US011853646B2

(12) United States Patent
Carrigan et al.

(10) Patent No.: US 11,853,646 B2
(45) Date of Patent: Dec. 26, 2023

(54) USER INTERFACES FOR AUDIO MEDIA CONTROL

(71) Applicant: Apple Inc., Cupertino, CA (US)

(72) Inventors: Taylor G. Carrigan, San Francisco, CA (US); Patrick L. Coffman, San Francisco, CA (US); Alan C. Dye, Cupertino, CA (US); Christopher P. Foss, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/922,675

(22) Filed: Jul. 7, 2020

(65) Prior Publication Data

US 2020/0379730 A1 Dec. 3, 2020

Related U.S. Application Data

(63) Continuation of application No. 16/888,775, filed on May 31, 2020.

(60) Provisional application No. 63/032,603, filed on May 30, 2020, provisional application No. 62/855,852, filed on May 31, 2019.

(51) Int. Cl.
*G06F 3/01* (2006.01)
*G06F 3/16* (2006.01)

(52) U.S. Cl.
CPC .............. *G06F 3/167* (2013.01); *G06F 3/017* (2013.01); *G06F 3/165* (2013.01)

(58) Field of Classification Search
CPC ........... G06F 3/167; G06F 3/017; G06F 3/165
See application file for complete search history.

(56) References Cited

U.S. PATENT DOCUMENTS

| 5,202,961 | A | 4/1993 | Mills et al. |
| 5,305,435 | A | 4/1994 | Bronson |
| 5,347,628 | A | 9/1994 | Welch et al. |
| 5,404,316 | A | 4/1995 | Klingler et al. |
| 5,463,725 | A | 10/1995 | Henckel et al. |

(Continued)

FOREIGN PATENT DOCUMENTS

| AU | 2007100826 A4 | 9/2007 |
| AU | 2008100011 A4 | 2/2008 |

(Continued)

OTHER PUBLICATIONS

"Problems with SmartThings on your Samsung snnartwatch", published to web on Nov. 9, 2018 at https://www.samsung.com/us/support/troubleshooting/TSG01003169/#smartthings-error-on-samsung-smartwatch, retrieved Nov. 23, 2020 (Year: 2018).*

(Continued)

*Primary Examiner* — Shourjo Dasgupta
(74) *Attorney, Agent, or Firm* — DLA Piper LLP (US)

(57) ABSTRACT

A method includes receiving data indicating a current media playback state of an external media playback device. The method includes, in response to receiving the data and in accordance with a determination that a set of external media playback device control criteria are met, displaying, via the display generation component, a user interface for controlling media playback at the external media playback device that includes one or more selectable user interface objects based on whether the data indicates that the external media playback device is currently performing a media playback operation.

36 Claims, 92 Drawing Sheets

(56) References Cited

U.S. PATENT DOCUMENTS

| | | |
|---|---|---|
| 5,495,566 A | 2/1996 | Kwatinetz |
| 5,513,342 A | 4/1996 | Leong et al. |
| 5,519,828 A | 5/1996 | Rayner |
| 5,521,841 A | 5/1996 | Arman et al. |
| 5,557,724 A | 9/1996 | Sampat et al. |
| 5,568,603 A | 10/1996 | Chen et al. |
| 5,611,060 A | 3/1997 | Belfiore et al. |
| 5,614,940 A | 3/1997 | Cobbley et al. |
| 5,682,326 A | 10/1997 | Klingler et al. |
| 5,684,970 A | 11/1997 | Asuma et al. |
| 5,692,213 A | 11/1997 | Harrison et al. |
| 5,726,687 A | 3/1998 | Belfiore et al. |
| 5,732,184 A | 3/1998 | Chao et al. |
| 5,745,096 A | 4/1998 | Ludolph et al. |
| 5,751,260 A | 5/1998 | Nappi et al. |
| 5,754,174 A | 5/1998 | Carpenter et al. |
| 5,758,180 A | 5/1998 | Duffy et al. |
| 5,760,767 A | 6/1998 | Shore et al. |
| 5,760,772 A | 6/1998 | Austin |
| 5,778,053 A | 7/1998 | Skarbo et al. |
| 5,793,366 A | 8/1998 | Proehl et al. |
| 5,841,971 A | 11/1998 | Longginou et al. |
| 5,864,868 A | 1/1999 | Contois |
| 5,872,566 A | 2/1999 | Bates et al. |
| 5,872,922 A | 2/1999 | Hogan et al. |
| 5,874,958 A | 2/1999 | Ludolph |
| 5,880,725 A | 3/1999 | Southgate |
| 5,880,733 A | 3/1999 | Horvitz et al. |
| 5,892,507 A | 4/1999 | Moorby |
| 5,936,623 A | 8/1999 | Amro |
| 5,999,173 A | 12/1999 | Ubillos |
| 6,011,537 A | 1/2000 | Slotznick |
| 6,016,248 A | 1/2000 | Anzai et al. |
| 6,023,275 A | 2/2000 | Horvitz et al. |
| 6,026,389 A | 2/2000 | Nakajima et al. |
| 6,031,529 A | 2/2000 | Migos et al. |
| 6,061,062 A | 5/2000 | Venolia |
| 6,072,503 A | 6/2000 | Tani et al. |
| 6,081,256 A | 6/2000 | Martin et al. |
| 6,094,197 A | 7/2000 | Buxton et al. |
| 6,115,037 A | 9/2000 | Sumiyoshi et al. |
| 6,118,450 A | 9/2000 | Proehl et al. |
| 6,140,987 A | 10/2000 | Stein et al. |
| 6,166,736 A | 12/2000 | Hugh |
| 6,204,840 B1 | 3/2001 | Petelycky et al. |
| 6,208,342 B1 | 3/2001 | Mugura et al. |
| 6,236,400 B1 | 5/2001 | Guerrero |
| 6,262,724 B1 | 7/2001 | Crow et al. |
| 6,308,187 B1 | 10/2001 | Destefano |
| 6,310,613 B1 | 10/2001 | Tanaka et al. |
| 6,317,784 B1 | 11/2001 | Mackintosh et al. |
| 6,323,846 B1 | 11/2001 | Westerman et al. |
| 6,332,147 B1 | 12/2001 | Moran et al. |
| 6,351,765 B1 | 2/2002 | Pietropaolo et al. |
| 6,362,837 B1 | 3/2002 | Ginn |
| 6,363,395 B1 | 3/2002 | Tanaka et al. |
| 6,366,296 B1 | 4/2002 | Boreczky et al. |
| 6,369,835 B1 | 4/2002 | Lin |
| 6,393,430 B1 | 5/2002 | Van |
| 6,393,462 B1 | 5/2002 | Mullen-schultz |
| 6,446,080 B1 | 9/2002 | Van Ryzin et al. |
| 6,452,609 B1 | 9/2002 | Katinsky et al. |
| 6,456,305 B1 | 9/2002 | Qureshi et al. |
| 6,477,117 B1 | 11/2002 | Narayanaswami et al. |
| 6,489,951 B1 | 12/2002 | Wong et al. |
| 6,504,934 B1 | 1/2003 | Kasai et al. |
| 6,515,681 B1 | 2/2003 | Knight |
| 6,515,988 B1 | 2/2003 | Eldridge et al. |
| 6,538,665 B2 | 3/2003 | Crow et al. |
| 6,539,243 B1 | 3/2003 | Kimura et al. |
| 6,539,343 B2 | 3/2003 | Zhao et al. |
| 6,544,295 B1 | 4/2003 | Bodnar et al. |
| 6,556,222 B1 | 4/2003 | Narayanaswami |
| 6,570,557 B1 | 5/2003 | Westerman |
| 6,577,330 B1 | 6/2003 | Tsuda et al. |
| 6,584,479 B2 | 6/2003 | Chang et al. |
| 6,587,127 B1 | 7/2003 | Stojakovic et al. |
| 6,600,936 B1 | 7/2003 | Kärkkäinen et al. |
| 6,674,452 B1 | 1/2004 | Kraft et al. |
| 6,677,932 B1 | 1/2004 | Westerman |
| 6,677,965 B1 | 1/2004 | Ullmann et al. |
| 6,725,427 B2 | 4/2004 | Freeman et al. |
| 6,833,848 B1 | 12/2004 | Wolff et al. |
| 6,834,371 B1 | 12/2004 | Jensen et al. |
| 6,850,256 B2 | 2/2005 | Crow et al. |
| 6,922,147 B1 | 7/2005 | Viksnins et al. |
| 6,975,306 B2 | 12/2005 | Hinckley et al. |
| 7,081,905 B1 | 7/2006 | Raghunath |
| 7,091,964 B2 | 8/2006 | Wong et al. |
| 7,111,240 B2 | 9/2006 | Crow et al. |
| 7,191,411 B2 | 3/2007 | Moehrle |
| 7,240,297 B1 | 7/2007 | Anderson et al. |
| 7,315,984 B2 | 1/2008 | Crow et al. |
| 7,318,196 B2 | 1/2008 | Crow et al. |
| 7,370,244 B2 | 5/2008 | Breitling et al. |
| 7,378,954 B2 | 5/2008 | Wendt |
| 7,415,720 B2 | 8/2008 | Jung |
| 7,441,207 B2 | 10/2008 | Filner |
| 7,454,192 B1 | 11/2008 | Zhu |
| 7,458,025 B2 | 11/2008 | Crow et al. |
| 7,479,949 B2 | 1/2009 | Jobs et al. |
| 7,492,350 B2 | 2/2009 | Fabre et al. |
| 7,526,728 B2 | 4/2009 | Apparao et al. |
| 7,546,470 B2 | 6/2009 | Schultz |
| 7,571,014 B1 | 8/2009 | Lambourne et al. |
| 7,581,186 B2 | 8/2009 | Dowdy et al. |
| 7,593,749 B2 | 9/2009 | Vallström et al. |
| 7,596,761 B2 | 9/2009 | Lemay et al. |
| 7,619,615 B1 | 11/2009 | Donoghue et al. |
| 7,656,393 B2 | 2/2010 | King et al. |
| 7,710,393 B2 | 5/2010 | Tsuk et al. |
| 7,730,223 B1 | 6/2010 | Bavor et al. |
| 7,750,893 B2 | 7/2010 | Hashimoto et al. |
| 7,831,054 B2 | 11/2010 | Ball et al. |
| 7,860,936 B1 | 12/2010 | Newstadt et al. |
| 7,996,792 B2 | 8/2011 | Anzures et al. |
| 8,028,323 B2 | 9/2011 | Weel |
| 8,042,157 B2 | 10/2011 | Bennett et al. |
| 8,046,804 B2 | 10/2011 | Kelts |
| 8,060,571 B2 | 11/2011 | Rao |
| 8,060,825 B2 | 11/2011 | Chaudhri et al. |
| 8,077,157 B2 | 12/2011 | Sengupta et al. |
| 8,116,807 B2 | 2/2012 | Matas |
| 8,146,019 B2 | 3/2012 | Kim et al. |
| 8,171,137 B1 | 5/2012 | Parks et al. |
| 8,196,043 B2 | 6/2012 | Crow et al. |
| 8,217,906 B2 | 7/2012 | Sinclair |
| 8,224,894 B1 | 7/2012 | Parks et al. |
| 8,225,191 B1 | 7/2012 | Kalman |
| 8,234,395 B2 | 7/2012 | Millington |
| 8,260,879 B2 | 9/2012 | Chan |
| 8,264,465 B2 | 9/2012 | Grant et al. |
| 8,280,539 B2 | 10/2012 | Jehan et al. |
| 8,290,603 B1 | 10/2012 | Lambourne |
| 8,305,356 B1 | 11/2012 | Jang |
| 8,386,563 B2 | 2/2013 | Parks et al. |
| 8,392,259 B2 | 3/2013 | Macgillivray et al. |
| 8,392,617 B1 | 3/2013 | Weber et al. |
| 8,434,133 B2 | 4/2013 | Kulkarni et al. |
| 8,458,780 B1 | 6/2013 | Takkallapally et al. |
| 8,467,766 B2 | 6/2013 | Rackley et al. |
| 8,478,363 B2 | 7/2013 | Levien et al. |
| 8,478,816 B2 | 7/2013 | Parks et al. |
| 8,531,427 B2 | 9/2013 | Jang |
| 8,564,543 B2 | 10/2013 | Chaudhri |
| 8,572,513 B2 | 10/2013 | Chaudhri et al. |
| 8,587,528 B2 | 11/2013 | Chaudhri |
| 8,589,823 B2 | 11/2013 | Lemay et al. |
| 8,613,070 B1 | 12/2013 | Deva et al. |
| 8,624,836 B1 | 1/2014 | Miller et al. |
| 8,682,722 B1 | 3/2014 | Des Jardins et al. |
| 8,689,128 B2 | 4/2014 | Chaudhri et al. |
| 8,698,762 B2 | 4/2014 | Wagner et al. |
| 8,718,556 B2 | 5/2014 | Lee et al. |

(56) References Cited

U.S. PATENT DOCUMENTS

| | | |
|---|---|---|
| 8,736,557 B2 | 5/2014 | Chaudhri et al. |
| 8,769,624 B2 | 7/2014 | Cotterill |
| 8,811,951 B1 | 8/2014 | Faaborg et al. |
| 8,812,601 B2 | 8/2014 | Hsieh et al. |
| 8,830,181 B1 | 9/2014 | Clark et al. |
| 8,860,674 B2 | 10/2014 | Lee et al. |
| 8,875,046 B2 | 10/2014 | Jitkoff |
| 8,884,874 B1 | 11/2014 | Kim et al. |
| 8,886,710 B2 | 11/2014 | Evans et al. |
| 8,914,752 B1 | 12/2014 | Spiegel |
| 8,914,840 B2 | 12/2014 | Reisman |
| 8,938,394 B1 | 1/2015 | Faaborg et al. |
| 8,943,410 B2 | 1/2015 | Ubillos |
| 8,984,431 B2 | 3/2015 | Newman et al. |
| 9,002,322 B2 | 4/2015 | Cotterill |
| 9,042,556 B2 | 5/2015 | Kallai et al. |
| 9,084,003 B1 | 7/2015 | Sanio et al. |
| 9,095,779 B2 | 8/2015 | Chan et al. |
| 9,100,944 B2 | 8/2015 | Sauhta et al. |
| 9,112,849 B1 | 8/2015 | Werkelin Ahlin et al. |
| 9,134,902 B2 | 9/2015 | Kang et al. |
| 9,185,062 B1 | 11/2015 | Yang et al. |
| 9,191,988 B2 | 11/2015 | Newham |
| 9,195,219 B2 | 11/2015 | Hong et al. |
| 9,202,509 B2 | 12/2015 | Kallai et al. |
| 9,239,605 B1 | 1/2016 | Nanda et al. |
| 9,244,584 B2 | 1/2016 | Fino |
| 9,247,363 B2 | 1/2016 | Triplett et al. |
| 9,251,787 B1 | 2/2016 | Hart et al. |
| 9,269,083 B1 | 2/2016 | Jarajapu et al. |
| 9,294,476 B1 | 3/2016 | Lurey et al. |
| 9,294,853 B1 | 3/2016 | Dhaundiyal |
| 9,319,782 B1 | 4/2016 | Hilmes et al. |
| 9,374,607 B2 | 6/2016 | Bates et al. |
| 9,395,905 B2 | 7/2016 | Wherry |
| 9,400,489 B2 | 7/2016 | Kim et al. |
| D765,118 S | 8/2016 | Bachman et al. |
| 9,407,624 B1 | 8/2016 | Myers et al. |
| 9,431,021 B1 | 8/2016 | Scalise et al. |
| 9,450,812 B2 | 9/2016 | Lee et al. |
| 9,451,144 B2 | 9/2016 | Dye |
| 9,477,208 B2 | 10/2016 | Park et al. |
| 9,489,106 B2 | 11/2016 | Chaudhri et al. |
| D773,510 S | 12/2016 | Foss et al. |
| 9,519,413 B2 | 12/2016 | Bates |
| 9,549,323 B2 | 1/2017 | Lee et al. |
| 9,582,178 B2 | 2/2017 | Grant et al. |
| 9,628,414 B1 | 4/2017 | Umapathy et al. |
| D789,381 S | 6/2017 | Okumura et al. |
| 9,680,927 B2 | 6/2017 | Miller et al. |
| 9,680,982 B2 | 6/2017 | Fiedler |
| 9,710,639 B1 * | 7/2017 | Saini .................. G06F 21/36 |
| 9,727,749 B2 * | 8/2017 | Tzeng ................. G06F 21/6218 |
| 9,794,720 B1 | 10/2017 | Kadri |
| 9,798,443 B1 | 10/2017 | Gray |
| 9,812,128 B2 | 11/2017 | Mixter et al. |
| 9,820,323 B1 | 11/2017 | Young et al. |
| 9,826,083 B2 | 11/2017 | Kanevsky et al. |
| 9,846,685 B2 | 12/2017 | Li |
| 9,847,999 B2 | 12/2017 | Van Os et al. |
| 9,898,250 B1 | 2/2018 | Williams et al. |
| 9,922,317 B2 | 3/2018 | Bak et al. |
| 9,954,989 B2 * | 4/2018 | Zhou ................. H04M 1/72403 |
| 9,967,401 B2 | 5/2018 | Coffman et al. |
| 10,055,094 B2 | 8/2018 | Li et al. |
| 10,089,607 B2 | 10/2018 | Ziat et al. |
| 10,089,983 B1 | 10/2018 | Gella et al. |
| 10,096,015 B2 | 10/2018 | Bak et al. |
| 10,104,089 B2 * | 10/2018 | Kim ..................... H04L 63/08 |
| 10,129,044 B2 * | 11/2018 | Kangshang .......... G06F 3/0481 |
| 10,142,122 B1 | 11/2018 | Hill et al. |
| 10,178,234 B2 | 1/2019 | Coffman et al. |
| 10,182,138 B2 | 1/2019 | Motika et al. |
| 10,198,563 B2 * | 2/2019 | Wang ................... G06F 21/35 |
| 10,200,468 B2 | 2/2019 | Leban et al. |
| 10,225,711 B2 | 3/2019 | Parks et al. |
| 10,237,141 B2 | 3/2019 | Sasaki et al. |
| 10,248,779 B2 | 4/2019 | Song et al. |
| 10,284,980 B1 | 5/2019 | Woo et al. |
| 10,299,300 B1 | 5/2019 | Young |
| 10,303,422 B1 | 5/2019 | Woo et al. |
| 10,304,463 B2 | 5/2019 | Mixter et al. |
| 10,310,725 B2 | 6/2019 | Smith et al. |
| 10,334,054 B2 | 6/2019 | Van Os et al. |
| 10,374,804 B2 * | 8/2019 | Lee ..................... H04W 12/082 |
| 10,412,206 B1 | 9/2019 | Liang et al. |
| 10,417,037 B2 | 9/2019 | Gruber et al. |
| 10,436,977 B2 | 10/2019 | Bergman et al. |
| 10,454,781 B2 | 10/2019 | Sasaki et al. |
| 10,490,195 B1 | 11/2019 | Krishnamoorthy et al. |
| 10,511,456 B2 | 12/2019 | Smith et al. |
| 10,523,625 B1 | 12/2019 | Allen et al. |
| 10,524,300 B2 | 12/2019 | Ueda et al. |
| 10,558,546 B2 | 2/2020 | Cranfill et al. |
| 10,567,515 B1 | 2/2020 | Bao |
| 10,705,701 B2 | 7/2020 | Pisula et al. |
| 10,713,699 B1 | 7/2020 | Lien et al. |
| 10,732,819 B2 * | 8/2020 | Wang .................. G06F 3/04817 |
| 10,742,645 B2 * | 8/2020 | Hevizi ................... H04W 4/60 |
| 10,742,648 B2 * | 8/2020 | Magyar ............... H04L 63/0876 |
| 10,749,967 B2 | 8/2020 | Van Os et al. |
| 10,779,085 B1 | 9/2020 | Carrigan |
| 10,802,843 B1 | 10/2020 | Carrigan et al. |
| 10,824,299 B2 * | 11/2020 | Bai ........................ G06F 3/0482 |
| 10,833,887 B2 * | 11/2020 | Wu ......................... G06F 3/048 |
| 10,924,446 B1 | 2/2021 | Paul |
| 10,963,145 B1 | 3/2021 | Voss et al. |
| 11,079,913 B1 | 8/2021 | Kim et al. |
| 11,343,370 B1 * | 5/2022 | Gordon ............... G06Q 20/409 |
| 11,431,834 B1 * | 8/2022 | Gordon ................. G06F 21/32 |
| 11,463,576 B1 * | 10/2022 | Gordon ............. H04M 1/72448 |
| 2001/0030597 A1 | 10/2001 | Inoue et al. |
| 2001/0031622 A1 | 10/2001 | Kivela et al. |
| 2001/0039497 A1 | 11/2001 | Hubbard |
| 2001/0043514 A1 | 11/2001 | Kita et al. |
| 2001/0049627 A1 | 12/2001 | Simpson |
| 2001/0050687 A1 | 12/2001 | Iida et al. |
| 2002/0002039 A1 | 1/2002 | Qureshey et al. |
| 2002/0015024 A1 | 2/2002 | Westerman et al. |
| 2002/0026442 A1 | 2/2002 | Lipscomb et al. |
| 2002/0048224 A1 | 4/2002 | Dygert et al. |
| 2002/0054158 A1 | 5/2002 | Asami |
| 2002/0054164 A1 | 5/2002 | Uemura |
| 2002/0057262 A1 | 5/2002 | Patrick et al. |
| 2002/0059295 A1 | 5/2002 | Ludtke et al. |
| 2002/0068600 A1 | 6/2002 | Chihara et al. |
| 2002/0080151 A1 | 6/2002 | Venolia |
| 2002/0115478 A1 | 8/2002 | Fujisawa et al. |
| 2002/0116276 A1 | 8/2002 | Ottley |
| 2002/0122066 A1 | 9/2002 | Bates et al. |
| 2002/0137565 A1 | 9/2002 | Blanco |
| 2002/0142734 A1 | 10/2002 | Wickstead |
| 2002/0154173 A1 | 10/2002 | Etgen et al. |
| 2002/0162005 A1 | 10/2002 | Ueda et al. |
| 2002/0168938 A1 | 11/2002 | Chang |
| 2002/0191028 A1 | 12/2002 | Senechalle et al. |
| 2002/0198909 A1 | 12/2002 | Huynh et al. |
| 2003/0028382 A1 | 2/2003 | Chambers et al. |
| 2003/0028639 A1 | 2/2003 | Yamamoto et al. |
| 2003/0030673 A1 | 2/2003 | Ho |
| 2003/0052901 A1 | 3/2003 | Fukuchi |
| 2003/0055977 A1 | 3/2003 | Miller |
| 2003/0067908 A1 | 4/2003 | Mattaway et al. |
| 2003/0076301 A1 | 4/2003 | Tsuk et al. |
| 2003/0079057 A1 | 4/2003 | Ruskin et al. |
| 2003/0081506 A1 | 5/2003 | Karhu et al. |
| 2003/0097358 A1 | 5/2003 | Mendez et al. |
| 2003/0097413 A1 | 5/2003 | Vishik et al. |
| 2003/0112938 A1 | 6/2003 | Kanakubo et al. |
| 2003/0122787 A1 | 7/2003 | Zimmerman et al. |
| 2003/0128192 A1 | 7/2003 | Van Os |
| 2003/0160861 A1 | 8/2003 | Barlow et al. |
| 2003/0182139 A1 | 9/2003 | Harris et al. |
| 2003/0188183 A1 | 10/2003 | Lee et al. |

(56) References Cited

U.S. PATENT DOCUMENTS

| | | |
|---|---|---|
| 2003/0229900 A1 | 12/2003 | Reisman |
| 2004/0019640 A1 | 1/2004 | Bartram et al. |
| 2004/0027371 A1 | 2/2004 | Jaeger |
| 2004/0032955 A1 | 2/2004 | Hashimoto et al. |
| 2004/0046638 A1 | 3/2004 | Kawasaki |
| 2004/0055446 A1 | 3/2004 | Robbin et al. |
| 2004/0056837 A1 | 3/2004 | Koga et al. |
| 2004/0066710 A1 | 4/2004 | Yuen et al. |
| 2004/0073432 A1 | 4/2004 | Stone |
| 2004/0100479 A1 | 5/2004 | Nakano et al. |
| 2004/0104896 A1 | 6/2004 | Suraqui |
| 2004/0122683 A1 | 6/2004 | Grossman et al. |
| 2004/0125088 A1 | 7/2004 | Zimmerman et al. |
| 2004/0130581 A1 | 7/2004 | Howard et al. |
| 2004/0139398 A1 | 7/2004 | Testa et al. |
| 2004/0140956 A1 | 7/2004 | Kushler et al. |
| 2004/0155907 A1 | 8/2004 | Yamaguchi et al. |
| 2004/0168118 A1 | 8/2004 | Wong et al. |
| 2004/0181695 A1 | 9/2004 | Walker et al. |
| 2004/0189714 A1 | 9/2004 | Fox et al. |
| 2004/0235520 A1 | 11/2004 | Cadiz et al. |
| 2004/0237048 A1 | 11/2004 | Tojo et al. |
| 2004/0242200 A1 | 12/2004 | Maeoka et al. |
| 2004/0250217 A1 | 12/2004 | Tojo et al. |
| 2004/0261010 A1* | 12/2004 | Matsuishi ........... G06F 16/9577 715/236 |
| 2004/0264916 A1 | 12/2004 | Van et al. |
| 2004/0266491 A1 | 12/2004 | Howard et al. |
| 2004/0268400 A1 | 12/2004 | Barde et al. |
| 2005/0012723 A1 | 1/2005 | Pallakoff |
| 2005/0021418 A1 | 1/2005 | Marcus et al. |
| 2005/0024341 A1 | 2/2005 | Gillespie et al. |
| 2005/0052458 A1 | 3/2005 | Lambert |
| 2005/0071188 A1 | 3/2005 | Thuerk |
| 2005/0093868 A1 | 5/2005 | Hinckley |
| 2005/0096009 A1 | 5/2005 | Ackley |
| 2005/0097135 A1 | 5/2005 | Epperson et al. |
| 2005/0117752 A1 | 6/2005 | Tima et al. |
| 2005/0144247 A1 | 6/2005 | Christensen et al. |
| 2005/0144452 A1 | 6/2005 | Lynch et al. |
| 2005/0144568 A1 | 6/2005 | Gruen et al. |
| 2005/0146534 A1 | 7/2005 | Fong et al. |
| 2005/0160372 A1 | 7/2005 | Gruen et al. |
| 2005/0162402 A1 | 7/2005 | Watanachote |
| 2005/0177445 A1 | 8/2005 | Church |
| 2005/0181774 A1 | 8/2005 | Miyata |
| 2005/0192924 A1 | 9/2005 | Drucker et al. |
| 2005/0210412 A1 | 9/2005 | Matthews et al. |
| 2005/0216839 A1 | 9/2005 | Salvucci |
| 2005/0220304 A1 | 10/2005 | Lenoir et al. |
| 2005/0229112 A1 | 10/2005 | Clay et al. |
| 2005/0240756 A1 | 10/2005 | Mayer |
| 2005/0251566 A1 | 11/2005 | Weel |
| 2005/0268237 A1 | 12/2005 | Crane et al. |
| 2005/0275628 A1 | 12/2005 | Balakrishnan et al. |
| 2005/0278587 A1 | 12/2005 | Breitling et al. |
| 2006/0001645 A1 | 1/2006 | Drucker et al. |
| 2006/0002523 A1 | 1/2006 | Bettis et al. |
| 2006/0019649 A1 | 1/2006 | Feinleib et al. |
| 2006/0020637 A1 | 1/2006 | Kedem |
| 2006/0020904 A1 | 1/2006 | Aaltonen et al. |
| 2006/0026535 A1 | 2/2006 | Hotelling et al. |
| 2006/0026536 A1 | 2/2006 | Hotelling et al. |
| 2006/0038796 A1 | 2/2006 | Hinckley et al. |
| 2006/0050054 A1 | 3/2006 | Liang et al. |
| 2006/0085751 A1 | 4/2006 | O'brien et al. |
| 2006/0085766 A1 | 4/2006 | Dominowska et al. |
| 2006/0125799 A1 | 6/2006 | Hillis et al. |
| 2006/0132456 A1 | 6/2006 | Anson |
| 2006/0132460 A1 | 6/2006 | Kolmykov-zotov et al. |
| 2006/0132469 A1 | 6/2006 | Lai et al. |
| 2006/0143716 A1 | 6/2006 | Ikemoto |
| 2006/0146074 A1 | 7/2006 | Harrison |
| 2006/0148455 A1 | 7/2006 | Kim |
| 2006/0156239 A1 | 7/2006 | Jobs et al. |
| 2006/0160090 A1 | 7/2006 | Macina et al. |
| 2006/0161621 A1 | 7/2006 | Rosenberg |
| 2006/0161870 A1 | 7/2006 | Hotelling et al. |
| 2006/0161871 A1 | 7/2006 | Hotelling et al. |
| 2006/0176278 A1 | 8/2006 | Mathews et al. |
| 2006/0178110 A1 | 8/2006 | Nurminen et al. |
| 2006/0185005 A1 | 8/2006 | Graves et al. |
| 2006/0197753 A1 | 9/2006 | Hotelling |
| 2006/0206709 A1 | 9/2006 | Labrou et al. |
| 2006/0210092 A1 | 9/2006 | Navid |
| 2006/0217104 A1 | 9/2006 | Cho |
| 2006/0224882 A1 | 10/2006 | Chin |
| 2006/0227106 A1 | 10/2006 | Hashimoto et al. |
| 2006/0236847 A1 | 10/2006 | Withop |
| 2006/0246874 A1 | 11/2006 | Sullivan |
| 2006/0250578 A1 | 11/2006 | Pohl et al. |
| 2006/0256090 A1 | 11/2006 | Huppi |
| 2006/0258289 A1 | 11/2006 | Dua |
| 2006/0268020 A1 | 11/2006 | Han |
| 2006/0271425 A1 | 11/2006 | Goodman et al. |
| 2006/0271864 A1 | 11/2006 | Satterfield et al. |
| 2006/0271867 A1 | 11/2006 | Wang et al. |
| 2006/0279541 A1 | 12/2006 | Kim et al. |
| 2006/0281449 A1 | 12/2006 | Kun et al. |
| 2006/0286971 A1 | 12/2006 | Maly et al. |
| 2006/0288226 A1 | 12/2006 | Kowal |
| 2007/0004451 A1 | 1/2007 | C. Anderson |
| 2007/0011614 A1 | 1/2007 | Crow et al. |
| 2007/0013671 A1 | 1/2007 | Zadesky et al. |
| 2007/0027682 A1 | 2/2007 | Bennett |
| 2007/0033295 A1 | 2/2007 | Marriott |
| 2007/0048714 A1 | 3/2007 | Plastina et al. |
| 2007/0053268 A1 | 3/2007 | Crandall et al. |
| 2007/0055947 A1 | 3/2007 | Ostojic et al. |
| 2007/0057775 A1 | 3/2007 | O'reilly et al. |
| 2007/0070045 A1 | 3/2007 | Sung et al. |
| 2007/0070066 A1 | 3/2007 | Bakhash |
| 2007/0073649 A1 | 3/2007 | Kikkoji et al. |
| 2007/0085841 A1 | 4/2007 | Tsuk et al. |
| 2007/0097090 A1 | 5/2007 | Battles |
| 2007/0097093 A1 | 5/2007 | Ohshita et al. |
| 2007/0113294 A1 | 5/2007 | Field et al. |
| 2007/0115933 A1 | 5/2007 | Muhamed et al. |
| 2007/0124680 A1 | 5/2007 | Robbin et al. |
| 2007/0126715 A1 | 6/2007 | Funamoto |
| 2007/0136679 A1 | 6/2007 | Yang |
| 2007/0136778 A1 | 6/2007 | Birger et al. |
| 2007/0143495 A1 | 6/2007 | Porat |
| 2007/0150842 A1 | 6/2007 | Chaudhri et al. |
| 2007/0152979 A1 | 7/2007 | Jobs et al. |
| 2007/0157089 A1 | 7/2007 | Van Os et al. |
| 2007/0157094 A1 | 7/2007 | Lemay et al. |
| 2007/0157103 A1 | 7/2007 | Arneson et al. |
| 2007/0162963 A1 | 7/2007 | Penet et al. |
| 2007/0168369 A1 | 7/2007 | Bruns |
| 2007/0168413 A1 | 7/2007 | Barletta et al. |
| 2007/0180492 A1 | 8/2007 | Hassan et al. |
| 2007/0186106 A1 | 8/2007 | Ting et al. |
| 2007/0186235 A1 | 8/2007 | Jarman et al. |
| 2007/0191008 A1 | 8/2007 | Bucher et al. |
| 2007/0192744 A1 | 8/2007 | Reponen |
| 2007/0198111 A1 | 8/2007 | Oetzel et al. |
| 2007/0226645 A1 | 9/2007 | Kongqiao et al. |
| 2007/0226778 A1 | 9/2007 | Pietruszka |
| 2007/0229221 A1 | 10/2007 | Saotome |
| 2007/0260547 A1 | 11/2007 | Little |
| 2007/0283011 A1 | 12/2007 | Rakowski et al. |
| 2007/0294182 A1 | 12/2007 | Hammad |
| 2008/0011827 A1 | 1/2008 | Little et al. |
| 2008/0016368 A1 | 1/2008 | Adams |
| 2008/0016468 A1 | 1/2008 | Chambers et al. |
| 2008/0016537 A1 | 1/2008 | Little et al. |
| 2008/0017721 A1 | 1/2008 | Zehnacker |
| 2008/0027947 A1 | 1/2008 | Pritchett et al. |
| 2008/0034011 A1 | 2/2008 | Cisler et al. |
| 2008/0034289 A1 | 2/2008 | Doepke et al. |
| 2008/0036743 A1 | 2/2008 | Westerman et al. |
| 2008/0037951 A1 | 2/2008 | Cho et al. |
| 2008/0040786 A1 | 2/2008 | Chang et al. |

(56) References Cited

U.S. PATENT DOCUMENTS

| | | |
|---|---|---|
| 2008/0042866 A1 | 2/2008 | Morse et al. |
| 2008/0055264 A1 | 3/2008 | Anzures et al. |
| 2008/0057926 A1 | 3/2008 | Forstall et al. |
| 2008/0062141 A1 | 3/2008 | Chaudhri |
| 2008/0065505 A1 | 3/2008 | Plastina et al. |
| 2008/0066016 A1 | 3/2008 | Dowdy et al. |
| 2008/0075368 A1 | 3/2008 | Kuzmin |
| 2008/0081558 A1 | 4/2008 | Dunko et al. |
| 2008/0082939 A1 | 4/2008 | Nash et al. |
| 2008/0084400 A1 | 4/2008 | Rosenberg |
| 2008/0091717 A1 | 4/2008 | Garbow et al. |
| 2008/0094367 A1 | 4/2008 | Van De Ven et al. |
| 2008/0100693 A1 | 5/2008 | Jobs et al. |
| 2008/0109764 A1 | 5/2008 | Linnamaki |
| 2008/0114678 A1 | 5/2008 | Bennett et al. |
| 2008/0114980 A1 | 5/2008 | Sridhar |
| 2008/0122794 A1 | 5/2008 | Koiso et al. |
| 2008/0122796 A1 | 5/2008 | Jobs et al. |
| 2008/0126935 A1 | 5/2008 | Blomgren |
| 2008/0147735 A1 | 6/2008 | Sloo |
| 2008/0150959 A1 | 6/2008 | Marui et al. |
| 2008/0155413 A1 | 6/2008 | Ubillos et al. |
| 2008/0155417 A1 | 6/2008 | Vallone et al. |
| 2008/0155474 A1 | 6/2008 | Duhig et al. |
| 2008/0158170 A1 | 7/2008 | Herz et al. |
| 2008/0160974 A1 | 7/2008 | Vartiainen et al. |
| 2008/0163127 A1 | 7/2008 | Newell et al. |
| 2008/0165141 A1 | 7/2008 | Christie |
| 2008/0165152 A1 | 7/2008 | Forstall et al. |
| 2008/0165153 A1 | 7/2008 | Platzer et al. |
| 2008/0168185 A1 | 7/2008 | Robbin et al. |
| 2008/0168384 A1 | 7/2008 | Platzer et al. |
| 2008/0168395 A1 | 7/2008 | Ording et al. |
| 2008/0168403 A1 | 7/2008 | Westerman et al. |
| 2008/0190266 A1 | 8/2008 | Kim et al. |
| 2008/0201454 A1 | 8/2008 | Soffer |
| 2008/0208762 A1 | 8/2008 | Arthur et al. |
| 2008/0214163 A1 | 9/2008 | Onyon et al. |
| 2008/0222546 A1 | 9/2008 | Mudd et al. |
| 2008/0225007 A1 | 9/2008 | Nakadaira et al. |
| 2008/0225013 A1 | 9/2008 | Muylkens et al. |
| 2008/0229409 A1 | 9/2008 | Miller et al. |
| 2008/0250319 A1 | 10/2008 | Lee et al. |
| 2008/0259829 A1 | 10/2008 | Rosenblatt |
| 2008/0273712 A1 | 11/2008 | Eichfeld et al. |
| 2008/0273713 A1 | 11/2008 | Hartung et al. |
| 2008/0282202 A1 | 11/2008 | Sunday |
| 2008/0285772 A1 | 11/2008 | Haulick et al. |
| 2008/0292074 A1 | 11/2008 | Boni et al. |
| 2008/0313257 A1 | 12/2008 | Allen et al. |
| 2008/0320391 A1 | 12/2008 | Lemay et al. |
| 2009/0002335 A1 | 1/2009 | Chaudhri |
| 2009/0002396 A1 | 1/2009 | Andrews et al. |
| 2009/0006846 A1 | 1/2009 | Rosenblatt |
| 2009/0006958 A1 | 1/2009 | Pohjola et al. |
| 2009/0007188 A1 | 1/2009 | Omernick |
| 2009/0031375 A1 | 1/2009 | Sullivan et al. |
| 2009/0051327 A1 | 2/2009 | Bohne |
| 2009/0051649 A1 | 2/2009 | Rondel |
| 2009/0054044 A1 | 2/2009 | Ikemori et al. |
| 2009/0055377 A1 | 2/2009 | Hedge et al. |
| 2009/0058822 A1 | 3/2009 | Chaudhri |
| 2009/0060170 A1 | 3/2009 | Coughlan et al. |
| 2009/0061837 A1 | 3/2009 | Chaudhri et al. |
| 2009/0063851 A1 | 3/2009 | Nijdam |
| 2009/0075694 A1 | 3/2009 | Kim et al. |
| 2009/0077491 A1 | 3/2009 | Kim |
| 2009/0094681 A1 | 4/2009 | Sadler et al. |
| 2009/0100383 A1 | 4/2009 | Sunday et al. |
| 2009/0119754 A1 | 5/2009 | Schubert |
| 2009/0122149 A1 | 5/2009 | Ishii |
| 2009/0125571 A1* | 5/2009 | Kiilerich ............ G06F 16/9574 |
| 2009/0128500 A1 | 5/2009 | Sinclair |
| 2009/0133051 A1 | 5/2009 | Hildreth |
| 2009/0135678 A1 | 5/2009 | Godat |
| 2009/0140960 A1 | 6/2009 | Mahowald et al. |
| 2009/0140991 A1 | 6/2009 | Takasaki et al. |
| 2009/0143114 A1 | 6/2009 | Vargas et al. |
| 2009/0144391 A1 | 6/2009 | Jung et al. |
| 2009/0144451 A1 | 6/2009 | Cabezas et al. |
| 2009/0144623 A1 | 6/2009 | Jung |
| 2009/0146962 A1 | 6/2009 | Ahonen et al. |
| 2009/0153289 A1 | 6/2009 | Hope et al. |
| 2009/0158390 A1 | 6/2009 | Guan |
| 2009/0164581 A1 | 6/2009 | Bove et al. |
| 2009/0164923 A1 | 6/2009 | Ovi et al. |
| 2009/0165107 A1 | 6/2009 | Tojo et al. |
| 2009/0174677 A1 | 7/2009 | Gehani et al. |
| 2009/0174680 A1 | 7/2009 | Anzures et al. |
| 2009/0174763 A1 | 7/2009 | Bengtsson et al. |
| 2009/0177966 A1 | 7/2009 | Chaudhri |
| 2009/0187423 A1 | 7/2009 | Kim |
| 2009/0187981 A1 | 7/2009 | Pan et al. |
| 2009/0193514 A1 | 7/2009 | Adams et al. |
| 2009/0195497 A1 | 8/2009 | Fitzgerald et al. |
| 2009/0198359 A1 | 8/2009 | Chaudhri |
| 2009/0199119 A1 | 8/2009 | Park et al. |
| 2009/0199130 A1 | 8/2009 | Tsern et al. |
| 2009/0199188 A1 | 8/2009 | Fujimaki |
| 2009/0204920 A1 | 8/2009 | Beverley et al. |
| 2009/0204929 A1 | 8/2009 | Baurmann et al. |
| 2009/0228938 A1 | 9/2009 | White et al. |
| 2009/0231960 A1 | 9/2009 | Hutcheson |
| 2009/0241169 A1 | 9/2009 | Dhand et al. |
| 2009/0244015 A1 | 10/2009 | Sengupta et al. |
| 2009/0248737 A1 | 10/2009 | Shukla et al. |
| 2009/0264116 A1 | 10/2009 | Thompson et al. |
| 2009/0265417 A1 | 10/2009 | Svendsen et al. |
| 2009/0271744 A1 | 10/2009 | Anders |
| 2009/0279392 A1 | 11/2009 | Scott et al. |
| 2009/0304205 A1 | 12/2009 | Hardacker et al. |
| 2009/0307633 A1 | 12/2009 | Haughay et al. |
| 2009/0311993 A1 | 12/2009 | Horodezky |
| 2009/0312059 A1 | 12/2009 | Pratt et al. |
| 2009/0322695 A1 | 12/2009 | Cho et al. |
| 2009/0327449 A1 | 12/2009 | Silverman et al. |
| 2010/0001967 A1 | 1/2010 | Yoo |
| 2010/0004031 A1 | 1/2010 | Kim |
| 2010/0005421 A1 | 1/2010 | Yoshioka |
| 2010/0023449 A1 | 1/2010 | Skowronek et al. |
| 2010/0042654 A1 | 2/2010 | Heller et al. |
| 2010/0042835 A1 | 2/2010 | Lee et al. |
| 2010/0054497 A1 | 3/2010 | Bull et al. |
| 2010/0058228 A1 | 3/2010 | Park |
| 2010/0058253 A1 | 3/2010 | Son |
| 2010/0070490 A1 | 3/2010 | Amidon et al. |
| 2010/0081473 A1 | 4/2010 | Chatterjee et al. |
| 2010/0082374 A1 | 4/2010 | Charania et al. |
| 2010/0082481 A1 | 4/2010 | Lin et al. |
| 2010/0085379 A1 | 4/2010 | Hishikawa et al. |
| 2010/0088634 A1 | 4/2010 | Tsuruta |
| 2010/0088639 A1 | 4/2010 | Yach et al. |
| 2010/0094834 A1 | 4/2010 | Svendsen |
| 2010/0106647 A1 | 4/2010 | Raman |
| 2010/0107229 A1 | 4/2010 | Najafi et al. |
| 2010/0121636 A1 | 5/2010 | Burke et al. |
| 2010/0122195 A1 | 5/2010 | Hwang |
| 2010/0125785 A1 | 5/2010 | Moore et al. |
| 2010/0131978 A1 | 5/2010 | Friedlander et al. |
| 2010/0159995 A1 | 6/2010 | Stallings et al. |
| 2010/0174644 A1 | 7/2010 | Rosano et al. |
| 2010/0174993 A1 | 7/2010 | Pennington et al. |
| 2010/0178873 A1 | 7/2010 | Lee et al. |
| 2010/0205563 A1 | 8/2010 | Haapsaari et al. |
| 2010/0223542 A1 | 9/2010 | Vuong et al. |
| 2010/0225495 A1 | 9/2010 | Marui |
| 2010/0229094 A1 | 9/2010 | Nakajima et al. |
| 2010/0231534 A1 | 9/2010 | Chaudhri et al. |
| 2010/0231535 A1 | 9/2010 | Chaudhri et al. |
| 2010/0231536 A1 | 9/2010 | Chaudhri et al. |
| 2010/0231537 A1 | 9/2010 | Pisula et al. |
| 2010/0235729 A1 | 9/2010 | Kocienda et al. |
| 2010/0248823 A1 | 9/2010 | Smith |
| 2010/0250376 A1 | 9/2010 | Nandiraju |

(56) References Cited

U.S. PATENT DOCUMENTS

| | | |
|---|---|---|
| 2010/0251304 A1 | 9/2010 | Donoghue et al. |
| 2010/0257484 A1 | 10/2010 | Nakamura et al. |
| 2010/0259482 A1 | 10/2010 | Ball |
| 2010/0269156 A1 | 10/2010 | Hohlfeld et al. |
| 2010/0272250 A1 | 10/2010 | Yap et al. |
| 2010/0283743 A1 | 11/2010 | Coddington |
| 2010/0284389 A1 | 11/2010 | Ramsay et al. |
| 2010/0293598 A1 | 11/2010 | Collart et al. |
| 2010/0295803 A1 | 11/2010 | Kim et al. |
| 2010/0296678 A1 | 11/2010 | Kuhn-rahloff et al. |
| 2010/0299436 A1 | 11/2010 | Khalid et al. |
| 2010/0299639 A1 | 11/2010 | Ramsay et al. |
| 2010/0302172 A1 | 12/2010 | Wilairat et al. |
| 2010/0306657 A1 | 12/2010 | Derbyshire et al. |
| 2010/0318917 A1 | 12/2010 | Holladay et al. |
| 2010/0318928 A1 | 12/2010 | Neuman et al. |
| 2010/0318939 A1 | 12/2010 | Moon |
| 2010/0321201 A1 | 12/2010 | Huang et al. |
| 2010/0325239 A1 | 12/2010 | Khedouri et al. |
| 2011/0003587 A1 | 1/2011 | Belz et al. |
| 2011/0010470 A1 | 1/2011 | Hulbert et al. |
| 2011/0016089 A1 | 1/2011 | Freedman et al. |
| 2011/0029750 A1 | 2/2011 | Jang et al. |
| 2011/0029891 A1 | 2/2011 | Kim et al. |
| 2011/0035799 A1 | 2/2011 | Handler |
| 2011/0041102 A1 | 2/2011 | Kim |
| 2011/0054268 A1 | 3/2011 | Fidacaro et al. |
| 2011/0054647 A1 | 3/2011 | Chipchase |
| 2011/0059769 A1 | 3/2011 | Brunolli |
| 2011/0065384 A1 | 3/2011 | Cader et al. |
| 2011/0070924 A1 | 3/2011 | Kim et al. |
| 2011/0071656 A1 | 3/2011 | Mckiel, Jr. |
| 2011/0081923 A1 | 4/2011 | Bednar et al. |
| 2011/0082902 A1 | 4/2011 | Rottler et al. |
| 2011/0087431 A1 | 4/2011 | Gupta et al. |
| 2011/0088086 A1 | 4/2011 | Swink et al. |
| 2011/0106671 A1 | 5/2011 | Minnis et al. |
| 2011/0109540 A1 | 5/2011 | Milne et al. |
| 2011/0126148 A1 | 5/2011 | Krishnaraj et al. |
| 2011/0130168 A1 | 6/2011 | Vendrow et al. |
| 2011/0131537 A1 | 6/2011 | Cho et al. |
| 2011/0138166 A1 | 6/2011 | Peszek et al. |
| 2011/0138295 A1 | 6/2011 | Momchilov et al. |
| 2011/0142234 A1 | 6/2011 | Rogers |
| 2011/0149874 A1 | 6/2011 | Reif |
| 2011/0157046 A1 | 6/2011 | Lee et al. |
| 2011/0159469 A1 | 6/2011 | Hwang et al. |
| 2011/0159927 A1 | 6/2011 | Choi |
| 2011/0163971 A1 | 7/2011 | Wagner et al. |
| 2011/0164042 A1 | 7/2011 | Chaudhri |
| 2011/0164269 A1 | 7/2011 | Kamishiro |
| 2011/0179386 A1 | 7/2011 | Shaffer et al. |
| 2011/0183650 A1 | 7/2011 | Mckee |
| 2011/0185048 A1 | 7/2011 | Yew et al. |
| 2011/0187497 A1 | 8/2011 | Chin |
| 2011/0191695 A1 | 8/2011 | Dinka et al. |
| 2011/0209099 A1 | 8/2011 | Hinckley et al. |
| 2011/0214158 A1 | 9/2011 | Pasquero et al. |
| 2011/0215921 A1 | 9/2011 | Ben et al. |
| 2011/0218765 A1 | 9/2011 | Rogers et al. |
| 2011/0225426 A1 | 9/2011 | Agarwal et al. |
| 2011/0231914 A1 | 9/2011 | Hung |
| 2011/0234152 A1 | 9/2011 | Frossen et al. |
| 2011/0242002 A1 | 10/2011 | Kaplan et al. |
| 2011/0246942 A1 | 10/2011 | Misawa |
| 2011/0250895 A1 | 10/2011 | Wohlert et al. |
| 2011/0254683 A1 | 10/2011 | Soldan et al. |
| 2011/0273526 A1 | 11/2011 | Mehin et al. |
| 2011/0275358 A1 | 11/2011 | Faenger |
| 2011/0279852 A1 | 11/2011 | Oda et al. |
| 2011/0281568 A1 | 11/2011 | Le Clech |
| 2011/0291971 A1 | 12/2011 | Masaki et al. |
| 2011/0302493 A1 | 12/2011 | Runstedler et al. |
| 2011/0306393 A1 | 12/2011 | Goldman et al. |
| 2011/0314398 A1 | 12/2011 | Yano et al. |
| 2011/0319056 A1 | 12/2011 | Toy et al. |
| 2011/0320450 A1 | 12/2011 | Liu et al. |
| 2012/0004920 A1 | 1/2012 | Kelly et al. |
| 2012/0005708 A1 | 1/2012 | Kelts |
| 2012/0011437 A1 | 1/2012 | James et al. |
| 2012/0016678 A1 | 1/2012 | Gruber et al. |
| 2012/0024947 A1 | 2/2012 | Naelon et al. |
| 2012/0033028 A1 | 2/2012 | Murphy et al. |
| 2012/0036556 A1 | 2/2012 | Lebeau et al. |
| 2012/0040719 A1 | 2/2012 | Lee et al. |
| 2012/0044062 A1 | 2/2012 | Jersa et al. |
| 2012/0050185 A1 | 3/2012 | Davydov et al. |
| 2012/0051560 A1 | 3/2012 | Sanders |
| 2012/0054278 A1 | 3/2012 | Taleb et al. |
| 2012/0059813 A1 | 3/2012 | Sejnoha et al. |
| 2012/0062470 A1 | 3/2012 | Chang et al. |
| 2012/0066632 A1 | 3/2012 | Sundermeyer et al. |
| 2012/0066731 A1 | 3/2012 | Vasquez et al. |
| 2012/0079126 A1 | 3/2012 | Evans et al. |
| 2012/0084697 A1 | 4/2012 | Reeves |
| 2012/0088477 A1 | 4/2012 | Cassidy et al. |
| 2012/0089951 A1 | 4/2012 | Cassidy |
| 2012/0096069 A1 | 4/2012 | Chan |
| 2012/0096076 A1 | 4/2012 | Chan et al. |
| 2012/0096386 A1 | 4/2012 | Baumann et al. |
| 2012/0105358 A1 | 5/2012 | Momeyer et al. |
| 2012/0110455 A1 | 5/2012 | Sharma et al. |
| 2012/0115608 A1 | 5/2012 | Pfeifer et al. |
| 2012/0129496 A1 | 5/2012 | Park et al. |
| 2012/0131459 A1 | 5/2012 | Ilama-vaquero et al. |
| 2012/0136998 A1 | 5/2012 | Hough et al. |
| 2012/0143694 A1 | 6/2012 | Zargahi et al. |
| 2012/0154156 A1 | 6/2012 | Kuntzel |
| 2012/0178431 A1 | 7/2012 | Gold |
| 2012/0197419 A1 | 8/2012 | Dhruv et al. |
| 2012/0197523 A1 | 8/2012 | Kirsch |
| 2012/0210226 A1 | 8/2012 | Mccoy et al. |
| 2012/0214458 A1 | 8/2012 | Levien et al. |
| 2012/0215684 A1 | 8/2012 | Kidron |
| 2012/0218177 A1 | 8/2012 | Pang et al. |
| 2012/0222092 A1 | 8/2012 | Rabii |
| 2012/0223890 A1 | 9/2012 | Borovsky et al. |
| 2012/0223959 A1 | 9/2012 | Lengeling et al. |
| 2012/0231849 A1 | 9/2012 | Yamashita et al. |
| 2012/0254810 A1 | 10/2012 | Heck et al. |
| 2012/0260169 A1 | 10/2012 | Schwartz et al. |
| 2012/0269361 A1 | 10/2012 | Bhow et al. |
| 2012/0272145 A1 | 10/2012 | Ryan et al. |
| 2012/0272230 A1* | 10/2012 | Lee .................... H04L 67/32 717/173 |
| 2012/0284185 A1 | 11/2012 | Mettler et al. |
| 2012/0284297 A1 | 11/2012 | Aguera-arcas et al. |
| 2012/0284673 A1 | 11/2012 | Lamb et al. |
| 2012/0290657 A1 | 11/2012 | Parks et al. |
| 2012/0290943 A1 | 11/2012 | Toney et al. |
| 2012/0294118 A1 | 11/2012 | Haulick et al. |
| 2012/0297017 A1 | 11/2012 | Livshits et al. |
| 2012/0304111 A1 | 11/2012 | Queru et al. |
| 2012/0311444 A1 | 12/2012 | Chaudhri |
| 2012/0322508 A1 | 12/2012 | Forstall et al. |
| 2012/0323868 A1 | 12/2012 | Robbin et al. |
| 2012/0324390 A1 | 12/2012 | Tao et al. |
| 2013/0002589 A1 | 1/2013 | Jang |
| 2013/0005487 A1 | 1/2013 | Frazzini et al. |
| 2013/0007203 A1 | 1/2013 | Szu |
| 2013/0007617 A1 | 1/2013 | Mackenzie et al. |
| 2013/0017846 A1 | 1/2013 | Schoppe |
| 2013/0021236 A1 | 1/2013 | Bender et al. |
| 2013/0022221 A1 | 1/2013 | Kallai et al. |
| 2013/0024932 A1 | 1/2013 | Toebes et al. |
| 2013/0026293 A1 | 1/2013 | Schneider et al. |
| 2013/0027289 A1 | 1/2013 | Choi et al. |
| 2013/0027341 A1 | 1/2013 | Mastandrea |
| 2013/0030892 A1 | 1/2013 | Liu et al. |
| 2013/0031217 A1 | 1/2013 | Rajapakse |
| 2013/0041790 A1 | 2/2013 | Murugesan et al. |
| 2013/0044072 A1 | 2/2013 | Kobayashi et al. |
| 2013/0046893 A1 | 2/2013 | Hauser et al. |
| 2013/0047084 A1 | 2/2013 | Sanders et al. |

(56) References Cited

U.S. PATENT DOCUMENTS

| | | |
|---|---|---|
| 2013/0047233 A1 | 2/2013 | Fisk et al. |
| 2013/0051755 A1 | 2/2013 | Brown et al. |
| 2013/0053107 A1 | 2/2013 | Kang et al. |
| 2013/0054697 A1 | 2/2013 | Cha et al. |
| 2013/0055082 A1 | 2/2013 | Fino et al. |
| 2013/0055150 A1 | 2/2013 | Galor |
| 2013/0060687 A1 | 3/2013 | Bak et al. |
| 2013/0063084 A1 | 3/2013 | Tilvis et al. |
| 2013/0063364 A1 | 3/2013 | Moore |
| 2013/0073286 A1 | 3/2013 | Bastea-forte et al. |
| 2013/0073584 A1 | 3/2013 | Kuper et al. |
| 2013/0074194 A1 | 3/2013 | White et al. |
| 2013/0080177 A1 | 3/2013 | Chen |
| 2013/0080516 A1 | 3/2013 | Bologh |
| 2013/0080525 A1 | 3/2013 | Aoki et al. |
| 2013/0080955 A1 | 3/2013 | Reimann et al. |
| 2013/0082819 A1 | 4/2013 | Cotterill |
| 2013/0086637 A1 | 4/2013 | Cotterill et al. |
| 2013/0091205 A1 | 4/2013 | Kotler et al. |
| 2013/0094666 A1 | 4/2013 | Haaff et al. |
| 2013/0094770 A1* | 4/2013 | Lee .................. G06F 21/36 382/218 |
| 2013/0102281 A1 | 4/2013 | Kanda et al. |
| 2013/0102298 A1 | 4/2013 | Goodman et al. |
| 2013/0103797 A1 | 4/2013 | Park et al. |
| 2013/0111407 A1 | 5/2013 | Mullen |
| 2013/0111579 A1 | 5/2013 | Newman et al. |
| 2013/0113822 A1 | 5/2013 | Putrevu et al. |
| 2013/0115932 A1 | 5/2013 | Williams et al. |
| 2013/0117693 A1 | 5/2013 | Anderson et al. |
| 2013/0120106 A1 | 5/2013 | Cauwels et al. |
| 2013/0120254 A1 | 5/2013 | Mun et al. |
| 2013/0124207 A1* | 5/2013 | Sarin .................. G06F 3/167 704/E11.001 |
| 2013/0132865 A1 | 5/2013 | Li |
| 2013/0138272 A1 | 5/2013 | Louise-Babando et al. |
| 2013/0141514 A1 | 6/2013 | Chao et al. |
| 2013/0145303 A1 | 6/2013 | Prakash et al. |
| 2013/0159858 A1 | 6/2013 | Joffray et al. |
| 2013/0162411 A1 | 6/2013 | Moses et al. |
| 2013/0166332 A1 | 6/2013 | Hammad |
| 2013/0173699 A1 | 7/2013 | Parks et al. |
| 2013/0173794 A1 | 7/2013 | Agerbak et al. |
| 2013/0174044 A1 | 7/2013 | Hill |
| 2013/0185813 A1 | 7/2013 | Shim et al. |
| 2013/0189963 A1 | 7/2013 | Epp et al. |
| 2013/0191220 A1 | 7/2013 | Dent et al. |
| 2013/0191454 A1 | 7/2013 | Oliver et al. |
| 2013/0191911 A1 | 7/2013 | Dellinger et al. |
| 2013/0194476 A1 | 8/2013 | Shimosato |
| 2013/0205375 A1 | 8/2013 | Woxblom et al. |
| 2013/0212212 A1 | 8/2013 | Addepalli et al. |
| 2013/0222270 A1 | 8/2013 | Winkler et al. |
| 2013/0222271 A1 | 8/2013 | Alberth et al. |
| 2013/0223821 A1 | 8/2013 | Issa et al. |
| 2013/0231127 A1 | 9/2013 | Kildal et al. |
| 2013/0234924 A1 | 9/2013 | Janefalkar et al. |
| 2013/0239202 A1 | 9/2013 | Adams et al. |
| 2013/0243924 A1 | 9/2013 | Bhandari et al. |
| 2013/0244615 A1 | 9/2013 | Miller |
| 2013/0246522 A1 | 9/2013 | Bilinski et al. |
| 2013/0246916 A1 | 9/2013 | Reimann et al. |
| 2013/0254574 A1 | 9/2013 | Zacchio et al. |
| 2013/0262298 A1 | 10/2013 | Morley et al. |
| 2013/0262857 A1 | 10/2013 | Neuman et al. |
| 2013/0272511 A1 | 10/2013 | Mateer et al. |
| 2013/0282180 A1 | 10/2013 | Layton |
| 2013/0283161 A1 | 10/2013 | Reimann et al. |
| 2013/0283199 A1 | 10/2013 | Selig et al. |
| 2013/0298024 A1 | 11/2013 | Rhee et al. |
| 2013/0304758 A1 | 11/2013 | Gruber et al. |
| 2013/0305354 A1* | 11/2013 | King .................. G06F 21/629 726/19 |
| 2013/0311597 A1 | 11/2013 | Arrouye et al. |
| 2013/0311986 A1 | 11/2013 | Arrouye et al. |
| 2013/0311997 A1 | 11/2013 | Gruber et al. |
| 2013/0314302 A1 | 11/2013 | Jeung et al. |
| 2013/0316763 A1 | 11/2013 | Kader |
| 2013/0318158 A1 | 11/2013 | Teng et al. |
| 2013/0318249 A1 | 11/2013 | Mcdonough et al. |
| 2013/0322634 A1 | 12/2013 | Bennett et al. |
| 2013/0324081 A1 | 12/2013 | Gargi et al. |
| 2013/0325967 A1 | 12/2013 | Parks et al. |
| 2013/0329924 A1* | 12/2013 | Fleizach .............. H04R 25/558 381/314 |
| 2013/0332162 A1 | 12/2013 | Keen |
| 2013/0332560 A1 | 12/2013 | Knight et al. |
| 2013/0333006 A1 | 12/2013 | Tapling et al. |
| 2013/0339343 A1 | 12/2013 | Hierons et al. |
| 2013/0346068 A1 | 12/2013 | Solem et al. |
| 2013/0346859 A1 | 12/2013 | Bates et al. |
| 2013/0347022 A1 | 12/2013 | Bates et al. |
| 2014/0003597 A1 | 1/2014 | Lazaridis et al. |
| 2014/0006562 A1 | 1/2014 | Handa et al. |
| 2014/0026188 A1 | 1/2014 | Gubler |
| 2014/0032706 A1 | 1/2014 | Kuscher et al. |
| 2014/0033035 A1 | 1/2014 | Crow et al. |
| 2014/0037107 A1 | 2/2014 | Marino et al. |
| 2014/0037109 A1 | 2/2014 | Ban |
| 2014/0040742 A1 | 2/2014 | Park et al. |
| 2014/0043424 A1 | 2/2014 | Gava et al. |
| 2014/0047020 A1* | 2/2014 | Matus .................. H04M 1/67 709/204 |
| 2014/0047382 A1 | 2/2014 | Kim et al. |
| 2014/0049447 A1 | 2/2014 | Choi |
| 2014/0058860 A1 | 2/2014 | Roh et al. |
| 2014/0064155 A1 | 3/2014 | Evans et al. |
| 2014/0068751 A1 | 3/2014 | Last |
| 2014/0072282 A1 | 3/2014 | Cho |
| 2014/0073256 A1 | 3/2014 | Newham et al. |
| 2014/0075130 A1 | 3/2014 | Bansal et al. |
| 2014/0075311 A1 | 3/2014 | Boettcher et al. |
| 2014/0080416 A1 | 3/2014 | Seo et al. |
| 2014/0082136 A1 | 3/2014 | Garcia Puga et al. |
| 2014/0082715 A1 | 3/2014 | Grajek et al. |
| 2014/0089196 A1 | 3/2014 | Paya et al. |
| 2014/0094224 A1 | 4/2014 | Lozovoy et al. |
| 2014/0095965 A1 | 4/2014 | Li |
| 2014/0104178 A1 | 4/2014 | Jo |
| 2014/0114966 A1 | 4/2014 | Bilinski et al. |
| 2014/0122730 A1 | 5/2014 | Burch et al. |
| 2014/0136481 A1 | 5/2014 | Quan et al. |
| 2014/0136986 A1 | 5/2014 | Martin et al. |
| 2014/0139637 A1 | 5/2014 | Mistry et al. |
| 2014/0143737 A1 | 5/2014 | Mistry et al. |
| 2014/0149884 A1 | 5/2014 | Flynn et al. |
| 2014/0155031 A1 | 6/2014 | Lee et al. |
| 2014/0157160 A1 | 6/2014 | Cudak et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0171156 A1 | 6/2014 | Pattikonda et al. |
| 2014/0173447 A1 | 6/2014 | Das et al. |
| 2014/0176298 A1 | 6/2014 | Kumar et al. |
| 2014/0181104 A1 | 6/2014 | Chin et al. |
| 2014/0181183 A1 | 6/2014 | Yamamoto et al. |
| 2014/0181202 A1 | 6/2014 | Gossain |
| 2014/0181654 A1* | 6/2014 | Kumar ................ G11B 27/105 715/716 |
| 2014/0189589 A1 | 7/2014 | Kim et al. |
| 2014/0207707 A1 | 7/2014 | Na et al. |
| 2014/0215413 A1 | 7/2014 | Calkins et al. |
| 2014/0223490 A1 | 8/2014 | Pan et al. |
| 2014/0229835 A1 | 8/2014 | Ravine |
| 2014/0236325 A1 | 8/2014 | Sasaki et al. |
| 2014/0237361 A1 | 8/2014 | Martin et al. |
| 2014/0245161 A1 | 8/2014 | Yuen et al. |
| 2014/0247229 A1 | 9/2014 | Cho et al. |
| 2014/0253487 A1 | 9/2014 | Bezinge et al. |
| 2014/0258292 A1 | 9/2014 | Thramann et al. |
| 2014/0267002 A1 | 9/2014 | Luna |
| 2014/0267911 A1 | 9/2014 | Grant et al. |
| 2014/0270183 A1 | 9/2014 | Luna |
| 2014/0282103 A1 | 9/2014 | Jerry |

(56) References Cited

U.S. PATENT DOCUMENTS

| | | |
|---|---|---|
| 2014/0282240 A1 | 9/2014 | Flynn et al. |
| 2014/0283018 A1 | 9/2014 | Dadu et al. |
| 2014/0298432 A1 | 10/2014 | Brown |
| 2014/0310348 A1 | 10/2014 | Keskitalo et al. |
| 2014/0315163 A1 | 10/2014 | Ingrassia et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0333414 A1 | 11/2014 | Kursun |
| 2014/0334644 A1 | 11/2014 | Selig et al. |
| 2014/0335789 A1 | 11/2014 | Malamud et al. |
| 2014/0337791 A1 | 11/2014 | Agnetta et al. |
| 2014/0337931 A1 | 11/2014 | Cotterill |
| 2014/0344904 A1 | 11/2014 | Venkataramani et al. |
| 2014/0347275 A1 | 11/2014 | Jung et al. |
| 2014/0351339 A1 | 11/2014 | Kaneoka et al. |
| 2014/0351346 A1 | 11/2014 | Barton |
| 2014/0354759 A1 | 12/2014 | Cranfill et al. |
| 2014/0359140 A1 | 12/2014 | Shankarraman |
| 2014/0359454 A1 | 12/2014 | Lee et al. |
| 2014/0359637 A1 | 12/2014 | Yan |
| 2014/0359709 A1 | 12/2014 | Nassar et al. |
| 2014/0363024 A1 | 12/2014 | Apodaca |
| 2014/0364056 A1 | 12/2014 | Alsina et al. |
| 2014/0365904 A1* | 12/2014 | Kim ............... G06F 3/04817 715/741 |
| 2014/0372309 A1 | 12/2014 | Bullard et al. |
| 2014/0375577 A1 | 12/2014 | Yeh et al. |
| 2014/0380187 A1 | 12/2014 | Lewin et al. |
| 2014/0380234 A1 | 12/2014 | Shim et al. |
| 2015/0012435 A1 | 1/2015 | Wright et al. |
| 2015/0019944 A1 | 1/2015 | Kalgi |
| 2015/0020081 A1 | 1/2015 | Cho et al. |
| 2015/0029089 A1 | 1/2015 | Kim |
| 2015/0032812 A1 | 1/2015 | Dudley |
| 2015/0033361 A1* | 1/2015 | Choi ............... G06F 3/0482 726/27 |
| 2015/0039494 A1 | 2/2015 | Sinton et al. |
| 2015/0049591 A1 | 2/2015 | Adams et al. |
| 2015/0051913 A1 | 2/2015 | Choi |
| 2015/0052222 A1 | 2/2015 | Farrell et al. |
| 2015/0058651 A1 | 2/2015 | Choi et al. |
| 2015/0058744 A1 | 2/2015 | Dhingra et al. |
| 2015/0067803 A1 | 3/2015 | Alduaiji |
| 2015/0081072 A1 | 3/2015 | Kallai et al. |
| 2015/0089359 A1* | 3/2015 | Brisebois ............ G06F 3/04817 715/702 |
| 2015/0095175 A1 | 4/2015 | Dua |
| 2015/0095804 A1 | 4/2015 | Grossman et al. |
| 2015/0111558 A1 | 4/2015 | Yang |
| 2015/0111559 A1 | 4/2015 | Leaver et al. |
| 2015/0113407 A1 | 4/2015 | Hoffert et al. |
| 2015/0120545 A1 | 4/2015 | Fiore et al. |
| 2015/0130737 A1 | 5/2015 | Im et al. |
| 2015/0135282 A1 | 5/2015 | Kong et al. |
| 2015/0138101 A1 | 5/2015 | Park et al. |
| 2015/0143419 A1 | 5/2015 | Bhagwat et al. |
| 2015/0148927 A1 | 5/2015 | Georges et al. |
| 2015/0149599 A1 | 5/2015 | Caunter et al. |
| 2015/0154589 A1 | 6/2015 | Li |
| 2015/0154676 A1 | 6/2015 | Matousek et al. |
| 2015/0160856 A1 | 6/2015 | Jang et al. |
| 2015/0163188 A1 | 6/2015 | Faaborg et al. |
| 2015/0176998 A1 | 6/2015 | Huang et al. |
| 2015/0177914 A1 | 6/2015 | Coyner et al. |
| 2015/0179008 A1 | 6/2015 | Sung et al. |
| 2015/0186892 A1 | 7/2015 | Zhang et al. |
| 2015/0189426 A1 | 7/2015 | Pang |
| 2015/0193069 A1 | 7/2015 | Di Censo et al. |
| 2015/0193130 A1 | 7/2015 | Cho et al. |
| 2015/0193196 A1 | 7/2015 | Lin et al. |
| 2015/0193392 A1 | 7/2015 | Greenblatt et al. |
| 2015/0195133 A1 | 7/2015 | Sheets et al. |
| 2015/0199967 A1 | 7/2015 | Reddy et al. |
| 2015/0200715 A1 | 7/2015 | Oiwa et al. |
| 2015/0205511 A1 | 7/2015 | Vinna et al. |
| 2015/0205971 A1 | 7/2015 | Sanio et al. |
| 2015/0208158 A1 | 7/2015 | Sanders |
| 2015/0213542 A1 | 7/2015 | Wallaja |
| 2015/0215128 A1 | 7/2015 | Pal |
| 2015/0215382 A1 | 7/2015 | Arora et al. |
| 2015/0215398 A1 | 7/2015 | Murphy et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229750 A1 | 8/2015 | Zhou et al. |
| 2015/0229782 A1 | 8/2015 | Zuidema et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1* | 8/2015 | Yarbrough ............ G06Q 20/327 705/44 |
| 2015/0243163 A1 | 8/2015 | Shoemake et al. |
| 2015/0248200 A1 | 9/2015 | Cho et al. |
| 2015/0248268 A1 | 9/2015 | Kumar et al. |
| 2015/0249540 A1 | 9/2015 | Khalil et al. |
| 2015/0253960 A1 | 9/2015 | Lin et al. |
| 2015/0254661 A1 | 9/2015 | Lanc |
| 2015/0256957 A1 | 9/2015 | Kim et al. |
| 2015/0261493 A1 | 9/2015 | Lemmon et al. |
| 2015/0262183 A1 | 9/2015 | Gervais et al. |
| 2015/0264304 A1 | 9/2015 | Chastney et al. |
| 2015/0271120 A1 | 9/2015 | Langholz |
| 2015/0278799 A1 | 10/2015 | Palanisamy |
| 2015/0286694 A1 | 10/2015 | Kaplinger et al. |
| 2015/0295921 A1 | 10/2015 | Cao |
| 2015/0302856 A1 | 10/2015 | Kim et al. |
| 2015/0304330 A1 | 10/2015 | Soannboonsrup et al. |
| 2015/0309768 A1 | 10/2015 | Van Der Heide |
| 2015/0312299 A1 | 10/2015 | Chen et al. |
| 2015/0317977 A1 | 11/2015 | Manjunath et al. |
| 2015/0319006 A1 | 11/2015 | Plummer et al. |
| 2015/0319046 A1 | 11/2015 | Plummer et al. |
| 2015/0324552 A1 | 11/2015 | Beckhardt |
| 2015/0339466 A1 | 11/2015 | Gao et al. |
| 2015/0347010 A1 | 12/2015 | Yang et al. |
| 2015/0347738 A1* | 12/2015 | Ulrich ............... G06F 21/35 726/17 |
| 2015/0348002 A1 | 12/2015 | Van Os |
| 2015/0350031 A1 | 12/2015 | Burks et al. |
| 2015/0350296 A1 | 12/2015 | Yang et al. |
| 2015/0350297 A1 | 12/2015 | Yang et al. |
| 2015/0350448 A1 | 12/2015 | Coffman et al. |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0358304 A1 | 12/2015 | Beckhardt et al. |
| 2015/0365400 A1 | 12/2015 | Cox |
| 2015/0370426 A1 | 12/2015 | Carrigan et al. |
| 2015/0373172 A1 | 12/2015 | Boesen |
| 2015/0378522 A1 | 12/2015 | Butts et al. |
| 2015/0382047 A1 | 12/2015 | Van Os et al. |
| 2016/0004393 A1 | 1/2016 | Faaborg et al. |
| 2016/0004417 A1* | 1/2016 | Bates ................ G06F 3/04847 715/716 |
| 2016/0004499 A1 | 1/2016 | Kim et al. |
| 2016/0005024 A1 | 1/2016 | Harrell |
| 2016/0006745 A1 | 1/2016 | Furuichi et al. |
| 2016/0012417 A1 | 1/2016 | Mizon |
| 2016/0014266 A1 | 1/2016 | Bhatt |
| 2016/0022202 A1 | 1/2016 | Peterson et al. |
| 2016/0026429 A1 | 1/2016 | Triplett |
| 2016/0026779 A1 | 1/2016 | Grigg et al. |
| 2016/0028869 A1 | 1/2016 | Bhatt |
| 2016/0029146 A1 | 1/2016 | Tembey et al. |
| 2016/0034887 A1 | 2/2016 | Lee |
| 2016/0036996 A1 | 2/2016 | Midholt et al. |
| 2016/0037345 A1 | 2/2016 | Margadoudakis |
| 2016/0043962 A1 | 2/2016 | Kim et al. |
| 2016/0048705 A1* | 2/2016 | Yang ................ H04W 12/06 726/34 |

(56) References Cited

U.S. PATENT DOCUMENTS

| | | |
|---|---|---|
| 2016/0050199 A1 | 2/2016 | Ganesan |
| 2016/0050476 A1 | 2/2016 | Patil |
| 2016/0054710 A1 | 2/2016 | Kim et al. |
| 2016/0062487 A1* | 3/2016 | Foss ................. G06F 3/0393 345/184 |
| 2016/0062567 A1 | 3/2016 | Yang et al. |
| 2016/0062589 A1 | 3/2016 | Wan et al. |
| 2016/0062606 A1 | 3/2016 | Vega et al. |
| 2016/0065707 A1 | 3/2016 | Yang et al. |
| 2016/0065708 A1 | 3/2016 | Yang et al. |
| 2016/0066277 A1 | 3/2016 | Yang et al. |
| 2016/0070244 A1 | 3/2016 | Cipollo et al. |
| 2016/0073197 A1 | 3/2016 | Hammer et al. |
| 2016/0073482 A1 | 3/2016 | Fok et al. |
| 2016/0077734 A1 | 3/2016 | Buxton et al. |
| 2016/0085565 A1 | 3/2016 | Arcese et al. |
| 2016/0086176 A1 | 3/2016 | Henrique et al. |
| 2016/0088039 A1 | 3/2016 | Millington et al. |
| 2016/0092072 A1 | 3/2016 | So et al. |
| 2016/0092665 A1 | 3/2016 | Cowan et al. |
| 2016/0094678 A1 | 3/2016 | Kumar et al. |
| 2016/0097651 A1 | 4/2016 | Jung et al. |
| 2016/0099901 A1 | 4/2016 | Allen et al. |
| 2016/0127799 A1 | 5/2016 | Alsina et al. |
| 2016/0132864 A1 | 5/2016 | Shah et al. |
| 2016/0134488 A1 | 5/2016 | Straub et al. |
| 2016/0134942 A1 | 5/2016 | Lo |
| 2016/0139752 A1 | 5/2016 | Shim et al. |
| 2016/0142763 A1 | 5/2016 | Kim et al. |
| 2016/0150624 A1 | 5/2016 | Meerbeek et al. |
| 2016/0156687 A1 | 6/2016 | Leung |
| 2016/0156992 A1 | 6/2016 | Kuper |
| 2016/0162252 A1 | 6/2016 | Di Censo et al. |
| 2016/0171482 A1 | 6/2016 | Muncey et al. |
| 2016/0173318 A1 | 6/2016 | Ha et al. |
| 2016/0173617 A1 | 6/2016 | Allinson |
| 2016/0183046 A1 | 6/2016 | Kwon |
| 2016/0189451 A1 | 6/2016 | Yoo et al. |
| 2016/0196042 A1 | 7/2016 | Laute et al. |
| 2016/0196106 A1 | 7/2016 | Hammer et al. |
| 2016/0202866 A1 | 7/2016 | Zambetti |
| 2016/0209939 A1 | 7/2016 | Zambetti et al. |
| 2016/0210983 A1 | 7/2016 | Amada et al. |
| 2016/0226674 A1 | 8/2016 | Kangshang et al. |
| 2016/0231902 A1 | 8/2016 | Sirpal et al. |
| 2016/0239167 A1 | 8/2016 | Reimann et al. |
| 2016/0241543 A1 | 8/2016 | Jung et al. |
| 2016/0246566 A1 | 8/2016 | Fullerton et al. |
| 2016/0253145 A1 | 9/2016 | Lee et al. |
| 2016/0259656 A1 | 9/2016 | Sumner et al. |
| 2016/0259936 A1 | 9/2016 | Mukherjee et al. |
| 2016/0267319 A1 | 9/2016 | Murillo et al. |
| 2016/0267779 A1 | 9/2016 | Kuang |
| 2016/0277708 A1 | 9/2016 | Rintel et al. |
| 2016/0277903 A1 | 9/2016 | Poosala et al. |
| 2016/0291924 A1 | 10/2016 | Bierbower et al. |
| 2016/0295340 A1 | 10/2016 | Baker et al. |
| 2016/0299669 A1 | 10/2016 | Bates et al. |
| 2016/0299736 A1 | 10/2016 | Bates et al. |
| 2016/0314451 A1 | 10/2016 | Martin |
| 2016/0320849 A1 | 11/2016 | Koo |
| 2016/0335041 A1 | 11/2016 | Wachter et al. |
| 2016/0336531 A1 | 11/2016 | Yokoyama |
| 2016/0342141 A1 | 11/2016 | Koumaiha et al. |
| 2016/0342386 A1 | 11/2016 | Kallai et al. |
| 2016/0345039 A1 | 11/2016 | Billmeyer |
| 2016/0345172 A1 | 11/2016 | Cotterill |
| 2016/0351191 A1 | 12/2016 | Lehtiniemi et al. |
| 2016/0352661 A1 | 12/2016 | Yang et al. |
| 2016/0357354 A1 | 12/2016 | Chen et al. |
| 2016/0360344 A1* | 12/2016 | Shim ................. G06F 3/04883 |
| 2016/0364600 A1* | 12/2016 | Shah ................. G06F 3/04883 |
| 2016/0366481 A1 | 12/2016 | Lim et al. |
| 2016/0366531 A1 | 12/2016 | Popova |
| 2016/0373884 A1 | 12/2016 | Peterson et al. |
| 2016/0378961 A1 | 12/2016 | Park |
| 2016/0381476 A1 | 12/2016 | Gossain et al. |
| 2017/0003931 A1 | 1/2017 | Dvortsov et al. |
| 2017/0010782 A1 | 1/2017 | Chaudhri et al. |
| 2017/0010794 A1* | 1/2017 | Cho ................. G06F 3/04817 |
| 2017/0013562 A1* | 1/2017 | Lim ................. G06F 1/1698 |
| 2017/0017531 A1 | 1/2017 | Choi et al. |
| 2017/0019517 A1 | 1/2017 | Wilder et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0031648 A1 | 2/2017 | So et al. |
| 2017/0041727 A1 | 2/2017 | Reimann |
| 2017/0046025 A1 | 2/2017 | Dascola et al. |
| 2017/0054731 A1 | 2/2017 | Cotterill |
| 2017/0060402 A1 | 3/2017 | Bates |
| 2017/0061965 A1 | 3/2017 | Penilla et al. |
| 2017/0068402 A1 | 3/2017 | Lochhead et al. |
| 2017/0068507 A1* | 3/2017 | Kim ................. G06F 1/3228 |
| 2017/0070346 A1 | 3/2017 | Lombardi et al. |
| 2017/0078294 A1 | 3/2017 | Medvinsky |
| 2017/0083285 A1 | 3/2017 | Meyers et al. |
| 2017/0083494 A1 | 3/2017 | Yun et al. |
| 2017/0092085 A1 | 3/2017 | Agarwal |
| 2017/0092270 A1 | 3/2017 | Newendorp et al. |
| 2017/0094049 A1 | 3/2017 | Kanevsky et al. |
| 2017/0097621 A1 | 4/2017 | Ackmann et al. |
| 2017/0099270 A1 | 4/2017 | Anson |
| 2017/0115940 A1* | 4/2017 | Byeon ................. G06F 3/0346 |
| 2017/0127145 A1 | 5/2017 | Rajapakse |
| 2017/0134553 A1 | 5/2017 | Jeon et al. |
| 2017/0134567 A1* | 5/2017 | Jeon ................. H04M 1/72454 |
| 2017/0134872 A1 | 5/2017 | Silva et al. |
| 2017/0142087 A1 | 5/2017 | Maninder et al. |
| 2017/0142584 A1 | 5/2017 | Oh et al. |
| 2017/0148010 A1 | 5/2017 | Bak et al. |
| 2017/0180843 A1 | 6/2017 | Perianu et al. |
| 2017/0185373 A1 | 6/2017 | Kim et al. |
| 2017/0192730 A1 | 7/2017 | Yang et al. |
| 2017/0193813 A1 | 7/2017 | Carroll et al. |
| 2017/0195772 A1* | 7/2017 | Han ................. A61B 5/6817 |
| 2017/0206779 A1 | 7/2017 | Lee et al. |
| 2017/0227935 A1 | 8/2017 | Su et al. |
| 2017/0235545 A1 | 8/2017 | Millington et al. |
| 2017/0235926 A1 | 8/2017 | Fyke et al. |
| 2017/0242653 A1 | 8/2017 | Lang et al. |
| 2017/0242657 A1 | 8/2017 | Jarvis et al. |
| 2017/0251314 A1 | 8/2017 | Pye et al. |
| 2017/0263249 A1 | 9/2017 | Akbacak et al. |
| 2017/0285788 A1 | 10/2017 | Park et al. |
| 2017/0287312 A1 | 10/2017 | Schofield et al. |
| 2017/0289249 A1 | 10/2017 | Knight et al. |
| 2017/0293610 A1 | 10/2017 | Tran |
| 2017/0322713 A1 | 11/2017 | Hwang et al. |
| 2017/0339151 A1 | 11/2017 | Van Os et al. |
| 2017/0357421 A1 | 12/2017 | Dye et al. |
| 2017/0357425 A1 | 12/2017 | Smith et al. |
| 2017/0357434 A1 | 12/2017 | Coffman et al. |
| 2017/0357439 A1* | 12/2017 | Lemay ................. G06F 3/0484 |
| 2017/0357477 A1 | 12/2017 | Im et al. |
| 2017/0357478 A1 | 12/2017 | Piersol et al. |
| 2017/0357973 A1 | 12/2017 | Van et al. |
| 2017/0359189 A1 | 12/2017 | Smith et al. |
| 2017/0359191 A1 | 12/2017 | Smith et al. |
| 2017/0359555 A1 | 12/2017 | Irani et al. |
| 2017/0363436 A1 | 12/2017 | Eronen et al. |
| 2017/0374004 A1 | 12/2017 | Holmes et al. |
| 2018/0019973 A1 | 1/2018 | Mikhailov et al. |
| 2018/0032997 A1 | 2/2018 | Gordon et al. |
| 2018/0039916 A1* | 2/2018 | Ravindra ................. G06Q 10/025 |
| 2018/0040322 A1 | 2/2018 | Mixter et al. |
| 2018/0040324 A1 | 2/2018 | Wilberding |
| 2018/0061421 A1 | 3/2018 | Sarikaya |
| 2018/0067528 A1 | 3/2018 | Wang et al. |
| 2018/0067712 A1* | 3/2018 | Behzadi ................. G06F 3/0484 |
| 2018/0067904 A1 | 3/2018 | Li |
| 2018/0069957 A1 | 3/2018 | Mushikabe et al. |
| 2018/0070187 A1 | 3/2018 | Drinkwater et al. |
| 2018/0075439 A1 | 3/2018 | Bak et al. |

(56) References Cited

U.S. PATENT DOCUMENTS

| | | |
|---|---|---|
| 2018/0082682 A1 | 3/2018 | Erickson et al. |
| 2018/0096690 A1 | 4/2018 | Mixter et al. |
| 2018/0096696 A1 | 4/2018 | Mixter |
| 2018/0101297 A1 | 4/2018 | Yang et al. |
| 2018/0109629 A1 | 4/2018 | Van Os et al. |
| 2018/0124128 A1 | 5/2018 | Faulkner et al. |
| 2018/0139292 A1 | 5/2018 | Koren et al. |
| 2018/0144590 A1 | 5/2018 | Mixter et al. |
| 2018/0182389 A1 | 6/2018 | Devaraj et al. |
| 2018/0190264 A1 | 7/2018 | Mixter et al. |
| 2018/0190279 A1 | 7/2018 | Anderson et al. |
| 2018/0218201 A1 | 8/2018 | Siminoff |
| 2018/0227341 A1 | 8/2018 | Rizzi |
| 2018/0228003 A1 | 8/2018 | O'Driscoll et al. |
| 2018/0234549 A1 | 8/2018 | Coffman et al. |
| 2018/0253281 A1 | 9/2018 | Jarvis et al. |
| 2018/0267773 A1 | 9/2018 | Kim et al. |
| 2018/0288115 A1 | 10/2018 | Asnis et al. |
| 2018/0302790 A1 | 10/2018 | Cotterill |
| 2018/0308480 A1 | 10/2018 | Jang et al. |
| 2018/0329585 A1 | 11/2018 | Carrigan et al. |
| 2018/0329586 A1 | 11/2018 | Sundstrom et al. |
| 2018/0330589 A1 | 11/2018 | Horling |
| 2018/0332559 A1 | 11/2018 | Gudivada et al. |
| 2018/0335903 A1* | 11/2018 | Coffman ............ G06F 3/04847 |
| 2018/0336904 A1 | 11/2018 | Piercy et al. |
| 2018/0336905 A1 | 11/2018 | Kim et al. |
| 2018/0337924 A1 | 11/2018 | Graham et al. |
| 2018/0341448 A1* | 11/2018 | Behzadi ................. G06F 3/14 |
| 2018/0351762 A1* | 12/2018 | Iyengar ................ G05B 15/02 |
| 2018/0357631 A1 | 12/2018 | Bak et al. |
| 2018/0364665 A1 | 12/2018 | Clymer et al. |
| 2019/0012069 A1 | 1/2019 | Bates |
| 2019/0012073 A1 | 1/2019 | Hwang |
| 2019/0012966 A1* | 1/2019 | Shi ...................... G09G 3/3677 |
| 2019/0025943 A1 | 1/2019 | Jobs et al. |
| 2019/0028419 A1 | 1/2019 | Sullivan |
| 2019/0043508 A1 | 2/2019 | Sak et al. |
| 2019/0056854 A1 | 2/2019 | Azzolin et al. |
| 2019/0056907 A1 | 2/2019 | So et al. |
| 2019/0080698 A1 | 3/2019 | Miller |
| 2019/0102145 A1 | 4/2019 | Wilberding et al. |
| 2019/0124049 A1 | 4/2019 | Bradley et al. |
| 2019/0124203 A1 | 4/2019 | Coffman et al. |
| 2019/0124510 A1 | 4/2019 | Cotterill et al. |
| 2019/0129661 A1 | 5/2019 | Hirota et al. |
| 2019/0138951 A1 | 5/2019 | Brownhill et al. |
| 2019/0149972 A1 | 5/2019 | Parks et al. |
| 2019/0158645 A1 | 5/2019 | Yang et al. |
| 2019/0163329 A1 | 5/2019 | Yang et al. |
| 2019/0172467 A1 | 6/2019 | Kim et al. |
| 2019/0199963 A1 | 6/2019 | Ahn et al. |
| 2019/0221227 A1 | 7/2019 | Mixter |
| 2019/0222775 A1 | 7/2019 | Ahn |
| 2019/0278900 A1 | 9/2019 | Yang et al. |
| 2019/0289079 A1 | 9/2019 | Van Os et al. |
| 2019/0294406 A1 | 9/2019 | Bierbower et al. |
| 2019/0306607 A1 | 10/2019 | Clayton et al. |
| 2019/0310820 A1 | 10/2019 | Bates |
| 2019/0311721 A1 | 10/2019 | Edwards |
| 2019/0361575 A1 | 11/2019 | Ni et al. |
| 2019/0361729 A1 | 11/2019 | Gruber et al. |
| 2019/0370781 A1 | 12/2019 | Van Os et al. |
| 2019/0370805 A1 | 12/2019 | Van Os et al. |
| 2019/0371313 A1 | 12/2019 | Naughton et al. |
| 2019/0378500 A1 | 12/2019 | Miller et al. |
| 2020/0050426 A1 | 2/2020 | Jung et al. |
| 2020/0050502 A1 | 2/2020 | Ghafourifar et al. |
| 2020/0075026 A1 | 3/2020 | Peeler et al. |
| 2020/0104018 A1 | 4/2020 | Coffman et al. |
| 2020/0120503 A1 | 4/2020 | Cotterill |
| 2020/0126560 A1 | 4/2020 | Ho et al. |
| 2020/0135191 A1 | 4/2020 | Nourbakhsh |
| 2020/0151601 A1 | 5/2020 | Niewczas |
| 2020/0152186 A1 | 5/2020 | Koh et al. |
| 2020/0154583 A1 | 5/2020 | Lee et al. |
| 2020/0184964 A1 | 6/2020 | Myers et al. |
| 2020/0186378 A1 | 6/2020 | Six et al. |
| 2020/0192627 A1 | 6/2020 | Jang et al. |
| 2020/0201491 A1 | 6/2020 | Coffman et al. |
| 2020/0201495 A1 | 6/2020 | Coffman et al. |
| 2020/0213437 A1 | 7/2020 | Bhatt |
| 2020/0213530 A1 | 7/2020 | Ahn |
| 2020/0218486 A1* | 7/2020 | Behzadi ............. H04M 1/6066 |
| 2020/0225817 A1 | 7/2020 | Coffman et al. |
| 2020/0275144 A1 | 8/2020 | Major |
| 2020/0294499 A1 | 9/2020 | Deluca et al. |
| 2020/0302913 A1 | 9/2020 | Marcinkiewicz |
| 2020/0336909 A1 | 10/2020 | Seel et al. |
| 2020/0366742 A1 | 11/2020 | Van Os et al. |
| 2020/0379711 A1 | 12/2020 | Graham et al. |
| 2020/0379712 A1 | 12/2020 | Carrigan |
| 2020/0379713 A1 | 12/2020 | Carrigan |
| 2020/0379714 A1 | 12/2020 | Graham et al. |
| 2020/0379716 A1 | 12/2020 | Carrigan et al. |
| 2020/0379729 A1 | 12/2020 | Graham et al. |
| 2020/0380972 A1 | 12/2020 | Carrigan et al. |
| 2020/0382332 A1 | 12/2020 | Carrigan et al. |
| 2020/0383157 A1 | 12/2020 | Lee et al. |
| 2020/0395012 A1 | 12/2020 | Kim et al. |
| 2020/0413197 A1 | 12/2020 | Carrigan et al. |
| 2021/0011588 A1 | 1/2021 | Coffman et al. |
| 2021/0011613 A1 | 1/2021 | Pisula et al. |
| 2021/0014610 A1 | 1/2021 | Carrigan et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0099829 A1 | 4/2021 | Soto et al. |
| 2021/0158830 A1 | 5/2021 | Boehlke |
| 2021/0173431 A1 | 6/2021 | Yang et al. |
| 2021/0181903 A1 | 6/2021 | Carrigan et al. |
| 2021/0203765 A1 | 7/2021 | Yang et al. |
| 2021/0255816 A1* | 8/2021 | Behzadi ............. H04M 1/6066 |
| 2021/0255819 A1 | 8/2021 | Graham et al. |
| 2021/0263702 A1 | 8/2021 | Carrigan |
| 2021/0266274 A1 | 8/2021 | Liu et al. |
| 2021/0272118 A1 | 9/2021 | Van Os et al. |
| 2021/0323406 A1 | 10/2021 | So et al. |
| 2021/0349680 A1 | 11/2021 | Kim et al. |
| 2021/0352172 A1 | 11/2021 | Kim et al. |
| 2021/0392223 A1 | 12/2021 | Coffman et al. |
| 2022/0004356 A1 | 1/2022 | Kim et al. |
| 2022/0043626 A1 | 2/2022 | Carrigan |
| 2022/0058257 A1 | 2/2022 | Cotterill |
| 2022/0100367 A1 | 3/2022 | Carrigan et al. |
| 2022/0100841 A1 | 3/2022 | Yang et al. |
| 2022/0116399 A1 | 4/2022 | Carrigan et al. |
| 2022/0129144 A1 | 4/2022 | Carrigan et al. |
| 2022/0137759 A1 | 5/2022 | Yang et al. |
| 2022/0163996 A1 | 5/2022 | Yang et al. |
| 2022/0191162 A1 | 6/2022 | Hegarty et al. |
| 2022/0277037 A1 | 9/2022 | Sanders et al. |
| 2022/0279063 A1 | 9/2022 | Coffman et al. |
| 2022/0286549 A1 | 9/2022 | Coffman et al. |
| 2022/0303383 A1 | 9/2022 | Coffman et al. |
| 2022/0326817 A1 | 10/2022 | Carrigan et al. |
| 2022/0350482 A1 | 11/2022 | Carrigan et al. |
| 2022/0357964 A1 | 11/2022 | Carrigan et al. |
| 2022/0391166 A1 | 12/2022 | Sanders |
| 2022/0391520 A1 | 12/2022 | Ma et al. |
| 2022/0392455 A1 | 12/2022 | Ma et al. |
| 2023/0041125 A1 | 2/2023 | Kim et al. |
| 2023/0073844 A1 | 3/2023 | Coffman et al. |
| 2023/0084551 A1 | 3/2023 | Coffman et al. |
| 2023/0098814 A1 | 3/2023 | Carrigan et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |

(56) References Cited

U.S. PATENT DOCUMENTS

| | | | |
|---|---|---|---|
| 2023/0168797 A1 | 6/2023 | Chaudhri et al. | |
| 2023/0179700 A1 | 6/2023 | Bhatt | |

FOREIGN PATENT DOCUMENTS

| | | | |
|---|---|---|---|
| AU | 2014100584 A4 | 7/2014 | |
| CA | 2876587 A1 | 2/2014 | |
| CN | 1263425 A | 8/2000 | |
| CN | 1274439 A | 11/2000 | |
| CN | 1341889 A | 3/2002 | |
| CN | 1452739 A | 10/2003 | |
| CN | 1525723 A | 9/2004 | |
| CN | 1620677 A | 5/2005 | |
| CN | 1663174 A | 8/2005 | |
| CN | 1741104 A | 3/2006 | |
| CN | 1797295 A | 7/2006 | |
| CN | 1813240 A | 8/2006 | |
| CN | 1846221 A | 10/2006 | |
| CN | 1863281 A | 11/2006 | |
| CN | 1908981 A | 2/2007 | |
| CN | 101002167 A | 7/2007 | |
| CN | 101022395 A | 8/2007 | |
| CN | 101047521 A | 10/2007 | |
| CN | 101107668 A | 1/2008 | |
| CN | 101188506 A | 5/2008 | |
| CN | 101243426 A | 8/2008 | |
| CN | 101268470 A | 9/2008 | |
| CN | 101299694 A | 11/2008 | |
| CN | 101321156 A | 12/2008 | |
| CN | 101340274 A | 1/2009 | |
| CN | 101341718 A | 1/2009 | |
| CN | 101341727 A | 1/2009 | |
| CN | 101350938 A | 1/2009 | |
| CN | 101359291 A | 2/2009 | |
| CN | 101409743 A | 4/2009 | |
| CN | 101485128 A | 7/2009 | |
| CN | 101488138 A | 7/2009 | |
| CN | 100530059 C | 8/2009 | |
| CN | 101501657 A | 8/2009 | |
| CN | 101517563 A | 8/2009 | |
| CN | 101610155 A | 12/2009 | |
| CN | 101625620 A | 1/2010 | |
| CN | 101673207 A | 3/2010 | |
| CN | 101673298 A | 3/2010 | |
| CN | 101854278 A | 10/2010 | |
| CN | 101861562 A | 10/2010 | |
| CN | 101873386 A | 10/2010 | |
| CN | 101877748 A | 11/2010 | |
| CN | 101882409 A | 11/2010 | |
| CN | 101931655 A | 12/2010 | |
| CN | 101976171 A | 2/2011 | |
| CN | 102065148 A | 5/2011 | |
| CN | 102077191 A | 5/2011 | |
| CN | 102164213 A | 8/2011 | |
| CN | 201928419 U | 8/2011 | |
| CN | 102202192 A | 9/2011 | |
| CN | 102209321 A | 10/2011 | |
| CN | 102262506 A | 11/2011 | |
| CN | 102281294 A | 12/2011 | |
| CN | 102301323 A | 12/2011 | |
| CN | 102396205 A | 3/2012 | |
| CN | 102508707 A | 6/2012 | |
| CN | 102523213 A | 6/2012 | |
| CN | 102695302 A | 9/2012 | |
| CN | 102707994 A | 10/2012 | |
| CN | 102737313 A | 10/2012 | |
| CN | 102740146 A | 10/2012 | |
| CN | 102750066 A | 10/2012 | |
| CN | 102750086 A | 10/2012 | |
| CN | 102754071 A | 10/2012 | |
| CN | 102859480 A | 1/2013 | |
| CN | 102866828 A | 1/2013 | |
| CN | 102902453 A | 1/2013 | |
| CN | 102905181 A | 1/2013 | |
| CN | 102982401 A | 3/2013 | |
| CN | 103067625 A | 4/2013 | |
| CN | 103069378 A | 4/2013 | |
| CN | 103139370 A | 6/2013 | |
| CN | 103250138 A | 8/2013 | |
| CN | 103260079 A | 8/2013 | |
| CN | 103425451 A | 12/2013 | |
| CN | 103458215 A | 12/2013 | |
| CN | 103558916 A | 2/2014 | |
| CN | 103576902 A | 2/2014 | |
| CN | 103582873 A | 2/2014 | |
| CN | 103593154 A | 2/2014 | |
| CN | 103765385 A | 4/2014 | |
| CN | 103793075 A | 5/2014 | |
| CN | 103793138 A | 5/2014 | |
| CN | 103853328 A | 6/2014 | |
| CN | 103870255 A | 6/2014 | |
| CN | 104106036 A | 10/2014 | |
| CN | 104166458 A | 11/2014 | |
| CN | 104205785 A | 12/2014 | |
| CN | 104335234 A | 2/2015 | |
| CN | 104503688 A | 4/2015 | |
| CN | 105374192 A | 3/2016 | |
| CN | 105388998 A | 3/2016 | |
| CN | 105474580 A | 4/2016 | |
| CN | 105549947 A | 5/2016 | |
| CN | 105794231 A | 7/2016 | |
| CN | 105900376 A | 8/2016 | |
| CN | 105940678 A | 9/2016 | |
| CN | 106030700 A | 10/2016 | |
| CN | 106062810 A | 10/2016 | |
| CN | 106383645 A | 2/2017 | |
| CN | 106797415 A | 5/2017 | |
| CN | 107533368 A | 1/2018 | |
| CN | 107637073 A | 1/2018 | |
| CN | 107819928 A | 3/2018 | |
| CN | 104012150 B * | 5/2018 | ............ G06F 21/31 |
| CN | 108292203 A | 7/2018 | |
| CN | 109117078 A | 1/2019 | |
| CN | 109196825 A | 1/2019 | |
| CN | 109287140 A | 1/2019 | |
| CN | 109302531 A | 2/2019 | |
| CN | 109347581 A | 2/2019 | |
| CN | 109348052 A | 2/2019 | |
| CN | 109688441 A | 4/2019 | |
| CN | 109688442 A | 4/2019 | |
| CN | 108683798 B | 4/2021 | |
| EP | 0459174 A2 | 12/1991 | |
| EP | 0564247 A1 | 10/1993 | |
| EP | 0684543 A1 | 11/1995 | |
| EP | 0844555 A2 | 5/1998 | |
| EP | 0871177 A2 | 10/1998 | |
| EP | 0880091 A2 | 11/1998 | |
| EP | 0881563 A2 | 12/1998 | |
| EP | 1079371 A1 | 2/2001 | |
| EP | 1133119 A2 | 9/2001 | |
| EP | 1186987 A2 | 3/2002 | |
| EP | 1215575 A2 | 6/2002 | |
| EP | 1357458 A2 | 10/2003 | |
| EP | 1469374 A1 | 10/2004 | |
| EP | 1615109 A2 | 1/2006 | |
| EP | 1705883 A1 | 9/2006 | |
| EP | 1760584 A1 | 3/2007 | |
| EP | 1855170 A2 | 11/2007 | |
| EP | 1885109 A2 | 2/2008 | |
| EP | 1942401 A1 | 7/2008 | |
| EP | 2018032 A1 | 1/2009 | |
| EP | 2120115 A2 | 11/2009 | |
| EP | 2180665 A1 | 4/2010 | |
| EP | 2194698 A1 | 6/2010 | |
| EP | 2247087 A1 | 11/2010 | |
| EP | 2290922 A1 | 3/2011 | |
| EP | 2409214 A1 | 1/2012 | |
| EP | 2420925 A2 | 2/2012 | |
| EP | 2523109 A1 | 11/2012 | |
| EP | 2568693 A2 | 3/2013 | |
| EP | 2632193 A2 | 8/2013 | |
| EP | 2674889 A2 | 12/2013 | |
| EP | 2725473 A1 | 4/2014 | |
| EP | 2733579 A2 | 5/2014 | |

(56) References Cited

FOREIGN PATENT DOCUMENTS

| | | |
|---|---|---|
| EP | 2750062 A2 | 7/2014 |
| EP | 2770673 A1 | 8/2014 |
| EP | 2770708 A1 | 8/2014 |
| EP | 2891049 A1 | 7/2015 |
| EP | 2892240 A1 | 7/2015 |
| EP | 2891049 A4 | 3/2016 |
| EP | 2998822 A2 | 3/2016 |
| EP | 3032537 A2 | 6/2016 |
| EP | 3038427 A1 | 6/2016 |
| EP | 2568693 A3 | 7/2016 |
| EP | 3057342 A1 | 8/2016 |
| EP | 3073703 A1 | 9/2016 |
| EP | 3138300 A1 | 3/2017 |
| EP | 3163495 A1 * | 5/2017 ........... H04B 17/318 |
| EP | 3276905 A1 | 1/2018 |
| EP | 3379853 A1 | 9/2018 |
| EP | 2632193 B1 | 10/2018 |
| EP | 3445058 A1 | 2/2019 |
| EP | 2568693 B1 | 12/2019 |
| EP | 3038427 B1 | 12/2019 |
| EP | 3633963 A1 | 4/2020 |
| GB | 2402105 A | 12/2004 |
| GB | 2466038 A | 6/2010 |
| GB | 2505476 A | 3/2014 |
| IN | 1038 | 6/2007 |
| JP | 5-266169 A | 10/1993 |
| JP | 8-147138 A | 6/1996 |
| JP | 8-166783 A | 6/1996 |
| JP | 9-97154 A | 4/1997 |
| JP | 9-258947 A | 10/1997 |
| JP | 10-198517 A | 7/1998 |
| JP | 10-232757 A | 9/1998 |
| JP | 11-272391 A | 10/1999 |
| JP | 2000-101879 A | 4/2000 |
| JP | 2000-105772 A | 4/2000 |
| JP | 2000-122957 A | 4/2000 |
| JP | 2000-163193 A | 6/2000 |
| JP | 2000-200092 A | 7/2000 |
| JP | 2000-231371 A | 8/2000 |
| JP | 2000-259477 A | 9/2000 |
| JP | 2000-284879 A | 10/2000 |
| JP | 2000-347921 A | 12/2000 |
| JP | 2001-202176 A | 7/2001 |
| JP | 2001-306375 A | 11/2001 |
| JP | 2001-331758 A | 11/2001 |
| JP | 2002-82745 A | 3/2002 |
| JP | 2002-288125 A | 10/2002 |
| JP | 2002-288690 A | 10/2002 |
| JP | 2002-342356 A | 11/2002 |
| JP | 2002-351768 A | 12/2002 |
| JP | 2003-30245 A | 1/2003 |
| JP | 2003-43978 A | 2/2003 |
| JP | 2003-52019 A | 2/2003 |
| JP | 2003-62975 A | 3/2003 |
| JP | 2003-264621 A | 9/2003 |
| JP | 2003-330586 A | 11/2003 |
| JP | 2003-330613 A | 11/2003 |
| JP | 2004-38895 A | 2/2004 |
| JP | 2004-104813 A | 4/2004 |
| JP | 2004-192573 A | 7/2004 |
| JP | 2004-348601 A | 12/2004 |
| JP | 2004-356816 A | 12/2004 |
| JP | 2005-44036 A | 2/2005 |
| JP | 2005-507112 A | 3/2005 |
| JP | 2005-190108 A | 7/2005 |
| JP | 2006-166248 A | 6/2006 |
| JP | 2006-295753 A | 10/2006 |
| JP | 2007-41976 A | 2/2007 |
| JP | 2007-304854 A | 11/2007 |
| JP | 2007-534009 A | 11/2007 |
| JP | 2007-334301 A | 12/2007 |
| JP | 2008-26439 A | 2/2008 |
| JP | 2008-99330 A | 4/2008 |
| JP | 2009-17486 A | 1/2009 |
| JP | 2009-93206 A | 4/2009 |
| JP | 2009-239867 A | 10/2009 |
| JP | 2009-296577 A | 12/2009 |
| JP | 2009-543166 A | 12/2009 |
| JP | 2009-543228 A | 12/2009 |
| JP | 2010-503082 A | 1/2010 |
| JP | 2010-503922 A | 2/2010 |
| JP | 2010-245940 A | 10/2010 |
| JP | 2010-257118 A | 11/2010 |
| JP | 2010-271779 A | 12/2010 |
| JP | 2011-65590 A | 3/2011 |
| JP | 2011-118662 A | 6/2011 |
| JP | 2011-209786 A | 10/2011 |
| JP | 2011-237857 A | 11/2011 |
| JP | 2012-168966 A | 9/2012 |
| JP | 2012-215938 A | 11/2012 |
| JP | 2013-506225 A | 2/2013 |
| JP | 2013-93699 A | 5/2013 |
| JP | 2013-98613 A | 5/2013 |
| JP | 2013-105468 A | 5/2013 |
| JP | 2013-530433 A | 7/2013 |
| JP | 2013-530458 A | 7/2013 |
| JP | 2013-175188 A | 9/2013 |
| JP | 2014-502454 A | 1/2014 |
| JP | 2014-503861 A | 2/2014 |
| JP | 2014-071835 A | 4/2014 |
| JP | 2014-087126 A | 5/2014 |
| JP | 2014-512044 A | 5/2014 |
| JP | 2014-110638 A | 6/2014 |
| JP | 2014-131359 A | 7/2014 |
| JP | 2014-170982 A | 9/2014 |
| JP | 2015-8001 A | 1/2015 |
| JP | 2015-14923 A | 1/2015 |
| JP | 2015-501022 A | 1/2015 |
| JP | 2015-61318 A | 3/2015 |
| JP | 2015-520456 A | 7/2015 |
| JP | 2015-524974 A | 8/2015 |
| JP | 2015-526776 A | 9/2015 |
| JP | 6023162 B2 | 11/2016 |
| JP | 2017-41008 A | 2/2017 |
| JP | 2018-007158 A | 1/2018 |
| KR | 10-2003-0030384 A | 4/2003 |
| KR | 10-2005-0072071 A | 7/2005 |
| KR | 10-2007-0101893 A | 10/2007 |
| KR | 10-2007-0120125 A | 12/2007 |
| KR | 10-0805341 B1 | 2/2008 |
| KR | 10-2009-0089472 A | 8/2009 |
| KR | 10-2010-0036351 A | 4/2010 |
| KR | 10-2012-0003323 A | 1/2012 |
| KR | 10-2012-0088746 A | 8/2012 |
| KR | 10-2012-0100433 A | 9/2012 |
| KR | 10-1253392 B1 | 4/2013 |
| KR | 10-2013-0063019 A | 6/2013 |
| KR | 10-2013-0075783 A | 7/2013 |
| KR | 10-2013-0082190 A | 7/2013 |
| KR | 10-2013-0108563 A | 10/2013 |
| KR | 10-2013-0141688 A | 12/2013 |
| KR | 10-1342208 B1 | 12/2013 |
| KR | 10-2014-0016244 A | 2/2014 |
| KR | 10-2014-0031283 A | 3/2014 |
| KR | 10-2014-0137400 A | 12/2014 |
| KR | 10-2014-0148289 A | 12/2014 |
| KR | 20150031010 A * | 3/2015 |
| KR | 10-2015-0121177 A | 10/2015 |
| KR | 20160012008 A * | 2/2016 |
| KR | 10-2016-0045633 A | 4/2016 |
| KR | 10-2016-0092363 A | 8/2016 |
| KR | 10-2016-0141847 A | 12/2016 |
| KR | 10-2017-0008601 A | 1/2017 |
| KR | 10-2017-0027435 A | 3/2017 |
| KR | 10-2017-0027999 A | 3/2017 |
| KR | 10-2017-0082022 A | 7/2017 |
| KR | 10-2017-0100358 A | 9/2017 |
| KR | 10-2017-0124954 A | 11/2017 |
| KR | 10-1820573 B1 | 1/2018 |
| KR | 10-2018-0034637 A | 4/2018 |
| KR | 10-2018-0085931 A | 7/2018 |
| KR | 10-2019-0002658 A | 1/2019 |
| KR | 10-2019-0014495 A | 2/2019 |
| KR | 10-2019-0022883 A | 3/2019 |

(56) References Cited

FOREIGN PATENT DOCUMENTS

| | | |
|---|---|---|
| KR | 10-2019-0057414 A | 5/2019 |
| KR | 102011177 B1 * | 8/2019 |
| KR | 10-2020-0039030 A | 4/2020 |
| KR | 10-2022-0004223 A | 1/2022 |
| MX | 336834 B | 2/2016 |
| TW | 546942 B | 8/2003 |
| TW | 200915698 A | 4/2009 |
| TW | 201131471 A | 9/2011 |
| TW | I348803 B | 9/2011 |
| TW | 201137722 A | 11/2011 |
| TW | 201316247 A | 4/2013 |
| TW | 201324310 A | 6/2013 |
| TW | 201403363 A | 1/2014 |
| TW | 201409345 A | 3/2014 |
| TW | 201415345 A | 4/2014 |
| TW | 201416959 A | 5/2014 |
| WO | 99/44114 A1 | 9/1999 |
| WO | 02/01864 A1 | 1/2002 |
| WO | 2003/036457 A2 | 5/2003 |
| WO | 2003/054832 A1 | 7/2003 |
| WO | 2003/062975 A1 | 7/2003 |
| WO | 2003/062976 A1 | 7/2003 |
| WO | 2004/095414 A1 | 11/2004 |
| WO | 2004/104813 A1 | 12/2004 |
| WO | 2005/031608 A2 | 4/2005 |
| WO | 2005/053225 A1 | 6/2005 |
| WO | 2005/109829 A1 | 11/2005 |
| WO | 2006/011139 A2 | 2/2006 |
| WO | 2006/020304 A2 | 2/2006 |
| WO | 2006/020305 A2 | 2/2006 |
| WO | 2006/113834 A2 | 10/2006 |
| WO | 2006/130234 A2 | 12/2006 |
| WO | 2007/073422 A1 | 6/2007 |
| WO | 2007/102110 A2 | 9/2007 |
| WO | 2007/142703 A1 | 12/2007 |
| WO | 2007/149731 A1 | 12/2007 |
| WO | 2008/027924 A2 | 3/2008 |
| WO | 2008/030976 A2 | 3/2008 |
| WO | 2008/033853 A2 | 3/2008 |
| WO | 2008/085742 A2 | 7/2008 |
| WO | 2008/151229 A1 | 12/2008 |
| WO | 2009/005563 A1 | 1/2009 |
| WO | 2009/067670 A1 | 5/2009 |
| WO | 2009/086599 A1 | 7/2009 |
| WO | 2009/097592 A1 | 8/2009 |
| WO | 2009/146857 A2 | 12/2009 |
| WO | 2010/087988 A1 | 8/2010 |
| WO | 2010/107661 A1 | 9/2010 |
| WO | 2010/120972 A1 | 10/2010 |
| WO | 2010/128442 A2 | 11/2010 |
| WO | 2011/027964 A1 | 3/2011 |
| WO | 2011/041427 A2 | 4/2011 |
| WO | 2011/084857 A1 | 7/2011 |
| WO | 2011/126502 A1 | 10/2011 |
| WO | 2011/149231 A2 | 12/2011 |
| WO | 2012/004288 A1 | 1/2012 |
| WO | 2012/006494 A1 | 1/2012 |
| WO | 2012/028773 A1 | 3/2012 |
| WO | 2012/050927 A2 | 4/2012 |
| WO | 2012/051052 A1 | 4/2012 |
| WO | 2012/104288 A1 | 8/2012 |
| WO | 2012/126078 A1 | 9/2012 |
| WO | 2012/154748 A1 | 11/2012 |
| WO | 2012/166352 A1 | 12/2012 |
| WO | 2012/170446 A2 | 12/2012 |
| WO | 2013/000150 A1 | 1/2013 |
| WO | 2013/026023 A1 | 2/2013 |
| WO | 2013/048880 A1 | 4/2013 |
| WO | 2013/049346 A1 | 4/2013 |
| WO | 2013/097882 A1 | 7/2013 |
| WO | 2013/097895 A1 | 7/2013 |
| WO | 2013/097896 A1 | 7/2013 |
| WO | 2013/111239 A1 | 8/2013 |
| WO | 2013/132144 A1 | 9/2013 |
| WO | 2013/135270 A1 | 9/2013 |
| WO | 2013/136548 A1 | 9/2013 |
| WO | 2013/137503 A1 | 9/2013 |
| WO | 2013/153405 A2 | 10/2013 |
| WO | 2013/169842 A2 | 11/2013 |
| WO | 2013/169846 A1 | 11/2013 |
| WO | 2013/169875 A2 | 11/2013 |
| WO | 2013/173504 A1 | 11/2013 |
| WO | 2013/173838 A2 | 11/2013 |
| WO | 2013/176847 A1 | 11/2013 |
| WO | 2014/021967 A1 | 2/2014 |
| WO | 2014/030320 A1 | 2/2014 |
| WO | 2014/032461 A1 | 3/2014 |
| WO | 2014/078965 A1 | 5/2014 |
| WO | 2014/105274 A1 | 7/2014 |
| WO | 2014/105276 A1 | 7/2014 |
| WO | 2014/107469 A2 | 7/2014 |
| WO | 2014/115605 A1 | 7/2014 |
| WO | 2014/128800 A1 | 8/2014 |
| WO | 2014/143776 A2 | 9/2014 |
| WO | 2014/147297 A1 | 9/2014 |
| WO | 2014/151089 A1 | 9/2014 |
| WO | 2013/173504 A8 | 12/2014 |
| WO | 2014/197279 A1 | 12/2014 |
| WO | 2015/008409 A1 | 1/2015 |
| WO | 2015/062410 A1 | 5/2015 |
| WO | 2015/076930 A1 | 5/2015 |
| WO | 2015/124831 A1 | 8/2015 |
| WO | 2015/134692 A1 | 9/2015 |
| WO | 2015/185123 A1 | 12/2015 |
| WO | 2016/033400 A1 | 3/2016 |
| WO | 2016/036472 A1 | 3/2016 |
| WO | 2016/036541 A2 | 3/2016 |
| WO | 2016/057117 A1 | 4/2016 |
| WO | 2016/200603 A1 | 12/2016 |
| WO | 2016/204186 A1 | 12/2016 |
| WO | 2017/027526 A1 | 2/2017 |
| WO | 2017/058293 A1 | 4/2017 |
| WO | 2017/058442 A1 | 4/2017 |
| WO | 2017/112003 A1 | 6/2017 |
| WO | 2017/147081 A1 | 8/2017 |
| WO | 2017/218143 A1 | 12/2017 |
| WO | 2017/218192 A1 | 12/2017 |
| WO | 2018/025030 A2 | 2/2018 |
| WO | 2018/048510 A1 | 3/2018 |
| WO | 2018/067531 A1 | 4/2018 |
| WO | 2018/084802 A1 | 5/2018 |
| WO | 2018/085671 A1 | 5/2018 |
| WO | 2018/089700 A1 | 5/2018 |
| WO | 2018/098136 A1 | 5/2018 |
| WO | 2018/144339 A2 | 8/2018 |
| WO | 2018/198136 A1 | 11/2018 |
| WO | 2018/213401 A1 | 11/2018 |
| WO | 2018/213415 A1 | 11/2018 |
| WO | 2018/232333 A1 | 12/2018 |
| WO | 2020/063762 A1 | 4/2020 |
| WO | 2020/076365 A1 | 4/2020 |
| WO | 2020/242577 A1 | 12/2020 |
| WO | 2020/243691 A1 | 12/2020 |
| WO | 2021/010993 A1 | 1/2021 |

OTHER PUBLICATIONS

"Samsung—User manual—Galaxy Watch", published to web on Aug. 24, 2018 at https://content.abt.com/documents/90234/SM-R810NZDAXAR-use.pdf, retrieved Nov. 23, 2020 (Year: 2018).*

Akshay, "Control your SmartThings compatible devices on the Gear S2 and S3 with the Smarter Things app", published to web on Sep. 7, 2017 at https://iotgadgets.com/2017/09/control-smartthings-compatible-devices-gear-s2-s3-smarter-things-app/, retrieved Nov. 23, 2020 (Year: 2017).*

Mallory Locklear, "Samsung to bring SmartThings control to its Gear snnartwatches", published to web on Jan. 8, 2018 at https://engadget.com/2018-01-08-samsung-smartthings-app-gear-smartwatches.html, retrieved Nov. 23, 2020 (Year: 2018).*

"Control an individual smart device on your watch", published to web on Nov. 9, 2018 at https://www.samsung.com/us/support/troubleshooting/TSG01003208, retrieved Nov. 23, 2020 (Year: 2018).*

(56) References Cited

OTHER PUBLICATIONS

Cherlynn Low, "So you bought a smartwatch. Now what?", published to web on Feb. 6, 2018 at https://www.engadget.conn/2018-02-06-how-to-set-up-your-smartwatch.html, retrieved Nov. 23, 2020 (Year: 2018).*
"Smart Home App—What is the Widget", published on Jan. 26, 2019 to https://support.vivint.com/s/article/Vivint-Smart-Home-App-What-is-the-Widget, retrieved Apr. 27, 2021 (Year: 2019).*
Dan Gookin, "Lock Screen Settings on Your Android Phone", published on Sep. 23, 2015 to https://www.dummies.com/consumer-electronics/smartphones/droid/lock-screen-settings-on-your-android-phone/, retrieved Apr. 27, 2021 (Year: 2015).*
"Customize Notifications and Content on Your Galaxy Phone's Lock Screen", published on Oct. 4, 2017 to https://www.samsung.com/US/support/answer/ANS00062636, retrieved Apr. 27, 2021 (Year: 2017).*
Forrest Stroud, "Screen Lock Meaning & Definition" published on Jan. 30, 2014 to https://www.webopedia.com/definitions/screen-lock, retrieved Apr. 29, 2021 (Year: 2014).*
Allyson Kazmucha, "Sonos Controller App for iPhone and iPad Review", published on Mar. 1, 2018 to https://www.imore.com/sonos-controller-app-iphone-and-ipad-review, retrieved Nov. 28, 2022. (Year: 2018).*
Emily Cohn, "Sonos Just Fixed the Most Annoying Thing About Its iPhone App", published on Jun. 27, 16 to https:// www.businessinsider.com/sonos-mobile-app-works-on-lock-screen-2016-6, retrieved Nov. 28, 22. (Year: 2016).*
Jon Fingas, "Sonos Puts Speaker Controls On Your iPhone's Lock Screen", published on Jun. 21, 2016 to https://www.engadget.com/2016-06-21-sonos-ios-lock-screen-controls.html, retrieved Nov. 28, 22. (Year: 2016).*
Advisory Action received for U.S. Appl. No. 10/308,315, dated Jul. 10, 2006, 3 pages.
Advisory Action received for U.S. Appl. No. 12/395,537, dated Apr. 26, 2012, 4 pages.
Advisory Action received for U.S. Appl. No. 12/566,673, dated Jun. 12, 2013, 3 pages.
Advisory Action received for U.S. Appl. No. 13/038,217, dated Dec. 8, 2014, 3 pages.
Advisory Action received for U.S. Appl. No. 13/587,850, dated May 15, 2015, 2 pages.
Advisory Action received for U.S. Appl. No. 15/730,610, dated Oct. 24, 2019, 5 pages.
Appeal Brief received for U.S. Appl. No. 11/522,167 mailed on Nov. 23, 2010, 65 pages.
Apple, "Iphone User's Guide", iPhone first generation, Available at: http://pocketpccentral.net/iphone/products/1 g_iphone.htm, Jun. 29, 2007, 124 pages.
Applicant Initiated Interview Summary received for U.S. Appl. No. 16/583,989, dated Mar. 25, 2020, 4 pages.
Applicant Initiated Interview Summary received for U.S. Appl. No. 16/702,968, dated Jul. 1, 2020, 5 pages.
Applicant-Initiated Interview Summary received for U.S. Appl. No. 16/584,490, dated Jan. 31, 2020, 4 pages.
Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Bennett Stephen, "E52: Logic's Most Sophisticated Virtual Analogue Synth", Logic Notes & Techniques, Jun. 2007, 6 pages.
Bove Tony, "iPod & iTunes for Dummies", Wiley Publishing, Inc, 6th Edition, 2008, pp. 143-182.
Butler Travis, "Portable MP3: The Nomad Jukebox", available at: http://tidbits.com/article/6261, Jan. 8, 2001, 4 pages.
Call Me, "Samsung R3 højttaler giver dig en lækker 360 graders lydoplevelse—med WiFi og Bluetooth | Call me", 0:24 / 3:22, Available Online at: https://www.youtube.com/watch?v=4Uv_sOhrlro, Sep. 22, 2016, 3 pages.

Ciprianij., "How to use Spotify's Offline mode on iPhone", XP055533907, retrieved from the Internet: URL: https://www.cnet.com/how-to/how-to-use-spotifys-offline-mode-on-iphone/, Aug. 1, 2011, 5 pages.
Corrected Notice of Allowance received for U.S. Appl. No. 13/587,850, dated Apr. 1, 2020, 2 pages.
Corrected Notice of Allowance received for U.S. Appl. No. 13/587,850, dated Mar. 23, 2020, 2 pages.
Corrected Notice of Allowance received for U.S. Appl. No. 14/830,629, dated Feb. 13, 2019, 3 pages.
David Chanceg., "Unpublished U.S. Appl. No. 16/583,989, filed Sep. 26, 2019, titled User Interfaces for Audio Media Control".
Decision on Appeal received for U.S. Appl. No. 12/566,673, mailed on Dec. 18, 2019, 10 pages.
Decision on Appeal received for U.S. Appl. No. 13/587,850, mailed on Aug. 28, 2019, 21 pages.
Decision on Appeal received for U.S. Appl. No. 13/587,850, mailed on Oct. 21, 2019, 3 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.
Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for Danish Patent Application No. PA201770406, dated May 15, 2020, 2 pages.
Decision to Grant received for European Patent Application No. 10712824.1, dated May 17, 2018, 3 pages.
Decision to Grant received for European Patent Application No. 12181537.7, dated Mar. 3, 2016, 2 pages.
Decision to Grant received for Japanese Patent Application No. 2014-017726, dated Dec. 7, 2015, 6 pages.
Decision to Refuse received for European Patent Application No. 07842262.3, dated Dec. 21, 2018, 8 pages.
Decision to Refuse received for European Patent Application No. 10177096.4, dated Feb. 13, 2019, 4 pages.
Decision to Refuse received for European Patent Application No. 12753631.6, dated Feb. 20, 2019, 20 pages.
Detroitborg, "Apple Music: Walkthrough", YouTube Video, online available at: "https://www.youtube.com/watch?v=NLgjodiAtbQ", Jun. 30, 2015, 1 page.
Digital Video Editor, IBM Technical Disclosure Bulletin, vol. 35, No. 2, ip.com Journal, ip.com Inc, West Henrietta XP013097273, Jul. 1, 1992, 6 pages.
Enright Andrewc., "Dissatisfaction Sows Innovation", Available at: http://web.archive.org/web/20051225123312/http://thetreehouseandthecave.blogspot.com/2004/12/dissatisfaction-sows-innovation.html, Dec. 29, 2004, 6 pages.
Enright Andrewc., "Meet Cover Flow", Available online at: http://web.archive.org/web/20060111073239/thetreehouseandthecave.blogspot.com/2005/08/meet-coverflow.html, Aug. 13, 2005, 2 pages.
Enright Andrewc., "Visual Browsing on an iBook DS", Available online at: http://web.archive.org/web/20060111175609/thetreehouseandthecave.blogspot.com/2004/12/visual-browsing-on-i book-ds.html, Dec. 29, 2004, 2 pages.
Examiner's Answer to Appeal Brief received for U.S. Appl. No. 11/522,167 mailed on Feb. 15, 2011, 13 pages.
Examiner's Answer to Appeal Brief received for U.S. Appl. No. 12/566,673, mailed on Nov. 17, 2017, 10 pages.
Extended European Search Report (includes Partial European Search Report and European Search Opinion) received for European Patent Application No. 12181537.7, dated Mar. 27, 2014, 7 pages.
Extended European Search Report (includes Partial European Search Report and European Search Opinion) received for European Patent Application No. 13184872.3, dated Dec. 5, 2013, 9 pages.
Extended European Search Report for European Application No. 10177099.8, dated Oct. 18, 2010, 7 pages.
Extended European Search Report received for European Patent Application No. 10177096.4, dated Oct. 18, 2010, 9 pages.
Extended European Search Report received for European Patent Application No. 18197583.0, dated Jun. 4, 2019, 20 pages.

(56) References Cited

OTHER PUBLICATIONS

Extended European Search Report received for European Patent Application No. 18197589.7, dated Jan. 7, 2019, 9 pages.
Extended European Search Report received for European Patent Application No. 19169980.0, dated Jul. 2, 2019, 8 pages.
Extended European Search Report received for European Patent Application No. 19207753.5, dated Dec. 18, 2019, 9 pages.
Final Office Action received for U.S. Appl. No. 09/293,507, dated Apr. 24, 2002, 12 pages.
Final Office Action received for U.S. Appl. No. 09/293,507, dated Feb. 14, 2001, 10 pages.
Final Office Action received for U.S. Appl. No. 10/308,315, dated Apr. 6, 2005, 10 pages.
Final Office Action received for U.S. Appl. No. 10/308,315, dated Mar. 9, 2006, 10 pages.
Final Office Action received for U.S. Appl. No. 10/308,315, dated Mar. 23, 2007, 12 pages.
Final Office Action received for U.S. Appl. No. 11/459,591, dated Jan. 13, 2009, 11 pages.
Final Office Action received for U.S. Appl. No. 11/522,167, dated Aug. 5, 2009, 9 pages.
Final Office Action received for U.S. Appl. No. 11/522,167, dated Jul. 23, 2010, 11 pages.
Final Office Action received for U.S. Appl. No. 11/522,167, dated Jun. 3, 2013, 18 pages.
Final Office Action received for U.S. Appl. No. 11/522,167, dated Oct. 15, 2008, 10 pages.
Final Office Action received for U.S. Appl. No. 11/767,409, dated Jul. 17, 2012, 24 pages.
Final Office Action received for U.S. Appl. No. 11/767,409, dated Mar. 16, 2011, 16 pages.
Final Office Action received for U.S. Appl. No. 11/960,674, dated May 12, 2011, 10 pages.
Final Office Action received for U.S. Appl. No. 11/983,059, dated Jun. 6, 2011, 11 pages.
Final Office Action received for U.S. Appl. No. 12/215,651, dated Jul. 6, 2012, 27 pages.
Final Office Action received for U.S. Appl. No. 12/395,537, dated Feb. 3, 2012, 15 pages.
Final Office Action received for U.S. Appl. No. 12/395,537, dated Jun. 29, 2015, 17 pages.
Final Office Action received for U.S. Appl. No. 12/395,537, dated Nov. 14, 2013, 22 pages.
Final Office Action received for U.S. Appl. No. 12/395,541, dated Dec. 28, 2011, 16 pages.
Final Office Action received for U.S. Appl. No. 12/566,669, dated Nov. 23, 2012, 29 pages.
Final Office Action received for U.S. Appl. No. 12/566,671, dated Dec. 20, 2012, 20 pages.
Final Office Action received for U.S. Appl. No. 12/566,673, dated Aug. 12, 2016, 28 pages.
Final Office Action received for U.S. Appl. No. 12/566,673, dated Jan. 17, 2013, 22 pages.
Final Office Action received for U.S. Appl. No. 12/566,673, dated Mar. 25, 2014, 19 pages.
Final Office Action received for U.S. Appl. No. 13/038,217, dated May 6, 2014, 11 pages.
Final Office Action received for U.S. Appl. No. 13/333,890, dated Feb. 13, 2014, 19 pages.
Final Office Action received for U.S. Appl. No. 13/333,890, dated Oct. 2, 2015, 21 pages.
Final Office Action received for U.S. Appl. No. 13/333,900, dated Dec. 19, 2014, 15 pages.
Final Office Action received for U.S. Appl. No. 13/333,900, dated Nov. 7, 2013, 14 pages.
Final Office Action received for U.S. Appl. No. 13/489,245, dated Mar. 28, 2014, 23 pages.
Final Office Action received for U.S. Appl. No. 13/489,245, dated Oct. 16, 2019, 25 pages.
Final Office Action received for U.S. Appl. No. 13/489,245, dated Sep. 27, 2018, 25 pages.
Final Office Action received for U.S. Appl. No. 13/587,850, dated May 3, 2016, 31 pages.
Final Office Action received for U.S. Appl. No. 13/587,850, dated Nov. 28, 2014, 22 pages.
Final Office Action received for U.S. Appl. No. 14/045,544, dated May 6, 2016, 26 pages.
Final Office Action received for U.S. Appl. No. 14/830,629, dated Apr. 16, 2018, 27 pages.
Final Office Action received for U.S. Appl. No. 15/730,610, dated Aug. 6, 2019, 28 pages.
Final Office Action received for U.S. Appl. No. 15/910,263, dated Aug. 28, 2019, 32 pages.
Final Office Action received for U.S. Appl. No. 16/584,490, dated May 1, 2020, 48 pages.
Final Office Action received in U.S. Appl. No. 12/547,401, dated Feb. 11, 2013, 13 pages.
Final Office Action received in U.S. Appl. No. 12/547,401, dated Jun. 28, 2010, 19 pages.
Finkelstein Ellen, "Temporarily Override Object Snap Settings", AutoCAD Tips Blog, Apr. 9, 2007, 4 pages.
Free Virtual Classic Analogue Mono Synth, Samsara Cycle Audio Releases DEISK-O, Jan. 2, 2011, 3 pages.
Google, "Google Home Help, Listen to music", Datasheet [online], Available Online at: https://web.archive.org/web/20170326051235/ https:/support.google.com/googlehome/answer/7030379?hl=en &reftopic=7030084, Mar. 26, 2017, 3 pages.
Graham et al, "Unpublished U.S. Appl. No. 16/584,490, filed Sep. 26, 2019, titled user interfaces for audio media control".
Hoffberger Chase, "Spotify's Collaborative Playlists Let Friends Listen Together", Evolver.fm, Available online at http://www.evolver. fm/2011/08/22/spotify-collaborative-playlists/, Aug. 22, 2011, 4 pages.
How-To: iTunes in the Cloud, Online Available at: http://y2kemo. com/2011/06/how-to-itunes-in-the-cloud/, XP55040711, Jun. 9, 2011, 4 pages.
Hughes Neil, "Apple Explores Merging Cloud Content with Locally Stored Media Library", Available at: http://appleinsider.com/articles/ 11/02/10/apple_explores_merging_cloud_content_with_locally_ stored_media_library.html, XP55040717, Feb. 10, 2011, 2 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018, 2 pages.
Intention to Grant received for Danish Patent Application No. PA201770401, dated Sep. 17, 2018, 2 pages.
Intention to Grant received for Danish Patent Application No. PA201770403, dated May 7, 2018, 2 pages.
Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770406, dated Feb. 6, 2020, 3 pages.
Intention to Grant received for Danish Patent Application No. PA201770408, dated Nov. 30, 2018, 3 pages.
Intention to Grant received for European Patent Application No. 10712824.1, dated Jan. 5, 2018, 9 pages.
Intention to Grant Received for European Patent Application No. 12181537.7, dated Sep. 22, 2015, 7 pages.
Intention to Grant received for European Patent Application No. 13184872.3, dated Feb. 11, 2019, 7 pages.
International Preliminary Report on Patentability received for PCT Patent Application No. PCT/US00/010441, dated Feb. 14, 2001, 3 pages.
International Preliminary Report on Patentability received for PCT Patent Application No. PCT/US2006/062714, dated Jul. 8, 2008, 6 pages.
International Preliminary Report on Patentability received for PCT Patent Application No. PCT/US2007/078180, dated Mar. 17, 2009, 6 pages.

(56) References Cited

OTHER PUBLICATIONS

International Preliminary Report on Patentability received for PCT Patent Application No. PCT/US2007/088914, dated Jul. 7, 2009, 8 pages.
International Preliminary Report on Patentability received for PCT Patent Application No. PCT/US2010/027088, dated Sep. 29, 2011, 7 pages.
International Preliminary Report on Patentability received for PCT Patent Application No. PCT/US2012/025314, dated Sep. 12, 2013, 8 pages.
International Preliminary Report on Patentability received for PCT Patent Application No. PCT/US2012/051432, dated Feb. 27, 2014, 10 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2018/032158, dated Nov. 21, 2019, 12 pages.
International Preliminary Report on Patentability received for PCT Patent Application No. PCT/US2018/032904, dated Nov. 28, 2019, 14 pages.
International Search Report and Written Opinion received for PCT Patent Application No. PCT/US00/10441, dated Jul. 11, 2000, 2 pages.
International Search Report and Written Opinion received for PCT Patent Application No. PCT/US2007/078180, dated Mar. 3, 2008, 8 pages.
International Search Report and Written Opinion received for PCT Patent Application No. PCT/US2007/088914, dated Jun. 23, 2008, 10 pages.
International Search Report and Written Opinion received for PCT Patent Application No. PCT/US2010/027088, dated Jun. 18, 2010, 8 pages.
International Search Report and Written Opinion received for PCT Patent Application No. PCT/US2012/025314, dated May 14, 2012, 10 pages.
International Search Report and Written Opinion received for PCT Patent Application No. PCT/US2012/051432, dated Oct. 29, 2012, 12 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2018/032158, dated Nov. 2, 2018, 19 pages.
International Search Report and Written Opinion received for PCT Patent Application No. PCT/US2018/032904, dated Oct. 1, 2018, 21 pages.
Invitation to Pay Addition Fees and Partial International Search Report received for PCT Patent Application No. PCT/US2018/032904, dated Jul. 31, 2018, 18 pages.
Invitation to Pay Additional Fees received for PCT Patent Application No. PCT/US2018/032158, dated Sep. 10, 2018, 16 pages.
Itjungles, "iPhone 6: How to Pair with Another Bluetooth Device", Available Online at: https://www.youtube.com/watch?v=9setanYtHAk, Aug. 5, 2015, 3 pages.
Jarvie, "Alexa plays me music", Available online at: https://www.youtube.com/watch?v=bR2ZC8Sy8YQ, Feb. 23, 2015, 1 page.
Kanter David, "Start Download Automatically Sync Your (New) Music, Apps, and iBooks Across Your iDevices With iCloud", Available online at: https://appadvice.com/appnn/2011/06/automatically-sync-music-apps-ibooks-idevices-icloud, Jun. 8, 2011, 6 pages.
Kim et al, "An Energy Efficient Transmission Scheme for Real-Time Data in Wireless Sensor Networks", Sensors, vol. 15, in Sensors 2015, May 20, 2015, 25 pages.
Mac Fan, "Chapter 4: The True Character of Apple's Genuine Cloud—Your Personal Data Always Exist in There, Regardless of Your Location", Mainichi Communications Inc, vol. 19, No. 8, Aug. 1, 2011, 8 pages.

McElhearn Kirk, "iTunes 10.3 Offers Automatic Downloads and Access to Purchases", Available at: http://web.archive.org/web/20110613084837/http://www.tidbits.com/article/12235>, Jun. 8, 2011, 5 pages.
Minutes of the Oral Proceedings received for European Patent Application No. 00923491.5, mailed on May 11, 2011, 65 pages.
Minutes of the Oral Proceedings received for European Patent Application No. 12753631.6, mailed on Feb. 20, 2019, 3 pages.
Miser Brad, "Sams Teach Yourself iTunes® 10 in 10 Minutes", SAMS Publishing, Dec. 30, 2010, pp. 65 and 67-69.
Non-Final Office Action received for U.S. Appl. No. 12/395,537, dated Dec. 14, 2015, 18 pages.
Non-Final Office Action received for U.S. Appl. No. 09/293,507, dated Aug. 1, 2001, 13 pages.
Non-Final Office Action received for U.S. Appl. No. 09/293,507, dated Jun. 22, 2000, 11 pages.
Non-Final Office Action received for U.S. Appl. No. 09/293,508, dated Jun. 30, 2000, 10 pages.
Non-Final Office Action received for U.S. Appl. No. 10/308,315, dated Aug. 8, 2005, 12 pages.
Non-Final Office Action received for U.S. Appl. No. 10/374,013, dated Feb. 1, 2007, 8 pages.
Non-Final Office Action received for U.S. Appl. No. 11/459,591, dated Jul. 29, 2008, 15 pages.
Non-Final Office Action received for U.S. Appl. No. 11/521,740, dated Dec. 27, 2007, 8 pages.
Non-Final Office Action received for U.S. Appl. No. 11/522,167, dated Dec. 6, 2012, 15 pages.
Non-Final Office Action received for U.S. Appl. No. 11/522,167, dated Feb. 5, 2009, 9 pages.
Non-Final Office Action received for U.S. Appl. No. 11/522,167, dated Jan. 20, 2010, 10 pages.
Non-Final Office Action received for U.S. Appl. No. 11/522,167, dated May 2, 2007, 8 pages.
Non-Final Office Action received for U.S. Appl. No. 11/522,167, dated Oct. 19, 2007, 10 pages.
Non-Final Office Action received for U.S. Appl. No. 11/767,409, dated Aug. 29, 2011, 18 pages.
Non-Final Office Action received for U.S. Appl. No. 11/767,409, dated Feb. 9, 2012, 20 pages.
Non-Final Office Action received for U.S. Appl. No. 11/767,409, dated Nov. 23, 2010, 12 pages.
Non-Final Office Action received for U.S. Appl. No. 11/960,674, dated Oct. 27, 2010, 7 pages.
Non-Final Office Action received for U.S. Appl. No. 11/983,059, dated Dec. 30, 2010, 11 pages.
Non-Final Office Action received for U.S. Appl. No. 12/215,651, dated Aug. 15, 2013, 27 pages.
Non-Final Office Action received for U.S. Appl. No. 12/215,651, dated Feb. 2, 2012, 18 pages.
Non-Final Office Action received for U.S. Appl. No. 12/395,537, dated Aug. 15, 2011, 17 pages.
Non-Final Office Action received for U.S. Appl. No. 12/395,537, dated Jan. 5, 2015, 20 pages.
Non-Final Office Action received for U.S. Appl. No. 12/395,537, dated Jul. 8, 2013, 22 pages.
Non-Final Office Action received for U.S. Appl. No. 12/395,541, dated Jul. 26, 2011, 15 pages.
Non-Final Office Action received for U.S. Appl. No. 12/395,541, dated Mar. 14, 2013, 23 pages.
Non-Final Office Action received for U.S. Appl. No. 12/566,669, dated Apr. 17, 2014, 27 pages.
Non-Final Office Action received for U.S. Appl. No. 12/566,669, dated Jun. 19, 2012, 30 pages.
Non-Final Office Action received for U.S. Appl. No. 12/566,671, dated May 23, 2012, 21 pages.
Non-Final Office Action received for U.S. Appl. No. 12/566,672, dated Nov. 8, 2012, 11 pages.
Non-Final Office Action received for U.S. Appl. No. 12/566,673, dated Jun. 7, 2012, 17 pages.
Non-Final Office Action received for U.S. Appl. No. 12/566,673, dated Mar. 26, 2015, 19 pages.

(56) References Cited

OTHER PUBLICATIONS

Non-Final Office Action received for U.S. Appl. No. 12/566,673, dated Sep. 13, 2013, 18 pages.
Non-Final Office Action received for U.S. Appl. No. 13/038,217, dated Sep. 13, 2013, 16 pages.
Non-Final Office Action received for U.S. Appl. No. 13/333,890, dated Aug. 30, 2013, 20 pages.
Non-Final Office Action received for U.S. Appl. No. 13/333,890, dated Jun. 5, 2015, 20 pages.
Non-Final Office Action received for U.S. Appl. No. 13/333,890, dated May 1, 2013, 26 pages.
Non-Final Office Action received for U.S. Appl. No. 13/333,900, dated Mar. 19, 2013, 17 pages.
Non-Final Office Action received for U.S. Appl. No. 13/333,900, dated May 23, 2014, 19 pages.
Non-Final Office Action received for U.S. Appl. No. 13/489,245, dated Apr. 8, 2019, 27 pages.
Non-Final Office Action received for U.S. Appl. No. 13/489,245, dated Dec. 27, 2017, 22 pages.
Non-Final Office Action received for U.S. Appl. No. 13/489,245, dated Nov. 20, 2013, 25 pages.
Non-Final Office Action received for U.S. Appl. No. 13/587,850, dated Apr. 7, 2014, 18 pages.
Non-Final Office Action received for U.S. Appl. No. 13/587,850, dated Oct. 8, 2015, 29 pages.
Non-Final Office Action received for U.S. Appl. No. 14/045,544, dated Oct. 6, 2015, 20 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 15/274,963, dated Mar. 13, 2018, 23 pages.
Non-Final Office Action received for U.S. Appl. No. 15/730,610, dated Apr. 15, 2020, 36 pages.
Non-Final Office Action received for U.S. Appl. No. 15/730,610, dated Feb. 1, 2019, 22 pages.
Non-Final Office Action received for U.S. Appl. No. 15/910,263, dated Jun. 15, 2020, 38 pages.
Non-Final Office Action received for U.S. Appl. No. 15/910,263, dated Mar. 4, 2019, 26 pages.
Non-Final Office Action received for U.S. Appl. No. 16/583,989, dated Jan. 24, 2020, 20 pages.
Non-Final Office Action received for U.S. Appl. No. 16/584,490, dated Dec. 10, 2019, 27 pages.
Non-Final Office Action received for U.S. Appl. No. 16/702,968, dated Apr. 8, 2020, 20 pages.
Non-Final Office Action received for U.S. Appl. No. 16/807,604, dated Jun. 2, 2020, 28 pages.
Non-Final Office Action received for U.S. Appl. No. 10/308,315, dated Jul. 28, 2004, 10 pages.
Non-Final Office Action received for U.S. Appl. No. 12/566,673, dated Dec. 16, 2015, 23 pages.
Non-Final Office Action received in U.S. Appl. No. 12/547,401, dated Jan. 8, 2010, 12 pages.
Notice of Acceptance received for Australian Patent Application No. 2016201454, dated Mar. 1, 2018, 3 pages.
Notice of Acceptance received for Australian Patent Application No. 2018223051, dated Oct. 30, 2018, 3 pages.
Notice of Acceptance received for Australian Patent Application No. 2018236872, dated Jul. 9, 2019, 3 pages.
Notice of Allowance and Search Report received for Taiwanese Patent Application No. 104128687, dated Jun. 7, 2016, 4 pages.
Notice of Allowance Received for Canadian Patent Application No. 2,661,200, dated Aug. 20, 2014, 1 page.
Notice of Allowance received for Canadian Patent Application No. 2,882,403, dated Oct. 31, 2018, 1 page.
Notice of Allowance received for Chinese Patent Application No. 201210308569.5, dated May 31, 2016, 4 pages.
Notice of Allowance received for Chinese Patent Application No. 201280040169.9, dated Sep. 4, 2018, 3 pages.
Notice of Allowance received for Chinese Patent Application No. 201410449822.8, dated Mar. 5, 2019, 2 pages.
Notice of Allowance received for Chinese Patent Application No. 201880001436.9, dated May 8, 2020, 3 pages.
Notice of Allowance received for Danish Patent Application No. PA201770408, dated Feb. 8, 2019, 2 pages.
Notice of Allowance received for Japanese Patent Application No. 2012-500842, dated Jun. 20, 2014, 3 pages.
Notice of Allowance received for Japanese Patent Application No. 2014-148065, dated Jan. 12, 2016, 6 pages.
Notice of Allowance received for Japanese Patent Application No. 2014-526255, dated Jan. 7, 2016, 6 pages.
Notice of Allowance received for Japanese Patent Application No. 2016-001259, dated Jul. 27, 2018, 4 pages.
Notice of Allowance received for Japanese Patent Application No. 2016-017400, dated Dec. 16, 2016, 3 pages.
Notice of Allowance received for Japanese Patent Application No. 2016-022175, dated Jan. 12, 2018, 4 pages.
Notice of allowance received for Korean Patent Application No. 10-2013-7028489, dated Jan. 25, 2016, 5 pages.
Notice of Allowance received for Korean Patent Application No. 10-2014-7006538, dated May 19, 2016, 3 pages.
Notice of Allowance received for Korean Patent Application No. 1020167025395, dated Oct. 26, 2016, 5 pages.
Notice of Allowance received for Korean Patent Application No. 10-2017-7035057, dated May 31, 2018, 4 pages.
Notice of Allowance received for Mexican Patent Application No. MX/a/2014/001761, dated Sep. 11, 2015, 3 pages.
Notice of Allowance received for Mexican Patent Application No. MX/a/2016/001209, dated Mar. 26, 2018, 3 pages.
Notice of Allowance received for U.S. Appl. No. 09/293,507, dated Jul. 25, 2002, 6 pages.
Notice of Allowance received for U.S. Appl. No. 09/293,508, dated Feb. 13, 2001, 5 pages.
Notice of Allowance received for U.S. Appl. No. 10/308,315, dated Aug. 27, 2007, 6 pages.
Notice of Allowance received for U.S. Appl. No. 10/374,013, dated Aug. 27, 2007, 6 pages.
Notice of Allowance received for U.S. Appl. No. 10/374,445, dated May 5, 2006, 7 pages.
Notice of Allowance received for U.S. Appl. No. 10/374,831, dated Sep. 10, 2004, 8 pages.
Notice of Allowance received for U.S. Appl. No. 11/459,591, dated May 21, 2009, 9 pages.
Notice of Allowance received for U.S. Appl. No. 11/521,740, dated Jul. 24, 2008, 7 pages.
Notice of Allowance received for U.S. Appl. No. 11/767,409, dated Jun. 12, 2013, 14 pages.
Notice of Allowance received for U.S. Appl. No. 11/960,674, dated Sep. 2, 2011, 7 pages.
Notice of Allowance received for U.S. Appl. No. 11/983,059, dated Feb. 10, 2012, 8 pages.
Notice of Allowance received for U.S. Appl. No. 12/215,651, dated Feb. 6, 2014, 5 pages.
Notice of Allowance received for U.S. Appl. No. 12/395,537 dated Jun. 29, 2016, 14 pages.
Notice of Allowance received for U.S. Appl. No. 12/395,541, dated Aug. 22, 2013, 8 pages.
Notice of Allowance received for U.S. Appl. No. 12/395,541, dated Sep. 12, 2013, 2 pages.
Notice of Allowance received for U.S. Appl. No. 12/547,401, dated Jul. 22, 2013, 8 pages.
Notice of Allowance received for U.S. Appl. No. 12/566,669, dated Nov. 6, 2014, 12 pages.
Notice of Allowance received for U.S. Appl. No. 12/566,671, dated Apr. 12, 2013, 11 pages.
Notice of Allowance received for U.S. Appl. No. 12/566,671, dated Dec. 18, 2013, 11 pages.
Notice of Allowance received for U.S. Appl. No. 12/566,672, dated Jun. 24, 2013, 8 pages.

(56) References Cited

OTHER PUBLICATIONS

Notice of Allowance received for U.S. Appl. No. 12/566,672, dated Mar. 1, 2013, 7 pages.
Notice of Allowance received for U.S. Appl. No. 12/566,673, dated Feb. 26, 2020, 7 pages.
Notice of Allowance received for U.S. Appl. No. 13/333,900, dated Apr. 13, 2015, 9 pages.
Notice of Allowance received for U.S. Appl. No. 13/333,900, dated Dec. 1, 2015, 2 pages.
Notice of Allowance received for U.S. Appl. No. 13/333,900, dated Sep. 15, 2015, 7 pages.
Notice of Allowance received for U.S. Appl. No. 13/587,850, dated Feb. 27, 2020, 5 pages.
Notice of Allowance received for U.S. Appl. No. 13/587,850, dated Nov. 8, 2019, 6 pages.
Notice of Allowance received for U.S. Appl. No. 14/830,629, dated Oct. 17, 2018, 8 pages.
Notice of Allowance received for U.S. Appl. No. 15/274,963, dated Jul. 6, 2018, 10 pages.
Notice of Grant received for Chinese Patent Application No. 200780033722.5, dated Jun. 19, 2014, 4 pages.
Notice of Non-Compliant Amendment received for U.S. Appl. No. 11/522,167 dated May 14, 2008, 4 pages.
Office Action received for Australian Patent Application No. 2012296381, dated Jan. 21, 2016, 5 pages.
Office Action received for Australian Patent Application No. 2012296381, dated Mar. 4, 2016, 4 pages.
Office Action received for Australian Patent Application No. 2012296381, dated Mar. 6, 2015, 4 pages.
Office Action received for Australian Patent Application No. 2016201454, dated Mar. 29, 2017, 3 pages.
Office Action received for Australian Patent Application No. 2018203624, dated Feb. 5, 2020, 4 pages.
Office Action received for Australian Patent Application No. 2018203624, dated Mar. 11, 2020, 5 pages.
Office Action received for Australian Patent Application No. 2018203624, dated Mar. 15, 2019, 6 pages.
Office Action received for Australian Patent Application No. 2018203624, dated Oct. 30, 2019, 5 pages.
Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action received for Brazilian Patent Application No. BR112014003009-0, dated Oct. 29, 2019, 6 pages.
Office Action Received for Canadian Patent Application No. 2,661,200, dated Jan. 3, 2013, 5 pages.
Office Action received for Canadian Patent Application No. 2,661,200, dated Jun. 9, 2010, 3 pages.
Office Action Received for Canadian Patent Application No. 2,661,200, dated Nov. 1, 2011, 4 pages.
Office Action received for Canadian Patent Application No. 2,661,200, dated Nov. 14, 2013, 2 pages.
Office Action received for Canadian Patent Application No. 2,882,403, dated Apr. 2, 2015, 5 pages.
Office Action received for Canadian Patent Application No. 2,882,403, dated Sep. 15, 2017, 5 pages.
Office Action received for Chinese Patent Application No. 201210308569.5, dated Feb. 5, 2016, 3 pages.
Office Action received for Chinese Patent Application No. 201210308569.5, dated Nov. 19, 2014, 24 pages.
Office Action received for Chinese Patent Application No. 201210308569.5, dated Sep. 1, 2015, 39 pages.
Office Action received for Chinese Patent Application No. 201280040169.9, dated Jun. 1, 2016, 10 pages.
Office Action received for Chinese Patent Application No. 201280040169.9, dated Mar. 31, 2017, 13 pages.
Office Action received for Chinese Patent Application No. 201280040169.9, dated May 14, 2018, 6 pages.
Office Action received for Chinese Patent Application No. 201280040169.9, dated Sep. 20, 2017, 14 pages.
Office Action received for Chinese Patent Application No. 201410449822.8, dated Dec. 2, 2016, 9 pages.
Office Action received for Chinese Patent Application No. 201410449822.8, dated May 4, 2018, 12 pages.
Office Action received for Chinese Patent Application No. 201410449822.8, dated Nov. 20, 2018, 11 pages.
Office Action received for Chinese Patent Application No. 201410449822.8, dated Sep. 30, 2017, 20 pages.
Office Action received for Chinese Patent Application No. 201580046339.8, dated Feb. 26, 2019, 18 pages.
Office Action received for Chinese Patent Application No. 201580046339.8, dated Jun. 3, 2020, 19 pages.
Office Action received for Chinese Patent Application No. 201580046339.8, dated Oct. 31, 2019, 9 pages.
Office Action received for Chinese Patent Application No. 201811539259.8, dated Apr. 3, 2020, 10 pages.
Office Action received for Chinese Patent Application No. 201811539259.8, dated Sep. 18, 2019, 12 pages.
Office Action received for Chinese Patent Application No. 201811539260.0, dated Jun. 3, 2020, 8 pages.
Office Action received for Chinese Patent Application No. 201811539260.0, dated Oct. 8, 2019, 14 pages.
Office Action received for Chinese Patent Application No. 201880001436.9, dated Apr. 28, 2019, 19 pages.
Office Action received for Chinese Patent Application No. 201880001436.9, dated Nov. 6, 2019, 24 pages.
Office Action received for Chinese Patent Application No. 201910164962.3, dated Apr. 8, 2020, 25 pages.
Office Action received for Danish Patent Application No. PA201770392, dated Apr. 17, 2018, 2 pages.
Office Action received for Danish Patent Application No. PA201770392, dated Dec. 8, 2017, 4 pages.
Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770406, dated Feb. 27, 2018, 7 pages.
Office Action received for Danish Patent Application No. PA201770406, dated Jan. 25, 2019, 8 pages.
Office Action received for Danish Patent Application No. PA201770406, dated Jun. 22, 2017, 11 pages.
Office Action received for Danish Patent Application No. PA201770406, dated Mar. 26, 2019, 3 pages.
Office Action received for Danish Patent Application No. PA201770406, dated Nov. 11, 2019, 4 pages.

(56) References Cited

OTHER PUBLICATIONS

Office Action received for Danish Patent Application No. PA201770408, dated Dec. 21, 2017, 6 pages.
Office Action received for Danish Patent Application No. PA201770408, dated Jun. 20, 2017, 9 pages.
Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for European Patent Application No. 00923491.5, dated Jan. 11, 2010, 6 pages.
Office Action received for European Patent Application No. 00923491.5, dated Mar. 12, 2007, 9 pages.
Office Action received for European Patent Application No. 00923491.5, dated Sep. 11, 2007, 5 pages.
Office Action received for European Patent Application No. 07842262.3, dated Feb. 16, 2017, 6 pages.
Office Action received for European Patent Application No. 07842262.3, dated Sep. 8, 2011, 5 pages.
Office Action received for European Patent Application No. 10177096.4, dated Feb. 20, 2012, 6 pages.
Office Action received for European Patent Application No. 10177096.4, dated Jul. 26, 2017, 8 pages.
Office Action received for European Patent Application No. 10177096.4, dated Jun. 7, 2018, 14 pages.
Office Action received for European Patent Application No. 10177096.4, dated Mar. 21, 2013, 9 pages.
Office Action received for European Patent Application No. 10177099.8, dated Feb. 20, 2012, 5 pages.
Office Action received for European Patent Application No. 10712824.1, dated Jun. 23, 2014, 7 pages.
Office Action received for European Patent Application No. 12753631.6, dated Jul. 10, 2017, 6 pages.
Office Action received for European Patent Application No. 13184872.3, dated May 18, 2018, 8 pages.
Office Action received for European Patent Application No. 18197583.0, dated Feb. 28, 2020, 8 pages.
Office Action received for European Patent Application No. 18197589.7, dated Oct. 1, 2019, 5 pages.
Office Action received for European Patent Application No. 19169980.0, dated Mar. 4, 2020, 6 pages.
Office Action received for European Patent Application No. 10712824.1, dated Mar. 1, 2016, 11 pages.
Office Action Received for Indian Patent Application No. 717/CHENP/2014, dated Feb. 7, 2019, 5 pages.
Office Action Received for Japanese Patent Application No. 2012500842, dated Jan. 31, 2014, 5 pages.
Office Action received for Japanese Patent Application No. 2014-148065, dated Sep. 7, 2015, 5 pages.
Office Action received for Japanese Patent Application No. 2014-17726, dated Feb. 9, 2015, 4 pages.
Office Action received for Japanese Patent Application No. 2014-526255, dated Jun. 12, 2015, 5 pages.
Office Action received for Japanese Patent Application No. 2016-001259, dated Feb. 23, 2018, 11 pages.
Office Action received for Japanese Patent Application No. 2016-001259, dated Jan. 6, 2017, 6 pages.
Office Action received for Japanese Patent Application No. 2016-001259, dated Nov. 13, 2017, 10 pages.
Office Action received for Japanese Patent Application No. 2016-022175, dated Apr. 10, 2017, 11 pages.
Office Action received for Japanese Patent Application No. 2018-119170, dated May 10, 2019, 8 pages.
Office Action received for Korean Patent Application No. 10-2013-7028487, dated Feb. 18, 2016, 8 pages.
Office Action Received for Korean Patent Application No. 10-2013-7028487, dated Jun. 5, 2015, 9 pages.
Office Action received for Korean Patent Application No. 10-2013-7028487, dated Jun. 13, 2016, 6 pages.
Office Action received for Korean Patent Application No. 10-2013-7028489, dated Jun. 4, 2015, 4 pages.
Office Action received for Korean Patent Application No. 10-2014-7006538, dated Jul. 31, 2015, 8 pages.
Office Action received for Korean Patent Application No. 10-2016-7022902, dated Sep. 4, 2017, 3 pages.
Office Action received for Korean Patent Application No. 10-2017-7035057, dated Mar. 21, 2018, 10 pages.
Office Action received for Mexican Patent Application No. MX/a/2016/001209, dated Apr. 20, 2017, 5 pages.
Office Action received for Mexican Patent Application No. MX/a/2016/001209, dated Aug. 25, 2016, 4 pages.
Office Action received for Mexican Patent Application No. MX/a/2016/001209, dated Sep. 13, 2017, 5 pages.
On-Line Definition for "Playback", American Heritage Dictionary of the English Language, 4th Edition, 2000, 1 page.
Partial European Search Report received for European Patent Application No. 20158824.1, dated May 8, 2020, 14 pages.
Partial European Search Report received for European Patent Application No. 18197583.0, dated Jan. 14, 2019, 18 pages.
Partyshare—turn your Xperia into a jukebox, online available at"https://forum.xda-developers.com/crossdevice-dev/sony/app-partyshare-xperia-jukebox-t2877807", Sep. 15, 2014, 5 pages.
Plaisant et al, "Touchscreen Toggle Switches: Push or slide? Design Issues and Usability Study", Technical Report CAR-TR-521, CS-TR-2557, Nov. 1990, pp. 1-10.
Planet Quark, "See Everything Your Mac Printed", XP055533938, retrieved from the Internet: URL: https://www.planetquark.com/2011/05/19/see-everything-your-mac-printed/#.XjkfQsgzZGM, May 19, 2011, 7 pages.
Quick Time Movie Player Ver. 2.1.2.59, Current Time Indicator Dragging Operation, Ver. 2.1.2.59, 1996, 1 page.
Real One Player Version 2.0 Screen Dumps, 2002, 4 pages.
Restriction Requirement received for U.S. Appl. No. 10/374,013, dated Oct. 6, 2006, 4 pages.
Restriction Requirement received for U.S. Appl. No. 11/767,409, dated Sep. 21, 2010, 8 pages.
Restriction Requirement received for U.S. Appl. No. 12/215,651, dated Sep. 28, 2011, 11 pages.
Restriction Requirement received for U.S. Appl. No. 12/395,537, dated May 9, 2011, 6 pages.
Restriction Requirement received for U.S. Appl. No. 12/395,541, dated May 27, 2011, 6 pages.
Review: Samsung Radiant R3 Wireless Speakers, Available Online at: https://www.youtube.com/watch?v=ZBICVE1WdKE, Jan. 19, 2016, 3 pages.
Richards, "TN Audio Mixer and Master Volume Control with Automatic Configuration", Technical Disclosure Bulletin, vol. 37, No. 01, Jan. 1, 1994, pp. 485-486.
Ricker Thomas, "iTunes (in the Cloud) 10.3 beta available for download, we go hands-on", retrieved from the Internet: https://www.engadget.com/2011/06/07/itunes-in-the-cloud10-3-beta-available-for-download-we-go-ha/, 2011, 12 pages.
Samsung, "Samsung R3 Wireless 360° Smart Speaker (Black)", User Manual ver. 1.0 (English), User manual [online], Available Online at: https://www.samsung.com/uk/support/model/WAM3500/XU/, Dec. 16, 2016, 3 pages.

(56) References Cited

OTHER PUBLICATIONS

Sawyer Brian, "Get with the Cover Flow", Available online at: https://briansawyer.net/2005/12/08/get-with-the-coverflow/, Dec. 9, 2005, pp. 1-2.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870419, dated Aug. 27, 2018, 7 pages.
Search Report and Opinion received for Danish Patent Application No. PA201870419, dated Sep. 10, 2018, 9 pages.
Search Report and Opinion received for Danish Patent Application No. PA201870598, dated Dec. 5, 2018, 8 pages.
Search Report received for Danish Patent Application No. PA201770404, dated Jun. 20, 2017, 8 pages.
Search Report received for Danish Patent Application No. PA201770409, dated Jun. 20, 2017, 9 pages.
Search Report received for European Patent Application No. 00923491.5, dated Jun. 2, 2006, 6 pages.
Search Report received for European Patent Application No. 00923491.5, dated Mar. 6, 2006, 4 pages.
Seifert Dan, "Google Home review: Home is where the smart is", The Verge, Available Online at: https://www.theverge.com/2016/11/3/13504658/google-home-review-speaker-assistant-amazon-echo-competitor, Nov. 3, 2016, 11 pages.
Seifi Joe, "Pianist Pro Review", Online available at: http://www.appsafari.com/productivity/11529/pianist-pro/, Apr. 24, 2010, 9 pages.
Smarttricks, "Top 3 Music Player for Android", Available online at: https://www.youtube.com/watch?v=He7RTn4CL34, Feb. 22, 2017, 4 pages.
Sonos, "Sonos Controller App for iPad Product Guide", Available online at: https://www.sonos.com/documents/productguides/en/iPadGuide_EN.pdf, Nov. 2014, 47 pages.
Summon to Attend Oral Proceeding received for European Patent Application No. 10177099.8 mailed on Mar. 20, 2013, 9 pages.
Summons to attend oral proceedings received for European Patent Application No. 00923491.5, mailed on Jan. 27, 2011, 10 pages.
Summons to Attend Oral Proceedings received for European Patent Application No. 07842262.3, mailed on Jun. 25, 2018, 9 pages.
Summons to Attend Oral Proceedings received for European Patent Application No. 12753631.6, mailed on Jul. 6, 2018, 5 pages.
Summons to Attend Oral Proceedings received for European Patent Application No. 12753631.6, mailed on May 8, 2018, 9 pages.
Summons to attend Oral proceedings received for European Patent Application No. 18197589.7, mailed on Apr. 9, 2020, 7 pages.
Summons to Attend Oral Proceedings received for European Patent Application No. 10177096.4, mailed on Sep. 21, 2018, 12 pages.
Summons to Oral Proceedings received for German Patent Application No. 112007002143.8 mailed on Nov. 28, 2018, 13 pages.
Tedeschi Bob, "Stoking a Music Fan's Fancy with Apps That Rock", Available at: http://www.nytimes.com/2010/05/20/technology/personaltech/20smart.html, May 19, 2010, 3 pages.
The Single Keyboard Piano, available at: http://moocowmusic.com/PianistPro/Manual/ManualSingleKeyboardPiano.html, Sep. 26, 2010, 4 pages.
The Single Keyboard Piano, Online available at: http://web.archive.org/web/20100926023929/http://moocowmusic.com/PianistPro/Manual/ManualSingleKeyboardPiano.html, Sep. 26, 2010, 3 pages.
Whitehouse Ben, "Coverflow: Better Digital Music Navigation", Whitehouse&Company, Online Available at: http://wandco.com/2005/08/coverflow-better-digital-music-navigation/, Aug. 15, 2005, pp. 1-3.
Windows Media Player for Windows XP version 8.0, 2001, 2 pages.
Woolsey Amanda, "Apple Watch Tips—How to Add and Play Music", Available online at: https://www.youtube.com/watch?v=E0QEuqMaoi8, Apr. 26, 2015, 3 pages.
Yamaguchi Yuu, "Useful Freeware and Shareware Information", Pick Up Onlineware, 23th, MdN, vol. 146, MdN Corporation, Jun. 6, 2006, pp. 135.

Applicant Initiated Interview Summary received for U.S. Appl. No. 16/583,989, dated Aug. 3, 2020, 6 pages.
Applicant Initiated Interview Summary received for U.S. Appl. No. 16/584,490, dated Jul. 28, 2020, 4 pages.
Applicant-Initiated Interview Summary received for U.S. Appl. No. 16/807,604, dated Jul. 24, 2020, 5 pages.
Crutnacker, "Amazon Echo Tips and Tricks: Playing Music Demonstration", Available Online at: https://www.youtube.com/watch?v=W_bqq2ynUII, Nov. 4, 2015, 1 page.
Final Office Action received for U.S. Appl. No. 16/583,989, dated Jul. 10, 2020, 23 pages.
Final Office Action received for U.S. Appl. No. 16/702,968, dated Jul. 27, 2020, 21 pages.
Non-Final Office Action received for U.S. Appl. No. 16/263,280, dated Jul. 27, 2020, 11 pages.
Non-Final Office Action received for U.S. Appl. No. 16/803,849, dated Jul. 13, 2020, 23 pages.
Advisory Action received for U.S. Appl. No. 16/584,347, dated Aug. 28, 2020, 2 pages.
Applicant-Initiated Interview Summary received for U.S. Appl. No. 16/584,321, dated Apr. 8, 2020, 5 pages.
Applicant-Initiated Interview Summary received for U.S. Appl. No. 16/584,347, dated Sep. 1, 2020, 3 pages.
Corrected Notice of Allowance received for U.S. Appl. No. 16/584,347, dated Sep. 23, 2020, 5 pages.
Decision to Grant received for German Patent Application No. 102015208532.5, dated Sep. 22, 2020, 10 pages (1 page of English Translation and 9 pages of Official Copy).
Final Office Action received for U.S. Appl. No. 16/584,321, dated May 22, 2020, 12 pages.
Final Office Action received for U.S. Appl. No. 16/584,347, dated Jun. 10, 2020, 20 pages.
International Search Report and Written Opinion received for PCT Patent Application No. PCT/US2020/025526, dated Aug. 11, 2020, 18 pages.
Invitation to Pay Additional Fees received for PCT Patent Application No. PCT/US2020/035488, dated Sep. 23, 2020, 15 pages.
Invitation to Pay Additional Fees received for PCT Patent Application No. PCT/US2020/025526, dated Jun. 15, 2020, 12 pages.
Non-Final Office Action received for U.S. Appl. No. 16/584,321, dated Jan. 7, 2020, 19 pages.
Non-Final Office Action received for U.S. Appl. No. 16/584,347, dated Dec. 20, 2019, 16 pages.
Notice of Allowance received for Japanese Patent Application No. 2019-116580, dated Oct. 2, 2020, 4 pages (1 page of English Translation and 3 pages of Official Copy).
Notice of Allowance received for Japanese Patent Application No. 2019-238894, dated Oct. 5, 2020, 4 pages (1 page of English Translation and 3 pages of Official Copy).
Notice of Allowance received for U.S. Appl. No. 16/584,321, dated Aug. 25, 2020, 9 pages.
Notice of Allowance received for U.S. Appl. No. 16/584,347, dated Sep. 15, 2020, 9 pages.
Office Action received for European Patent Application No. 19186538.5, dated Oct. 12, 2020, 7 pages.
Applicant-Initiated Interview Summary received for U.S. Appl. No. 15/730,610, dated Aug. 25, 2020, 6 pages.
Applicant-Initiated Interview Summary received for U.S. Appl. No. 16/803,849, dated Aug. 21, 2020, 5 pages.
Extended European Search Report received for European Patent Application No. 20158824.1, dated Aug. 10, 2020, 13 pages.
Final Office Action received for U.S. Appl. No. 16/807,604, dated Aug. 19, 2020, 35 pages.
Notice of Allowance received for U.S. Appl. No. 16/584,490, dated Aug. 27, 2020, 13 pages.
Summons to Attend Oral Proceedings received for European Patent Application No. 18197583.0, mailed on Aug. 14, 2020, 12 pages.
Advisory Action received for U.S. Appl. No. 16/583,989, dated Sep. 22, 2020, 5 pages.
Applicant-Initiated Interview Summary received for U.S. Appl. No. 16/422,736, dated Sep. 28, 2020, 3 pages.
Applicant-Initiated Interview Summary received for U.S. Appl. No. 16/702,968, dated Sep. 28, 2020, 6 pages.

(56) References Cited

OTHER PUBLICATIONS

Final Office Action received for U.S. Appl. No. 16/803,849, dated Sep. 24, 2020, 29 pages.
Office Action received for Chinese Patent Application No. 201811539259.8, dated Sep. 3, 2020, 10 pages (6 pages of English Translation and 4 pages of Official Copy).
Office Action received for Chinese Patent Application No. 202010125114.4, dated Aug. 21, 2020, 16 pages (8 pages of English Translation and 8 pages of Official Copy).
Applicant-Initiated Interview Summary received for U.S. Appl. No. 15/910,263, dated Nov. 18, 2020, 6 pages.
Corrected Notice of Allowance received for U.S. Appl. No. 16/584,347, dated Nov. 9, 2020, 2 pages.
International Search Report and Written Opinion received for PCT Patent Application No. PCT/US2020/024390, dated Oct. 23, 2020, 26 pages.
Notice of Allowance received for Korean Patent Application No. 10-2020-7017803, dated Nov. 5, 2020, 6 pages (2 pages of English Translation and 4 pages of Official Copy).
Notice of Allowance received for U.S. Appl. No. 16/584,743, dated Nov. 16, 2020, 7 pages.
Office Action received for Chinese Patent Application No. 201580043701.6, dated Oct. 12, 2020, 22 pages (5 pages of English Translation and 17 pages of Official Copy).
Office Action received for Chinese Patent Application No. 201580046339.8, dated Oct. 19, 2020, 12 pages (4 pages of English Translation and 8 pages of Official Copy).
Office Action received for Chinese Patent Application No. 201580046788.2, dated Sep. 22, 2020, 10 pages (5 pages of English Translation and 5 pages of Official Copy).
Office Action received for European Patent Application No. 19207753.5, dated Nov. 12, 2020, 5 pages.
Office Action received for Chinese Patent Application No. 201911128105.4, dated Jul. 3, 2020, 18 pages (9 pages of English Translation and 9 pages of Official Copy).
Advisory Action received for U.S. Appl. No. 14/846,511, dated Oct. 22, 2019, 5 pages.
Advisory Action received for U.S. Appl. No. 14/846,511, dated Sep. 19, 2018, 8 pages.
Advisory Action received for U.S. Appl. No. 14/863,099, dated Sep. 8, 2016, 3 pages.
Advisory Action received for U.S. Appl. No. 15/250,152, dated Mar. 25, 2019, 5 pages.
AdyClock—Night Alarm Clock, App for android, Google play store page: https://web.archive.org/web/20130924223153/https://play.google.com/store/apps/details?id=com.adyclock&hl=en, Sep. 24, 2013, 2 pages.
Akhgari Ehsan, "Don't Leave a Trace: Private Browsing in Firefox", available online at "http://ehsanakhgari.org/blog/2008-11-04/dont-leave-trace-private-browsing-firefox", Nov. 4, 2008, 71 pages.
Applicant Initiated Interview Summary received for U.S. Appl. No. 14/641,304, dated Dec. 2, 2019, 5 pages.
Applicant Initiated Interview Summary received for U.S. Appl. No. 14/641,304, dated Jul. 28, 2020, 5 pages.
Applicant Initiated Interview Summary received for U.S. Appl. No. 14/846,511, dated Apr. 20, 2020, 4 pages.
Applicant Initiated Interview Summary received for U.S. Appl. No. 15/433,320, dated Feb. 11, 2020, 5 pages.
Applicant-Initiated Interview Summary received for U.S. Appl. No. 16/259,954, dated Mar. 23, 2020, 3 pages.
Applicant-Initiated Interview Summary received for U.S. Appl. No. 16/584,743, dated May 1, 2020, 5 pages.
Applicant-Initiated Interview Summary received for U.S. Appl. No. 16/586,002, dated Apr. 28, 2020, 5 pages.
Beard Chris, "Mozilla Labs Introducing Weave", available online at <https://blog.mozilla.org/labs/2007/12/introducing-weave/>, Dec. 21, 2007, 57 pages.
Bell Killian, "Twitter Notifications, iCloud Tabs & Location-Based Reminders Appear in Latest OS X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.
Certificate of Examination received for Australian Patent Application No. 2018101014, dated Mar. 20, 2019, 2 pages.
Certification of Examination received for Australian Patent Application No. 2017100553, dated Jan. 17, 2018, 2 pages.
Chan Christine, "Handoff Your Browser to Your iPhone or iPad! Plus, A Chance to Win a Copy!", Apr. 12, 2011, 2 pages.
Corrected Notice of Allowance received for U.S. Appl. No. 14/719,217, dated Apr. 22, 2019, 2 pages.
Corrected Notice of Allowance received for U.S. Appl. No. 14/719,217, dated Mar. 20, 2019, 2 pages.
Corrected Notice of Allowance received for U.S. Appl. No. 14/841,614, dated Jan. 8, 2019, 3 pages.
Corrected Notice of Allowance received for U.S. Appl. No. 15/269,801, dated Oct. 3, 2017, 4 pages.
Corrected Notice of Allowance received for U.S. Appl. No. 15/845,794, dated Feb. 25, 2019, 2 pages.
Corrected Notice of Allowance received for U.S. Appl. No. 15/952,736, dated Nov. 19, 2018, 2 pages.
Corrected Notice of Allowance received for U.S. Appl. No. 16/229,959, dated Mar. 3, 2020, 3 pages.
Corrected Notice of Allowance received for U.S. Appl. No. 16/434,865, dated Apr. 28, 2020, 2 pages.
Corrected Notice of Allowance received for U.S. Appl. No. 16/434,865, dated Jun. 4, 2020, 2 pages.
Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision to Grant received for Danish Patent Application No. PA201670628, dated Nov. 20, 2017, 2 pages.
Decision to Grant received for Danish Patent Application No. PA201770782, dated Oct. 25, 2019, 2 pages.
Decision to Grant received for European Patent Application No. 12773460.6, dated Jun. 27, 2019, 2 pages.
Decision to Grant received for European Patent Application No. 13171047.7, dated Jun. 27, 2019, 2 pages.
Decision to Grant received for European Patent Application No. 15711969.4, dated Sep. 26, 2019, 2 pages.
Decision to Grant received for European Patent Application No. 15713062.6, dated Apr. 11, 2019, 2 pages.
Decision to Grant received for European Patent Application No. 15724160.5, dated Jun. 14, 2018, 2 pages.
Decision to Grant received for Japanese Patent Application No. 2017-075031, dated Jul. 1, 2019, 3 pages (1 page of English Translation and 2 pages of Official Copy).
Decision to Refuse received for European Patent Application No. 12770400.5, dated Nov. 8, 2018, 12 pages.
Dharmasena Anusha, "iMessage-send as text message Option", YouTube, Available online at: <https://www.youtube.com/watch?v=hXG-MdIW6FA>, Feb. 18, 2013, 1 page.
Digital alarm clock app for Android, Goggle play store digital alarm clock description page, Mar. 25, 2015, 3 pages.
Dybwad Barb, "Google Chrome Gets Bookmark Syncing", available online at "http://mashable.com/2009/11/02/chrome-bookmark-sync/", Nov. 3, 2009, 6 pages.
Evaluation Report for Utility Model Patent received for Chinese Patent Application No. 201620051290.7, completed on Sep. 19, 2016, 11 pages (6 pages of English translation and 5 pages of Official Copy).
Examiner's Answer to Appeal Brief received for U.S. Appl. No. 14/774,664, dated May 31, 2018, 28 pages.
Examiner's Answer to Appeal Brief received for U.S. Appl. No. 14/863,099, dated Jul. 28, 2017, 31 pages.
Examiner's Answer to Appeal Brief received for U.S. Appl. No. 15/128,952, dated Jan. 8, 2020, 9 pages.
Examiner's Initiated Interview Summary received for U.S. Appl. No. 14/641,298, dated Mar. 10, 2020, 4 pages.
Examiner's Pre-Review Report received for Japanese Patent Application No. 2018-080122, dated Feb. 25, 2020, 6 pages (3 pages of English Translation and 3 pages of Official Copy).

(56) References Cited

OTHER PUBLICATIONS

Extended European Search Report for European Application No. 17813737.8, dated Nov. 22, 2019, 9 pages.
Extended European Search Report received for European Patent Application No. 13171047.7, dated Oct. 29, 2014, 8 pages.
Extended European Search Report received for European Patent Application No. 17799904.2, dated Jul. 30, 2018, 7 pages.
Extended European Search Report received for European Patent Application No. 18178147.7, dated Oct. 4, 2018, 8 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19186538.5, dated Oct. 9, 2019, 10 pages.
Extended European Search Report received for European Patent Application No. 19203942.8, dated Apr. 1, 2020, 10 pages.
Final Office Action received for U.S. Appl. No. 14/503,327, dated May 18, 2017, 10 pages.
Final Office Action received for U.S. Appl. No. 13/248,882, dated Dec. 4, 2013, 22 pages.
Final Office Action received for U.S. Appl. No. 13/492,057, dated Apr. 8, 2016, 29 pages.
Final Office Action received for U.S. Appl. No. 13/492,057, dated Mar. 30, 2015, 18 pages.
Final Office Action received for U.S. Appl. No. 14/285,378, dated Jul. 23, 2015, 19 pages.
Final Office Action received for U.S. Appl. No. 14/641,289, dated Jul. 1, 2016., 32 pages.
Final Office Action received for U.S. Appl. No. 14/641,298, dated Jun. 26, 2020, 50 pages.
Final Office Action received for U.S. Appl. No. 14/641,298, dated May 16, 2019, 50 pages.
Final Office Action received for U.S. Appl. No. 14/641,298, dated Oct. 4, 2017, 30 pages.
Final Office Action received for U.S. Appl. No. 14/641,304, dated Oct. 15, 2019, 21 pages.
Final Office Action received for U.S. Appl. No. 14/719,217, dated Feb. 23, 2017, 37 pages.
Final Office Action received for U.S. Appl. No. 14/774,664, dated Aug. 25, 2017, 23 pages.
Final Office Action received for U.S. Appl. No. 14/841,455, dated Nov. 6, 2018, 14 pages.
Final Office Action received for U.S. Appl. No. 14/841,614, dated May 10, 2018, 13 pages.
Final Office Action received for U.S. Appl. No. 14/841,623, dated Sep. 5, 2017, 16 pages.
Final Office Action received for U.S. Appl. No. 14/846,511 dated May 10, 2018, 21 pages.
Final Office Action received for U.S. Appl. No. 14/846,511, dated Aug. 11, 2020, 25 pages.
Final Office Action received for U.S. Appl. No. 14/846,511, dated Jun. 5, 2019, 24 pages.
Final Office Action received for U.S. Appl. No. 14/863,099, dated Apr. 21, 2016, 20 pages.
Final Office Action received for U.S. Appl. No. 15/128,952, dated Jul. 18, 2018, 19 pages.
Final Office Action received for U.S. Appl. No. 15/433,320, dated Dec. 31, 2019, 30 pages.
Final Office Action received for U.S. Appl. No. 15/250,152, dated Aug. 23,2017, 24 pages.
Final Office Action received for U.S. Appl. No. 15/250,152, dated Nov. 16, 2018, 30 pages.
Final Office Action received for U.S. Appl. No. 14/641,304, dated Jul. 24, 2018., 19 pages.
Firefox Sync—Take Your Bookmarks, Tabs and Personal Information with You, available online at https://web.archive.org/web/20120601020556/http://support.mozilla.org/en-US/kb/firefox-sync-take-your-bookmarks-and-tabs-with-you?redirectlocale=en-US&redirectslug=what-firefox-sync, Jun. 1, 2012, 3 pages.
Fitbit surge Fitness Watch, Manual version 1.0, May 7, 2015, 48 pages.
Frakes Dan, "How to Get Started with Airplay", available at: https://www.macworld.com/article/2039770/how-to-get-started-with-airplay.html, Macworld, May 27, 2013, 8 pages.
G Pad, LG's Latest Uls That Shine More Lightly on the G-Pad, Online available at: http://bungq.com/1014, Nov. 19, 2013, 38 pages (2 pages of English Translation and 36 pages of Official Copy).
Google Labs, "Google Browser Sync", available online at "https://web.archive.org/web/20120518050142/http://www.google.com/tools/firefox/browsersync/faq.html", May 18, 2012, 5 pages.
Intention to Grant received for Danish Patent Application No. PA201670628, dated Aug. 28, 2017, 2 pages.
Intention to Grant received for Danish Patent Application No. PA201770782, dated Aug. 8, 2019, 2 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
Intention to Grant received for European Patent Application No. 13171047.7, dated Jan. 23, 2019, 8 pages.
Intention to Grant received for European Patent Application No. 15711969.4, dated May 29, 2019, 11 pages.
Intention to Grant received for European Patent Application No. 15713062.6, dated Mar. 25, 2019, 7 pages.
Intention to Grant received for European Patent Application No. 15713062.6, dated Oct. 8, 2018, 8 pages.
Intention to Grant received for European Patent Application No. 15724160.5, dated Mar. 7, 2018, 8 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2013/044710, dated Dec. 18, 2014, 11 pages.
International Preliminary Report on Patentability received for PCT Patent Application No. PCT/US2014/027882, dated Sep. 24, 2015, 8 pages.
International Preliminary Report on Patentability Received for PCT Patent Application No. PCT/US2015/019306, dated Dec. 15, 2016, 10 pages.
International Preliminary Report on Patentability Received for PCT Patent Application No. PCT/US2015/019309, dated Dec. 15, 2016, 10 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2016/021012, dated Sep. 21, 2017, 11 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/032240, dated Nov. 29, 2018, 29 pages.
International Preliminary Report on Patentability received for PCT Patent Application no. PCT/US2015/046787, dated Mar. 16, 2017, 19 pages.

(56) References Cited

OTHER PUBLICATIONS

International Search Report and Written Opinion received for PCT Application No. PCT/US2015/019309, dated Jun. 25, 2015, 15 pages.
International Search Report and Written Opinion received for PCT Patent Application No. PCT/US17/31086, dated Sep. 8, 2017, 15 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2013/044710, dated Aug. 15, 2013, 11 pages.
International Search Report and Written Opinion received for PCT Patent Application No. PCT/US2014/027882, dated Oct. 10, 2014, 11 pages.
International Search Report and Written Opinion received for PCT Patent Application No. PCT/US2015/019306, dated Jun. 17, 2015, 15 pages.
International Search Report and Written Opinion received for PCT Patent Application No. PCT/US2015/019317, datedAug. 25, 2015, 24 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/046787, dated Apr. 1, 2016, 26 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2016/021012, dated Jun. 2, 2016, 15 pages.
International Search Report and Written Opinion received for PCT Patent Application No. PCT/US2017/032240, dated Sep. 21, 2017, 33 pages.
International Search Report and written Opinion received for PCT Patent Application No. PCT/US2020/024390, dated Aug. 17, 2020, 22 pages.
Invitation to Pay Addition Fees received for PCT Patent Application No. PCT/US2014/027882, dated Aug. 5, 2014, 2 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fees received for PCT Patent Application No. PCT/US2020/024390, dated Jun. 26, 2020, 15 pages.
Invitation to Pay Additional Fees received for PCT Patent Application No. PCT/US2015/019317, dated May 22, 2015, 7 pages.
Invitation to Pay Additional Fees received for PCT Patent Application No. PCT/US2015/046787, dated Dec. 15, 2015, 8 pages.
Invitation to pay additional fees received for PCT Patent Application No. PCT/US2015/054223, dated Mar. 9, 2016, 9 pages.
Invitation to Pay Search Fees received for European Patent Application No. 18728002.9, dated Sep. 2, 2020, 8 pages.
IPhone, "User Guide for iOS 7.1 Software", Mar. 2014, 162 pages.
Kimura Ryoji, "Keynote presentation practice guide for iPad & iPhone", K.K. Rutles, first edition, Feb. 29, 2012, 4 pages (Official Copy Only) (See Communication under 37 CFR § 1.98(a) (3)).
Kinect Gesture Commands—Kinect Voice Commands, Xbox Wire, Available Online At: <https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.
Mackie Simon, "Emulate Safari's Reader Mode in Other Browsers with Readability", available online at "https://gigaom.com/2010/06/21/emulate-safaris-reader-mode-in-other-browsers-with-readability/", Jun. 21, 2010, 5 pages.
Minutes of Oral Hearing received for German Patent Application No. 102015208532.5, mailed on Dec. 13, 2019, 21 pages (3 pages of English Translation and 18 pages of Official Copy).
Minutes of the Oral Proceedings received for European Application No. 12770400.5, mailed on Nov. 6, 2018, 7 pages.
Minutes of the Oral Proceedings received for European Application No. 15711969.4, mailed on May 16, 2019, 7 pages.
Mozilla Services, "Firefox Sync Terms of Service (for versions prior to Firefox 29)", available online at <https://services.mozilla.com/tos/>, Aug. 19, 2010, 4 pages.
Night Display (Alarm Clock) App, Google Play Store Night Display (Alarm Clock) Description page, available at <https://web.archive.org/web/20141007124222/https://play.google.com/store/apps/details?id=com.srk.nighttimedisplay&hl=en>, Oct. 7, 2014, pp. 1-3.
Non-Final Action received for U.S. Appl. No. 15/952,736, dated Jun. 1, 2018, 12 pages.
Non-Final Office Action received for U.S. Appl. No. 13/492,057, dated Dec. 17, 2015, 25 pages.
Non-Final Office Action received for U.S. Appl. No. 14/503,327, dated Sep. 12, 2016, 10 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 13/492,057, dated Jul. 8, 2014, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/641,289, dated Jul. 16, 2015, 31 pages.
Non-Final Office Action received for U.S. Appl. No. 14/641,289, dated Mar. 11, 2016, 26 pages.
Non-Final Office Action received for U.S. Appl. No. 14/641,298, dated Mar. 6, 2017, 26 pages.
Non-Final Office Action received for U.S. Appl. No. 14/641,298, dated Nov. 29, 2019, 47 pages.
Non-Final Office Action received for U.S. Appl. No. 14/641,298, dated Sep. 19, 2018, 41 pages.
Non-Final Office Action received for U.S. Appl. No. 14/641,304, dated Feb. 27, 2019, 18 pages.
Non-Final Office Action received for U.S. Appl. No. 14/641,304, dated Mar. 4, 2020, 21 pages.
Non-Final Office Action received for U.S. Appl. No. 14/642,366, dated Aug. 24, 2015, 7 pages.
Non-Final Office Action received for U.S. Appl. No. 14/719,217, dated Jul. 26, 2018, 40 pages.
Non-Final Office Action received for U.S. Appl. No. 14/719,217, dated Jul. 28, 2016, 28 pages.
Non-Final Office Action received for U.S. Appl. No. 14/774,664, dated Mar. 7, 2017, 23 pages.
Non-Final Office Action received for U.S. Appl. No. 14/841,455, dated Apr. 25, 2018, 13 pages.
Non-Final Office Action received for U.S. Appl. No. 14/841,608, dated Apr. 12, 2017., 9 pages.
Non-Final Office Action received for U.S. Appl. No. 14/841,614, dated Jul. 27, 2017, 13 pages.
Non-Final Office Action received for U.S. Appl. No. 14/841,623, dated Feb. 2, 2017, 17 pages.
Non-Final Office Action received for U.S. Appl. No. 14/846,511 dated Jan. 7, 2020, 25 pages.
Non-Final Office Action received for U.S. Appl. No. 14/846,511 dated Oct. 27, 2017, 15 pages.

(56) References Cited

OTHER PUBLICATIONS

Non-Final Office Action received for U.S. Appl. No. 14/863,099, dated Dec. 2, 2015, 12 pages.
Non-Final Office Action received for U.S. Appl. No. 15/128,952, dated Apr. 1, 2019, 20 pages.
Non-Final Office Action received for U.S. Appl. No. 15/128,952, dated Dec. 29, 2017, 13 pages.
Non-Final Office Action received for U.S. Appl. No. 15/134,638, dated Sep. 20, 2016, 6 pages.
Non-Final Office Action received for U.S. Appl. No. 15/269,801, dated Dec. 30, 2016, 17 pages.
Non-Final Office Action received for U.S. Appl. No. 15/433,320, dated Jul. 31, 2020, 13 pages.
Non-Final Office Action received for U.S. Appl. No. 15/620,666, dated Mar. 28, 2018, 14 pages.
Non-Final Office Action received for U.S. Appl. No. 15/845,794, dated Oct. 15, 2018, 8 pages.
Non-Final Office Action received for U.S. Appl. No. 16/229,959, dated Oct. 31, 2019, 10 pages.
Non-Final Office Action received for U.S. Appl. No. 16/259,954, dated Feb. 5, 2020, 10 pages.
Non-Final Office Action received for U.S. Appl. No. 16/422,736, dated Jun. 23, 2020, 24 pages.
Non-Final Office Action received for U.S. Appl. No. 16/434,865, dated Jan. 16, 2020, 9 pages.
Non-Final Office Action received for U.S. Appl. No. 16/584,743, dated Feb. 6, 2020, 15 pages.
Non-Final Office Action received for U.S. Appl. No. 16/586,002, dated Feb. 20, 2020, 15 pages.
Non-Final Office Action received for U.S. Appl. No. 16/723,583, dated Aug. 13, 2020, 13 pages.
Non-Final Office Action received for U.S. Appl. No. 14/841,455, dated Apr. 11, 2019, 13 pages.
Non-Final Office Action received for U.S. Appl. No. 14/846,511, dated Nov. 30, 2018, 22 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/433,320, dated May 2, 2019, 27 pages.
Non-Final Office Action received for U.S. Appl. No. 15/945,610, dated Sep. 20, 2018, 9 pages.
Non-Final Office Action received for U.S. Appl. No. 14/641,304, dated Sep. 11, 2017., 18 pages.
Notice of Acceptance received for Australian Patent Application No. 2015201884, dated Oct. 4, 2016, 3 pages.
Notice of Acceptance received for Australian Patent Application No. 2015267671, dated Apr. 4, 2018, 3 pages.
Notice of Acceptance received for Australian Patent Application No. 2016230001, dated May 25, 2018, 3 pages.
Notice of Acceptance received for Australian Patent Application No. 2017266867, dated Mar. 6, 2019, 3 pages.
Notice of Acceptance received for Australian Patent Application No. 2017284013, dated Aug. 26, 2020, 3 pages.
Notice of Acceptance received for Australian Patent Application No. 2018202751, dated Sep. 4, 2019, 3 pages.
Notice of Acceptance received for Australian Patent Application No. 2018220115, dated Jun. 29, 2020, 3 pages.
Notice of Acceptance received for Australian Patent Application No. 2018229544, dated May 4, 2020, 3 pages.
Notice of Acceptance received for Australian Patent Application No. 2019203473, dated Nov. 7, 2019, 3 pages.
Notice of Allowance Action received for U.S. Appl. No. 14/641,304, dated Sep. 9, 2020, 15 pages.
Notice of Allowance received for Chinese Patent Application No. 201280047459.6, dated Jan. 31, 2018, 2 pages (1 page of English Translation and 1 page of Official Copy).
Notice of Allowance received for Chinese Patent Application No. 201580028491.3, dated Mar. 29, 2019, 2 pages (1 page of English Translation and 1 page of Official Copy).
Notice of Allowance received for Chinese Patent Application No. 201580028505.1, dated Sep. 19, 2019, 2 pages (1 page of English Translation and 1 page of Official Copy).
Notice of Allowance received for Chinese Patent Application No. 201620051290.7, dated Jun. 22, 2016, 2 pages (Official Copy only) (See Communication under 37 CFR § 1.98(a) (3)).
Notice of Allowance received for Chinese Patent Application No. 201680011682.3, dated Aug. 5, 2020, 2 pages (1 page of English Translation and 1 page of Official Copy).
Notice of Allowance received for Chinese Patent Application No. 201780002398.4, dated Jun. 17, 2019, 2 pages (1 page of English Translation and 1 page of Official Copy).
Notice of Allowance received for Chinese Patent Application No. 201810338038.8, dated Jun. 30, 2020, 2 pages (1 page of English Translation and 1 page of Official Copy).
Notice of Allowance received for Chinese Patent Application No. 201520364847.8, dated Nov. 5, 2015, 9 pages (7 page of English Translation and 2 pages of Official Copy).
Notice of Allowance received for Japanese Patent Application No. 2015-095183, dated Apr. 21, 2017, 3 pages. (Official Copy Only) (See Communication under 37 CFR § 1.98(a) (3)).
Notice of Allowance received for Japanese Patent Application No. 2016-569669, dated Mar. 19, 2018, 4 pages (1 page of English translation and 3 pages of Official Copy).
Notice of Allowance received for Japanese Patent Application No. 2017-101107, dated Jun. 3, 2019, 5 pages (1 page of English Translation and 4 pages of Official Copy).
Notice of Allowance received for Japanese Patent Application No. 2017-543762, dated Mar. 30, 2020, 4 pages (1 page of English Translation and 3 pages of Official Copy).
Notice of Allowance received for Japanese Patent Application No. 2018-560107, dated Dec. 6, 2019, 4 pages (1 page of English Translation and 3 pages of Official Copy).
Notice of Allowance received for Korean Patent Application No. 10-2015-0072162, dated Dec. 27, 2017, 4 pages (2 pages of English Translation and 2 pages of Official copy).
Notice of Allowance received for Korean Patent Application No. 10-2016-7032902, dated Sep. 7, 2018, 3 pages (1 page of English Translation and 2 pages of Official Copy).
Notice of Allowance received for Korean Patent Application No. 10-2016-7035555, dated Sep. 23, 2019, 3 pages (1 page of English Translation and 2 pages of Official Copy).
Notice of Allowance received for Korean Patent Application No. 10-2017-7012145, dated Oct. 30, 2019, 3 pages (1 page of English Translation and 2 pages of Official Copy).
Notice of Allowance received for Korean Patent Application No. 10-2017-7022905, dated Jul. 31, 2019, 4 pages (2 pages of English Translation and 2 pages of Official Copy).
Notice of Allowance received for Korean Patent Application No. 10-2018-0035949, dated Nov. 28, 2019, 3 pages (1 page of English Translation and 2 pages of Official Copy).
Notice of Allowance received for Korean Patent Application No. 10-2018-7033301, dated Feb. 20, 2019, 5 pages (2 pages of English Translation and 3 pages of Official Copy).
Notice of Allowance received for Korean Patent Application No. 10-2019-7014494, dated Mar. 19, 2020, 4 pages (1 page of English Translation and 3 pages of Official Copy).
Notice of Allowance received for Korean Patent Application No. 10-2014-7008348, dated Feb. 21, 2019, 5 pages (2 pages of English Translation and 3 pages of Official Copy).
Notice of Allowance received for Taiwanese Patent Application No. 102120412, dated Oct. 28, 2015, 5 pages (2 pages of English Translation and 3 pages of Official copy).
Notice of Allowance received for Taiwanese Patent Application No. 104108223, dated Jan. 10, 2017, 3 pages (Official Copy Only) (See Communication under 37 CFR § 1.98(a) (3)).
Notice of Allowance received for Taiwanese Patent Application No. 104114953, dated Oct. 17, 2017, 3 pages (Official Copy only) (See Communication under 37 CFR § 1.98(a) (3)).

(56) References Cited

OTHER PUBLICATIONS

Notice of Allowance Received for Taiwanese Patent Application No. 104117041, dated Feb. 24, 2017, 3 pages. (Official Copy Only) (See Communication under 37 CFR § 1.98(a) (3)).
Notice of Allowance received for Taiwanese Patent Application No. 104128519, dated Nov. 20, 2017, 5 pages (2 page of English Translation and 3 pages of Official Copy).
Notice of Allowance received for Taiwanese Patent Application No. 104134740, dated Dec. 8, 2016, 5 pages (1 page of English Translation and 4 pages of Official Copy).
Notice of Allowance received for Taiwanese Patent Application No. 106144804, dated Jun. 27, 2018, 6 pages (2 pages of English Translation and 4 pages of Official copy).
Notice of Allowance received for Taiwanese Patent Application No. 104117042, dated Nov. 17, 2017, 5 pages (2 Pages of English Translation and 3 Pages of Official Copy).
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 13/492,057, dated Jan. 3, 2017, 5 pages.
Notice of Allowance received for U.S. Appl. No. 13/492,057, dated May 18, 2017, 3 pages.
Notice of Allowance received for U.S. Appl. No. 14/285,378, dated May 19, 2016, 10 pages.
Notice of Allowance received for U.S. Appl. No. 14/503,327, dated Mar. 22, 2018, 5 pages.
Notice of Allowance received for U.S. Appl. No. 14/503,327, dated Nov. 30, 2017, 5 pages.
Notice of Allowance received for U.S. Appl. No. 14/641,289, dated Aug. 24, 2017, 6 Pages.
Notice of Allowance received for U.S. Appl. No. 14/641,289, dated Dec. 12, 2017, 5 pages.
Notice of Allowance received for U.S. Appl. No. 14/642,366, dated Jan. 14, 2016, 8 pages.
Notice of Allowance received for U.S. Appl. No. 14/719,217, dated Feb. 13, 2019, 13 pages.
Notice of Allowance received for U.S. Appl. No. 14/841,608, dated Nov. 14, 2017, 5 pages.
Notice of Allowance received for U.S. Appl. No. 14/841,614, dated Oct. 24, 2018, 10 pages.
Notice of Allowance received for U.S. Appl. No. 14/841,623, dated Feb. 23, 2018, 8 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/845,794, dated Feb. 14, 2019, 6 pages.
Notice of Allowance received for U.S. Appl. No. 15/945,610, dated May 20, 2019, 7 pages.
Notice of Allowance received for U.S. Appl. No. 15/952,736, dated Sep. 11, 2018, 16 pages.
Notice of Allowance received for U.S. Appl. No. 16/131,767, dated Sep. 6, 2019, 7 pages.
Notice of Allowance received for U.S. Appl. No. 16/229,959, dated Dec. 4, 2019, 6 pages.
Notice of Allowance received for U.S. Appl. No. 16/259,954, dated May 7, 2020, 9 pages.
Notice of Allowance received for U.S. Appl. No. 16/434,865, dated Apr. 7, 2020, 5 pages.
Notice of Allowance received for U.S. Appl. No. 16/584,743, dated Aug. 7, 2020, 8 pages.
Notice of Allowance received for U.S. Appl. No. 16/586,002, dated Jun. 9, 2020, 5 pages.
Notice of Allowance received for U.S. Appl. No. 14/841,455, dated Oct. 22, 2019, 10 pages.
Office Action received for Australian Patent Application No. 2015201884, dated Oct. 12, 2015, 4 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Australian Patent Application No. 2015267671, dated Apr. 5, 2017, 2 pages.
Office Action received for Australian Patent Application No. 2015302298, dated Apr. 4, 2018, 3 pages.
Office Action received for Australian Patent Application No. 2015302298, dated Jul. 20, 2018, 3 pages.
Office Action received for Australian Patent Application No. 2015302298, dated Sep. 14, 2017, 3 pages.
Office Action received for Australian Patent Application No. 2015302298, dated Sep. 4, 2018, 5 pages.
Office Action received for Australian Patent Application No. 2016230001, dated Feb. 7, 2018, 3 pages.
Office Action received for Australian Patent Application No. 2016266010, dated Aug. 23, 2018, 4 pages.
Office Action received for Australian Patent Application No. 2016266010, dated May 4, 2018, 4 pages.
Office Action received for Australian Patent Application No. 2016266010, dated Nov. 28, 2018, 5 pages.
Office Action received for Australian Patent Application No. 2016266010, dated Nov. 30, 2017, 5 pages.
Office Action received for Australian Patent Application No. 2017100553, dated Aug. 4, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017266867, dated Dec. 6, 2018, 3 pages.
Office Action received for Australian Patent Application No. 2017284013, dated Mar. 19, 2020, 3 pages.
Office Action received for Australian Patent Application No. 2018101014, dated Jan. 18, 2019, 5 pages.
Office Action received for Australian Patent Application No. 2018101014, dated Sep. 19, 2018, 4 pages.
Office Action received for Australian Patent Application No. 2018202751, dated Apr. 2, 2019, 4 pages.
Office Action received for Australian Patent Application No. 2018220115, dated Apr. 21, 2020, 3 pages.
Office Action received for Australian Patent Application No. 2018220115, dated Oct. 4, 2019, 3 pages.
Office Action received for Australian Patent Application No. 2018229544, dated Nov. 15, 2019, 4 pages.
Office Action received for Australian Patent Application No. 2018271366, dated Feb. 25, 2020, 5 pages.
Office Action received for Australian Patent Application No. 2019203473, dated Oct. 25, 2019, 2 pages.
Office Action received for Chinese Patent Application No. 201510288981.9, dated Jul. 1, 2019, 16 pages (8 pages of English Translation and 8 pages of Official Copy).
Office Action received for Chinese Patent Application No. 201510288981.9, dated Jul. 3, 2018, 19 pages (8 pages of English Translation and 11 pages of official copy).
Office Action received for Chinese Patent Application No. 201510288981.9, dated Mar. 6, 2019, 20 pages (10 pages of English Translation and 10 pages of Official Copy).
Office Action received for Chinese Patent Application No. 201580028491.3, dated Oct. 8, 2018, 9 pages (3 pages of English Translation and 6 pages of Official Copy).
Office Action received for Chinese Patent Application No. 201580028505.1, dated Jan. 16, 2019, 15 pages (5 pages of English Translation and 10 pages of Official Copy).

(56) References Cited

OTHER PUBLICATIONS

Office Action received for Chinese Patent Application No. 201580028505.1, dated Jun. 20, 2019, 7 pages (3 pages of English Translation and 4 pages of Official Copy).
Office Action received for Chinese Patent Application No. 201580043701.6, dated Dec. 24, 2018, 20 pages (5 pages of English Translation and 15 pages of Official copy).
Office Action received for Chinese Patent Application No. 201580043701.6, dated Nov. 4, 2019, 20 pages (6 pages of English Translation and 14 pages of Official Copy).
Office Action received for Chinese Patent Application No. 201580046788.2, dated Apr. 15, 2019, 13 pages (6 pages of English Translation and 7 pages of Official Copy).
Office Action received for Chinese Patent Application No. 201580046788.2, dated Feb. 25, 2020, 14 pages (7 pages of English Translation and 7 pages of Official Copy).
Office Action received for Chinese Patent Application No. 201680011682.3, dated Dec. 2, 2019, 14 pages (7 pages of English Translation and 7 pages of Official Copy).
Office Action received for Chinese Patent Application No. 201711292804.3, dated Aug. 5, 2020, 26 pages (16 pages of English Translation and 10 pages of Official Copy).
Office Action received for Chinese Patent Application No. 201780002398.4, dated Feb. 27, 2019, 6 pages (3 pages of English Translation and 3 pages of Official Copy).
Office Action received for Chinese Patent Application No. 201780002398.4, dated Sep. 12, 2018, 17 pages (5 pages of English Translation and 12 pages of Official Copy).
Office Action received for Chinese Patent Application No. 201810338038.8, dated Jan. 21, 2020, 26 pages (13 pages of English Translation and 13 pages of Official Copy).
Office Action received for Chinese Patent Application No. 201810338038.8, dated May 14, 2019, 26 pages (13 pages of English Translation and 13 pages of Official Copy).
Office Action received for Chinese Patent Application No. 201810338826.7, dated Apr. 3, 2019, 21 pages (13 pages of English Translation and 8 pages of Official Copy).
Office Action received for Chinese Patent Application No. 201810338826.7, dated Jan. 16, 2020, 16 pages (10 pages of English Translation and 6 pages of Official Copy).
Office Action received for Chinese Patent Application No. 201810338826.7, dated Oct. 21, 2019, 19 pages (12 pages of English Translation and 7 pages of Official Copy).
Office Action received for Chinese Patent Application No. 201811460172.1, dated Jan. 21, 2020, 17 pages (8 pages of English Translation and 9 pages of Official Copy).
Office Action received for Chinese Patent Application No. 201910475434.X, dated Dec. 4, 2019, 14 pages (8 pages of English Translation and 6 pages of Official Copy).
Office Action received for Chinese Patent Application No. 201910475434.X, dated Jun. 3, 2020, 9 pages (5 pages of English Translation and 4 pages of Official Copy).
Office Action received for Danish Patent Application No. PA201570256, dated Jul. 7, 2015, 2 pages.
Office Action received for Danish Patent Application No. PA201570256, dated Mar. 17, 2016, 5 pages.
Office Action received for Danish Patent Application No. PA201570256, dated May 23, 2017, 3 pages.
Office Action received for Danish Patent Application No. PA201570256, dated Oct. 10, 2016, 3 pages.
Office Action Received for Danish Patent Application No. PA201570768, dated Sep. 13, 2016, 8 pages.
Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action Received for Danish Patent Application No. PA201670622, dated Aug. 17, 2018, 4 pages.
Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 13171047.7, dated May 24, 2017, 7 pages.
Office Action received for European Patent Application No. 15711969.4, dated Nov. 17, 2017, 9 pages.
Office Action received for European Patent Application No. 15713062.6, dated Dec. 6, 2017, 7 pages.
Office Action received for European Patent Application No. 15719347.5, dated Apr. 9, 2020, 4 pages.
Office Action received for European Patent Application No. 15719347.5, dated Jun. 17, 2019, 4 pages.
Office Action received for European Patent Application No. 15760008.1, dated Jul. 16, 2019, 9 pages.
Office Action received for European Patent Application No. 16710590.7, dated Mar. 15, 2019, 10 pages.
Office Action received for European Patent Application No. 18178147.7, dated Mar. 20, 2020, 4 pages.
Office Action received for European Patent Application No. 18208881.5, dated Jun. 11, 2019, 5 pages.
Office Action received for European Patent Application No. 19150528.8, dated Jul. 1, 2020, 6 pages.
Office Action received for German Patent Application No. 102015208532.5, dated Apr. 1, 2019, 20 pages (10 pages of English Translation and 10 pages of Official Copy).
Office Action received for German Patent Application No. 102015208532.5, dated Apr. 21, 2020, 3 pages (1 page of English Translation and 2 pages of Official Copy).
Office Action received for German Patent Application No. 102015208532.5, dated Aug. 21, 2019, 15 pages (5 pages of English Translation and 10 pages of Official Copy).
Office Action received for Hong Kong Patent Application No. 151051633, dated Jun. 5, 2015, 11 pages (Official Copy Only) (See Communication under 37 CFR § 1.98(a) (3)).
Office Action received for Japanese Patent Application No. 2015095183, dated Jun. 3, 2016, 13 pages (6 pages of English Translation and 7 pages of Official copy).
Office Action received for Japanese Patent Application No. 2017-075031, dated Jul. 30, 2018, 16 pages (8 pages of English Translation and 8 pages of Official Copy).
Office Action received for Japanese Patent Application No. 2017-101107, dated Sep. 7, 2018, 14 pages (7 pages of English Translation and 7 pages of Official Copy).
Office Action received for Japanese Patent Application No. 2017-507413, dated Feb. 22, 2019, 11 pages (5 pages of English Translation and 6 pages of Official Copy).
Office Action received for Japanese Patent Application No. 2017-507413, dated Jul. 22, 2019, 4 pages (1 page of English Translation and 3 pages of Official Copy).
Office Action received for Japanese Patent Application No. 2017-507413, dated May 25, 2018, 14 pages (7 pages of English Translation and 7 pages of Official Copy).
Office Action received for Japanese Patent Application No. 2017-543762, dated Apr. 8, 2019, 5 pages (2 pages of English Translation and 3 pages of Official copy).

(56) References Cited

OTHER PUBLICATIONS

Office Action received for Japanese Patent Application No. 2017-543762, dated Jul. 9, 2018, 8 pages (4 pages of English Translation and 4 pages of Official Copy).
Office Action received for Japanese Patent Application No. 2018-080122, dated Aug. 9, 2019, 5 pages (2 pages of English Translation and 3 pages of Official Copy).
Office Action received for Japanese Patent Application No. 2018-080122, dated Jan. 28, 2019, 11 pages (6 pages of English Translation and 5 pages of Official Copy).
Office Action received for Japanese Patent Application No. 2018-560107, dated Jun. 14, 2019, 26 pages (13 pages of English Translation and 13 pages of Official Copy).
Office Action received for Japanese Patent Application No. 2019-238894, dated Mar. 6, 2020, 7 pages (3 pages of English Translation and 4 pages of Official Copy).
Office Action received for Korean Patent Application No. 10-2014-7008348, dated Jan. 22, 2019, 16 pages (1 page of English Translation and 15 pages of Official Copy).
Office Action received for Korean Patent Application No. 10-2015-0072162, dated Apr. 20, 2016, 11 pages (6 pages of English Translation and 5 pages of Official Copy).
Office Action received for Korean Patent Application No. 10-2015-0072162, dated Feb. 27, 2017., 12 pages (6 pages of English Translation and 6 pages of Official Copy).
Office Action received for Korean Patent Application No. 10-2016-7035555, dated Dec. 26, 2017, 5 pages (2 pages of English Translation and 3 pages of Official Copy).
Office Action received for Korean Patent Application No. 10-2016-7035555, dated Jul. 18, 2019, 9 pages (4 pages of English Translation and 5 pages of Official Copy).
Office Action received for Korean Patent Application No. 10-2016-7035555, dated Sep. 18, 2018, 9 pages (4 pages of English Translation and 5 pages of Official Copy).
Office Action received for Korean Patent Application No. 10-2017-7012145, dated Jul. 18, 2019, 5 pages (2 pages of English Translation and 3 pages of Official Copy).
Office Action received for Korean Patent Application No. 10-2017-7012145, dated Sep. 13, 2018, 6 pages (3 pages of English Translation and 3 pages of Official Copy).
Office Action received for Korean Patent Application No. 10-2017-7022905, dated Oct. 22, 2018, 9 pages (4 pages of English Translation and 5 pages of official copy).
Office Action received for Korean Patent Application No. 10-2018-0035949, dated Apr. 24, 2019, 9 pages (4 pages of English Translation and 5 pages of Official Copy).
Office Action received for Korean Patent Application No. 10-2018-0035949, dated Dec. 24, 2018, 7 pages (3 pages of English Translation and 4 pages of Official Copy).
Office Action received for Korean Patent Application No. 10-2018-0035949, dated Jun. 20, 2018, 9 pages (4 pages of English Translation and 5 pages of Official Copy).
Office Action received for Korean Patent Application No. 10-2018-7033301, dated Dec. 14, 2018, 6 pages (2 pages of English Translation and 4 pages of Official Copy).
Office Action received for Korean Patent Application No. 10-2018-7035747, dated Apr. 9, 2020, 11 pages (5 pages of English Translation and 6 pages of Official Copy).
Office Action received for Korean Patent Application No. 10-2019-7014494, dated Jun. 14, 2019, 11 pages (5 pages of English Translation and 6 pages of Official Copy).
Office Action received for Korean Patent Application No. 10-2020-0024632, dated May 18, 2020, 11 pages (5 pages of English Translation and 6 pages of Official Copy).
Office Action received for Korean Patent Application No. 10-2020-7002929, dated Mar. 22, 2020, 5 pages (2 pages of English Translation and 3 pages of Official Copy).
Office Action received for Taiwanese Patent Application No. 102120412, dated Feb. 25, 2015, 15 pages (6 pages of English Translation and 9 pages of Official Copy).
Office Action received for Taiwanese Patent Application No. 104108223, dated Apr. 25, 2016, 10 pages (5 pages of English Translation and 5 pages of Official copy).
Office Action received for Taiwanese Patent Application No. 104114953, dated Feb. 18, 2017, 9 pages (4 pages of English Translation and 5 pages of Official copy).
Office Action received for Taiwanese Patent Application No. 104114953, dated Jun. 8, 2016, 11 pages (5 pages of English Translation and 6 pages of Official copy).
Office Action Received for Taiwanese Patent Application No. 104117041, dated Aug. 22, 2016, 6 pages (3 pages of English Translation and 3 pages of Official Copy).
Office Action received for Taiwanese Patent Application No. 104117042, dated Apr. 20, 2017, 18 pages (7 pages of English Translation and 11 pages of Official Copy).
Office Action received for Taiwanese Patent Application No. 104128519, dated Mar. 29, 2017., 16 pages (7 pages of English Translation and 9 pages of Official Copy).
Online Alarm Clock, https://web.archive.org/web/20150505081746/http://www.online-stopwatch.com/online-alarm-clock, May 5, 2015, 2 pages.
Q Pair, online available at: http://mongri.net/entry/G-Pad-83-Qpair, Retrieved on Mar. 6, 2017, Dec. 20, 2013, 22 pages (10 pages of English translation and 12 pages of Official Copy).
Q Pair, Posting of a blog, Online Available at: <http://www.leaderyou.co.kr/2595>, Dec. 7, 2013, 41 pages (23 page of English Translation and 18 pages of Official Copy).
Samsung,"SM-G900F User Manual", English (EU). Rev.1.0, Mar. 2014, 249 pages.
Search Report received for Danish Patent Application No. 201570768, dated Mar. 17, 2016, 11 pages.
Search Report received for Netherlands Patent Application No. 2014737, dated Oct. 29, 2015, 9 pages.
Shankland Stephen, "Chrome OS Gets 'Ok Google' Voice Search Control", available online at <http://www.cnet.com/news/chrome-os-gets-ok-google-voice-search-control/>, May 21, 2014, 4 pages.
Smith Eddie, "The expert's guide to Instapaper", available online at "http://www.macworld.com/article/1166898/the_experts_guide_to_instapaper.html", May 23, 2012, 8 pages.
Summons to Attend Oral Proceedings received for European Patent Application No. 12770400.5, mailed on Mar. 19, 2018, 10 pages.
Summons to Attend Oral Proceedings received for European Patent Application No. 13171047.7, mailed on Jul. 9, 2018, 12 pages.
Summons to Attend Oral Proceedings received for European Patent Application No. 15711969.4, mailed on Oct. 22, 2018, 12 pages.
Supplemental Notice of Allowance received for U.S. Appl. No. 14/841,608, dated Jan. 25, 2018, 2 pages.
The Simple Alarm app for Pebble, available online at <https://web.archive.org/web/20150517070400>/http://www.rebootsramblings.ca/n/sahhelp/https://www.youtube.com/watch?v=IVp1scQPw08, May 17, 2015, 1 page.
Vanhemert Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.
Wikipedia,"QR code", Available online at: https://en.wikipedia.org/w/index.php?title=OR_code&oldid=452939488, Sep. 28, 2011, pp. 1-9.
Feng, Lipeng, "Bound for computer lovers", Dec. 31, 2009, 2 pages (Official Copy Only) (See Communication under 37 CFR § 1.98(a) (3)).
Notice of Allowance received for U.S. Appl. No. 15/730,610, dated Oct. 21, 2020, 29 pages.
Office Action received for Australian Patent Application No. 2018271366, dated Oct. 26, 2020, 5 pages.
Office Action received for Australian Patent Application No. 2019268111, dated Oct. 27, 2020, 7 pages.
Office Action received for Chinese Patent Application No. 201910164962.3, dated Sep. 18, 2020, 19 pages (6 pages of English Translation and 13 pages of Official Copy).
Office Action received for European Patent Application No. 17799904.2, dated Oct. 21, 2020, 6 pages.

(56) References Cited

OTHER PUBLICATIONS

Office Action received for Japanese Patent Application No. 2019-124728, dated Sep. 18, 2020, 6 pages (3 pages of English Translation and 3 pages of Official Copy).
Office Action received for Korean Patent Application No. 10-2018-7035747, dated Oct. 14, 2020, 6 pages (3 pages of English Translation and 3 pages of Official Copy).
Rev. Some Culture, "It's super easy for middle-aged and elderly people to learn compute", Jul. 31, 2013, 2 pages (Official Copy Only) (See Communication under 37 CFR § 1.98(a) (3)).
WZ Science Alliance, "Very simple geriatrics computer and Internet bestselling upgrade", Sep. 30, 2013, 3 pages (Official Copy Only) (See Communication under 37 CFR § 1.98(a) (3)).
International Search Report and Written Opinion received for PCT Patent Application No. PCT/US2020/035488, dated Nov. 17, 2020, 21 pages.
Applicant-Initiated Interview Summary received for U.S. Appl. No. 16/670,949, dated Apr. 6, 2021, 2 pages.
Board Opinion received for Chinese Patent Application No. 201580046339.8, dated Mar. 19, 2021, 11 pages (3 pages of English Translation and 8 pages of Official Copy).
Corrected Notice of Allowance received for U.S. Appl. No. 15/910,263, dated Mar. 17, 2021, 3 pages.
Corrected Notice of Allowance received for U.S. Appl. No. 15/910,263, dated Mar. 18, 2021, 3 pages.
Corrected Notice of Allowance received for U.S. Appl. No. 16/583,981, dated Apr. 6, 2021, 3 pages.
Decision to Grant received for Japanese Patent Application No. 2019-124728, dated Apr. 2, 2021, 4 pages (1 page of English Translation and 3 pages of Official Copy).
Examiner's Answer to Appeal Brief received for U.S. Appl. No. 14/641,298, dated Mar. 22, 2021, 19 pages.
Non-Final Office Action received for U.S. Appl. No. 16/836,571, dated Mar. 25, 2021, 28 pages.
Notice of Allowance received for Chinese Patent Application No. 201811539260.0, dated Mar. 15, 2021, 2 pages (1 page of English Translation and 1 page of Official Copy).
Notice of Allowance received for Chinese Patent Application No. 201910475434.X, dated Mar. 10, 2021, 2 pages (1 page of English Translation and 1 page of Official Copy).
Notice of Allowance received for Korean Patent Application No. 10-2020-7031319, dated Apr. 6, 2021, 5 pages (2 pages of English Translation and 3 pages of Official Copy).
Notice of Allowance received for Korean Patent Application No. 10-2021-7005691, dated Mar. 29, 2021, 3 pages (1 page of English Translation and 2 pages of Official Copy).
Notice of Allowance received for U.S. Appl. No. 16/702,968, dated Apr. 21, 2021, 20 pages.
Notice of Allowance received for U.S. Appl. No. 15/433,320, dated Apr. 1, 2021, 19 pages.
Notice of Allowance received for U.S. Appl. No. 16/422,736, dated Apr. 20, 2021, 12 pages.
Notice of Allowance received for U.S. Appl. No. 16/583,981, dated Mar. 26, 2021, 10 pages.
Notice of Allowance received for U.S. Appl. No. 16/583,989, dated Apr. 1, 2021, 5 pages.
Notice of Allowance received for U.S. Appl. No. 16/584,490, dated Mar. 26, 2021, 13 pages.
Office Action received for Australian Patent Application No. 2021201403, dated Mar. 16, 2021, 3 pages.
Office Action received for Chinese Patent Application No. 201711292804.3, dated Feb. 23, 2021, 17 pages (8 pages of English Translation and 9 pages of Official Copy).
Office Action received for Chinese Patent Application No. 202010125114.4, dated Mar. 1, 2021, 15 pages (9 pages of English Translation and 6 pages of Official Copy).
Office Action received for European Patent Application No. 17813737.8, dated Apr. 16, 2021, 7 pages.
Punchkick Interactive, "Punchkick hands-on review: Fitbit Surge", URL: https://www.youtube.com/watch?v=K2G7aebUYcA, Mar. 25, 2015, 3 pages.
Supplemental Notice of Allowance received for U.S. Appl. No. 16/584,490, dated Apr. 13, 2021, 2 pages.
Advisory Action received for U.S. Appl. No. 16/422,736, mailed on Mar. 12, 2021, 3 pages.
Applicant Initiated Interview Summary received for U.S. Appl. No. 16/583,994, mailed on Apr. 3, 2020, 5 pages.
Applicant-Initiated Interview Summary received for U.S. Appl. No. 15/433,320, dated Nov. 25, 2020, 4 pages.
Applicant-Initiated Interview Summary received for U.S. Appl. No. 16/263,280, dated Nov. 25, 2020, 3 pages.
Applicant-Initiated Interview Summary received for U.S. Appl. No. 16/422,736, dated Feb. 24, 2021, 3 pages.
Applicant-Initiated Interview Summary received for U.S. Appl. No. 16/583,981, dated Mar. 9, 2020, 5 pages.
Applicant-Initiated Interview Summary received for U.S. Appl. No. 16/583,981, dated Sep. 14, 2020, 6 pages.
Applicant-Initiated Interview Summary received for U.S. Appl. No. 16/583,994, dated Nov. 24, 2020, 4 pages.
Applicant-Initiated Interview Summary received for U.S. Appl. No. 16/723,583, dated Dec. 28, 2020, 6 pages.
Applicant-Initiated Interview Summary received for U.S. Appl. No. 16/803,849, dated Dec. 21, 2020, 5 pages.
Applicant-Initiated Interview Summary received for U.S. Appl. No. 16/807,604, dated Dec. 21, 2020, 7 pages.
Applicant-Initiated Interview Summary received for U.S. Appl. No. 17/031,833, dated Dec. 21, 2020, 5 pages.
Board Opinion received for Chinese Patent Application No. 201510288981.9, dated Jan. 4, 2021, 21 pages (9 pages of English Translation and 12 pages of Official Copy).
Brief Communication Regarding Oral Proceedings received for European Patent Application No. 18197583.0, dated Feb. 18, 2021, 2 pages.
Corrected Notice of Allowance received for U.S. Appl. No. 15/730,610, dated Nov. 27, 2020, 3 pages.
Corrected Notice of Allowance received for U.S. Appl. No. 15/910,263, dated Feb. 10, 2021, 3 pages.
Corrected Notice of Allowance received for U.S. Appl. No. 16/584,743, dated Dec. 30, 2020, 3 pages.
Decision on Appeal received for U.S. Appl. No. 15/128,952, dated Dec. 28, 2020, 23 pages.
Final Office Action received for U.S. Appl. No. 16/263,280, dated Mar. 4, 2021, 13 pages.
Final Office Action received for U.S. Appl. No. 16/422,736, dated Jan. 11, 2021, 39 pages.
Final Office Action received for U.S. Appl. No. 16/583,981, dated Apr. 16, 2020, 19 pages.
Final Office Action received for U.S. Appl. No. 16/583,994, dated Jul. 23, 2020, 16 pages.
Final Office Action received for U.S. Appl. No. 16/723,583, dated Feb. 5, 2021, 15 pages.
Final Office Action received for U.S. Appl. No. 17/031,833, dated Jan. 26, 2021, 17 pages.
Hein Buster, "iOS 5 Allows Users to Delete Music Directly From iPhone/iPad", Online available at: https://www.cultofmac.com/99990/ios-5-allows-users-to-delete-music-directly- from-iphoneipad/, Jun. 9, 2011, 7 pages.
Intention to Grant received for European Patent Application No. 15719347.5, dated Dec. 8, 2020, 7 pages.
Intention to Grant received for European Patent Application No. 18197589.7, dated Jan. 21, 2021, 8 pages.
International Search Report and Written Opinion received for PCT Patent Application No. PCT/US2020/026044, dated Sep. 9, 2020, 26 pages.
International Search Report and Written Opinion received for PCT Patent Application No. PCT/US2020/035446, dated Nov. 10, 2020, 20 pages.
Invitation to Pay Additional Fees received for PCT Patent Application No. PCT/US2020/026044, dated Jun. 25, 2020, 12 pages.
Invitation to Pay Additional Fees received for PCT Patent Application No. PCT/US2020/035446, dated Sep. 11, 2020, 12 pages.

(56) References Cited

OTHER PUBLICATIONS

Invitation to Pay Search Fees received for European Patent Application No. 20719301.2, datedn Dec. 17, 2020, 5 pages.
LG G Pad 8.3 Tablet Q Remote User, Available at: - <https://mushroomprincess.tistory.com/1320>, Dec. 26, 2013, 37 pages (20 pages of English Translation and 17 pages of Official Copy).
Minutes of the Oral Proceedings received for European Patent Application No. 18197583.0, dated Mar. 9, 2021, 6 pages.
Nbc News, "Nbc News - YouTube Democratic Debate (full)", Online available at: - https://www.youtube.com/watch?v=ti2Nokoq1J4, Jan. 17, 2016, 1 page.
Non-Final Office Action received for U.S. Appl. No. 16/583,981, dated Dec. 6, 2019, 14 pages.
Non-Final Office Action received for U.S. Appl. No. 16/583,994, dated Dec. 23, 2020, 17 pages.
Non-Final Office Action received for U.S. Appl. No. 16/583,994, dated Dec. 30, 2019, 14 pages.
Non-Final Office Action received for U.S. Appl. No. 16/670,949, dated Dec. 9, 2020, 11 pages.
Non-Final Office Action received for U.S. Appl. No. 17/031,833, dated Dec. 7, 2020, 13 pages.
Notice of Acceptance received for Australian Patent Application No. 2019268111, dated Feb. 18, 2021, 3 pages.
Notice of Allowance received for Chinese Patent Application No. 201811460172.1, dated Jan. 11, 2021, 2 pages (1 page of English Translation and 1 page of Official Copy).
Notice of Allowance received for Korean Patent Application No. 10-2018-7035747, dated Dec. 9, 2020, 5 pages (2 pages of English Translation and 3 pages of Official Copy).
Notice of Allowance received for Korean Patent Application No. 10-2020-7002929, dated Nov. 26, 2020, 3 pages (1 page of English Translation and 2 pages of Official Copy).
Notice of Allowance received for U.S. Appl. No. 15/910,263, dated Feb. 18, 2021, 3 pages.
Notice of Allowance received for U.S. Appl. No. 15/910,263, dated Jan. 22, 2021, 33 pages.
Notice of Allowance received for U.S. Appl. No. 16/583,989, dated Dec. 24, 2020, 7 pages.
Office Action received for Australian Patent Application No. 2018271366, dated Jan. 19, 2021, 5 pages.
Office Action received for Australian Patent Application No. 2020257092, dated Mar. 3, 2021, 7 pages.
Office Action received for Australian Patent Application No. 2020257092, dated Nov. 30, 2020, 6 pages.
Office Action received for Chinese Patent Application No. 201811460172.1, dated Oct. 14, 2020, 7 pages (4 pages of English Translation and 3 pages of Official Copy).
Office Action received for Chinese Patent Application No. 201811539260.0, dated Nov. 4, 2020, 9 pages (5 pages of English Translation and 4 pages of Official Copy).
Office Action received for Chinese Patent Application No. 201910164962.3, dated Jan. 12, 2021, 14 pages (7 pages of English Translation and 7 pages of Official Copy).
Office Action received for Chinese Patent Application No. 201910475434.X, dated Oct. 30, 2020, 9 pages (5 pages of English Translation and 4 pages of Official Copy).
Office Action received for Chinese Patent Application No. 201911128105.4, dated Jan. 4, 2021, 14 pages (7 pages of English Translation and 7 pages of Official Copy).
Office Action received for Danish Patent Application No. PA201970533, dated Jul. 17, 2020, 6 pages.
Office Action received for Danish Patent Application No. PA202070560, dated Dec. 11, 2020, 7 pages.
Office Action received for Danish Patent Application No. PA202070560, dated Mar. 10, 2021, 7 pages.
Office Action received for European Patent Application No. 18728002.9, dated Dec. 14, 2020, 15 pages.
Office Action received for European Patent Application No. 20719301.2, dated Jan. 28, 2021, 15 pages.
Office Action received for Japanese Patent Application No. 2018-080122, dated Nov. 27, 2020, 16 pages (8 pages of English Translation and 8 pages of Official Copy).
Office Action received for Japanese Patent Application No. 2019-124728, dated Dec. 14, 2020, 4 pages (2 pages of English Translation and 2 pages of Official Copy).
Office Action received for Korean Patent Application No. 10-2020-0024632, dated Dec. 29, 2020, 11 pages (5 pages of English Translation and 6 pages of Official Copy).
Office Action received for Korean Patent Application No. 10-2020-7031319, dated Dec. 8, 2020, 14 pages (6 pages of English Translation and 8 pages of Official Copy).
Result of Consultation received for European Patent Application No. 16710590.7, dated Dec. 7, 2020, 4 pages.
Result of Consultation received for European Patent Application No. 18197583.0, dated Feb. 24, 2021, 3 pages.
Result of Consultation received for European Patent Application No. 18197589.7, dated Dec. 1, 2020, 9 pages.
Result of Consultation received for European Patent Application No. 18197589.7, dated Dec. 17, 2020, 6 pages.
Search Report and Opinion received for Danish Patent Application No. PA201970533, dated Oct. 25, 2019, 9 pages.
Summons to Attend Oral Proceedings received for European Patent Application No. 15760008.1, dated Feb. 5, 2021, 11 pages.
Summons to Attend Oral Proceedings received for European Patent Application No. 19169980.0, dated Dec. 3, 2020, 8 pages.
Supplemental Notice of Allowance received for U.S. Appl. No. 16/584,743, dated Nov. 25, 2020, 2 pages.
Corrected Notice of Allowance received for U.S. Appl. No. 16/422,736, dated Jul. 9, 2021, 2 pages.
Corrected Notice of Allowance received for U.S. Appl. No. 16/702,968, dated Jun. 28, 2021, 4 pages.
Decision to Refuse received for European Patent Application No. 19169980.0, dated Jul. 15, 2021, 4 pages.
Extended European Search Report received for European Patent Application No. 21166718.3, dated Jul. 6, 2021, 11 pages.
Non-Final Office Action received for U.S. Appl. No. 17/062,891, dated Jul. 13, 2021, 12 pages.
Notice of Allowance received for Brazilian Patent Application No. BR112014003009-0, dated Jun. 15, 2021, 3 pages (1 page of English Translation and 2 pages of Official Copy).
Office Action received for Australian Patent Application No. 2020207785, dated Jul. 13, 2021, 3 pages.
Office Action received for Australian Patent Application No. 2020273355, dated Jul. 6, 2021, 3 pages.
Applicant-Initiated Interview Summary received for U.S. Appl. No. 17/031,833, dated May 24, 2021, 6 pages.
Board Decision received for Chinese Patent Application No. 201510288981.9, dated May 6, 2021, 31 pages (3 pages of English Translation and 28 pages of Official Copy).
Corrected Notice of Allowance received for U.S. Appl. No. 16/583,981, dated May 17, 2021, 3 pages.
Corrected Notice of Allowance received for U.S. Appl. No. 16/702,968, dated May 26, 2021, 4 pages.
Intention to Grant received for European Patent Application No. 15719347.5, dated May 11, 2021, 8 pages.
Non-Final Office Action received for U.S. Appl. No. 16/803,849, dated May 14, 2021, 34 pages.
Non-Final Office Action received for U.S. Appl. No. 16/987,003, dated May 10, 2021, 20 pages.
Notice of Allowance received for Japanese Patent Application No. 2018-080122, dated May 7, 2021, 28 pages (1 page of English Translation and 27 pages of Official Copy).
Notice of Hearing received for Indian Patent Application No. 717/CHENP/2014, dated May 5, 2021, 3 pages.
Office Action received for Chinese Patent Application No. 201911128105.4, dated Apr. 8, 2021, 10 pages (5 pages of English Translation and 5 pages of Official Copy).
Office Action received for European Patent Application No. 18208881.5, dated May 7, 2021, 6 pages.
Office Action received for European Patent Application No. 19207753.5, dated May 10, 2021, 4 pages.

(56) References Cited

OTHER PUBLICATIONS

Office Action received for European Patent Application No. 20158824.1, dated May 18, 2021, 10 pages.
Brief Communication Regarding Oral Proceedings received for European Patent Application No. 19169980.0, dated Jun. 17, 2021, 2 pages.
Androidcentral, "How do i respond to group messages from notification bar?", Available online at: https://forums.androidcentral.com/ask-question/952030-how-do-i- respond-group-messages-notification-bar.html, Mar. 25, 2019, 3 pages.
Corrected Notice of Allowance received for U.S. Appl. No. 16/702,968, dated Jun. 16, 2021, 4 pages.
Decision to Grant received for European Patent Application No. 18197589.7, dated Jun. 10, 2021, 2 pages.
Intention to Grant received for European Patent Application No. 15719347.5, dated Jun. 8, 2021, 7 pages.
Intention to Grant received for European Patent Application No. 16710590.7, dated Jun. 14, 2021, 8 pages.
Notice of Allowance received for U.S. Appl. No. 16/422,736, dated Jun. 15, 2021, 13 pages.
Notice of Allowance received for U.S. Appl. No. 17/031,833, dated Jun. 25, 2021, 15 pages.
Office Action received for Chinese Patent Application No. 201580043701.6, dated May 8, 2021, 10 pages (1 page of English Translation and 9 pages of Official Copy).
Rossignol Joe, "Ios 10 Concept Simplifies Lock Screen with Collapsed Notifications"; Available online at: https://www.macrumors.com/2016/06/16/ios-10-collapsed-notifications- concept/, Jun. 16, 2016, 10 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Corrected Notice of Allowance received for U.S. Appl. No. 16/807,604, dated Jul. 26, 2021, 3 pages.
Corrected Notice of Allowance received for U.S. Appl. No. 17/031,833, dated Aug. 2, 2021, 3 pages.
Extended European Search Report received for European Patent Application No. 21160991.2, dated Jul. 16, 2021, 14 pages.
Final Office Action received for U.S. Appl. No. 17/026,818, dated Jan. 29, 2021, 21 pages.
Intention to Grant received for European Patent Application No. 18197583.0, dated Jul. 23, 2021, 9 pages.
Non-Final Office Action received for U.S. Appl. No. 17/026,818, dated Nov. 25, 2020, 20 pages.
Non-Final Office Action received for U.S. Appl. No. 17/223,794, dated Jun. 16, 2021, 32 pages.
Notice of Allowance received for Korean Patent Application No. 10-2021-7020549, dated Jul. 13, 2021, 3 pages (1 page of English Translation and 2 pages of Official Copy).
Notice of Allowance received for U.S. Appl. No. 16/888,775, dated Jul. 26, 2021, 5 pages.
Notice of Allowance received for U.S. Appl. No. 17/026,818, dated May 13, 2021, 10 pages.
Search Report and Opinion received for Danish Patent Application No. PA202070617, dated Dec. 23, 2020, 8 pages.
Applicant-Initiated Interview Summary received for U.S. Appl. No. 16/263,280, dated Apr. 26, 2021, 2 pages.
Intention to Grant received for Danish Patent Application No. PA202070560, dated Apr. 26, 2021, 2 pages.
Notice of Allowance received for U.S. Appl. No. 16/807,604, dated Apr. 30, 2021, 25 pages.
Office Action received for Danish Patent Application No. PA201970533, dated Apr. 20, 2021, 2 pages.
Board Decision received for Chinese Patent Application No. 201580043701.6, dated Aug. 19, 2021, 2 pages (1 page of English Translation and 1 page of Official Copy).
Corrected Notice of Allowance received for U.S. Appl. No. 16/987,003, dated Sep. 1, 2021, 3 pages.
Non-Final Office Action received for U. S. U.S. Appl. No. 17/013,778, dated Aug. 20, 2021, 9 pages.
Office Action received for Korean Patent Application No. 10-2021-7021047, dated Aug. 13, 2021, 5 pages (2 pages of English Translation and 3 pages of Official Copy).
Sony, "Sony Smartwatch 3 SWR50", User Guide, Jul. 2014, 31 pages.
Applicant-Initiated Interview Summary received for U.S. Appl. No. 16/836,571, dated Jul. 7, 2021, 6 pages.
Board Decision received for Chinese Patent Application No. 201580046339.8, dated Jun. 22, 2021, 12 pages (1 page of English Translation and 11 pages of Official Copy).
Corrected Notice of Allowance received for U.S. Appl. No. 16/583,994, dated Jul. 6, 2021, 3 pages.
Corrected Notice of Allowance received for U.S. Appl. No. 16/807,604, dated Jun. 28, 2021, 3 pages.
Decision to Grant received for European Patent Application No. 15719347.5, dated Jun. 24, 2021, 2 pages.
Invitation to Pay Search Fees received for European Patent Application No. 18733381.0, dated Jun. 30, 2021, 4 pages.
Notice of Allowance received for U.S. Appl. No. 16/583,994, dated Jun. 24, 2021, 10 pages.
Office Action received for Chinese Patent Application No. 201810338040.5, dated Jun. 3, 2021, 25 pages (15 pages of English Translation and 10 pages of Official Copy).
Office Action received for Chinese Patent Application No. 201810339290.0, dated Jun. 4, 2021, 20 pages (11 pages of English Translation and 9 pages of Official Copy).
Office Action received for Chinese Patent Application No. 202010125114.4, dated Jun. 7, 2021, 7 pages (4 pages of English Translation and 3 pages of Official Copy).
Summons to Attend Oral Proceedings received for European Patent Application No. 18178147.7, dated Jun. 28, 2021, 8 pages.
Corrected Notice of Allowance received for U.S. Appl. No. 16/263,280, dated Aug. 5, 2021, 4 pages.
Notice of Allowance received for Japanese Patent Application No. 2020-558885, dated Jul. 26, 2021, 4 pages (1 page of English Translation and 3 pages of Official Copy).
Notice of Allowance received for Korean Patent Application No. 10-2020-0024632, dated Jul. 26, 2021, 3 pages (1 page of English Translation and 2 pages of Official Copy).
Notice of Allowance received for U.S. Appl. No. 16/987,003, dated Aug. 18, 2021, 9 pages.
Office Action received for Australian Patent Application No. 2021204454, dated Aug. 9, 2021, 7 pages.
Office Action received for Chinese Patent Application No. 201811367893.8, dated Jun. 21, 2021, 18 pages (8 pages of English Translation and 10 pages of Official Copy).
Applicant-Initiated Interview Summary received for U.S. Appl. No. 16/583,994, dated May 28, 2021, 5 pages.
Corrected Notice of Allowance received for U.S. Appl. No. 16/702,968, dated Jun. 8, 2021, 3 pages.
Corrected Notice of Allowance received for U.S. Appl. No. 16/702,968, dated May 28, 2021, 4 pages.
Corrected Notice of Allowance received for U.S. Appl. No. 16/807,604, dated May 28, 2021, 3 pages.
Notice of Allowance received for U.S. Appl. No. 16/263,280, dated Jun. 8, 2021, 8 pages.
Notice of Allowance received for U.S. Appl. No. 16/670,949, dated May 27, 2021, 7 pages.
Notice of Allowance received for U.S. Appl. No. 16/888,775, dated Jun. 3, 2021, 11 pages.
Office Action received for Chinese Patent Application No. 201580046788.2, dated Mar. 25, 2021, 9 pages (4 pages of English Translation and 5 pages of Official Copy).
Final Office Action received for U.S. Appl. No. 17/062,891, dated Jan. 3, 2022, 13 pages.
Notice of Acceptance received for Australian Patent Application No. 2020239711, dated Dec. 16, 2021, 3 pages.
Notice of Allowance received for Japanese Patent Application No. 2020-183773, dated Dec. 23, 2021, 4 pages (1 page of English Translation and 3 pages of Official Copy).

(56) References Cited

OTHER PUBLICATIONS

Office Action received for Australian Patent Application No. 2020285521, dated Dec. 20, 2021, 3 pages.
Summons to Attend Oral Proceedings received for European Patent Application No. 17799904.2, dated Dec. 20, 2021, 8 pages.
13 questions and answers about using Apple Pay online, Online available at: http://www.it528.com/apple/1356.html, Feb. 18, 2016, 5 pages (Official Copy Only). See Communication Under 37 CFR § 1.98(a) (3).
Applicant-Initiated Interview Summary received for U.S. Appl. No. 16/679,967, dated Oct. 25, 2021, 2 pages.
Applicant-Initiated Interview Summary received for U.S. Appl. No. 16/803,849, dated Oct. 12, 2021, 6 pages.
Applicant-Initiated Interview Summary received for U.S. Appl. No. 17/062,891, dated Nov. 22, 2021, 4 pages.
Applicant-Initiated Interview Summary received for U.S. Appl. No. 17/223,794, dated Sep. 7, 2021, 3 pages.
Board Opinion received for Chinese Patent Application No. 201910164962.3, dated Sep. 16, 2021, 16 pages (6 pages of English Translation and 10 pages of Official Copy).
Brief Communication Regarding Oral Proceedings received for European Patent Application No. 15760008.1, dated Sep. 13, 2021, 8 pages.
Corrected Notice of Allowance received for U.S. Appl. No. 14/641,298, dated Dec. 9, 2021, 5 pages.
Corrected Notice of Allowance received for U.S. Appl. No. 16/670,949, dated Sep. 8, 2021, 2 pages.
Corrected Notice of Allowance received for U.S. Appl. No. 16/807,604, dated Oct. 4, 2021, 5 pages.
Corrected Notice of Allowance received for U.S. Appl. No. 16/807,604, dated Oct. 14, 2021, 3 pages.
Corrected Notice of Allowance received for U.S. Appl. No. 16/807,604, dated Oct. 22, 2021, 3 pages.
Corrected Notice of Allowance received for U.S. Appl. No. 16/836,571, dated Dec. 6, 2021, 5 pages.
Corrected Notice of Allowance received for U.S. Appl. No. 16/836,571, dated Nov. 4, 2021, 4 pages.
Corrected Notice of Allowance received for U.S. Appl. No. 16/836,571, dated Nov. 18, 2021, 3 pages.
Corrected Notice of Allowance received for U.S. Appl. No. 16/836,571, dated Oct. 12, 2021, 4 pages.
Decision on Appeal received for U.S. Appl. No. 14/641,298, dated Nov. 1, 2021, 9 pages.
Decision to Grant received for Danish Patent Application No. PA202070560, dated Oct. 21, 2021, 2 pages.
Decision to Grant received for European Patent Application No. 16710590.7, dated Oct. 28, 2021, 2 pages.
Extended European Search Report received for European Patent Application No. 21197457.1, dated Nov. 15, 2021, 8 pages.
Final Office Action received for U.S. Appl. No. 16/679,967, dated Nov. 10, 2021, 14 pages.
Final Office Action received for U.S. Appl. No. 16/803,849, dated Nov. 02, 2021, 37 pages.
Intention to Grant received for Danish Patent Application No. PA202070617, dated Nov. 15, 2021, 2 pages.
Intention to Grant received for European Patent Application No. 15760008.1, dated Oct. 5, 2021, 11 pages.
Intention to Grant received for European Patent Application No. 19207753.5, dated Sep. 3, 2021, 8 pages.
International Preliminary Report on Patentability received for PCT Patent Application No. PCT/US2020/024390, dated Dec. 9, 2021, 20 pages.
International Preliminary Report on Patentability received for PCT Patent Application No. PCT/US2020/025526, dated Dec. 9, 2021, 13 pages.
International Preliminary Report on Patentability received for PCT Patent Application No. PCT/US2020/026044, dated Dec. 9, 2021, 18 pages.
International Preliminary Report on Patentability received for PCT Patent Application No. PCT/US2020/035446, dated Dec. 9, 2021, 14 pages.
International Search Report and Written Opinion received for PCT Patent Application No. PCT/US2021/031760, dated Sep. 16, 2021, 18 pages.
Minutes of the Oral Proceedings received for European Patent Application No. 15760008.1, dated Sep. 21, 2021, 6 pages.
Non-Final Office Action received for U.S Appl. No. 16/679,967, dated Sep. 2, 2021, 12 pages.
Non-Final Office Action received for U.S. Appl. No. 16/921,551, dated Sep. 8, 2021, 7 pages.
Non-Final Office Action received for U.S. Appl. No. 17/013,778, dated Dec. 9, 2021, 11 pages.
Non-Final received for U.S. Appl. No. 17/461,103, dated Nov. 22, 2021, 15 pages.
Notice of Acceptance received for Australian Patent Application No. 2020257092, dated Aug. 27, 2021, 3 pages.
Notice of Acceptance received for Australian Patent Application No. 2021201403, dated Oct. 22, 2021, 3 pages.
Notice of Allowance received for Chinese Patent Application No. 202010125114.4, dated Nov. 24, 2021, 2 pages (1 page of English Translation and 1 page of Official Copy).
Notice of Allowance received for Korean Patent Application No. 10-2021-7021047, dated Dec. 6, 2021, 3 pages (1 page of English Translation and 2 pages of Official Copy).
Notice of Allowance received for U.S. Appl. No. 14/641,298, dated Nov. 29, 2021, 8 pages.
Notice of Allowance received for U.S. Appl. No. 16/263,280, dated Sep. 17, 2021, 8 pages.
Notice of Allowance received for U.S. Appl. No. 16/670,949, dated Sep. 14, 2021, 7 pages.
Notice of Allowance received for U.S. Appl. No. 16/836,571, dated Sep. 8, 2021, 25 pages.
Notice of Allowance received for U.S. Appl. No. 17/031,833, dated Sep. 20, 2021, 6 pages.
Office Action received for Australian Patent Application No. 2020207785, dated Dec. 14, 2021, 5 pages.
Office Action received for Australian Patent Application No. 2020239711, dated Sep. 13, 2021, 5 pages.
Office Action received for Australian Patent Application No. 2020273355, dated Nov. 23, 2021, 6 pages.
Office Action received for Australian Patent Application No. 2020282362, dated Nov. 25, 2021, 3 pages.
Office Action received for Chinese Patent Application No. 201580043701.6, dated Sep. 10, 2021, 10 pages (5 pages of English Translation and 5 pages of Official Copy).
Office Action received for Chinese Patent Application No. 201711292804.3, dated Sep. 10, 2021, 19 pages (8 pages of English Translation and 11 pages of Official Copy).
Office Action received for Chinese Patent Application No. 201780033899.9, dated Sep. 3, 2021, 12 pages (6 pages of English Translation and 6 pages of Official Copy).
Office Action received for Chinese Patent Application No. 201810338040.5, dated Oct. 25, 2021, 22 pages (13 pages of English Translation and 9 pages of Official Copy).
Office Action received for Chinese Patent Application No. 201810339290.0, dated Oct. 18, 2021, 20 pages (11 pages of English Translation and 9 pages of Official Copy).
Office Action received for Chinese Patent Application No. 202011450203.2, mailed on Sep. 01, 2021, 12 pp. (6 pp. Of English Translation and 6 pp. Of Official Copy).
Office Action received for Danish Patent Application No. PA202070617, mailed on Sep. 24, 2021, 4 pp.
Office Action received for European Patent Application No. 15714698.6, mailed on Oct. 13, 2021, 2 pp.
Office Action received for European Patent Application No. 18733381.0, mailed on Oct. 2021, 9 pp.. 29,.
Office Action received for European Patent Application No. 19186538.5, mailed on Oct. 2021, 7 pp.. 22,.
Office Action received for European Patent Application No. 19203942.8, mailed on Oct. 2021, 6 pp.. 29,.

(56) References Cited

OTHER PUBLICATIONS

Office Action received for Indian Patent Application No. 202014041529, mailed on 06, 2021, 6 pp.. Dec.
Office Action received for Japanese Patent Application No. 2020-159840, mailed on Dec. 10, 2021, 13 pp. (7 pp. Of English Translation and 6 pp. Of Official Copy).
Office Action received for Japanese Patent Application No. 2021-026630, mailed on Aug. 20, 2021, 7 pp. (3 pp. Of English Translation and 4 pp. Of Official Copy).
Record of Oral Hearing received for U.S. Patent Application No. 14/641,298, mailed on Oct. 08, 2021, 17 pp.
Result of Consultation received for European Patent Application No. 15760008.1, mailed on Sep. 09, 2021, 7 pp.
Search Report and Opinion received for Danish Patent Application No. PA202170320, on Oct. 06, 2021, 9 pp.. mailed.
Summons to Attend Oral Proceedings received for European Patent Application 20158824.1, mailed on Dec. 07, 2021, 6 pp.
Petternitter, "User Restricted Collaborative Playlists - the Spotify Community", Downloaded from: https://community.spotify.com/t5/Archived-Ideas/User-restricted-collaborative-playlists/idi-p/70721, May 28, 2012, 4 pp.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 03, 2013, 5 pp.
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Brumberg et al., "The Unlock Project: A Python-based framework for practical brain-computer interface communication "app" development", Conf Proc IEEE Eng Med Biol Soc. 2012, doi:10.1109/EMBC.2012.6346473, Institute of Electrical and Electronics Engineers, 2012, 11 pages.
Han Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only). See Communication Under 37 CFR § 1.98(a) (3).
Pu Fang, "Research on Location-aware Service in Pervasive Computing", Issue No. 7, Information Technology Series, China Doctoral Dissertations, Jul. 15, 2008, 140 pages (Official Copy only). See Communication Under 37 CFR § 1.98(a) (3).
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
International Preliminary Report on Patentability received for PCT Patent Application No. PCT/US2020/035488, dated Dec. 9, 2021, 16 pages.
Notice of Allowance received for Korean Patent Application No. 10-2021-7035472, dated Nov. 23, 2021, 4 pages (2 pages of English Translation and 2 pages of Official Copy).
Board Opinion received for Chinese Patent Application No. 201580046788.2, dated Dec. 29, 2021, 10 pages (4 pages of English Translation and 6 pages of Official Copy).
Non-Final Office Action received for U.S. Appl. No. 16/917,659, dated Jan. 14, 2022, 10 pages.
Notice of Acceptance received for Australian Patent Application No. 2020282362, dated Jan. 4, 2022, 3 pages.
Notice of Acceptance received for Australian Patent Application No. 2020285524, dated Dec. 17, 2021, 3 pages.
Notice of Allowance received for Japanese Patent Application No. 2021-026630, dated Jan. 7, 2022, 4 pages (1 page of English Translation and 3 pages of Official Copy).
Notice of Allowance received for Korean Patent Application No. 10-2021-7039234, dated Dec. 20, 2021, 4 pages (1 page of English Translation and 3 pages of Official Copy).
Notice of Allowance received for U.S. Appl. No. 16/888,775, dated Jan. 12, 2022, 5 pages.
Notice of Allowance received for U.S. Appl. No. 16/921,551, dated Jan. 13, 2022, 6 pages.
Office Action received for Chinese Patent Application No. 201811367893.8, dated Nov. 29, 2021, 6 pages (3 pages of English Translation and 3 pages of Official Copy).
Summons to Attend Oral Proceedings received for European Patent Application No. 17813737.8, dated Jan. 4, 2022, 12 pages.
Applicant Initiated Interview Summary received for U.S. Appl. No. 16/917,659, dated Jan. 28, 2022, 2 pages.
Applicant-Initiated Interview Summary received for U.S. Appl. No. 17/461,103, dated Jan. 26, 2022, 6 pages.
Corrected Notice of Allowance received for U.S. Appl. No. 16/921,551, dated Jan. 26, 2022, 3 pages.
Intention to Grant received for European Patent Application No. 18197583.0, dated Jan. 17, 2022, 9 pages.
Non-Final Office Action received for U.S. Appl. No. 17/027,373, dated Feb. 2, 2022, 17 pages.
Notice of Acceptance received for Australian Patent Application No. 2020293355, dated Jan. 17, 2022, 3 pages.
Office Action received for Korean Patent Application No. 10-2021-7041874, dated Jan. 19, 2022, 5 pages (2 pages of English Translation and 3 pages of Official Copy).
Applicant-Initiated Interview Summary received for U.S. Appl. No. 16/679,967, dated Feb. 10, 2022, 2 pages.
Applicant-Initiated Interview Summary received for U.S. Appl. No. 16/803,849, dated Feb. 28, 2022, 9 pages.
Applicant-Initiated Interview Summary received for U.S. Appl. No. 17/013,778, dated Feb. 28, 2022, 2 pages.
Applicant-Initiated Interview Summary received for U.S. Appl. No. 17/062,891, dated Apr. 5, 2022, 4 pages.
Applicant-Initiated Interview Summary received for U.S. Appl. No. 17/168,069, dated Nov. 17, 2021, 2 pages.
Applicant-Initiated Interview Summary received for U.S. Appl. No. 17/476,404, dated Mar. 18, 2022, 2 pages.
Board Opinion received for Chinese Patent Application No. 201810338826.7, dated Jan. 19, 2022, 18 pages (6 pages of English Translation and 12 pages of Official Copy).
Corrected Notice of Allowance received for U.S. Appl. No. 16/836,571, dated Mar. 25, 2022, 2 pages.
Corrected Notice of Allowance received for U.S. Appl. No. 16/921,551, dated Feb. 9, 2022, 2 pages.
Corrected Notice of Allowance received for U.S. Appl. No. 17/168,069, dated Feb. 9, 2022, 2 pages.
Corrected Notice of Allowance received for U.S. Appl. No. 17/461,103, dated Apr. 14, 2022, 2 pages.
Decision to Grant received for European Patent Application No. 18197583.0, dated Feb. 3, 2022, 3 pages.
Examiner-Initiated Interview Summary received for U.S. Appl. No. 17/027,373, dated Mar. 31, 2022, 4 pages.
Extended European Search Report received for European Patent Application No. 21207736.6, dated Feb. 22, 2022, 11 pages.
Final Office Action received for U.S. Appl. No. 17/013,778, dated Apr. 1, 2022, 11 pages.
Final Office Action received for U.S. Appl. No. 17/476,404, dated May 5, 2022, 26 pages.
Intention to Grant received for European Patent Application No. 15760008.1, dated Apr. 6, 2022, 11 pages.
Intention to Grant received for European Patent Application No. 19207753.5, dated Jan. 28, 2022, 8 pages.
International Search Report and Written Opinion received for PCT Patent Application No. PCT/US2021/048358, dated Feb. 24, 2022, 21 pages.
International Search Report and Written Opinion received for PCT Patent Application No. PCT/US2021/054470, dated Feb. 2, 2022, 12 pages.
International Search Report and Written Opinion received for PCT Patent Application No. PCT/US2021/056674, dated Jan. 26, 2022, 10 pages.

(56) References Cited

OTHER PUBLICATIONS

Invitation to Pay Additional Fees received for PCT Patent Application No. PCT/US2021/048358, dated Dec. 23, 2021, 14 pages.
Non-Final Office Action received for U.S. Appl. No. 17/476,404, dated Feb. 8, 2022, 26 pages.
Non-Final Office Action received for U.S. Appl. No. 16/679,967, dated Apr. 19, 2022, 13 pages.
Non-Final Office Action received for U.S. Appl. No. 17/168,069, dated Jul. 21, 2021, 17 pages.
Non-Final Office Action received for U.S. Appl. No. 17/176,908, dated Feb. 24, 2022, 28 pages.
Notice of Acceptance received for Australian Patent Application No. 2020207785, dated May 4, 2022, 3 pages.
Notice of Acceptance received for Australian Patent Application No. 2020285521, dated Mar. 15, 2022, 3 pages.
Notice of Acceptance received for Australian Patent Application No. 2021204454, dated Feb. 25, 2022, 3 pages.
Notice of Acceptance received for Australian Patent Application No. 2022201369, dated Mar. 17, 2022, 3 pages.
Notice of Allowance received for Chinese Patent Application No. 201580043701.6, dated Jan. 26, 2022, 2 pages (1 page of English Translation and 1 page of Official Copy).
Notice of Allowance received for Chinese Patent Application No. 201780033899.9, dated Feb. 8, 2022, 2 pages (1 page of English Translation and 1 page of Official Copy).
Notice of Allowance received for Chinese Patent Application No. 201810338040.5, dated Mar. 30, 2022, 6 pages (2 pages of English Translation and 4 pages of Official Copy).
Notice of Allowance received for Chinese Patent Application No. 201810339290.0, dated Mar. 9, 2022, 2 pages (1 page of English Translation and 1 page of Official Copy).
Notice of Allowance received for Korean Patent Application No. 10-2021-0143923, dated Jan. 27, 2022, 4 pages (1 page of English Translation and 3 pages of Official Copy).
Notice of Allowance received for Korean Patent Application No. 10-2021-7041874, dated Mar. 24, 2022, 4 pages (1 page of English Translation and 3 pages of Official Copy).
Notice of Allowance received for U.S. Appl. No. 16/836,571, dated Feb. 14, 2022, 31 pages.
Notice of Allowance received for U.S. Appl. No. 17/062,891, dated Apr. 25, 2022, 9 pages.
Notice of Allowance received for U.S. Appl. No. 17/168,069, dated Jan. 19, 2022, 12 pages.
Notice of Allowance received for U.S. Appl. No. 17/168,069, dated Mar. 22, 2022, 5 pages.
Notice of Allowance received for U.S. Appl. No. 17/461,103, dated Mar. 17, 2022, 10 pages.
Office Action received for Australian Patent Application No. 2018271366, dated May 17, 2021, 5 pages.
Office Action received for Australian Patent Application No. 2021201243, dated Feb. 17, 2022, 4 pages.
Office Action received for Australian Patent Application No. 2021203669, dated Apr. 5, 2022, 3 pages.
Office Action received for Chinese Patent Application No. 201811367893.8, dated Feb. 15, 2022, 14 pages (6 pages of English Translation and 8 pages of Official Copy).
Office Action received for Chinese Patent Application No. 202110235995.X, dated Mar. 22, 2022, 17 pages (9 pages of English Translation and 8 pages of Official Copy).
Office Action received for Danish Patent Application No. PA202170320, dated May 3, 2022, 3 pages.
Office Action received for European Patent Application No. 20719301.2, dated Feb. 21, 2022, 9 pages.
Office Action received for European Patent Application No. 21160991.2, dated Mar. 24, 2022, 11 pages.
Office Action received for Japanese Patent Application No. 2020-159840, dated Mar. 28, 2022, 6 pages (3 pages of English Translation and 3 pages of Official Copy).
Office Action received for Japanese Patent Application No. 2020-184605, dated Feb. 14, 2022, 24 pages (11 pages of English Translation and 13 pages of Official Copy).
Office Action received for Korean Patent Application No. 10-2021-7032984, dated Feb. 22, 2022, 8 pages (4 pages of English Translation and 4 pages of Official Copy).
Office Action received for Korean Patent Application No. 10-2022-7008567, dated Mar. 28, 2022, 5 pages (2 pages of English Translation and 3 pages of Official Copy).
Summons to Attend Oral Proceedings received for European Patent Application No. 19150528.8, dated Mar. 15, 2022, 7 pages.
Supplemental Notice of Allowance received for U.S. Appl. No. 17/168,069, dated Apr. 20, 2022, 2 pages.
Supplemental Notice of Allowance received for U.S. Appl. No. 17/168,069, dated Feb. 2, 2022, 2 pages.
COMPUTERADV,"Sonos App Navigation & Menu on iPhone", Available online at: https://www.youtube.com/watch?v=Jhz9XvWQ204, Aug. 4, 2015, 1 page.
HOWCAST,"How to Create and Edit Playlists on iPhone", Youtube, Available online at: https://www.youtube.com/watch?v=YPOnKUvcso4, Mar. 13, 2014, 3 pages.
Noriega Josh, "How to Store and Listen to Music Directly from Your Android Wear Smartwatch", Guiding Tech, Available online at: https://www.guidingtech.com/55254/listen-music-android-wear-smartwatch, Jan. 15, 2016, 16 pages.
SandraHoutz,"How Do I Delete a Playlist from a Synced Ipod but Not Remove it From the Library in itunes", Apple Communities Website, Available online at: https://discussions.apple.com/thread/7503609, Mar. 23, 2016, 2 pages.
Sharepoint At RACKSPACE,"Sharepoint 2013: How to Edit a List or Library Using Quick Edit", Available online at: https://www.youtube.com/watch?v=foZXcFC1k80, Oct. 10, 2014, 1 page.
SUPERTUNETV,"Ipod Nano 6G - Sync Selected Playlist iTunes", Youtube, Available online at: https://www.youtube.com/watch?v=xU 3rYRabt_I, Sep. 10, 2012, 3 pages.
Whitwam Ryan, "How to Sync and Play Music on Your Android Wear Watch", Available online at: https://www .greenbot.com/article/2997520/how-to-sync-and-play-music-on-your-android-wear-watch.html, Nov. 2, 2015, 4 pages.
Corrected Notice of Allowance received for U.S. Appl. No. 17/461,103, mailed on May 10, 2022 2 pages.
Non-Final Office Action received for U.S. Appl. No. 17/181,089, mailed on May 13, 2022 12 pages.
Notice of Allowance received for U.S. Appl. No. 16/803,849, mailed on May 17, 2022 12 pages.
Notice of Allowance received for Japanese Patent Application No. 2021-563716, dated Mar. 14, 2022, 4 pages (1 page of English Translation and 3 pages of Official Copy).
Corrected Notice of Allowance received for U.S. Appl. No. 16/803,849, dated Jul. 7, 2022, 3 pages.
Corrected Notice of Allowance received for U.S. Appl. No. 17/027,373, dated Jul. 12, 2022, 2 pages.
Notice of Allowance received for Japanese Patent Application No. 2021-074395, dated Jun. 27, 2022, 4 pages (1 page of English Translation and 3 pages of Official Copy).
Notice of Allowance received for Korean Patent Application No. 10-2021-7032984, dated Jun. 29, 2022, 5 pages (2 pages of English Translation and 3 pages of Official Copy).
Notice of Allowance received for U.S. Appl. No. 16/917,659, dated Jul. 8, 2022, 11 pages.
Summons to Attend Oral Proceedings received for European Patent Application No. 18208881.5, dated Jun. 29, 2022, 9 pages.
Board Decision received for Chinese Patent Application No. 201580046788.2, dated Jun. 6, 2022, 17 pages (1 page of English Translation and 16 pages of Official Copy).
Board Decision received for Chinese Patent Application No. 201810338826.7, dated May 30, 2022, 20 pages (2 pages of English Translation and 18 pages of Official Copy).
Notice of Allowance received for Korean Patent Application No. 10-2020-0123805, dated Jun. 19, 2022, 5 pages (2 pages of English Translation and 3 pages of Official Copy).
Notice of Allowance received for U.S. Appl. No. 17/461,103, dated Jun. 20, 2022, 6 pages.

(56) References Cited

OTHER PUBLICATIONS

Office Action received for European Patent Application No. 20158824.1, dated Jun. 13, 2022, 5 pages.
Office Action received for Indian Patent Application No. 202118054338, dated Jun. 21, 2022, 5 pages.
Office Action received for Japanese Patent Application No. 2021-569562, dated May 13, 2022, 6 pages (3 pages of English Translation and 3 pages of Official Copy).
Applicant Initiated Interview Summary received for U.S. Appl. No. 17/176,908, dated Jun. 14, 2022, 6 pages.
Brief Communication Regarding Oral Proceedings received for European Patent Application No. 20158824.1, dated May 30, 2022, 1 page.
Corrected Notice of Allowance received for U.S. Appl. No. 16/803,849, dated Jun. 8, 2022, 3 pages.
Decision to Grant received for European Patent Application No. 19207753.5, dated Jun. 2, 2022, 3 pages.
Notice of Allowance received for Japanese Patent Application No. 2021-571464, dated May 30, 2022, 4 pages (1 page of English Translation and 3 pages of Official Copy).
Notice of Allowance received for U.S. Appl. No. 16/679,967, dated Jun. 15, 2022, 7 pages.
Office Action received for Australian Patent Application No. 2021201243, dated Jun. 1, 2022, 5 pages.
Office Action received for Chinese Patent Application No. 201811367893.8, dated Apr. 27, 2022, 11 pages (5 pages of English Translation and 6 pages of Official Copy).
Office Action received for Korean Patent Application No. 10-2022-7006175, dated May 27, 2022, 7 pages (3 pages of English Translation and 4 pages of Official Copy).
Summons to Attend Oral Proceedings received for European Patent Application No. 18728002.9, dated Jun. 3, 2022, 15 pages.
Board Decision received for Chinese Patent Application No. 201811367893.8, dated Aug. 25, 2022, 2 pages (1 page of English Translation and 1 page of Official Copy).
Brief Communication regarding Oral Proceedings received for European Patent Application No. 19150528.8, dated Sep. 5, 2022, 2 pages.
Notice of Allowance received for Japanese Patent Application No. 2022-102840, dated Aug. 19, 2022, 4 pages (1 page of English Translation and 3 pages of Official Copy).
Office Action received for Chinese Patent Application No. 202111612841.4, dated Jul. 22, 2022, 13 pages (7 pages of English Translation and 6 pages of Official Copy).
Office Action received for European Patent Application No. 21197457.1, dated Sep. 2, 2022, 8 pages.
Brief Communication Regarding Oral Proceedings received for European Patent Application No. 17799904.2, dated Sep. 13, 2022, 1 page.
Brief Communication Regarding Oral Proceedings received for European Patent Application No. 17813737.8, dated Sep. 19, 2022, 1 page.
Decision to Refuse received for European Patent Application No. 17799904.2, dated Sep. 19, 2022, 4 pages.
Decision to Refuse received for European Patent Application No. 19150528.8, dated Sep. 9, 2022, 4 pages.
Non-Final Office Action received for U.S. Appl. No. 17/476,404, dated Sep. 14, 2022, 31 pages.
Notice of Allowance received for Chinese Patent Application No. 201811367893.8, dated Sep. 2, 2022, 2 pages (1 page of English Translation and 1 page of Official Copy).
Office Action received for European Patent Application No. 20720675.6, dated Sep. 8, 2022, 6 pages.
Applicant-Initiated Interview Summary received for U.S. Appl. No. 17/476,404, dated Jul. 27, 2022, 6 pages.
Extended European Search Report received for European Patent Application No. 22169639.6, dated Jul. 19, 2022, 14 pages.
Notice of Allowance received for Japanese Patent Application No. 2020-159840, dated Jul. 8, 2022, 4 pages (1 page of English Translation and 3 pages of Official Copy).
Notice of Allowance received for Japanese Patent Application No. 2022-079682, dated Jul. 15, 2022, 4 pages (1 page of English Translation and 3 pages of Official Copy).
Notice of Allowance received for Korean Patent Application No. 10-2022-7008567, dated Jul. 4, 2022, 9 pages (2 pages of English Translation and 7 pages of Official Copy).
Applicant-Initiated Interview Summary received for U.S. Appl. No. 17/314,948, dated Oct. 21, 2022, 6 pages.
Corrected Notice of Allowance received for U.S. Appl. No. 17/027,373, dated Oct. 26, 2022, 2 pages.
Extended European Search Report received for European Patent Application No. 22188377.0, dated Oct. 27, 2022, 8 pages.
Final Office Action received for U.S. Appl. No. 17/181,089, dated Oct. 21, 2022, 15 pages.
Notice of Allowance received for Korean Patent Application No. 10-2022-0091730, dated Oct. 4, 2022, 5 pages (2 pages of English Translation and 3 pages of Official Copy).
Notice of Allowance received for U.S. Appl. No. 16/679,967, dated Nov. 2, 2022, 7 pages.
Office Action received for Chinese Patent Application No. 202110235995.X, dated Sep. 30, 2022, 13 pages (7 pages of English Translation and 6 pages of Official Copy).
Office Action received for Danish Patent Application No. PA202270464, dated Oct. 25, 2022, 9 pages.
Summons to Attend Oral Proceedings received for European Patent Application No. 9. 21160991.2, dated Oct. 19, 2022, 10 pages.
Applicant-Initiated Interview Summary received for U.S. Appl. No. 16/679,967, dated Jun. 1, 2022, 2 pages.
Notice of Acceptance received for Australian Patent Application No. 2021203669, dated May 25, 2022, 3 pages.
Notice of Acceptance received for Australian Patent Application No. 2022202458, dated May 6, 2022, 3 pages.
Notice of Allowance received for U.S. Appl. No. 17/027,373, dated Jun. 3, 2022, 8 pages.
Office Action received for Chinese Patent Application No. 202011450203.2, dated Apr. 20, 2022, 9 pages (5 pages of English Translation and 4 pages of Official Copy).
Result of Consultation received for European Patent Application No. 20158824.1, dated May 17, 2022, 7 pages.
Corrected Notice of Allowance received for U.S. Appl. No. 17/062,891, dated Aug. 2, 2022, 2 pages.
Corrected Notice of Allowance received for U.S. Appl. No. 17/461,103, dated Aug. 3, 2022, 2 pages.
Decision to Grant received for European Patent Application No. 15760008.1, dated Aug. 11, 2022, 2 pages.
Intention to Grant received for Danish Patent Application No. PA202170320, dated Jul. 27, 2022, 2 pages.
Intention to Grant received for European Patent Application No. 20158824.1, dated Aug. 11, 2022, 10 pages.
Non-Final Office Action received for U.S. Appl. No. 17/314,948, dated Aug. 1, 2022, 33 pages.
Notice of Allowance received for Japanese Patent Application No. 2021-569562, mailed on Jul. 29, 2022, 4 pages (1 page of English Translation and 3 pages of Official Copy).
Notice of Allowance received for U.S. Appl. No. 17/027,373, mailed on Aug. 2, 2022, 2 pages.
Farmboyreef, "Apple watch controlling your tv", Available online at: https://www.youtube.com/watch?v=xaJPG0Wm3Tg, Jun. 23, 2015, 3 pages.
Gil Lory, "How to control Apple TV with your Apple Watch", Available online at: https://www.imore.com/how-control-your-apple-tv-remote-app%ADapple-watch], Jun. 6, 2016, 24 pages.
HOBBYISTSOFTWARELTD,"VLC Remote", Online available at: https://watchaware.com/watch-apps/297244048, 2016, 7 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Nikolov Anton, "Design principle: Consistency", Available online at: https://uxdesign.cc/design-principle-consistency-6b0cf7e7339f, Apr. 8, 2017, 9 pages.

(56) References Cited

OTHER PUBLICATIONS

Ojeda-Zapata Julio, "Five Apps That Play Podcasts Directly from Your Apple Watch", Available online at: https://tidbits.com/2018/04/09/five-apps-that-play-podcasts-directly~ from-your-apple-watch/, Apr. 9, 2018, 12 pages.
Pairing Your Apple Watch With Your AppleTV, Available online at: https://www.youtube.com/watch?v=C418YFSJ-UY, Apr. 27, 2015, 3 pages.
Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%20%20go%20to,.%E2%80%9D%20Tap%20on%20Add%20Music., Mar. 2, 2018, 13 pages.
Applicant-Initiated Interview Summary received for U.S. Appl. No. 17/181,089, dated Oct. 7, 2022, 4 pages.
Decision to Refuse received for European Patent Application No. 17813737.8, dated Sep. 30, 2022, 5 pages.
Non-Final Office Action received for U.S. Appl. No. 17/489,508, dated Oct. 19, 2022, 20 pages.
Notice of Allowance received for Chinese Patent Application No. 202011450203.2, dated Sep. 30, 2022, 4 pages (1 page of English Translation and 3 pages of Official Copy).
Notice of Allowance received for U.S. Appl. No. 16/888,775, dated Oct. 19, 2022, 6 pages.
Notice of Allowance received for U.S. Appl. No. 17/027,373, dated Oct. 3, 2022, 5 pages.
Office Action received for Chinese Patent Application No. 202080039642.6, dated Sep. 5, 2022, 12 pages (6 pages of English Translation and 6 pages of Official Copy).
Office Action received for Chinese Patent Application No. 202111652452.4, dated Aug. 29, 2022, 23 pages (12 pages of English Translation and 11 pages of Official Copy).
Office Action received for European Patent Application No. 20720310.0, dated Oct. 4, 2022, 9 pages.
Hoffman Chris, "How to Ungroup Notifications on iPhone or iPad", Retrieved from the internet <URL: https://www.howtogeek.com/366566/how-to-ungroup-notifications-on-iphone-or-ipad/>, Sep. 17, 2018, 3 pages.
Applicant-Initiated Interview Summary received for U.S. Appl. No. 17/181,089, dated Nov. 22, 2022, 3 pages.
Applicant-Initiated Interview Summary received for U.S. Appl. No. 17/489,508, dated Nov. 17, 2022, 6 pages.
Decision to Grant received for Danish Patent Application No. PA202170320, dated Nov. 10, 2022, 2 pages.
Office Action received for Australian Patent Application No. 2021261941, dated Nov. 3, 2022, 3 pages.
Office Action received for Australian Patent Application No. 2022200515, dated Nov. 2, 2022, 2 pages.
Office Action received for Chinese Patent Application No. 202111646465.0, dated Oct. 21, 2022, 11 pages (6 pages of English Translation and 5 pages of Official Copy).
Invitation to Pay Search Fees received for European Patent Application No. 20760624.5, dated Jan. 2, 2023, 3 pages.
Non-Final Office Action received for U.S. Appl. No. 17/181,089, dated Feb. 17, 2023, 14 pages.
Non-Final Office Action received for U.S. Appl. No. 17/479,974, dated Feb. 22, 2023, 30 pages.
Notice of Allowance received for Chinese Patent Application No. 202111646465.0, dated Feb. 6, 2023, 3 pages (1 page of English Translation and 2 pages of Official Copy).
Notice of Allowance received for U.S. Appl. No. 16/888,775, dated Feb. 21, 2023, 5 pages.
Office Action received for Australian Patent Application No. 2022204555, dated Feb. 17, 2023, 5 pages.
Office Action received for Chinese Patent Application No. 201911288715.0, dated Jan. 20, 2023, 23 pages (11 pages of English Translation and 12 pages of Official Copy).
Advisory Action received for U.S. Appl. No. 17/181,089, dated Dec. 20, 2022, 4 pages.
Applicant-Initiated Interview Summary received for U.S. Appl. No. 17/476,404, dated Dec. 20, 2022, 2 pages.
Applicant-Initiated Interview Summary received for U.S. Appl. No. 17/509,356, dated Feb. 3, 2023, 3 pages.
Brief Communication Regarding Oral Proceedings received for European Patent Application No. 18728002.9, dated Dec. 7, 2022, 1 page.
Brief Communication Regarding Oral Proceedings received for European Patent Application No. 18728002.9, dated Nov. 28, 2022, 7 pages.
Corrected Notice of Allowance received for U.S. Appl. No. 17/871,627, dated Feb. 8, 2023, 2 pages.
Decision to Grant received for European Patent Application No. 20158824.1, dated Dec. 15, 2022, 3 pages.
Decision to Refuse received for European Patent Application No. 18208881.5, dated Dec. 23, 2022, 12 pages.
Examiner's Answer to Appeal Brief received for U.S. Appl. No. 17/013,778, dated Dec. 20, 2022, 9 pages.
Extended European Search Report received for European Patent Application No. 22195584.2, dated Jan. 5, 2023, 13 pages.
Extended European Search Report received for European Patent Application No. 22198071.7, dated Dec. 5, 2022, 8 pages.
Extended European Search Report received for European Patent Application No. 22201007.6, dated Jan. 12, 2023, 7 pages.
International Preliminary Report on Patentability received for PCT Patent Application No. PCT/US2021/031760, dated Nov. 24, 2022, 11 pages.
International Search Report and Written Opinion received for PCT Patent Application No. PCT/US2022/031252, dated Oct. 7, 2022, 18 pages.
International Search Report and Written Opinion received for PCT Patent Application No. PCT/US2022/032340, dated Jan. 12, 2023, 18 pages.
Invitation to Pay Additional Fees and Partial International Search Report received for PCT Patent Application No. PCT/US2022/032340, dated Nov. 21, 2022, 14 pages.
Invitation to Pay Search Fees received for European Patent Application No. 15714698.6, dated Dec. 16, 2022, 4 pages.
Invitation to Pay Search Fees received for European Patent Application No. 21728781.2, dated Dec. 2, 2022, 3 pages.
Minutes of Oral Proceedings received for European Patent Application No. 18208881.5, dated Dec. 22, 2022, 4 pages.
Minutes of Oral Proceedings received for European Patent Application No. 18728002.9, dated Dec. 22, 2022, 7 pages.
Non-Final Office Action received for U.S. Appl. No. 17/320,900, dated Dec. 22, 2022, 30 pages.
Non-Final Office Action received for U.S. Appl. No. 17/509,356, dated Dec. 22, 2022, 16 pages.
Non-Final Office Action received for U.S. Appl. No. 17/666,971, dated Dec. 8, 2022, 26 pages.
Notice of Acceptance received for Australian Patent Application No. 2022200515, dated Dec. 21, 2022, 3 pages.
Notice of Allowance received for Chinese Patent Application No. 202111612841.4, dated Jan. 5, 2023, 3 pages (2 pages of English Translation & 1 page of Official Copy).
Notice of Allowance received for Japanese Patent Application No. 2022-014389, dated Jan. 27, 2023, 4 pages (1 page of English Translation and 3 pages of Official Copy).
Notice of Allowance received for Japanese Patent Application No. 2022-125792, dated Jan. 27, 2023, 4 pages (1 page of English Translation and 3 pages of Official Copy).
Notice of Allowance received for Japanese Patent Application No. 2022-135126, dated Nov. 18, 2022, 4 pages (1 page of English Translation and 3 pages of Official Copy).
Notice of Allowance received for Korean Patent Application No. 10-2022-7006175, dated Jan. 12, 2023, 7 pages (2 pages of English Translation and 5 pages of Official Copy).

(56) References Cited

OTHER PUBLICATIONS

Notice of Allowance received for U.S. Appl. No. 16/917,659, dated Dec. 1, 2022, 11 pages.
Notice of Allowance received for U.S. Appl. No. 17/871,627, dated Jan. 20, 2023, 11 pages.
Office Action received for Australian Patent Application No. 2021201243, dated Dec. 12, 2022, 3 pages.
Office Action received for Australian Patent Application No. 2022200901, dated Dec. 19, 2022, 4 pages.
Office Action received for Australian Patent Application No. 2022201532, dated Dec. 19, 2022, 5 pages.
Office Action received for Australian Patent Application No. 2022203561, dated Dec. 16, 2022, 2 pages.
Office Action received for Australian Patent Application No. 2022241590, dated Nov. 18, 2022, 8 pages.
Office Action received for Chinese Patent Application No. 201811377642.8, dated Oct. 27, 2022, 20 pages (08 pages of English Translation and 12 pages of Official Copy).
Office Action received for Chinese Patent Application No. 201811379281.0, dated Oct. 27, 2022, 21 pages (8 pages of English Translation and 13 pages of Official Copy).
Office Action received for Danish Patent Application No. PA202270464, dated Dec. 20, 2022, 3 pages.
Office Action received for European Patent Application No. 20719301.2, dated Jan. 24, 2023, 9 pages.
Office Action received for Japanese Patent Application No. 2020-184605, dated Dec. 12, 2022, 9 pages (4 pages of English Translation and 5 pages of Official Copy).
Office Action received for Korean Patent Application No. 10-2022-0053111, dated Dec. 12, 2022, 9 pages (4 pages of English Translation and 5 pages of Official Copy).
Office Action received for Korean Patent Application No. 10-2022-7001521, dated Dec. 26, 2022, 13 pages (6 pages of English Translation and 7 pages of Official Copy).
Result of Consultation received for European Patent Application No. 18208881.5, dated Dec. 6, 2022, 10 pages.
Supplemental Notice of Allowance received for U.S. Appl. No. 16/917,659, dated Dec. 21, 2022, 3 pages.
Office Action received for European Patent Application No. 20760624.5, dated Mar. 7, 2023, 13 pages.
Notice of Allowance received for Chinese Patent Application No. 201911099970.0, dated Jun. 25, 2023, 4 pages (1 page of English Translation and 3 pages of Official Copy).
Office Action received for Australian Patent Application No. 2022235591, dated Jun. 28, 2023, 3 pages.
Office Action received for Japanese Patent Application No. 2020-184605, dated Jul. 3, 2023, 6 pages (3 pages of English Translation and 3 pages of Official Copy).
Office Action received for Korean Patent Application No. 10-2022-0053111, dated Jun. 29, 2023, 7 pages (3 pages of English Translation and 4 pages of Official Copy).
Office Action received for Korean Patent Application No. 10-2022-7001521, dated Jun. 21, 2023, 10 pages (5 page of English Translation and 5 pages of Official Copy).
Advisory Action received for U.S. Appl. No. 17/747,804, dated Jun. 23, 2023, 6 pages.
Applicant-Initiated Interview Summary received for U.S. Appl. No. 17/306,354, dated Jun. 28, 2023, 3 pages.
Final Office Action received for U.S. Appl. No. 17/479,974, dated Jun. 28, 2023, 32 pages.
Non-Final Office Action received for U.S. Appl. No. 17/489,508, dated Jun. 21, 2023, 26 pages.
Notice of Allowance received for U.S. Appl. No. 17/519,025, dated Jun. 22, 2023, 7 pages.
Notice of Allowance received for U.S. Appl. No. 17/867,317, dated Jul. 6, 2023, 11 pages.
Office Action received for Chinese Patent Application No. 202111652452.4, dated May 19, 2023, 15 pages (8 pages of English Translation and 7 pages of Official Copy).

Applicant Initiated Interview Summary received for U.S. Appl. No. 17/666,971, dated Jun. 9, 2023, 2 pages.
Applicant Initiated Interview Summary received for U.S. Appl. No. 17/824,510, dated Jun. 16, 2023, 4 pages.
Applicant-Initiated Interview Summary received for U.S. Appl. No. 17/181,089, dated Apr. 7, 2023, 5 pages.
Applicant-Initiated Interview Summary received for U.S. Appl. No. 17/181,089, dated May 16, 2023, 4 pages.
Applicant-Initiated Interview Summary received for U.S. Appl. No. 17/320,900, dated Apr. 17, 2023, 4 pages.
Applicant-Initiated Interview Summary received for U.S. Appl. No. 17/476,404, dated Jun. 2, 2023, 2 pages.
Applicant-Initiated Interview Summary received for U.S. Appl. No. 17/479,974, dated Apr. 4, 2023, 2 pages.
Applicant-Initiated Interview Summary received for U.S. Appl. No. 17/489,508, dated Jun. 2, 2023, 4 pages.
Applicant-Initiated Interview Summary received for U.S. Appl. No. 17/747,804, dated Mar. 17, 2023, 4 pages.
Applicant-Initiated Interview Summary received for U.S. Appl. No. 17/747,804, dated May 31, 2023, 4 pages.
Applicant-Initiated Interview Summary received for U.S. Appl. No. 17/752,582, dated Apr. 17, 2023, 3 pages.
Applicant-Initiated Interview Summary received for U.S. Appl. No. 17/867,317, dated May 30, 2023, 4 pages.
Corrected Notice of Allowance received for U.S. Appl. No. 17/013,778, dated Mar. 7, 2023, 5 pages.
Corrected Notice of Allowance received for U.S. Appl. No. 17/509,356, dated Jun. 13, 2023, 2 pages.
Corrected Notice of Allowance received for U.S. Appl. No. 17/509,356, dated May 24, 2023, 2 pages.
Corrected Notice of Allowance received for U.S. Appl. No. 17/871,627, dated Apr. 11, 2023, 3 pages.
Corrected Notice of Allowance received for U.S. Appl. No. 17/871,627, dated Mar. 7, 2023, 2 pages.
Corrected Notice of Allowance received for U.S. Appl. No. 17/871,627, dated May 3, 2023, 2 pages.
Corrected Notice of Allowance received for U.S. Appl. No. 18/077,905, dated Apr. 10, 2023, 2 pages.
Corrected Notice of Allowance received for U.S. Appl. No. 18/077,905, dated Apr. 19, 2023, 2 pages.
Corrected Notice of Allowance received for U.S. Appl. No. 18/077,905, dated Apr. 26, 2023, 3 pages.
Corrected Notice of Allowance received for U.S. Appl. No. 18/077,905, dated May 4, 2023, 2 pages.
Decision on Opposition received for Australian Patent Application No. 2018271366, dated Mar. 3, 2023, 3 pages.
Decision to Grant received for Danish Patent Application No. PA202270464, dated May 9, 2023, 1 page.
Extended European Search Report received for European Patent Application No. 23157906.1, dated Apr. 6, 2023, 10 pages.
Extended European Search Report received for European Patent Application No. 23158566.2, dated Jun. 14, 2023, 10 pages.
Final Office Action received for U.S. Appl. No. 17/181,089, dated Apr. 19, 2023, 13 pages.
Final Office Action received for U.S. Appl. No. 17/314,948, dated Mar. 7, 2023, 31 pages.
Final Office Action received for U.S. Appl. No. 17/489,508, dated Mar. 10, 2023, 25 pages.
Final Office Action received for U.S. Appl. No. 17/666,971, dated May 12, 2023, 29 pages.
Final Office Action received for U.S. Appl. No. 17/747,804, dated Apr. 28, 2023, 17 pages.
Intention to Grant received for Danish Patent Application No. PA202270464, dated Feb. 20, 2023, 2 pages.
Intention to Grant received for European Patent Application No. 18728002.9, dated Apr. 12, 2023, 9 pages.
Intention to Grant received for European Patent Application No. 20720675.6, dated Mar. 24, 2023, 9 pages.
International Preliminary Report on Patentability received for PCT Patent Application No. PCT/US2021/048358, dated Apr. 6, 2023, 15 pages.

(56) References Cited

OTHER PUBLICATIONS

International Preliminary Report on Patentability received for PCT Patent Application No. PCT/US2021/054470, dated Apr. 27, 2023, 9 pages.
International Preliminary Report on Patentability received for PCT Patent Application No. PCT/US2021/056674, dated May 11, 2023, 7 pages.
International Search Report and Written Opinion received for PCT Patent Application No. PCT/US2022/043733, dated Jan. 3, 2023, 12 pages.
Mitroff Sarah, "8 things you should know about Apple Music for Android", CNET website, downloaded from https://www.cnet.com/tech/services-and-software/apple-music- for-android-what-to-know/, Nov. 11, 2015, 4 pages.
Non-Final Office Action received for U.S. Appl. No. 17/306,354, dated Jun. 2, 2023, 21 pages.
Non-Final Office Action received for U.S. Appl. No. 17/476,404, dated Mar. 30, 2023, 29 pages.
Non-Final Office Action received for U.S. Appl. No. 17/747,804, dated Mar. 1, 2023, 14 pages.
Non-Final Office Action received for U.S. Appl. No. 17/752,582, dated Mar. 6, 2023, 17 pages.
Non-Final Office Action received for U.S. Appl. No. 17/824,510, dated May 22, 2023, 15 pages.
Non-Final Office Action received for U.S. Appl. No. 17/835,110, dated Apr. 3, 2023, 28 pages.
Non-Final Office Action received for U.S. Appl. No. 17/867,317, dated Feb. 28, 2023, 18 pages.
Non-Final Office Action received for U.S. Appl. No. 18/077,971, dated Apr. 3, 2023, 24 pages.
Notice of Acceptance received for Australian Patent Application No. 2018271366, dated Mar. 31, 2023, 3 pages.
Notice of Acceptance received for Australian Patent Application No. 2021201243, dated Feb. 23, 2023, 3 pages.
Notice of Acceptance received for Australian Patent Application No. 2021261941, dated Mar. 15, 2023, 3 pages.
Notice of Acceptance received for Australian Patent Application No. 2022200901, dated Mar. 9, 2023, 3 pages.
Notice of Acceptance received for Australian Patent Application No. 2022201532, dated May 22, 2023, 3 pages.
Notice of Acceptance received for Australian Patent Application No. 2022203561, dated Feb. 27, 2023, 3 pages.
Notice of Acceptance received for Australian Patent Application No. 2022204555, dated May 11, 2023, 3 pages.
Notice of Allowance received for Chinese Patent Application No. 202080039642.6, dated Apr. 17, 2023, 6 pages (2 pages of English Translation and 4 pages of Official Copy).
Notice of Allowance received for Japanese Patent Application No. 2022-007217, dated Apr. 10, 2023, 4 pages (1 page of English Translation and 3 pages of Official Copy).
Notice of Allowance received for Japanese Patent Application No. 2022-201453, dated Jun. 5, 2023, 4 pages (1 page of English Translation and 3 pages of Official Copy).
Notice of Allowance received for U.S. Appl. No. 17/013,778, dated Feb. 23, 2023, 8 pages.
Notice of Allowance received for U.S. Appl. No. 17/019,845, dated Jun. 5, 2023, 10 pages.
Notice of Allowance received for U.S. Appl. No. 17/509,356, dated Apr. 7, 2023, 11 pages.
Notice of Allowance received for U.S. Appl. No. 17/519,025, dated Mar. 2, 2023, 8 pages.
Notice of Allowance received for U.S. Appl. No. 17/752,582, dated Jun. 13, 2023, 18 pages.
Notice of Allowance received for U.S. Appl. No. 17/848,845, dated May 24, 2023, 26 pages.
Notice of Allowance received for U.S. Appl. No. 18/077,905, dated Mar. 24, 2023, 18 pages.
Ochs Susie, "Getting Started with Apple Music: 12 Things to Do First", Macworld website, downloaded from https://www.macworld.com/article/225812/getting-started-with- apple-music-12-things-to-do-first.html, Jun. 30, 2015, 12 pages.
Office Action received for Australian Patent Application No. 2022218517, dated Apr. 27, 2023, 7 pages.
Office Action received for Australian Patent Application No. 2022235591, dated Jun. 6, 2023, 3 pages.
Office Action received for Australian Patent Application No. 2022241590, dated Jun. 7, 2023, 7 pages.
Office Action received for Australian Patent Application No. 2022241590, dated Mar. 17, 2023, 5 pages.
Office Action received for Chinese Patent Application No. 201811379281.0, dated May 16, 2023, 16 pages (06 pages of English Translation and 10 pages of Official Copy).
Office Action received for Chinese Patent Application No. 201811539259.8, dated Mar. 13, 2023, 16 pages (8 pages of English Translation and 8 pages of Official Copy).
Office Action received for Chinese Patent Application No. 201811539259.8, dated May 24, 2023, 22 pages (2 pages of English Translation and 20 pages of Official Copy).
Office Action received for Chinese Patent Application No. 201911099970.0, dated Feb. 23, 2023, 15 pages (5 pages of English Translation and 10 pages of Official Copy).
Office Action received for Chinese Patent Application No. 202111652452.4, dated Feb. 11, 2023, 28 pages (13 pages of English Translation and 15 pages of Official Copy).
Office Action received for European Patent Application No. 15714698.6, dated Apr. 18, 2023, 14 pages.
Office Action received for European Patent Application No. 20720310.0, dated Apr. 11, 2023, 8 pages.
Office Action received for European Patent Application No. 21166718.3, dated Feb. 20, 2023, 7 pages.
Office Action received for European Patent Application No. 21197457.1, dated May 30, 2023, 8 pages.
Office Action received for European Patent Application No. 21728781.2, dated Mar. 1, 2023, 13 pages.
Office Action received for Indian Patent Application No. 202215025360, dated Mar. 29, 2023, 6 pages.
Office Action received for Indian Patent Application No. 202215025361, dated Mar. 29, 2023, 6 pages.
Office Action received for Indian Patent Application No. 202215025363, dated Mar. 29, 2023, 6 pages.
Office Action received for Indian Patent Application No. 202215025364, dated Mar. 29, 2023, 6 pages.
Office Action received for Japanese Patent Application No. 2022-201453, dated Mar. 6, 2023, 8 pages (5 pages of English Translation and 3 pages of Official Copy).
Philips Support Website, "How to switch to preferred audio language in Philips TV from a broadcast with multiple languages audio stream?", Available Online at: https://www.USA.philips.com/c-f/XC000010105/how-to-switch-to-preferred-audio-language- in-philips-tv-from-a-broadcast-with-multiple-languages-audio-stream, Dec. 29, 2016, 5 pages.
Supplemental Notice of Allowance received for U.S. Appl. No. 16/888,775, dated Mar. 1, 2023, 2 pages.

\* cited by examiner

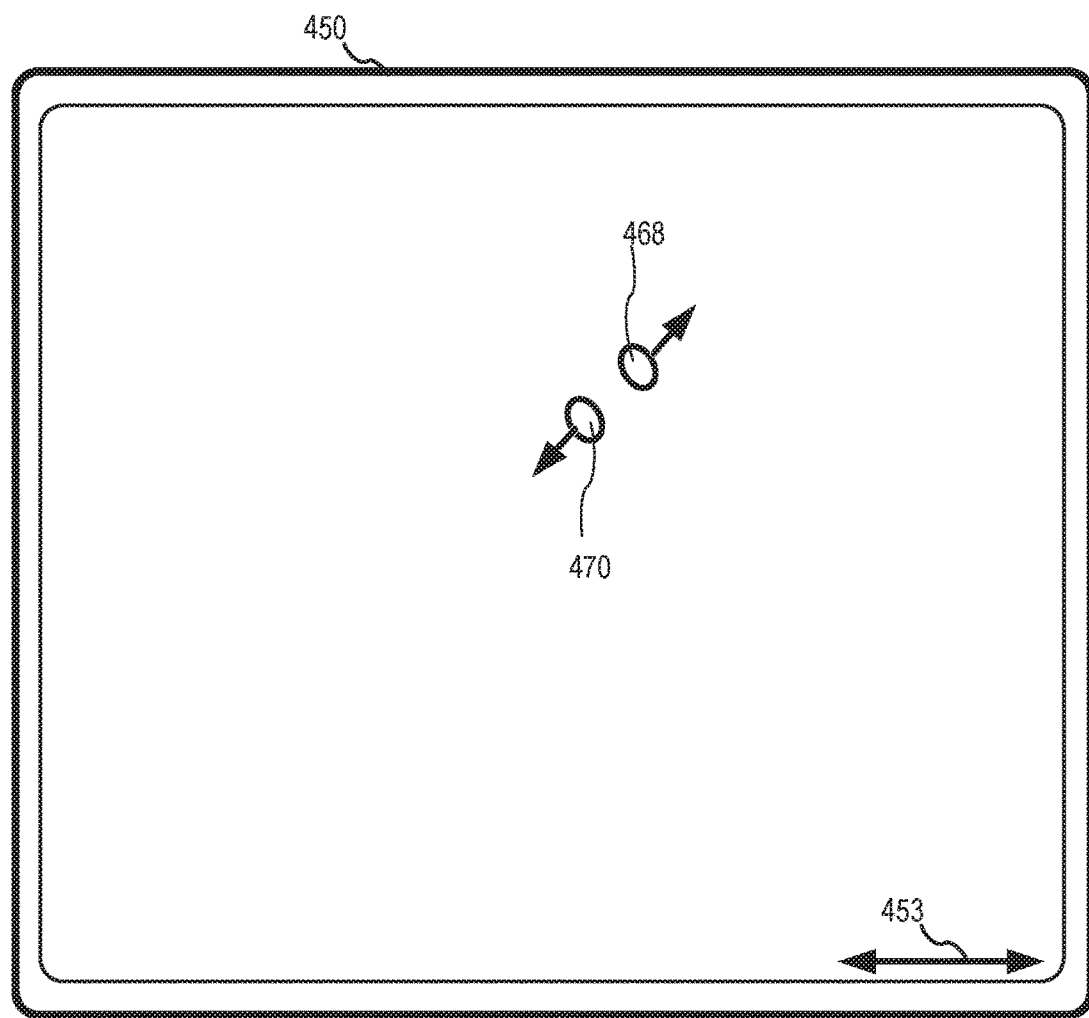
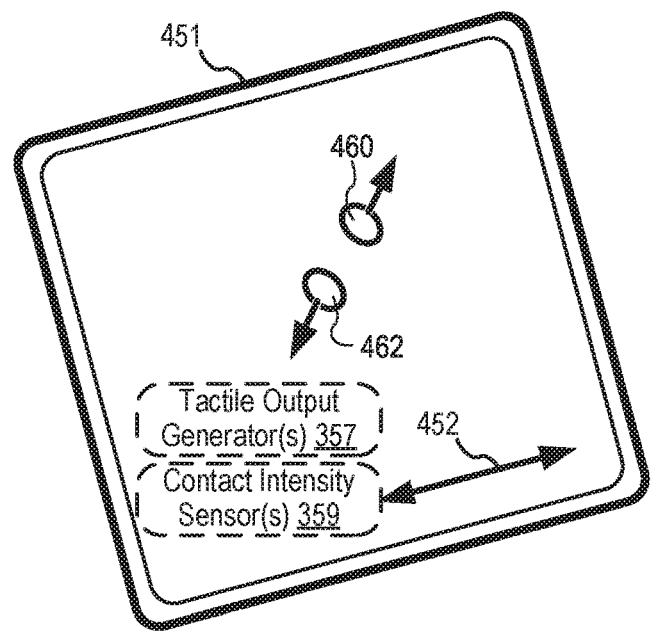
*FIG. 4B*

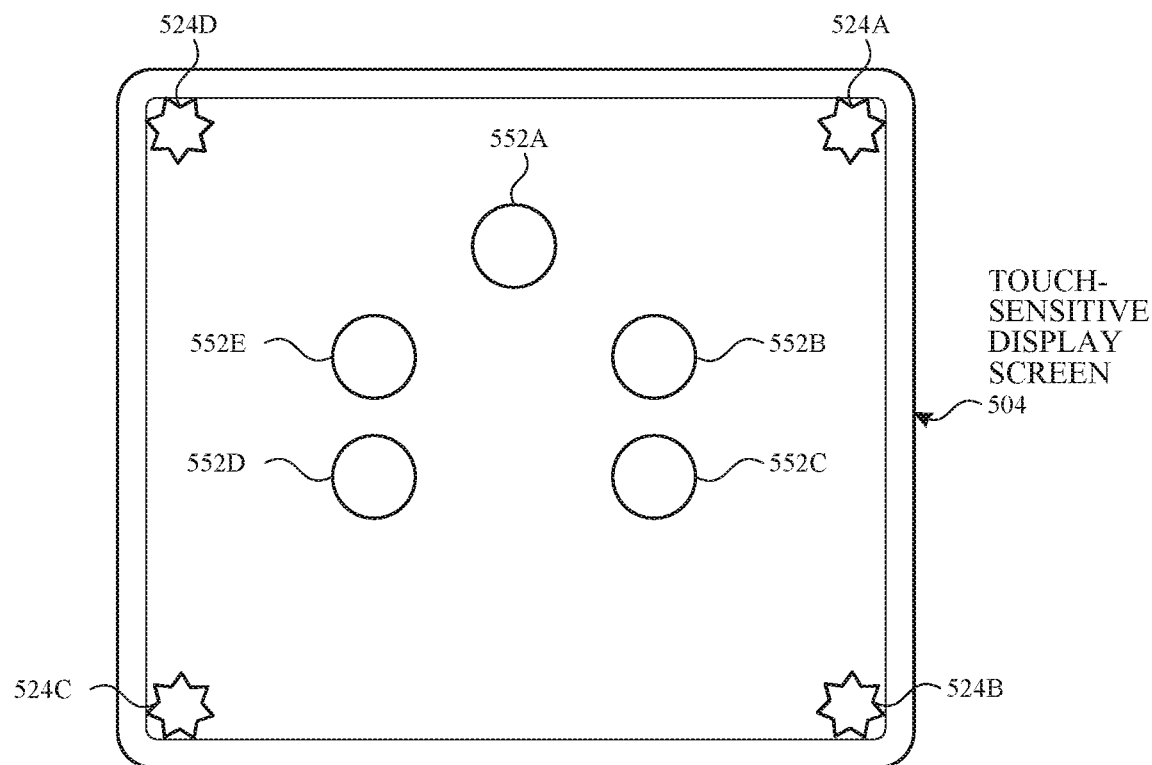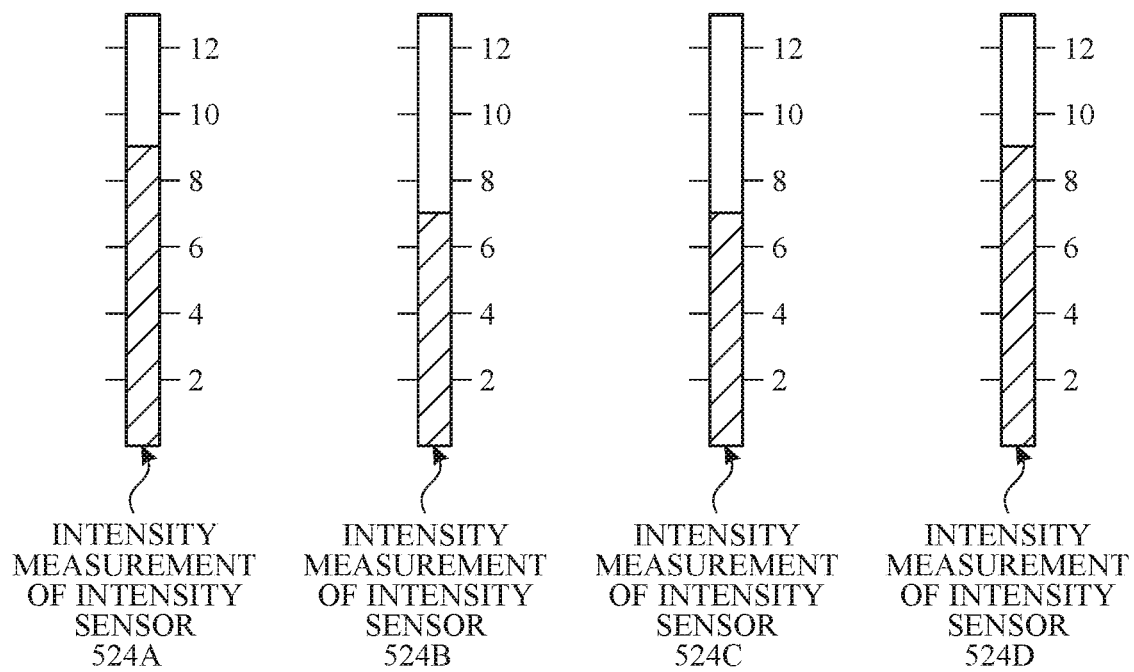
FIG. 5C

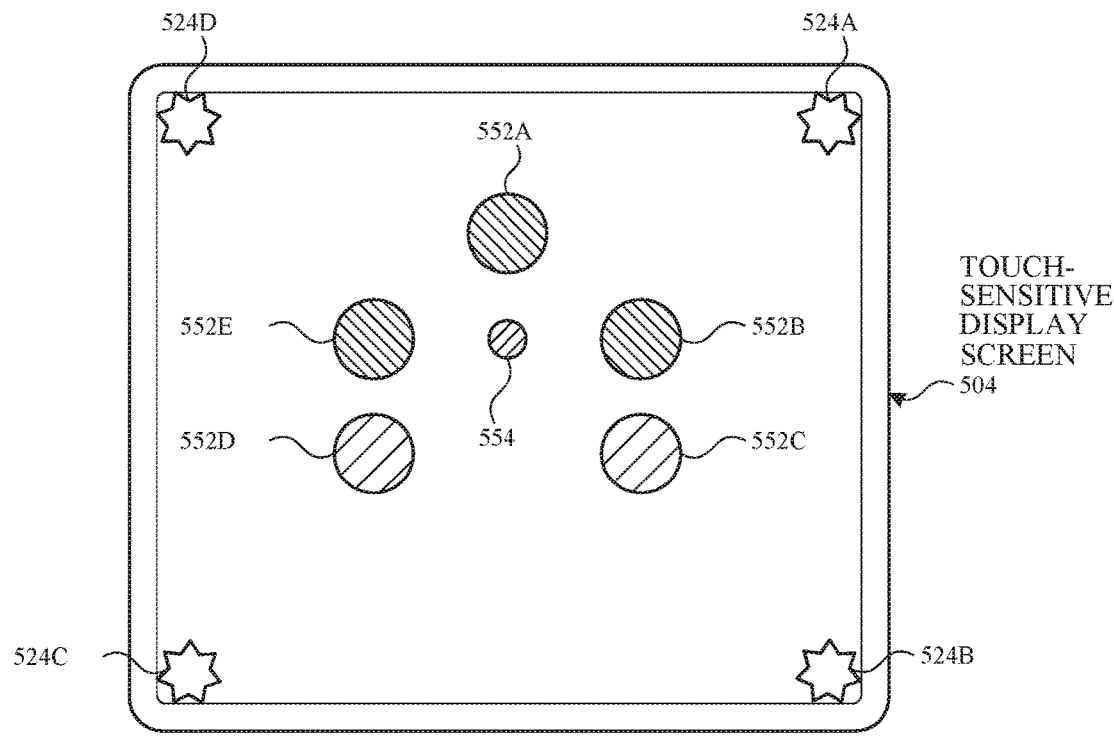
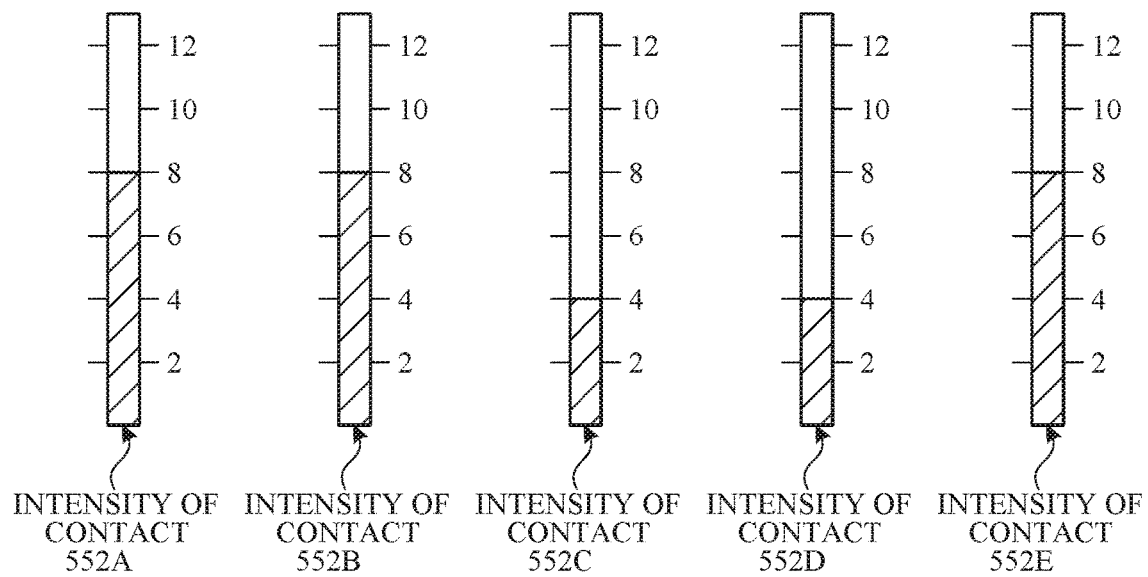
FIG. 5D

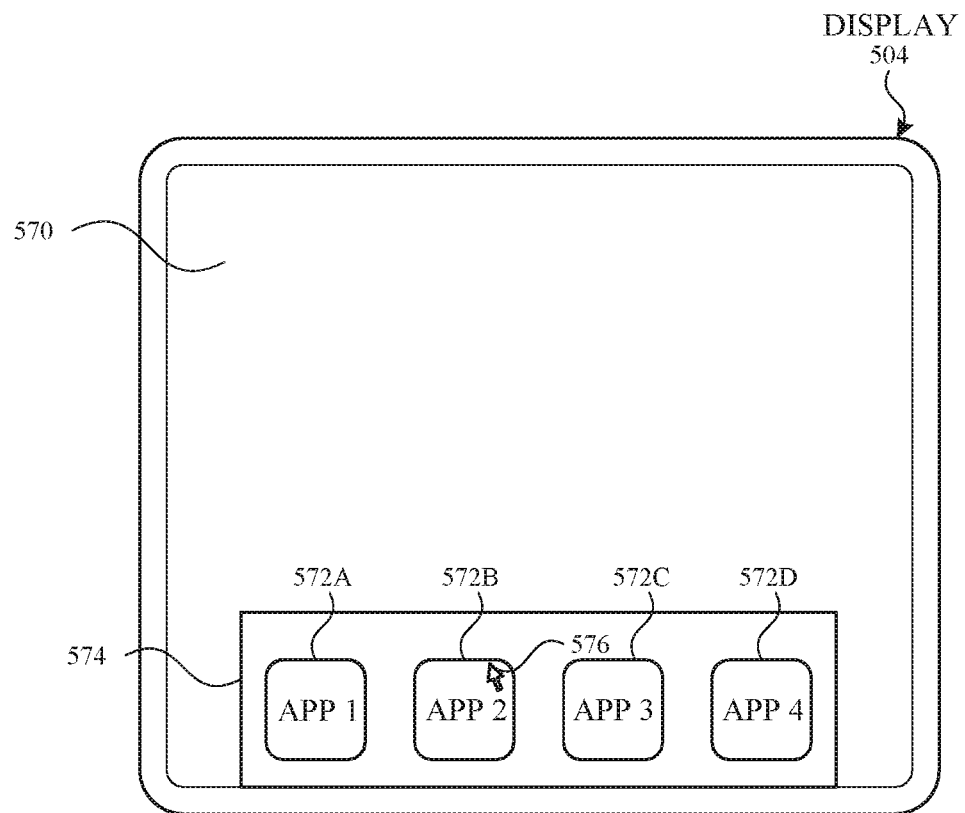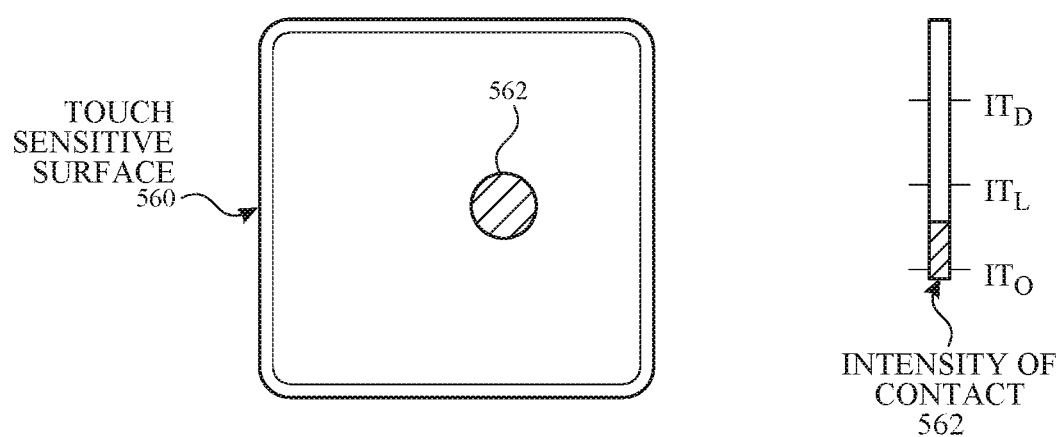
FIG. 5E

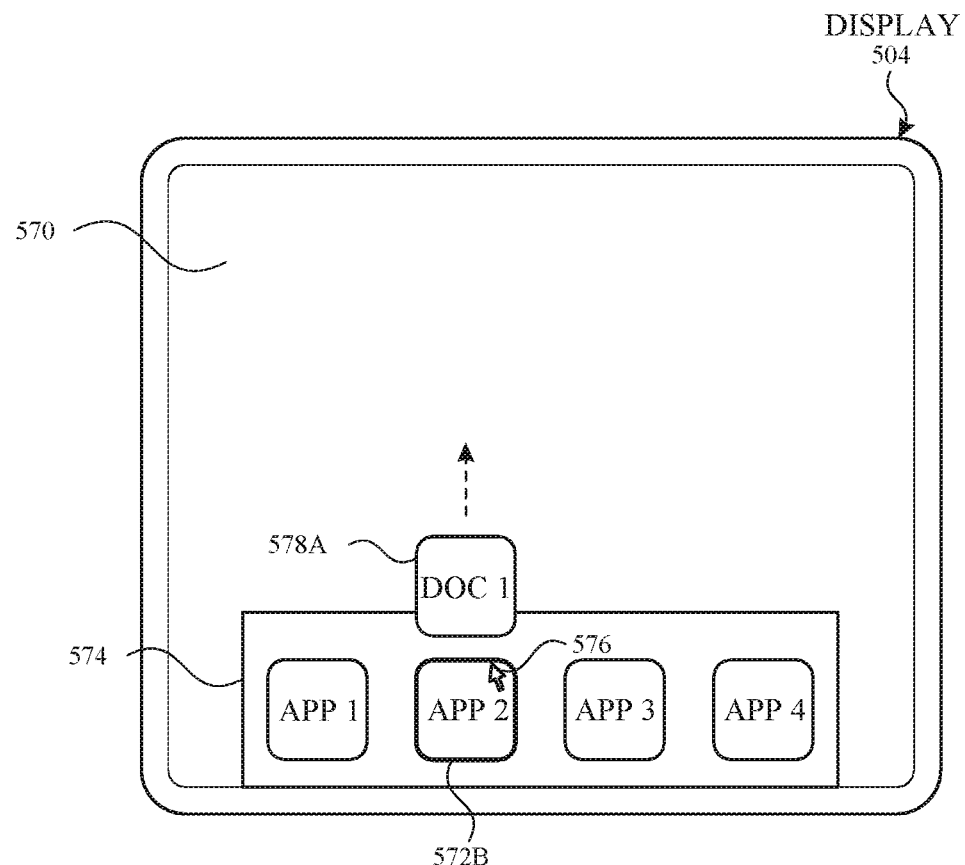
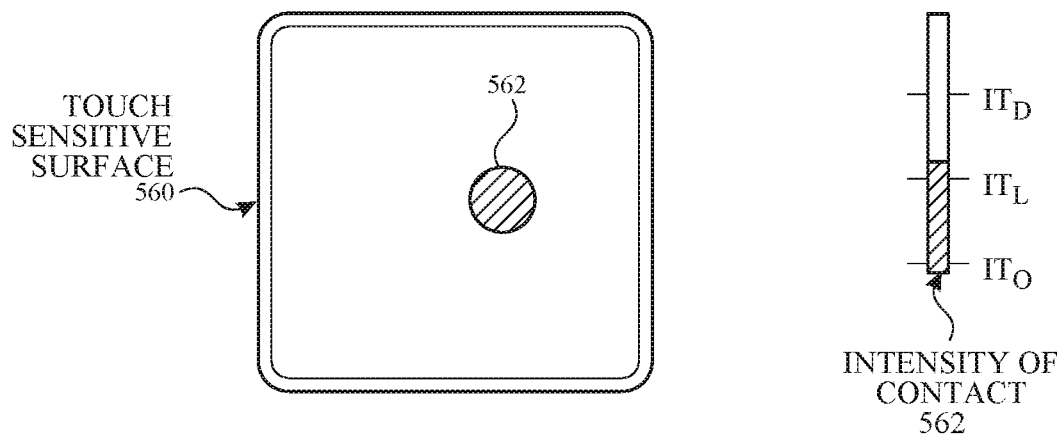
*FIG. 5F*

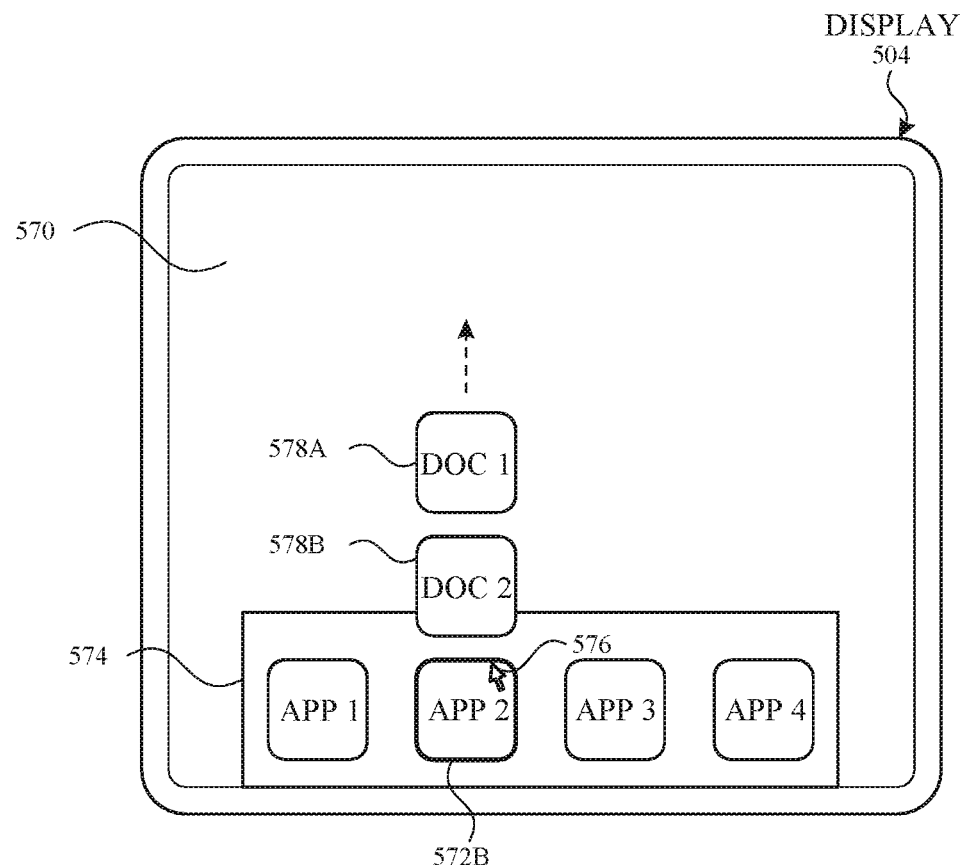
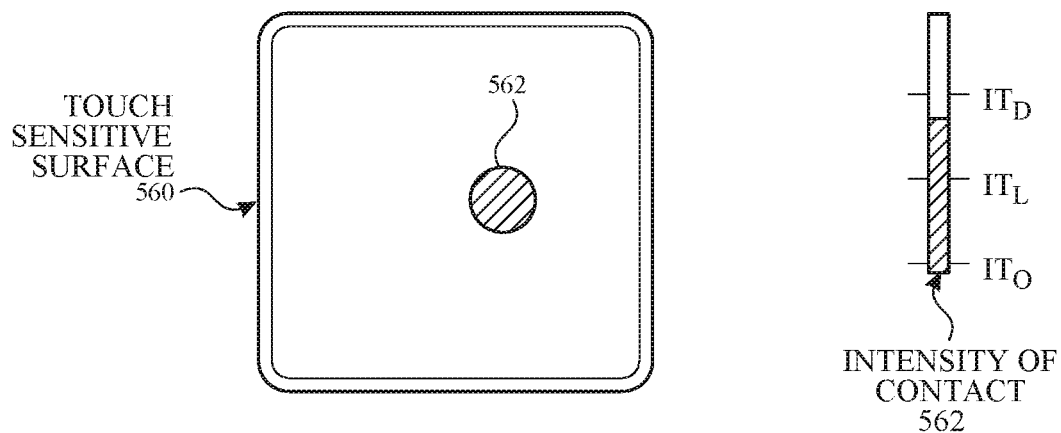
FIG. 5G

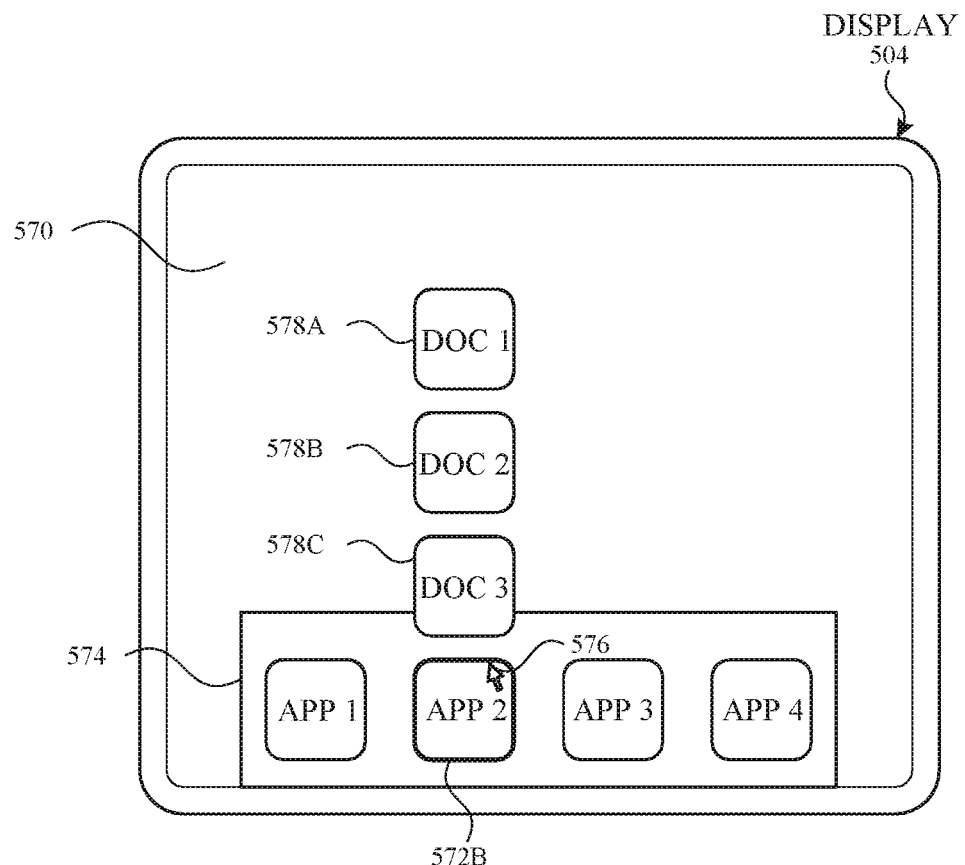
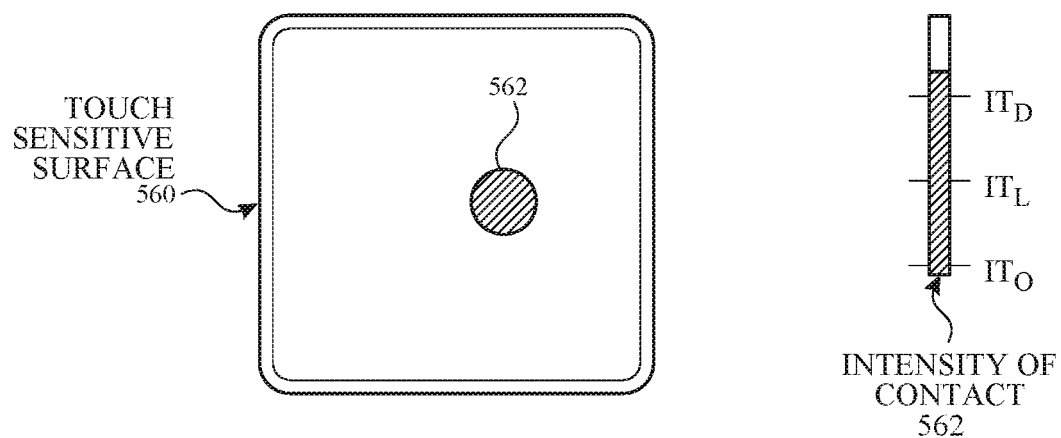
FIG. 5H

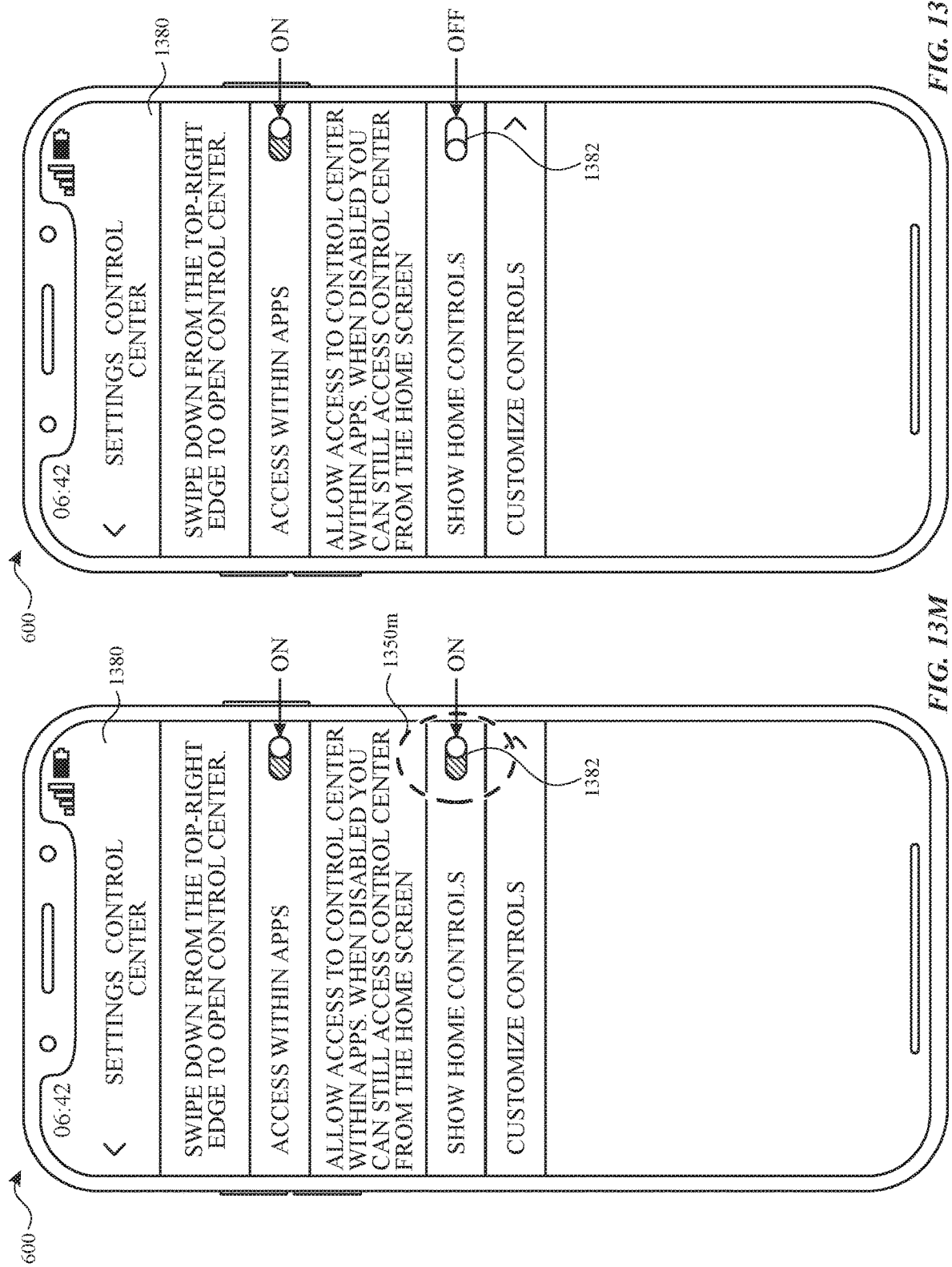

1400

1402
Display, via the display generation component, a first user interface that includes a first plurality of selectable user interface objects, wherein the first plurality of selectable user interface objects includes:

1404
A first selectable user interface object that, when selected, causes the computer system to modify a state of the computer system

1406
In accordance with a determination that the computer system is in a first use context, a second selectable user interface object that, when selected, causes a first external accessory device of a plurality of external accessory devices to perform a first function

1408
In accordance with a determination that the computer system is in a second use context that is different from the first use context, a third selectable user interface object, different from the second selectable user interface object, that, when selected, causes a second external accessory device of the plurality of external accessory devices to perform a second function, where the third selectable user interface object is not included in the user interface in accordance with a determination that the computer system is in the first use context

*FIG. 14*

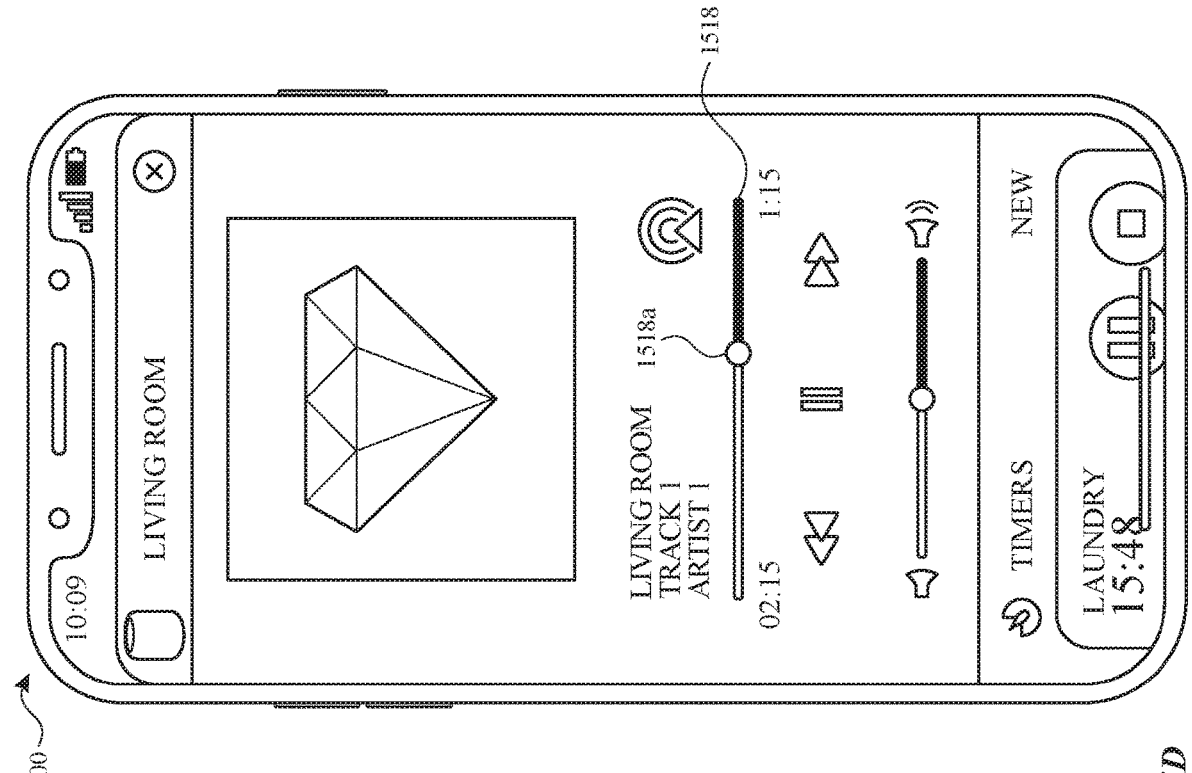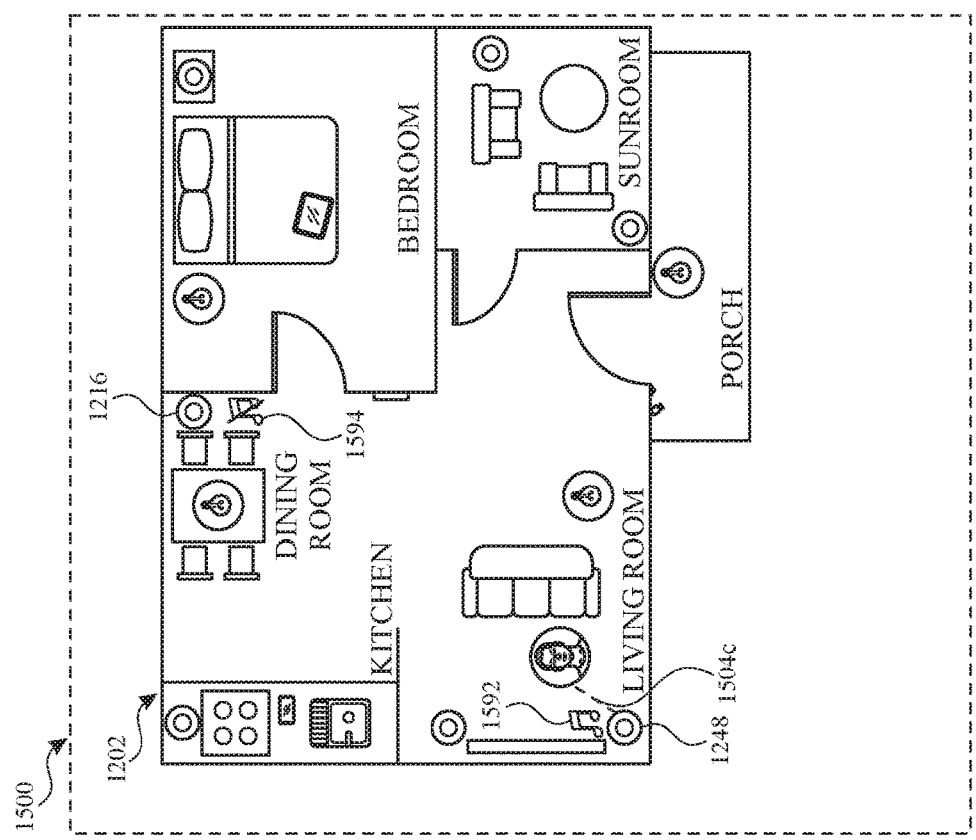
FIG. 15D

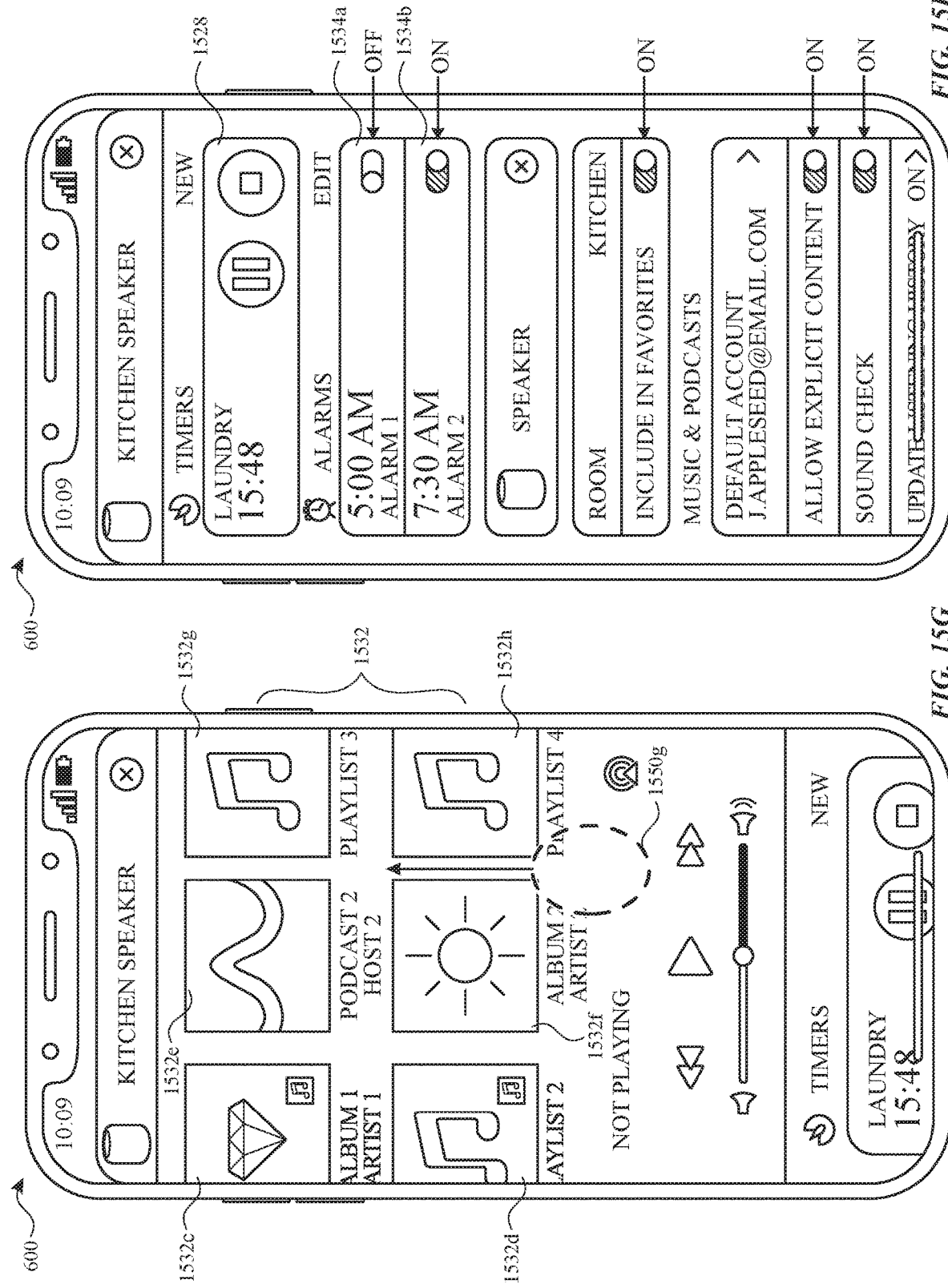

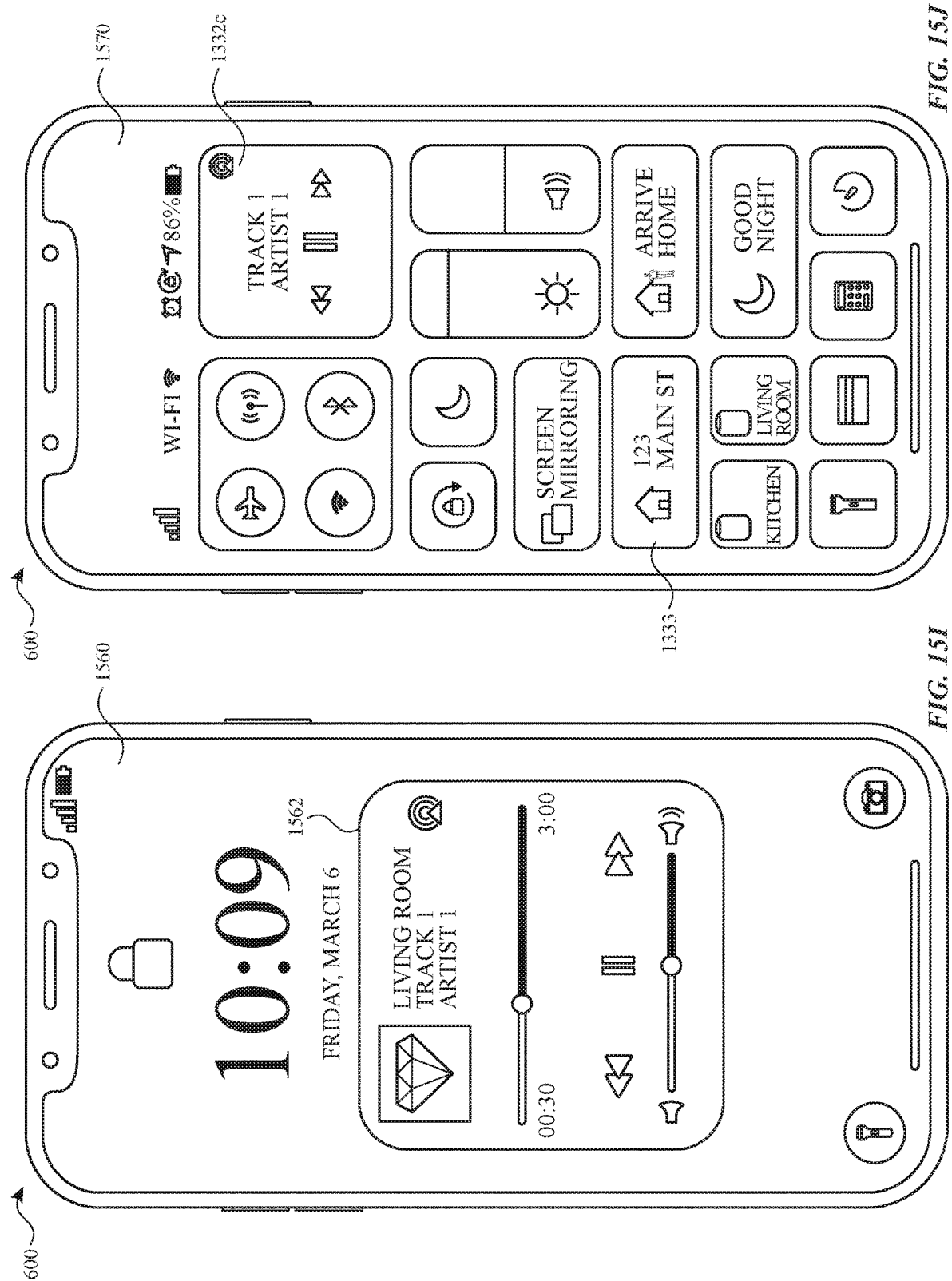

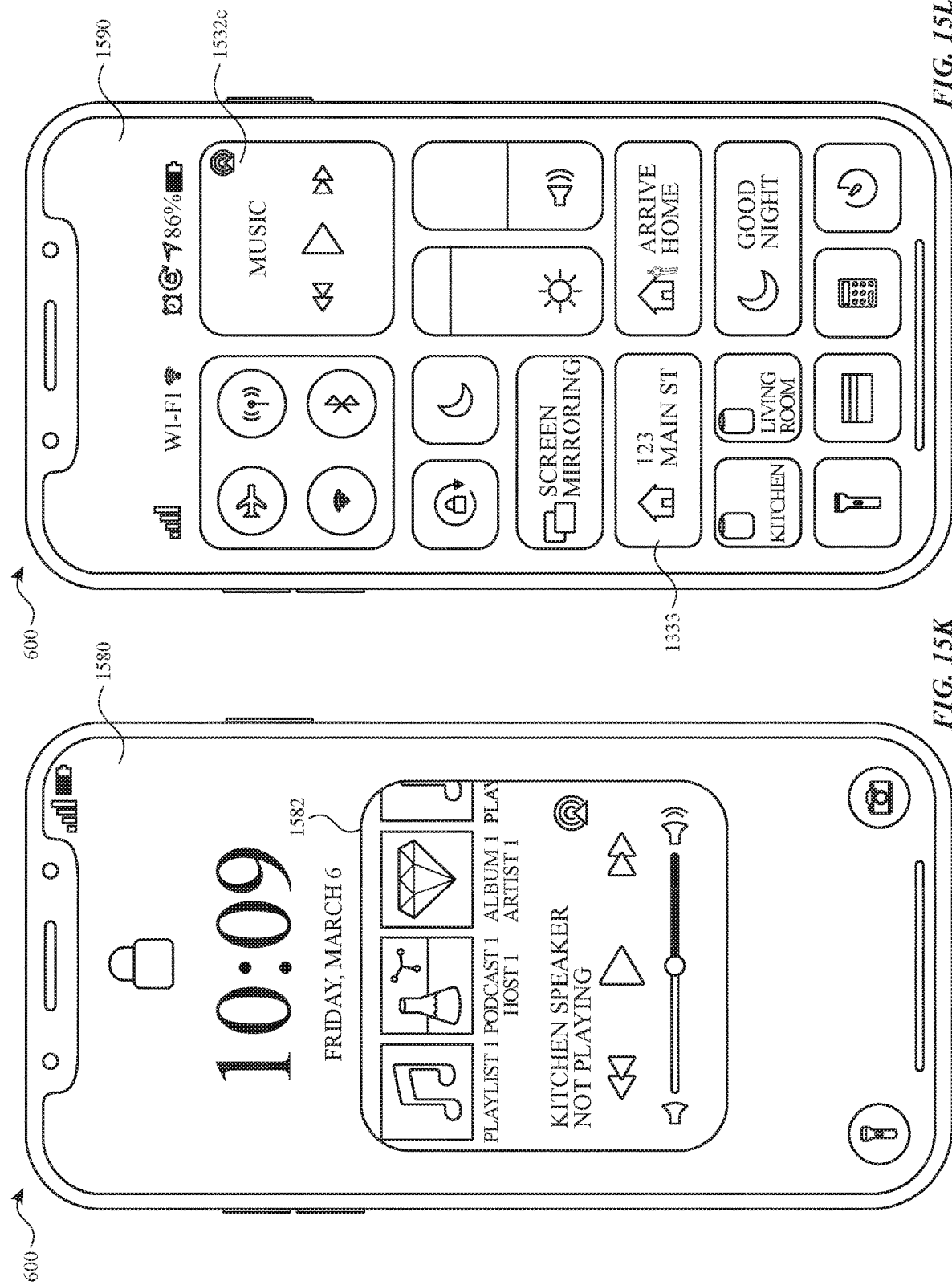

1600

1602
Receive data indicating a current media playback state of an external media playback device.

1604
In response to receiving the data and in accordance with a determination that a set of external media playback device control criteria are met, display, via the display generation component, a user interface for controlling media playback at the external media playback device that includes:

1606
In accordance with a determination that the data indicates that the external media playback device is currently performing a media playback operation, a first selectable user interface object that, when selected via the one or more input devices, causes the external media playback device to modify the media playback operation.

1608
In accordance with a determination that the data indicates that the external media playback device is not currently performing a media playback operation:

1610
A second selectable user interface object that, when selected via the one or more input devices, causes the external media playback device to initiate playback of a first predetermined media item

1612
A third selectable user interface object that, when selected via the one or more input devices, causes the external media playback device to initiate playback of a second predetermined media item

*FIG. 16*

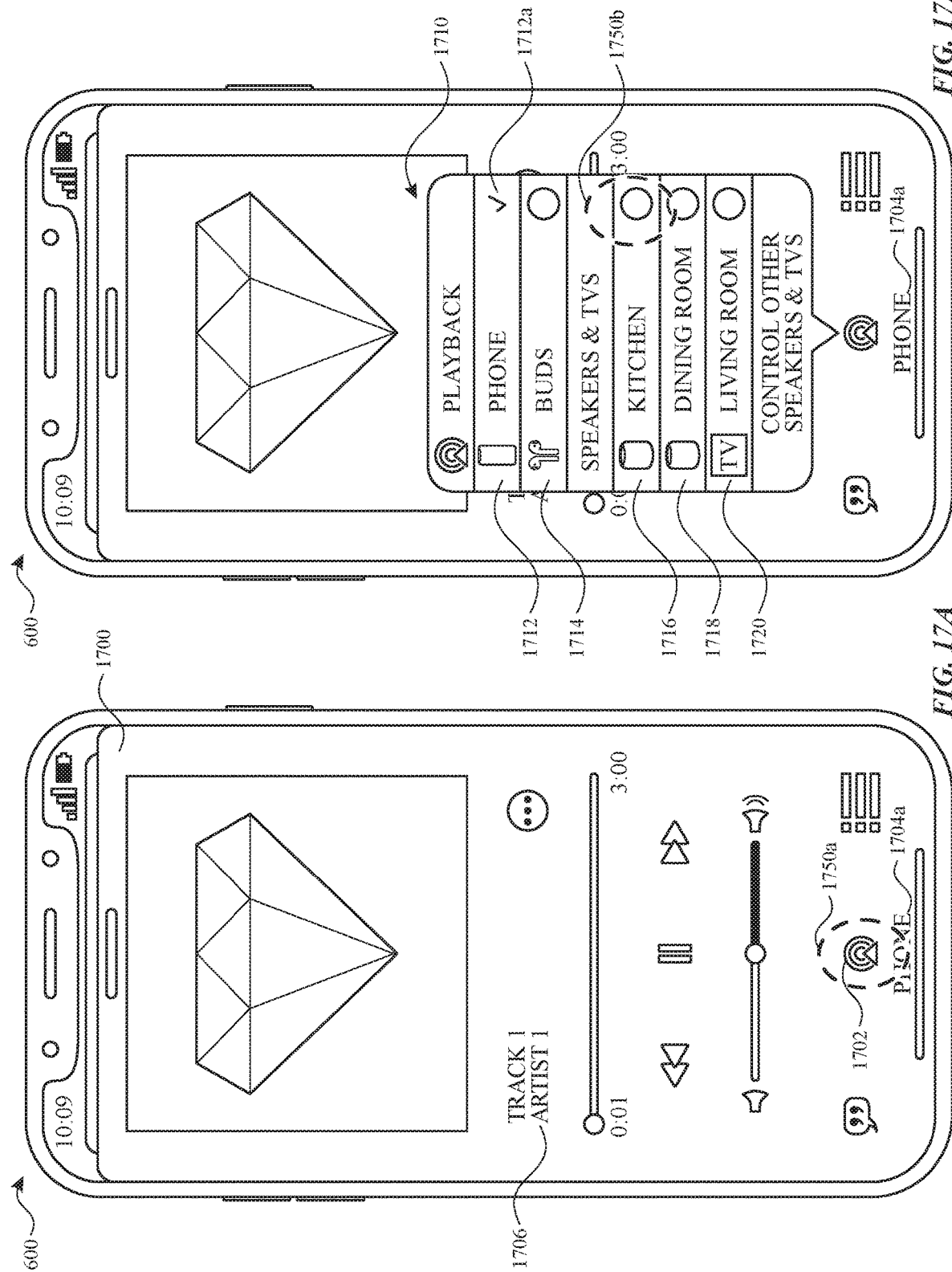

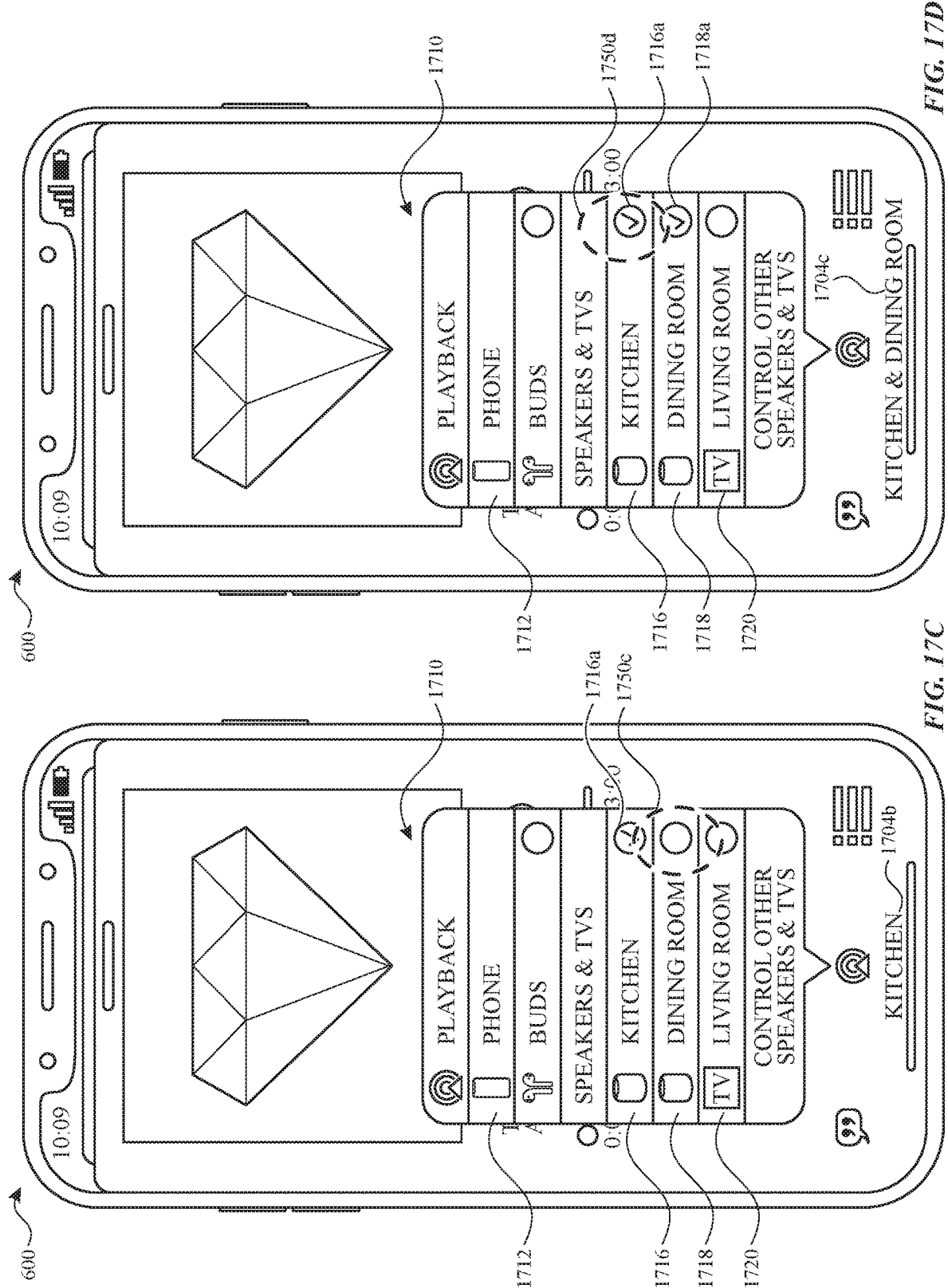

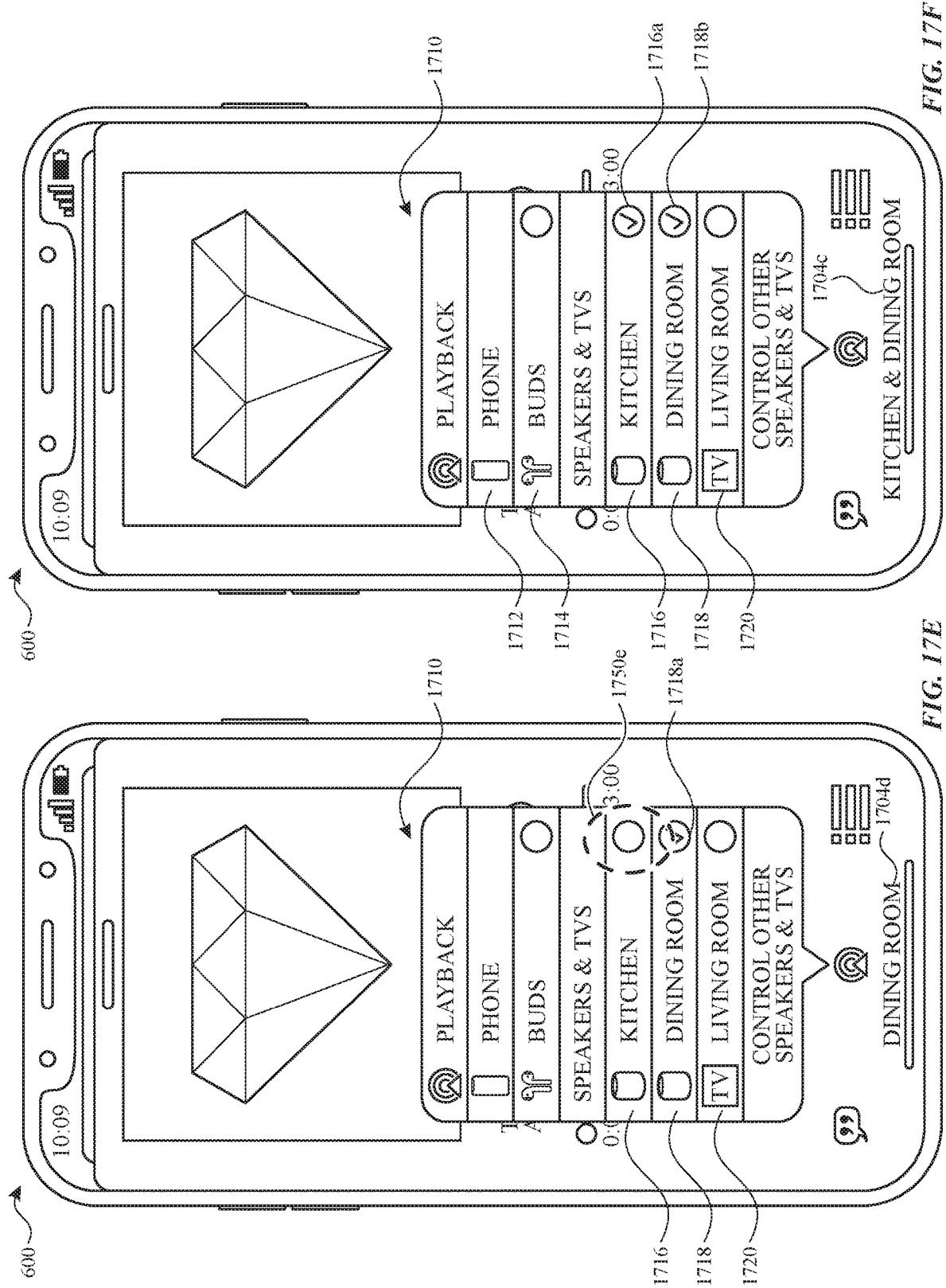

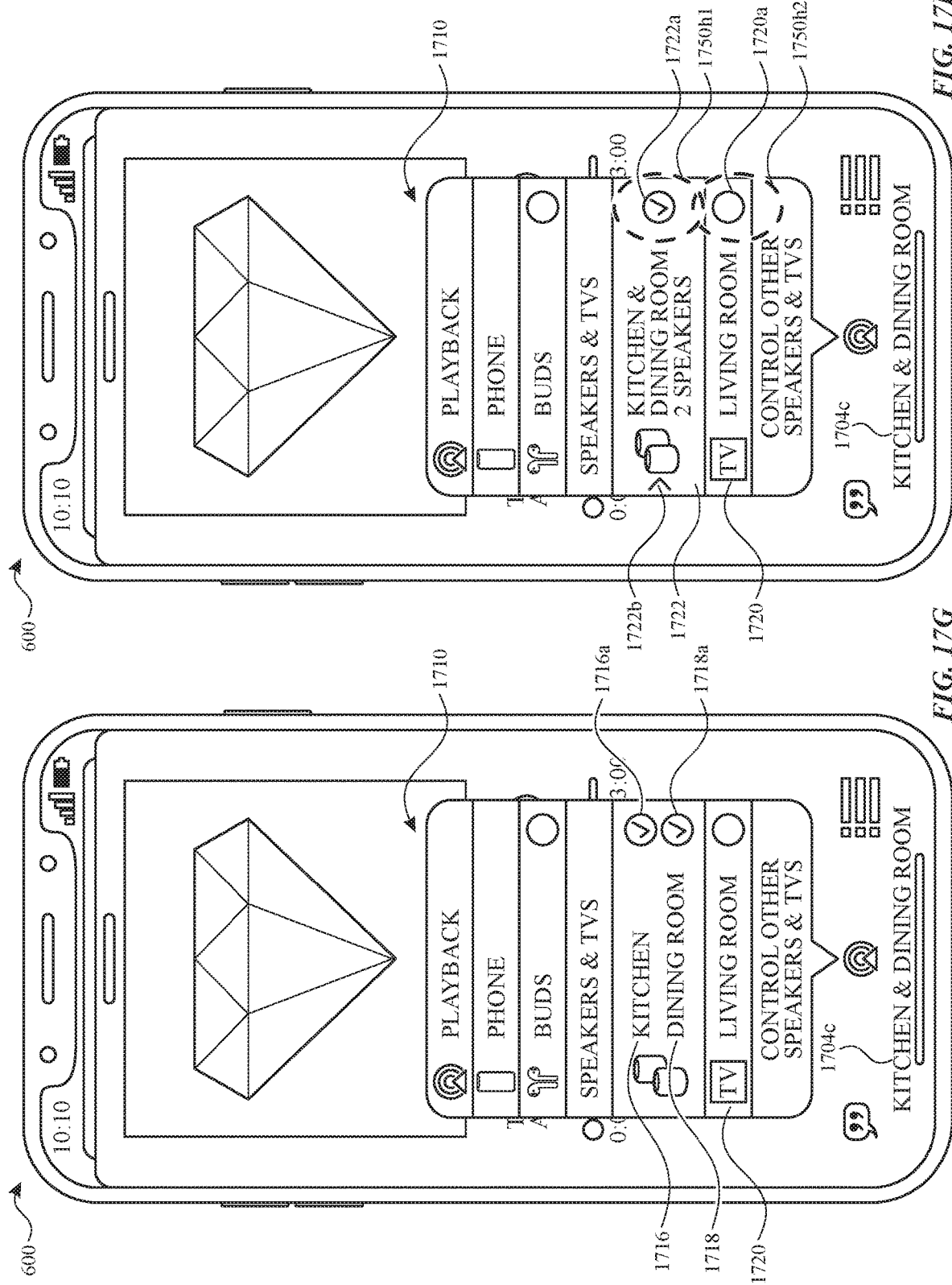

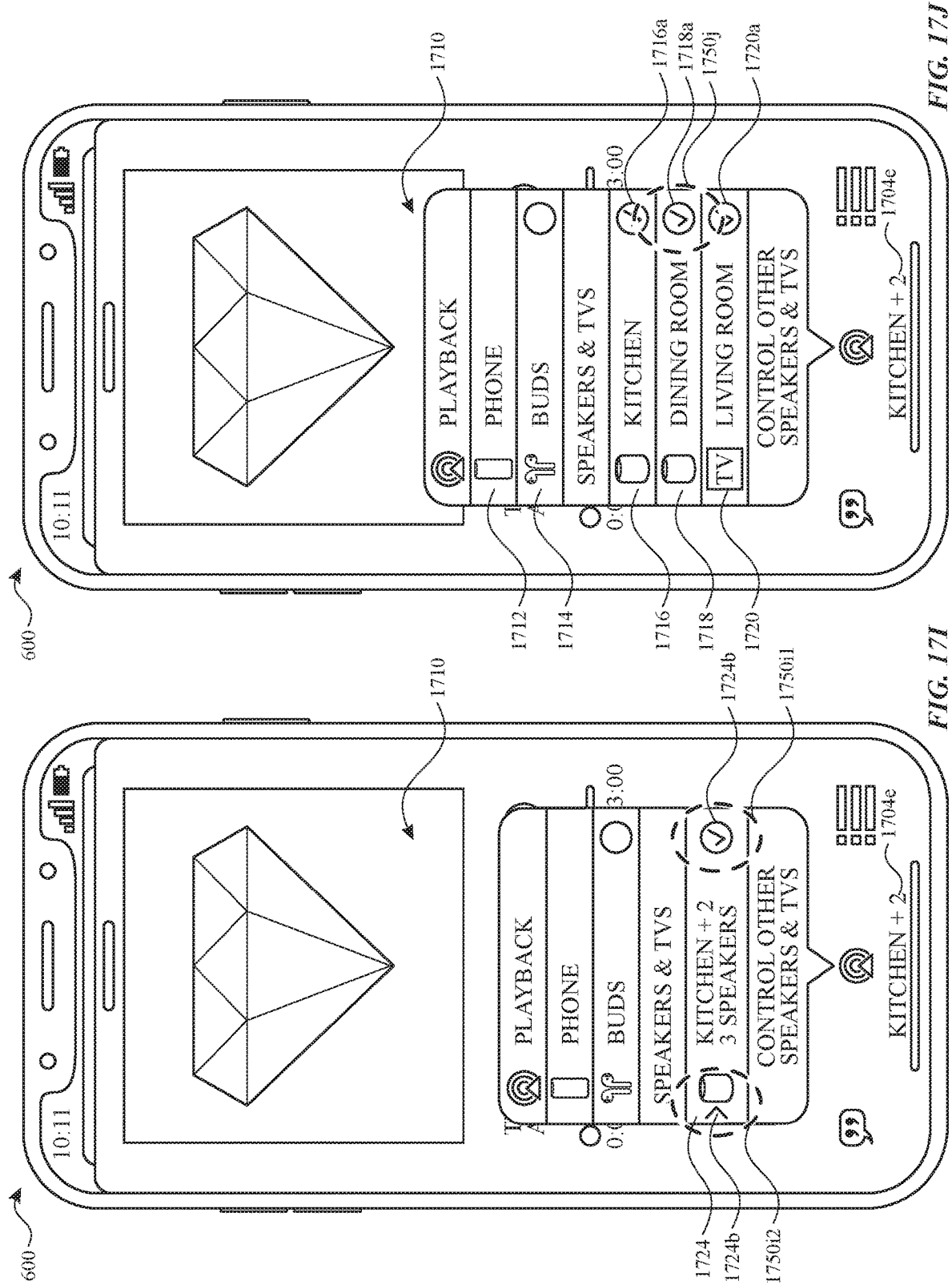

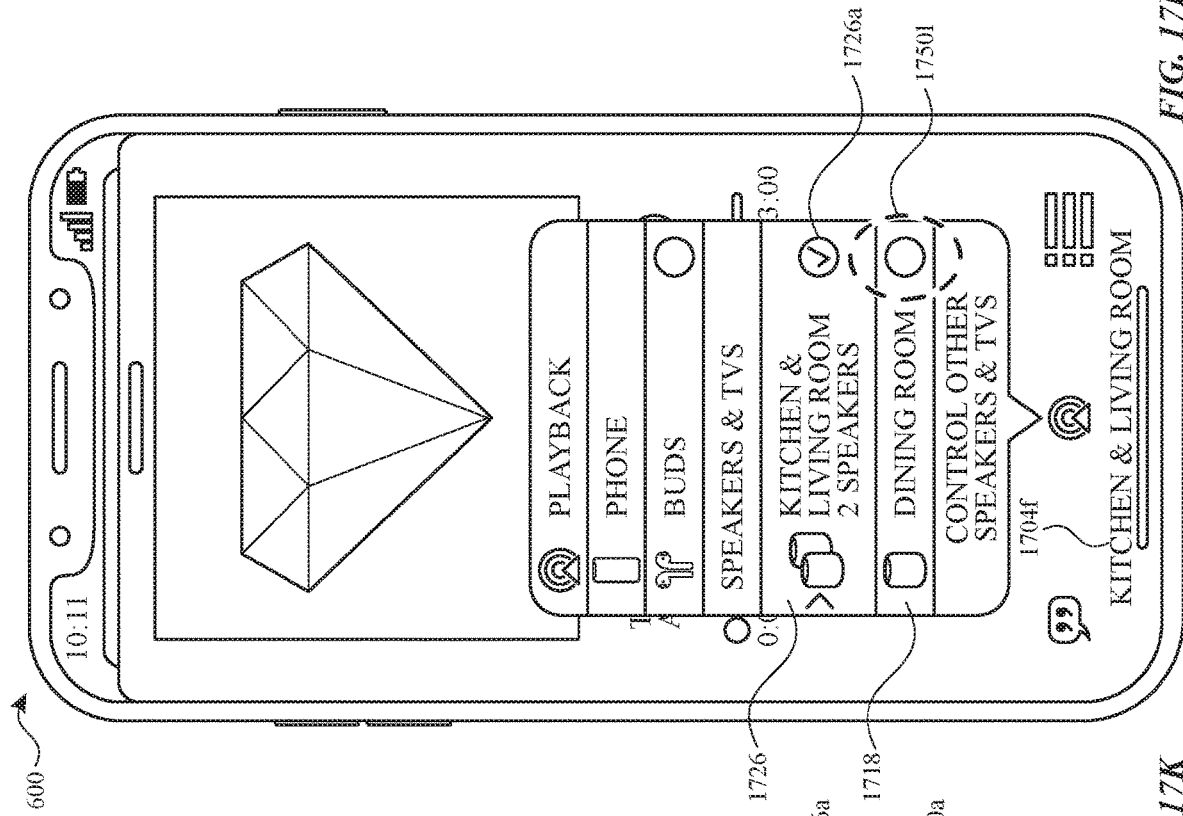
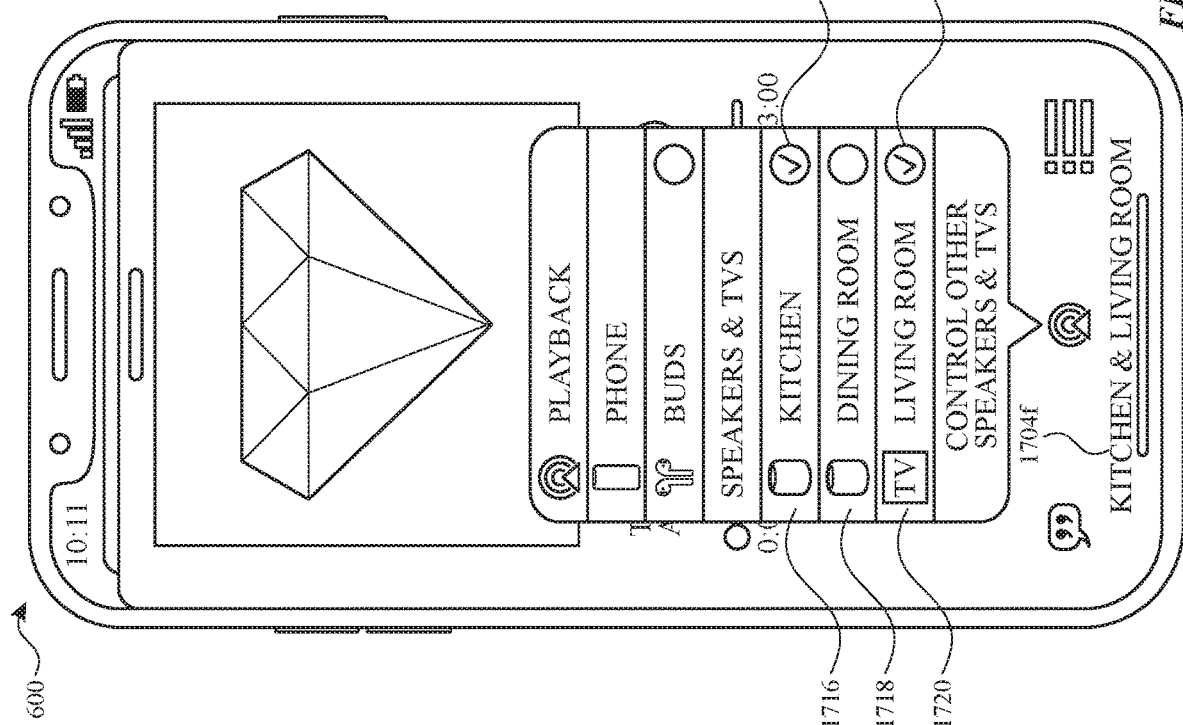

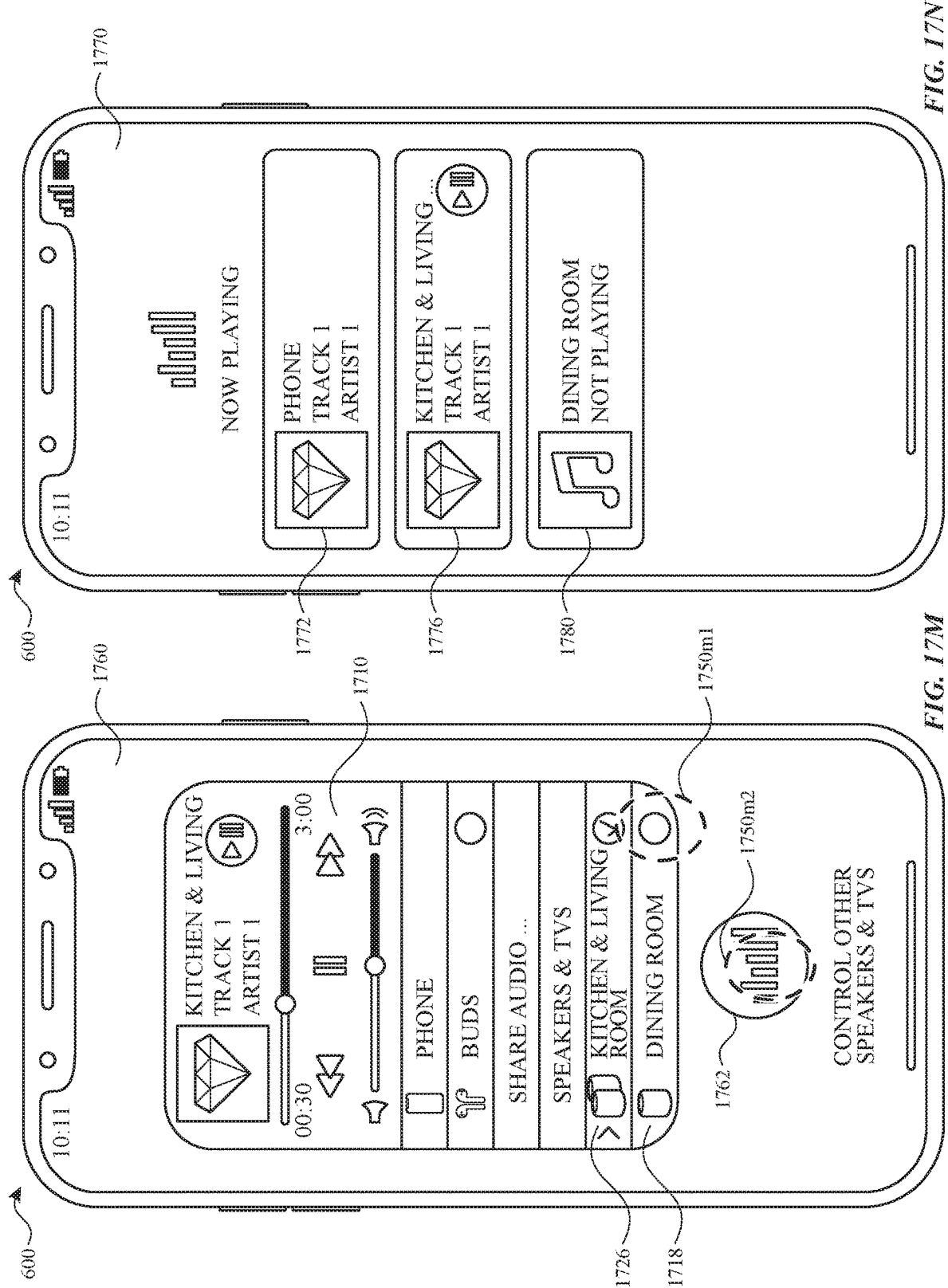

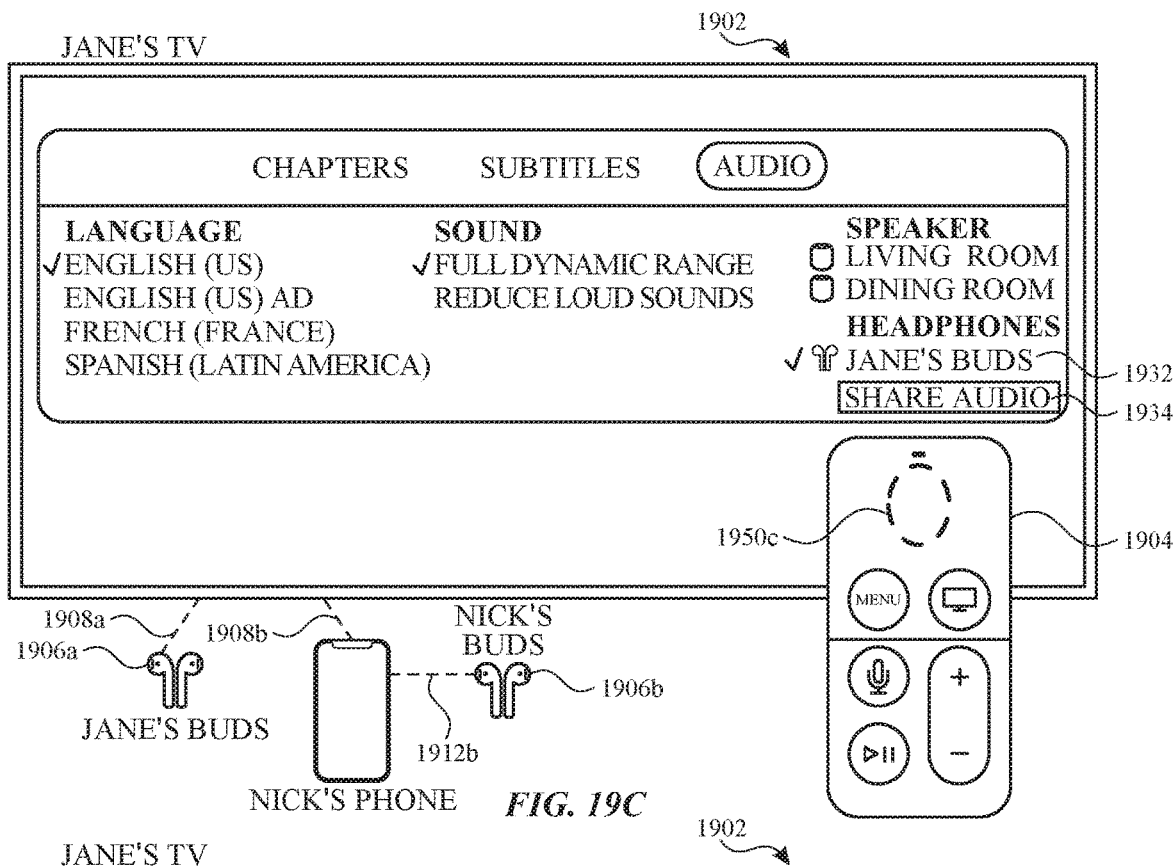
FIG. 19C
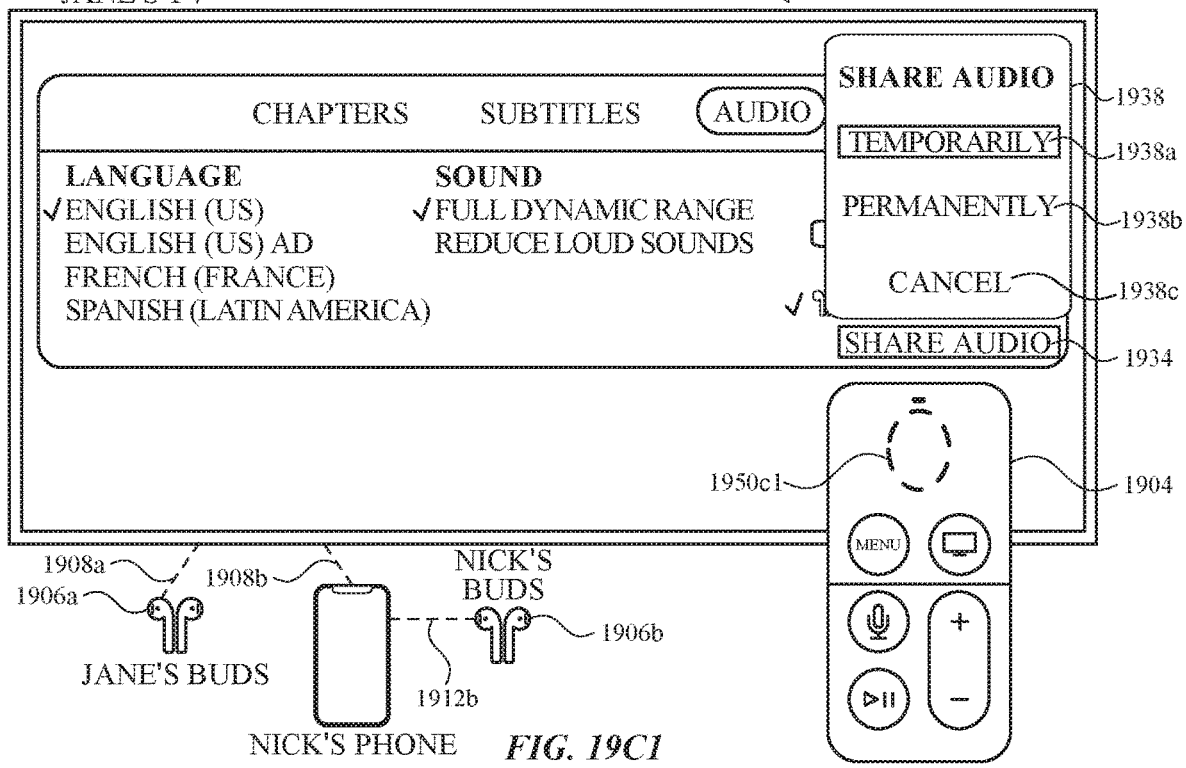
FIG. 19C1

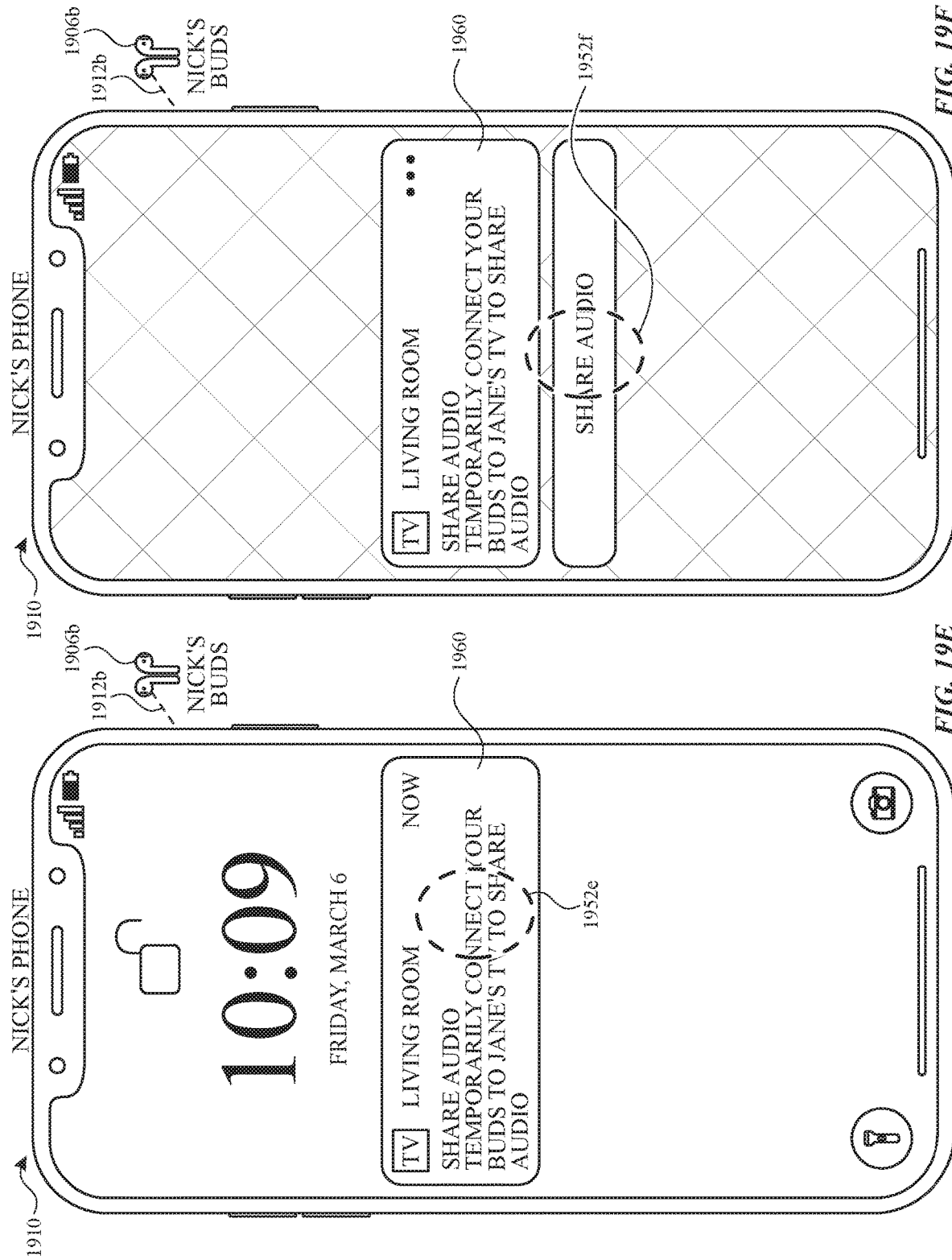

USER INTERFACES FOR AUDIO MEDIA CONTROL

CROSS-REFERENCE TO RELATED APPLICATIONS

This application is a continuation of U.S. patent application Ser. No. 16/888,775, titled "USER INTERFACES FOR AUDIO MEDIA CONTROL," tiled on May 31, 2020, which claims priority to U.S. Provisional Patent Application Ser. No. 63/032,603, titled "USER INTERFACES FOR AUDIO MEDIA CONTROL," filed on May 30, 2020 and U.S. Provisional Patent Application Ser. No. 62/855,852, titled "USER INTERFACES FOR AUDIO MEDIA CONTROL," filed on May 31, 2019. The contents of which are hereby incorporated by reference in their entireties.

FIELD

The present disclosure relates generally to computer user interfaces, and more specifically to techniques for controlling audio playback.

BACKGROUND

The number of electronic devices, and particularly smart devices, continues to increase. These devices are increasingly being interconnected with each other, are increasingly more capable, and are performing more complex tasks. As such, these devices are increasingly expected to have thoughtfully-designed user interfaces.

BRIEF SUMMARY

Some techniques for controlling audio playback using electronic devices, are generally cumbersome and inefficient. For example, some existing techniques use a complex and time-consuming user interface, which may include multiple key presses or keystrokes. Such techniques require more time than necessary, wasting user time and device energy. This latter consideration is particularly important in battery-operated devices.

Accordingly, the present technique provides electronic devices with faster, more efficient methods and interfaces for controlling audio playback. Such methods and interfaces optionally complement or replace other methods for controlling audio playback. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at an electronic device with a display device detecting, while connected to an external device, an indication that a physical proximity between the electronic device and the external device satisfies a proximity condition; in response to detecting the indication that the physical proximity satisfies the proximity condition, displaying, via the display device, a first media information affordance representing a first media item, the first media information affordance including a first set of information about the first media item; receiving a first input representing selection of the first media information affordance; and in response to receiving the first input in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

Example non-transitory computer-readable storage media are described herein. An example non-transitory computer-readable storage medium stores one or more programs configured to be executed by one or more processors of an electronic device with a display device, the one or more programs including instructions for detecting, while connected to an external device, an indication that a physical proximity between the electronic device and the external device satisfies a proximity condition; in response to detecting the indication that the physical proximity satisfies the proximity condition, displaying, via the display device, a first media information affordance representing a first media item, the first media information affordance including a first set of information about the first media item; receiving a first input representing selection of the first media information affordance; and in response to receiving the first input in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

Example transitory computer-readable storage media are described herein. An example transitory computer-readable storage medium stores one or more programs configured to be executed by one or more processors of an electronic device with a display device, the one or more programs including instructions for detecting, while connected to an external device, an indication that a physical proximity between the electronic device and the external device satisfies a proximity condition; in response to detecting the indication that the physical proximity satisfies the proximity condition, displaying, via the display device, a first media information affordance representing a first media item, the first media information affordance including a first set of information about the first media item; receiving a first input representing selection of the first media information affordance; and in response to receiving the first input in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

Example electronic devices are described herein. An example electronic device includes a display device; one or more processors; and memory storing one or more programs configured to be executed by the one or more processors, the one or more programs including instructions for detecting, while connected to an external device, an indication that a physical proximity between the electronic device and the external device satisfies a proximity condition; in response to detecting the indication that the physical proximity satisfies the proximity condition, displaying, via the display device, a first media information affordance representing a first media item, the first media information affordance including a first set of information about the first media item; receiving a first input representing selection of the first media information affordance; and in response to receiving the first input in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

An example electronic device includes a display device; means for detecting, while connected to an external device, an indication that a physical proximity between the electronic device and the external device satisfies a proximity condition; means for, in response to detecting the indication that the physical proximity satisfies the proximity condition, displaying, via the display device, a first media information affordance representing a first media item, the first media information affordance including a first set of information about the first media item; means for receiving a first input representing selection of the first media information affordance; and means for, in response to receiving the first input in accordance with a determination that the first input is a first type of input, transmitting an instruction to the external device to initiate playback of the first media item on the external device; and in accordance with a determination that the first input is a second type of input different from the first type of input, displaying, via the display device, a second media information affordance representing the first media item, the second media information affordance different from the first media information affordance and including a second set of information about the first media item.

An example method includes, at an electronic device with a display device detecting, while connected to an external device, an indication that a physical proximity between the electronic device and the external device satisfies a proximity condition in response to detecting the indication that the physical proximity satisfies the proximity condition, displaying, via the display device, a first media information affordance representing a first media item that is currently playing on the external device, the first media information affordance including a first set of information about the first media item; receiving a first input representing selection of the first media information affordance; and in response to receiving the first input in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example non-transitory computer-readable storage medium stores one or more programs configured to be executed by one or more processors of an electronic device with a display device, the one or more programs including instructions for detecting, while connected to an external device, an indication that a physical proximity between the electronic device and the external device satisfies a proximity condition in response to detecting the indication that the physical proximity satisfies the proximity condition, displaying, via the display device, a first media information affordance representing a first media item that is currently playing on the external device, the first media information affordance including a first set of information about the first media item; receiving a first input representing selection of the first media information affordance; and in response to receiving the first input in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example transitory computer-readable storage medium stores one or more programs configured to be executed by one or more processors of an electronic device with a display device, the one or more programs including instructions for detecting, while connected to an external device, an indication that a physical proximity between the electronic device and the external device satisfies a proximity condition in response to detecting the indication that the physical proximity satisfies the proximity condition, displaying, via the display device, a first media information affordance representing a first media item that is currently playing on the external device, the first media information affordance including a first set of information about the first media item; receiving a first input representing selection of the first media information affordance; and in response to receiving the first input: in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example electronic device includes a display device; one or more processors; and memory storing one or more programs configured to be executed by the one or more processors, the one or more programs including instructions for detecting, while connected to an external device, an indication that a physical proximity between the electronic device and the external device satisfies a proximity condition in response to detecting the indication that the physical proximity satisfies the proximity condition, displaying, via the display device, a first media information affordance representing a first media item that is currently playing on the external device, the first media information affordance including a first set of information about the first media item; receiving a first input representing selection of the first media information affordance; and in response to receiving the first input in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example electronic device includes a display device; means for detecting, while connected to an external device, an indication that a physical proximity between the electronic device and the external device satisfies a proximity condition means for, in response to detecting the indication that the physical proximity satisfies the proximity condition, displaying, via the display device, a first media information affordance representing a first media item that is currently playing on the external device, the first media information affordance including a first set of information about the first media item; means for receiving a first input representing selection of the first media information affordance; and means for, in response to receiving the first input in accordance with a determination that the first input is a first type of input, initiating playback of the first media item on the electronic device; and in accordance with a determination that the first input is a second type of input different from the first type of input, displaying, via the display device, a second media information affordance representing the first media item, the second media information affordance different from the first media information affordance and including a second set of information about the first media item.

An example method includes, at an electronic device with a display device detecting, while connected to an external device, an indication that a physical proximity between the electronic device and the external device satisfies a first proximity condition; in response to detecting the indication that the physical proximity satisfies the first proximity condition, displaying, via the display device, a first media information affordance representing a first media item; while displaying the first media information affordance representing the first media item, detecting an indication that the physical proximity between the electronic device and the external device satisfies a second proximity condition; and in response to detecting the indication that the physical proximity satisfies the second proximity condition, initiating playback of the first media item.

An example non-transitory computer-readable storage medium stores one or more programs configured to be executed by one or more processors of an electronic device with a display device, the one or more programs including instructions for detecting, while connected to an external device, an indication that a physical proximity between the electronic device and the external device satisfies a first proximity condition; in response to detecting the indication that the physical proximity satisfies the first proximity condition, displaying, via the display device, a first media information affordance representing a first media item; while displaying the first media information affordance representing the first media item, detecting an indication that the physical proximity between the electronic device and the external device satisfies a second proximity condition; and in response to detecting the indication that the physical proximity satisfies the second proximity condition, initiating playback of the first media item.

An example transitory computer-readable storage medium stores one or more programs configured to be executed by one or more processors of an electronic device with a display device, the one or more programs including instructions for detecting, while connected to an external device, an indication that a physical proximity between the electronic device and the external device satisfies a first proximity condition; in response to detecting the indication that the physical proximity satisfies the first proximity condition, displaying, via the display device, a first media information affordance representing a first media item; while displaying the first media information affordance representing the first media item, detecting an indication that the physical proximity between the electronic device and the external device satisfies a second proximity condition; and in response to detecting the indication that the physical proximity satisfies the second proximity condition, initiating playback of the first media item.

An example electronic device includes a display device; one or more processors; and memory storing one or more programs configured to be executed by the one or more processors, the one or more programs including instructions for detecting, while connected to an external device, an indication that a physical proximity between the electronic device and the external device satisfies a first proximity condition; in response to detecting the indication that the physical proximity satisfies the first proximity condition, displaying, via the display device, a first media information affordance representing a first media item; while displaying the first media information affordance representing the first media item, detecting an indication that the physical proximity between the electronic device and the external device satisfies a second proximity condition; and in response to detecting the indication that the physical proximity satisfies the second proximity condition, initiating playback of the first media item.

An example electronic device includes a display device; means for detecting, while connected to an external device, an indication that a physical proximity between the electronic device and the external device satisfies a first proximity condition; means for, in response to detecting the indication that the physical proximity satisfies the first proximity condition, displaying, via the display device, a first media information affordance representing a first media item; means for, while displaying the first media information affordance representing the first media item, detecting an indication that the physical proximity between the electronic device and the external device satisfies a second proximity condition; and means for, in response to detecting the indication that the physical proximity satisfies the second proximity condition, initiating playback of the first media item.

An example method includes, at a computer system that is in communication with a display generation component and one or more input devices displaying, via the display generation component, a first user interface that includes a first plurality of selectable user interface objects, wherein the first plurality of selectable user interface objects includes a first selectable user interface object that, when selected, causes the computer system to modify a state of the computer system; in accordance with a determination that the computer system is in a first use context, a second selectable user interface object that, when selected, causes a first external accessory device of a plurality of external accessory devices to perform a first function; and in accordance with a determination that the computer system is in a second use context that is different from the first use context, a third selectable user interface object, different from the second selectable user interface object, that, when selected, causes a second external accessory device of the plurality of external accessory devices to perform a second function, wherein the third selectable user interface object is not included in the user interface in accordance with a determination that the computer system is in the first use context.

An example non-transitory computer-readable storage medium storing one or more programs configured to be executed by one or more processors of a computer system that is in communication with a display generation component and one or more input devices, the one or more programs including instructions for displaying, via the display generation component, a first user interface that includes a first plurality of selectable user interface objects, wherein the first plurality of selectable user interface objects includes a first selectable user interface object that, when selected, causes the computer system to modify a state of the computer system; in accordance with a determination that the computer system is in a first use context, a second selectable user interface object that, when selected, causes a first external accessory device of a plurality of external accessory devices to perform a first function; and in accordance with a determination that the computer system is in a second use context that is different from the first use context, a third selectable user interface object, different from the second selectable user interface object, that, when selected, causes a second external accessory device of the plurality of external accessory devices to perform a second function, wherein the third selectable user interface object is not included in the user interface in accordance with a determination that the computer system is in the first use context.

An example transitory computer-readable storage medium storing one or more programs configured to be executed by one or more processors of a computer system that is in communication with a display generation component and one or more input devices, the one or more programs including instructions for displaying, via the display generation component, a first user interface that includes a first plurality of selectable user interface objects, wherein the first plurality of selectable user interface objects includes: a first selectable user interface object that, when selected, causes the computer system to modify a state of the computer system; in accordance with a determination that the computer system is in a first use context, a second selectable user interface object that, when selected, causes a first external accessory device of a plurality of external accessory devices to perform a first function; and in accordance with a determination that the computer system is in a second use context that is different from the first use context, a third selectable user interface object, different from the second selectable user interface object, that, when selected, causes a second external accessory device of the plurality of external accessory devices to perform a second function, wherein the third selectable user interface object is not included in the user interface in accordance with a determination that the computer system is in the first use context.

An example computer system comprises one or more processors, wherein the computer system is in communication with a display generation component and one or more input devices; and memory storing one or more programs configured to be executed by the one or more processors. The one or more programs including instructions for displaying, via the display generation component, a first user interface that includes a first plurality of selectable user interface objects, wherein the first plurality of selectable user interface objects includes: a first selectable user interface object that, when selected, causes the computer system to modify a state of the computer system; in accordance with a determination that the computer system is in a first use context, a second selectable user interface object that, when selected, causes a first external accessory device of a plurality of external accessory devices to perform a first function; and in accordance with a determination that the computer system is in a second use context that is different from the first use context, a third selectable user interface object, different from the second selectable user interface object, that, when selected, causes a second external accessory device of the plurality of external accessory devices to perform a second function, wherein the third selectable user interface object is not included in the user interface in accordance with a determination that the computer system is in the first use context.

An example computer system comprises: means for displaying, via the display generation component, a first user interface that includes a first plurality of selectable user interface objects, wherein the computer system is in communication with a display generation component and one or more input devices, and wherein the first plurality of selectable user interface objects includes: a first selectable user interface object that, when selected, causes the computer system to modify a state of the computer system; in accordance with a determination that the computer system is in a first use context, a second selectable user interface object that, when selected, causes a first external accessory device of a plurality of external accessory devices to perform a first function; and in accordance with a determination that the computer system is in a second use context that is different from the first use context, a third selectable user interface object, different from the second selectable user interface object, that, when selected, causes a second external accessory device of the plurality of external accessory devices to perform a second function, wherein the third selectable user interface object is not included in the user interface in accordance with a determination that the computer system is in the first use context.

An example method includes, at a computer system that is in communication with a display generation component and one or more input devices receiving data indicating a current media playback state of an external media playback device; and in response to receiving the data and in accordance with a determination that a set of external media playback device control criteria are met, displaying, via the display generation component, a user interface for controlling media playback at the external media playback device that includes: in accordance with a determination that the data indicates that the external media playback device is currently performing a media playback operation, a first selectable user interface object that, when selected via the one or more input devices, causes the external media playback device to modify the media playback operation; and in accordance with a determination that the data indicates that the external media playback device is not currently performing a media playback operation a second selectable user interface object that, when selected via the one or more input devices, causes the external media playback device to initiate playback of a first predetermined media item; and a third selectable user interface object that, when selected via the one or more input devices, causes the external media playback device to initiate playback of a second predetermined media item.

An example non-transitory computer-readable storage medium storing one or more programs configured to be executed by one or more processors of a computer system that is in communication with a display generation component and one or more input devices, the one or more programs including instructions for receiving data indicating a current media playback state of an external media playback device; and in response to receiving the data and in accordance with a determination that a set of external media playback device control criteria are met, displaying, via the display generation component, a user interface for controlling media playback at the external media playback device that includes: in accordance with a determination that the data indicates that the external media playback device is currently performing a media playback operation, a first selectable user interface object that, when selected via the one or more input devices, causes the external media playback device to modify the media playback operation; and in accordance with a determination that the data indicates that the external media playback device is not currently performing a media playback operation: a second selectable user interface object that, when selected via the one or more input devices, causes the external media playback device to initiate playback of a first predetermined media item; and a third selectable user interface object that, when selected via the one or more input devices, causes the external media playback device to initiate playback of a second predetermined media item.

An example transitory computer-readable storage medium storing one or more programs configured to be executed by one or more processors of a computer system that is in communication with a display generation component and one or more input devices, the one or more programs including instructions for: receiving data indicating a current media playback state of an external media playback device; and in response to receiving the data and in accordance with a determination that a set of external media playback device control criteria are met, displaying, via the display generation component, a user interface for controlling media playback at the external media playback device that includes: in accordance with a determination that the data indicates that the external media playback device is currently performing a media playback operation, a first selectable user interface object that, when selected via the one or more input devices, causes the external media playback device to modify the media playback operation; and in accordance with a determination that the data indicates that the external media playback device is not currently performing a media playback operation: a second selectable user interface object that, when selected via the one or more input devices, causes the external media playback device to initiate playback of a first predetermined media item; and a third selectable user interface object that, when selected via the one or more input devices, causes the external media playback device to initiate playback of a second predetermined media item.

An example computer system comprises one or more processors, wherein the computer system is in communication with a display generation component and one or more input devices; and memory storing one or more programs configured to be executed by the one or more processors. The one or more programs including instructions for: receiving data indicating a current media playback state of an external media playback device; and in response to receiving the data and in accordance with a determination that a set of external media playback device control criteria are met, displaying, via the display generation component, a user interface for controlling media playback at the external media playback device that includes: in accordance with a determination that the data indicates that the external media playback device is currently performing a media playback operation, a first selectable user interface object that, when selected via the one or more input devices, causes the external media playback device to modify the media playback operation; and in accordance with a determination that the data indicates that the external media playback device is not currently performing a media playback operation: a second selectable user interface object that, when selected via the one or more input devices, causes the external media playback device to initiate playback of a first predetermined media item; and a third selectable user interface object that, when selected via the one or more input devices, causes the external media playback device to initiate playback of a second predetermined media item.

An example computer system comprises: means for receiving data indicating a current media playback state of an external media playback device, wherein the computer system is in communication with a display generation component and one or more input devices; and means, responsive to receiving the data and in accordance with a determination that a set of external media playback device control criteria are met, for displaying, via the display generation component, a user interface for controlling media playback at the external media playback device that includes: in accordance with a determination that the data indicates that the external media playback device is currently performing a media playback operation, a first selectable user interface object that, when selected via the one or more input devices, causes the external media playback device to modify the media playback operation; and in accordance with a determination that the data indicates that the external media playback device is not currently performing a media playback operation: a second selectable user interface object that, when selected via the one or more input devices, causes the external media playback device to initiate playback of a first predetermined media item; and a third selectable user interface object that, when selected via the one or more input devices, causes the external media playback device to initiate playback of a second predetermined media item.

An example method includes, at a computer system that is in communication with a display generation component and one or more input devices displaying, via the display generation component, a user interface that includes: a first selectable user interface object for controlling a first set of one or more media playback devices; a second selectable user interface object for controlling a second set of one or more media playback devices that are different from the first set of one or more media playback devices; and an indication that the first selectable user interface object is selected; while the user interface includes the indication, receiving user input corresponding to a selection of the second selectable user interface object; and in response to receiving the user input corresponding to the selection of the second selectable user interface object and in accordance with a determination that a set of criteria is met: displaying, in the user interface, a third selectable user interface object for controlling a third set of one or media playback devices that includes the first set of one or more media playback devices and the second set of one or more media playback devices; and ceasing to display the first selectable user interface object and the second user interface object.

An example non-transitory computer-readable storage medium storing one or more programs configured to be executed by one or more processors of a computer system that is in communication with a display generation component and one or more input devices, the one or more programs including instructions for: displaying, via the display generation component, a user interface that includes: a first selectable user interface object for controlling a first set of one or more media playback devices; a second selectable user interface object for controlling a second set of one or more media playback devices that are different from the first set of one or more media playback devices; and an indication that the first selectable user interface object is selected; while the user interface includes the indication, receiving user input corresponding to a selection of the second selectable user interface object; and in response to receiving the user input corresponding to the selection of the second selectable user interface object and in accordance with a determination that a set of criteria is met: displaying, in the user interface, a third selectable user interface object for controlling a third set of one or media playback devices that includes the first set of one or more media playback devices and the second set of one or more media playback devices; and ceasing to display the first selectable user interface object and the second user interface object.

An example transitory computer-readable storage medium storing one or more programs configured to be executed by one or more processors of a computer system that is in communication with a display generation component and one or more input devices, the one or more programs including instructions for: displaying, via the display generation component, a user interface that includes: a first selectable user interface object for controlling a first set of one or more media playback devices; a second selectable user interface object for controlling a second set of one or more media playback devices that are different from the first set of one or more media playback devices; and an indication that the first selectable user interface object is selected; while the user interface includes the indication, receiving user input corresponding to a selection of the second selectable user interface object; and in response to receiving the user input corresponding to the selection of the second selectable user interface object and in accordance with a determination that a set of criteria is met: displaying, in the user interface, a third selectable user interface object for controlling a third set of one or media playback devices that includes the first set of one or more media playback devices and the second set of one or more media playback devices; and ceasing to display the first selectable user interface object and the second user interface object.

An example computer system comprises one or more processors, wherein the computer system is in communication with a display generation component and one or more input devices; and memory storing one or more programs configured to be executed by the one or more processors. The one or more programs including instructions for: displaying, via the display generation component, a user interface that includes: a first selectable user interface object for controlling a first set of one or more media playback devices; a second selectable user interface object for controlling a second set of one or more media playback devices that are different from the first set of one or more media playback devices; and an indication that the first selectable user interface object is selected; while the user interface includes the indication, receiving user input corresponding to a selection of the second selectable user interface object; and in response to receiving the user input corresponding to the selection of the second selectable user interface object and in accordance with a determination that a set of criteria is met: displaying, in the user interface, a third selectable user interface object for controlling a third set of one or media playback devices that includes the first set of one or more media playback devices and the second set of one or more media playback devices; and ceasing to display the first selectable user interface object and the second user interface object.

An example computer system comprises: means for displaying, via the display generation component, a user interface that includes: a first selectable user interface object for controlling a first set of one or more media playback devices; a second selectable user interface object for controlling a second set of one or more media playback devices that are different from the first set of one or more media playback devices; and an indication that the first selectable user interface object is selected; means, while the user interface includes the indication, for receiving user input corresponding to a selection of the second selectable user interface object; and means, responsive to receiving the user input corresponding to the selection of the second selectable user interface object and in accordance with a determination that a set of criteria is met, for: displaying, in the user interface, a third selectable user interface object for controlling a third set of one or media playback devices that includes the first set of one or more media playback devices and the second set of one or more media playback devices; and ceasing to display the first selectable user interface object and the second user interface object.

An example method includes, at a computer system: while the computer system is providing media to a first set of one or more devices, initiating a first process to provide the media to a second set of one or more devices, while continuing to provide the media to the first set of one or more devices, that includes: receiving, from a first external device that is in communication with the second set of one or more devices, first data that is indicative of a first request to progress the first process to provide the media to the second set of one or more devices; and receiving, second data that is indicative of a second request to progress the first process to provide the media to the second set of one or more devices, wherein the second data is received from a second external device that is in communication with the second set of one or more devices or is received from a first device of the second set of one or more devices; and after receiving the first data and the second data, providing the media to the second set of one or more devices while continuing to provide the media to the first set of one or more devices.

An example non-transitory computer-readable storage medium storing one or more programs configured to be executed by one or more processors, the one or more programs including instructions for: while the computer system is providing media to a first set of one or more devices, initiating a first process to provide the media to a second set of one or more devices, while continuing to provide the media to the first set of one or more devices, that includes: receiving, from a first external device that is in communication with the second set of one or more devices, first data that is indicative of a first request to progress the first process to provide the media to the second set of one or more devices; and receiving, second data that is indicative of a second request to progress the first process to provide the media to the second set of one or more devices, wherein the second data is received from a second external device that is in communication with the second set of one or more devices or is received from a first device of the second set of one or more devices; and after receiving the first data and the second data, providing the media to the second set of one or more devices while continuing to provide the media to the first set of one or more devices.

An example transitory computer-readable storage medium storing one or more programs configured to be executed by one or more processors of a computer system, the one or more programs including instructions for: while the computer system is providing media to a first set of one or more devices, initiating a first process to provide the media to a second set of one or more devices, while continuing to provide the media to the first set of one or more devices, that includes: receiving, from a first external device that is in communication with the second set of one or more devices, first data that is indicative of a first request to progress the first process to provide the media to the second set of one or more devices; and receiving, second data that is indicative of a second request to progress the first process to provide the media to the second set of one or more devices, wherein the second data is received from a second external device that is in communication with the second set of one or more devices or is received from a first device of the second set of one or more devices; and after receiving the first data and the second data, providing the media to the second set of one or more devices while continuing to provide the media to the first set of one or more devices.

An example computer system comprises one or more processors and memory storing one or more programs configured to be executed by the one or more processors. The one or more programs including instructions for: while the computer system is providing media to a first set of one or more devices, initiating a first process to provide the media to a second set of one or more devices, while continuing to provide the media to the first set of one or more devices, that includes: receiving, from a first external device that is in communication with the second set of one or more devices, first data that is indicative of a first request to progress the first process to provide the media to the second set of one or more devices; and receiving, second data that is indicative of a second request to progress the first process to provide the media to the second set of one or more devices, wherein the second data is received from a second external device that is in communication with the second set of one or more devices or is received from a first device of the second set of one or more devices; and after receiving the first data and the second data, providing the media to the second set of one or more devices while continuing to provide the media to the first set of one or more devices.

An example computer system comprises: means, while the computer system is providing media to a first set of one or more devices, for initiating a first process to provide the media to a second set of one or more devices, while continuing to provide the media to the first set of one or more devices, that includes: means for receiving, from a first external device that is in communication with the second set of one or more devices, first data that is indicative of a first request to progress the first process to provide the media to the second set of one or more devices; and means for receiving, second data that is indicative of a second request to progress the first process to provide the media to the second set of one or more devices, wherein the second data is received from a second external device that is in communication with the second set of one or more devices or is received from a first device of the second set of one or more devices; and means, after receiving the first data and the second data, for providing the media to the second set of one or more devices while continuing to provide the media to the first set of one or more devices.

An example method includes, at a computer system that is in communication with one or more input devices: receiving, from a first user, a first request to perform an operation; in response to the first request, initiating performance of a first operation, wherein the first operation is performed based on at least a first performance parameter; after initiating performance of the first operation, receiving, via the one or more input devices, a second request to perform an operation; and in response to receiving the second request: in accordance with a determination that the second request was made by the first user, initiating performance of, wherein the second operation is performed based on at least the first performance parameter; and in accordance with a determination that the second request was made by a second user different than the first user, initiating performance of a third operation different from the first operation.

An example non-transitory computer-readable storage medium storing one or more programs configured to be executed by one or more processors of a computer system that is in communication with a display generation component and one or more input devices, the one or more programs including instructions for: receiving, from a first user, a first request to perform an operation; in response to the first request, initiating performance of a first operation, wherein the first operation is performed based on at least a first performance parameter; after initiating performance of the first operation, receiving, via the one or more input devices, a second request to perform an operation; and in response to receiving the second request: in accordance with a determination that the second request was made by the first user, initiating performance of, wherein the second operation is performed based on at least the first performance parameter; and in accordance with a determination that the second request was made by a second user different than the first user, initiating performance of a third operation different from the first operation.

An example transitory computer-readable storage medium storing one or more programs configured to be executed by one or more processors of a computer system that is in communication with a display generation component and one or more input devices, the one or more programs including instructions for: receiving, from a first user, a first request to perform an operation; in response to the first request, initiating performance of a first operation, wherein the first operation is performed based on at least a first performance parameter; after initiating performance of the first operation, receiving, via the one or more input devices, a second request to perform an operation; and in response to receiving the second request: in accordance with a determination that the second request was made by the first user, initiating performance of, wherein the second operation is performed based on at least the first performance parameter; and in accordance with a determination that the second request was made by a second user different than the first user, initiating performance of a third operation different from the first operation.

An exemplary computer system comprises one or more processors, wherein the computer system is in communication with a display generation component and one or more input devices; and memory storing one or more programs configured to be executed by the one or more processors. The one or more programs including instructions for: receiving, from a first user, a first request to perform an operation; in response to the first request, initiating performance of a first operation, wherein the first operation is performed based on at least a first performance parameter; after initiating performance of the first operation, receiving, via the one or more input devices, a second request to perform an operation; and in response to receiving the second request: in accordance with a determination that the second request was made by the first user, initiating performance of, wherein the second operation is performed based on at least the first performance parameter; and in accordance with a determination that the second request was made by a second user different than the first user, initiating performance of a third operation different from the first operation.

An example computer system comprises: means for receiving, from a first user, a first request to perform an operation; means, responsive to the first request, for initiating performance of a first operation, wherein the first operation is performed based on at least a first performance parameter; means, after initiating performance of the first operation, for receiving, via the one or more input devices, a second request to perform an operation; and means, responsive to receiving the second request, for; in accordance with a determination that the second request was made by the first user, initiating performance of, wherein the second operation is performed based on at least the first performance parameter; and in accordance with a determination that the second request was made by a second user different than the first user, initiating performance of a third operation different from the first operation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for controlling audio playback, thereby increasing the effectiveness, efficiency, and user satisfaction with such devices. Such methods and interfaces may complement or replace other methods for controlling audio playback.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 14 illustrates an exemplary method in accordance with some embodiments.

FIGS. 15A-15L illustrate exemplary user interfaces in accordance with some embodiments.

FIG. 16 illustrates an exemplary method in accordance with some embodiments.

FIGS. 19A-19I illustrate exemplary user interfaces in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for controlling audio playback. Techniques described below allow a user to transfer playback of audio from one device to another by bringing the two devices in proximity of each other. For example, while playing music on a phone, a user can place the phone close to a wireless speaker to transfer playback of the music to the wireless speaker, which might provide better sound quality than the phone. When the phone is brought into proximity of the speaker, a notification is displayed on the phone (e.g., at the top of a display of the phone) to notify the user that the music can be played on the speaker. The notification can be tapped to initiate playback of the music on the speaker. A swipe gesture pulling down on the notification, instead of initiating playback, provides an interface with additional information, such as a queue of recent and/or scheduled media items that can be selected for playback on the speaker. Audio media playing on the speaker can be transferred to the phone in a similar manner. While audio is playing on the speaker, bringing the phone in proximity of the speaker causes the phone to display a notification similar to the notification discussed above, except tapping the notification transfers the audio from the speaker to the phone, and swiping on the notification displays additional information for the media playing on the speaker. In some embodiments, while the notification is displayed, the phone can be brought in even closer proximity to the speaker to initiate playback without a touch input on a display of the phone. Such techniques can reduce the cognitive burden on a user who initiates playback of audio media, thereby enhancing productivity. Further, such techniques can reduce processor and battery power otherwise wasted on redundant user inputs.

Figure 7:
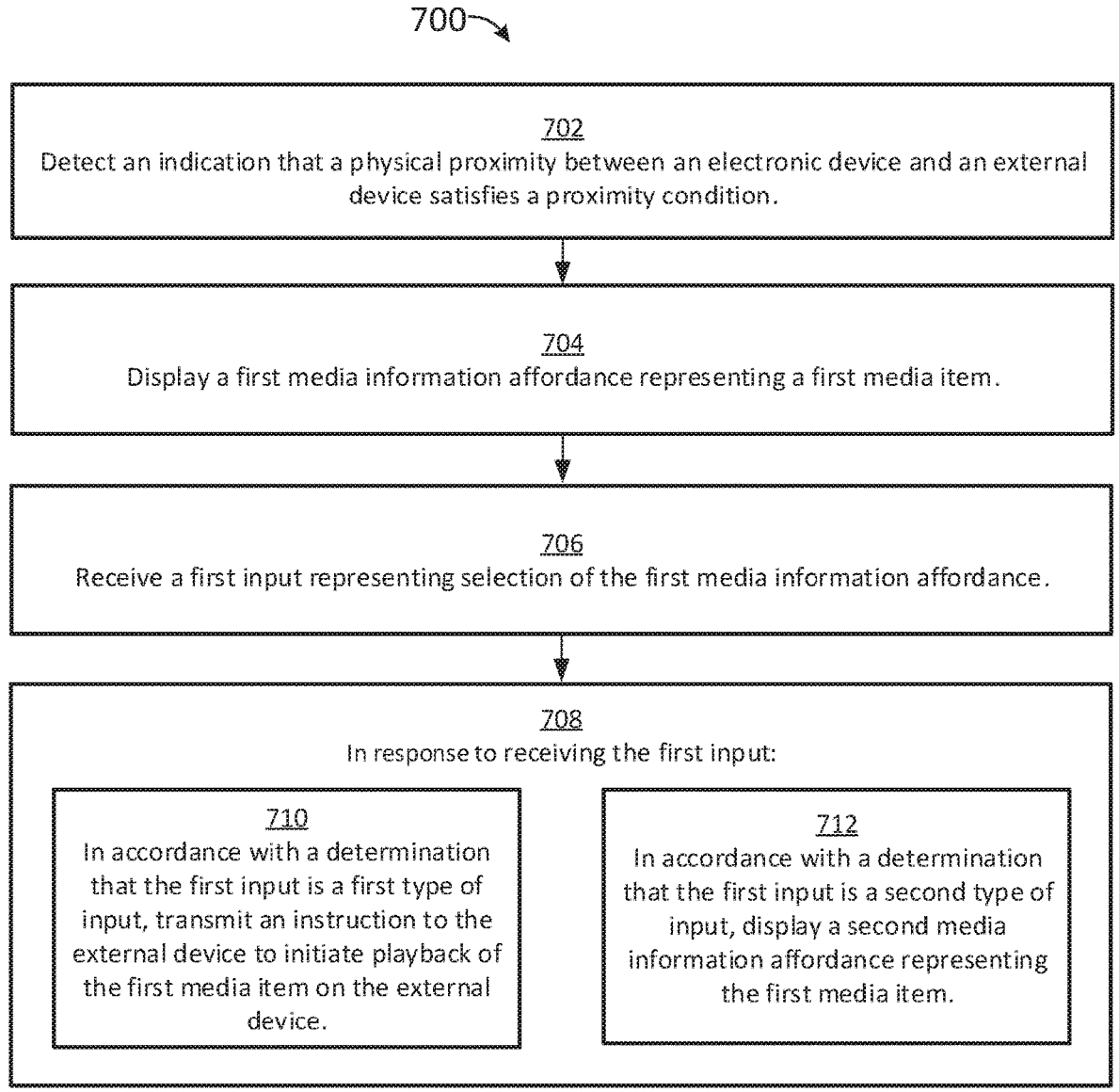
FIG. 7 illustrates an exemplary method in accordance with some embodiments.
Figure 8:
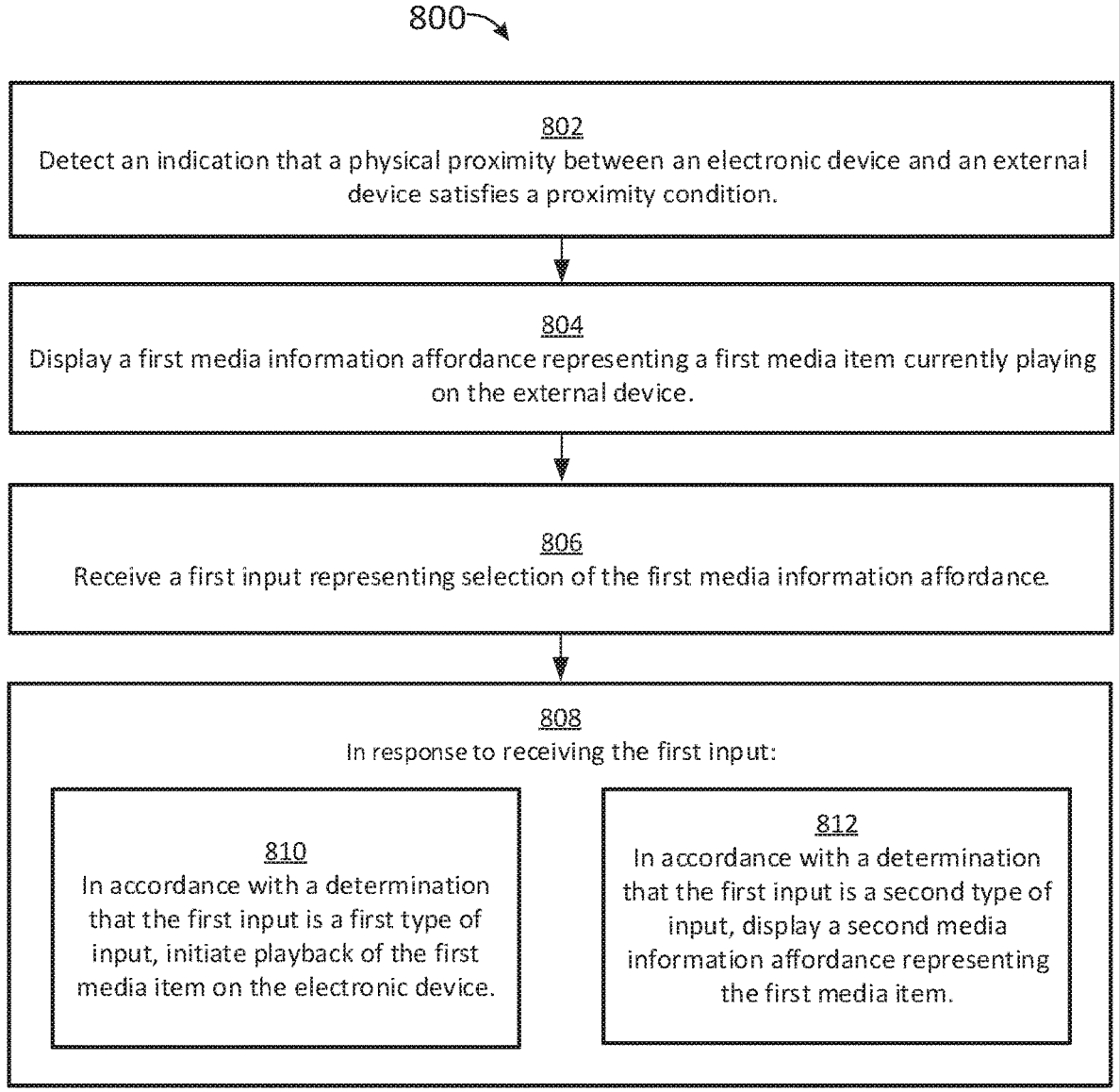
FIG. 8 illustrates an exemplary method in accordance with some embodiments.
Figure 12:
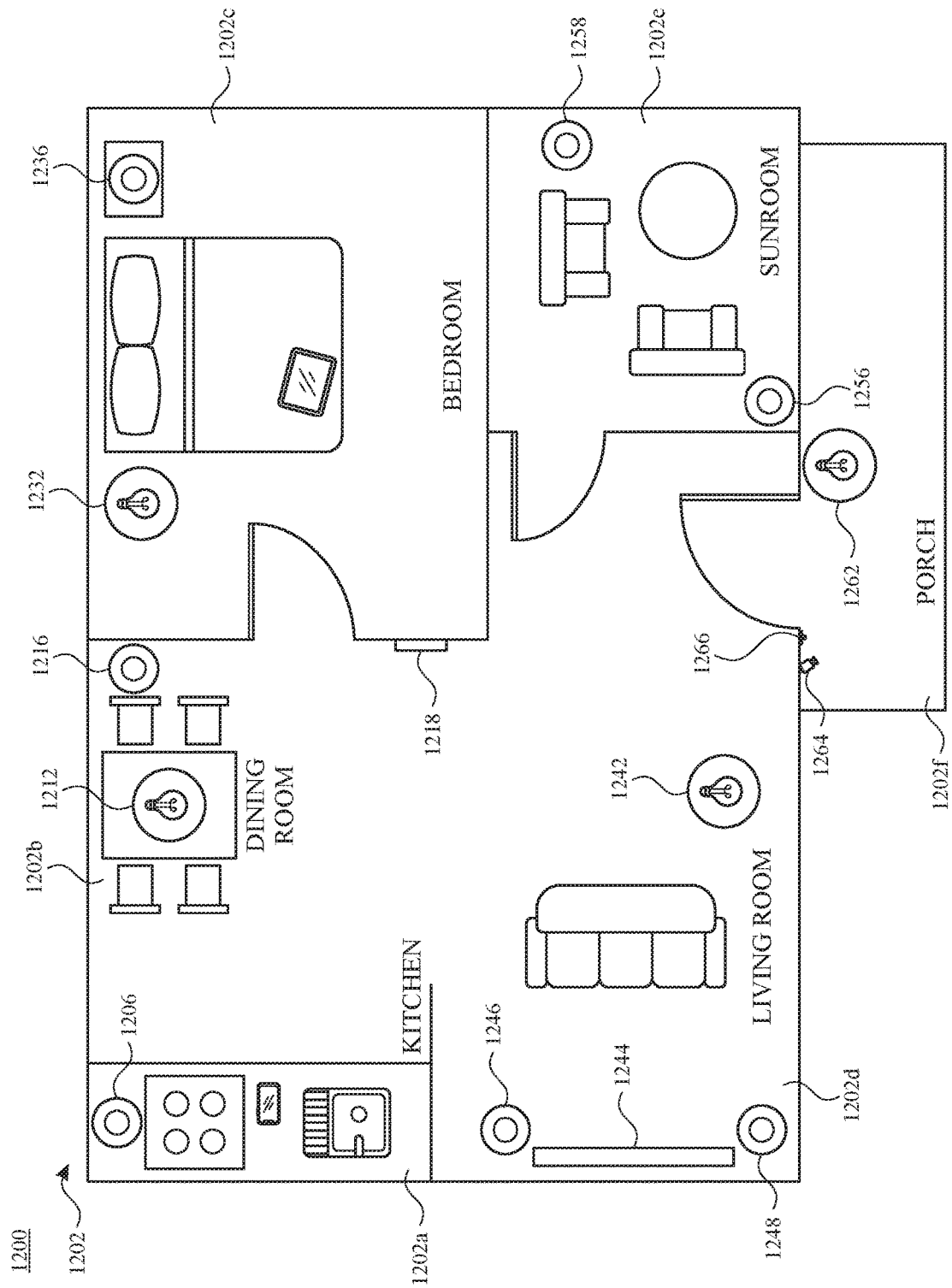
FIG. 12 is a diagram illustrating an exemplary set of devices in accordance with some embodiments.
Figure 13A:
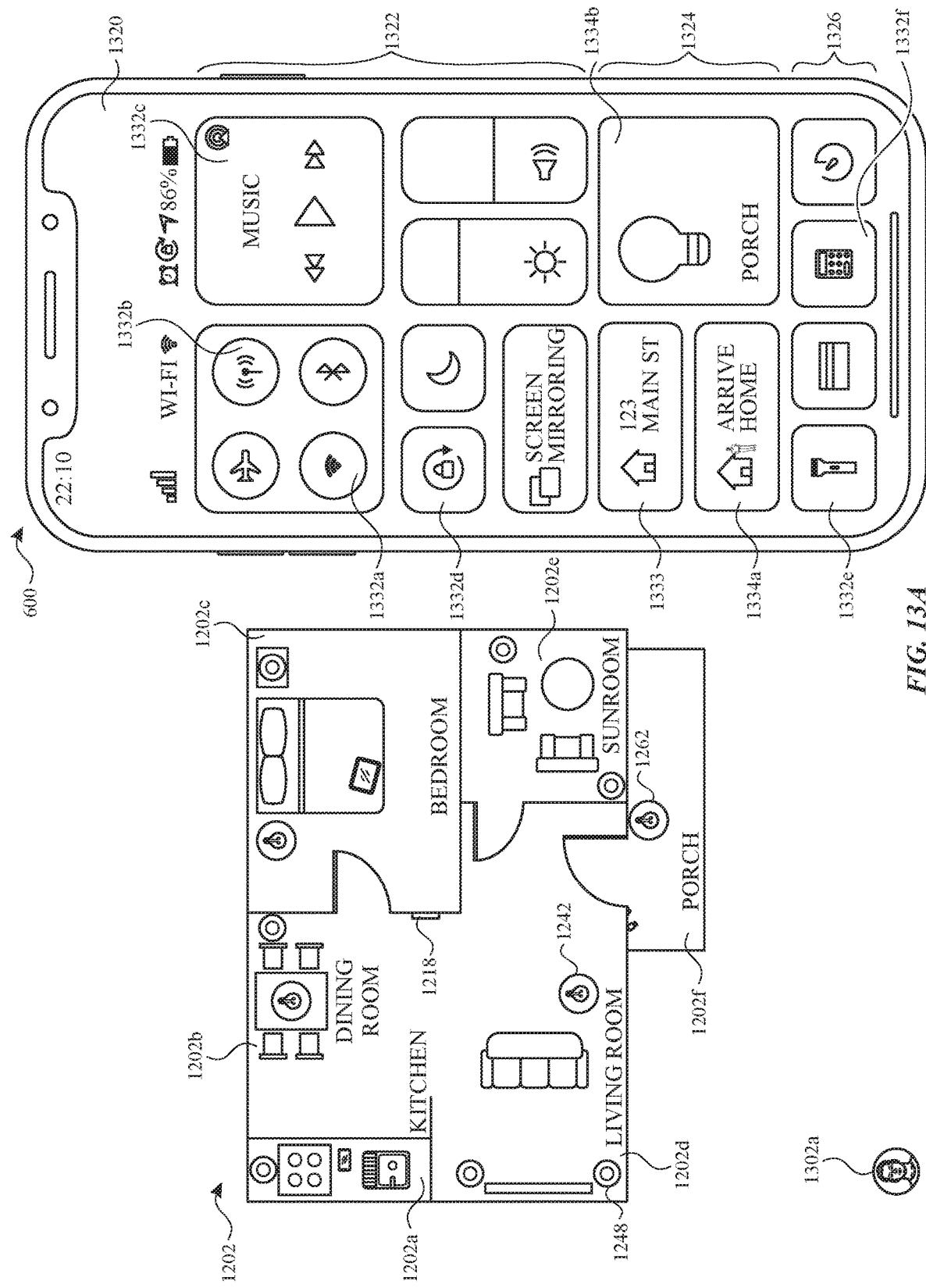
FIGS. 13A-13N illustrate exemplary user interfaces in accordance with some embodiments.

Below, FIGS. 1A-1B, 2, 3, 4A-4B, and 5A-5J provide a description of exemplary devices for performing the techniques for managing event notifications. FIGS. 6A-6P and 11A-11D illustrate exemplary user interfaces for controlling audio playback. FIGS. 7-8 are flow diagrams illustrating methods of controlling audio playback in accordance with some embodiments. The user interfaces in FIGS. 6A-6P and 11A-11D are used to illustrate the processes described below, including the processes shown in FIGS. 7-8. FIGS. 9A-9D and 11A-11D illustrate exemplary user interfaces for controlling audio playback. FIG. 10 is a flow diagram illustrating methods of controlling audio playback in accordance with some embodiments. The user interfaces in FIGS. 9A-9D and 11A-11D are used to illustrate the processes described below, including the processes shown in FIG. 10. FIG. 12 is a diagram illustrating an exemplary set of devices in accordance with some embodiments. The diagram in FIG. 12 is used to illustrate the processes described below, including the processes shown in FIGS. 14, 18, 20, and 23. FIGS. 13A-13N illustrate exemplary user interfaces for managing controls in accordance with some embodiments. FIG. 14 is a flow diagram illustrating methods for managing controls in accordance with some embodiments. The user interfaces in FIGS. 13A-13N are used to illustrate the processes described below, including the processes shown in FIG. 14. FIGS. 15A-15L illustrate exemplary user interfaces for controlling audio playback in accordance with some embodiments. FIG. 16 is a flow diagram illustrating methods for controlling audio playback in accordance with some embodiments. The user interfaces in FIGS. 15A-1SL are used to illustrate the processes described below, including the processes shown in FIG. 16. FIGS. 17A-17P illustrate exemplary user interfaces for managing controls for controlling audio playback on a group of devices in accordance with some embodiments. FIG. 18 is a flow diagram illustrating methods for managing controls for controlling audio playback on a group of devices. The user interfaces in FIGS. 17A-17P are used to illustrate the processes described below, including the processes shown in FIG. 18. FIGS. 19A-19I illustrate exemplary user interfaces for sharing media in accordance with some embodiments. FIG. 20 is a flow diagram illustrating methods for sharing media. The user interfaces in FIGS. 19A-19I are used to illustrate the processes described below, including the processes shown in FIG. 20. FIGS. 21A-21F illustrate exemplary user interfaces for managing voice input in accordance with some embodiments. FIGS. 22A-22F illustrate exemplary user interfaces for managing voice input in accordance with some embodiments. FIG. 23 is a flow diagram illustrating methods for managing voice input in accordance with some embodiments. The user interfaces in FIGS. 21A-21F and 22A-22F are used to illustrate the processes described below, including the processes shown in FIG. 23.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
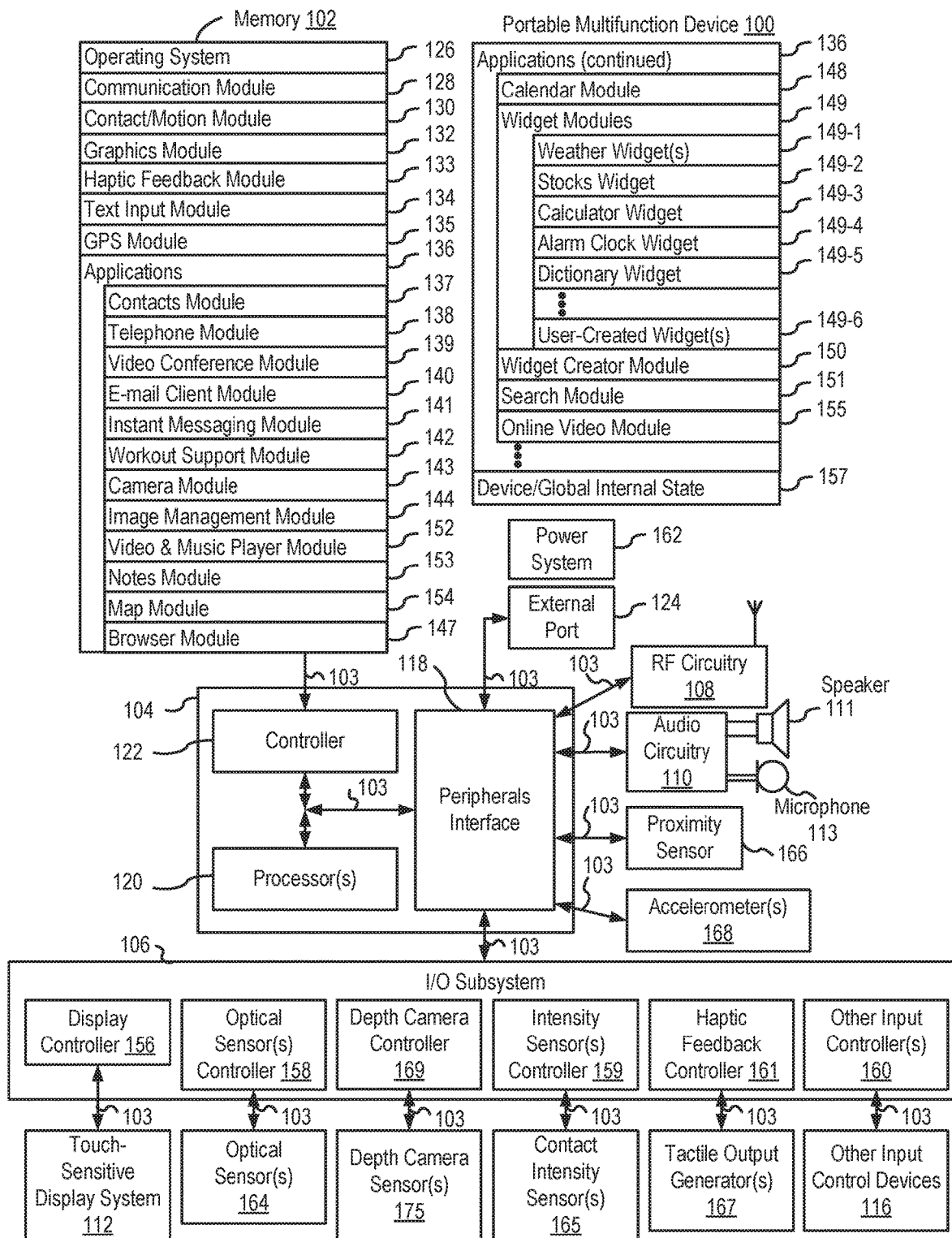
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data. GSM Environment (EDGE), high-speed downlink packet access (HSDPA), high-speed uplink packet access (HSUPA), Evolution, Data-Only (EV-DO), HSPA, HSPA+, (DC-HSPDA), long term evolution (LTE), near field communication (NFC), wideband code division multiple access (W-CDMA), code division multiple access (CDMA), time division multiple access (TDMA) Bluetooth, Bluetooth Low Energy (BTLE), Wireless Fidelity (Wi-Fi) (e.g., IEEE 802.11a, IEEE 802.11b, IEEE 802.111.g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964; "Gestures For Touch Sensitive Input Devices," filed Jul. 30, 2004; (4) U.S. patent application Ser. No. 11/048,264, "Gestures For Touch Sensitive input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," tiled Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In sonic embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; U.S. Ser. No. 11/240,788, "Proximity Detector In Handheld Device"; U.S. Ser. No. 11/620,702; "Using Ambient Light Sensor To Augment Proximity Sensor Output"; U.S. Ser. No. 11/586,862, "Automated Response To And Sensing Of User Activity In Portable Devices"; and U.S. Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
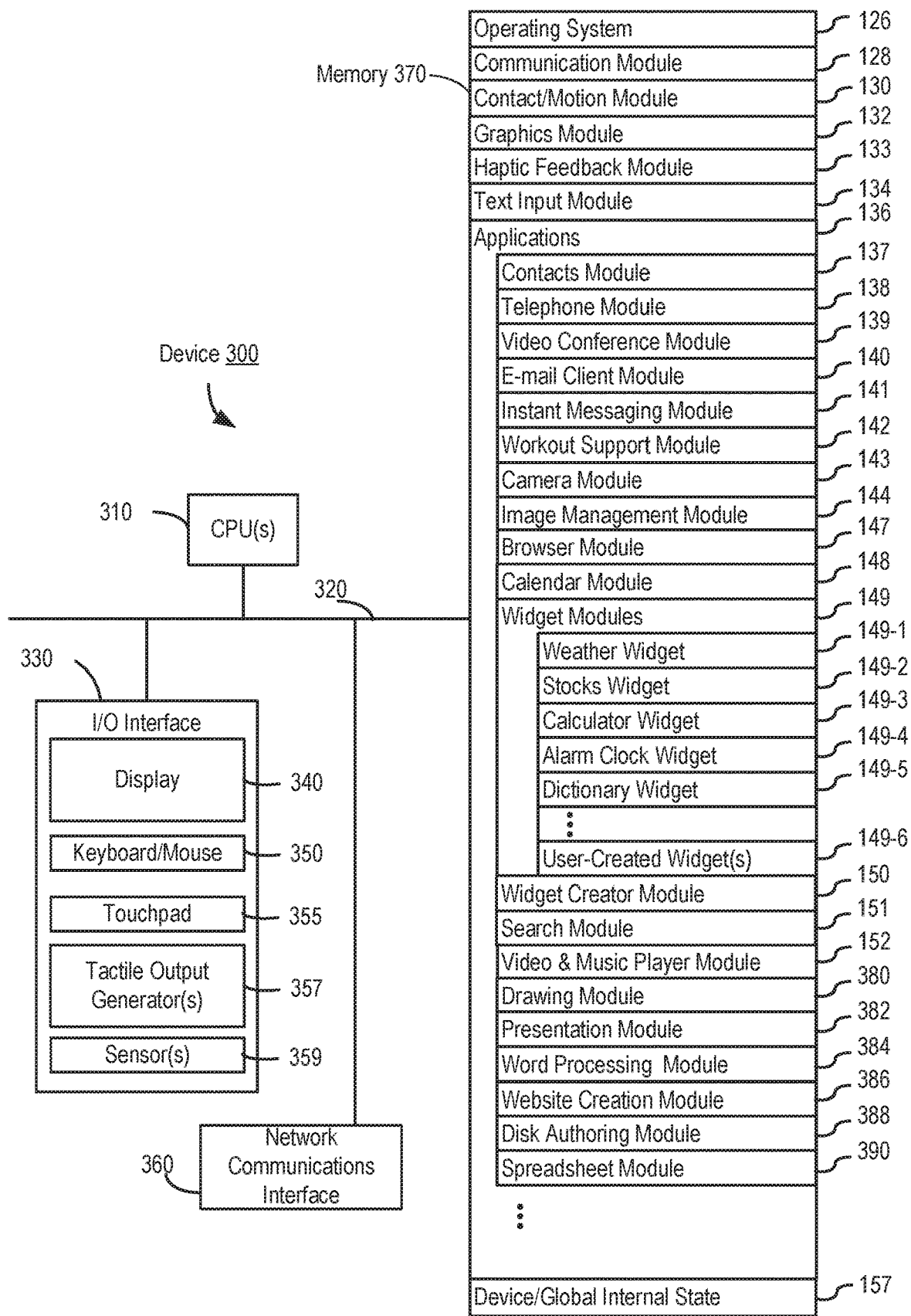
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions a subset or superset thereof:

Contacts module 137 (sometimes called an address book or contact list);
Telephone module 138;
Video conference module 139;
E-mail client module 140;
Instant messaging (IM) module 141,
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RE circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number 138, conduct a conversation, and disconnect or hang up when the conversation is completed. As noted above, the wireless communication optionally uses any of a plurality of communications standards, protocols, and technologies.

In conjunction with RE circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RE circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RE circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RE circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RE circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
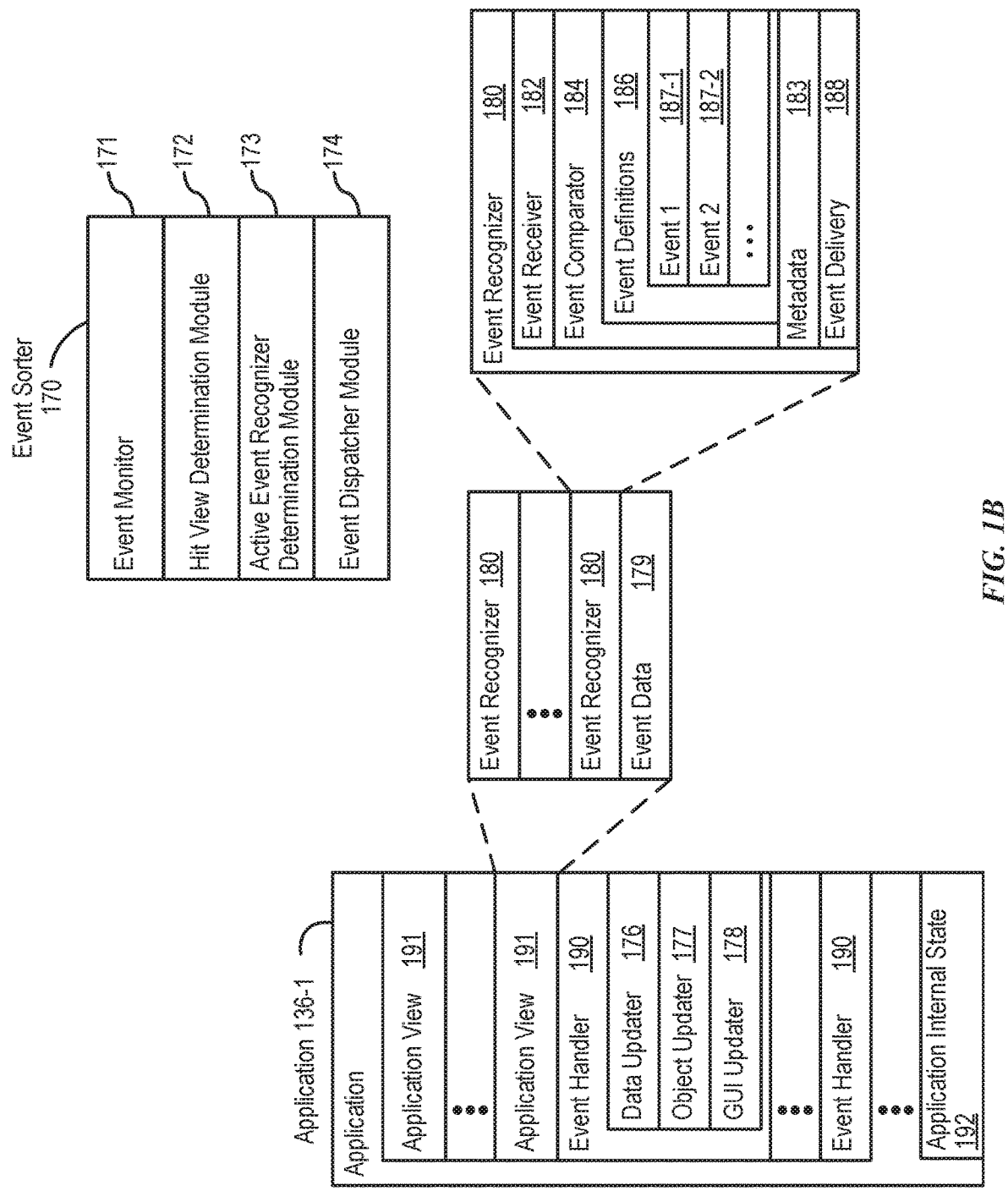
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement, Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
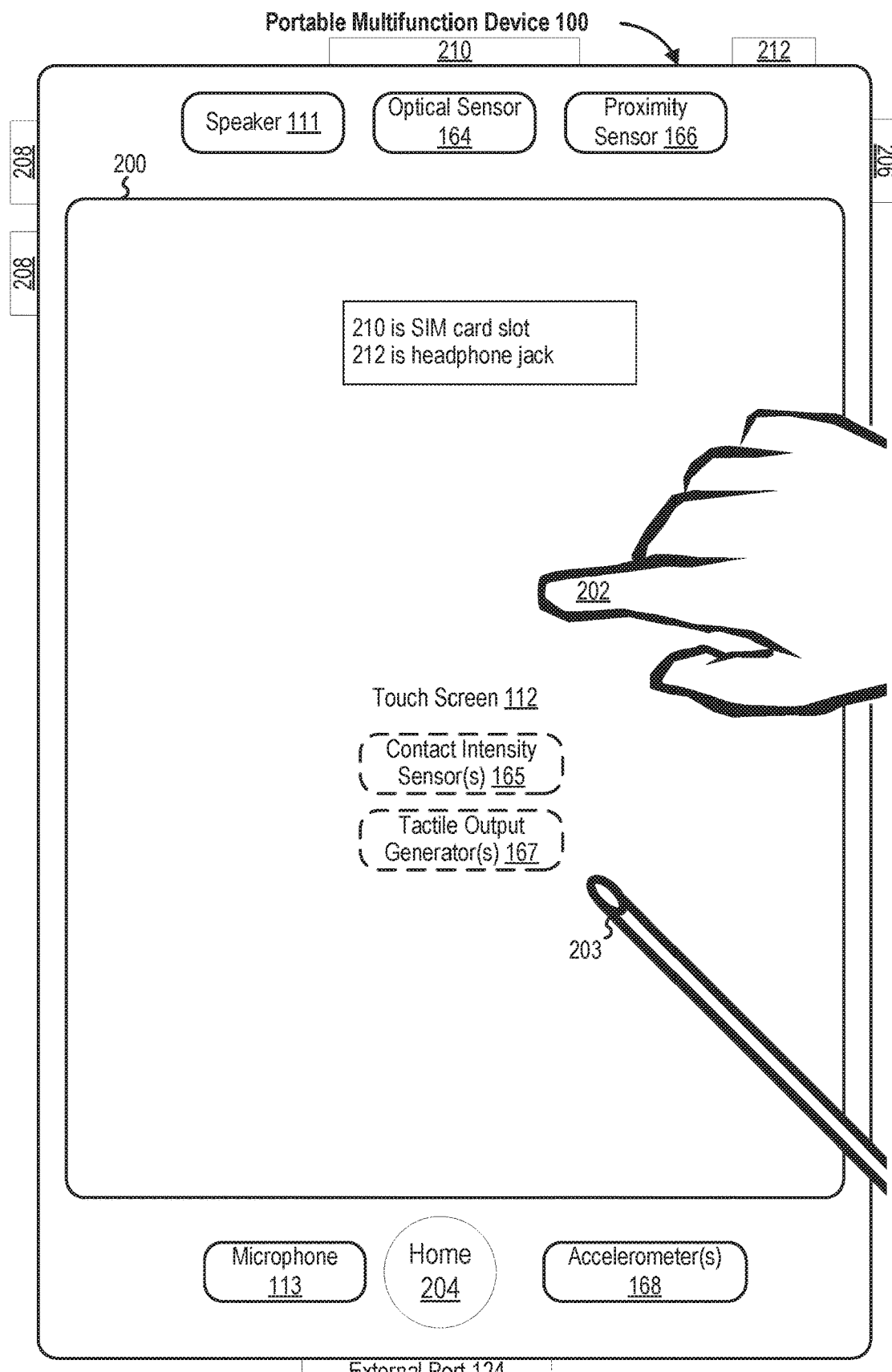
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
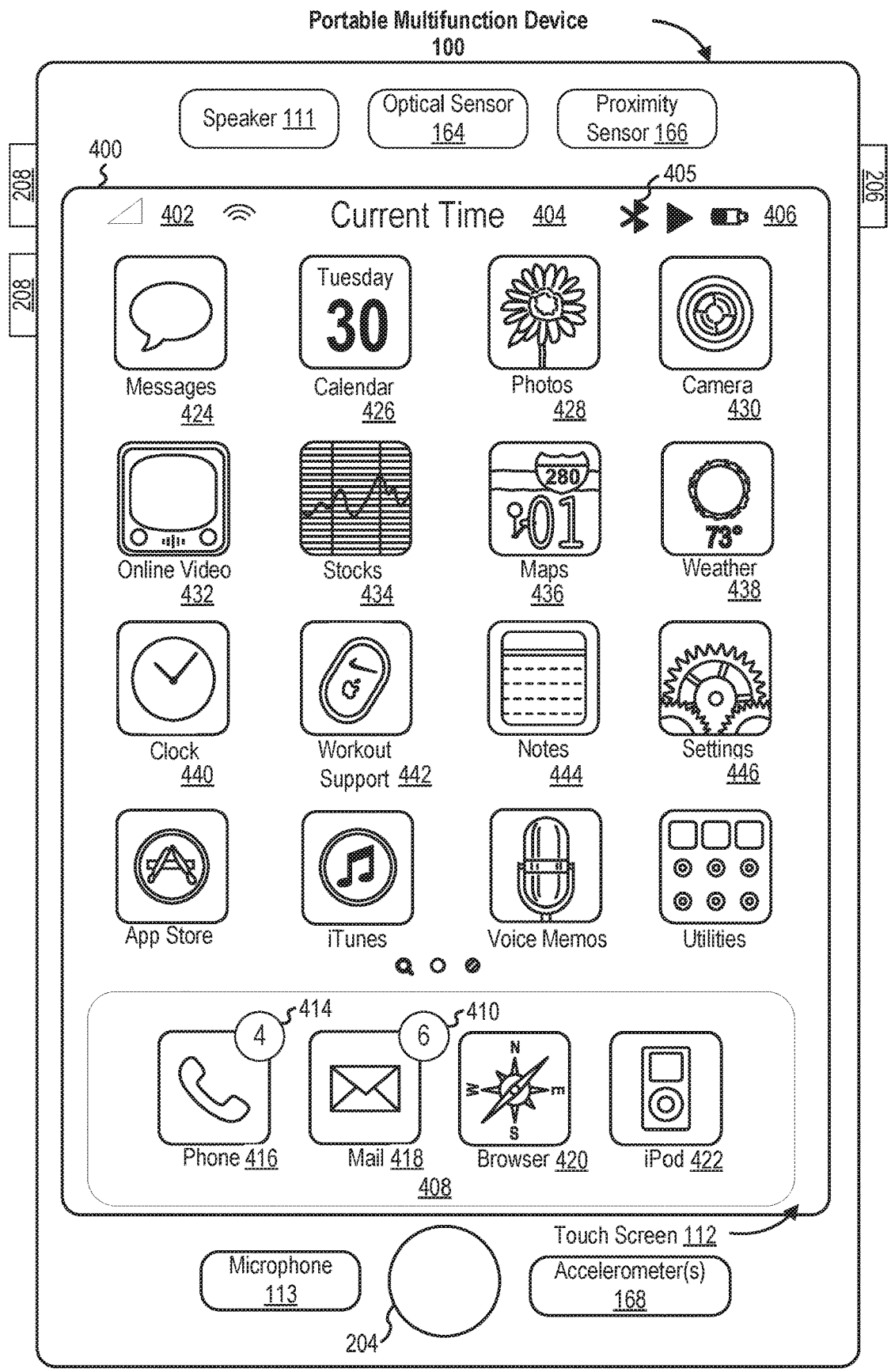
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar,"
  Icon 428 for image management module 144, labeled "Photos;"
  Icon 430 for camera module 143, labeled "Camera,"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3 with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
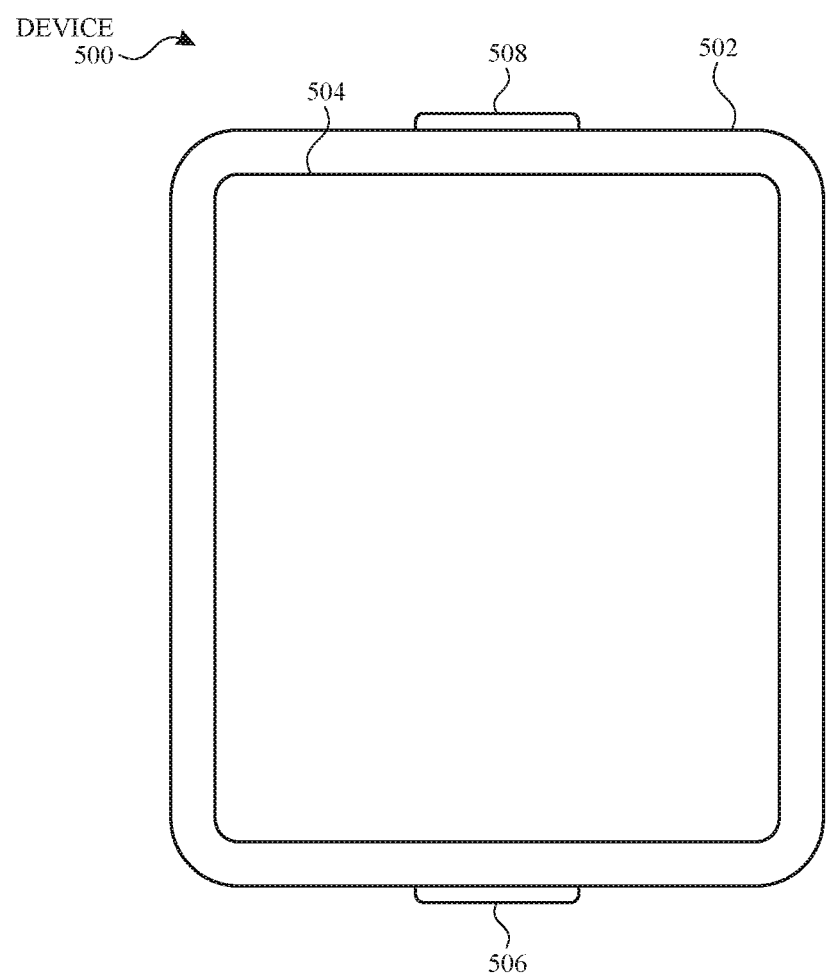
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
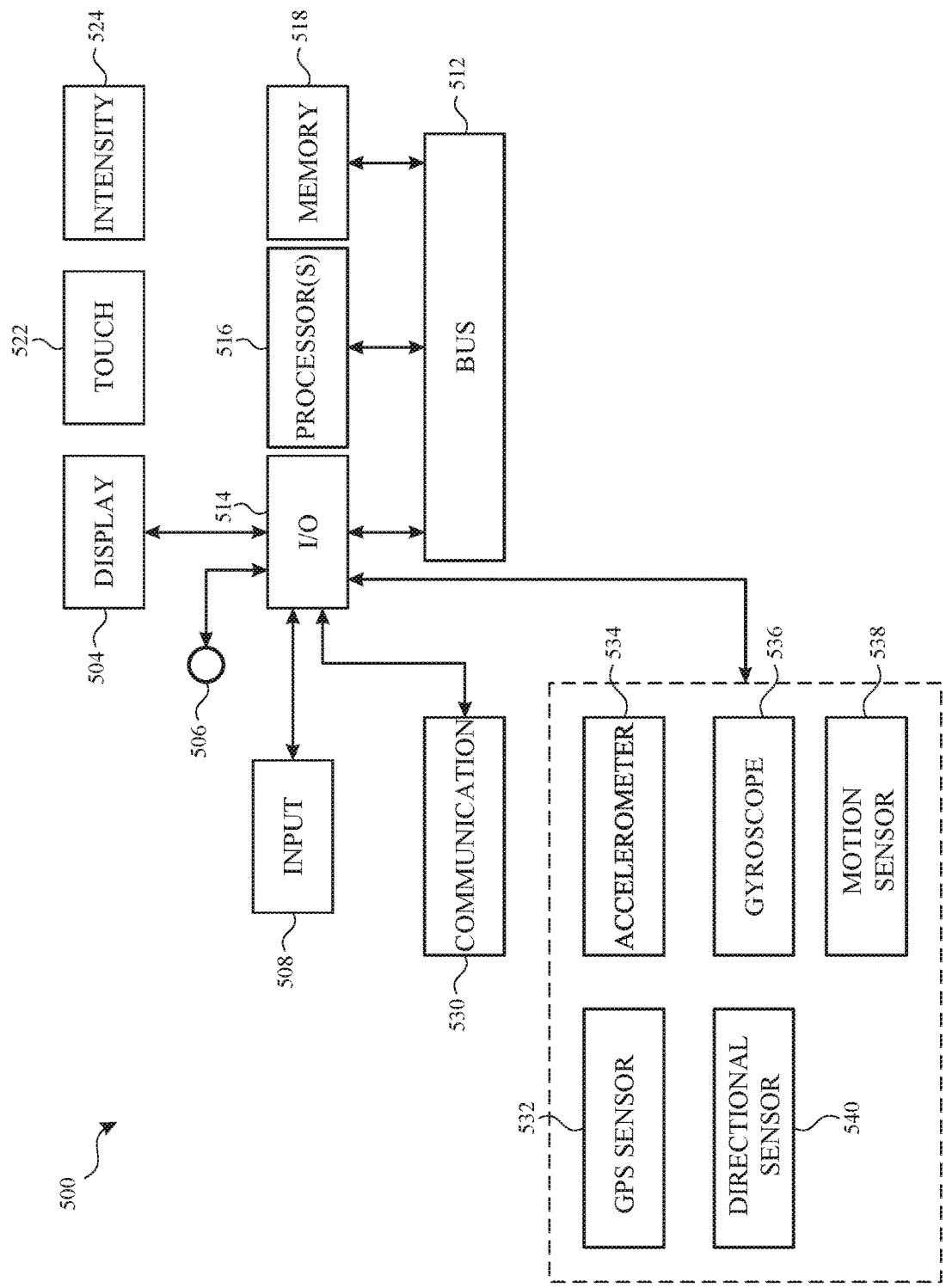
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, 1400, 1600, 1800, 2000, 2300 (FIGS. 7, 8, 10, 14, 18, 20, 23). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "flu"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5I:
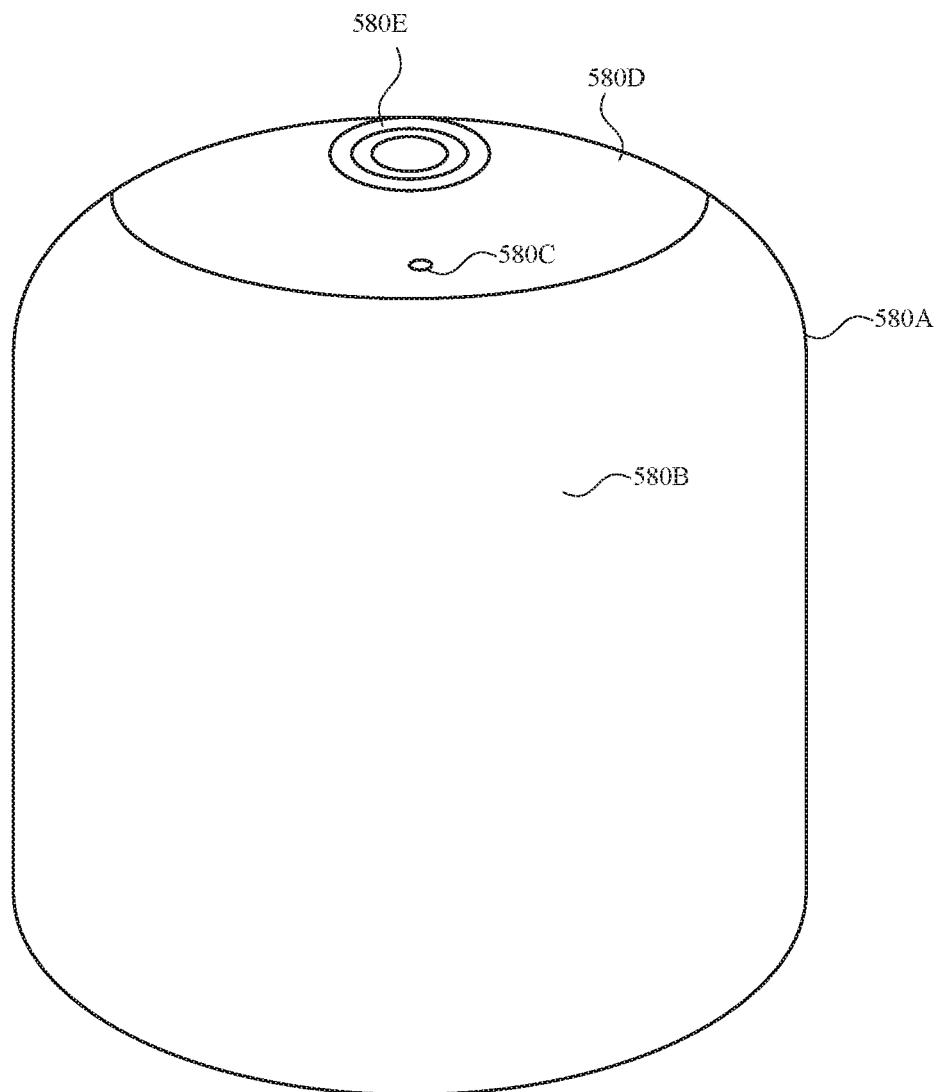
FIG. 5I illustrates an electronic device in accordance with some embodiments.

FIG. 5I illustrates exemplary electronic device 580. Device 580 includes body 580A, In some embodiments, device 580 can include some or all of the features described with respect to devices 100, 300, and 500 (e.g., 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5J:
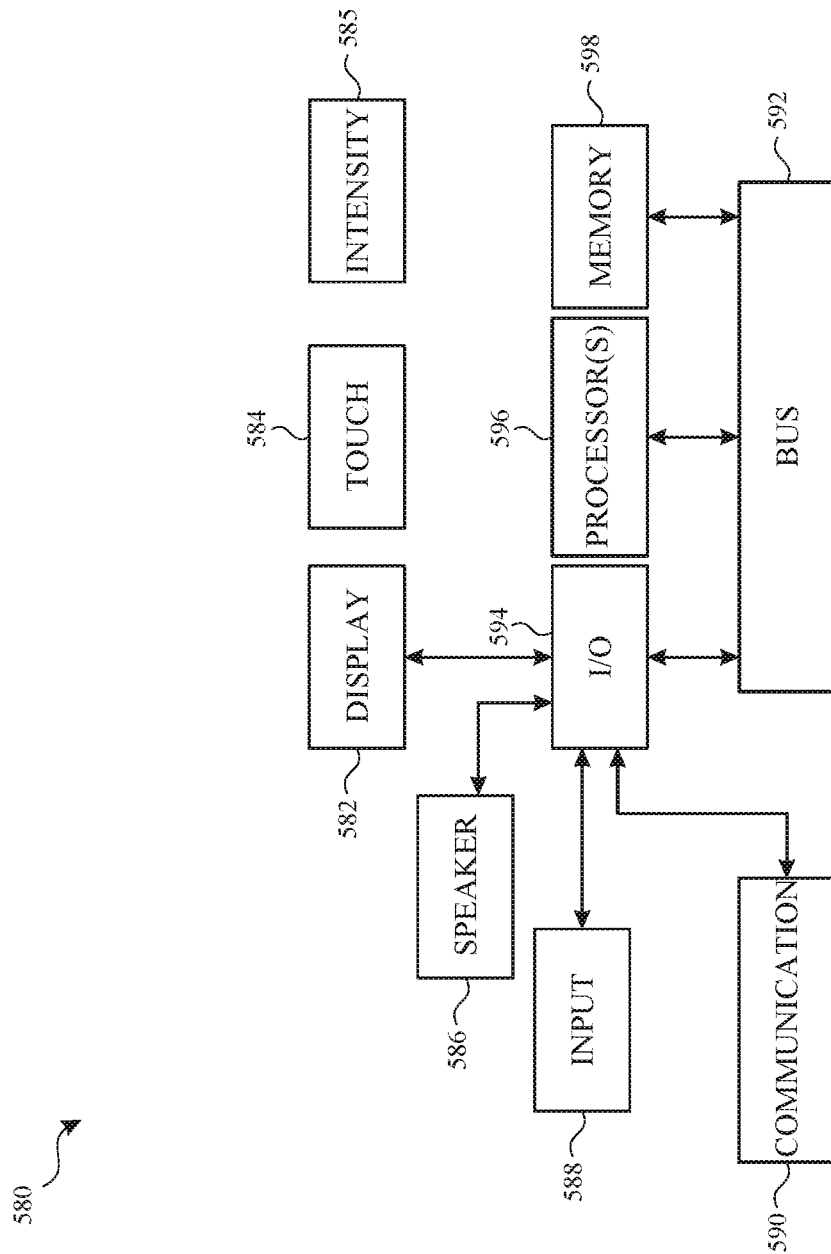
FIG. 5J is a block diagram illustrating an electronic device in accordance with some embodiments.

FIG. 5J depicts exemplary personal electronic device 580. In some embodiments, device 580 can include sonic or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including processes 800 (FIG. 8), 1000 (FIG. 10), 1200 (FIG. 12), 1400 FIG. 14), 1600 (FIG. 16), 1800 (FIG. 18), 2000 (FIG. 20), and 2300 (FIG. 23). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5J, but can include other or additional components in multiple configurations.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, device 580.

Figure 6A:
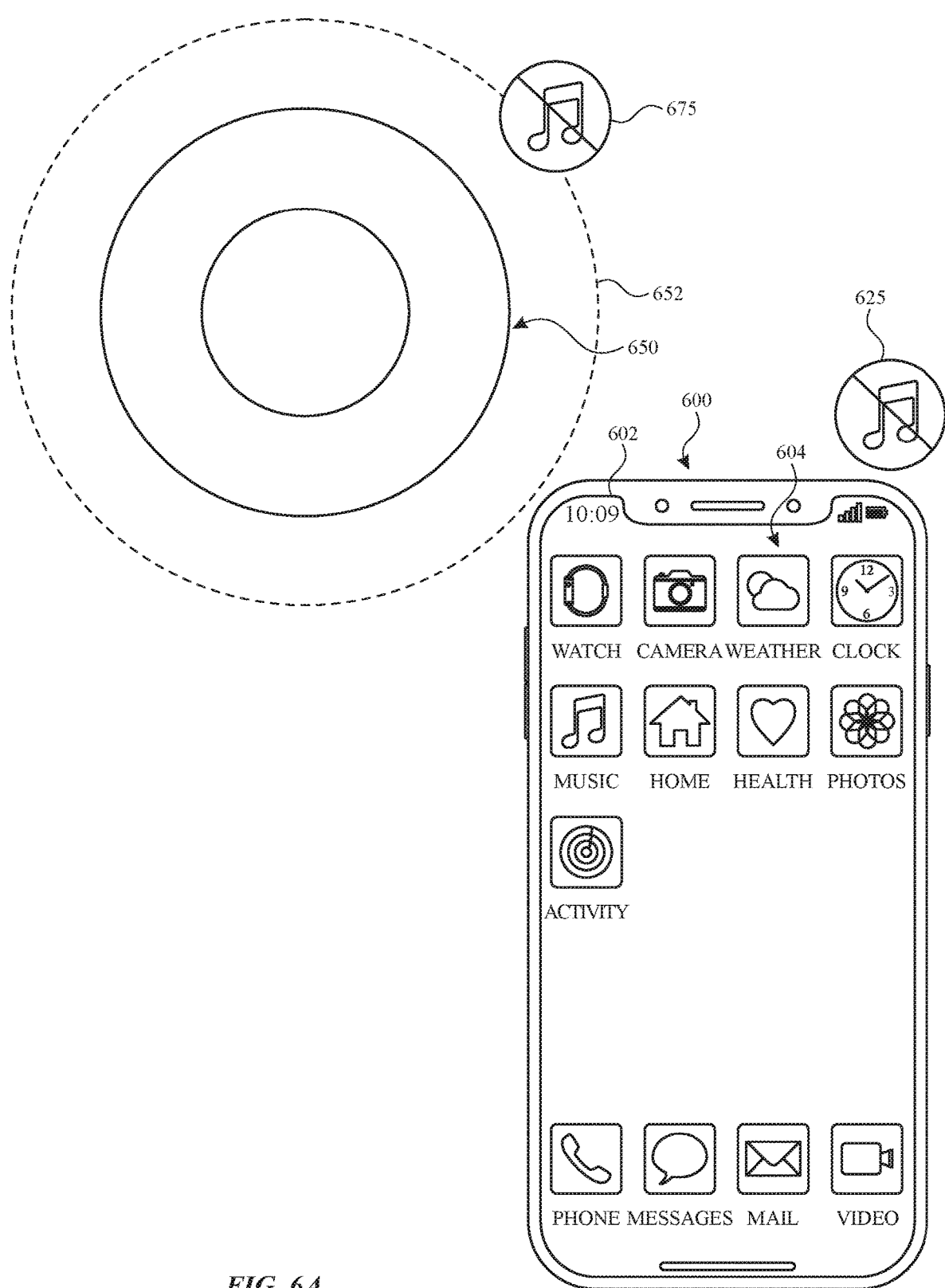
FIGS. 6A-6P illustrate exemplary user interfaces in accordance with some embodiments.
Figure 6B:
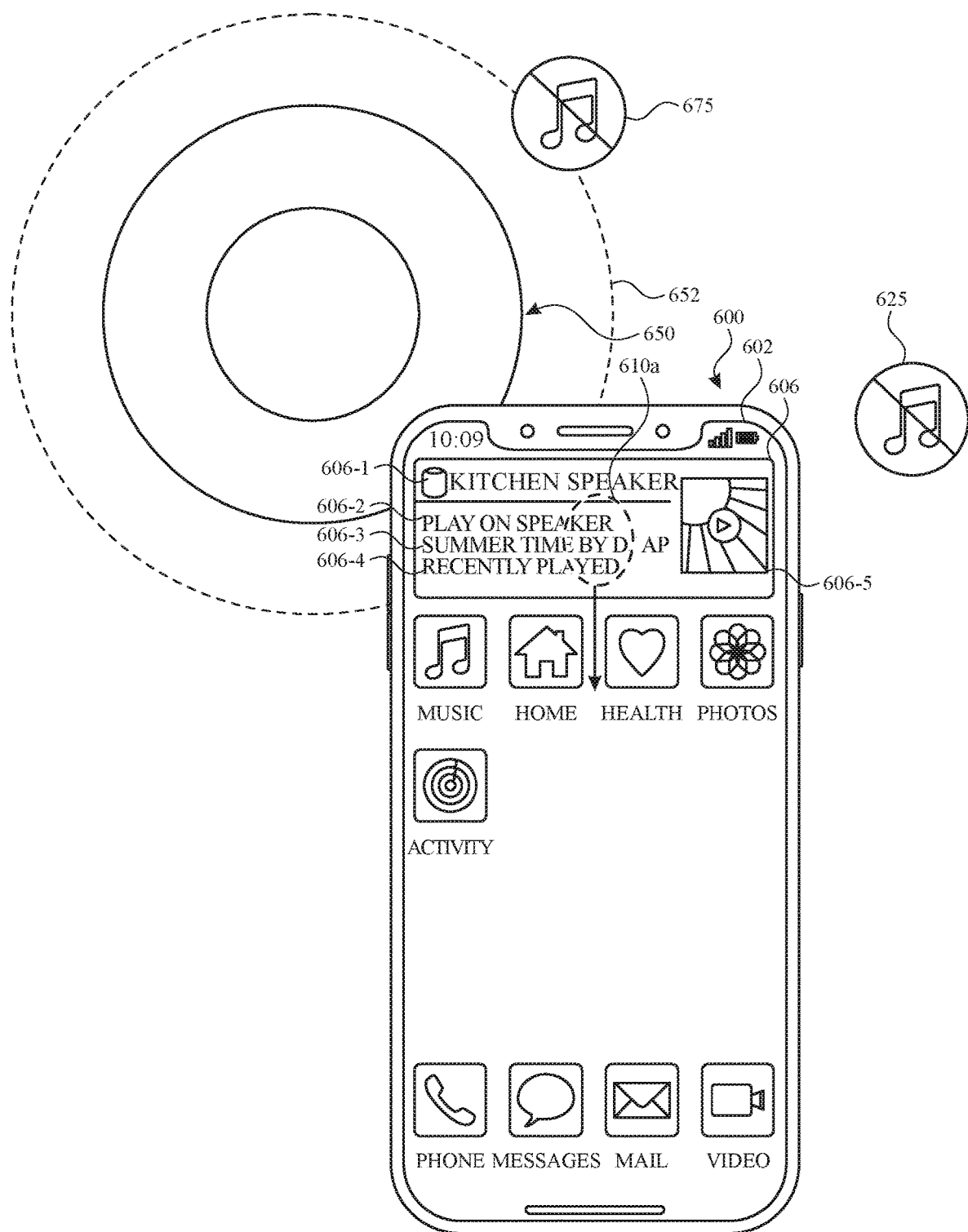
Figure 6C:
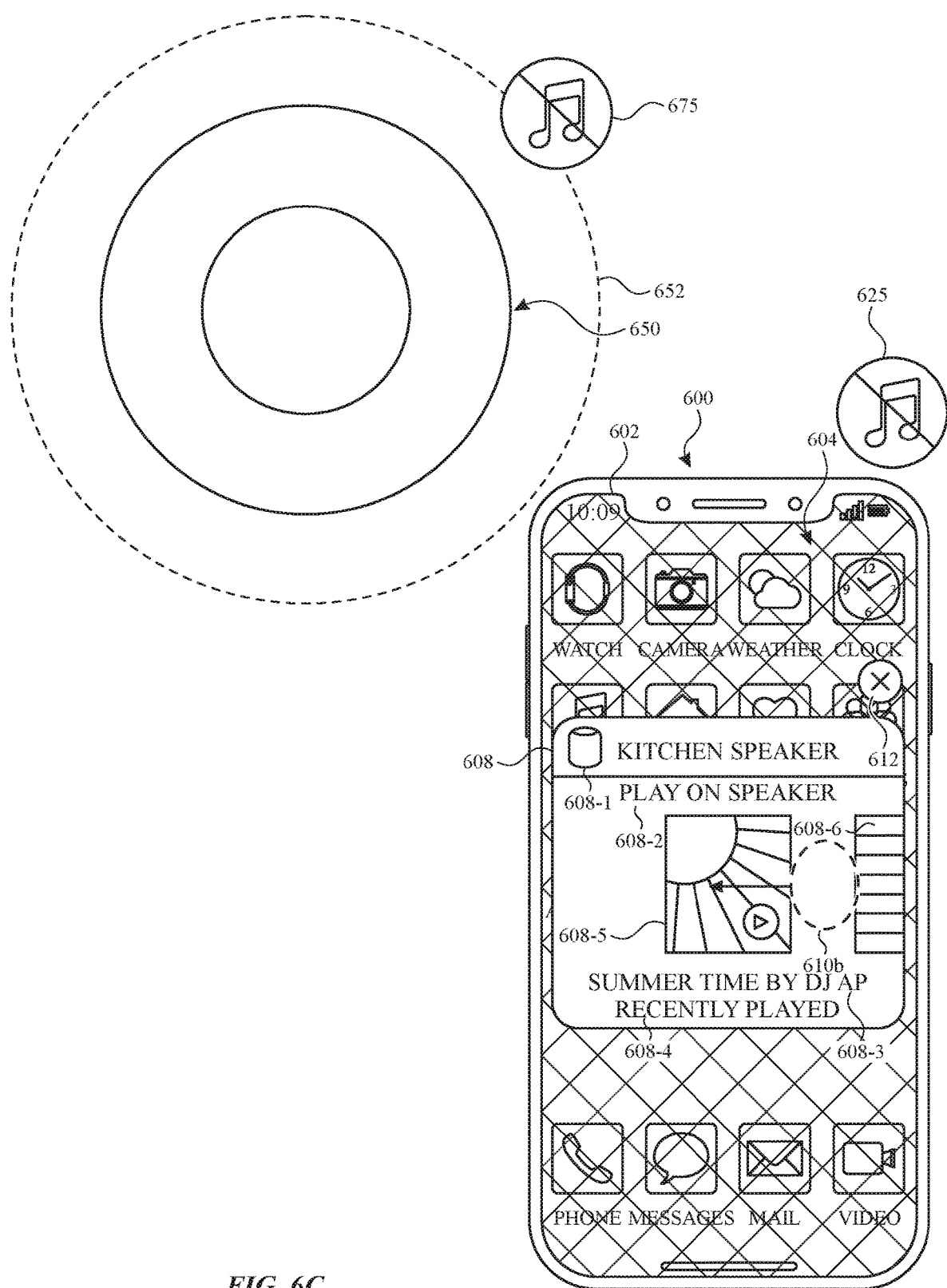
Figure 6D:
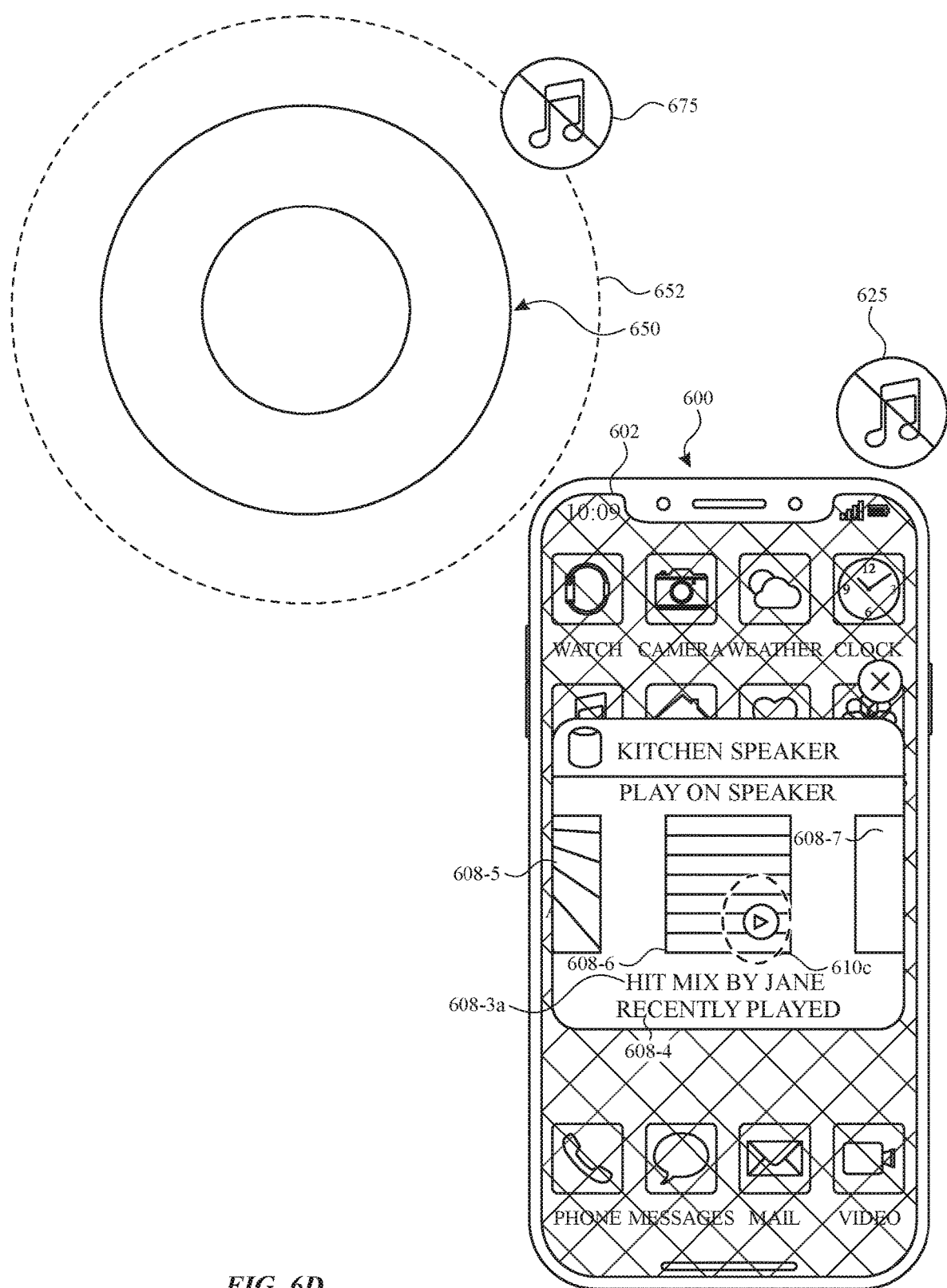
Figure 6E:
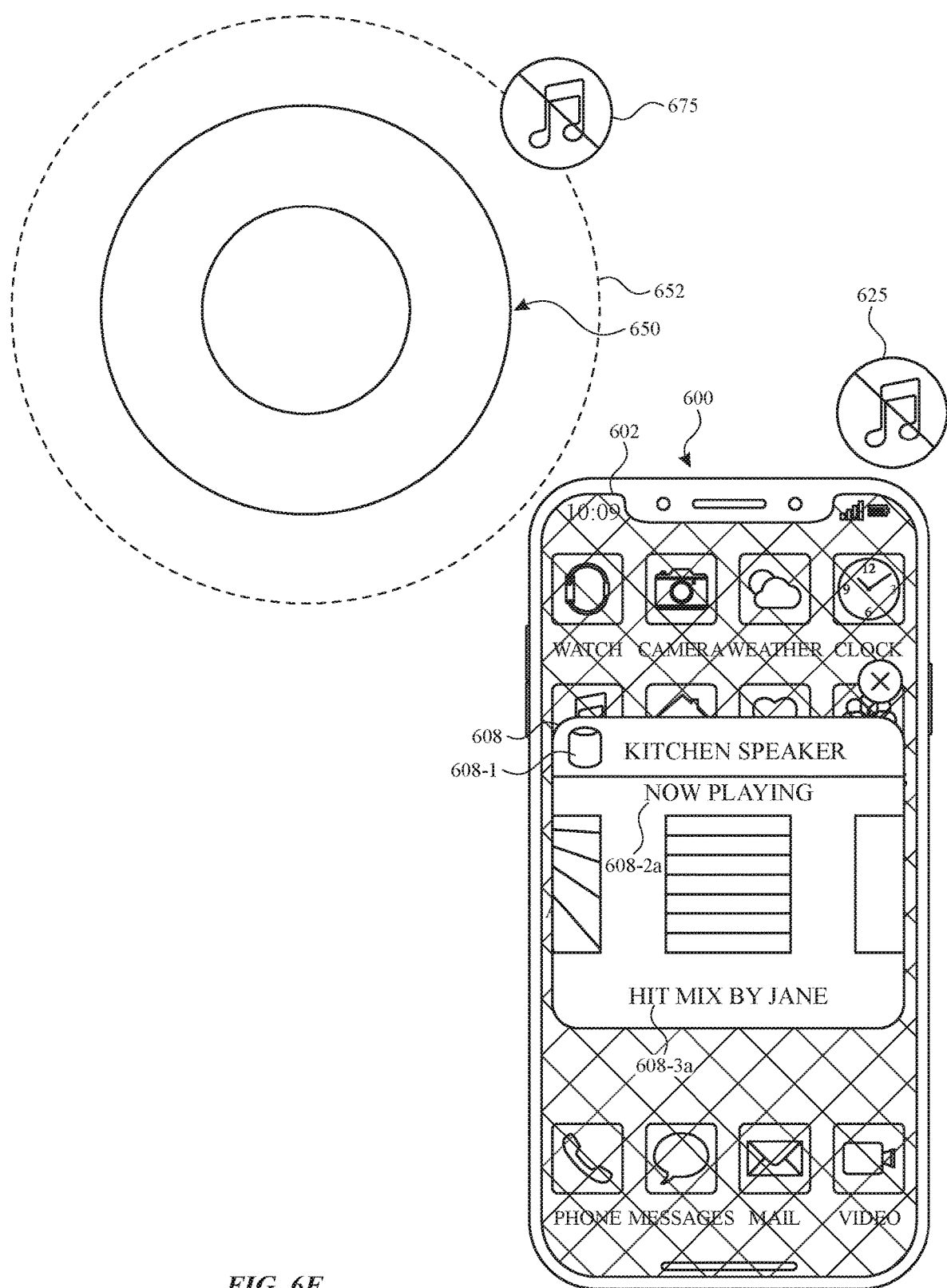
Figure 6F:
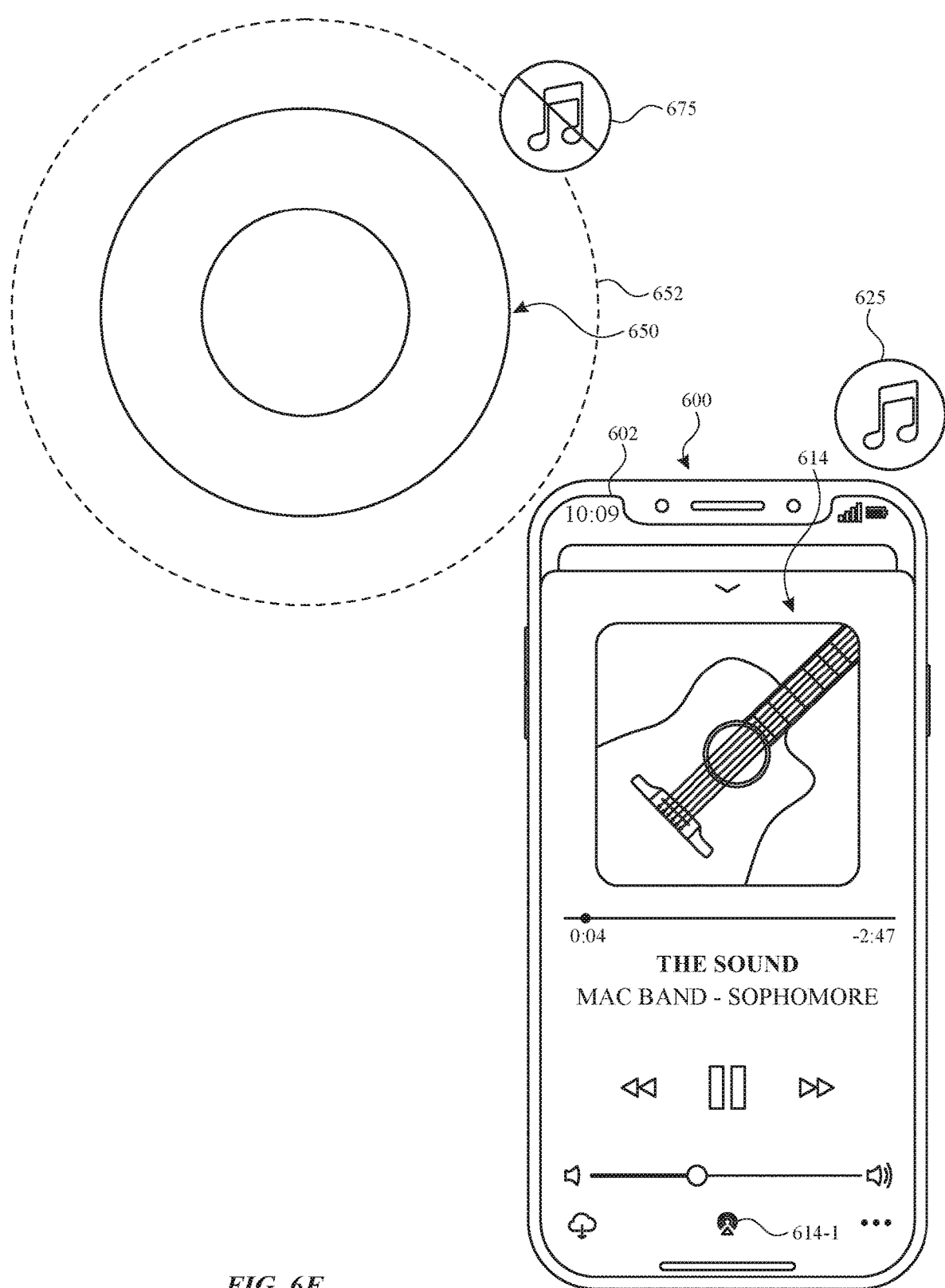
Figure 6G:
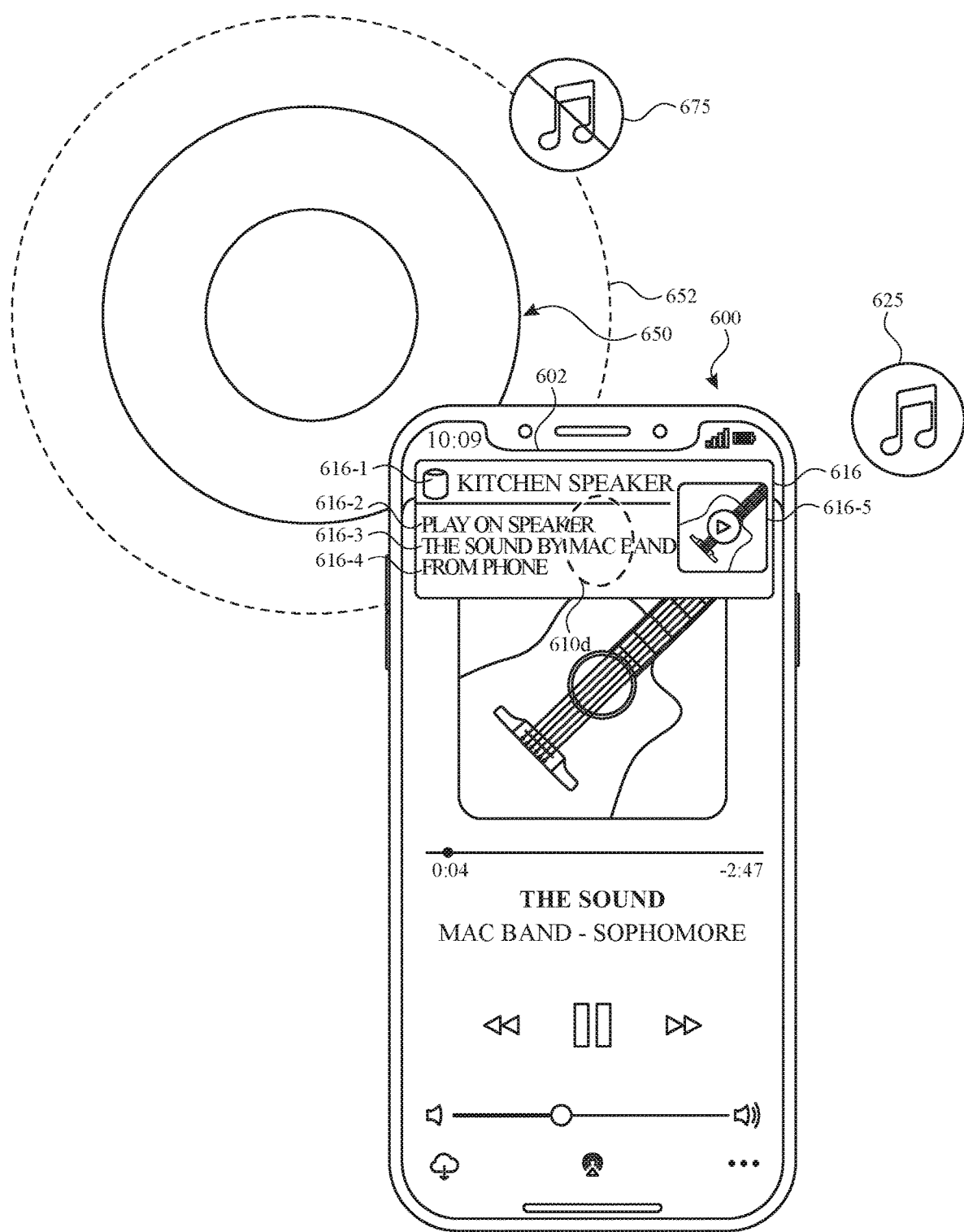
Figure 6H:
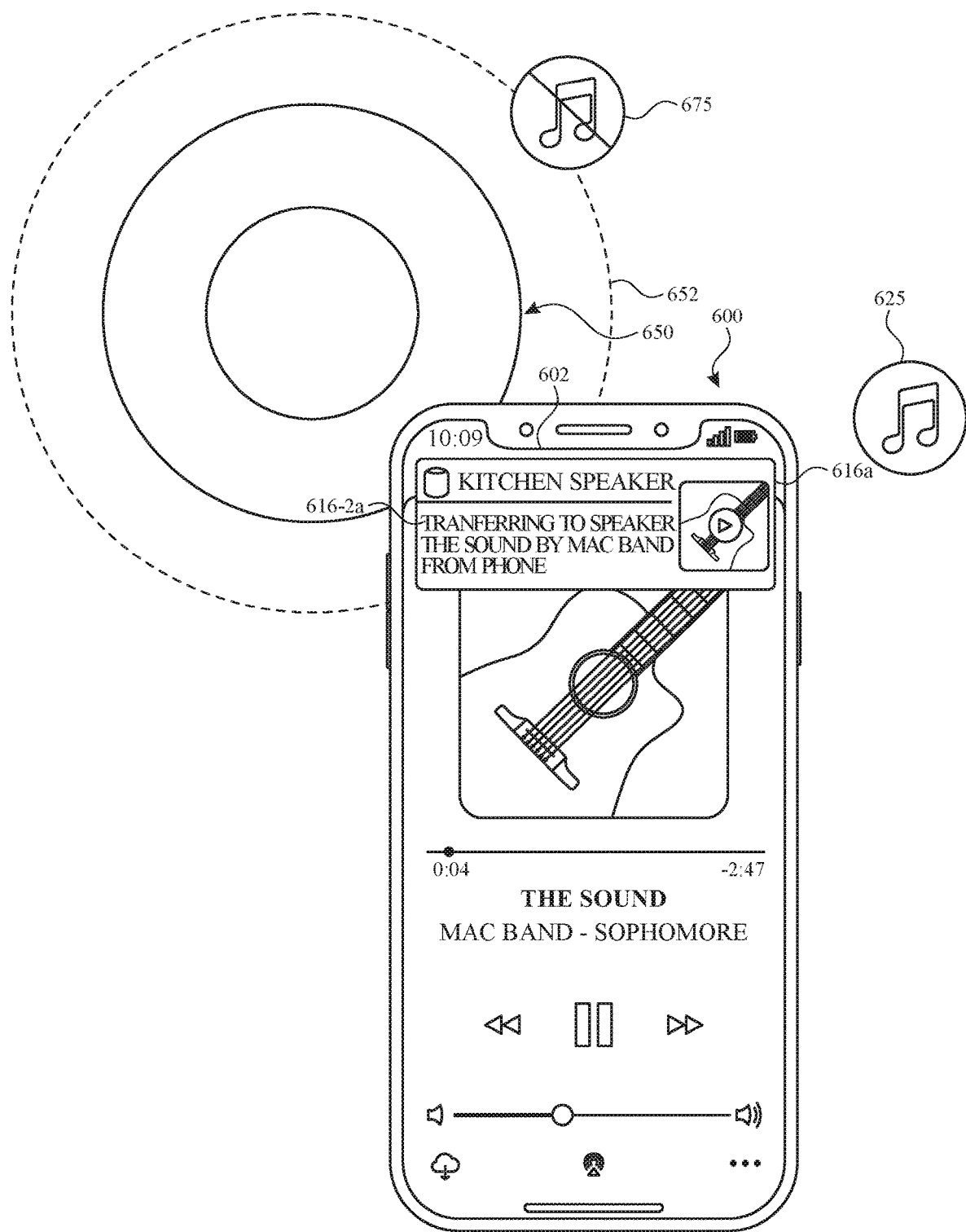
Figure 6I:
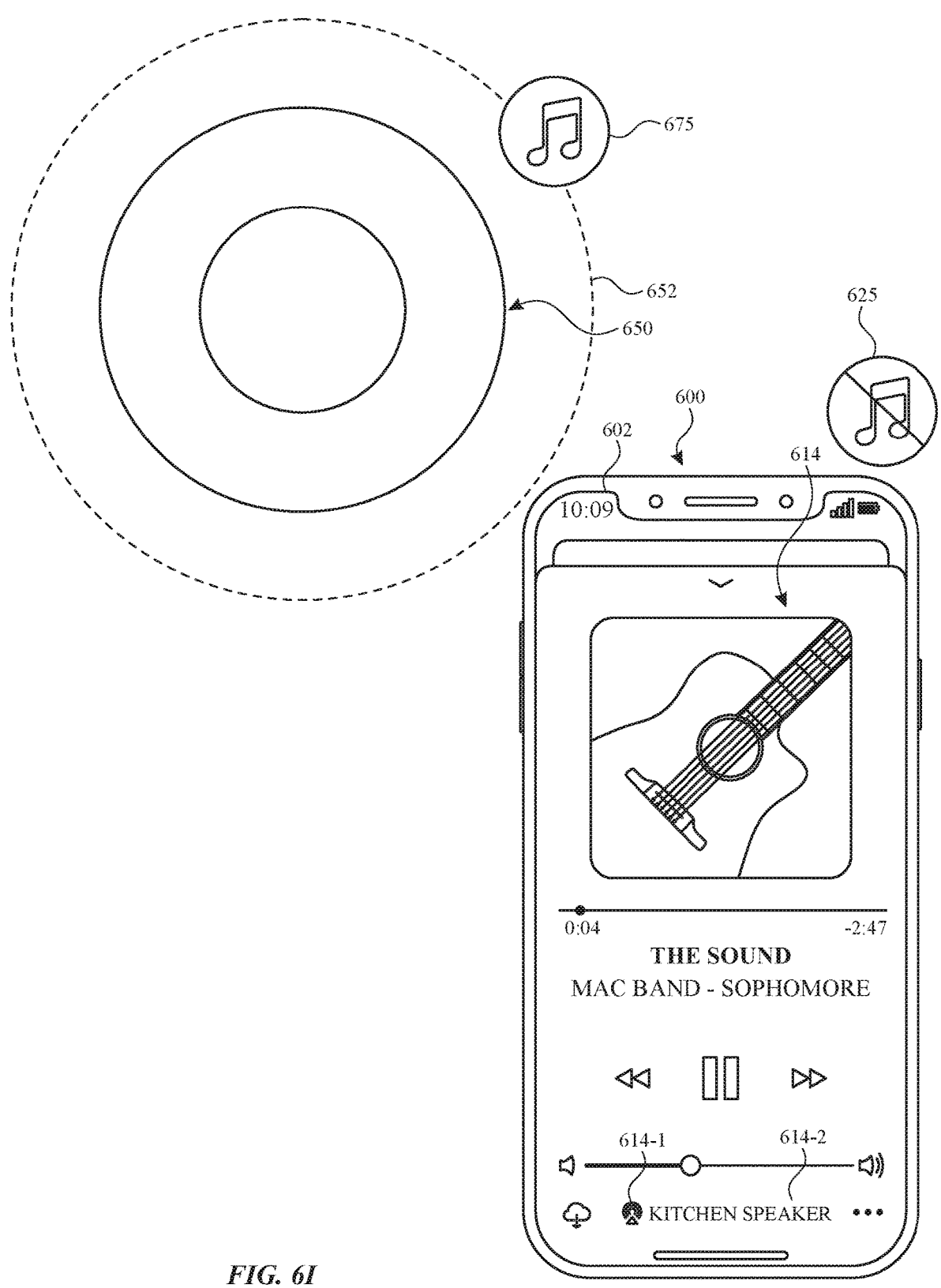
Figure 6J:
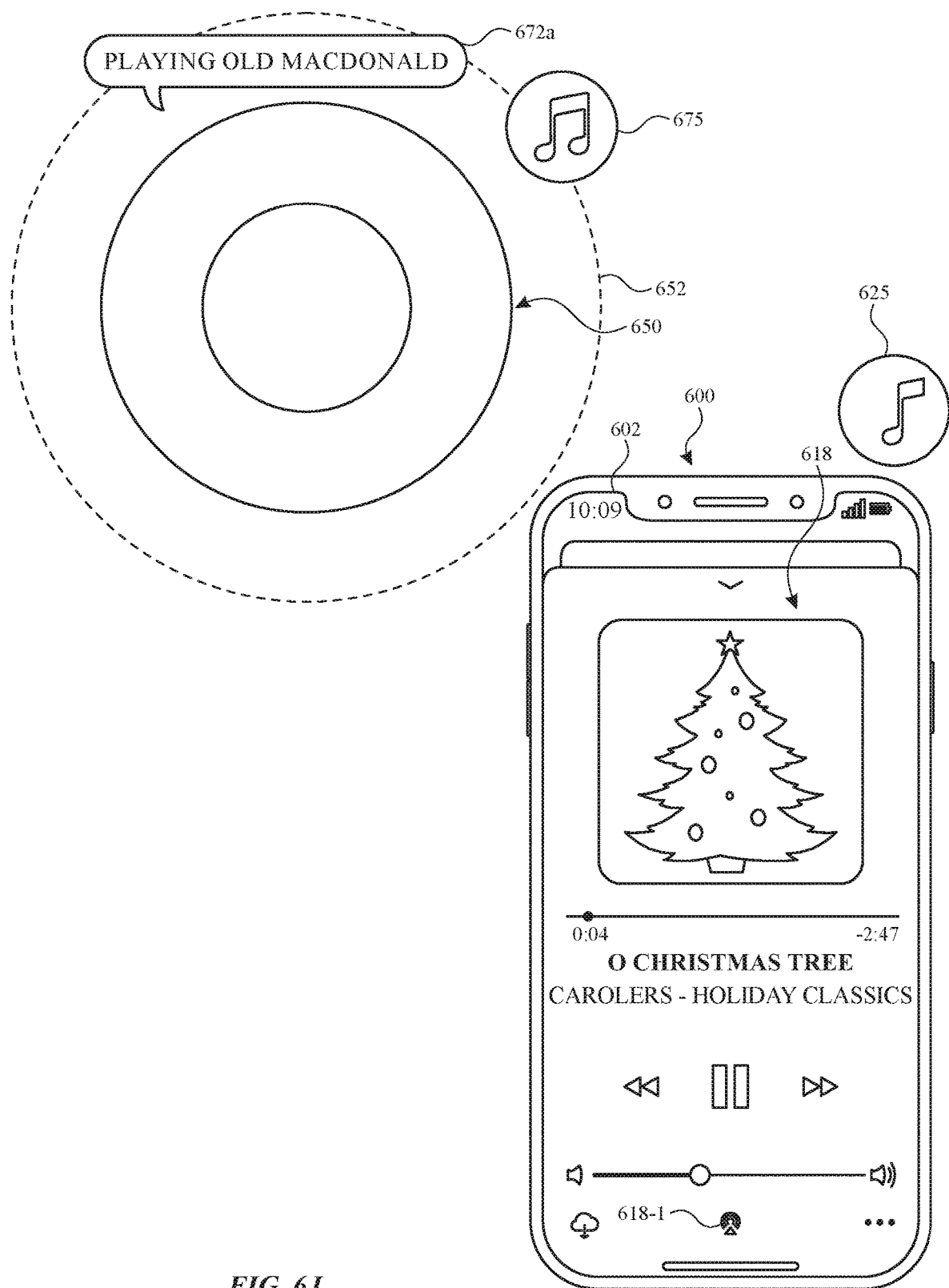
Figure 6K:
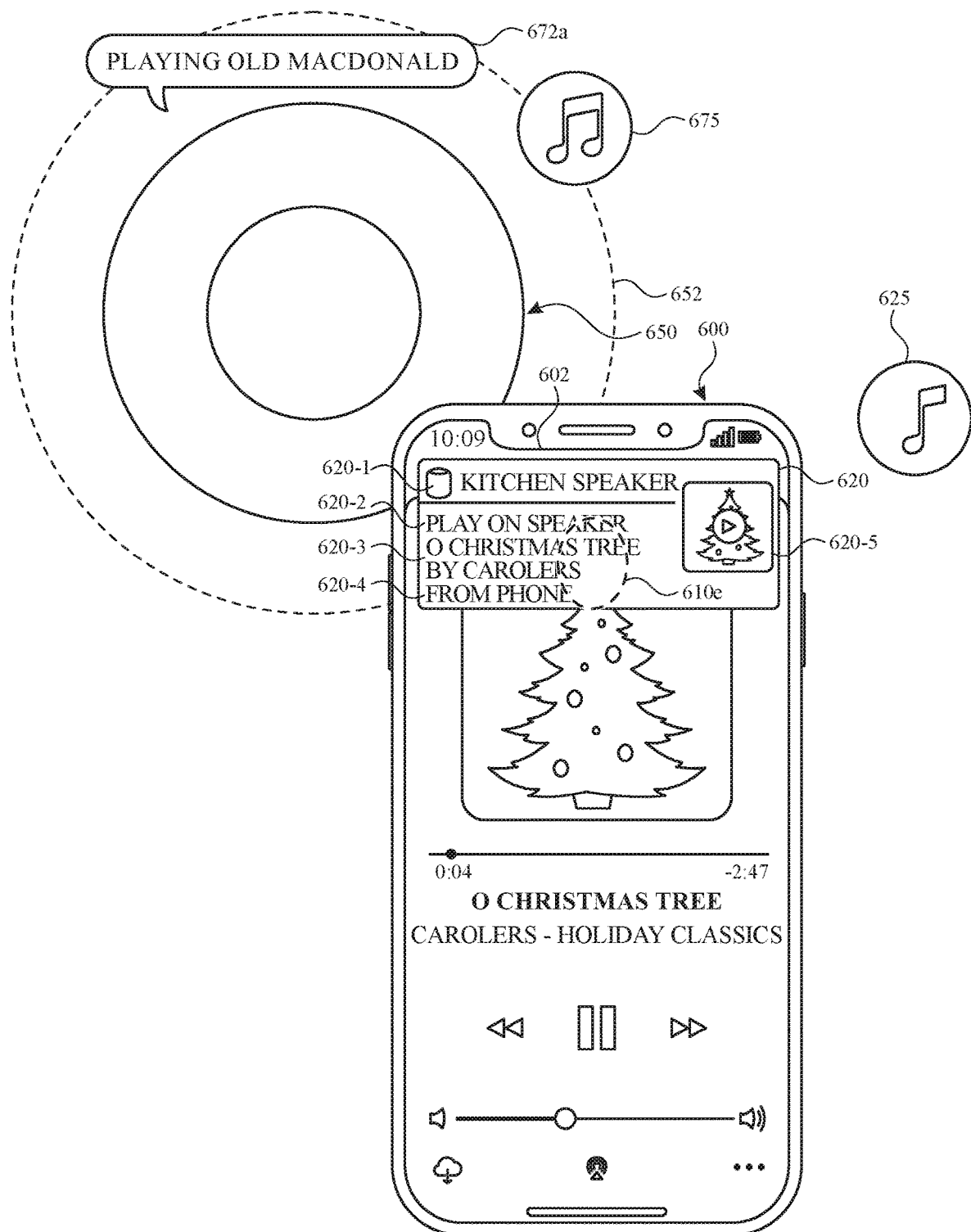
Figure 6L:
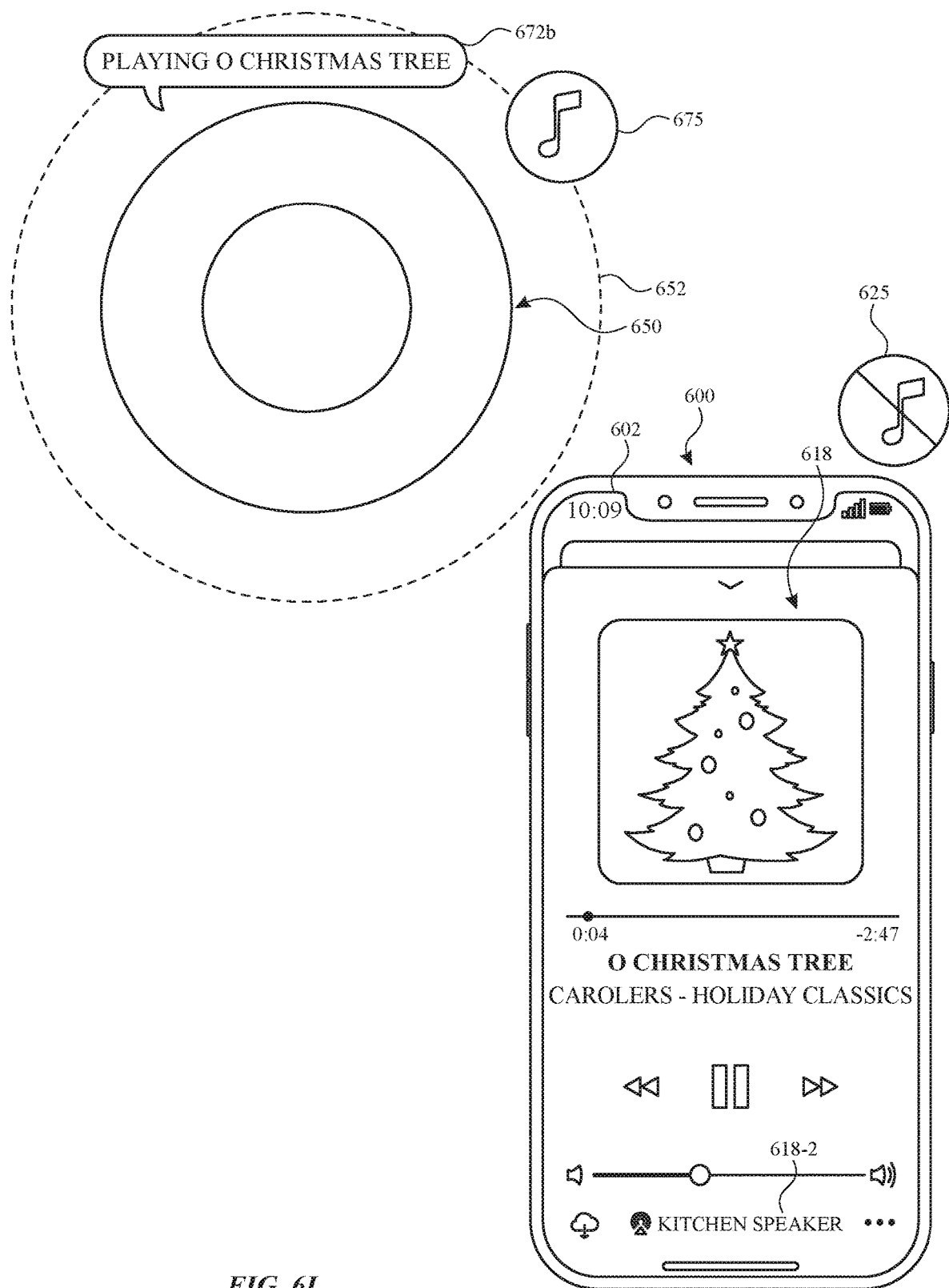
Figure 6M:
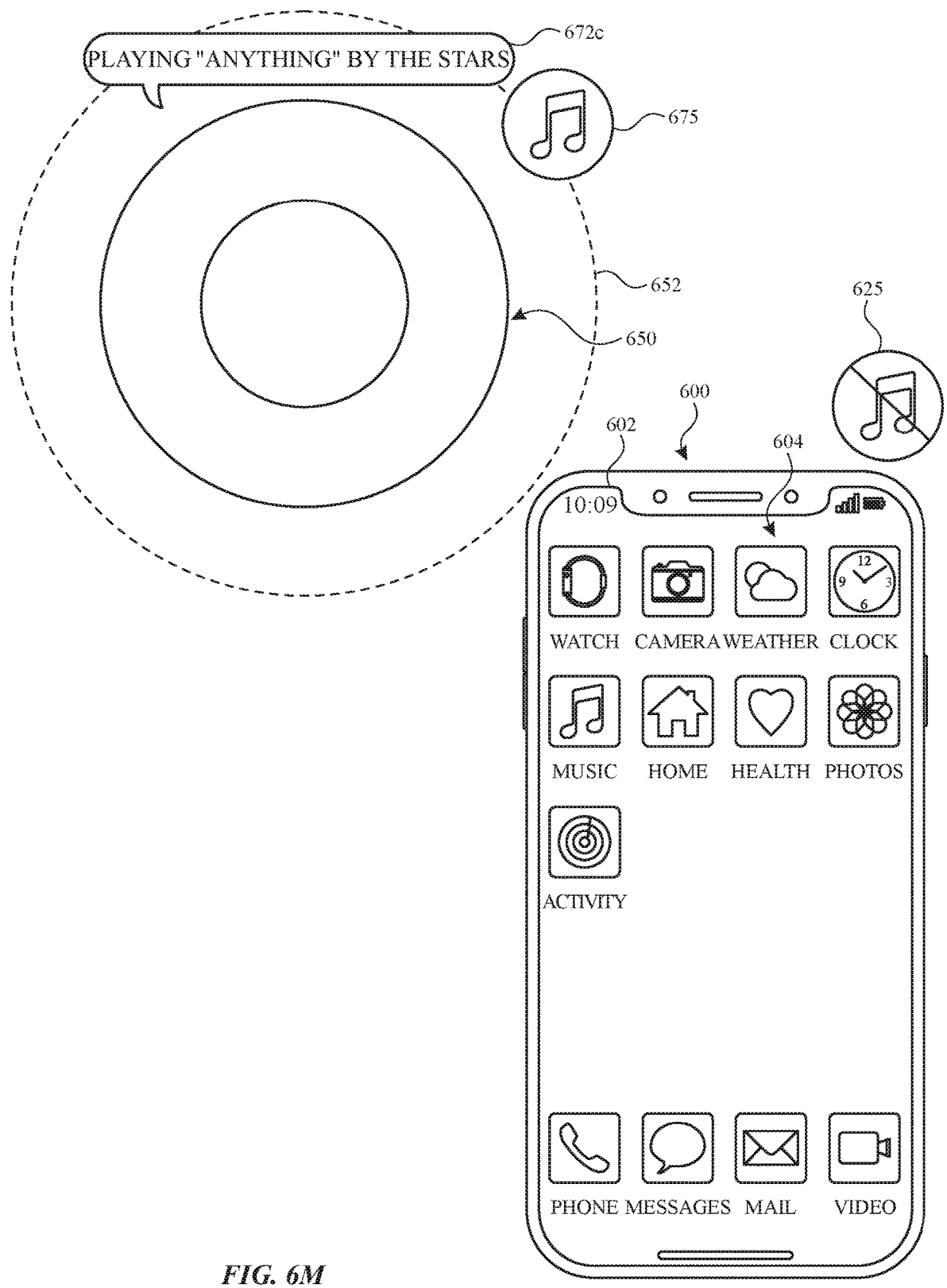
Figure 6N:
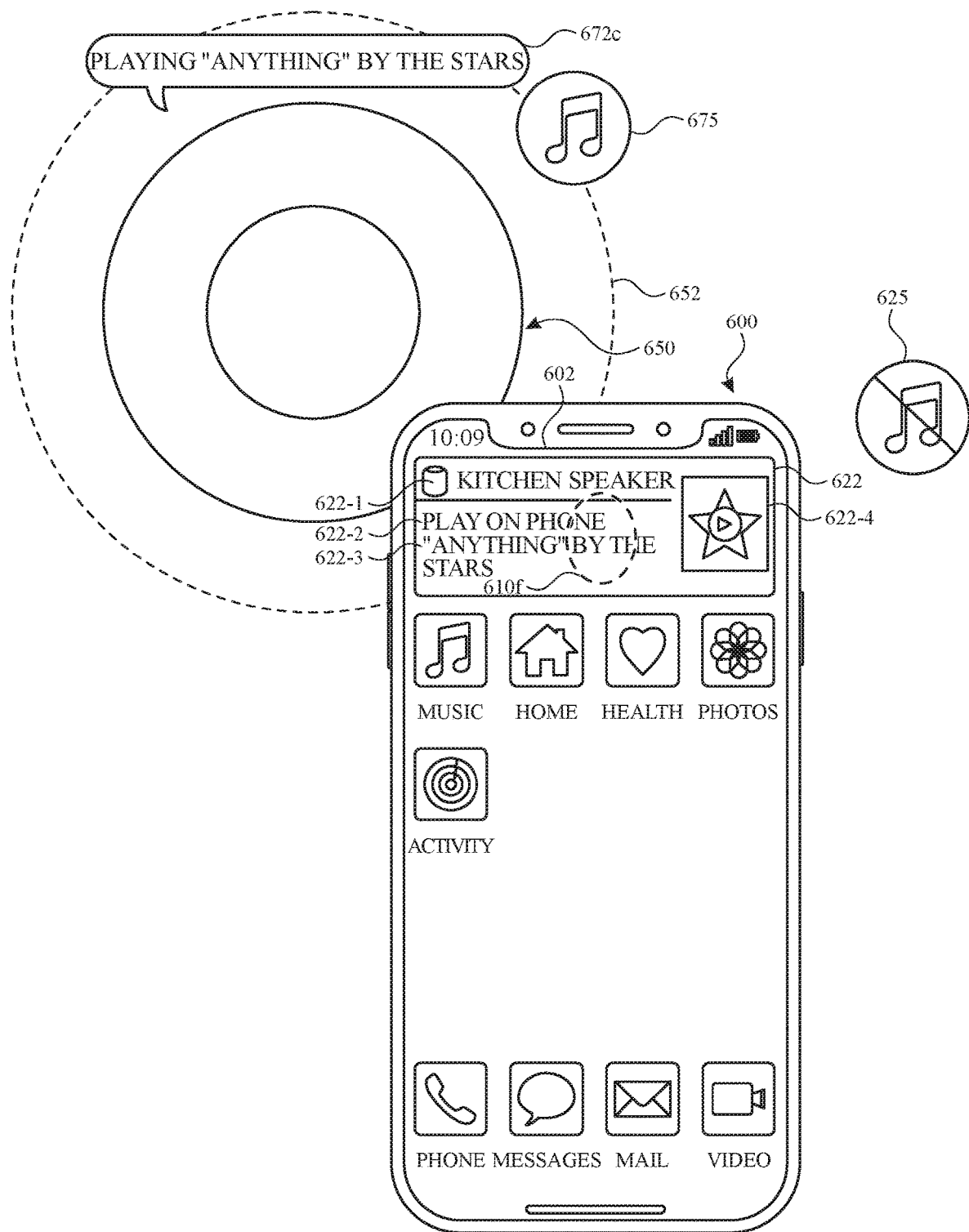
Figure 6O:
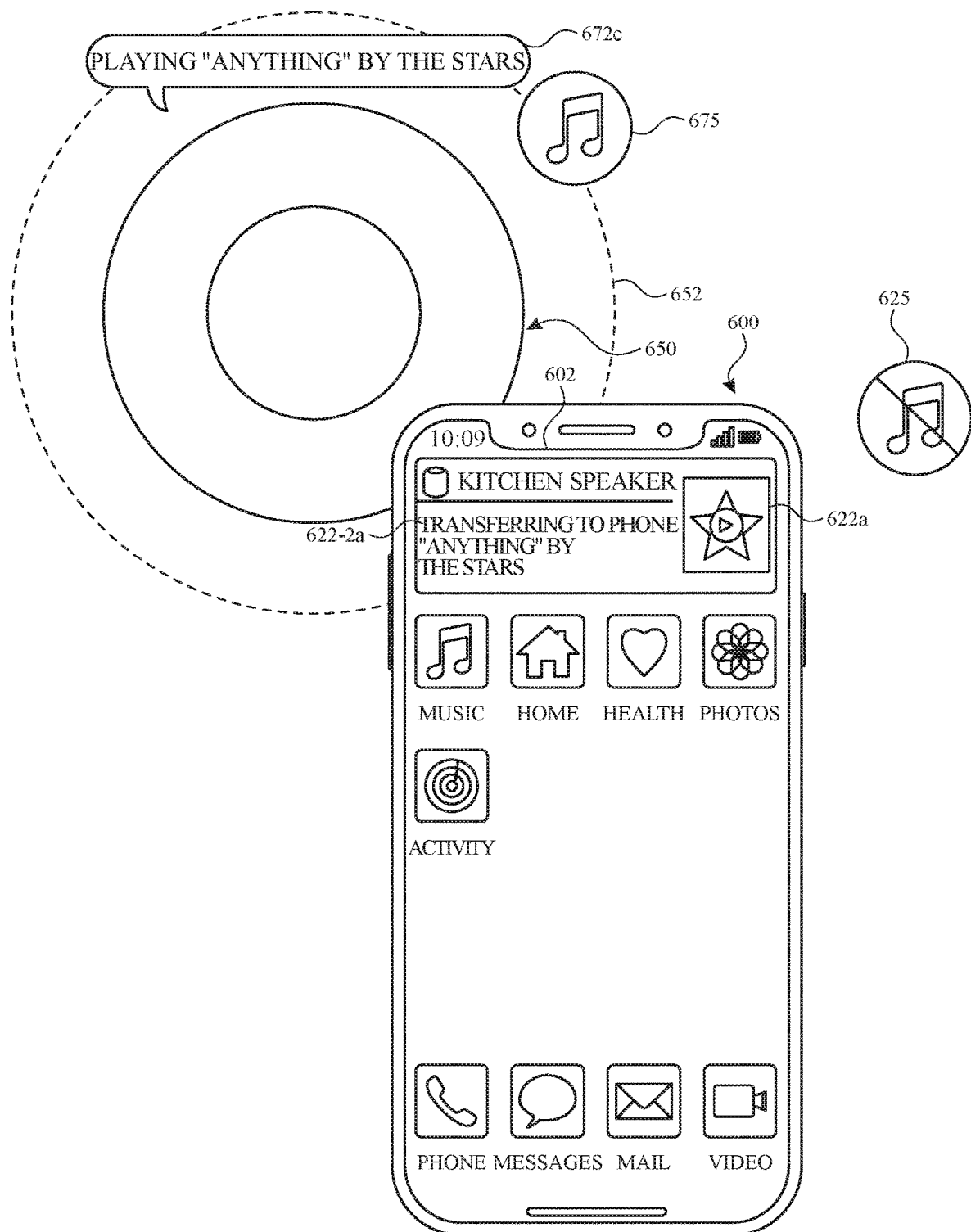
Figure 6P:
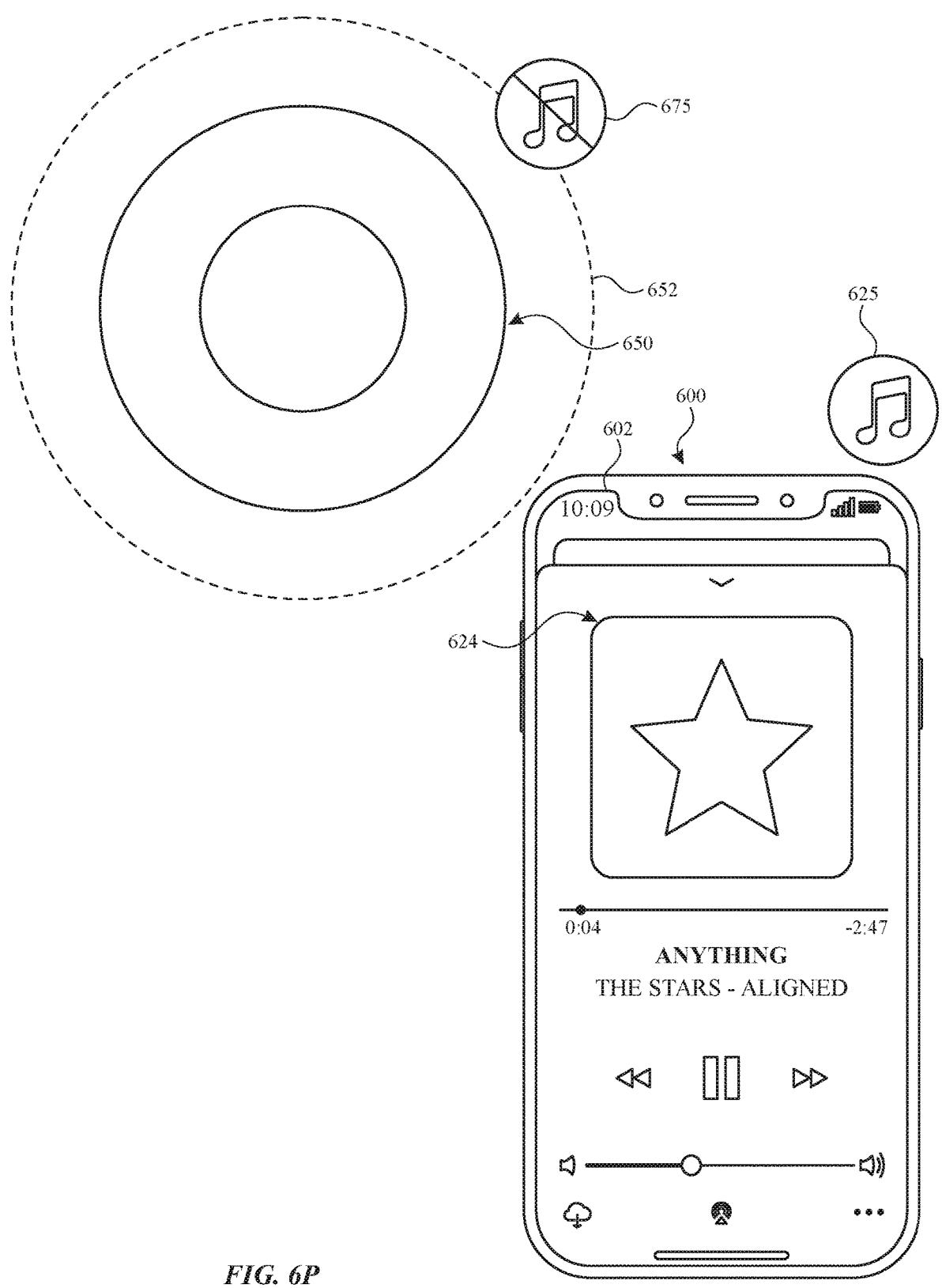

FIGS. 6A-6P illustrate exemplary user interfaces for controlling audio playback, in accordance with some embodiments. The user interfaces in these figures are used to illustrate the processes described below, including the methods in FIGS. 7-8.

Devices can use the satisfaction of a proximity condition to perform one or more functions. The use of proximity of one device to another device can be used as a clear indicator that a user (e.g., holding one of the devices) would like to perform some action (e.g., invoke an interface) on one or both of the devices. For example, this can prevent a waste of device resources by avoiding excessive user input (e.g., to navigate one or more menus on a device display) in order perform a function. Moreover, this can save the user time as well, for example, by reducing the number of user inputs required to perform a function (e.g., invoke an interface on a display).

FIG. 6A illustrates an exemplary electronic device 600 (e.g., a phone) and device 650 (e.g., a smart speaker). In some embodiments, device 600 includes one or more features of device 100, 300, or 500. Device 650 includes one or more features of device 580. In some embodiments, device 650 includes one or more features of device 100, 300, or 500. In the embodiment illustrated in FIG. 6A, device 650 is located in a kitchen and is designated as "Kitchen Speaker." Device 600 and device 650 are connected (e.g., via Bluetooth, near-field communication, a network connection) such that device 600 and device 650 can each obtain information about the other device. Such information can include information about audio currently playing or recently played on a device.

FIGS. 6A-6P illustrate exemplary physical arrangements of a device 600 and device 650. FIG. 6A illustrates a first scenario that includes device 650 and device 600 at a relatively long distance away from the device 650. FIG. 6A illustrates an exemplary overhead view of the first scenario. As shown in FIG. 6A, device 600 and device 650 are far apart. FIG. 6A shows proximity condition range indicator 652 around device 650. A proximity condition range indicator is also referred to herein as a "proximity zone indicator" or simply as a "proximity zone." Device 600 is not inside of proximity condition range indicator 652. The proximity condition range indicators are included in the figures to aid understanding, but are not displayed on either device 600 or device 650. Proximity condition range indicator 652 is included as a visual aid, and is intended to represent a physical proximity that would satisfy a proximity condition. For example, range indicator 652 can represent the range of a near-field communication detection circuitry of device 650. In some embodiments, any appropriate technique can be used to detect proximity between devices. For instance, in some examples, wide-band wireless connection is used. Wide-band wireless connection is used, for example, to determine one or more of: directionality, distance, and orientation, of one or more devices. Thus, presence of a detectable device within (e.g., partially or completely) proximity condition range indicator 652 would satisfy a proximity condition, but would not if the detectable device is located outside of the range indicator 652. One of ordinary skill in the art would appreciate that a detection range of physical proximity can be non-uniform, can be affected by numerous variables (e.g., wireless interference, air humidity, or the like), and can include points in space in three dimensions, all of which are intended to be within the scope of this disclosure. Thus, the graphical representation of proximity condition range indicator 652 is not intended to limit the scope of determining whether a proximity condition is satisfied. Furthermore, the figures are not necessarily to scale and are included merely as a visual aid. Thus, unless otherwise noted, the size and scale of features depicted in the figures are not intended as a limitation on a distance required to be in close proximity or to satisfy a proximity condition.

FIG. 6A shows audio activity indicator 625, which indicates the audio activity of device 600, and audio activity indicator 675, which indicates the audio activity of device 650. Audio activity indicator 625 and audio activity indicator 675 indicate that device 600 and device 650 are both not currently outputting audio (e.g., are not playing back media) in the scenario illustrated in FIG. 6A, as indicated by the diagonal lines through the music notes in audio activity indicator 625 and audio activity indicator 675. The audio activity indicators are included in the figures to aid understanding, but are not displayed on either device 600 or device 650. In addition to the activity indications, some of the figures described below also include audio representations (e.g., 672a-672c), which are also included in the figures to aid understanding of the particular media item playing on device 600. These audio representations are also not displayed on either device 600 or device 650.

FIG. 6B illustrates a second scenario that includes device 600 at a short distance away from device 650. FIG. 6B illustrates an exemplary overhead view of the second scenario. As shown in 6B, device 600 and device 650 are close together and now device 600 is at least partially within the proximity condition range indicator 652. Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays media information affordance 606, which represents a media item recently played on device 600. Exemplary media items include, but are not limited to, a music track, an audio book (or portion thereof, such as a chapter), a podcast, a video, and a phone call. In some embodiments, media information affordance 606 represents a media item recently played on device 600 in accordance with a determination that both device 600 and device 650 are not currently playing audio. In FIG. 6B, media information affordance 606 represents a music track (e.g., a song).

Media information affordance 606 optionally includes several graphical elements that provide information about the media item, including: (1) external device indicator 606-1, which indicates the device with which device 600 is in proximity (e.g., device 650, also referred to as Kitchen Speaker); (2) action indicator 606-2, which indicates an action or function associated with media information affordance 606 (e.g., an action that is performed in response to selection of media information affordance 606); (3) media item indicator 606-3, which provides information identifying the media item (e.g., song title ("Summertime") and artist "DJ AP"); (4) media item status indicator 606-4, which describes a status of the media item (e.g., "Recently Played"); and (5) media item graphic 606-5, which includes an image associated with the media item (e.g., an album cover of the album on which the song is included).

As indicated by action indicator 606-2, selection of media information affordance 606 can cause the media item associated with media information affordance 606 to be played on device 650. In some embodiments, the action performed in response to selection of media information affordance 606 depends on the type of input. For example, in response to an input on media information affordance 606, e.g., as illustrated by input 610a, device 650 can perform an operation. For example, if the input is a tap gesture, playback of the media item on device 650 is initiated, whereas if the input is a downward swipe gesture starting on or near media information affordance 606 a different operation is performed.

As illustrated in FIG. 6B, device 600 may receive input (e.g., a swipe) on media information affordance 606. In response to receiving input, and in accordance with a determination that the input is a swipe (e.g., as opposed to a tap), device 600 displays media information affordance 608, as shown in FIG. 6C. In the embodiment illustrated in FIGS. 6B-6C, device 600 also ceases display of media information affordance 606 and partially obscures (e.g., greys out, blurs out) the portion of user interface 604 that is not occupied by media information affordance 608. Media information affordance 608 optionally includes several graphical elements that provide information about the media item, including: (1) external device indicator 608-1, which indicates the device with which device 600 is in proximity (e.g., device 650, also referred to as Kitchen Speaker); (2) action indicator 608-2, which indicates an action or function associated with media information affordance 608 (e.g., an action that is performed in response to selection of media information affordance 608); (3) media item indicator 608-3, which provides information identifying the media item (e.g., song title ("Summertime") and artist "DJ AP"); (4) media item status indicator 608-4, which describes a status of the media item (e.g., "Recently Played"); and (5) media item graphic 608-5, which includes an image associated with the media item (e.g., an album cover of the album on which the song is included). In some embodiments, media information affordance 608 is different from media information affordance 606. In the embodiment illustrated in FIGS. 6B-6C, media information affordance 608 is larger than media information affordance 606 and is displayed at or near the middle of display 602, whereas media information affordance 606 is displayed at or near the top of display 602. For example, media information provided in affordance 608 may be an enlarged, expanded version of media information provided in affordance 606.

In response to an input corresponding to selection of the media item while media information affordance 608 is displayed (e.g., a tap on media item graphic 608-5 or a tap on media information affordance 608 while media item graphic 608-5 is entered on media information affordance 608), playback of the media item "Summertime by DJ AP" on device 650 is initiated.

In addition, media information affordance 608 includes a queue of media items (e.g., media item graphic 608-5, 608-6 in FIG. 6C) that can be selected for playback on device 650. As shown in FIG. 6C, media information affordance 608 includes media item graphic 608-6, which corresponds to a second media item. In FIG. 6C, device 600 receives input (e.g., input 601b, which represents a right-to-left swipe) on media information affordance 608. In response to receiving input 610b, device 600 scrolls media item graphics in media information affordance 608 in a horizontal manner, as shown in FIG. 6D. Scrolling media information affordance 608 includes moving media item graphic 608-5 partially off the left edge of media information affordance 608, fully displaying media item graphic 608-6 in the middle of media information affordance 608, and partially displaying media item graphic 608-7, which was previously completely hidden (e.g., not displayed). As a result of scrolling, media item indicator 608-3 is replaced (or updated) with media item indicator 608-3a, which provides information identifying the media item corresponding to media item graphic 608-6 (e.g., playlist ("Hit Mix") and user "Jane"). In some embodiments, the media item corresponding to media item graphic 608-6 is the media item that was played immediately prior to the media item corresponding to media item graphic 608-5, and is considered recently played, as indicated by media item status indicator 608-4 in FIG. 6D. In some embodiments, the queue in media information affordance 608 includes media items that are scheduled to be played after the media item corresponding to media item graphic 608-5 (e.g., the next 2, 4, 5, 8 edia items to be played). In some such embodiments, the media item corresponding to media item graphic 608-6 represents a media item scheduled to be played after the media item corresponding to media item graphic 608-5, and, optionally, media item status indicator 608-4 is replaced or updated, e.g., with a media item status indicator such as "Up Next".

In FIG. 6I), device 600 receives input 610c (e.g., a tap) corresponding to selection of a media item represented by media item graphic 608-6. In response to receiving input 610c, device 600 transmits an instruction to device 650 to initiate playback of the media item represented by media item graphic 608-6 on device 650. FIG. 6E illustrates the status of device 600 and device 650 after initiating playback of the media item on device 650. In FIG. 6E, audio activity indicator 675 indicates that device 650 is currently playing audio, and audio activity indicator 625 indicates that device 600 still is not playing audio. Media information affordance 608 is optionally updated to reflect the current state; updated action indicator 608-2a indicates that the media item "Hit Mix by Jane" is now playing on device 650, as indicated by external device indicator 608-1, which still identifies device 650 ("Kitchen Speaker").

FIG. 6F illustrates a scenario in which device 600 is not inside of proximity condition range indicator 652, device 600 is playing audio (as indicated by audio activity indicator 625), and device 650 is not playing audio (as indicated by audio activity indicator 675). In FIG. 6F, device 600 displays user interface 614 of a music application running on device 600, which indicates the media item currently being played on device 600. FIG. 6G illustrates that device 600 is moved at least partially inside of proximity condition range indicator 652 while device 600 is playing audio and device 650 is not playing audio (e.g., song "The Sound" by artist "Mac Band" from album "Sophomore"). Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied (e.g., in order to send media items between device 600 and device 650)). In some examples, device 650 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays media information affordance 616, which represents the media item currently playing on device 600. In some embodiments, media information affordance 616 represents the media item currently playing on device 600 in accordance with a determination that device 600 is currently playing a media item.

Media information affordance 616 optionally includes several graphical elements that provide information about the media item currently playing on device 600, including: (1) external device indicator 616-1, which indicates the device with which device 600 is in proximity (e.g., device 650, also referred to as Kitchen Speaker); (2) action indicator 616-2, which indicates an action or function associated with media information affordance 616 (e.g., an action that is performed in response to selection of media information affordance 616); (3) media item indicator 616-3, which provides information identifying the media item (e.g., song title ("The Sound") and artist "Mac Band"); (4) media item status indicator 616-4, which describes a status of the media item (e.g., "From Phone"); and (5) media item graphic 616-5, which includes an image associated with the media item (e.g., an album cover of the album on which the song is included).

As indicated by action indicator 616-2, selection of media information affordance 616 can cause the media item associated with media information affordance 616 to be played on device 650. Furthermore, media item status indicator 616-4 indicates the source of the media item to be played back (e.g., "From Phone").

In some embodiments, media information affordance 616 corresponding to a currently playing media item is analogous to media information affordance 606 corresponding to a recently played media item. For example, the action performed in response to selection of media information affordance 616 depends on the type of input. In some embodiments, in response to a tap gesture on media information affordance 616, playback of the media item currently playing on device 600 is initiated on device 650, whereas a downward swipe gesture starting on or near media information affordance 616 causes device 600 to display a media information affordance analogous to media information affordance 608 described above, but with information for the media item currently playing on device 600 in FIG. 6G.

In FIG. 6G, device 600 receives input 610d (e.g., a tap) corresponding to selection of media information affordance 616. In response to receiving input 610d, device 600 transmits an instruction to device 650 to initiate playback of the media item currently playing on device 600. As shown in FIG. 6H, in response to receiving input 610d, device 600 displays updated media information affordance 616a (e.g., replaces media information affordance 616 with a new affordance or maintains display of media information affordance 616, but changes at least a portion of the information displayed therein). In FIG. 6H, media information affordance 616a includes updated action indicator 616-2a, which indicates that playback has been initiated (e.g., "Transferring to Speaker"). In some embodiments, device 600 displays a media information affordance analogous to media information affordance 616a in response to a tap on media information affordance 606 (FIG. 6B), except with information corresponding to recently played media item "Summertime by DJ AP" instead of currently playing media item "The Sound by Mac Band."

As shown in FIG. 6I, after displaying updated media information affordance 616a (e.g., in response to an indication that playback has successfully begun on device 650 or a predetermined amount of time after receiving input 610d or displaying media information affordance 616a), device 600 ceases displaying media information affordance 616a and updates user interface 614 with graphical element 614-2 to indicate that audio is being played back on device 650, "Kitchen Speaker" (as indicated by audio status indicator 675). Audio status indicator 625 indicates that device 600 ceases playing audio when playback begins on device 650 (e.g., in response to input 610d). In some embodiments, device 600 continues playing audio (e.g., "The Sound by Mac Band") during playback on device 650.

FIG. 6J illustrates a scenario in which device 600 is not inside of proximity condition range indicator 652, device 600 is playing audio (as indicated by audio activity indicator 625), and device 650 is playing audio different from the audio playing on device 600 (as indicated by audio activity indicator 675). In particular, in FIG. 6J, device 600 is playing "O Christmas Tree" as shown on user interface 618, and device 650 is playing "Old MacDonald," as indicated by audio representation 672a. Audio representation 672a is only being provided for illustrative purposes only. In FIG. 6J, device 600 displays user interface 618 of a music application running on device 600, which indicates the media item currently being played on device 600. FIG. 6K illustrates that device 600 is moved at least partially inside of proximity condition range indicator 652 while both device 600 and device 650 are playing their respective audio media items. Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied).

As illustrated in FIG. 6K, in response to detecting the indication that the physical proximity satisfies the proximity condition, device 600 displays media information affordance 620, which represents the media item currently playing on device 600. In sonic embodiments, media information affordance 620 represents the media item currently playing on device 600 in accordance with a determination that device 600 is currently playing a media item (e.g., regardless of whether or not device 650 is playing audio). In some embodiments, media information affordance 620 represents the media item currently playing on device 600 in accordance with a determination that device 600 and device 650 are both currently playing audio.

Media information affordance 620 optionally includes several graphical elements that provide information about the media item currently playing on device 600, including: (1) external device indicator 620-1, which indicates the device with which device 600 is in proximity (e.g., device 650, also referred to as "Kitchen Speaker" in FIG. 6K); (2) action indicator 620-2, which indicates an action or function associated with media information affordance 620 (e.g., an action that is performed in response to selection of media information affordance 620); (3) media item indicator 620-3, which provides information identifying the media item (e.g., song title ("O Christmas Tree") and artist "Carolers"); (4) media item status indicator 620-4, which describes a status of the media item (e.g., "From Phone"); and (5) media item graphic 620-5, which includes an image associated with the media item (e.g., an album cover of the album on which the song is included).

As indicated by action indicator 620-2, selection of media information affordance 620 can cause the media item associated with media information affordance 620 to be played on device 650. Furthermore, media item status indicator 620-4 indicates the source of the media item to be played back (e.g., "From Phone").

In some embodiments, media information affordance 620 is analogous to media information affordance 616. For example, the action performed in response to selection of media information affordance 620 depends on the type of input. In some embodiments, in response to a tap gesture on media information affordance 620, playback of the media item currently playing on device 600 is initiated on device 650, whereas a downward swipe gesture starting on or near media information affordance 620 causes device 600 to display a media information affordance analogous to media information affordance 608 described above, but with information for the media item currently playing on device 600 in FIG. 6K.

In FIG. 6K, device 600 receives input 610e (e.g., a tap) corresponding to selection of media information affordance 620. In response to receiving input 610e, device 600 transmits an instruction to device 650 to initiate playback of the media item currently playing on device 600. In some embodiments, in response to receiving input 610e, device 600 displays an updated media information affordance analogous to updated media information affordance 616a to indicate that the media item currently playing on device 600 is being transferred for playback on device 650.

As shown in FIG. 6L, after receiving input 610e (e.g., in response to receiving input 610e), device 600 ceases displaying media information affordance 620 and updates user interface 618 with graphical element 618-2 to indicate that audio is being played back on device 650, "Kitchen Speaker" (as indicated by audio status indicator 675). Audio status indicator 625 indicates that device 600 ceases playing audio when playback begins on device 650 (e.g., in response to input 610e). Audio status indication 675 indicates that device 650 is playing audio (e.g., "O Christmas Tree," which is indicated by audio representation 672b). In some embodiments, device 600 continues playing audio (e.g., "O Christmas Tree") during playback on device 650.

FIG. 6M illustrates a scenario in which device 600 is not inside of proximity condition range indicator 652, device 600 is not playing audio (as indicated by audio activity indicator 625), and device 650 is playing audio ("Anything" by The Stars (e.g., 672c), as indicated by audio activity indicator 675). In FIG. 6M, device 600 displays user interface 604 (e.g., a home screen with application icons). FIG. 6N illustrates that device 600 is moved at least partially inside of proximity condition range indicator 652 while both device 600 and device 650 are playing their respective audio media items. Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays media information affordance 622, which represents the media item currently playing on device 650. In some embodiments, media information affordance 622 represents the media item currently playing on device 650 in accordance with a determination that device 650 is currently playing a media item and device 600 is not currently playing a media item. In some embodiments, media information affordance 620 represents the media item currently playing on device 650 in accordance with a determination that device 650 is currently playing a media item (e.g., regardless of whether or not device 600 is playing a media item).

Media information affordance 622 optionally includes several graphical elements that provide information about the media item currently playing on device 650, including: (1) external device indicator 622-1, which indicates the device with which device 600 is in proximity (e.g., device 650, also referred to as Kitchen Speaker); (2) action indicator 622-2, which indicates an action or function associated with media information affordance 622 (e.g., an action that is performed in response to selection of media information affordance 622); (3) media item indicator 622-3, which provides information identifying the media item (e.g., song title ("Anything") and artist "The Stars"); and (4) media item graphic 622-4, which includes an image associated with the media item (e.g., an album cover of the album on which the song is included).

As indicated by action indicator 622-2, selection of media information affordance 622 can cause the media item associated with media information affordance 622 to be played on device 600 (e.g., transferred from device 650).

In some embodiments, the action performed in response to selection of media information affordance 622 depends on the type of input. For example, in response to a tap gesture on media information affordance 622, playback of the media item currently playing on device 650 is initiated on device 600, whereas a downward swipe gesture starting on or near media information affordance 622 causes device 600 to display a media information affordance analogous to media information affordance 608 described above, but with information for the media item currently playing on device 650 in FIG. 6N.

In FIG. 6N, device 600 receives input 610f (e.g., a tap) corresponding to selection of media information affordance 622. In response to receiving input 610f, device 600 initiates playback on device 600 of the media item currently playing on device 650. As shown in FIG. 6O, in response to receiving input 610f, device 600 displays updated media information affordance 622a (analogous to updated media information affordance 616a), with updated action indicator 622-2a to indicate that the media item currently playing on device 650 is being transferred for playback on device 600.

As shown in FIG. 6P, after displaying updated media information affordance 622a (e.g., in response to an indication that playback has successfully begun on device 600 or a predetermined amount of time after receiving input 610f or displaying media information affordance 622a), device 600 ceases displaying media information affordance 622a and displays user interface 624 to indicate that audio is being played back on device 600 (as indicated by audio status indicator 625). In some embodiments, user interface 624 corresponds to a music application that is launched in response to initiating playback on device 600, and allows a user to further control playback on device 600. Audio status indicator 675 indicates that device 650 ceases playing audio when playback begins on device 600 (e.g., in response to input 610f). In some embodiments, device 650 continues playing audio (e.g., "Anything" by The Stars) during playback on device 600.

FIG. 7 is a flow diagram illustrating a method for controlling audio playback using an electronic device in accordance with some embodiments. Method 700 is performed at a device (e.g., 100, 300, 500, or 600) with a display device (e.g., 602). Some operations in method 700 are, optionally, combined, the orders of some operations are, optionally, changed, and some operations are, optionally, omitted.

As described below, method 700 provides an intuitive way for controlling audio playback. The method reduces the cognitive burden on a user for controlling audio playback, thereby creating a more efficient human-machine interface. For battery-operated computing devices, enabling a user to control audio playback faster and more efficiently conserves power and increases the time between battery charges.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

The electronic device detects (702), while connected to an external device (e.g., 650), an indication that a physical proximity between the electronic device and the external device satisfies a proximity condition (e.g., represented by 652). In some embodiments, the indication is provided in response to a determination that the physical proximity between the electronic device and the external device satisfies the proximity condition. In some embodiments, the proximity condition is satisfied if the distance between the electronic device and the external device is less than a threshold distance (e.g., 6 inches, 12 inches, 18 inches, 24 inches).

In response to detecting the indication that the physical proximity satisfies the proximity condition, the electronic device displays (704), via the display device, a first media information affordance (e.g., 606, 616, 620) representing a first media item (e.g., a music track, an audio book (or portion thereof, such as a chapter), a podcast, a video, a phone call; a media item that is currently playing on the electronic device, a most recent media item that was playing on the electronic device and has ended or has been stopped or paused, a media item that is scheduled to be played next on the electronic device, such as a first track in a playlist, when a user launches a media application or selects a playlist), the first media information affordance including a first set of information (e.g., 606-1 through 606-5) about the first media item. Displaying a first media information affordance representing a first media item in response to detecting the indication that the physical proximity satisfies the proximity condition automatically provides feedback by indicating for the user that the physical proximity satisfies the proximity condition, thus reducing the number of inputs needed to display the first media information affordance. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device receives (706) a first input (e.g., 610a, 610d, 610e) representing selection of the first media information affordance.

In response to (708) receiving the first input, in accordance with a determination that the first input is a first type of input (e.g., a tap gesture on a touch-sensitive display of the electronic device at a location corresponding to the first media information affordance), the electronic device transmits (710) an instruction to the external device to initiate playback of the first media item on the external device (e.g., FIG. 6H-6I).

In response to (708) receiving the first input, in accordance with a determination that the first input is a second type of input (e.g., a directional swipe gesture on the first media information affordance) different from the first type of input, the electronic device displays (712), via the display device, a second media information affordance (e.g., 608) representing the first media item, the second media information affordance different from the first media information affordance and including a second set of information about the first media item. Transmitting an instruction to the external device to initiate playback of the first media item on the external device or displaying a second media information affordance representing the first media item depending on the type of input selecting the first media affordance provides additional control options related to the first media affordance without cluttering the user interface with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device displays the second media information affordance without transmitting an instruction to the external device to initiate playback of the first media item on the external device. In some embodiments, the second set of information includes the first set of information, but is displayed differently. In some embodiments, the second media information affordance includes additional information (e.g., more details) about the first media item and/or a larger graphical representation of the first media item. In some embodiments, the second set of information includes a queue of media items, including media items that are subsequent to the first media item (e.g., media items scheduled to be played after the first media item) and/or prior to the first media item in the queue (e.g., media items that were played prior to the first media item or are positioned before the first media item in a list of media items, such as a playlist).

In some embodiments, the first media information affordance includes an indication (e.g., 606-1, 606-2) that identifies the external device. In some embodiments, the second media information affordance includes an indication that identifies the external device. In some embodiments, the first media information affordance includes an indication that selection of the first media information affordance will initiate playback of the first media item on the external device.

In sonic embodiments, in response to receiving the first input, and in accordance with the determination that the first input is the first type of input, the electronic device alters the visual appearance (e.g., 612-2a) of the first media information affordance to indicate that playback of the first media item on the external device has been initiated (see, e.g., FIG. 6H). In some embodiments, altering the visual appearance of the first media information affordance includes displaying text indicating that playback of the first media item on the external device has been initiated, while, optionally, maintaining display of at least some of the first set of information about the first media item. In some embodiments, altering the visual appearance of the first media information affordance includes replacing the indication that selection of the first media information affordance will initiate playback of the first media item on the external device with the indication (e.g., text) that playback of the first media item on the external device has been initiated.

In some embodiments, the first set of information about the first media item indicates (e.g., 606-5, 902-4) a type of media item corresponding to the first media item. Exemplary types of media items include, but are not limited to, a music track, an audio book, a podcast, a video, and a phone call. In some embodiments, the first set of information for a phone call media item includes an avatar of the participant of the call.

In some embodiments, as part of initiating playback of the first media item on the external device, in accordance with a determination that the first media item satisfies a data transmission condition (e.g., the first media item is a phone call; the first media item is provided by an application, service, or account available to the electronic device but not available to the external device), the electronic device transmits data for the first media item to the external device. In some embodiments, as part of initiating playback of the first media item on the external device, in accordance with a determination the first media item does not satisfy the data transmission condition (e.g., the first media item is provided by a particular application, service, or account to which the external device has access), the electronic device forgoes transmitting data for the first media item to the external device. Transmitting data for the first media item to the external device (or not) based on whether the first media item satisfies a data transmission condition avoids a user having to provide additional inputs to transmit the data. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a queue of media items including the first media item exists on the electronic device prior to initiating playback. In some such embodiments, initiating playback includes transferring the queue to the external device. In some embodiments, the first media item is accessible to both the electronic device and the external device via a common user account. In some embodiments, the external device obtains the first media item from the common user account (e.g., playback of the first item does not include streaming the first media item from the electronic device to the external device). In some embodiments, the external device obtains the queue from the common user account.

In some embodiments, after transmitting the instruction to the external device to initiate playback of the first media item on the external device, in response to a determination that a time condition is met (e.g., a threshold amount of time has passed since receiving the first input of the first type), the electronic device ceases displaying the first media information affordance representing the first media item (see, e.g., FIG. 6I).

In some embodiments, while displaying the first media information affordance representing the first media item and before receiving the first input, the electronic device detects an indication that the physical proximity between the electronic device and the external device satisfies a physical separation condition (e.g., represented by 656). In some embodiments, the indication is provided in response to a determination that the physical proximity between the electronic device and the external device satisfies the physical separation condition. In some embodiments, the physical separation condition is satisfied if the distance between the electronic device and the external device exceeds a predefined threshold distance. In some embodiments, the threshold distance associated with the physical separation condition is greater than a first threshold distance associated with the (first) proximity condition. For example, the physical separation condition is satisfied if the distance between the electronic device and the external device exceeds a third threshold distance (e.g., 20 feet), and the first proximity condition is satisfied if the distance between the electronic device and the external device is less than the first threshold distance (e.g., 1-2 feet), where the third threshold distance is greater than the first threshold distance. In some embodiments, while displaying the first media information affordance representing the first media item and before receiving the first input, in response to detecting the indication that the physical proximity satisfies the physical separation condition, the electronic device ceases displaying the first media information affordance representing the first media item (e.g., FIG. 11D). Ceasing displaying the first media information affordance representing the first media item in response to detecting the indication that the physical proximity satisfies the physical separation condition provides feedback to the user indicating playback can no longer be initiated on the external device via selection of the first media information affordance. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first type of input includes a tap gesture (e.g., 610*d*) and the second type of input includes a swipe or drag gesture (e.g., 610*a*; a vertical upward or vertical downward swipe or drag gesture).

In some embodiments, while displaying the second media information affordance representing the first media item, the electronic device receives a second input (e.g., 610*c*) representing selection of the second media information affordance. In some embodiments, in response to receiving the second input representing selection of the second media information affordance, the electronic device transmits an instruction to the external device to initiate playback of a second media item on the external device. In some embodiments, the second media item is the first media item. In some embodiments, the second media information affordance represents a queue of media items including a representation of the first media item and a representation of at least one other media item. In some such embodiments, the electronic device scrolls the queue in response to input (e.g., a horizontal swipe or drag gesture). In some embodiments, in response to an input corresponding to selection of a media item in the queue, the electronic device transmits an instruction to the external device to initiate playback of the selected media item on the external device. Displaying the second media information affordance (e.g., with additional information about the first media item) and initiating playback of a second media item on the external device in response to selection of the second media information affordance provides improved feedback by giving the user additional information and/or control over playback on the external device. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, detecting the indication that the physical proximity between the electronic device and the external device satisfies a proximity condition occurs while the electronic device is causing playback of the first media item (e.g., FIG. 6G). In some embodiments, causing playback includes outputting the media item via one or more speakers of the electronic device, or causing output at one or more connected external speakers. In some embodiments, in response to receiving the first input, and in accordance with a determination that the first input is a first type of input, the electronic device ceases causing playback of the first media item at the electronic device (see, e.g., FIG. 6I). In some embodiments, the electronic device continues playing the first media item.

In some embodiments, the first media information affordance represents the first media item in accordance with a determination that the first media item is playing on the electronic device while detecting the indication that the physical proximity between the electronic device and the external device satisfies the proximity condition (e.g., FIG. 6G). In some embodiments, transmitting the instruction to the external device to initiate playback of the first media item on the external device is performed in accordance with a determination that the first media item is currently playing on the electronic device.

In some embodiments, as part of initiating playback of the first media item on the external device the electronic device ceases playing a third media item on the external device (see, e.g., FIG. 6L).

In some embodiments, in accordance with a determination that the electronic device is not playing a media item while detecting the indication that the physical proximity between the electronic device and the external device satisfies the proximity condition (e.g., FIG. 6B), the first media item is a media item played on the electronic device most recently before detecting the indication that the physical proximity between the electronic device and the external device satisfies the proximity condition. In some embodiments, the first media information affordance represents the media item most recently played on the electronic device in accordance with a determination that the external device is not playing a media item at the time of detecting the indication that the physical proximity between the electronic device and the external device satisfies the proximity condition.

Note that details of the processes described above with respect to method 700 (e.g., FIG. 7) are also applicable in an analogous manner to the methods described below. For example, method 800 and/or method 1000 optionally includes one or more of the characteristics of the various methods described above with reference to method 700. For example, operation 706 of method 700 can be performed to select the first media information affordance described in operation 1004 of method 1000, and operations 708, 710, and/or 712 can be performed as part of method 1000 in response to the selection. For brevity, these details are not repeated below.

FIG. 8 is a flow diagram illustrating a method for controlling audio playback using an electronic device in accordance with some embodiments. Method 800 is performed at a device (e.g., 100, 300, 500, or 600) with a display device 602). Some operations in method 800 are, optionally, combined, the orders of some operations are, optionally, changed, and some operations are, optionally, omitted.

As described below, method 800 provides an intuitive way for controlling audio playback. The method reduces the cognitive burden on a user for controlling audio playback, thereby creating a more efficient human-machine interface. For battery-operated computing devices, enabling a user to control audio playback faster and more efficiently conserves power and increases the time between battery charges.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

The electronic device detects (802), connected to an external device (e.g., 650), an indication that a physical proximity between the electronic device and the external device satisfies a proximity condition (e.g., represented by 652). In some embodiments, the indication is provided in response to a determination that the physical proximity between the electronic device and the external device satisfies the proximity condition. In some embodiments, the proximity condition is satisfied if the distance between the electronic devices is less than a threshold distance (e.g., 6 inches, 12 inches, 18 inches, 24 inches).

In response to detecting the indication that the physical proximity satisfies the proximity condition, the electronic device displays (804), via the display device, a first media information affordance (e.g., 622) representing a first media item (e.g., a music track, an audio book (or portion thereof, such as a chapter), a podcast, a video, a phone call) that is currently playing on the external device. In some embodiments, the first media information affordance represents the first media item in accordance with a determination that the first media item is currently playing on the external device and not currently playing on the electronic device. In some embodiments, the first media information affordance includes a first set of information (e.g., 622-1 through 622-4) about the first media item. Displaying a first media information affordance representing a first media item in response to detecting the indication that the physical proximity satisfies the proximity condition automatically provides feedback by indicating for the user that the physical proximity satisfies the proximity condition, thus reducing the number of inputs needed to display the first media information affordance. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

The electronic device receives (806) a first input (e.g., 610*f*) representing selection of the first media information affordance.

In response to (808) receiving the first input, in accordance with a determination that the first input is a first type of input (e.g., a tap gesture on a touch-sensitive display of the electronic device at a location corresponding to the first media information affordance), the electronic device initiates (810) playback of the first media item on the electronic device.

In response to (808) receiving the first input, in accordance with a determination that the first input is a second type of input (e.g., a directional swipe gesture on the first media information affordance) different from the first type of input, the electronic device displays (812), via the display device, a second media information affordance (e.g., 608) representing the first media item, the second media information affordance different from the first media information affordance and including a second set of information about the first media item. Initiating playback of the first media item on the electronic device or displaying a second media information affordance representing the first media item depending on the type of input selecting the first media affordance provides additional control options related to the first media affordance without cluttering the user interface with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second set of information includes the first set of information, but is displayed differently. In some embodiments, the second media information affordance includes additional information (e.g., more details) about the first media item and/or a larger graphical representation of the first media item. In some embodiments, the second set of information includes a queue of media items, including media items that are subsequent to the first media item (e.g., media items scheduled to be played after the first media item) and/or prior to the first media item in the queue (e.g., media items that were played prior to the first media item or are positioned before the first media item in a list of media items, such as a playlist).

In some embodiments, the electronic device displays the first media information affordance representing the first media item that is currently playing on the external device in accordance with a determination that the electronic device is not playing an audio media item at the time of detecting the indication that the physical proximity between the electronic device and the external device satisfies the proximity condition (e.g., FIG. 6N).

In some embodiments, the first media information affordance includes an indication (e.g., 622-2) that identifies the electronic device. In some embodiments, the second media affordance includes an indication that identifies the electronic device. In some embodiments, the first media information affordance includes an indication that selection of the first media information affordance will initiate playback of the first media item on the electronic device.

In some embodiments, in response to receiving the first input, and in accordance with a determination that the first input is a first type of input, the electronic device alters the visual appearance of the first media information affordance (e.g., 622-2a) to indicate that playback of the first media item on the electronic device has been initiated. In some embodiments, altering the visual appearance of the first media information affordance includes displaying text indicating that playback of the first media item on the electronic device has been initiated, while, optionally, maintaining display of at least some of the first set of information about the first media item. In some embodiments, altering the visual appearance of the first media information affordance includes replacing the indication that selection of the first media information affordance will initiate playback of the first media item on the electronic device with the indication (e.g., text) that playback of the first media item on the electronic device has been initiated.

In some embodiments, the first media information affordance includes an indication (e.g., 622-1) that identifies the external device as a source of the first media item.

In some embodiments, the first set of information about the first media item indicates (e.g., 622-4, 902-4) a type of media item corresponding to the first media item. Exemplary types of media items include, but are not limited to, a music track, an audio book, a podcast, a video, and a phone call. In some embodiments, the first set of information for a phone call media item includes an avatar of the participant of the call.

In some embodiments, as part of initiating playback of the first media item on the electronic device, in accordance with a determination that the first media item satisfies a data transmission condition (e.g., the first media item is provided by an application or account available to the external device but not available to the electronic device), the electronic device receives data for the first media item from the external device. In some embodiments, a queue of media items including the first media item exists on the external device prior to initiating playback. In some such embodiments, initiating playback includes transferring the queue to the electronic device. In some embodiments, as part of initiating playback of the first media item on the electronic device, in accordance with a determination that the first media item does not satisfy the data transmission condition (e.g., the electronic device was transmitting data for the first media item to the external device; the first media item is a phone call; the first media item is provided by a particular application, service, or account to which the electronic device has access), the electronic device forgoes receiving data for the first media item from the external device. Receiving data for the first media item from the external device (or not) based on whether the first media item satisfies a data transmission condition avoids a user having to provide additional inputs to receive the data. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a queue of media items including the first media item exists on external device prior to initiating playback. In some such embodiments, initiating playback includes transferring the queue to the electronic device. In some embodiments, the first media item is accessible to both the electronic device and the external device via a common user account. In some embodiments, the electronic device obtains the first media item from the common user account (e.g., playback of the first item does not include streaming the first media item from the external device to the electronic device). In some embodiments, the electronic device obtains the queue from the common user account.

In some embodiments, after initiating playback of the first media item on the electronic device, in response to a determination that a time condition is met (e.g., a threshold amount of time has passed since receiving the first input of the first type), the electronic device ceases displaying the first media information affordance representing the first media item (see, e.g., FIG. 6P).

In some embodiments, after displaying the first media information affordance representing the first media item and before receiving the first input, the electronic device detects an indication that the physical proximity between the electronic device and the external device satisfies a physical separation condition (e.g., represented by 656). In some embodiments, the indication is provided in response to a determination that the physical proximity between the electronic device and the external device satisfies the physical separation condition. In some embodiments, the physical separation condition is satisfied if the distance between the electronic device and the external device exceeds a predefined threshold distance. In some embodiments, the threshold distance associated with the physical separation condition is greater than a first threshold distance associated with the (first) proximity condition. For example, the physical separation condition is satisfied if the distance between the electronic device and the external device exceeds a third threshold distance (e.g., 20 feet), and the first proximity condition is satisfied if the distance between the electronic device and the external device is less than the first threshold distance (e.g., 1-2 feet), where the third threshold distance is greater than the first threshold distance. In some embodiments, after displaying the first media information affordance representing the first media item and before receiving the first input, in response to detecting the indication that the physical proximity satisfies the physical separation condition, the electronic device ceases displaying the first media information affordance representing the first media item (see, e.g., FIG. 11D). Ceasing displaying the first media information affordance representing the first media item in response to detecting the indication that the physical proximity satisfies the physical separation condition provides feedback to the user indicating playback can no longer be initiated on the electronic device via selection of the first media information affordance. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first type of input includes a tap gesture (e.g., 610f) and the second type of input includes a swipe or drag gesture (e.g., 610a; a vertical upward or vertical downward swipe or drag gesture).

In some embodiments, while displaying the second media information affordance (e.g., 608) representing the first media item, the electronic device receives a second input (e.g., 610c) representing selection of the second media information affordance. In some embodiments, in response to receiving the second input representing selection of the second media information affordance, the electronic device initiates playback of a second media item on the electronic device. In some embodiments, the second media item is the first media item. In some embodiments, the second media information affordance represents a queue of media items including a representation of the first media item and a representation of at least one other media item. In some such embodiments, the electronic device scrolls the queue in response to input (e.g., a horizontal swipe or drag gesture). In some embodiments, in response to an input corresponding to selection of a media item in the queue, the electronic device initiates playback of the selected media item on the electronic device. Displaying the second media information affordance (e.g., with additional information about the first media item) and initiating playback of a second media item on the electronic device in response to selection of the second media information affordance provides improved feedback by giving the user additional information and/or control over playback on the external device. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the first input, and in accordance with a determination that the first input is a first type of input, the external device ceases playing the first media item (see, e.g., FIG. 6P). In some embodiments, the external device continues playing the first media item.

Note that details of the processes described above with respect to method 800 (e.g., FIG. 8) are also applicable in an analogous manner to the methods described below. For example, method 1000 optionally includes one or more of the characteristics of the various methods described above with reference to method 800. For example, operation 806 of method 800 can be performed to select the first media information affordance described in operation 1004 of method 1000, and operations 808, 810, and/or 812 can be performed as part of method 1000 in response to the selection. For brevity, these details are not repeated below.

FIGS. 9A-9D illustrate exemplary methods and user interfaces for controlling playback of media according to some embodiments. In some embodiments, the techniques described with reference to FIGS. 9A-9D allow a user to initiate playback of a media item on a different device with touch input.

Figure 9A:
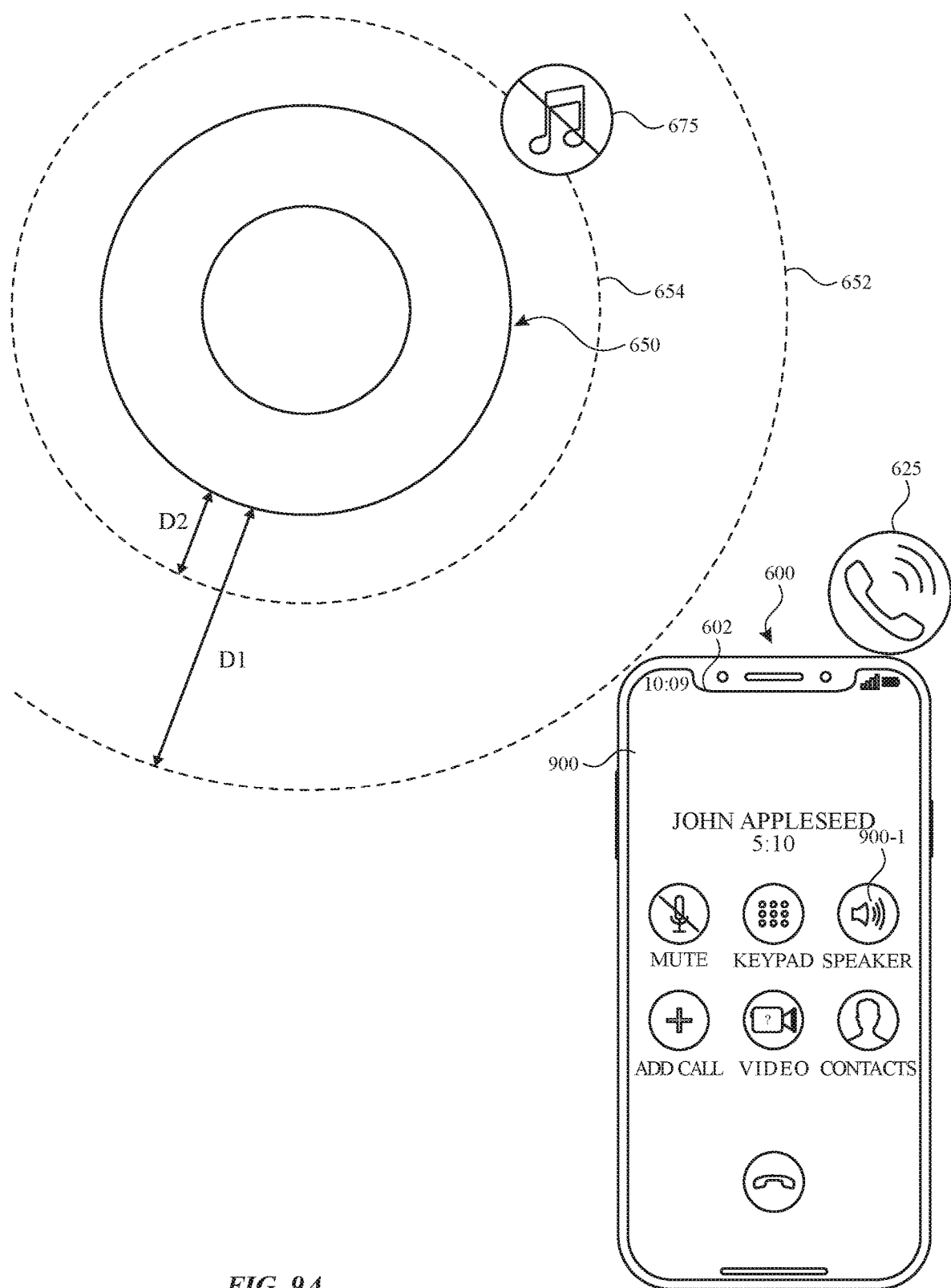
FIGS. 9A-9D illustrate exemplary user interfaces in accordance with some embodiments.
Figure 10:
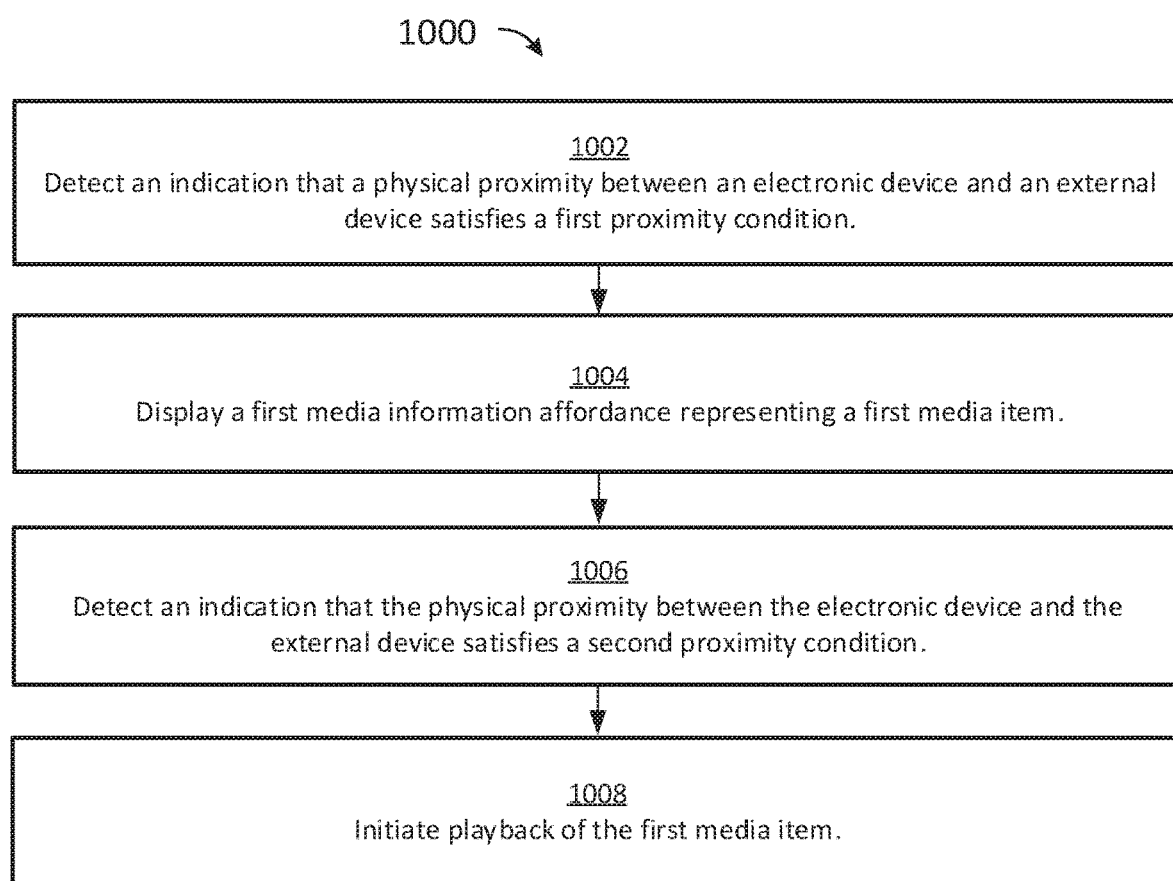
FIG. 10 illustrates an exemplary method in accordance with some embodiments.

FIG. 9A illustrates device 600, device 650, and proximity condition range indicator 652, described above with reference to FIGS. 6A-6P. Additionally, FIG. 9A illustrates playback proximity condition range indicator 654. As described in more detail below, playback of a media item can be initiated automatically (e.g., without selection of a media information affordance, such as 606, 608, 616, 620, and 622) by bringing device 600 within playback proximity condition range indicator 654.

Playback proximity condition range indicator 654 is included as a visual aid, and is intended to represent a physical proximity that would satisfy a playback proximity condition. Presence of a detectable device (e.g., 600) within (e.g., partially or completely) playback proximity condition range indicator 654 would satisfy a playback proximity condition, but would not if the detectable device is located outside of playback proximity condition range indicator 654. The graphical representation of playback proximity condition range indicator 654 is not intended to limit the scope of determining whether a playback proximity condition is satisfied. Furthermore, the figures are not necessarily to scale and are included merely as a visual aid. Thus, unless otherwise noted, the size and scale of features depicted in the figures are not intended as a limitation on a distance required to be in close proximity or to satisfy a playback proximity condition. However, as indicated by the arrows d1 and d2 in FIG. 9A, playback proximity condition range indicator 654 is inside of proximity condition range indicator 652 (e.g., d1 is greater than d2), such that device 600 must be closer to device 650 to satisfy the playback proximity condition associated with playback proximity condition range indicator 654 than to satisfy the proximity condition associated with proximity condition range indicator 652.

Figure 9B:
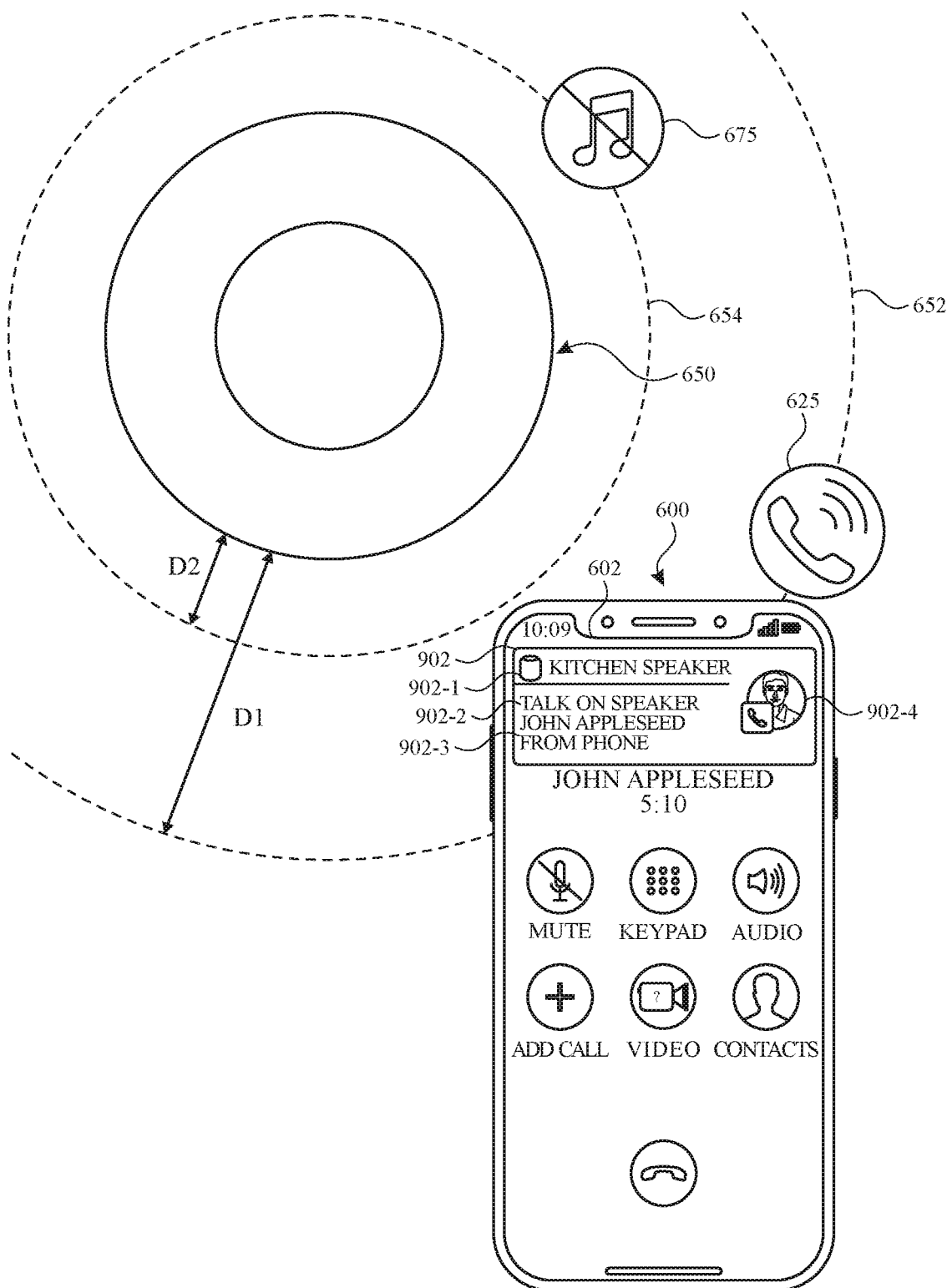

FIG. 9A illustrates a scenario in which device 600 is not inside of proximity condition range indicator 652, device 600 has an active phone call (as indicated by phone user interface 900 and audio activity indicator 625), and device 650 is not playing audio (as indicated by audio activity indicator 675). In FIG. 9A, device 600 is both providing audio output for the phone call (as indicated by audio status indicator 900-1) and receiving audio input for the phone call. Although FIGS. 9A-9D are described with reference to a phone call media item, the techniques described can be applied to other types of media items (e.g., a video call, music track, audio book, podcast). Similarly, the techniques described above with reference to FIGS. 6A-6P can be applied to a phone call, FIG. 9B illustrates that device 600 is moved at least partially inside of proximity condition range indicator 652 during the phone call on device 600. Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied).

In response to detecting the indication that the physical proximity satisfies the proximity condition, device 600 displays media information affordance 902, which represents the media item currently playing on device 600 (e.g., the phone call associated with user interface 900). Media information affordance 902 is analogous to media information affordances 606, 608, 616, 620, and 622 as applied to a phone call media item.

Media information affordance 902 optionally includes several graphical elements that provide information about the phone call in FIG. 9B, including: (1) external device indicator 902-1, which indicates the device with which device 600 is in proximity (e.g., device 650, also referred to as Kitchen Speaker); (2) action indicator 902-2, which indicates an action or function associated with media information affordance 902 (e.g., an action that is performed in response to selection of media information affordance 902); (3) media item indicator 902-3, which provides information identifying the media item (e.g., call participant ("John Appleseed") and current call source "Phone"); and (4) media item graphic 902-4, which includes an image associated with the media item. In the embodiment illustrated in FIG. 9B, media item graphic 902-4 includes a representation (e.g., an avatar) of a call participant on the other end of the call and an icon or thumbnail representing a phone. In some embodiments, the representation of the call participant in media item graphic 902-4 includes the participant's initials or name.

FIG. 9B illustrates that device 600 is moved at least partially inside of playback proximity condition range indicator 654 while media information affordance 902 is displayed on device 600 and while the phone call on device 600 is in process. Since playback proximity condition range indicator 654 represents a physical proximity that satisfies the playback proximity condition, device 600 detects an indication that a physical proximity between the device 600 and device 650 satisfies the playback proximity condition (e.g., and, in response, initiates communication with device 650, for example, to send an indication that the playback proximity condition is satisfied). In some examples, device 650 detects an indication that the playback proximity condition is satisfied (e.g., and, in response, initiates communication with device 600, for example, to send an indication that the playback proximity condition is satisfied).

Figure 9C:
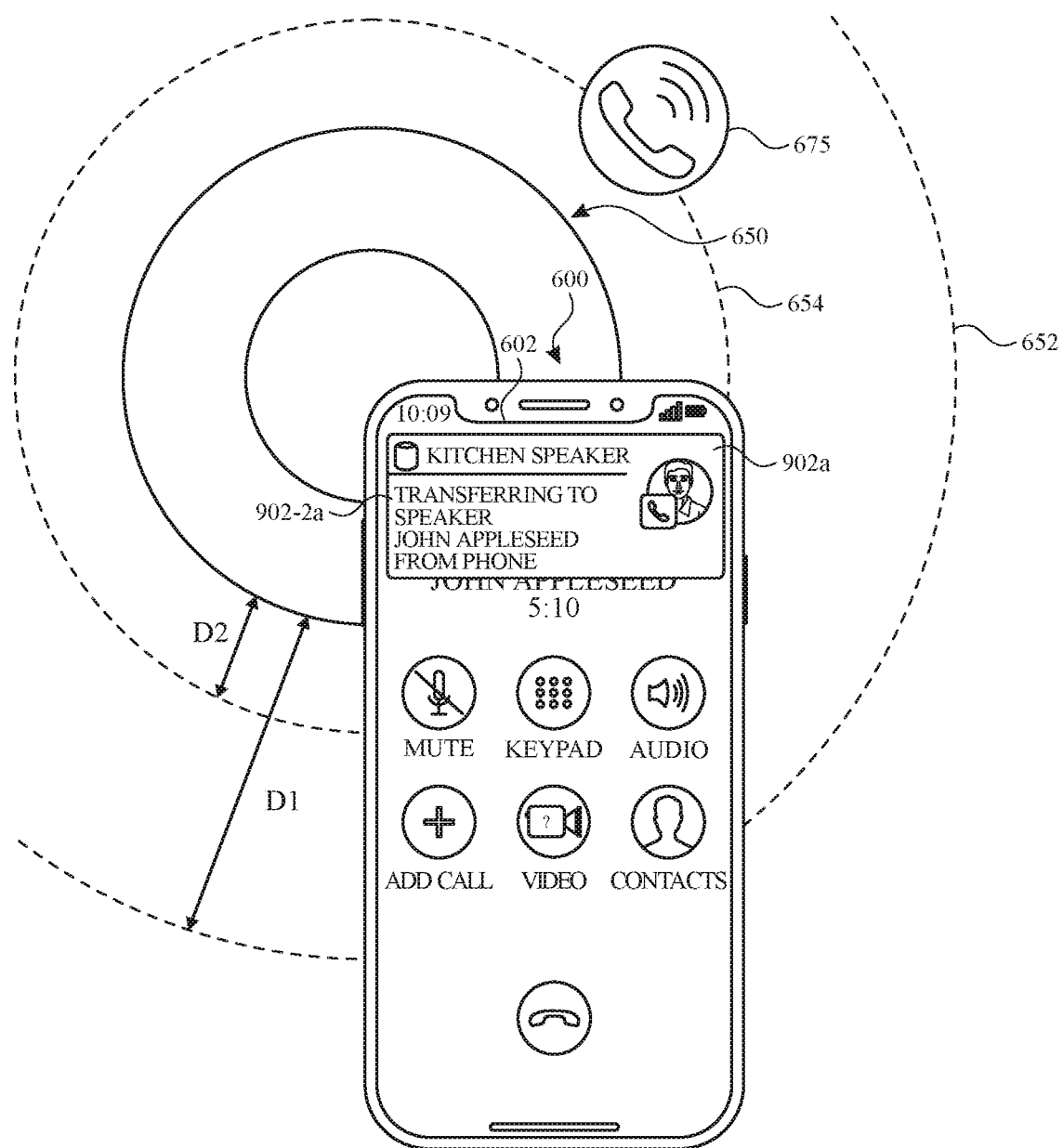

In response to detecting the indication that the physical proximity satisfies the playback proximity condition, device 600 initiates playback of the phone call on device 650. As shown in FIG. 9C, in response to detecting the indication that the physical proximity satisfies the playback proximity condition, device 600 displays updated media information affordance 902a (analogous to updated media information affordance 616a and 622a), with updated action indicator 902-2a to indicate that the phone call currently in process on device 600 is being transferred to device 600. In some embodiments, initiating playback of a phone call includes outputting audio of the phone call on device 650. In some embodiments, in response to detecting the indication that the physical proximity satisfies the playback proximity condition, device 650 begins receiving audio input for the phone call (e.g., audio received by device 650 is transmitted to the other participant). In some embodiments, device 600 remains the source of the phone call.

Figure 9D:
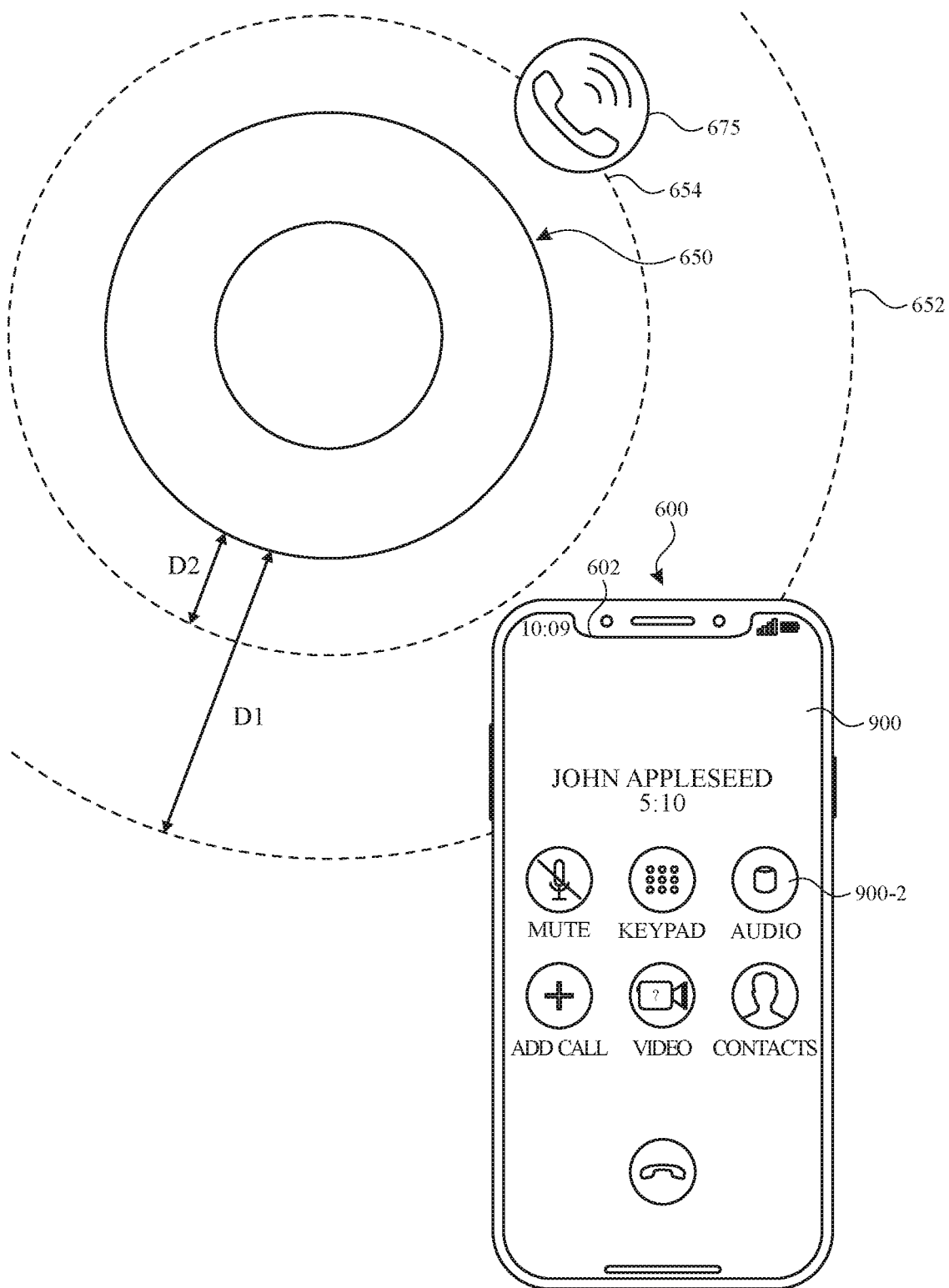

As shown in FIG. 9D, after displaying updated media information affordance 902a (e.g., in response to an indication that playback has successfully begun on device 650 or a predetermined amount of time after detecting the indication that the physical proximity satisfies the playback proximity condition or displaying media information affordance 902a), device 600 ceases displaying media information affordance 902a and updates user interface 900 to indicate that audio is being played back on device 650 (as indicated by updated audio status indicator 900-1a).

FIG. 10 is a flow diagram illustrating a method for controlling audio playback using an electronic device in accordance with some embodiments. Method 1000 is performed at a device (e.g., 100, 300, 500, or 600) with a display device (e.g., 602). Some operations in method 1000 are, optionally, combined, the orders of some operations are, optionally, changed, and some operations are, optionally, omitted.

As described below, method 1000 provides an intuitive way for controlling audio playback. The method reduces the cognitive burden on a user for controlling audio playback, thereby creating a more efficient human-machine interface. For battery-operated computing devices, enabling a user to control audio playback faster and more efficiently conserves power and increases the time between battery charges.

In some embodiments, the electronic device (e.g., 600) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

The electronic device detects (1002), while connected to an external device (e.g., 650), an indication that a physical proximity between the electronic device and the external device satisfies a first proximity condition (e.g., represented by 652). In some embodiments, the indication is provided in response to a determination that the physical proximity between the electronic device and the external device satisfies the first proximity condition. In some embodiments, the first proximity condition is satisfied if the distance between the electronic device and the external device is less than a first threshold distance (e.g., 6 inches, 12 inches, 18 inches, 24 inches).

In response to detecting the indication that the physical proximity satisfies the first proximity condition, the electronic device displays (1004), via the display device, a first media information affordance (e.g., 902) representing a first media item (e.g., a music track, an audio book (or portion thereof, such as a chapter), a podcast, a video, a phone call; a media item to be played on the electronic device (e.g., a media item that is currently playing on the electronic device, a most recent media item that was playing on the electronic device and has ended or has been stopped or paused, a media item that is scheduled to be played next on the electronic device, such as a first track in a playlist, when a user launches a media application or selects a playlist); a media item that is to be played on the external device). Displaying a first media information affordance representing a first media item in response to detecting the indication that the physical proximity satisfies the first proximity condition automatically provides feedback by indicating for the user that the physical proximity satisfies the proximity condition, thus reducing the number of inputs needed to display the first media information affordance. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the first media information affordance representing the first media item, the electronic device detects (1006) an indication that the physical proximity between the electronic device and the external device satisfies a second proximity condition (e.g., represented by 654). In some embodiments, the indication is provided in response to a determination that the physical proximity between the electronic device and the external device satisfies the second proximity condition. In some embodiments, the second proximity condition is satisfied if the distance between the electronic device and the external device is less than a second threshold distance, where the second threshold distance is less than the first threshold distance (e.g., 0 inches, 0.5 inches, 1 inch, 1.5 inches, 2 inches, less than 6 inches). In some embodiments, the second proximity condition corresponds to the electronic device being closer to the external device than what is required to satisfy the first proximity condition (e.g., the proximity that is required to trigger display of the first media information affordance).

In response to detecting the indication that the physical proximity satisfies the second proximity condition, the electronic device initiates (1008) playback of the first media item (e.g., FIG. 9C). In some embodiments, initiating playback of the first media item is performed without detecting selection of the first media information affordance. In some embodiments, initiating playback of the first media item causes the first media item to be played on the electronic device. In some embodiments, initiating playback of the first media item causes the first media item to be played on the external device. In some embodiments, initiating playback of the first media item includes transmitting an instruction to the external device to initiate playback of the first media item on the external device. Initiating playback of the first media item in response to detecting the indication that the physical proximity satisfies the second proximity condition automatically provides feedback by indicating for the user that the physical proximity satisfies the proximity condition, thus reducing the number of inputs needed to display the first media information affordance. Providing improved feedback, reducing the number of inputs needed to perform an operation, and performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first proximity condition is satisfied if the physical proximity between the electronic device and the external device is less than a first threshold distance (e.g., 652, D1). In some embodiments, the second proximity condition is satisfied if the physical proximity between the electronic device and the external device is less than a second threshold distance (e.g., 654, D2) that is less than the first threshold distance.

In some embodiments, the first media information affordance includes an indication (e.g., 902-1, 902-2) that identifies a device upon which playback of the first media item can be initiated. In some embodiments, the second media information affordance includes an indication that identifies the device upon which playback of the first media item is being initiated (e.g., a destination device). In some embodiments, the first media information affordance includes an indication of the device upon which playback of the first media item can be initiated and that selection of the first media information affordance will initiate playback of the first media item on the indicated device.

In some embodiments, as part of initiating playback of the first media item the electronic device alters (e.g., 902-2a) the visual appearance of the first media information affordance to indicate that playback of the first media item has been initiated. In some embodiments, altering the visual appearance of the first media information affordance includes displaying text indicating that playback of the first media item has been initiated, while, optionally, maintaining display of at least some information about the first media item. In some embodiments, altering the visual appearance of the first media information affordance includes replacing the indication that selection of the first media information affordance will initiate playback of the first media item with the indication (e.g., text) that playback of the first media item has been initiated.

In some embodiments, the first media information affordance indicates (e.g., 606-5, 622-4, 902-4) a type of media item corresponding to the first media item. Exemplary types of media items include, but are not limited to, a music track, an audio book, a podcast, a video, and a phone call. In some embodiments, the first media information affordance for a phone call media item includes an avatar of the participant of the call.

In some embodiments, as part of initiating playback of the first media item, in accordance with a determination that the first media item satisfies a data transmission condition (e.g., the first media item is provided by an application, service, or account not available to the device upon which playback of the first media item is being initiated), the electronic device transmits data for the first media item between the electronic device and the external device. In some embodiments, a queue of media items including the first media item exists on the device that is initially the source of the first media item prior to initiating playback. In some such embodiments, initiating playback includes transferring the queue to the device upon which playback of the first media item is being initiated. In some embodiments, as part of initiating playback of the first media item, in accordance with a determination that the first media item does not satisfy the data transmission condition (e.g., the first media item is provided by a particular application, service, or account to which the electronic device and the external device both have access), the electronic device forgoes transmitting data for the first media item between the electronic device and the external device. Transmitting data for the first media item between the electronic device and the external device (or not) based on whether the first media item satisfies a data transmission condition avoids a user having to provide additional inputs to transmit the data. Performing an operation when a set of conditions has been met without requiring further user input enhances the operability of the device and makes the user-device interface more efficient (e.g., by helping the user to provide proper inputs and reducing user mistakes when operating|interacting with the device) which, additionally, reduces power usage and improves battery life of the device by enabling the user to use the device more quickly and efficiently.

In some embodiments, a queue of media items including the first media item exists (e.g., on the electronic device or the external device) prior to initiating playback. In some such embodiments, initiating playback includes transferring the queue between the electronic device and the external device. In some embodiments, the first media item is accessible to both the electronic device and the external device via a common user account. In some embodiments, the device upon which playback is initiated obtains the first media item from the common user account (e.g., playback of the first item does not include streaming the first media item between the electronic device and the external device), In some embodiments, the device upon which playback is initiated obtains the queue from the common user account.

In some embodiments, after initiating playback of the first media item, in response to a determination that a time condition is met (e.g., a threshold amount of time has passed since detecting the indication that the physical proximity satisfies the second proximity condition), the electronic device ceases displaying the first media information affordance representing the first media item (see, e.g., FIGS. 9C-9D).

In some embodiments, after displaying the first media information affordance representing the first media item and before detecting the indication that the physical proximity satisfies the second proximity condition, the electronic device detects an indication that the physical proximity between the electronic device and the external device satisfies a physical separation condition (e.g., represented by 656). In some embodiments, the indication is provided in response to a determination that the physical proximity between the electronic device and the external device satisfies the physical separation condition. In some embodiments, the physical separation condition is satisfied if the distance between the electronic device and the external device exceeds a predefined threshold distance. In some embodiments, the threshold distance associated with the physical separation condition is greater than a threshold distance (e.g., the first threshold distance) associated with the first proximity condition. For example, the physical separation condition is satisfied if the distance between the electronic device and the external device exceeds a third threshold distance (e.g., 20 feet), and the first proximity condition is satisfied if the distance between the electronic device and the external device is less than the first threshold distance (e.g., 1-2 feet), where the third threshold distance is greater than the first threshold distance. In some embodiments, after displaying the first media information affordance representing the first media item and before detecting the indication that the physical proximity satisfies the second proximity condition, in response to detecting the indication that the physical proximity satisfies the physical separation condition, the electronic device ceases displaying the first media information affordance representing the first media item (see, e.g., 11C-11D). Ceasing displaying the first media information affordance representing the first media item in response to detecting the indication that the physical proximity satisfies the physical separation condition provides feedback to the user indicating that playback can no longer be initiated via selection of the first media information affordance. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, before detecting the indication that the physical proximity satisfies the second proximity condition, the electronic device detects an input (e.g., 610*a*, 610*d*, 610*e*, 610*f*) representing selection of the first media information affordance. In some embodiments, before detecting the indication that the physical proximity satisfies the second proximity condition, in response to receiving the first input, in accordance with a determination that the first input is a first type of input (e.g., a tap gesture on a touch-sensitive display of the electronic device at a location corresponding to the first media information affordance), the electronic device initiates playback of the first media item. In some embodiments, before detecting the indication that the physical proximity satisfies the second proximity condition, in response to receiving the first input, in accordance with a determination that the first input is a second type of input (e.g., a directional swipe gesture on the first media information affordance) different from the first type of input, the electronic device displays, via the display device, a second media information affordance (e.g., 608) representing the first media item, the second media information affordance different from the first media information affordance. Initiating playback of the first media item or displaying a second media information affordance representing the first media item depending on the type of input selecting the first media affordance provides additional control options related to the first media affordance without cluttering the user interface with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the second media information affordance representing the first media item, the electronic device receives a second input (e.g., 610c) representing selection of the second media information affordance. In some embodiments, in response to receiving the second input representing selection of the second media information affordance, the electronic device initiates playback of a second media item. In some embodiments, the second media item is the first media item. In some embodiments, the second media information affordance represents a queue of media items including a representation of the first media item and a representation of at least one other media item. In some such embodiments, the electronic device scrolls the queue in response to input (e.g., a horizontal swipe or drag gesture). In some embodiments, in response to an input corresponding to selection of a media item in the queue, the electronic device initiates playback of the selected media item. Displaying the second media information affordance (e.g., with additional information about the first media item) and initiating playback of a second media item in response to selection of the second media information affordance provides improved feedback by giving the user additional information and/or control over playback. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of initiating playback of the first media item, in accordance with a determination that the first media item is playing on the electronic device while detecting the indication that the physical proximity between the electronic device and the external device satisfies the second proximity condition (e.g., FIG. 6G), the electronic device ceases playing of the first media item on the electronic device and initiates playback of the first media item on the external device FIG. 6f). In some embodiments, as part of initiating playback of the first media item, in accordance with a determination that the first media item is playing on the external device while detecting the indication that the physical proximity between the electronic device and the external device satisfies the second proximity condition, the electronic device ceases playing of the first media item on the external device and initiating playback of the first media item on the electronic device In some embodiments, the first media item is playing on the electronic device while detecting the indication that the physical proximity between the electronic device and the external device satisfies the first proximity condition (see, e.g., FIGS. 6G and 6K). In some embodiments, as part of initiating playback of the first media item includes initiating playback of the first media item on the external device. In some embodiments, the first media information affordance represents the first media item in accordance with a determination that the electronic device is playing the first media item at the time of detecting the indication that the first physical proximity between the electronic device and the external device satisfies the proximity condition. In some embodiments, transmitting the instruction to the external device to initiate playback of the first media item on the external device is performed in accordance with a determination that the first media item is currently playing on the electronic device. In some embodiments, initiating playback of the first media item includes ceasing playing the first media item on the electronic device.

In some embodiments, as part of initiating playback of the first media item on the external device, the electronic device ceases playing a third media item on the external device (e.g., FIG. 6L).

In some embodiments, in accordance with a determination that neither the electronic device nor the external device is playing a media item while detecting the indication that the physical proximity between the electronic device and the external device satisfies the first proximity condition (e.g., 6B), the first media item is a media item played on the electronic device most recently before detecting the indication that the physical proximity between the electronic device and the external device satisfies the first proximity condition. In some embodiments, as part of initiating playback of the first media item, the electronic device initiates playback of the first media item on the external device. In some embodiments, the first media information affordance represents the media item most recently played on the electronic device in accordance with a determination that the external device is not playing a media item at the time of detecting the indication that the physical proximity between the electronic device and the external device satisfies the proximity condition.

In some embodiments, in accordance with a determination that, while detecting the indication that the physical proximity between the electronic device and the external device satisfies the first proximity condition, the electronic device is not playing a media item and the external device is playing a media item (e.g., FIG. 6N), the first media item is the media item playing on the external device. In some embodiments, as part of initiating playback of the first media item, the electronic device initiates playback of the first media item on the electronic device.

Note that details of the processes described above with respect to method 1000 (e.g., FIG. 10) are also applicable in an analogous manner to the methods described above. For example, method 700 and/or method 800 optionally includes one or more of the characteristics of the various methods described above with reference to method 1000. For example, operations 1006 and 1008 of method 1000 can be applied to method 700 and/or method 800 to initiate playback of the first media item described in method 700 and/or method 800. For brevity, these details are not repeated below.

Figure 11A:
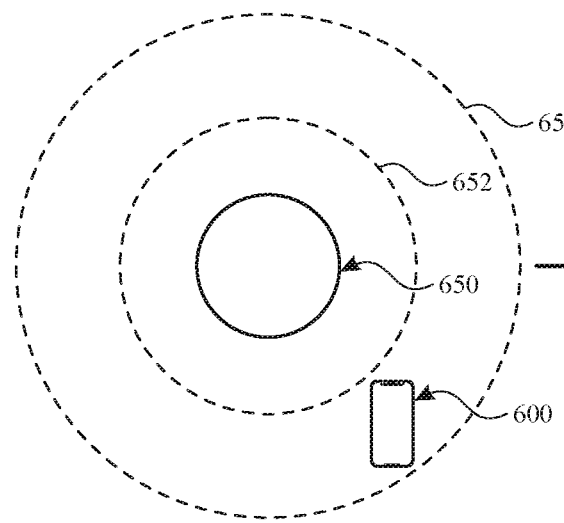
FIGS. 11A-11D illustrates exemplary user interfaces in accordance with some embodiments.

FIGS. 11A-11D illustrates techniques for ceasing display of graphical elements, such as, e.g., media information affordances 606, 608, 616, 620, 622, and 902. FIG. 11A illustrates device 600, device 650, and proximity condition range indicator 652, as described above. In addition, FIG. 11A includes element removal condition range indicator 656. Element removal condition range indicator 656 is included as a visual aid, and is intended to represent a range that would satisfy an element removal condition. Presence of a detectable device (e.g., 600) outside (e.g., partially or completely) element removal condition range indicator 656 would satisfy an element removal condition, but would not if the detectable device is located inside of element removal condition range indicator 656. The graphical representation of element removal condition range indicator 656 is not intended to limit the scope of determining whether an element removal condition is satisfied. Furthermore, the figures are not necessarily to scale and are included merely as a visual aid. Thus, unless otherwise noted, the size and scale of features depicted in the figures are not intended as a limitation on a distance required to satisfy element removal condition. However, element removal condition range indicator 656 is outside of proximity condition range indicator 652, such that device 600 must be farther away from device 650 to satisfy the element removal condition associated with element removal condition range indicator 656 than to satisfy the proximity condition associated with proximity condition range indicator 652.

Figure 11B:
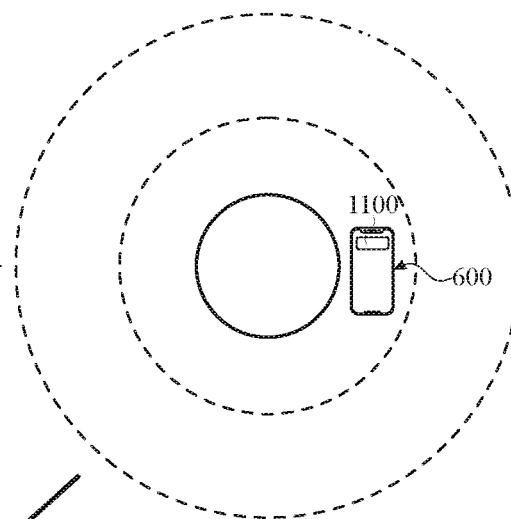

FIG. 11A illustrates a scenario in which device 600 is not inside of proximity condition range indicator 652 (e.g., FIG. 6A, 6F, 6J, 6M, or 9A). FIG. 11B illustrates that device 600 is moved at least partially inside of proximity condition range indicator 652 (e.g., FIG. 6B, 6G, 6K, 6N, or 9B). Since proximity condition range indicator 652 represents a physical proximity that satisfies the proximity condition, device 600 detects an indication that a physical proximity between the device 600 and device 650 satisfies the proximity condition (e.g., and, in response, initiates communication with device 650, for example, to send an indication that the condition is satisfied). In some examples, device 650 detects an indication that the proximity condition is satisfied (e.g., and, in response, initiates communication with device 600, for example, to send an indication that the condition is satisfied). In response to detecting the indication that the physical proximity satisfies the proximity condition, device 600 displays media information affordance 1100 (e.g., media information affordance 606, 608, 616, 620, 622, or 902), which represents a media item. In some embodiments, the media item represented by media information affordance is based on the audio output status of device 600 and/or device 650, as described above.

Figure 11C:
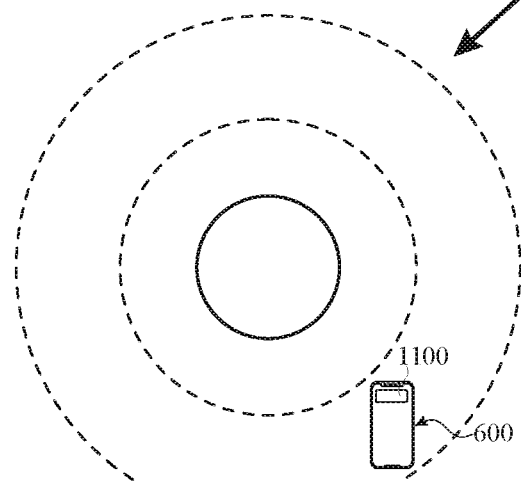

FIG. 11C illustrates that, while media information affordance 1100 is displaye device 600 is moved outside of proximity condition range indicator 652, but remains within element removal condition range indicator 656. As shown in FIG. 11C, device 600 continues display of media information affordance 1100.

Figure 11D:
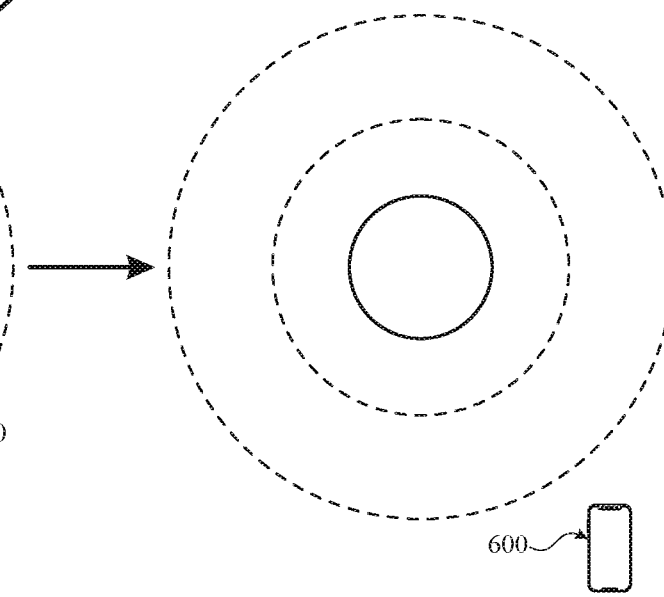

FIG. 11D illustrates that, while media information affordance 1100 is displayed, device 600 is moved outside of element removal condition range indicator 656. Since element removal condition range indicator 656 represents a physical range that satisfies the element removal condition, device 600 detects an indication that a physical range between device 600 and device 650 satisfies the element removal condition (e.g., and, in response, initiates communication with device 650, for example, to send an indication that the element removal condition is satisfied). In some examples, device 650 detects an indication that the element removal condition is satisfied (e.g., and, in response, initiates communication with device 600, for example, to send an indication that the element removal condition is satisfied). In response to detecting the indication that the physical range between device 600 and device 650 satisfies the element removal condition, device 600 ceases display of media information affordance 1100 (e.g., removes media information affordance 1100 from display 602).

FIG. 12 includes diagram 1200 and illustrates a physical structure and an exemplary set of devices located in and around the physical structure in accordance with some embodiments. FIG. 12 is used to illustrate the processes described below, including the processes shown in FIGS. 14, 16, 18, 20, and 23.

Diagram 1200 includes home 1202 and a set of accessory devices (e.g., device 1246, device 1204, etc.). The interior of home 1202 includes multiple rooms, such as kitchen 1202*a*, dining room 1202*b*, bedroom 1202*c*, living room 1202*d*, and sunroom 1202*e*. Kitchen 1202*a* is in the upper left portion of home 1202, and dining room 1202*b* is between kitchen 1202*a* and bedroom 1202*c*, where bedroom 1202*c* is to the right of dining room 1202*b*. Kitchen 1202*a* and dining room 1202*b* do not have a wall between them, while dining room 1202*b* and bedroom 1202*c* have a wall between them. Living room 1202*d* is in the bottom left portion of home 1202 and sunroom 1202*e* is in the bottom right portion of home 1202. Located at the exterior of home 1202 is porch 1202*f* In some embodiments, home 1202 includes rooms other than those depicted in FIG. 12 and/or excludes rooms that are depicted in FIG. 12. While diagram 1200 depicts a home, it should be recognized that this is merely an example and techniques described herein can work with other types of physical structures, such as an office building, a hotel, an apartment, etc. As illustrated in FIG. 12, each portion (e.g., room, porch) of home 1202 has at least one device. However, in some embodiments, a portion of home 1202 has no devices.

As illustrated in FIG. 12, kitchen speaker 1206 is positioned on a counter between a stove and a wall in kitchen 1202*a*. Dining room light 1212 and dining room speaker 1216 are located in dining room 1202*b*. Dining room light 1212 is positioned on a dining room table, and dining room speaker 1216 is positioned to the right of the dining room table. In addition, there is also thermostat 1218 on a wall in dining room 1202*b*. In bedroom 1202*c*, bedroom light 1232 is adjacent to a side of a bed, and bedroom speaker 1236 is positioned on the opposite side of the bed. In living room 1202*d*, living room speaker 1246 and living room speaker 1248 are on opposite sides of television 1244, and living room lamp 1242 is positioned in front of television 1244. In sunroom 1202*e*, sunroom speaker 1256 and sunroom speaker 1258 are positioned on opposite sides of the room. Located on porch 1202*f* are devices, such as porch light 1262, camera doorbell 1264, and doorbell 1266.

In this example, the speakers (e.g., kitchen speaker 1206, dining room speaker 1216, bedroom speaker 1236, living room speaker 1246, living room speaker 1248, sunroom speaker 1256, and sunroom speaker 1258), lights (e.g., dining room light 1212, bedroom light 1232, living room lamp 1242, porch light 1262), thermostat 1218, television 1244, doorbell camera 1264, and doorbell 1266 shown in FIG. 12 are assigned to (e.g., programmatically mapped (e.g., by a user account associated with home 1202) to a group of devices that corresponds to) home 1202. In addition, each individual speaker, light, television, thermostat, camera, and doorbell is also assigned to (e.g., mapped to a group that corresponds to) a portion of the home (e.g., a room, the portion) in which it is positioned. For example, kitchen speaker 1206 is assigned to (e.g., programmatically mapped to a group that corresponds to) kitchen 1202*a*; dining room light 1212, dining room speaker 1216, thermostat 1218 are assigned to dining room 1202*b*; bedroom light 1232 and bedroom speaker 1236 are assigned to bedroom 1202*c*; living room lamp 1242, television 1244, living room speaker 1246 and living room speaker 1248 are assigned to living room 1202*d*; sunroom speaker 1256 and sunroom speaker 1258 assigned to sunroom 1202*e*; and porch light 1262, camera doorbell 1264, and doorbell 1266 are assigned to porch 1202*f*. In some embodiments, each group that corresponds to a portion of home 1202 is also assigned to entire home 1202. Thus, in this example, the devices that are mapped to a room of home 1202 or the porch of home 1202 are also concurrently mapped to entire home 1202.

In some embodiments, the speakers, lights, cameras, doorbells, and televisions shown in FIG. 12 are smart devices that are directly connected to each other or indirectly connected to each other via one or more networks (e.g., wireless networks (e.g., Bluetooth, NFC, Wi-Fi, 4G, etc.)). In some embodiments, the speakers include one or more components of device 650, as described above. In some embodiments, other smart devices, such as smart appliances, smart thermostats, smart plug outlets, etc. are connected to the one or more networks. In some embodiments, one or more personal devices can be assigned to home 1202. In some embodiments, the personal devices that are assigned to home 1202 include electronic device 600. In some embodiments, the personal devices include one or more tablets, smartwatches, laptops, desktops, etc.

FIGS. 13A-13M illustrate exemplary user interfaces for managing controls in accordance with some embodiments. The user interfaces in these figures are used to illustrate the processes described below, including the processes shown in FIG. 14.

FIGS. 13A-13I illustrate exemplary scenarios for managing the display of multiple controls based on the user context of device 600. Most of FIGS. 13A-13I include a schematic diagram of a home (e.g., home 1202) and representations of devices relative to physical properties of the home (e.g., a location of a device relative to a wall or room of the home) For example, home 1202 in FIG. 13A includes an indication (e.g., symbol of person) at a location 1302*a* representing a location of device 600. The schematic diagram is provided for exemplary purposes only as a visual aid for the description. Thus, the schematic diagram is not intended to limit the scope of determining whether device 600 is at a particular location. Furthermore, the figures are not necessarily to scale and are included merely as a visual aid. Thus, unless otherwise noted, the size and scale of features depicted in the figures are not intended as a limitation on the location required for device 600 to be in a certain use context.

FIG. 13A illustrates device 600 displaying user interface 1320. User interface 1320 includes dynamic control portion 1324, which is visually located between static control portion 1322 (which is located near the top of user interface 1320) and static control portion 1326 (which is located near the bottom of user interface 1320). Each of the control portions (e.g., 1324, 1322, and 1326) are depicted in FIG. 13A as including multiple controls. However, as described herein, the controls presented in the static control portions (e.g., 1322 and 1326) of user interface 1320 do not change when the use context of device 600 changes (e.g., as described herein). Thus, the controls presented in the static control portions persist, even as the device's use context changes. However, the control presented in the dynamic control portion (e.g., 1324) of user interface 1320 can change (e.g., without device 600 detecting user input directed to one or more of the controls) when the use context of device 600 changes (e.g., as described herein). Thus, the controls presented in dynamic control portion 1324 are dynamic, based on changing use contexts.

As illustrated in FIG. 13A, the static control portions (e.g., 1322 and 1326) include multiple controls for performing operations local to device 600 ("local operation controls"). For example, as shown in FIG. 13A, static control portion 1322 includes multiple local operation controls, such as wireless connection control 1322*a*, cellular connection control 1322*b*, music application control 1322*c*, and orientation lock control 1332*d*. Similarly, static control portion 1326 includes flashlight control 1332*e* and calculator control 1332*f*. Each device control on user interface 1320, when selected, modifies a state of device 600 (e.g., without modifying the state of an accessory device, such as the accessory devices of home 1202).

A device control can modify a state of device 600 in different ways. In some embodiments, the state of the device 600 is modified when one or more of settings of device 600 changes, such as a connectivity setting (e.g., wireless, cellular, Bluetooth setting) or a display setting (e.g., changing or not chaining the display when the orientation of device 600 changes) being turned on/off. For example, in some embodiments, device 600 detects a selection of wireless connection control 1322*a* and, in response to detecting the selection, modifies a wireless connectivity state of device 600 (e.g., turns on/off device 600's ability to connect to a wireless network). In some embodiments, the state of device 600 is modified when device 600's output of media changes. For example, in some embodiments, device 600 detects a selection of music application control 1332*c* and, in response to detecting the selection, modifies (e.g., rewinds, fast-forwards, plays) a state of device 600's output of media. In some embodiments, the state of the device 600 is modified when device 600's display state changes (e.g., displaying a different user interface in response to receiving a selection of one of the local operation controls, displaying a different set of controls in response to receiving a selection of one of the local operation controls). For example, in some embodiments, device 600 detects selection of calculator control 1332*f* and, in response to detecting the selection, modifies the state of the device 600 by replacing user interface 1320 with a user interface for a calculator application. In some embodiments, the state of the device 600 is modified when one or more hardware component of device 600 is turned on/off. For example, in some embodiments, device 600 detects selection of flashlight control 1332*e* and, in response to detecting the selection, modifies the state of a light that is a part of device 600.

As illustrated in FIG. 13A, dynamic control portion 1324 includes dynamic accessory device controls that are displayed based on the use context in which device 600 is operating, such as arrive home scene control 1334*a*, and porch light control 1334*b*. Dynamic accessory device controls are controls for controlling accessory devices that are external to device 600. In FIG. 13A, arrive home scene control 1334*a* and porch light control 1334*b* are controls for controlling accessory devices in home 1202 (e.g., as described above in relation to FIG. 12). In FIG. 13A, arrive home scene control 1334*a* is a macro that controls a plurality of devices. Thus, in some embodiments, device 600 detects a tap gesture on arrive home scene control 1334*a* and, in response to detecting the tap gesture on arrive home scene control 1334*a*, transmits an instruction that causes thermostat 1218 to turn on and be set to a desired temperature, living room lamp 1242 to turn on, and living room speaker 1248 to play Jazz music. In comparison, porch light control 1334*b* only controls one device (e.g., porch light 1262) and performs one function (e.g., toggles porch light 1262 on/off). Thus, in some embodiments, device 600 detects a tap gesture on porch light control 1334*b* and, in response to detecting the tap gesture, transmits an instruction that causes porch light 1262 to turn on or off.

As described above in FIG. 13A, arrive home scene control 1334*a* and porch light control 1334*b* are displayed in dynamic control portion 1324 because device 600 is operating in a use context that corresponds to device 600 being at a location (e.g., as shown by 1302*a*) that is outside of home 1202. Thus, in some embodiments, when device 600 displays arrive home scene control 1334*a* and porch light control 1334*b* in dynamic control portion 1324 a determination has been made that these particular controls are more useful to a user operating device 600 when device 600 is located outside of home 1202 (or operating in the respective use context in FIG. 13A).

As illustrated in FIG. 13A, home control 1333 is also displayed in dynamic portion 1324. In FIG. 13A, home control 1333 is a control that corresponds to home 1202, such that when home control 1333 is selected, device 600 displays one or more accessory device controls that are not currently displayed. In addition, a selection of home control 1333 is an access point that allows device 600 to be navigated to a user interface (e.g., one or more user interface screens) with the full set of accessory device controls that are available for controlling the accessory devices assigned to home 1202.

In FIG. 13A, device 600 is associated with multiple homes (e.g., is authorized to manage accessory devices that are assigned to different homes). Home control 1333 includes an identifier that corresponds to home 1202 (e.g., "123 MAIN ST," the address of home 1202) because device 600 is currently configured to display accessory devices that are assigned to home 1202 and not another home in which device 600 is associated. In some embodiments, device 600 is associated with a home when device 600 is registered as one or more of a user, a manager, a guest, etc. of the home (e.g., in one or more databases).

In some embodiments, when device 600 is configured to display accessory device controls assigned to another home, device 600 displays a different identifier on home control 1333 than the one that is displayed in FIG. 13A. In some embodiments, when device 600 is configured to display accessory devices assigned to another home, device 600 displays different dynamic device controls (e.g., device controls that are relevant to the particular home). In some embodiments, when device 600 is configured to display accessory device controls assigned to a respective home when a determination is made that the respective home is the closest home to which device 600 is associated. In some of these embodiments, the determination (e.g., closest home determination) is made only when a "current home" setting is set to active. In some embodiments, when the "current home" setting is set to inactive, device 600 is configured to display accessory device controls assigned to the last home for which device 600 displayed a set of accessory device controls. In some embodiments, device 600 is configured to display accessory device controls assigned to the last home for which device 600 transmitted instructions that caused at least one accessory device of the respective home to perform an operation. In some embodiments, when device 600 is associated with only one home, device 600 displays "Home" as the identifier on home control 1333. In some embodiments, when device 600 is configured to display accessory device controls that are assigned to a home that does not have any controls (or that the controls assigned to the home do not meet certain criteria (e.g., a particular number or a particular type of accessory), device 600 resizes home control 1333 (e.g., to a size larger than depicted in FIG. 13A), such that home control 1333 practically fills (e.g., takes up two rows) the majority of dynamic portion 1324.

Figure 13B:
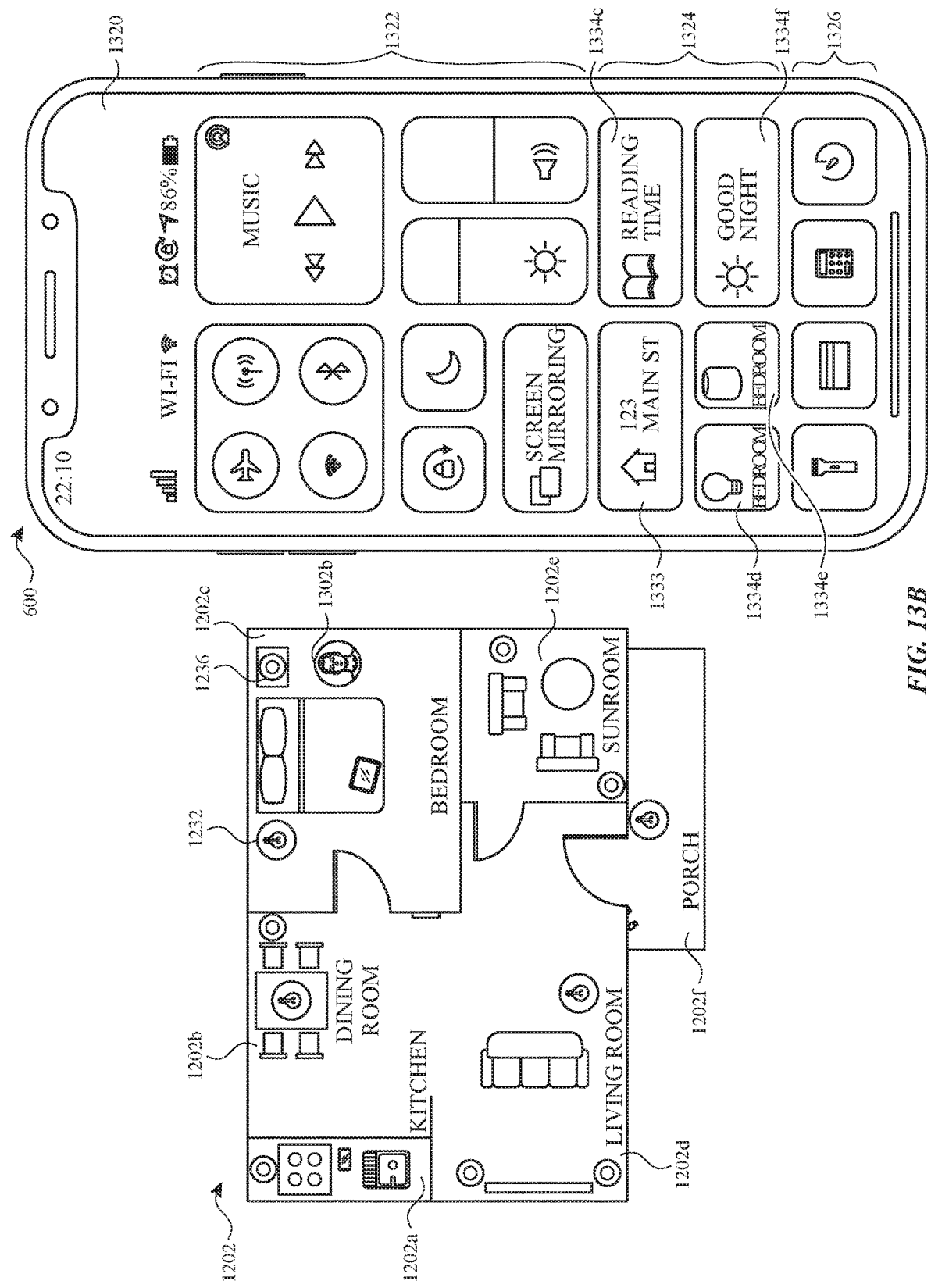

In FIG. 13B, the schematic diagram shows that device 600 has moved from location 1302*a* (e.g., in FIG. 13A) to location 1302*b*. As shown by the schematic diagram, device 600 is inside of house 1202 and, in particular, is in bedroom 1202*c* while device 600 is at location 1302*b*.

At FIG. 13B, a determination is made that device 600 is operating in a different use context than the context of FIG. 13A, Here, device 600 is operating in a different use context because device 600 has moved from being at a location (e.g., 1302*a*) that is outside of house 1202 to a location that is inside of house 1202 (e.g., 1302*b*). Specifically, at FIG. 13B, a determination is made that device 600 is operating in a use context that corresponds to device 600 being located inside of bedroom 1202*c* (and/or inside of house 1202).

As illustrated in FIG. 13B, because the device is determined to be located inside home 1202 (e.g., the device being located in the bedroom), device 600 updates dynamic control portion 1324 to display a different set of dynamic accessory device controls than the set of dynamic accessory device controls that were displayed in FIG. 13A. As illustrated in FIG. 13B, device 600 displays reading time scene control 1334*c*, bedroom light control 1334*d* (e.g., that, when selected, causes bedroom light 1232 to be turned on/off), bedroom speaker control 1334*e* (e.g., that, when selected, causes bedroom speaker 1236 to pause or initiate media playback), and good night scene control 1334*f*, which are different from the accessory controls that were displayed in dynamic control portion 1324 in FIG. 13A. Moreover, the controls displayed in FIG. 13B are for controlling one or more accessory devices (e.g., bedroom light 1232, bedroom speaker 1236) in bedroom 1202*c*, where none of the controls in FIG. 13A were for controlling any of the accessories in the bedroom. Thus, in FIG. 13B, the controls displayed in dynamic control portion 1324 are potentially more relevant to a user when the user and device 600 is located in bedroom 1202*c* than the controls displayed in dynamic control portion 1324 of FIG. 13A.

As illustrated in FIG. 13B, device 600 continues to display home control 1333 irrespective of the determination that device 600 is operating in a different use context. As shown in FIG. 13B, home control 1333 is the same size and is displayed in the same location in dynamic control portion 1324 as home control 1333 was displayed in FIG. 13A.

When comparing dynamic control portion 1324 in FIGS. 13A and 13B, the size of dynamic control portion 1324 remains the same, taking up the same region of user interface 1320. However, the number of controls displayed in dynamic control portion 1324 in FIG. 13A was three (e.g., home control 1333, arrive home scene control 1334*a*, porch light control 1334*b*) while the number of control displayed in dynamic control portion 1324 in FIG. 13B is five (e.g., home control 1333, reading scene control 1334*c*, bedroom light control 1334*d*, bedroom speaker control 1334*e*, and good night scene control 1334*f*). Thus, as shown by FIGS. 13A-13B, device 600 displays a different number of controls in dynamic control portion 1324 without changing the size of dynamic control portion 1324. When comparing FIG. 13A-13B, device 600 accomplishes this user interface by displaying smaller sized accessory device controls when the number of controls that are displayed in the dynamic control portion 1324 is greater due to device 600 being in a particular use context. For example, porch control 1334*b* in FIG. 13A occupied roughly the same area of dynamic control portion 1324 that reading scene control 1334*c* and good night scene control 1334*f* occupy together in FIG. 13B.

Moreover, arrive home scene control 1334a occupies roughly the same area of dynamic control portion 1324 that bedroom light control 1334d and bedroom speaker control 1334e occupy together in FIG. 13B.

As illustrated in FIG. 13B, home control 1333 remains the same size and at the same position in dynamical control portion 1324 as home control 1333 was in FIG. 13A. Thus, unlike the other controls in dynamic control portion 1324, home control 1333 remains the same size and is displayed at the same position, irrespective of the use context in which is operating in FIGS. 13A-13B and/or the number of other controls (e.g., a number greater than 0) that are displayed in dynamic control portion 1324. In some embodiments, the size and/or position of home 1333 changes when device 600 is operating in a different use context or based on the number of other controls (e.g., a number greater than 0) that are displayed in dynamic control portion 1324. In FIG. 13B user interface 1320 is being displayed at 22:10 (10:10 PM).

Figure 13C:
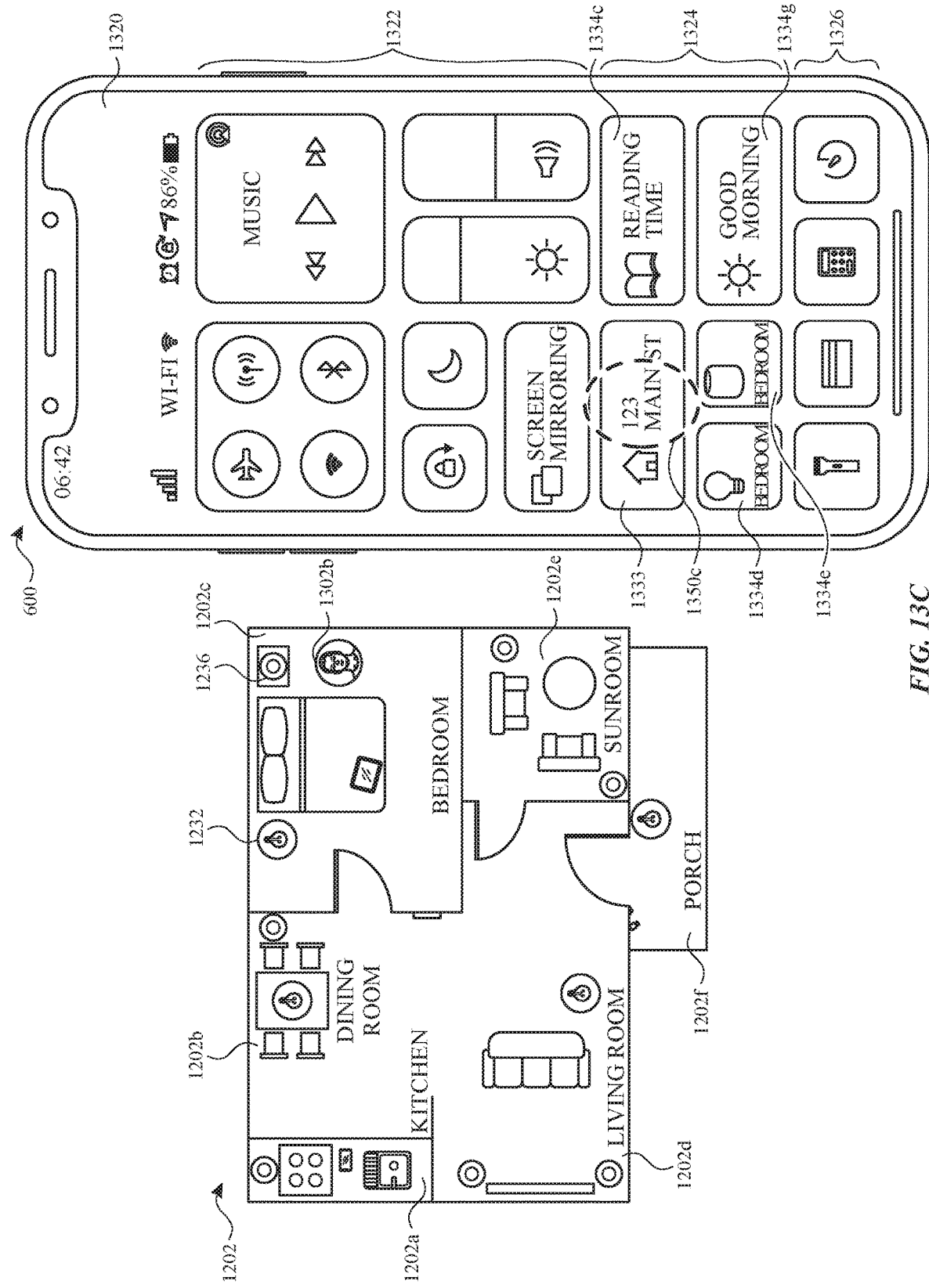

At FIG. 13C, a determination is made that device 600 is operating in a different use context, although device 600 is at the same location in FIG. 13C that device 600 was at in FIG. 13B. Here, device 600 is operating in a different use context because device 600 is displaying user interface 1320 at a different time (e.g., 06:42 (6:42 AM)) than it was displayed in FIG. 13B (22:10).

As illustrated in FIG. 13C, because device 600 is operating in the use context that corresponds to user interface 1320 being displayed at 06:42, device 600 displays a different set of controls. As show in FIG. 13C, device 600 has replaced good night scene control 1334f that was previously displayed in FIG. 13B with good morning scene control 1334g. In other words, at FIG. 13C, device 600 displays the same number of controls that were displayed in the previous use context (e.g., in FIG. 13B); however, the sets of controls are different because device 600 is based on a different use context. In some embodiments, device 600 displays a different number of controls at FIG. 13C than device 600 previously displayed in FIG. 13B. At FIG. 13C, device 600 detects gesture 1350c (e.g., a tap gesture, a long-press gesture) on home control 1333.

Figure 13E:
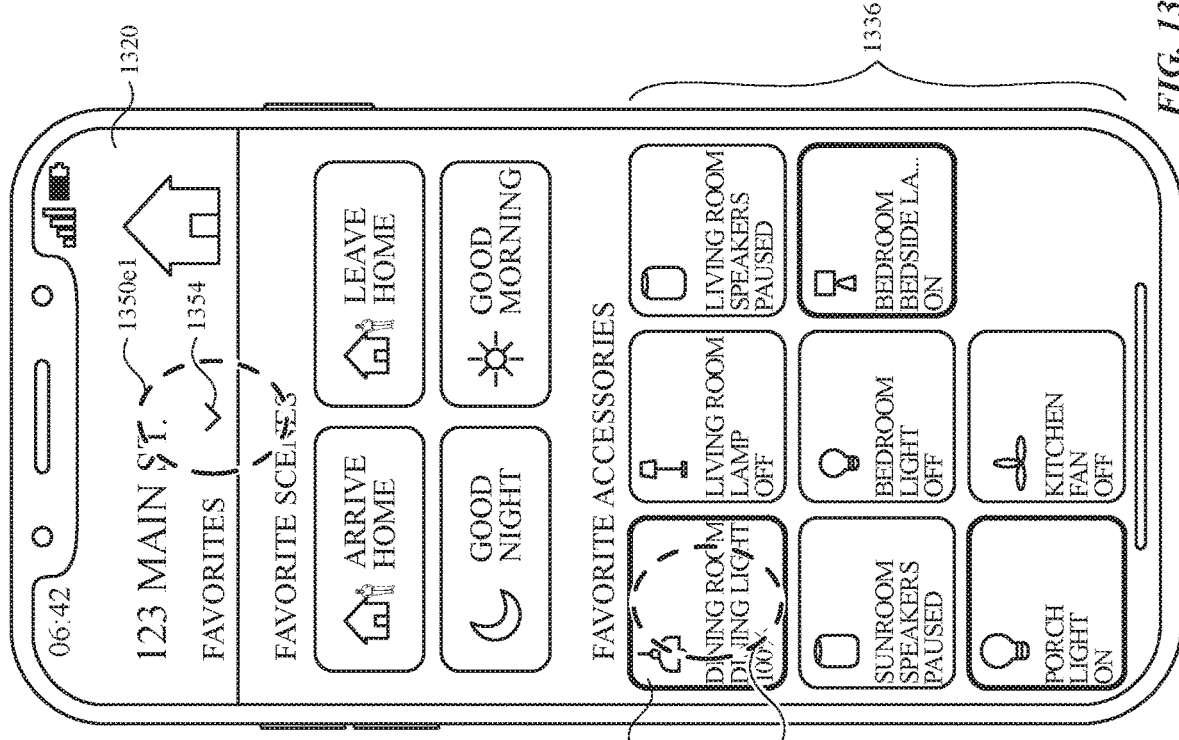
Figure 13D:
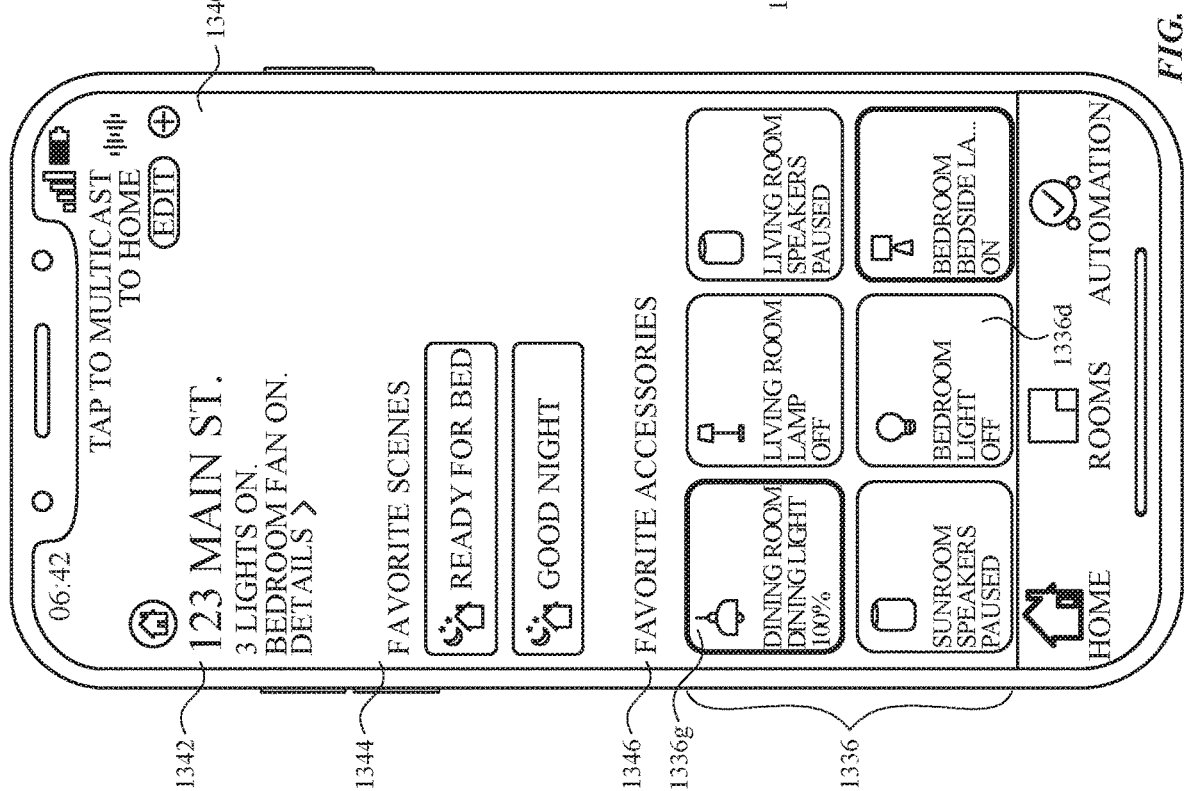

FIGS. 13D-13E illustrate exemplary user interfaces that device 600 can display in response to detecting gesture 1350c of FIG. 13C, As illustrated in FIG. 13D, in response to detecting gesture 1350c, device 600 displays user interface 1340 for a home application and ceases to display user interface 1320. As illustrated in FIG. 13D, user interface 1340 includes accessory device controls 1336. As shown in FIG. 13D, user interface 1340 includes an identifier that is associated with home 602 ("123 Main Street") to indicate that the information displayed on user interface 1340 concerns the scenes (e.g., 1344) and accessories (e.g., 1346) controls that are displayed on user interface 1340. In FIG. 13D, the identifier that is associated with home 602 displayed on user interface 1340 is the same as the identifier that was displayed on home control 1333 in FIGS. 13A-13C, as discussed above. In some embodiments, when "Home" is the identifier displayed on home control 1333 (e.g., because device 600 is associated with only one home), the identifier displayed on user interface 1340 is different (e.g., "123 Different Address") than the identifier displayed on the home control.

In FIG. 13D, in response to detecting gesture 1350c, device 600 has launched the home application and displayed a user interface for the home application. While displaying user interfaces for the home application, device 600 can display (e.g., via navigation of the user interfaces) the available controls for controlling the set of accessory devices that are assigned to home 602. In FIG. 13D, accessory device controls 1336 include one or more accessory device controls that have the same functionality as one or more of the dynamic accessory device controls displayed in FIG. 13C. For example, bedroom light control 1336d has the same functionality as bedroom light control 1334d in FIG. 13C. In FIG. 13D, accessory device controls 1336 include one or more accessory device controls that perform different functions from the function performed by the dynamic accessory device controls displayed in FIG. 13C. For example, dining room light control 1336g causes dining room light 1212 to perform a function and is displayed in FIG. 13D, but there is not a control that causes dining room light 1212 to perform a function in FIG. 13C.

As illustrated in FIG. 13E (e.g., as an alternative to FIG. 13D), in response to detecting gesture 1350c, device 600 updates user interface 1320 (e.g., continues to display user interface 1320) to display one or more of the components of user interface 1340. As shown in FIG. 13E, user interface 1320 includes accessory device controls 1336. In FIG. 13E, the first six accessory device controls are also displayed via user interface 1340 (e.g., in FIG. 13D). Moreover, there is a greater number of accessory device controls 1336 displayed in FIG. 13E than in FIG. 13D. To make room to display accessory device controls 1336 (e.g., additional accessory device controls), device 600 ceases to display home control 1333, and the local operation controls in their respective portions of user interface 1320 (e.g., such as wireless connection control 1322a, flashlight control 1332e). In addition, accessory device controls 1336 are the same size in FIG. 13E, while the dynamic accessory device controls were different sizes in FIG. 13C. In addition, at least one of accessory device control 1336 is displayed in the portion of user interface 1320 in which a local operation control was displayed in FIG. 13C. In some embodiments, device 600 uses one or more similar techniques to display the accessory device controls on user interface 1320 (and/or other components) that device 600 used to display the accessory device controls on user interface 1340 (e.g., as discussed above in relation to FIG. 13D).

In some embodiments, device 600 displays accessory device controls 1336 in FIG. 13E without launching the home application (e.g., as opposed to when device 600 displayed user interface 1340 in FIG. 13D).

In some embodiments, device 600 displays interface 1320 in FIG. 13E or user interface 1340 in FIG. 13D based on the type of gesture that is received. For example, in some embodiments, when a determination is made that gesture 1350c is a first type gesture (e.g., a tap gesture, a long-press gesture), device 600 displays user interface 1340 in FIG. 13D. In some embodiments, when a determination is made that gesture 1350c is a different type of gesture than the first type (e.g., a long-press gesture, a tap gesture), device 600 displays user interface 1320 in FIG. 13E. Thus, in some embodiments, these user interfaces (e.g., 1340 in FIG. 13D, 1320 in FIG. 13E) can be accessed based on the type of input that is received on home control 1333 in FIG. 13C.

Figure 13G:
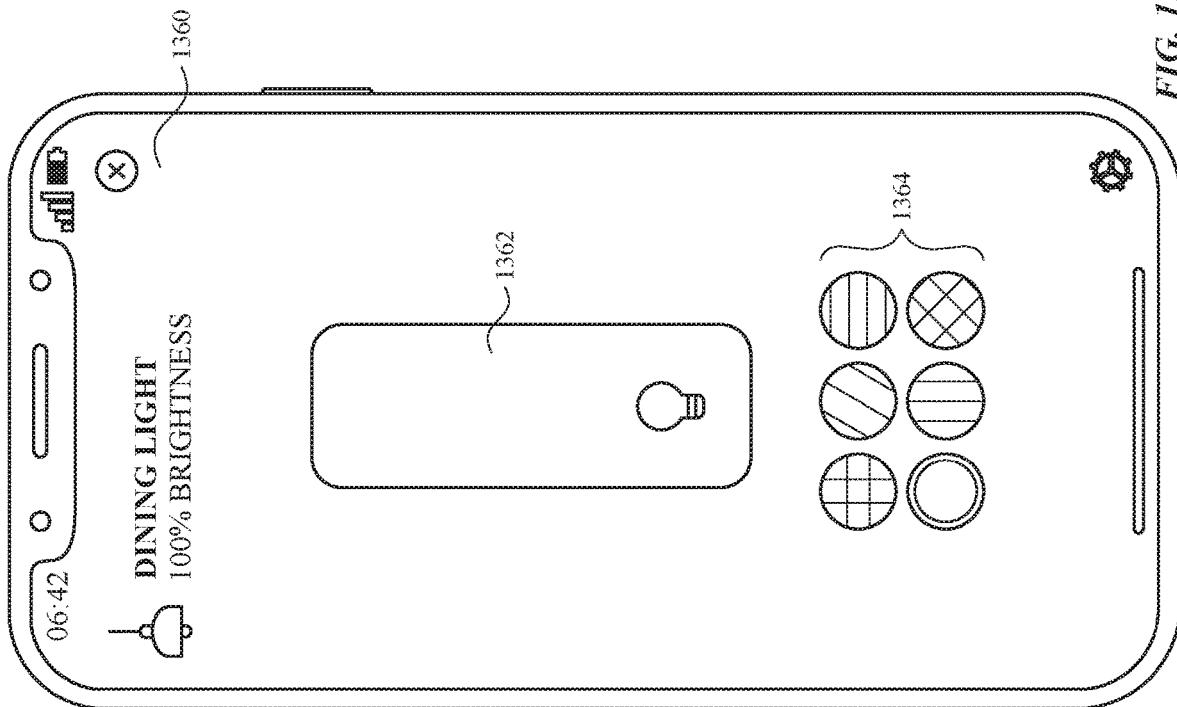
Figure 13F:
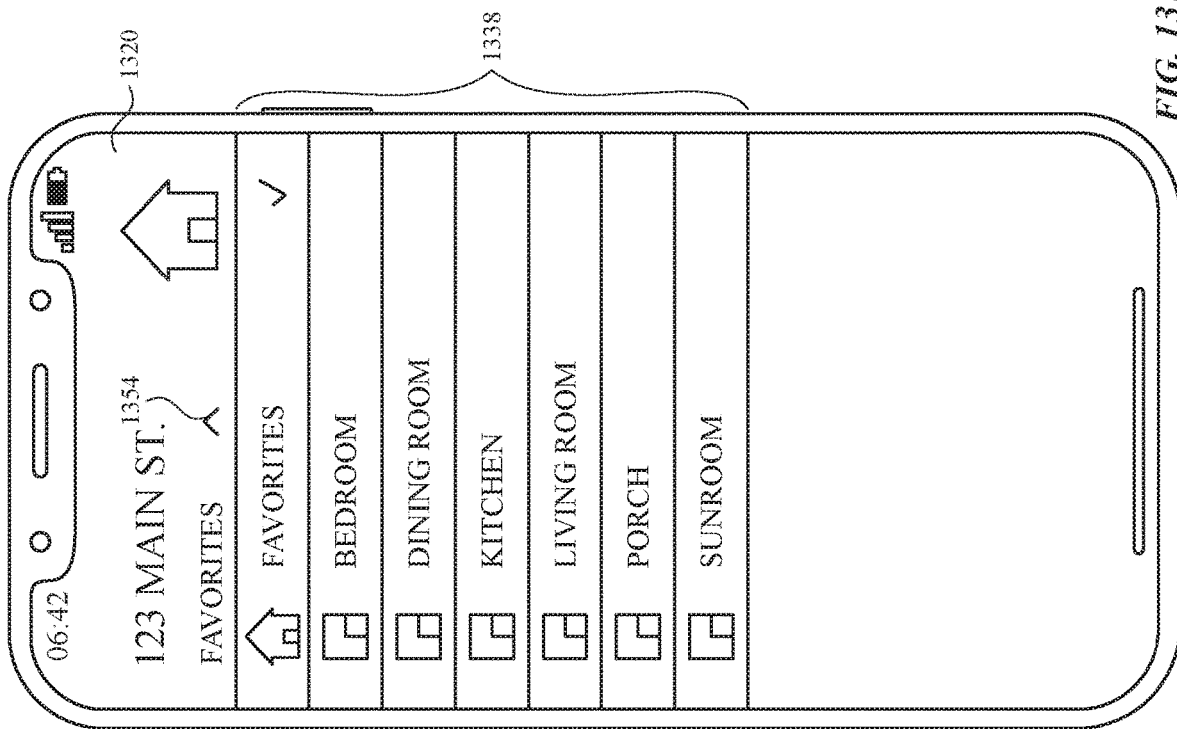

FIGS. 13F-13G illustrate exemplary user interfaces that device 600 can display when device 600 detects two different gestures at FIG. 13E. At FIG. 13E, device 600 detects tap gesture 1350e1 on navigation control 1334. As illustrated in FIG. 13F, in response to detecting tap gesture 1350e1, device 600 updates user interface 1320 to display menu 1338 and ceases to display accessory device controls 1336. Display menu 1338 includes controls for navigating to controls that correspond to individual rooms in house 1202, such as bedroom navigation control 1338d. In some embodiments, device 600 displays accessory device controls for controlling the devices that are available in bedroom 1202*c* (e.g., bedroom light 1232, bedroom speaker 1236) in response to detecting a tap gesture on bedroom navigation control 1338*d*. In some embodiments, in response to detecting a tap gesture on bedroom navigation control 1338*d*, the accessory device controls for controlling the devices that are available in bedroom 1202*c* include one or more accessory device controls that are different from the accessory device controls that are displayed in dynamic control portion 1334 in FIG. 13C.

Alternatively, at FIG. 13E, device 600 detects gesture 1350*e*2 (e.g., press-and-hold) on dining room light control 1336*g*. As illustrated in FIG. 13G, in response to detecting the gesture 1350*e*2, device 600 displays user interface 1360 and ceases to display user interface 1320. User interface 1360 includes additional controls that, when selected, causes device 600 to send instructions(s) to dining room light 1216 to perform different functions than a selection of dining room light control 1336*g* can cause dining room light 1216 to perform. For example, in FIG. 13E, selection (e.g., a tap gesture) of dining room light control 1336*g*, causes device 600 to transmit an instruction that causes dining room light control 1336*g* to turn on/off. However, in 13G, user interface 1360 includes light dimmer control 1362 (e.g., that, when selected, causes dining room light 1216 to dim) and color changing control 1364 (e.g., that, when selected, causes dining room light to change colors, which can cause device 600 to perform different functions than dining room light control 1336*g* of FIG. 13E).

Figure 13H:
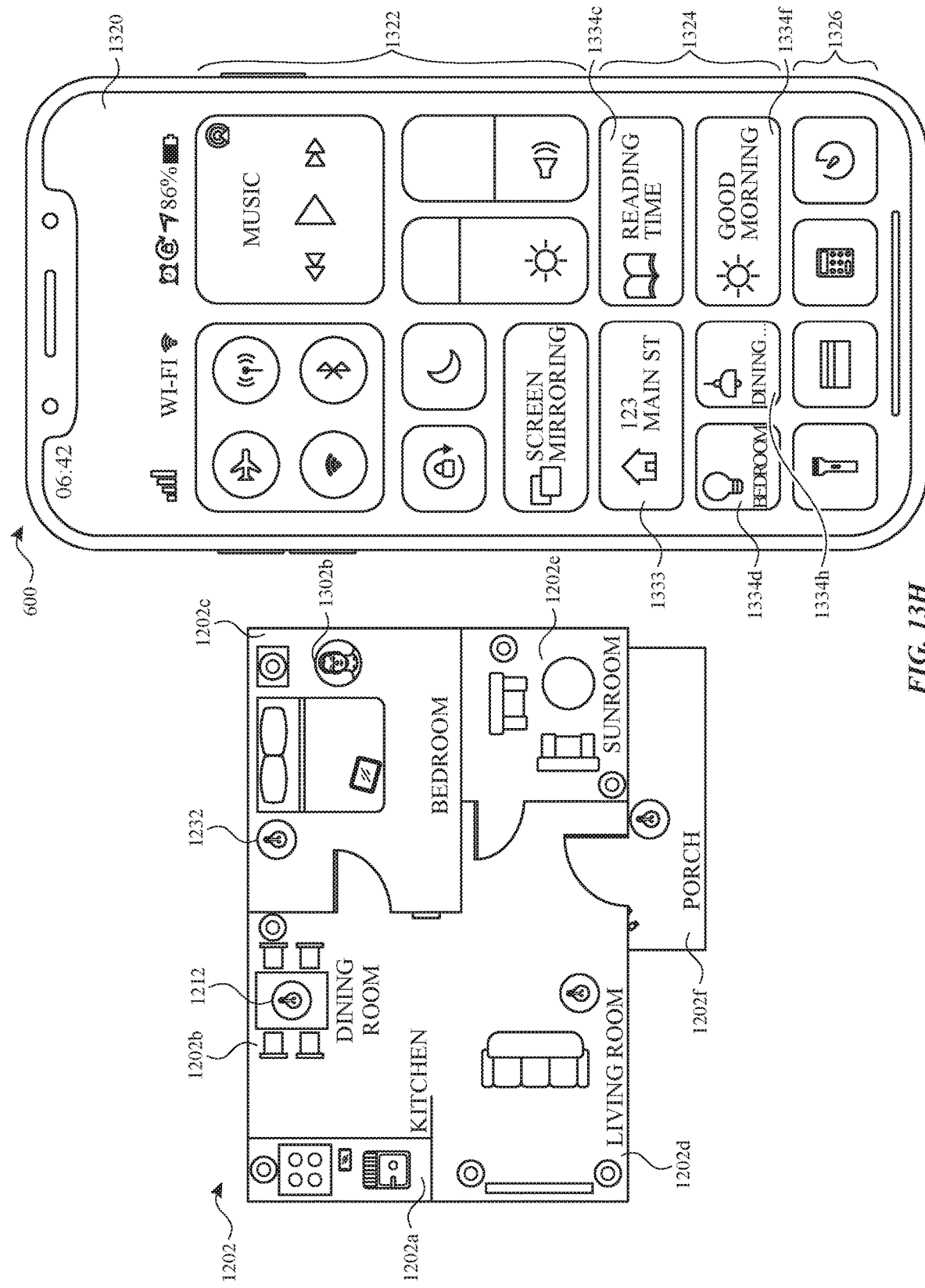

As illustrated in FIG. 13H, device 600 displays user interface 1320 with home control 1333 and the dynamic accessory device controls in dynamic control portion 1324 and the local operation controls in the static portions of user interface 1320 (e.g., at some point in time after displaying user interface 1320 in FIG. 13G). However, the set of dynamic accessory device controls displayed in FIG. 13H are different than the dynamic accessory device controls that are displayed in FIG. 13C because a determination has been made that device 600 is operating in a different use context. In particular, device 600 displays dining room light control 1334*h* (e.g., a control that, when selected, causes device 600 to transmit an instruction that causes dining room light 1212 to turn on/off) instead of bedroom light control 1334*d*. At FIG. 13H, device 600 displays dining room light control 1334*h* because device 600 is operating in a use context that is determined based on the historical use of controls. In particular, 600 is operating in a different user context in FIG. 13C (or 13F) because a determination was made that dining room light 1216 was the most recently used and/or access control (e.g., because user interface 1360 was recently displayed in FIG. 13G and/or that gesture 1350*e*2 was recently detected in FIG. 13E). In some embodiments, the historical use of a control can also be determined based on the control being one or more of the most frequently used, favorited (e.g., by user selection), most recently accessed, most recently displayed, most recently interacted with control or any combination thereof.

Figure 13I:
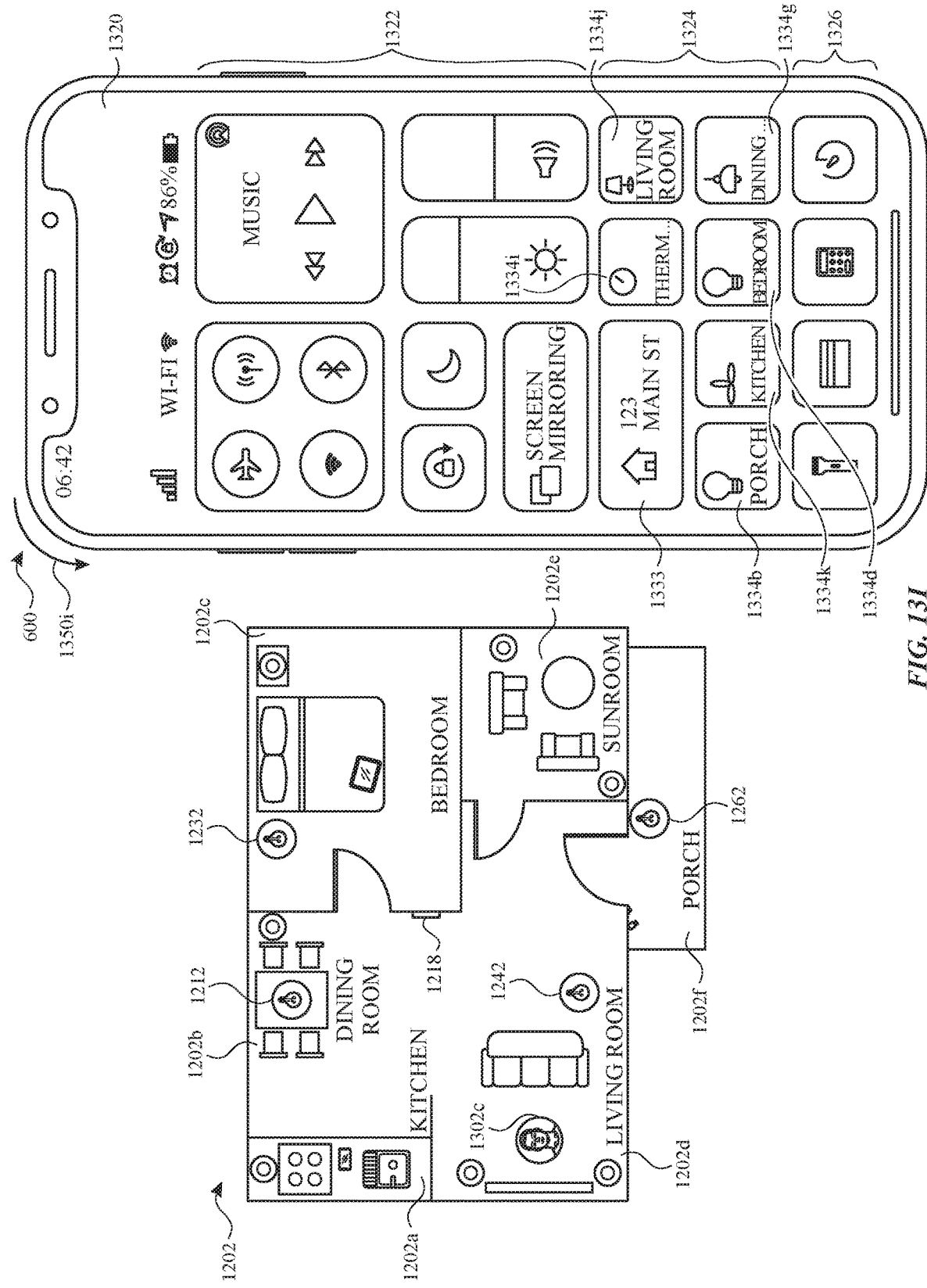

At FIG. 13I, a determination is made that device 600 is operating in a different use context (e.g., than in FIG. 13H) because device 600 is at a different location (e.g., location 1302*c* in FIG. 13I being different than location 1302*b* in FIG. 13H). Specifically, the use context in which device 600 is operating in FIG. 13I is determined because device 600 is operating in living room 1202*d* (e.g., or a different room than device 600 was operating within (e.g., bedroom 1202*c*) in FIG. 13H).

As illustrated in FIG. 13I, because device 600 is operating in living room 1202*d* (e.g., a different use context), device 600 displays a different set of controls in dynamic control portion 1224 than the set of controls that were previously displayed in FIG. 13H. For example, in FIG. 13I, device 600 displays thermostat control 1334*i*, living room control 1334*j*, dining room control 1334*g*, kitchen control 1334*k*, which were not previously displayed in FIG. 13H. In addition, a greater number of controls are displayed in dynamic control portion 1224 in FIG. 13I than the number of controls that were displayed in dynamic control portion 1224 in FIG. 13H while dynamic control portion 1224. In FIG. 13I, this is accomplished using one or techniques (e.g., displaying smaller controls) as described above in relation to FIGS. 13A-13C. At FIG. 13I, device 600 detects counter-clockwise rotation 1350*i* of device 600 (e.g., device 600 is physically rotated counter-clockwise 90 degrees).

Figure 13J:
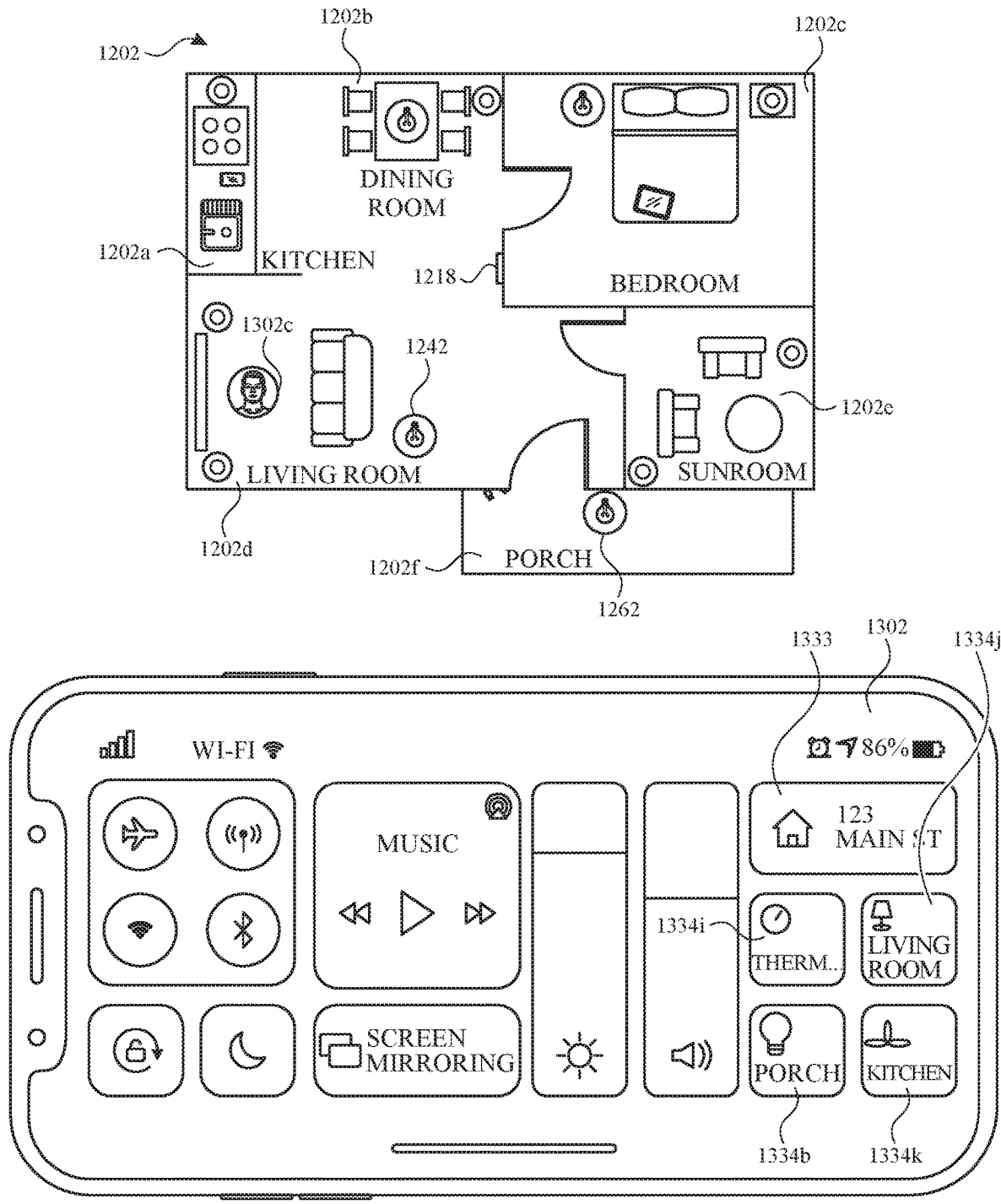

As illustrated in FIG. 13J, in response to detecting counter-clockwise rotation 1350*i*, device 600 transitions the display of user interface 1320 from a portrait orientation to a landscape orientation. As illustrated in FIG. 13I, when device 600 displays user interface in the landscape orientation, device 600 ceases to display some of the local operation controls, such as the local operation controls that were previously displayed in static portion 1326. In addition, in FIG. 13J, device 600 also ceases to display some of the dynamic device controls (e.g., kitchen fan control 1334*k* in FIG. 13I) from dynamic control portion 1324.

Figures 13K, 13L:
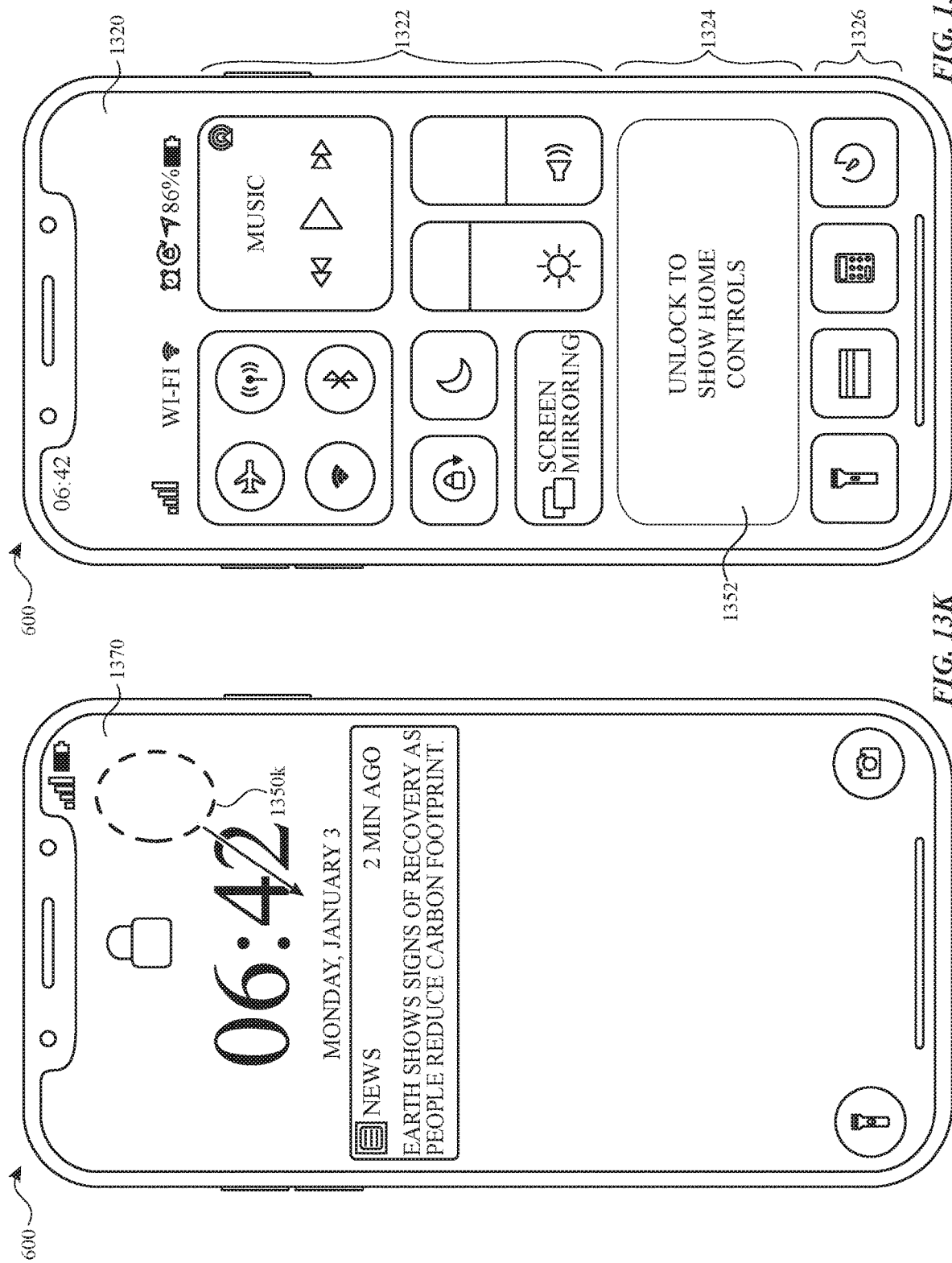

As illustrated in FIG. 13K (e.g., at some point in time after displaying FIG. 13I), device 600 displays user interface 1370 indicates that device 600 is in a locked state (e.g., as opposed to being in an unlocked state in FIG. 13A-13J). At FIG. 13K, device 600 detects swipe gesture 1350*k* on user interface 1370.

As illustrated in FIG. 13L, in response to detecting swipe gesture 1350*k*, device 600 displays user interface 1320 without any dynamic device controls and home control 1333 does not include dynamic controls in dynamic control portion 1324) because device 600 is operating in a locked state. In FIG. 13L, indication 1352 is displayed in dynamic control region 1324. Indication 1352 informs a user that device 600 must be unlocked in order for the dynamic device controls to be displayed. In some embodiments, user interface 1320 is displayed without any dynamic device controls and home control 1333 while device 600 is operating in a locked state for security reasons (e.g., to limit unauthorized access to the controls and/or to require authentication before dynamic device controls and/or home control 1333 are displayed). In some embodiments, device 600 omits dynamic device controls and home control 1333 to prevent unauthorized users from causing accessory devices in home 1202 to perform functions via selection of one or more of the controls.

At FIG. 13M, device 600 is in the unlocked state (e.g., at some point in time after displaying FIG. 13I). As illustrated in FIG. 13M, device 600 displays user interface 1380, which includes dynamic controls setting affordance 1382 in an active state (e.g., the setting is on). At FIG. 13M, device 600 detects tap gesture 13M on dynamic controls setting affordance 1382.

As illustrated in FIG. 13N, in response to detecting tap gesture 13M, device 600 toggles dynamic controls setting affordance 1382 from the active state to an inactive state (e.g., the setting is off). In some embodiments, at FIG. 13N, device 600 detects swipe gesture on user interface 1380. In some embodiments, in response to detecting the swipe gesture on user interface 1380, device 600 displays user interface 1320 without any dynamic device controls and home control 1333 (e.g., removes dynamic control portion 1324) because dynamic controls setting 1382 is in the inactive state.

FIG. 14 is a flow diagram illustrating methods for managing controls in accordance with some embodiments. Method 1400 is performed at a computer system (e.g., 100, 300, 500, or 600) that is in communication with a display generation component (e.g., 602) and one or more input devices. Some operations in method 1400 are, optionally, combined, the orders of some operations are, optionally, changed, and some operations are, optionally, omitted.

As described below, method 1400 for managing controls in accordance with some embodiments. The method reduces the cognitive burden on a user for managing controls in accordance with some embodiments, thereby, creating a more efficient human-machine interface. For battery-operated computing devices, enabling a user to control audio playback faster and more efficiently conserves power and increases the time between battery charges.

The computer system displays (1402), via the display generation component, a first user interface (e.g., 320) (e.g., a control center (e.g., user interface with a plurality of selectable user interface objects that control (e.g., set) one or more settings on the computer system (e.g., one or more Wi-Fi settings, Bluetooth settings, display settings (e.g., brightness controls), sound settings) or one or more accessory devices that are in communication with the computer system)) that includes (and/or is displayed on the first user interface) a first plurality of selectable user interface objects (e.g., 1332a-1332f, 1333, 1334a-1334k) (e.g., affordances) (e.g., a the first plurality of selectable user interface objects includes a plurality of selectable user interface objects for controlling a plurality of accessory devices (e.g., smart home accessory device (e.g., a smart (e.g., intelligent) light bulbs, thermostat, door lock, door opener (e.g., garage door opener), speaker, television, electric outlet, power strip, camera, appliance (e.g., a refrigerator, stove)))). In some embodiments, before displaying the first user interface, the computer system receives an input (e.g., a swipe gesture on the one or more input devices) that corresponds to a request to display a first user interface (e.g., a control center (e.g., user interface with a plurality of selectable user interface objects that control (e.g., set) one or more settings on the computer system (e.g., one or more Wi-Fi settings, Bluetooth settings, display settings (e.g., brightness controls), sound settings) or one or more accessory devices that are in communication with the computer system)) via the display generation component; and in response to receiving the input that corresponds to the request to display the first user interface via the display generation component, the computer system display the first user interface. In some embodiments, at least one of the plurality of selectable user interface objects is associated with or mapped to a first group of devices. In some embodiments, the first group of devices is associated with or mapped to a top-level location (or destination) (e.g., a location of a first type) (e.g., a home location, business, an office (e.g., a location that is a top-level location (e.g., a location that defines one or more locations (e.g., sub-locations) and/or one or more regions (or zones) that are within an area and/or perimeter that is defined by the location of the top-level location, a location that is at the top level of a hierarchy of locations, a location that is linked (e.g., programmatically) to one or more locations (e.g., sub-locations) and/or one or more regions (or zones)))). In some embodiments, the first group of devices can include a plurality of subgroups of devices. In some embodiments, a sub-group of devices is associated with or mapped to a sub-location (e.g., room positioned (e.g., in the boundary, area, or perimeter of the top-level location; and/or defined, identified, and/or linked (e.g., programmatically linked) (e.g., by a user) to the top-level location) in a top-level location and/or a zone (e.g., a location that is defined by two or more sub-locations within (e.g., within the boundary, area, or perimeter of the top-level location and/or defined, identified, and/or linked (e.g., by a user)) the top-level location (e.g., an entertainment zone that includes a living room and a dining room within the top-level location, a personal zone that includes two or more bedrooms, living rooms, bathrooms within the top-level location) in the top-level location). In some embodiments, the first user interface is a control user interface. In some embodiments, the first user interface is overlaid on top of another user interface e.g., a user interface that was previously displayed without an overlay on top of it). In some embodiments, the first user interface includes controls (e.g., sliders, selectable user interface objects (e.g., affordances)) for controlling music, one or more settings (e.g., to toggle an airplane mode, Bluetooth, cellular connectivity on/off) (e.g., to adjust the brightness of the display generation component, to adjust the sound of one or more speakers of the computer system), one or more status indicators (e.g., a battery percentage indication, a Wi-Fi indication, a cellular connectivity indication, a Bluetooth indicator)). In some embodiments, the first user interface includes a plurality of controls that are not associated with or mapped to the top-level location.

The first plurality of selectable user interface objects includes a first selectable user interface object (1404) (e.g., 1332a-1332f, 1333) (e.g., home app button) that, when selected, causes the computer system to modify a state (e.g., modifying (e.g., adjusting) the brightness of the computer system's display generation component, modifying the sound of one or more speakers of the computer system, modifying a state ((e.g., on/off) of Wi-Fi, an airplane mode, Bluetooth), modifying or changing the user interface that is displayed on the display screen of the computer system (e.g., displaying a second user interface that was not previously displayed and/or that is different from the first user interface)) of the computer system (e.g., without modifying the state of an external device to the computer system (e.g., device 600)). In some embodiments, the first selectable user interface object is displayed, irrespective of the use context in which the computer system is operating. In some embodiments, the first selectable user interface object, when selected, modifies a state of the computer system phone) without causing an external accessory device (e.g., first external accessory device and second accessory device) (or any external accessory devices) to perform a function. In some embodiments, the first selectable user interface object does not control an accessory when it is selected. In some embodiments, the first selectable user interface object, when selected, causes the computer system to display of a second user interface that is different from the first user interface. In some embodiments, the first user interface is an overlay (e.g., overlaid on top of another user interface, where portions of the other user interface are visible) while the second user interface is not an overlay. In some embodiments, the second user interface includes (e.g., is displayed on the second user interface) a second plurality of selectable user interface objects for controlling one or more accessory devices. In some embodiments, the second plurality of selectable user interface objects for controlling accessories includes or more (or a plurality) of the first group of selectable user interface objects and does not include one or more (or a plurality) of the first group of selectable user interface objects. In some embodiments, the second plurality of selectable user interface objects for controlling accessories includes a selectable user interface object. In some embodiments, one or more (or a plurality) of the first group of selectable user interface objects can be navigated to using the second user interface.

The first plurality of selectable user interface objects includes, in accordance with (1406) a determination that the computer system is in a first use context (e.g., one or more of a state of the computer system, time of use (e.g., time of displaying the first user interface), location of use (e.g., location (e.g., determined by one or more GPS sensors) of when the first user interface is displayed), historical use of one or more accessories), a second selectable user interface object (e.g., 1334a-1334k (e.g., 1334b)) that, when selected, causes a first external accessory device (e.g., smart home accessory device (e.g., a smart (e.g., intelligent) light bulbs, thermostat, door lock, door opener (e.g., garage door opener), speaker, television, electric outlet, power strip, camera, appliance e.g., a refrigerator, stove))) of a plurality of external accessory devices to perform a first function (e.g., causes the external accessory device to perform one or more functions (e.g., turn on/off, set a temperature, unlock/lock) that the external accessory device is configured to perform) (e.g., a first function that is selected based on (e.g., the computer system being in) the first use context).

The first plurality of selectable user interface objects includes, in accordance with (1408) a determination that the computer system is in a second use context that is different from the first use context, a third selectable user interface object (e.g., 1334a-1334k (e.g., 1334d)), different from the second selectable user interface object, that, when selected, causes (e.g., causes the accessory device to perform one or more functions (e.g., turn on/off, set a temperature, unlock/lock)) a second external accessory device (e.g., 1206, 1212, 1216, 1232, 1236, 1242, 1244, 1246, 1248, 1242, 1256, 1258, 1262, 1264, 1266) (e.g., smart home accessory device (e.g., a smart (e.g., intelligent) light bulbs, thermostat, door lock, door opener (e.g., garage door opener), speaker, television, electric outlet, power strip, camera, appliance (e.g., a refrigerator, stove))) of the plurality of external accessory devices to perform a second function, (e.g., causes the external accessory device to perform one or more functions (e.g., turn on/off, set a temperature, unlock/lock) that the external accessory device is configured to perform) (e.g., one or more of a state of the computer system, time of use (e.g., time of displaying the first user interface), location of use (e.g., location (e.g., determined by one or more UPS sensors)) of when the first user interface is displayed, historical use of one or more accessories) (e.g., a first function that is selected based on (e.g., the computer system being in) the first use context), where the third selectable user interface object (e.g., 1334a-1334k (e.g., 1334d)) is not included in the user interface in accordance with a determination that the computer system is in the first use context. In some embodiments, the function that is selected based on the second use context is different from the function that is selected based on the first use context. In some embodiments, the third selectable user interface object is displayed without displaying the second selectable user interface object. In some embodiments, the third selectable user interface object does not occupy the same location on the user interface as the second selectable user interface object. In some embodiments, the third selectable user interface object is a different size than the second selectable user interface object (e.g., irrespective of whether both the first and second use context are both met). In some embodiments, the first selectable user interface object is displayed on a fixed position on the display (e.g., in the same position irrespective of the use context of the computer system). In some embodiments, the second selectable user interface object is not included in the user interface when the computer system is in the second use context. In some embodiments, the first use context will change to the second use context while the first user interface is displayed via the display generation component, and in some embodiments, the selectable usable objects that were previously displayed other than the first selectable objects cease to be displayed or new selectable usable objects that were not previously displayed are displayed. Displaying dynamic selectable user interface objects for causing one or more external devices to perform different functions when prescribed conditions are met (e.g., based on the use context of the computer system) provides the user with feedback concerning the selectable user interface objects that are relevant as well as provides the user with more control of the computer system and external devices that can be controlled by the selectable objects provided by the computer system without cluttering the UI with additional displayed controls. Providing improved visual feedback and additional control of the computer system without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Displaying a consistent selectable user interface object (e.g., the first selectable user interface object), available in both the first and second use contexts, provides the user with a consistent control for changing one or more settings of the computer system. Providing the user with a control that is available in both the first and second use contexts makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Displaying dynamic selectable user interface objects in accordance with a determination that a computer system is in a particular use context enables a user to properly operate the computer system. The cognitive content of such information presented to the user relates to an internal state prevailing in the computer system, and is thus, a technical effect. For example, the internal state prevailing in the computer system dynamically changes and different selectable user interface objects are displayed as a result. Such presentation of the dynamic selectable user interface objects prompts the user to interact with the computer system.

In some embodiments, the first external accessory device (e.g., 1206, 1212, 1216, 1232, 1236, 1242, 1244, 1246, 1248, 1242, 1256, 1258, 1262, 1264, 1266) is different from the second external accessory device (e.g., 1206, 1212, 1216, 1232, 1236, 1242, 1244, 1246, 1248, 1242, 1256, 1258, 1262, 1264, 1266). In some embodiments, the second selectable user interface object that, when selected, causes a plurality of devices that includes the second device to perform a plurality of functions (e.g., the second selectable user interface object, when selected, initiates a macro (e.g., a program, a scene) to be activated, where the macro causes the plurality of devices to perform the plurality of functions in a predefined (e.g., or customized) sequence).

In some embodiments, the first use context includes a requirement that is met when the first user interface is displayed (e.g., initially displayed or displayed during) at a first time (e.g., 22:10 in FIG. 13A) (e.g., during a first range of times). In some embodiments, the second use context includes a requirement that is met when the first user interface is displayed (e.g., initially displayed or displayed during) at a second time (e.g., 06:42 in FIG. 13C) (e.g., during a second range of times that are different from the first range of times) that is different from the first time. In some embodiments, the first user interface (or second user interface) being displayed at the first time (or second time) is based on the computer system receiving a request (e.g., a swipe) to display the first user interface device at the first time (or second time) (or at a time before the first time (or second time)). In some embodiments, the determination that the computer system is in the first use context includes a determination of a current time. In some embodiments, the determination that the computer system is in the second use context includes a determination of a current time. In some embodiments, the first plurality of selectable user interface objects includes the second selectable user interface object only during a first time period. In some embodiments, the first plurality of selectable user interface objects includes the third selectable user interface object only during a second time period different from the first time period. In some embodiments, the second time period does not overlap the first time period. Displaying dynamic selectable user interface objects at different times and that are relevant to those times provides relevant control options without cluttering the user interface with less relevant control options. Providing improved control options without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first use context includes a requirement that is met when the computer system is detected at a first location (e.g., 1302a, 1302b, 1302c) (e.g., that corresponds to a first one or more locations). In some embodiments, the second use context includes a requirement that is met when the computer system is detected at a second location (e.g., 1302a, 1302b, 1302c) (e.g., that corresponds to a second one or more locations that are different from the first one or more locations) that is different from the first location. In some embodiments, the first plurality of selectable user interface objects includes the second selectable user interface object only when the computer system is at the first location. In some embodiments, the first plurality of selectable user interface objects includes the third selectable user interface object when the computer system is at the second location. In some embodiments, the first location and the second location do not overlap. Displaying dynamic selectable user interface objects for different locations and that are relevant to those locations provides relevant control options without cluttering the user interface with less relevant control options. Providing improved control options without cluttering the UI with additional displayed controls enhances the operability of the computer system and makes the user-device interface more efficient by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first use context includes a requirement that is met when the computer system has previously caused the first external accessory device to perform a third function (e.g., 1360, 1334h) (e.g., a function that is the same or different than the first function). In some embodiments, the first external accessory device is the most commonly controlled device or a most recently controlled device. In some embodiments, the second use context includes a requirement that is met when the computer system has previously caused the second external accessory device to perform a fourth function (e.g., 1360, 1334h) (e.g., a function that is the same or different than the second function). In some embodiments, the second external accessory device is the most commonly controlled device or a most recently controlled device. In some embodiments, the first plurality of selectable user interface objects includes the second selectable user interface object only when the computer system has previously caused the first external accessory device to perform the third function. In some embodiments, the first plurality of selectable user interface objects includes the third selectable user interface object when the computer system has previously caused the second external accessory device to perform the fourth function. In some embodiments, the third function and the fourth function are different. Displaying dynamic selectable user interface objects for causing one or more external devices to perform different functions based on the previous usage of control options with the external accessory devices provides more relevant control options without cluttering the user interface with less relevant control options. Providing improved control options without cluttering the UI with additional displayed controls enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first plurality of selectable user interface objects includes, in accordance with a determination that the computer system is in the first use context, a first number (e.g., 1333, 1334a-1334b in FIG. 13A) of selectable user interface objects that includes the first selectable user interface object and the second selectable user interface object. In some embodiments, the first plurality of selectable user interface objects includes, in accordance with a determination that the computer system is in the second use context, a second number (e.g., 1333, 1334c-1334f in FIG. 13A) of selectable user interface objects that includes the first selectable user interface object and the third selectable user interface object. In some embodiments, the first number is different than the second number (e.g., the first number is greater than the second number; the first number is less than the second number). Providing a different number controls based on the use context in which the computer system is operating provides the user with a relevant number of controls without cluttering the UI with additional controls that are not relevant (e.g., to fill empty space in the UI). Providing additional control of the computer system without cluttering the UI with additional displayed controls enhances the operability of the computer system and makes the user-device interface more efficient (e.g., by helping the user to provide proper inputs and reducing user mistakes when operating/interacting with the computer system)

which, additionally, reduces power usage and improves battery life of the computer system by enabling the user to use the computer system more quickly and efficiently.

In some embodiments, the computer system receives a first user input (e.g., tap input, a press-and-hold input) corresponding to the first selectable user interface object. In some embodiments, in response to receiving the first user input, the computer system displays a user interface (e.g., 1320, 1340) for controlling one or more external accessory devices (e.g., an application generated by a home management application) that includes: in accordance with the computer system being in the first use context, where the first use context includes the computer system being currently associated with a first location (e.g., a first home (e.g., "123 Main Street")) that corresponds to a first set of one or more external accessory devices, a first external accessory device user interface object (e.g., 1336) that, when selected, causes a first external accessory device (e.g., smart home accessory device (e.g., a smart (e.g., intelligent) light bulbs, thermostat, door lock, door opener (e.g., garage door opener), speaker, television, electric outlet, power strip, camera, appliance (e.g., a refrigerator, stove))) of the first set of one or more external accessory devices to perform a fifth function (e.g., causes the external accessory device to perform one or more functions (e.g., turn on/off, set a temperature, unlock/lock) that the external accessory device is configured to perform); and in accordance with the computer system being in the second use context, where the second use context includes the computer system being currently associated with a second location (e.g., a second home (e.g., "345 First Street")) that corresponds to a second set of one or more external accessory devices that is different from the first set of one or more external accessory devices, a second external accessory device user interface object (e.g., 1336) that, when selected, causes a first external accessory device (e.g., smart home accessory device (e.g., a smart (e.g., intelligent) light bulbs, thermostat, door lock, door opener (e.g., garage door opener), speaker, television, electric outlet, power strip, camera, appliance (e.g., a refrigerator, stove))) of the second set of one or more external accessory devices to perform a sixth function (e.g., causes the external accessory device to perform one or more functions (e.g., turn on/off, set a temperature, unlock/lock) that the external accessory device is configured to perform). Displaying user interface for controlling one or more external accessory devices that includes different controls for different external accessory devices based on the location that the computer system is contextually associated with provides users with control options that are more relevant to the current location of the devices. Providing additional control of the computer system without cluttering the UI with additional displayed controls enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first user interface is displayed while the computer system is in a first user-configurable mode (e.g., 1382 in FIG. 13M) (e.g., a mode in which dynamic external accessory device controls are enabled for display in the first user interface; a mode that can be selected in a settings user interface of the computer system). In some embodiments, while the computer system is in a second user-configurable mode (e.g., 1382 in FIG. 13N) (e.g., a mode in which dynamic external accessory device controls are not enabled for display in the first user interface; a mode that can be selected in a settings user interface of the computer system), the computer system displays a second user interface (e.g., 1320 in FIG. 13L) that includes a second plurality of user interface objects. In some embodiments, the second plurality of user interface objects includes a first subset of the first plurality of user interface objects and does not include any selectable user interface objects of a second subset of the first plurality of user interface objects that includes the first selectable user interface object and the second selectable user interface object. In some embodiments, the second subset includes any selectable user interface object of the first plurality of user interface objects that causes an external accessory device to perform a function. Not displaying the dynamic selectable user interface objects when a dynamic device control is disabled provides feedback as to whether the dynamic device control is disabled and provides the user with additional control over the feature. Providing improved visual feedback and control over features enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first user interface is displayed while the computer system is in an unlocked user interface state (e.g., a state in which a first set of user interface functions (e.g., a default set) are available). In some embodiments, while the computer system is in a locked user interface state (e.g., 13K-13L) (e.g., a state in which one or more of the first set of user interface functions are not available (a restricted user interface state)), the computer system displays a third user interface (e.g., 1320 in FIG. 13L) that includes a third plurality of user interface objects. In some embodiments, the third plurality of user interface objects includes a third subset of the first plurality of user interface objects and does not include a fourth subset of the first plurality of user interface objects. In some embodiments, the fourth subset includes the second selectable user interface object and/or the third selectable user interface object. In some embodiments, the fourth subset includes any selectable user interface object of the first plurality of user interface objects that causes an external accessory device to perform a function. Displaying a subset of the first plurality of user interface objects while not displaying a subset of the first plurality of user interface objects while in a locked state allows the computer system to limit what controls are provided while in a locked state, which protects unintentional access to the selectable user interface objects when the computer system is locked (e.g., in situations where the electronic device is in a more secure state or where a type of passcode will need to be provided in order to access additional functionality of the computer system). Providing improved security makes the user interface more secure and reduces unauthorized inputs which, additionally, reduces power usage and improves battery life of the computer system by enabling the user to use the computer system more securely and efficiently.

In some embodiments, the computer system receives user input (e.g., a tap gesture, a long press gesture) corresponding to selection of the first selectable user interface object. In some embodiments, in response to receiving the user input corresponding to selection of the first selectable user interface object and while displaying the first user interface (e.g.,

1320 in FIG. 13E) that includes the second selectable user interface object or the third selectable user interface object, the computer system displays a sixth selectable user interface object (e.g., 1336, 1336g) that is different from the second selectable user interface object and the third selectable user interface object. In some embodiments, selection of the sixth selectable user interface object causes (e.g., causes the accessory device to perform one or more functions (e.g., turn on/off, set a temperature, unlock/lock)) a seventh external accessory device (e.g., smart home accessory device (e.g., a smart (e.g., intelligent) light bulbs, thermostat, door lock, door opener (e.g., garage door opener), speaker, television, electric outlet, power strip, camera, appliance (e.g., a refrigerator, stove))) of the plurality of external accessory devices to perform a seventh function. In some embodiments, the seventh function is different from the first function and the second function. In some embodiments, the seventh external accessory device is different from the first external accessory device and the second external accessory device. In some embodiments, in response to receiving the user input corresponding to selection of the first selectable user interface object, the computer system ceases to display the first selectable user interface object (and/or other selectable user interface objects that, when selected, cause the computer system to modify a state (e.g., modifying (e.g., adjusting) the brightness of the computer system's display generation component, modifying the sound of one or more speakers of the computer system, modifying a state ((e.g., on/off) of Wi-Fi, an airplane mode, Bluetooth), modifying or changing the user interface being displayed on the display screen of the computer system (e.g., displaying a second user interface that was not previously displayed and/or that is different from the first user interface))). In some embodiments, in response to receiving the user input corresponding to selection of the first selectable user interface object, the computer system displays a plurality of selectable user interface objects for controls external accessory devices that are sorted in a particular order (e.g., by the room in which a respective external accessory device is assigned). Displaying additional selectable user interface objects that were not dynamically displayed on the first user interface in response to receiving an input (e.g., a long-press input) provides the user with additional control options without cluttering the first user interface. Providing additional control options without cluttering the user interface makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first location is a location that is less than a predetermined distance from a location associated with a first physical structure (e.g., a house, home, an office building). In some embodiments, in accordance with a determination that the computer system is in a first use context, the second external accessory device is associated with an interior location of the first physical structure.

In some embodiments, a second physical structure includes a first area and a second area that is different from the first area in some embodiments, the first location is a location that is within the first area of the physical structure without being within the second area of the physical structure. In some embodiments, in accordance with a determination that the computer system is in the first use context, the second external accessory device is associated with the first area and not associated with the second area.

In some embodiments, the second location is a location that is not less than a predetermined distance from a physical structure (e.g., a house, home, an office building). In some embodiments, in accordance with a determination that the computer system is in the second use context, the third external accessory device is associated with an exterior location of the physical structure.

In some embodiments, the first user interface includes a first portion and a second portion; and the computer. In some embodiments, in accordance with a determination that the computer system is in a first use context, the first portion is displayed based on a fixed layout of one or more selectable user interface objects and the second portion includes a first variable layout of one or more selectable user interface objects. In some embodiments, in accordance with a determination that the computer system is in a second use context, the first portion is displayed based on the fixed layout and the second portion is displayed based on a second variable layout of one or more selectable user interface objects. In some embodiments, the second variable layout is different from the third variable layout.

In some embodiments, while the computer system is in an orientation: in accordance with a determination that the computer system is in the first use context, the first selectable user interface objects are displayed in a third layout that occupies (e.g., are within and fill) a portion of the first user interface; and in accordance with a determination that the computer system is in the second use context, the second selectable user interface objects are displayed in a fourth layout that occupies (e.g., are within and fill) the portion of first the user interface. In some embodiments, in accordance with a determination that the computer system is in the first use context, the first number of selectable user interface is displayed in a third layout that occupies a portion of the first user interface. In some embodiments, in accordance with a determination that the computer system is in the second use context, the second number of selectable user interface is displayed in a fourth layout that is different from a third layout and the second layout occupies a portion of the first user interface. In some embodiments, the third layout is different from the fourth layout.

In some embodiments, as a part of displaying the second user interface, the computer system displaying at least one of (or concurrently displaying both) the selectable user interface object that corresponds to the second selectable user interface object and the selectable user interface object that corresponds to the third selectable user interface object.

In some embodiments, while displaying the second user interface without displaying the selectable user interface object that corresponds to the second selectable user interface object, the computer system receives user input corresponding to a request to display a third user interface. In some embodiments, in response to receiving the request to display the third user interface, the computer system displays the third user interface that includes displaying the selectable user interface object that corresponds to the second selectable user interface object.

In some embodiments, the first selectable user interface object is the same size irrespective of the number of dynamic controls. In some embodiments, the first selectable user interface object is displayed in the second portion of the first user interface. In some embodiments, while the first selectable user interface object is displayed in the second portion of the first user interface, the computer system: in accordance with a determination that the computer system is in a first use context, the first selectable user interface object has a first size; and in accordance with a determination that the computer system is in a second use context, the first selectable user interface object has a second size that is different from the first size. In some embodiments, the first selectable user interface object is displayed in the first portion of the first user interface, and while the first selectable user interface object is displayed in the first portion of the first user interface, the first selectable user interface object is the same size irrespective of the use context of the computer system.

Note that details of the processes described above with respect to method 1400 (e.g., FIG. 14) are also applicable in an analogous manner to the methods described above/below. For example, method 800 optionally includes one or more of the characteristics of the various methods described above with reference to method 1400. For example, operation 806 of method 800 can be performed to select a first media information affordance that can be displayed while the computer system is performing operation 1402 of method 1400, and operations 808, 810, and/or 812 can be performed as part of method 1400 in response to the selection. For brevity, these details are not repeated below.

FIGS. 15A-15L illustrate exemplary user interfaces for controlling audio playback in accordance with some embodiments. The user interfaces in these figures are used to illustrate the processes described below, including the processes shown in FIGS. 7, 8, 10, and 16.

FIGS. 15A-15D illustrate exemplary scenarios where an external media playback device (e.g., living room speaker 1248) is currently playing back media. FIGS. 15A-15D also illustrate user interfaces that are displayed while the external media playback device is currently playing back media and device 600 is a respective distance away from the external media playback device. FIGS. 15A-15D includes schematic diagram 1500, which includes a representation of a respective distance (e.g., 1504*a*-1504*c*) that a location (e.g., 1502*a*-1502*c*) of device 600 is away from the location of an external media playback device. Schematic diagram 1500 is provided for exemplary purposes only as a visual aid for the description. Thus, schematic diagram 1500 is not intended to limit the scope of determining whether device 600 is within a predetermined distance away from the external media playback device. Furthermore, the figures are not necessarily to scale and are included merely as a visual aid. Thus, unless otherwise noted, the size and scale of features depicted in the figures are not intended as a limitation on a distance required to be within the predetermined distance away from the external media playback device. In some embodiments, the techniques described in relation to FIGS. 15A-15D are similar to the techniques discussed above in relation to device 600 being within a proximity condition range, as described above (e.g., as represented by proximity range indicator 652 and using one or more techniques that are described above in relation to FIGS. 6A-6P).

Figure 15A:
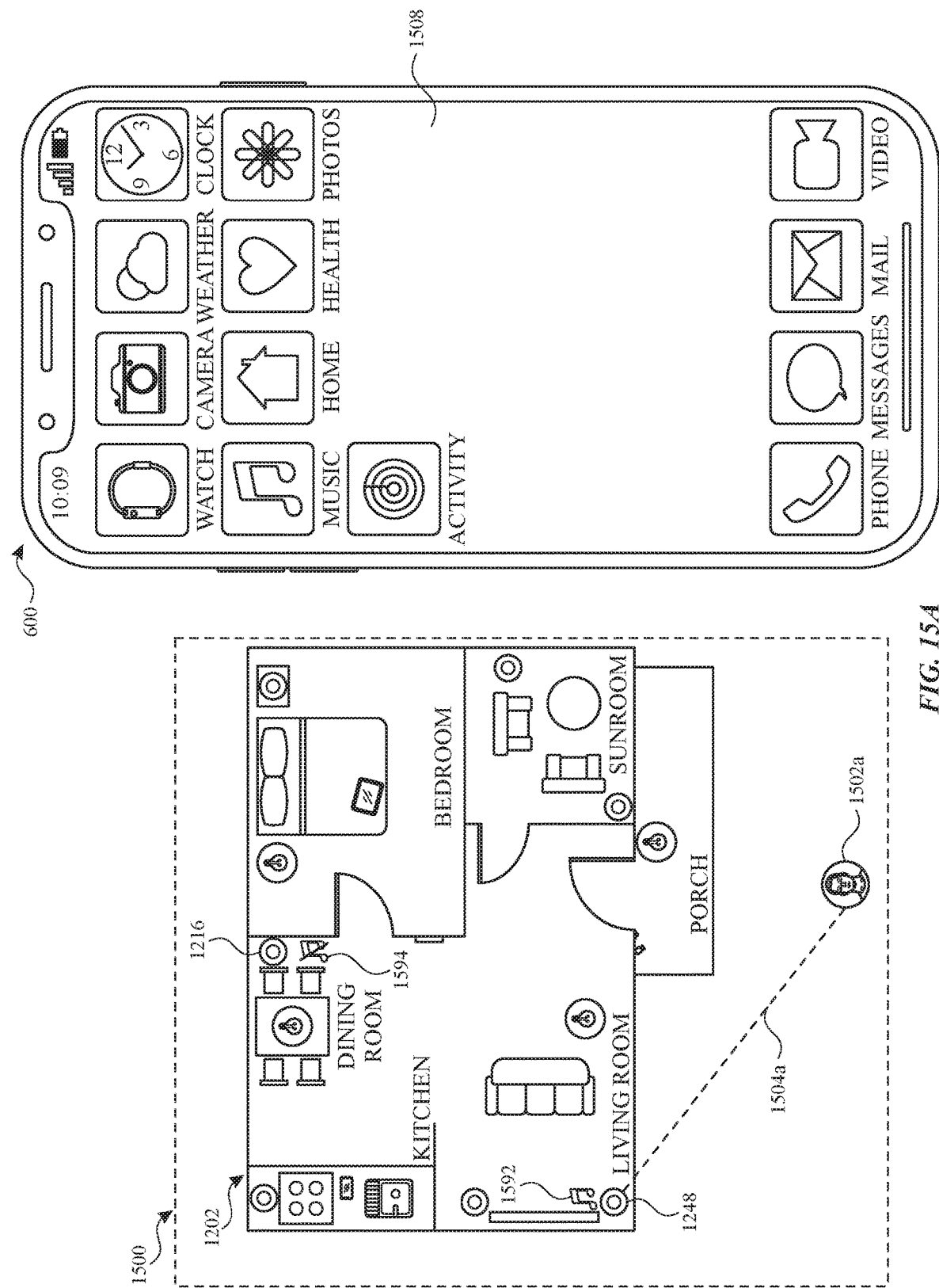

FIG. 15A illustrates device 600 displaying user interface 1508 that includes multiple application icons. As shown by schematic diagram 1500 in FIG. 15A, device 600 is at a location 1502*a* that is distance 1504*a* away from living room speaker 1248.

Figure 15B:
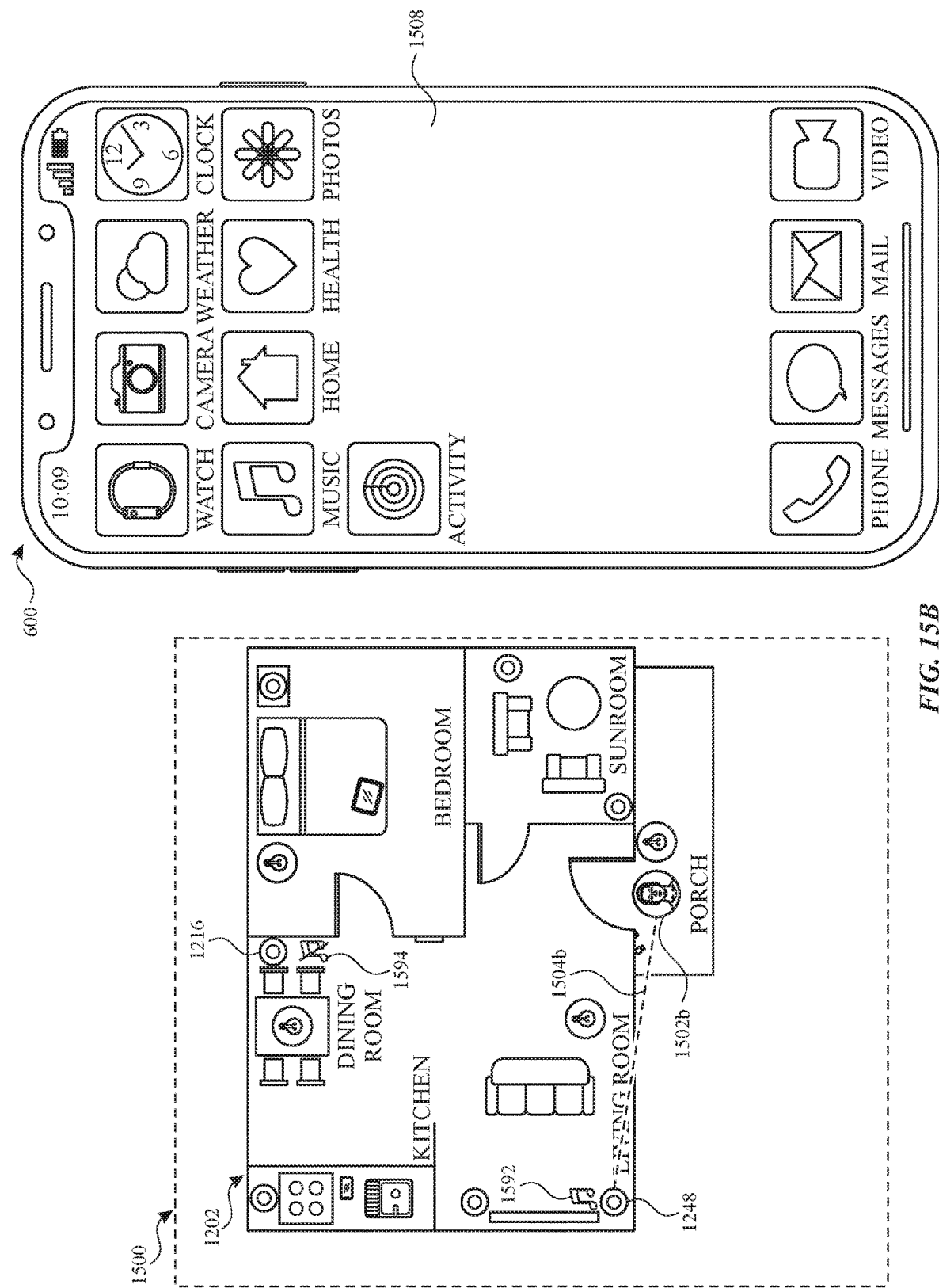

In FIG. 15B, schematic diagram 1500 shows that device 600 is currently at location 1502*b*, which is distance 1504*b* away from living room speaker 1248. Distance 1504*b* is less than distance 1504*a* that was depicted in FIG. 15A. Thus, in FIG. 15B, device 600 is closer to living room speaker 1248 than device 600 was in FIG. 15A.

At FIG. 15B, a determination is made that a set of external device control criteria (e.g., the control criteria) are not met. Here, the determination is made that the control criteria are not met because device 600 is not close enough to (e.g., distance 1504*b* is not within a predetermined distance (e.g., 1, 3, 5 meters)) living room speaker 1248. In some embodiments, a determination of whether the control criteria are met is made by device 600 or one or more other devices, such as a server in communication with device 600.

As illustrated in FIG. 15B, device 600 does not update user interface 1508 or display a user interface different than user interface 1508 because the external device control criteria are not met (e.g., when device 600 is distance 1504*b* away from living room speaker 1248).

Figure 15C:
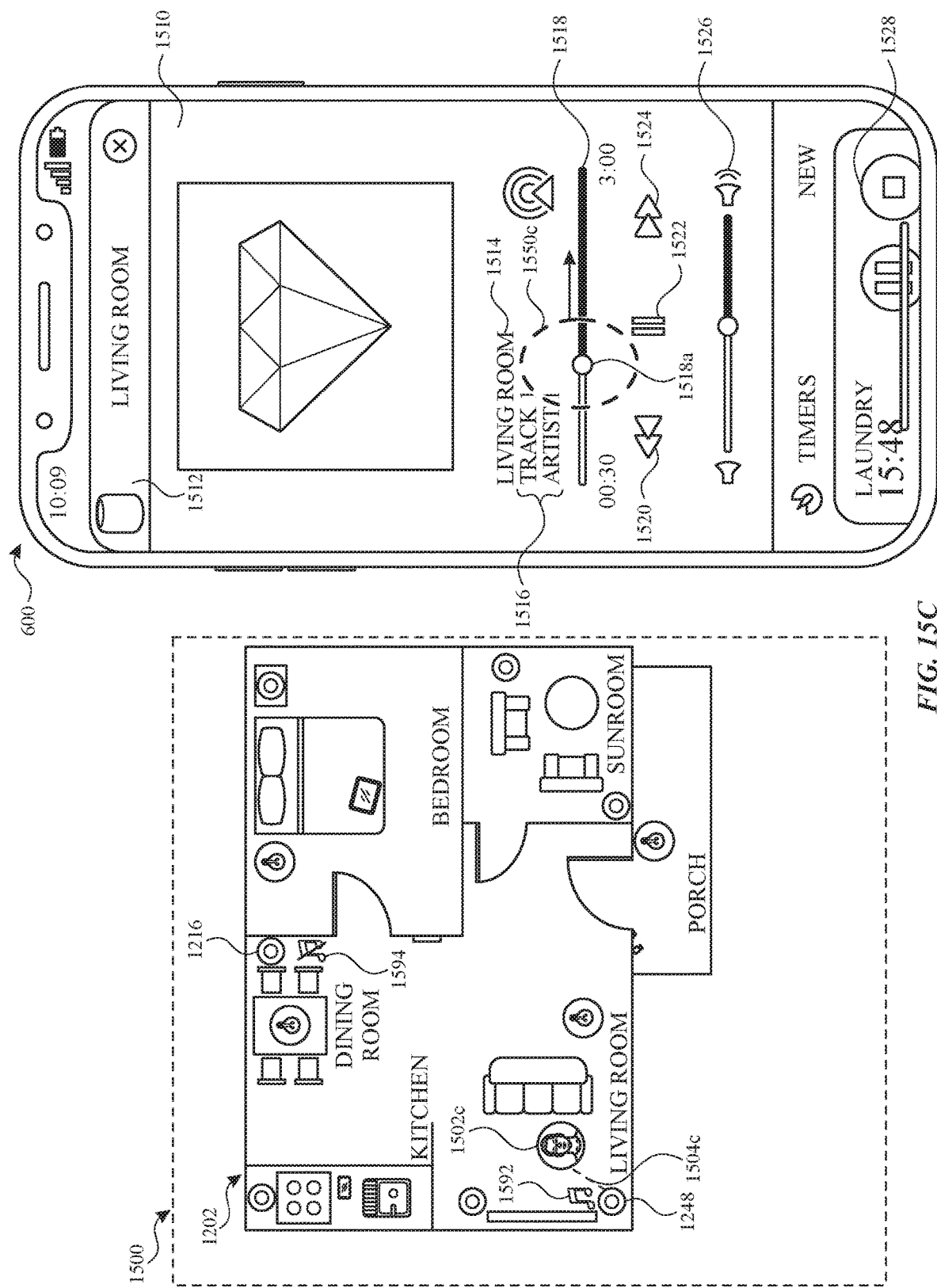

In FIG. 15C, schematic diagram 1500 shows that device 600 is currently at location 1502*c*, which is distance 1504*c* away from living room speaker 1248. Distance 1504*c* is less than distance 1504*b* that was depicted in FIG. 15B. Thus, in FIG. 15C, device 600 is closer to living room speaker 1248 than device 600 was in FIG. 15B.

At FIG. 15C, a determination is made that the control criteria are met. Here, the determination is made that the control criteria are met because device 600 is close enough to (e.g., distance 1504*c* is within a predetermined distance (e.g., 1, 3, 5 meters)) living room speaker 1248. At FIG. 15C, the determination is made that the control criteria are met without device 600 receiving any particular gestures or user inputs directed to any user interface elements of device 600. In some embodiments, when determining whether the control criteria are met, a determination is made that is not based on the physical orientation of the device 600 with respect to living room speaker 1248. In other words, in some embodiments, the control criteria do not include a criterion that is met based on whether device 600 is pointed at or away from a location that corresponds to living room speaker 1248 or any other object in the environment. In some embodiments, when determining whether the control criteria are met, a determination is made that is not based on whether the particular movement of electronic device 600 (e.g., based on whether device 600 is accelerating toward a location that corresponds to living room speaker 1248). In some embodiments, when the control criteria are met for two different external media playback devices (e.g., when device 600 is close enough to two different external media playback devices), device 600 will automatically display a user interface that is similar to user interface 1510 (or user interface 1530 that is discussed below) that corresponds to the closest device to device 600 or the closest device to device 600 that is currently playing back media.

In some embodiments, the control criteria include a criterion that is met when a voice command is made from device 600 to initiate playback of media at the external media playback device. In some embodiments, the voice command is analyzed by one or more speech recognition and/or biometric algorithms to determine that the voice belongs to a user that is associated with (e.g., via an account) device 600. Thus, in some embodiments, a device that is associated with the user that was recognized as issuing the voice command to the external media playback device will automatically display a user interface (e.g., such as user interface 1510 or user interface 1530 (discussed below)) (e.g., because the control criteria are met) while a device that is not associated with the user will not automatically display the user interface (e.g., because the control criteria are met) even if both devices are close enough to (e.g., within the predetermined distance from) the external media playback device.

In some embodiments, the control criteria include a criterion that is met when the device 600 is logged into the same account (e.g., a mobile device account, a media storage account, a media provider account) as the external media playback device. Thus, in some embodiments, a device that is logged into the same account as the external media playback device will automatically display a user interface while a device that is not logged into the same account as the external media playback device will not even if both devices are close enough to (e.g., within the predetermined distance from) the external media playback device.

In some embodiments, the control criteria include a criterion that is met when device 600 is logged into the same account as the media playback, the external media playback device is playing back media, and/or device 600 is in the same room (e.g., living room 1202*d*) as device 600. In some embodiments, when there are two or more devices logged into the same account as the external media playback device and the two or more devices are close enough to the external media playback device, at least one of the devices will display an indication of which device (e.g., an identifier associated with an owner of a device) that is controlling the playback of media on the external media playback device (e.g., when a command from the device is sent to the external media playback device) or that is displaying a user interface, such as user interface 1510 or user interface 1530 (discussed below).

Along with the determination concerning whether the control criteria are met, a determination is made that living room speaker 1248 is currently configured to play back media (e.g., is currently outputting media), which is illustrated by audio activity indicator 1592 in FIG. 15A. In FIG. 15C, schematic diagram 1500 includes audio activity indicator 1592 above living room speaker 1248 and audio activity indicator 1594 above dining room speaker 1216. Audio activity indicator 1592 (e.g., a music note) can be contrasted with audio activity indicator 1594 (e.g., "a music note with a slash through it"), such that audio activity indicator 1592 indicates that living room speaker 1248 is currently outputting media while audio activity indicator 1594 indicates that dining room speaker 1216 is not currently outputting media. It should be understood that audio activity indicator 1592 and audio activity indicator 1594 are provided for similar purposes and have the same properties as audio activity indicator 675 and audio activity indicator 625, respectively.

As illustrated in FIG. 15C, device 600 displays user interface 1510 because determinations have been made that the control criteria are met and living room speaker 1248 is currently playing back media. User interface 1510 includes device identifier 1512, device identifier 1514, current media identifier 1516, timer control 1528, and media playback controls, such as playback location control 1518, rewind control 1520, pause control 1522, fast-forward control 1524, and volume level control 1526. Device identifier 1512 and device identifier 1514 indicate the name of the device that can be controlled via user interface 1510. Thus, in FIG. 15C, device identifier 1512 and device identifier 1514 indicate (e.g., "Living Room") that living room speaker 1248 can be controlled via user interface 1510 because device 600 is close enough to living room speaker 1248. As shown in FIG. 15C, device identifier 1512 is also displayed next to a graphical representation of the type of device that can be controlled via user interface 1510. Thus, in FIG. 15C, the graphical representation is a speaker. Current media identifier 1516 indicates the media that is currently being played back or controlled by living room speaker 1248. Thus, in FIG. 15C, living room speaker 1248 is playing a song, "Track 1," which is performed by "Artist 1."

Timer control 1528 optionally includes multiple controls (e.g., a pause control, a stop control) for controlling a timer. At FIG. 15C, timer control 1528 corresponds to a non-media related application (e.g., a tinier application, an alarm application). Thus, at FIG. 15C, timer control 1528 corresponds to a different type of application than the media related application (e.g., a music application, a video application, a podcast application) to which the media playback controls correspond.

At FIG. 15C, when any one of the media playback controls are selected (e.g., via a gesture), an instruction is transmitted by device 600 that causes living room speaker 1248 to modify a media playback operation. For example, in response to receiving a gesture directed to rewind control 1520, device 600 transmits an instruction that causes living room speaker 1248 to rewind "Track 1," which is currently being played back.

As illustrated in FIG. 15C, playback position control 1518 includes playback position indicator 1518*a*. At FIG. 15C, playback position indicator 1518*a* is at a position on playback position control 1518 that corresponds to the current playback position of the media (e.g., current time of media that is being played back). At FIG. 15C, playback position indicator 1518*a* is displayed at the position on playback position control 1518 based on data indicating the state of playback of the media and the remaining time, such that the media playback controls are in sync with the current state of the media being played back on living room speaker 1248. At FIG. 15C, device 600 detects dragging gesture 1550*c* on playback position indicator 1518*a* of playback position control 1518.

As illustrated in FIG. 15D, in response to detecting dragging gesture 1550*c*, device 600 moves the playback position indicator 1518*a* from a first position on playback position control 1518 to a second position on playback position control 1518. Along with displaying playback position indicator 1518*a* at a new position on playback position control 1518, device 600 transmits an instruction to living room speaker 1248 that causes the speaker to skip the playback of media from the position of the media that corresponds to the first position on playback position control 1518 (e.g., 00:30 in FIG. 15C) to the position of the media that corresponds to the second position on playback position control 1518 (e.g., 02:15).

Figure 15E:
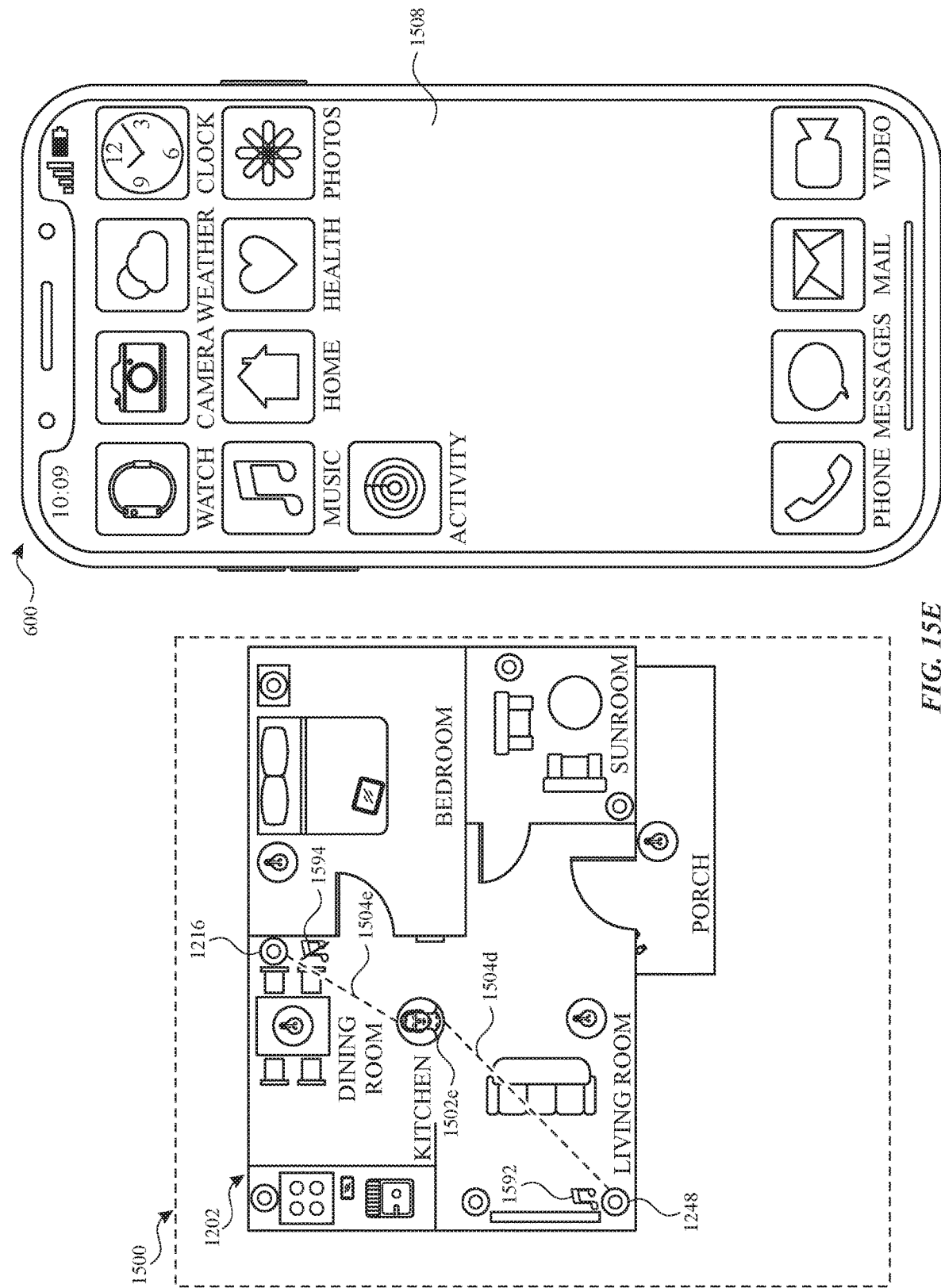
Figure 15F:
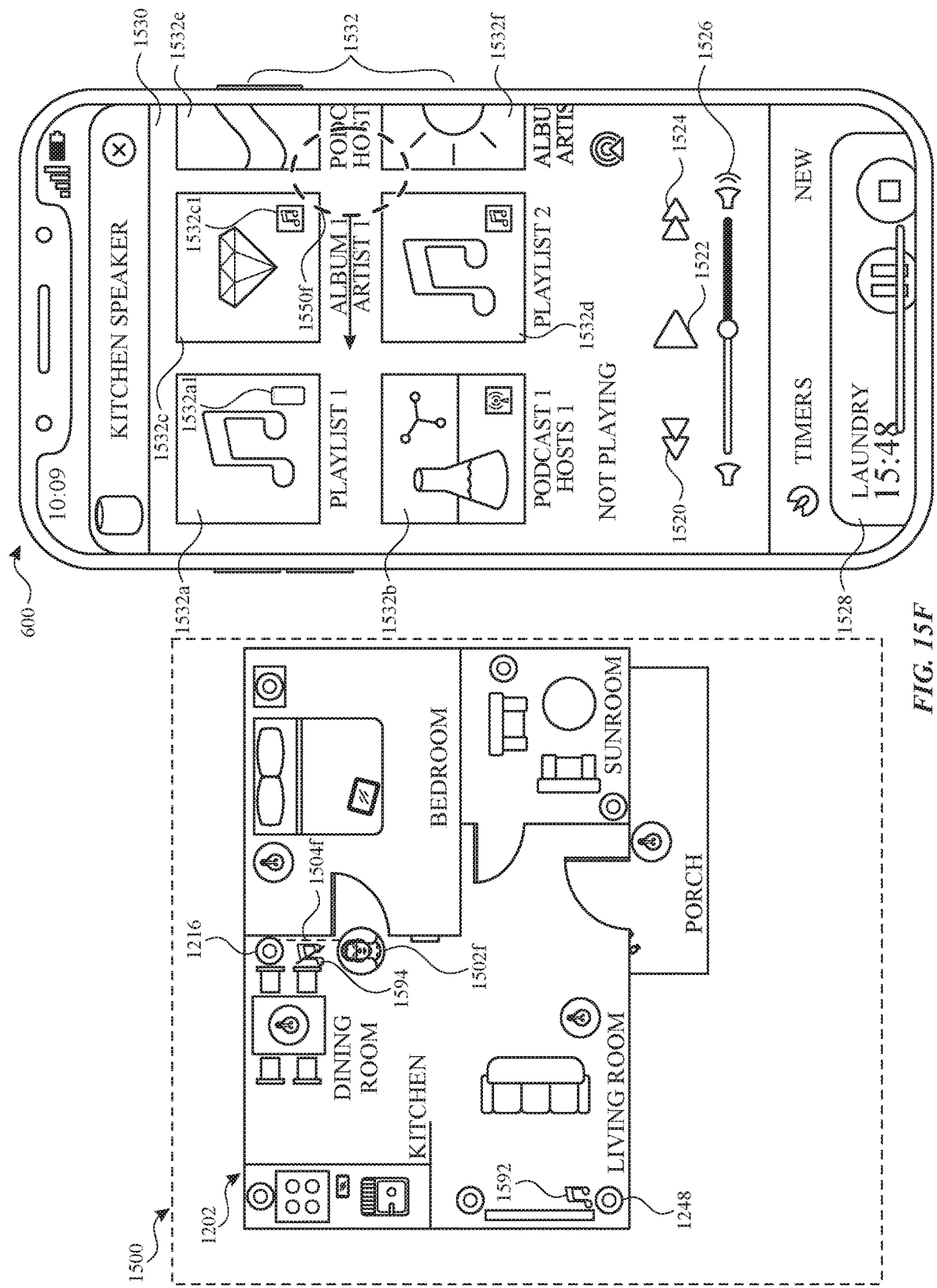

FIGS. 15E-15F illustrate exemplary scenarios where an external media playback device (e.g., dining room speaker 1216) is not currently playing back media. FIGS. 15E-15F also illustrate user interfaces that are displayed while the external media playback device is not currently playing back media, and device 600 is a respective distance away from the external media playback device. FIGS. 15E-15F includes schematic diagram 1500 that includes a respective representation of a respective distance (e.g., 1504*e*-1504*f*) that a respective location (e.g., 1502*e*-1502*f*) of device 600 is away from the location of an external media playback device. In some embodiments, the techniques described in relation to FIGS. 15E-15F are similar to the techniques discussed above in relation to device 600 being within a proximity condition range, as described above (e.g., as represented by proximity range indicator 652 and using one or more techniques that are described above in relation to FIGS. 6A-6P).

In FIG. 15E, schematic diagram 1500 shows that device 600 is currently at location 1502*e*, which is distance 1504*d* away from living room speaker 1248 and distance 1504*e* away from dining room speaker 1216. Distance 1504*d* is greater than distance 1504*c* (as shown in FIGS. 15C and 15D). Thus, in FIG. 15E, device 600 is further away from living room speaker 1248 than it was in FIG. 15D.

At FIG. 15E, a determination is made that the control criteria are not met because device 600 is not close to any external media device (e.g., living room speaker 1248, dining room speaker 1216). Thus, as illustrated in FIG. 15E, device 600 automatically ceases to display user interface 1510, which included media playback controls that controlled living room speaker 1248 (e.g., as discussed above in relation to FIGS. 15C-15D) and re-displays user interface 1508 that has the set of application icons. In some embodiments, when the determination is made that the control criteria are not met, device 600 continues to display user interface 1510 until a gesture is received to change the user interface displayed on device 600 and/or until the control criteria are met (e.g., for a different device than living room speaker 1248).

In FIG. 15F, schematic diagram 1500 shows that device 600 is currently at location 1502f, which is distance 1504f away from dining room speaker 1216. Distance 1504f is less than distance 1504e (as shown in FIG. 15E) Thus, in FIG. 15F device 600 is closer to dining room speaker 1216 than it was in FIG. 15E.

At FIG. 15F, a determination is made that the control criteria are met. Here, the determination is made that the control criteria are met because device 600 is close enough to (e.g., distance 1502f is within a predetermined distance for control (e.g., 1, 3, 5 meters)) dining room speaker 1216. Along with the determination concerning whether the control criteria are met, a determination is made that dining room speaker 1216 is not currently playing back media (e.g., is not currently outputting media), which is illustrated by audio activity indicator 1594 (as discussed above in relation to FIG. 15C).

As illustrated in FIG. 15F, device 600 displays user interface 1530 because determinations have been made that the control criteria are met and dining room speaker 1216 is not currently playing back media. In some embodiments, user interface 1530 is displayed when it is determined that device 600 has entered dining room 1202b.

User interface 1530 includes similar components as user interface 1510, such as device identifiers (e.g., "DINING ROOM") and a timer or alarm control (e.g., timer control 1528). However, because dining room speaker 1216 is not currently playing back media (e.g., instead of playing back media), user interface 1530 includes recommended media item graphics 1532. In some embodiments, the timer or alarm control displayed in user interface 1530 is different from the timer or alarm control that is displayed in user interface 1510 (e.g., because another device is being controlled and/or because the device that is being controlled via the respective user interface is in a different media playback state).

As illustrated in FIG. 15F, recommended media item graphics 1532 are representative of different types of media items, such as playlists (e.g., recommended media item graphics 1532a, 1532d), podcasts (e.g., recommended media item graphics 1532b, 1532e), and albums (e.g., recommended media item graphics 1532c, 1532f). Each of recommended media item graphics 1532 represents a predetermined media item that is being recommended to be played back on dining room speaker 1216 in FIG. 15F. Each of the recommended media item graphics includes a source indicator that indicates the source (e.g., a source application or a source device) that is providing (e.g., hosting, storing, transferring) a respective recommended media item. For example, recommended media item graphic 1532a (e.g., "Playlist 1") has source indicator 1532a1, which indicates that the recommended media item that is represented by recommended media item graphic 1532a is locally stored on device 600. As another example, recommended media item graphic 1532c (e.g., "ALBUM 1") has source indicator 1532c1, which indicates that the recommended media item that is represented by recommended media item graphic 1532c is being provided by a music application. In sonic embodiments, the first recommended media item graphic (e.g., 1532a) corresponds to a media item that is currently being playback (or is the first in the queue to be played back) on device 600. In some embodiments, when device 600 detects a tap gesture on one of recommended media item graphics 1532, dining room speaker 1216 initiates playback of media that is represented by the respective recommended media item graphic. In some embodiments, selecting a media item that is representative of a playlist media item will cause dining room speaker 1216 to play multiple media items that are a part of the playlist media items. In some embodiments, device 600 uses techniques described above (e.g., in FIGS. 6C-6E) in relation to media item graphics (e.g., 608-7) to display, choose, and/or respond to gesture(s) directed to one or more of recommended media item graphics 1532. In some embodiments, when a leftward or rightward swipe gesture is detected on user interface 1510 (e.g., in FIG. 15C), device 600 continues display of user interface 1510 without changing content displayed on user interface 1510 (e.g., because user interface 1510 does not include any recommended media item graphics that are to be displayed). At FIG. 15F, device 600 detects leftward swipe gesture 1550f on user interface 1530.

As illustrated in FIG. 15G, in response to detecting leftward swipe gesture 1550f, device 600 slides the recommended media item graphics to the left to display additional recommended media item graphics, such as newly displayed recommended media item graphic 1532g and recommended media item graphic 1532h. Here, recommended media item graphic 1532g and recommended media item graphic 1532h are each representative of a media item that was not represented by recommended media item graphics 1532a-1532f in FIG. 15F. At FIG. 15G, device 600 detects upward swipe gesture 1550g on user interface 1530.

As illustrated in FIG. 15H, in response to detecting upward swipe gesture 1550g, device 600 scrolls user interface 1530 upward to display additional controls that correspond to non-media related applications, such as alarm control 1534a and alarm control 1534b. In some embodiments, when an upward or downward swipe gesture is detected on user interface 1510 (e.g., in FIG. 15C), device 600 scrolls the user interface to display additional controls that correspond to non-media related applications. In some embodiments, in response to detecting a gesture on alarm control 1534a, device 600 will schedule an alarm to turn on at a time associated with alarm control 1534a (e.g., 5:00 AM).

Looking back at FIG. 15C, device 600 displayed user interface 1510 while device 600 was in an unlocked state and not displaying a music application control (e.g., 1572) with other device controls (e.g., controls for controlling the volume, brightness, Bluetooth connection of device 600). As shown in FIGS. 15I-15J, device 600 displays different user interfaces that correspond to user interface 1510 when device 600 is in a different state (and the control criteria are met and the external device is determined to be currently playing back media). FIG. 15I illustrates device 600 displaying user interface 1560 because device 600 is in a locked state. User interface 1560 includes similar components to user interface 1510, such as a device identifier (e.g., "LIVING ROOM") and one or more similar media playback controls. However, user interface 1560 does not include any timer and/or alarm controls. FIG. 15J illustrates device 600 displaying user interface 1560 because device 600 is displaying a music application control (e.g., 1572) with other device controls. User interface 1570 includes similar components to user interface 1510, such as a current media identifier (e.g., "Track 1"). However, user interface 1560 does not include any timer and/or alarm controls. In addition, user interface 1572 does not include all of the media controls that were displayed on user interface 1510, such as playback location control 1518 and volume level control 1526.

Looking back at FIG. 15F, device 600 displayed user interface 1530 while device 600 was in an unlocked state and not displaying a music application control (e.g., 1592) with a plurality of other device controls (e.g., controls for controlling the volume, brightness, Bluetooth connection, etc. of device 600). As shown in FIGS. 15K-15L, device 600 displays different user interfaces that correspond to user interface 1530 when device 600 is in a different state (and the control criteria are met and the external device is determined not to be currently playing back media). FIG. 15K illustrates device 600 displaying user interface 1580 because device 600 is in a locked state. User interface 1580 includes similar components to user interface 1530, such as a device identifier (e.g., "DINING ROOM"). However, user interface 1580 does not include any timer and/or alarm controls and includes a reduced number of recommended media item graphics. In addition, the recommended media item graphics that are displayed do not include any source indicators, FIG. 15L illustrates device 600 displaying user interface 1590 because device 600 is displaying a music application control (e.g., 1582) with a plurality of other device controls. User interface 1590 includes similar components to user interface 1530. However, user interface 1590 does not include any timer and/or alarm controls or recommended media item graphics.

FIG. 16 is a flow diagram illustrating methods for controlling audio playback using an electronic device in accordance with some embodiments. Method 1600 is performed at a computer system (e.g., 100, 300, 500, or 600) (e.g., a smartphone, a smartwatch) that is in communication with a display generation component (e.g., a display controller, a touch-sensitive display system) and one or more input devices (e.g., a touch-sensitive surface). Some of the operations in method 1600 are, optionally, combined, the orders of some operations are, optionally, changed, and some operations are, optionally, omitted.

As described below, method 1600 provides an intuitive way for controlling audio playback. The method reduces the cognitive burden on a user for controlling audio playback, thereby creating a more efficient human-machine interface. For battery-operated computing devices, enabling a user to control audio playback faster and more efficiently conserves power and increases the time between battery charges.

The computer system receives (e.g., 1602) data indicating a current media (e.g., audio and/or visual media) playback state (e.g., a state of outputting audio or visual media) of an external media playback device (e.g., 1216, 1248) (e.g., a speaker, television, a digital media player). In some embodiments, the data is received directly from the external media playback device (e.g., via a wired or wireless connection). In some embodiments, the data is received via an intermediate server.

The computer system, in response to (1604) receiving the data and in accordance with a determination that a set of external media playback device control criteria are met, displays, via the display generation component, a user interface (e.g., 1510 or 1530) for controlling media playback at the external media playback device. In some embodiments, the set of external device media control criteria includes a criterion that is met when the computer system is connected to the media playback device. In some embodiments, the determination occurs independent of (e.g., any) user inputs (e.g., the determination occurs automatically) on (e.g., any) app associated with the computer system. In some embodiments, the user interface is displayed automatically, without intervening user input, in response to receiving the data indicating the current media playback state of the external media playback device (e.g., a speaker, television, a digital media player). In some embodiments, the data is received directly from the external media playback device (e.g., via a wired or wireless connection). In some embodiments, the data is received via an intermediate server. In some embodiments, the set of external media playback device control criteria do not include any criterion based on the movement of the computer system (e.g., based on accelerometer data). In some embodiments, the set of external media playback device control criteria do not include any criterion based on a physical orientation of the computer system (e.g., based on accelerometer or gyroscope data).

The user interface for controlling media playback at the external media playback device includes (e.g., includes displaying), in accordance with (1606) a determination that the data indicates that the external media playback device is currently performing a media playback operation (e.g., as indicated by 1592), a first selectable user interface object (e.g., 1518, 1520, 1522, 1526 in FIG. 15C) that, when selected (e.g., via 1550*c*) via the one or more input devices, causes (e.g., in some embodiments, by transmitting a command directly or indirectly (e.g., via a server) to the external media playback device) the external media playback device to modify the media playback operation (e.g., pause or stop the operation, transition from the currently playing media to different media, a fast-forward operation, a rewind operation, a volume increase or decrease operation).

The user interface for controlling media playback at the external media playback device includes, in accordance with (1608) a determination that the data indicates that the external media playback device is not currently performing a media playback operation (e.g., the media playback device is not outputting audio or visual media (e.g., as indicated by 1594)), a second selectable user interface object (1610) (e.g., 1532*a*-1532*f*) that, when selected via the one or more input devices, causes the external media playback device to initiate playback of a first predetermined media item (e.g., a recommended media item, a media item that is not currently configured to be played back on the external media playback device). The user interface for controlling media playback at the external media playback device includes, in accordance with (1608) the determination that the data indicates that the external media playback device is not currently performing a media playback operation (e.g., the media playback device is not outputting audio or visual media), a third selectable user interface object (1612) (e.g., 1532*a*-15320 that, when selected via the one or more input devices, causes the external media playback device to initiate playback of a second predetermined media item (e.g., a recommended media item, a media item that is not currently configured to be played back on the external media playback device). In some embodiments, in accordance with a determination that the data indicates that the external media playback device is currently performing a media playback operation, computer system forgoes display of the selectable user interface object that, when selected via the one or more input devices, causes the external media playback device to initiate playback of the predetermined media item. In some embodiments, while displaying the user interface for controlling media playback at the external media playback device, the computer system ceases to display another user interface for controlling media for a different external media playback device (e.g., that is different from the user interface for controlling media playback at the external media playback device). In some embodiments, the user interface includes an identifier associated with the external device. Choosing to provide a selectable object for modifying a media that is being played back or to provide a selectable object that shows recommended (e.g., predetermined) items based on whether the external device is currently playing back media or not provides the user with feedback about the current state of the external device and provides feedback to the user indicating an operation that can be initiated to change the state of media playback on the external device. Providing improved visual feedback to the user enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Displaying a third selectable user interface object that causes the external device to perform a non-media-related function (e.g., irrespective of whether prescribed conditions are met that include whether the computer system is playback media) when the control criteria are met provides the user with additional control over the external device without cluttering the user interface under other circumstances. Providing additional control of the computer system without cluttering the UI enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the second (or first) selectable user interface object, when displayed, in accordance with a determination that the computer system is operating in a first display state (e.g., one of an unlocked state (e.g., a state where functionality of the computer system is accessible without requiring authentication (e.g., password authentication, biometric authentication, etc.)) and a locked state (e.g., a state where access to at least some functionality of the computer system requires authentication (e.g., password authentication, biometric authentication, etc.))), is displayed with a first visual appearance (e.g., 1510, 1530) (e.g., in the locked state, the first selectable object (e.g., controls pause or stop the operation, transition from the currently playing media to different media, a fast-forward operation, a rewind operation, a volume increase or decrease operation)) is displayed within a portion of the first visual appearance (e.g., within a windowed area) (e.g., includes indications of date and/or time, locked state, etc.)) (e.g., in the unlocked state, controls are displayed in the entirety of the first visual appearance).

In some embodiments, the second (or first) selectable user interface object, when displayed, in accordance with a determination that the computer system is operating in a second display state (e.g., one of an unlocked state (e.g., a state where functionality of the computer system is accessible without requiring authentication (e.g., password authentication, biometric authentication, etc.)) and a locked state (e.g., a state where access to functionality of the computer system requires authentication (e.g., password authentication, biometric authentication, etc.))) that is different from the first display state, is displayed with a second visual appearance (e.g., 1560, 1570, 1580, 1590) that is different from the first visual appearance (e.g., in the locked state, the first selectable object (e.g., controls (e.g., pause or stop the operation, transition from the currently playing media to different media, a fast-forward operation, a rewind operation, a volume increase or decrease operation)) is displayed within a portion of the second visual appearance (e.g., within a windowed area) (e.g., includes indications of date and/or time, locked state, etc.)) (e.g., in the unlocked state, controls are displayed in the entirety of the second visual appearance). In some embodiments, in accordance with the determination that the computer system is operating in the first display state, the second selectable user interface object is displayed with a third visual appearance. In some embodiments, in accordance with the determination that the computer system is operating in the second display state that is different from the first display state, the first selectable user interface object is displayed with the third visual appearance that is different from the fourth visual appearance. Displaying the selectable user interface objects differently when prescribed conditions are met allows the user to quickly recognize, via the provided feedback, the state in which the electronic device is operating. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, via the display generation component, a user interface (e.g., 1510, 1530) for controlling media playback at the external media playback device (e.g., pause or stop the operation, an operation that transitions from the currently playing media to different media, a fast-forward operation, a rewind operation, a volume increase or decrease operation), the computer system receives an indication (e.g., an internally-generated indication, an externally generated indication) that the computer system has moved from a first location (e.g., 1502c) (e.g., an area, a room in a building (e.g., a home)) to a second location (e.g., 1502f) (e.g., an area, a room in a building (e.g., a home)). In some embodiments, the indication is received directly from a component of the computer system from the external media playback device (e.g., via a wired or wireless connection). In some embodiments, the data is received via an intermediate server. In some embodiments, in response to receiving the indication that the computer system has moved from the first area (e.g., 1202d) to the second area (e.g., 1202b) (e.g., a room in a building (e.g., a home)), the computer system modifies the user interface (e.g., 1510, 1530) for controlling media playback at the external playback device (e.g., is modified to control operations (e.g., pause or stop the operation, a transition from the currently playing media to different media, a fast-forward operation, a rewind operation, a volume increase or decrease operation) of the computer system) (e.g., is modified to a default user interface (e.g., having default user interface objects for controlling operations)), In some embodiments, the modification of the user interface includes modifying the user interface to control another external playback device, Automatically modifying the user interface for controlling media playback at the external device when prescribed conditions are met provides a user interface that changes based on the location of the computer system and enables the user to see how the available selectable user interface objects will impact various external devices. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, modifying the media playback operation includes a modification selected from the group consisting of: altering the speed of the playback operation (e.g., fast-forwarding) (e.g., 1520, 1524), pausing the playback of media (e.g., 1522), rewinding the playback of media (e.g., 1520), and modifying the volume of the playback of media 1526).

In some embodiments, the set of external media playback device control criteria includes a criterion that is met when a distance (e.g., 1504a-1504d, 1504f) between the computer system and the external media playback device is below a threshold distance (e.g., a predetermined threshold distance (e.g., 1, 2, 5, 10, 20 feet)). Displaying a user interface with selectable user interface objects for controlling an external device based on the distance between the external device and the computer system enhances the security of the computer system by allowing only users who meet proximity standards to be presented with the selectable user interface. Providing improved security makes the user interface more secure and reduces unauthorized inputs which, additionally, reduces power usage and improves battery life of the computer system by enabling the user to use the computer system more securely and efficiently.

In some embodiments, the set of external media playback device control criteria includes a criterion that is met when a voice command (e.g., play) to initiate playback of media at the external media playback device is received at the computer system. In some embodiments, the computer system identifies the voice command as having been issued by a particular user (e.g., via one or more voice recognition techniques). Displaying a user interface with selectable user interface objects for controlling an external device when prescribed conditions are met (e.g., the voice of the user has been detected, where the voice corresponds to commands for the external device to perform a function) enhances the security of the computer system by allowing only users who meet certain standards to be presented with the selectable user interface objects automatically. Providing improved security makes the user interface more secure and reduces unauthorized inputs which, additionally, reduces power usage and improves battery life of the computer system by enabling the user to use the computer system more securely and efficiently.

In some embodiments, the set of external media playback device control criteria includes a criterion that is met when a determination is made that an external media playback device is of a first type (e.g., headphones). In sonic embodiments, the external media playback device of a first type is not connected and/or paired with another device prior to being connected to the computer system. Displaying a user interface with selectable user interface objects for controlling an external device, automatically, when a device of a first type is connected provides the user with optimized control options without the need for further input. Perform-ing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of external media playback device control criteria includes a criterion that is met when the external media playback device is currently playing back media and the computer system and the external media playback device are currently logged into the same account (e.g., a media provider account, a mobile device's account, a media storage account, etc.). Displaying a user interface with selectable user interface objects for controlling an external device when the computer system is logged into same account as external device enhances the security of the computer system by allowing only users who meet certain standards to be presented with the selectable user interface objects automatically. Providing improved security makes the user interface more secure and reduces unauthorized inputs which, additionally, reduces power usage and improves battery life of the computer system by enabling the user to use the computer system more securely and efficiently.

In some embodiments, the set of external media playback device control criteria includes a criterion that is met when a determination is made that the computer system and the external media playback device are within the same location (e.g., area; within the same room a predefined boundary or perimeter, etc.) and the computer system and the external media playback device are currently logged into the same account (e.g., a media provider account, a mobile device's account, a media storage account, etc.). Displaying a user interface with selectable user interface objects for controlling an external device when the computer system is in same area (e.g., room) in which the external device is located and logged into the same account as the external device enhances the security of the computer system by allowing only users who meet proximity standards to be presented with the selectable user interface objects automatically. Providing improved security makes the user interface more secure and reduces unauthorized inputs which, additionally, reduces power usage and improves battery life of the computer system by enabling the user to use the computer system more securely and efficiently.

In some embodiments, the second selectable user interface object includes an indication of a source (e.g., 1532a1, 1532c1) (e.g., source device (e.g., personal device, third-party application, media provider, etc.,) and/or source application) for the first predetermined media item. In some embodiments, the predetermined media item includes media items from a plurality of sources, and the indication representative of the source indicates a respective source for at least one media item of the media items. Displaying the indication of the source for the predetermined media item provides the user with feedback that allows the user to quickly recognize the source (e.g., application or device) that is providing the recommended media item (e.g., which helps the user to understand how to modify the recommended media item). Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first predetermined media item (e.g., 1532*a*) is a playlist (e.g., a predetermined playlist) that includes a plurality of media items. Displaying a predetermined media item that is a playlist allows the user to quickly select or play multiple media items that associated with the predetermined media item, without requiring excessive inputs. Optimizing control options and reducing excess inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the second selectable user interface object, the computer system receives a gesture (e.g., a gesture of a first type (e.g., a swipe) in a first direction (e.g., horizontal or vertical) (e.g., a gesture that is initiated at a location that corresponds to a first location of the display generation component). In some embodiments, in response to receiving the gesture (e.g., 1550*f*, 1550*g*) and in accordance with a determination that the gesture (e.g., 1550*f*) is in a first direction (e.g., horizontal), the computer system displays a third selectable user interface object (e.g., 1532*g*, 1532*h*) that, when selected, causes the external media playback device to initiate playback of a third predetermined media item that is different from the first predetermined media item and the second predetermined media item (e.g., display a third recommended media item). In some embodiments, in response to receiving the gesture (e.g., 1550*f*, 1550*g*) and in accordance with a determination that the gesture (e.g., 1550*g*) is in a second direction that is different from the first direction, the computer system displays a fourth selectable user interface object (e.g., 1534*a*, 1534*b*) that, when selected, causes the external media playback device to perform a non-media-related function (e.g., a function that does not include causing the external media playback device to initiate media playback). In some embodiments, the non-media-related function is a timer function or an alarm function), In some embodiments, the first direction is perpendicular to the second direction. In some embodiments, the first direction is not opposite the second direction. In some embodiments, displaying the fourth selectable user interface object (e.g., timer) includes ceasing to display the second selectable user interface object. In some embodiments, displaying the third selectable user interface object includes ceasing to display the second selectable user interface object. In some embodiments, while displaying the first selectable user interface object, receiving a second gesture; and in response to receiving the gesture and in accordance with a determination that the second gesture is in the first direction, forgoing display of the recommended content and/or maintaining display or the user interface (e.g., do not display additional content or maintain display of the visual content that was previously displayed before receiving the gesture); and in accordance with a determination that the second gesture is in the second direction, displaying the fourth selectable user interface object. Displaying different types of selectable user interface objects based on different directional gestures provides the user with more control options without cluttering the user interface. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface for controlling media playback at the external media playback device includes a third selectable user interface object (e.g., 1534*a*, 1534*b*) that, when selected via the one or more input devices, causes the external media playback device to perform a non-media-related function. In some embodiments, the non-media-related function is a timer function or an alarm function. In some embodiments, the media playback operation is performed by a first application (e.g., a media playback application), and the non-media-related function is performed by a second application of the external media playback device.

In some embodiments, in accordance with a determination that another computer system (e.g., a smartphone, a smartwatch) is connected to the external media playback device and enabled to cause the external media playback device to modify the media playback operation control operation, display an indication of the another computer system when a determination is made that the computer system and the another computer system are logged into the same account (e.g., a media provider account, a mobile device's account, a media storage account, etc.)

In some embodiments, when it is determined that voice input is detected (e.g., via a microphone of the computer system) and the voice input corresponds to a user associated with the computer system, the voice input is or has also been provided to control the external media device by the user. In some embodiments, the user associated with the computer system is the same user that also provided voice input to control the external media device, an instruction is sent to another computer system to forgo displaying a selectable user interface object that, when selected, causes the another computer system to modify the media playback operation of the external playback device. In some embodiments, the another computer system is within the same area (e.g., within a same room, a predefined boundary or perimeter, etc.) as the external playback media device.

In some embodiments, the data indicating the current media (e.g., audio and/or visual media) playback state (e.g., a state of outputting audio or visual media) of the external media playback device includes an indication of current playing time of the current media, and a user interface object for providing a remaining time of playing media is updated to show the current playback state based on the indication of current playing time.

In some embodiment, the user interface for controlling the media playback at the external media playback device includes an identifier associated with the external media playback device (e.g., a name, label, symbol that is representative of the external media playback device (e.g., "speaker") and/or the location of the external media device (e.g., "Kitchen")).

In some embodiments, the predetermined media item corresponds to a media item (e.g., audio and/or visual media) playing on the computer system (e.g., a smartphone, a smartwatch) and includes an indication (e.g., an image) representative of the media item. In some embodiments, for each media item of the predetermined media item, display an indication of a source (e.g., an image) (e.g., a source device (e.g., personal device, third-party application, media provider, etc.) and/or source application).

Note that details of the processes described above with respect to method 1600 (e.g., FIG. 16) are also applicable in an analogous manner to the methods described above. For example, method 800 optionally includes one or more of the characteristics of the various methods described above with reference to method 1600. For example, operation 806 of method 800 can be performed to select the first media information affordance described in operation 1608 of method 1600, and operations 808, 810, and/or 812 can be performed as part of method 1600 in response to the selection. For brevity, these details are not repeated below.

FIGS. 17A-17P illustrate exemplary user interfaces for managing controls for controlling audio playback on a group of devices in accordance with some embodiments. In some embodiments, the user interfaces described below with reference to FIGS. 17A-17P allow electronic device 600 to create a new group of devices and provide user interface elements for controlling the playback of media on the new group of devices. The user interfaces in these figures are used to illustrate the processes described below, including the processes shown in FIGS. 18 and 23.

FIG. 17A illustrates device 600 displaying user interface 1700. User interface 1700 is a user interface of a music application running on device 600. User interface 1700 includes media output control affordance 1702 and graphical element 1704a. Graphical element 1704a indicates that media corresponding to media representation 1706 (e.g., "TRACK 1" by "ARTIST 1") is currently being played back on device 600 (e.g., "PHONE") and/or via one or more speakers that are physically connected to device 600. In some embodiments, user interface 1700 is displayed with one or more components or using one or more techniques as described above (e.g., in FIGS. 6F and 6I). For example, in some embodiments, device 600 displays graphical element 1704a using one or more techniques, as discussed above in relation to graphical element 614-2. At FIG. 17A, device 600 detects tap gesture 1750a on (e.g., or detects a gesture at a location that corresponds to a selection of) media output control affordance 1702. As illustrated in FIG. 17B, in response to detecting tap gesture 1750a, device 600 displays media output control overlay 1710 over a portion of user interface 1700. In some embodiments, in response to detecting tap gesture 1750a, device 600 ceases to display user interface 1700. In some embodiments, in response to detecting tap gesture 1750a, media output control overlay 1710 takes up the majority of the display of device 600.

As illustrated in FIG. 17B, media output control overlay 1710 includes phone output affordance 1712 that is displayed with selection indicator 1712a (e.g., the checkmark in FIG. 17B). Phone output affordance 1712 is displayed with selection indicator 1712a to indicate that media is currently configured to be played back (and/or controlled) via device 600. In FIG. 17B, the indication that media is currently configured to be played back via device 600 is also indicated by graphical element 1704a (e.g., as described above in relation to FIG. 17A). In some embodiments, when a device is currently configured to play back media, the device is currently outputting the media.

Media output control overlay 1710 also optionally includes additional affordances for controlling the output of media on one or more external devices, such as headphone output affordance 1714, kitchen output affordance 1716, dining room output affordance 1718, and living room output affordance 1720. As shown in FIG. 17B, these additional output affordances for controlling the output of media are not displayed with any selection indicators because media is not currently configured to be played back via the respective devices that correspond to each of these additional affordances. Here, the external devices that correspond to each of these additional affordances have been previously discussed. For example, when kitchen output affordance 1716 is displayed with a selection indicator, media is configured to be played back or controlled via kitchen speaker 1206; when dining room output affordance 1718 is displayed with a selection indicator, media is configured to be played back or controlled via dining room speaker 1216; and when living room output affordance 1720 is displayed with a selection indicator, media is configured to be played back or controlled via living room television 1244. In some embodiments, an output affordance can correspond to multiple external devices. For example, in some embodiments, when living room output affordance 1720 is displayed with a selection indicator, media is configured to be played back or controlled via living room television 1244, living room speaker 1246, and living room speaker 1248.

In some embodiments, one or more other affordances for controlling the output of media are included in media output control overlay 1710, such as an affordance for controlling the output of media via the speaker (e.g., bedroom speaker 1236) in bedroom 1202c and/or the speakers (e.g., sunroom speaker 1256 and sunroom speaker 1258) in sunroom 1202e. In some embodiments, device 600 ceases to display user interface 1710 in response to detecting another tap gesture on media output control affordance 1702 (e.g., displays user interface 1700 as shown in FIG. 17A). At FIG. 17B, device 600 detects tap gesture 1750b on a portion of kitchen output affordance 1716.

At FIG. 17C, in response to detecting tap gesture 1750b, device 600 sends an instruction to kitchen speaker 1206 to initiate playback of media (e.g., media corresponding to media representation 1706 in FIG. 17A). In some embodiments, sending an instruction to a device to initiate playback of media is a part of configuring media to be played back or controlled via the device.

As illustrated in FIG. 17C, device 600 also updates kitchen output affordance 1716 to include selection indicator 1716a in response to detecting tap gesture 1750b. Here, selection indicator 1716a indicates that kitchen speaker 1206 is currently configured to playback the media (e.g., media corresponds to media representation 1706 in FIG. 17A) and/or control the media. In addition, because kitchen speaker 1206 is currently configured to playback the media and/or control the media, device 600 replaces graphical element 1704a (e.g., a graphical that indicated that the phone was configured to playback media) with graphical element 1704b (e.g., "KITCHEN") to indicate that media is currently configured to be playback or controlled via a device (e.g., kitchen speaker 1206) associated with kitchen 1202a. Moreover, at FIG. 17C, device 600 ceases to display graphical element 1704a because device 600 is no longer outputting (or configured to output) media via one or more speakers physically connected to device 600. At FIG. 17C, device 600 detects tap gesture 1750c on a portion of dining room output affordance 1718 while selection indicator 1716a (e.g., of kitchen output affordance 1716) is displayed.

At FIG. 17D, in response to detecting tap gesture 1750c, device 600 sends an instruction to dining room speaker 1216 to initiate playback of media (e.g., media corresponding to media representation 1706 in FIG. 17A), such that dining room speaker 1216 is configured to playback the media after receiving the instruction. As illustrated in FIG. 17C, device 600 also updates dining room output affordance 1718 to include selection indicator 1718a in response to detecting tap gesture 1750c. Here, selection indicator 1718a indicates that dining room speaker 1216 is currently configured to playback the media and/or control the media. In addition to dining room output affordance 1718 including selection indicator 1718*a*, kitchen output affordance 1716 continues to include selection indicator 1716*a*. Thus, in response to detecting tap gesture 1750*d*, device 600 creates a temporary group from the kitchen speaker and the dining room speaker and replaces graphical element 1704*b* (e.g., "KITCHEN") with graphical element 1704*c* (e.g., "KITCHEN & DINING ROOM"). Graphical element 1704*c* indicates that media is currently configured to be played back or controlled by one or more devices associated with kitchen 1202*a* and one or more devices associated with living room 1202, creating a temporary grouping of the devices.

Looking back at FIGS. 17B-17C, kitchen speaker 1206 was configured to playback media while device 600 ceased being configured to playback media (e.g., in response to detecting tap gesture 1750*b*). However, in FIGS. 17C-17D, both kitchen speaker 1206 and living room speaker 1216 are configured to playback media (e.g., in response to detecting tap gesture 1750*c*). Thus, in this example, device 600 allows media to be played back (or controlled by) on multiple devices simultaneously (e.g., via one or more inputs on media out control overlay 1710), creating temporary groupings of devices such as a first group of devices that are assigned to a room of house 1202 and a second group of devices that are assigned to a different room of house 1202. Temporary groups are user-created groups of devices that, when selected to receive media, can playback the same media simultaneously without a user or device having to choose to send media to each of the devices individually. In some embodiments, in response to detecting a tap gesture on phone output affordance 1712 at FIG. 17D, device 600 ceases to display selection indicators 1716*a* and 1718*a*, displays selection indicator 1712*a* (e.g., as shown in FIG. 17B), and outputs the media while the kitchen and dining room speakers cease being configured to playback the media. At FIG. 17D, device 600 detects tap gesture 1750*d* on a portion of kitchen output affordance 1716 within a predetermined period of time (e.g., 5 seconds, 10 seconds, 30 seconds) after selection indicators 1716*a* and 1718*a* are concurrently displayed.

At FIG. 17E, in response to detecting tap gesture 1750*d*, device 600 sends an instruction to kitchen room speaker 1206 to stop playback of media, such that kitchen room speaker 1206 is not configured to playback the media after receiving the instruction. As illustrated in FIG. 17E, in response to detecting tap gesture 1750*d*, device 600 ceases to display selection indicator 1716*a*. In response to detecting tap gesture 1750*d*, device 600 also replaces graphical element 1704*c* (e.g., "KITCHEN & DINING ROOM") with graphical element 1704*d* (e.g., "DINING ROOM") to indicate that dining room speaker 1216 is configured to playback media and kitchen speaker 1206 is no longer configured to playback media.

FIGS. 17F-17H illustrate a scenario where a tap gesture is not detected within the predetermined period of time after two (or more) selection indicators are concurrently displayed (and/or after two temporary groupings (or more) of devices are simultaneously configured to playback media). At FIG. 17E, device 600 detects tap gesture 1750*e* on a portion of kitchen output affordance 1716.

At FIG. 17F, in response to detecting tap gesture 1750*e*, device 600 performs one or more similar techniques to those described above (e.g., in relation to FIG. 17D). Thus, as illustrated in FIG. 17F, kitchen output affordance 1716 is displayed with selection indicator 1716*a*, and dining room output affordance 1718 is displayed with selection indicator 1718*a*. In addition, at FIG. 17F, kitchen speaker 1206 and dining room speaker 1216 are configured to playback media, which is indicated by graphical element 1704*c*.

At FIG. 17G, device 600 does not detect a tap gesture (e.g., on any portion of affordances 1712, 1714, 1716, 1718, 1720 in FIG. 17F) within the predetermined period of time (e.g., 5 seconds, 10 seconds, 30 seconds) after the selection indicators are concurrently displayed. As illustrated in FIG. 17G, device 600 displays an animation of kitchen output affordance 1716 and dining room output affordance 1718 coalescing and/or merging to form a single output affordance creating a temporary grouping between the devices in the kitchen and the dining room. Since device 600 did not detect the tap gesture before the predetermined period of time passed, the grouping persists When displaying the animation, device 600 ceases to display the border between kitchen output affordance 1716 and dining room output affordance 1718 and converges (or moves) kitchen output affordance 1716 and dining room output affordance 1718 together. Moreover, device 600 also merges the graphical icons (e.g., speaker icons in FIG. 17G) together.

As illustrated in FIG. 17H, device 600 displays kitchen-and-dining-room-output affordance 1722 that includes selection indicator 1722*a*. Kitchen-and-dining-room-output affordance 1722 is the result of kitchen output affordance 1716 and dining room output affordance 1718 coalescing via the animation described above in relation to FIG. 17G, creating a temporary group of devices from the kitchen and the dining room. As illustrated in FIG. 17H, kitchen-and-dining-room-output 1722 includes an identifier ("KITCHEN AND DINING ROOM") that is a combination of an identifier associated with kitchen output affordance 1716 ("KITCHEN" in FIG. 17F) and an identifier associated with dining room output affordance 1718 ("DINGING ROOM" in FIG. 17F). In addition, kitchen-and-dining-room-output affordance 1722 also includes the number of speakers ("2 SPEAKERS") that can be configured or de-configured to playback of the media in response to selection of a portion of kitchen-and-dining-room-output affordance 1722. In some embodiments, the number of speakers identifies the number of speaker devices (e.g., a number of speakers that are assigned to a different room). In some embodiments, the number of speakers identifies the total number of speakers in the coalesced speaker group. In some embodiments, device 600 does not display the coalescing animation in FIG. 17G and displays kitchen-and-dining-room-output affordance 1722 replacing kitchen output affordance 1716 and dining room output affordance 1718 in a different way, such as without an animation. In some embodiments, device 600 displays kitchen-and-dining-room-output affordance 1722 that includes selection indicator 1722*a* immediately after detecting tap gesture 1750*e*. In some embodiments, device 600 displays kitchen-and-dining-room-output affordance 1722 that includes selection indicator 1722*a* immediately after detecting tap gesture 1750*e* and after exiting and re-displaying media output control overlay 1710. In other words, the media output control overlay 1710 does not have to be displayed after detecting tap gesture 1750*e* for at least two output affordances to be coalesced into a new output affordance. In some embodiments, device 600 receives confirmation (e.g., via one or more gestures) before or after coalescing at least two output affordances together. In some embodiment, in response to receiving a negative confirmation (e.g., to not coalesce), device 600 will continue to display (and/or re-display) the at least two output affordances as being separate. In some embodiment, in response to receiving a positive confirmation (e.g., to coalesce), the coalesced group remains displayed and/or is displayed.

As illustrated in FIG. 17H, kitchen-and-dining-room-output affordance 1722 also includes expansion affordance 1722b. In FIG. 17H, expansion affordance 1722b displayed on a different portion (e.g., left portion) of kitchen-and-dining-room-output affordance 1722 from the portion (e.g., tight portion) in which selection indicator 1722a is displayed. In addition, the expansion affordance is only displayed on the coalesced output affordance (e.g., output affordance 1722) and is not displayed on the non-coalesced output affordance (e.g., output affordance 1720).

As illustrated in FIG. 17H, kitchen speaker 1206 and dining room speaker 1216 remain configured to playback media, which is indicated by graphical element 1704c (e.g., "KITCHEN &. DINING ROOM"). In some embodiments, device 600 detects tap gesture 1750h1 on selection indicator 1722a (e.g., right portion of kitchen-and-dining-room-output affordance 1722). In some embodiments, in response to detecting tap gesture 1750h1, device 600 (1) ceases to display selection indicator 1722 and graphical element 1704c and (2) sends an instruction to kitchen speaker 1206 and dining room speaker 1216 to stop playback of media (e.g., media corresponding to media representation 1706 in FIG. 17A), such that kitchen speaker 1206 and dining room speaker 1216 are not configured to playback the media after receiving the instruction. In some embodiments, after (1) ceasing to display the selection indicator 1722a and graphical element 1704c and/or (2) sending the instruction to kitchen speaker 1206 and dining room speaker 1216, device 600 continues to display kitchen-and-dining-room-output affordance 1722 and does not re-display separate output affordances for the kitchen and living room. In some embodiments, device 600 continues to display kitchen-and-dining-room-output affordance 1722 irrespective of whether a gesture (e.g., on selection indicator 1722a) is detected for the predetermined period of time. In other words, kitchen-and-dining-room-output affordance 1722 continues to be displayed although kitchen speaker 1206 and dining room speaker 1216 are no longer configured to playback the media in some embodiments, device 600 sends an instruction to kitchen speaker 1206 and dining room speaker 1216 to playback media in response to receiving a tap gesture while selection indicator 1722a is not displayed. At FIG. 17H, device 600 detects tap gesture 1750h2 on a portion of living room output affordance 1720 while selection indicator 1722a is displayed.

As illustrated in FIG. 17I, in response to detecting tap gesture 1750h2, device 600 coalesces kitchen-and-dining-room-output affordance 1722 and living room output affordance 1720 to display kitchen-dining-living-room output affordance 1724 because no subsequent gesture (e.g., on a selection indicator) was detected within a predetermined period of time (e.g., using similar techniques as described above in relation to FIGS. 17G-17H). As illustrated in FIG. 17I, kitchen-dining-living-room output affordance 1724 includes an identifier ("Kitchen+2") that is a combination of the identifier ("KITCHEN") of kitchen output affordance 1716, dining room output affordance 1718 (e.g., 1 of the "2"), and living room output affordance 1720 (e.g., 1 of the "2"). In addition, kitchen-dining-living-room output affordance 1724 includes an indication of the number of devices that are configured to playback media when the affordance is selected (e.g., "3 SPEAKERS").

As shown in FIG. 17H, in response to detecting tap gesture 1750h2, device 600 also sends an instruction to television 1244, such that television 1244 is configured to playback the media. Thus, after sending the instruction to television 1244, a device assigned to kitchen 1202a, a device assigned to dining room 1202h, and a device assigned to living room 1202d are configured to playback media. This designation is reflected by graphical element 1704e being displayed (e. "KITCHEN+2") in FIG. 17I.

In some embodiments, device 600 displays kitchen-dining-living-room output affordance 1724 using one or more techniques as described above (e.g., in FIGS. 17G-17H). In some embodiments, device 600 detects tap gesture 1750i1 on selection indicator 1724b (e.g., right portion of kitchen-and-dining-room-output affordance 1724). In some embodiments, in response to detecting tap gesture 1750i1, device 600 (1) ceases to display selection indicator 1724b and graphical element 1704e and (2) sends an instruction to kitchen speaker 1206, dining room speaker 1216, television 1244 to stop playback of media (e.g., media corresponding to media representation 1706 in FIG. 17A), such that kitchen speaker 1206, dining room speaker 1216, television 1244 are not configured to playback the media after receiving the instruction. In sonic embodiments, device 600 uses similar techniques in response to detecting tap gesture 1750i1 or a gesture subsequent to tap gesture 1750i1 to the techniques described above (e.g., in relation to device 600 detecting tap gesture 1750h1 or a gesture subsequent to tap gesture 1750h1).

As illustrated in FIG. 17I, kitchen-dining-living-room output affordance 1724 also includes expansion affordance 1724b, which is displayed using similar techniques as to those described above (e.g., in relation to expansion affordance 1722b). At FIG. 17I, device 600 detects tap gesture 1724i2 on expansion affordance 1724b.

As illustrated in FIG. 17J, in response to detecting tap gesture 1724i2, device 600 expands kitchen-dining-living-room output affordance 1724 by displaying the individual output affordances that were coalesced to make kitchen-dining-living-room output affordance 1724. Thus, in FIG. 17J, kitchen output affordance 1716, dining room output affordance 1718, and living room output affordance 1720 are displayed while kitchen-dining-living-room output affordance 1724. In some embodiments, in FIG. 17J, kitchen-dining-living-room output affordance 1724 remains displayed when the individual output affordances that make up the kitchen-dining-living-room output affordance 1724 are displayed.

Notably, as illustrated in FIG. 17J, kitchen output affordance 1716, dining room output affordance 1718, and living room output affordance 1720 are respectfully displayed with selection indicators 1716a, 1718a, and 1720a. Thus, media is currently configured to be played back or controlled via kitchen speaker 1206, dining room speaker 1216, and television 1244, which is also represented by graphical element 1704e ("KITCHEN+2") continuing to be displayed. At FIG. 17J, device 600 detects tap gesture 1750j on selection indicator 1718a.

As illustrated in FIG. 17K, in response to detecting tap gesture 1750j in FIG. 17J, device 600 ceases to display selection indication 1718a and maintains display of the other selection indicators because they were not selected via the tap gesture. In addition, in response to detecting tap gesture 1750j, device 600 sends an instruction to dining room speaker 1216 to stop playback of media, such that dining room speaker 1216 is not configured to playback the media after receiving the instruction, which is also represented by graphical element 11704f (e.g., "KITCHEN & LIVING ROOM") being displayed.

At FIG. 17L, device 600 does not detect a tap gesture (e.g., on any portion of affordances 1712, 1714, 1716, 1718, 1720 in FIG. 17F) within a predetermined period of time (e.g., 5 seconds, 10 seconds, 30 seconds) after detecting tap gesture 1750*j*. As illustrated in FIG. 17L, device 600 coalesces kitchen output affordance 1716 and living room output affordance 1720 to display kitchen-and-living-room-output affordance 1726, using one or more similar techniques to those described above. Notably, as illustrated in FIG. 17L, dining room affordance 1718 is displayed separately from kitchen-and-living-room-output affordance 1726 because device 600 effectively removed dining room affordance 1718 (and/or dining room speaker 1216) from the coalesced group (e.g., kitchen-dining-living-room output affordance 1724) in response to detecting tap gesture 1750*j*.

FIG. 17M illustrates device 600 displaying user interface 1760, which is an alternative user interface that can be displayed in lieu of user interface 1700 and media output control overlay 1710. Device 600 displays user interface 1760 with one or more components and/or using one or more techniques as described above in relation to media output control overlay 1710. For example, in some embodiments, device 600 displays kitchen-dining-living-room output affordance 1726 in response to detecting tap gesture 1724*m*1 on a portion of dining room output affordance 1718, using similar techniques to those described above in relation to detecting tap gesture 1750*h*2. In some embodiments, user interface 1760 is displayed in response to detecting a tap gesture on music control 1332*c*, which is displayed on user interface 1320 (e.g., in FIG. 13A).

User interface 1760 also includes other components that are not displayed on user interface 1700 and media output control overlay 1710, such as affordance 1762. At FIG. 17M, device 600 detects a tap gesture 1750*m*2 on affordance 1762.

As illustrated in FIG. 17N, in response to detecting tap gesture 1750*m*2 in FIG. 17M, device 600 ceases to display user interface 1760 and displays user interface 1770. User interface 1770 includes multiple group affordances (e.g., 1772, 1776, and 1780) that show the status of the media (e.g., now playing user interface) that is playing on a group of devices. The group affordances on user interface 1770 have a one-to-one relationship with the currently configured output affordances (e.g., as shown in 17L). Thus, at 17N, phone group affordance 1772 is related to phone output affordance 1712, kitchen-and-living-room-group affordance 1776 is related to kitchen-and-living-room output affordance 1726, and dining room group affordance 1780 is related to dining room output affordance 1718. In some embodiments, the group of affordances on user interface 1770 are updated dynamically based on the output affordances that are configured and/or displayed on media output control overlay 1710 and/or user interface 1760. In some embodiments, device 600 detects tap gesture 1750*n* on kitchen-and-living-room output affordance 1726. In some embodiments, in response to detecting tap gesture 1750*n*, device 600 displays a user interface with media playback controls (e.g., one or more of a play, pause, record, shuffle, rewind, fast-forward, volume level affordance/control) that, when selected, cause kitchen speaker 1206 and television 1244 to modify a media playback operation (e.g., such as described above in relation to FIGS. 15C-15D). In some embodiments, one or more of phone group affordance 1772, kitchen-and-living-room-group affordance 1776, and dining room group affordance 1780 are displayed while the media playback controls are displayed.

Figure 17O:
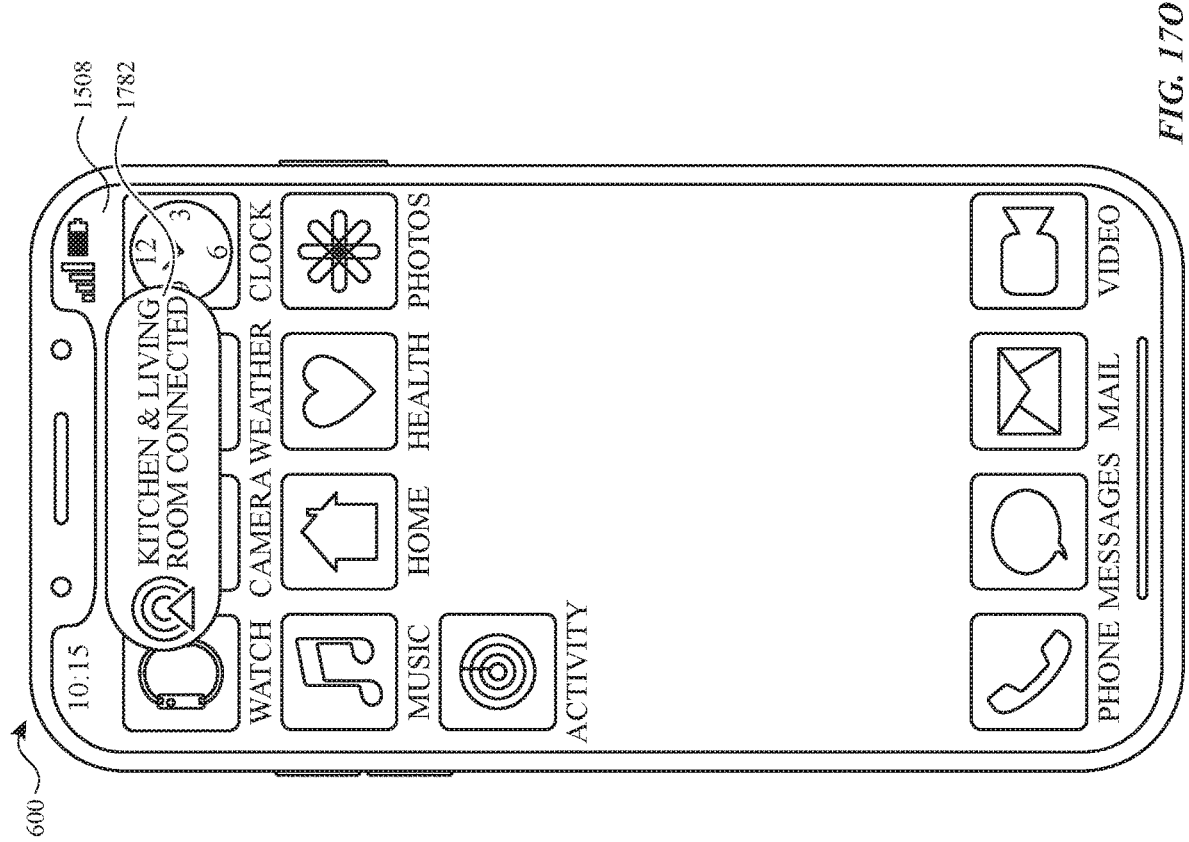
FIGS. 17A-17P illustrate exemplary user interfaces in accordance with some embodiments.
Figure 17P:
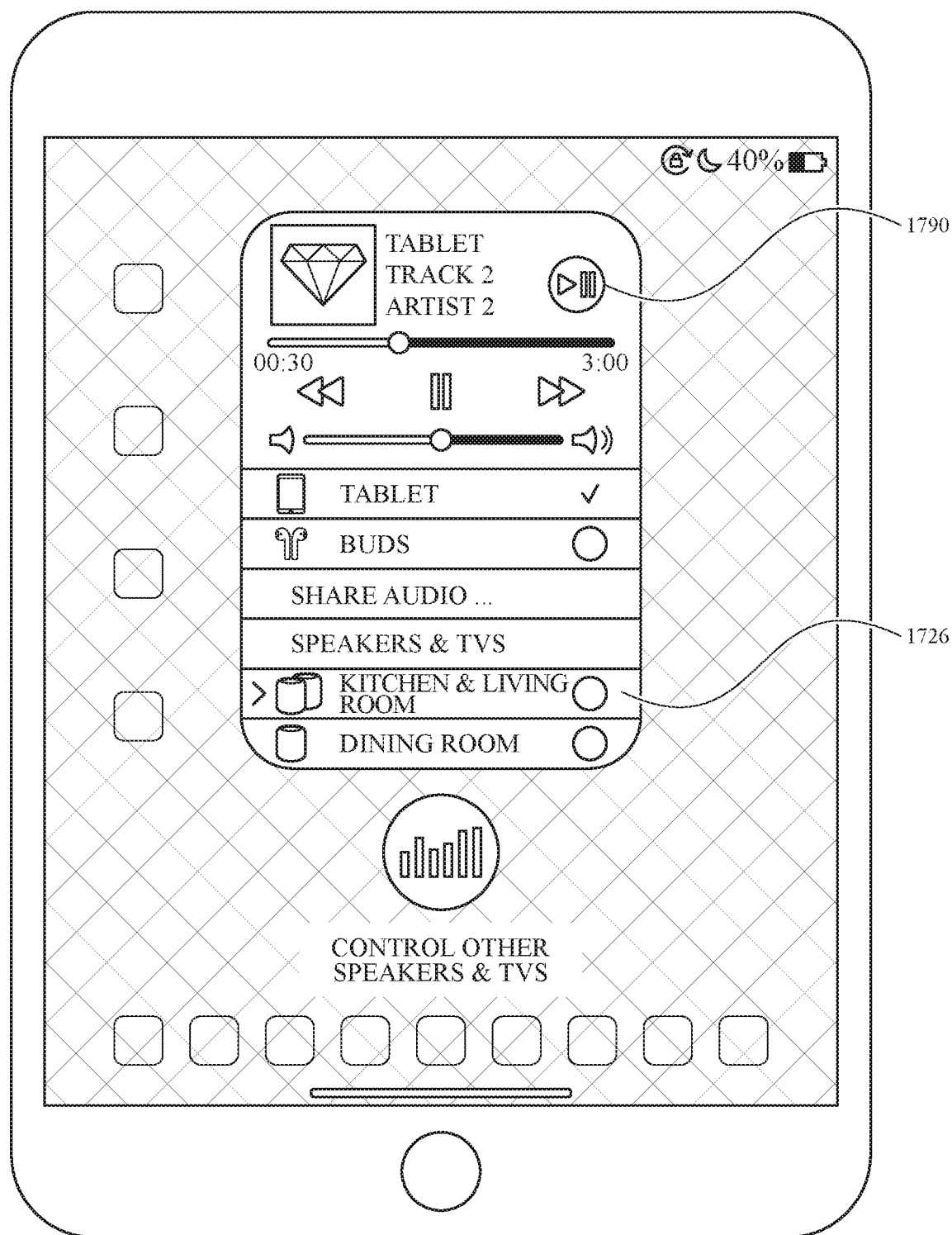
Figure 18:
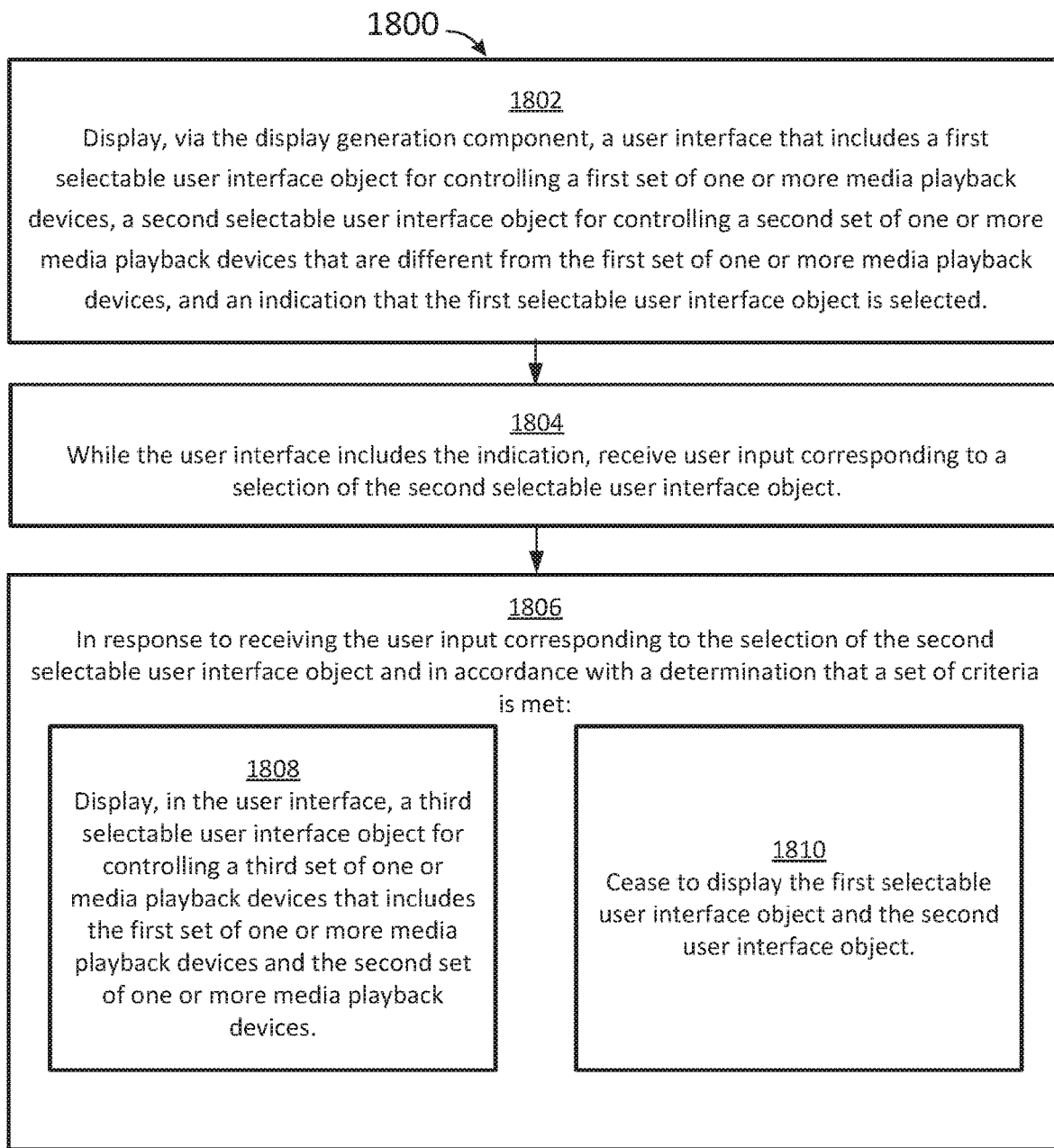
FIG. 18 illustrates an exemplary method in accordance with some embodiments.

FIG. 17O illustrates device 600 displaying user interface 1508. As illustrated in FIG. 17O, user interface 1780 includes notification 1782, which indicates that devices associated with the kitchen 1202*a* and living room 1202*d* are connected (or are available to playback media). Thus, FIG. 17O demonstrates that notifications can be received at an electronic device with an indication of a coalesced grouping (e.g., newly created group) such as the grouping that corresponds to kitchen-and-living-room output affordance 1726.

FIG. 17P illustrates tablet device 1700 (e.g., tablet device 1700 includes one or more features of devices 100, 300, 500, and 600) displaying user interface 1790. Here, the tablet device is different from device 600, as depicted in FIG. 17P. As illustrated in FIG. 17P, user interface 1790 is similar to user interface 1760 and is displayed using one or more similar techniques to those described above in relation to user interface 1760. Moreover, user interface 1790 indicates that the tablet device is playing media (e.g., "TRACK 2" by "ARTIST 2") from the media that device 600 is playing (e.g., "TRACK 1" by "ARTIST 1" in FIG. 17A).

Notably, at FIG. 17P, user interface 1790 includes kitchen-and-living-room output affordance 1726, which was created via device 600 (e.g., as described in FIGS. 17I-17L). Thus, FIG. 17P demonstrates that a newly created output affordance can be available to other devices. In some embodiments, whether the newly created output affordance is available to other devices is based one or more privacy settings. In some embodiments, the newly created output affordance is available to anyone (e.g., based on the state of the one or more privacy settings). In some embodiments, the newly created output affordance is only available to device's that are connected to the same network (e.g., or one of a group of networks) as the devices that associated with home 1202 (e.g., based on the state of the one or more privacy settings). In some embodiments, the newly created output affordance is available to only devices that are designated (e.g., by a user account) to be associated with home 1202 (e.g., based on the state of the one or more privacy settings). In some embodiments, the newly created output affordance is only available to devices that are registered to the same account (or group of accounts) to which device 600 is also registered, such as an account associated with home 1202 in FIG. 12 (e.g., based on the state of the one or more privacy settings). In some embodiments, a newly created output affordance is only available to devices that are within a certain proximity of device 600 (e.g., based on the state of the one or more privacy settings).

FIG. 18 is a flow diagram illustrating methods for managing controls for controlling audio playback on a group of devices using an electronic device. Method 1800 is perform at a computer system (e.g., 100, 300, 500, or 600) (e.g., a smartphone, a smartwatch) that is in communication with a display generation component (e.g., 602) (e.g., a display controller, a touch-sensitive display system) and one or more input devices (e.g., a touch-sensitive surface).

As described below, method 1800 provides an intuitive way for managing controls for controlling audio playback on a group of devices. The method reduces the cognitive burden on a user for managing controls for controlling audio playback on a group of devices, thereby creating a more efficient human-machine interface. For battery-operated computing devices, enabling a user to control audio playback faster and more efficiently conserves power and increases the time between battery charges.

The computer system displays (1802), via the display generation component, a user interface (e.g., 1710, 1760, 1790) that includes a first selectable user interface object (e.g., 1716, 1718, 1720) (e.g., an affordance, such as an affordance for selecting a playback device that is located in a kitchen) for controlling a first set of one or more media playback devices (e.g., the computer system, an external playback device (e.g., speaker, television, smart home appliance)). In some embodiments, the computer system is connected to the external playback device. In some embodiments, the first selectable user interface object corresponds to (e.g., displayed with (e.g., currently displayed with), displayed adjacent to (e.g., next to) or includes an indication (e.g., a symbol (e.g., a checkmark), a color, a pressed or depressed state of selection of the second selectable user interface object) that the second set of one or more media playback devices are playing back media. In some embodiments, the first selectable user interface object includes an indication (e.g., a label (e.g., a unique series of alphanumeric characters that are displayed for each of the plurality of selectable user interface objects for controlling media devices)) that is representative of the first set of one or more media playback devices. In some embodiments, the computer system receives (e.g., detects) user input corresponding to selection of the first selectable user interface object and, in response to receiving the user input corresponding to selection of the first selectable user interface object, the computer system sends instructions to the first set of one or more media playback devices that cause the first set of one or more media playback devices to control playback (e.g., output, not output) of media) and/or the computer system is configured to initiate playback on the first set of one or more media playback devices.

The user interface includes a second selectable user interface object (e.g., 1716, 1718, 1720, 1722) (e.g., an affordance, such as an affordance for selecting a playback device that is located in a dining room) for controlling a second set of one or more media playback devices that are different from the first set of one or more media playback devices. In some embodiments, the second selectable user interface object does not correspond to (e.g., is not displayed with (e.g., currently displayed with), displayed adjacent to (e.g., next to) or include an indication (e.g., a symbol (e.g., a checkmark), a color, a pressed or depressed state of selection of the second selectable user interface object) that the second set of one or more media playback devices are playing back media. In some embodiments, the second selectable user interface object includes an indication (e.g., a label (e.g., a unique series of alphanumeric characters that are displayed for each of the plurality of selectable user interface objects for controlling playback of media devices)) that is representative of the second set of one or more media playback devices. In some embodiments, the second selectable user interface object is different from the first selectable user interface object. In some embodiments, the computer system receives (e.g., detects) user input corresponding to selection of the second selectable user interface object and, in response to receiving the user input corresponding to selection of the second selectable user interface object, the computer system sends instructions to the second set of one or more media playback devices that cause the second set of one or more media playback devices to control playback (e.g., playback, not playback) of media) and/or the computer system is configured to initiate playback on the first set of one or more media playback devices.

The user interface includes an indication (e.g., 1716a, 1718a, 1720a, 1722a) that the first selectable user interface object is selected (e.g., a symbol (e.g., a checkmark), a color, a pressed or depressed state of selection of the first selectable user interface object). In some embodiments, the indication is displayed with (e.g., concurrently displayed), displayed adjacent to (e.g., next to) or on, or is included in, the first selectable user interface object. In some embodiments, the indication that the first selectable user interface is selected is an indication that the first set of one or more playback devices are playing back media (or configured to playback media (e.g., via the computer system)). In some embodiments, the first selectable user interface object corresponds to (e.g., displayed with (e.g., currently displayed with), displayed adjacent to (e.g., next to) or includes an indication (e.g., a symbol (e.g., a checkmark), a color, a pressed or depressed state of selection of the second selectable user interface object) that the second set of one or more media playback devices are playing back media. In some embodiments, the computer system receives (e.g., detects) user input corresponding to selection of the first selectable user interface object and, in response to receiving the user input corresponding to selection of the first selectable user interface object, the computer system sends instructions to the first set of one or more media playback devices that cause the first set of one or more media playback devices to control playback (e.g., output, not output) of media) and/or the computer system is configured to initiate playback on the first set of one or more media playback devices.

While the user interface includes the indication (and, in some embodiments, while the user interface does not include an indication that the second set of one or more media playback devices are playing back media), the computer system receives (1804) user input (e.g., 1750e) corresponding to a selection of the second selectable user interface object.

In response to (1806) receiving the user input (e.g., 1750e) corresponding to the selection of the second selectable user interface object and in accordance with a determination that a set of criteria is met (e.g., a criterion that includes the first selectable user interface object and the second selectable user interface object have both been selected (or an indication that the first selectable user interface object is displayed and an indication that the second selectable user interface object is displayed), a criterion that includes the first selectable user interface object and the second selectable user interface object have both been selected (or an indication that the first selectable user interface object is displayed and an indication that the second selectable user interface object is displayed) for a predetermined period of time (e.g., 5, 10, 30, 60 seconds)), the computer system displays (1808), in the user interface, a third selectable user interface object (e.g., 1722) for controlling a third set of one or media playback devices that includes the first set of one or more media playback devices and the second set of one or more media playback devices. In some embodiments, in response to receiving the user input corresponding to first selection of the second selectable user interface object, the computer system sends instructions to the second set of one or more media playback devices that cause the second set of one or more media playback devices to control playback (e.g., playback, not playback) of media). In some embodiments, in response to receiving the user input corresponding to first selection of the second selectable user interface object, the computer system is configured to initiate playback on the second set of one or more media playback devices. In some embodiments, in response to receiving the user input corresponding to first selection of the second selectable user interface object, the computer system displays with the indication (e.g., a symbol (e.g., a checkmark) corresponding to (e.g., that is displayed adjacent to (e.g., next to) or on) the second selectable user interface object, a color, a pressed or depressed state of selection) that the second set of one or more media playback devices are playing back media. In some embodiments, the first selectable user interface object corresponds to (e.g., displayed with (e.g., currently displayed with), displayed adjacent to (e.g., next to) or includes an indication (e.g., a symbol (e.g., a checkmark), a color, a pressed or depressed state of selection of the second selectable user interface object) that the first set of one or more devices and the second set of one or more media playback devices are playing back media. In some embodiments, the third selectable user interface object includes an indication (e.g., a label (e.g., a unique series of alphanumeric characters that are displayed for each of the plurality of selectable user interface objects for controlling playback of media devices)) that is representative of the first set of one or more media playback devices and second one or more playback devices. In some embodiments, the third selectable user interface object includes one or more portions of a label from the first selectable user interface object and one or more portions from a label on the second selectable user interface object.

In response to (1806) receiving the user input (e.g., 1750*e*) corresponding to the selection of the second selectable user interface object and in accordance with a determination that a set of criteria is met (e.g., a criterion that includes the first selectable user interface object and the second selectable user interface object have both been selected (or an indication that the first selectable user interface object is displayed and an indication that the second selectable user interface object is displayed), a criterion that includes the first selectable user interface object and the second selectable user interface object have both been selected (or an indication that the first selectable user interface object is displayed and an indication that the second selectable user interface object is displayed) for a predetermined period of time (e.g., 5, 10, 30, 60 seconds)), the computer system ceases (1810) to display the first selectable user interface object (e.g., 1716) and the second user interface object (e.g., 1718) (and the indication that the first selectable user interface object is selected). In some embodiments, a determination is made that the first set of one or more media playback devices are playing back media when the first selectable user interface object is displayed with an indication that the first set of one or more media playback devices are playing back media (e.g., a symbol (e.g., a checkmark), a color, a pressed or depressed state of selection). In some embodiments, a determination is made that the first set of one or more media playback devices are playback media when the computer system is transmitting media to the first set of one or more media playback devices. In some embodiments, the computer system displays the third selectable user interface object for controlling the first set of one or more media playback devices and the second set of one or more media playback devices and ceases to display the first selectable user interface object and the second user interface object immediately (e.g., irrespective of respective criteria being met) in response to receiving the user input corresponding to the first selection of the second selectable user interface object. In some embodiments, the computer system displays the third selectable user interface object for controlling the first set of one or more media playback devices and the second set of one or more media playback devices and ceases to display the first selectable user interface object and the second user interface object only after or in accordance with a determination that a respective set of criteria are met. In some embodiments, the respective criteria includes a criterion that is met after receiving the user input corresponding to the first selection of the second selectable user interface object and/or while the first selectable user interface object includes the indication that the first set of one or more media playback devices are playing back media (and the second selectable user interface object includes the indication that the first set of one or more media playback devices are playing back media). In some embodiments, in accordance with a determination that the respective set of criteria are met, the computer system maintains display of a selectable user interface object that was previously displayed, where the selectable user interface object is not the first selectable user interface object, the second selectable user interface object, or the third selectable user interface object. In some embodiments, in accordance with a determination that the respective set of criteria are not met, the computer system forgoes display of the third selectable user interface object for controlling playback of the first set of one or more media playback devices and the second set of one or more media playback devices. In some embodiments, in accordance with a determination that a respective set of criteria are not met, the computer system maintains display of the first user interface object and the second user interface object. Displaying a third selectable user interface object for controlling a group of devices that was controlled via a first selectable user interface object and a second selectable user interface object, while ceasing to display those objects, provides the user with an option to control multiple sets of devices with a single control. Providing additional control of the computer system without cluttering the VI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the third selectable user interface object, the computer system receives a first user input (e.g., 1750*h*1) (e.g., a tap input on a portion of the third selectable user interface object) corresponding to a selection (e.g., a selection on a portion of the third selectable user interface object that corresponds to a location that is associated with (e.g., the location whether the third selectable user interface object is displayed or will be displayed in response to receiving the first input)) of the third selectable user interface object (e.g., 1722*a*). In some embodiments, in response to receiving the first user input corresponding to the selection of the third selectable user interface object and in accordance with (e.g., in accordance with a determination that) the user interface including (e.g., at the time the user input correspond to the selection of the third selectable user interface object is received) an indication (e.g., a single indication) that the third selectable user interface object e.g., 1722) is selected (e.g., the first set of one or more media playback devices and the second media playback devices are playing back media), the computer system ceases to display, in the user interface, the indication (e.g., 1722*a*) (e.g., a symbol (e.g., a checkmark), a color, a pressed or depressed state of selection of the third selectable user interface object) that the third selectable user interface object is selected. In some embodiments, in response to receiving the user input corresponding to the first selection of the third selectable user interface object (and, in some embodiments, in accordance with the determination that the third selectable user interface object includes the indication that the first set of one or more media playback devices and the second set of one or more media playback devices are playing back media), the computer system is not configured to initiate playback on the first set of one or more media playback devices and the second set of one or more media playback devices. In some embodiments, in response to receiving the first user input corresponding to the selection of the third selectable user interface object and in accordance with (e.g., in accordance with a determination that) the user interface not including the indication (e.g., a single indication) that the third selectable user interface (e.g., 1722) object is selected, the computer system displays, in the user interface, the indication (e.g., 1722*a*) that the third selectable user interface object is selected. In some embodiments, in response to receiving the user input corresponding to the first selection of the third selectable user interface object (and in accordance with the determination that the third selectable user interface object does not include the indication that the first set of one or more media playback devices and the second set of one or more media playback devices are playing back media), the computer system is configured to initiate playback on the first set of one or more media playback devices and the second set of one or more media playback devices. Updating an indication that the third selectable user interface object for controlling a group of devices is selected based on the existing selection state of the third selectable user interface object provides the user with feedback as to the updated selection state of the object. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first selectable user interface object (e.g., 1716) includes an identifier (e.g., a name or symbol) associated with the first set of one or more media playback devices. In some embodiments, the second selectable user interface object (e.g., 1718) includes an identifier (e.g., a name or symbol) associated with the second set of one or more media playback device. In some embodiments, the identifier of the first selectable user interface object is different the identifier that is associated with the second selectable user interface object. In some embodiments, as a part of displaying the third selectable user interface object (e.g., 1722), the computer system displays an identifier associated with the third set of one or more media playback devices. In some embodiments, the identifier includes a portion that is representative (e.g., a portion of the symbol, name, text, or a number) of the identifier associated with the first set of one or more media playback devices and a portion that is representative (e.g., a portion of the symbol, name, text, or a number) of the identifier associated with the second set of one or more media playback device. Displaying a third selectable user interface object with an identifier that is based on the identifier of the first selectable user interface object and the second selectable user interface objects provides visual feedback to the user indicating the operation that is associated with the third selectable object. Providing improved visual feedback to the user enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the computer system more quickly and efficiently.

In some embodiments, the computer system, while displaying the third selectable user interface object, receives a second user input (e.g., 1750*i*2) (e.g., a tap input on a portion of the third selectable user interface object) corresponding to a selection (e.g., a selection on a portion of the third selectable user interface object that does not correspond to a location that is associated with (e.g., the location whether the third selectable user interface object is displayed or will be displayed in response to receiving the first input)) of the third selectable user interface object (e.g., 1724). In some embodiments, in response to receiving the second user input corresponding to the selection of the third selectable user interface object, the computer system displays the first selectable user interface object (e.g., 1716 (e.g., in FIG. 17K)) for controlling the first set of one or more media playback devices and the indication that the first selectable user interface object is selected. In some embodiments, in response to receiving the second user input corresponding to the selection of the third selectable user interface object, the computer system displays the second selectable user interface object (e.g., 1718 (e.g., in FIG. 17K)) for controlling the second set of one or more media playback devices and an indication that the second selectable user interface object is selected. In some embodiments, in response to receiving the second user input corresponding to the selection of the third selectable user interface object, ceasing to display the third selectable user interface object and maintaining display of a representation of the group of the external devices are controls (e.g., a representation associated with the third set of one or more media playback devices, where the representation includes a portion that is representative of the identifier associated with the first set of one or more media playback devices and a portion that is representative of the identifier associated with the second set of one or more media playback device). Displaying a first selectable user interface object and the second selectable user interface when the third selectable user interface object is selected provides the user with control over the group of selectable user interface objects that correspond to the third selectable user interface object. Providing additional control of the computer system without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the first selectable user interface object for controlling the first set of one or more media playback devices and the indication that the first selectable user interface object is selected and displaying the second selectable user interface object for controlling the second set of one or more media playback devices and the indication that the second selectable user interface object is selected, the computer system receives one or more user inputs corresponding to one or more selections of the first selectable user interface object. In some embodiments, in response to receiving the one or more user inputs (e.g., 1750*k*) (e.g., while displaying the second selectable user interface object for controlling the second set of one or more media playback devices and the indication that the second selectable user interface object is selected) and in accordance with a determination that the last (e.g., 1750*k*) of the one or more selections of the first selectable user interface object caused the computer system to cease to display the indication that the first selectable user interface object is selected, the computer system continues to display the first selectable user interface object (e.g., 1716) and the second selectable user interface object (e.g., 1720) without displaying the third selectable user interface object. In some embodiments, in response to receiving the one or more user inputs (e.g., 1750k) (e.g., while displaying the second selectable user interface object for controlling the second set of one or more media playback devices and the indication that the second selectable user interface object is selected) and in accordance with a determination that the last of the one or more selections of the first selectable user interface object caused the computer system to display of the indication that the first selectable user interface object is selected, displaying the third selectable user interface object without displaying the first selectable user interface object and the second selectable user interface object. Continuing to display the first selectable user interface object and the second selectable user interface object without displaying the third selectable user interface object, in response to the one or more user inputs provides the user with feedback that the first set of external devices are no longer associated with the third user interface object. Providing improved visual feedback to the user enhances the operability of the device and makes the user-device interface more efficient (e.g., by helping the user to provide proper inputs and reducing user mistakes when operating/interacting, with the device) which, additionally, reduces power usage and improves battery life of the device by enabling the user to use the device more quickly and efficiently.

In some embodiments, the user interface includes a fourth selectable user interface object (e.g., 1720) for controlling a fourth set of one or more media playback devices (e.g., a set of one or more media playback devices that is different from the first set of one or more media playback devices and the second set of one or more media playback devices (and the third set of one or more media playback devices)). In some embodiments, while displaying the third selectable user interface object (e.g., 1722) (and/or, in some embodiments, displaying the first selectable user interface object for controlling the first set of one or more media playback devices and the indication that the first selectable user interface object is selected and displaying the second selectable user interface object for controlling the second set of one or more media playback devices and the indication that the second selectable user interface object is selected in response to receiving the second user input corresponding to the selection of the third selectable user interface object) and the fourth selectable user interface object (e.g., 1720), the computer system receives a user input (e.g., 1750h2) corresponding to selection of the fourth user interface object. In some embodiments, in response to receiving the user input corresponds to selection of the fourth user interface object, the computer system displays, in the user interface, a fifth selectable user interface object (e.g., 1724) for controlling the first set of one or more media playback devices, the second set of one or media playback devices, and the fourth set of one or more media playback devices. In some embodiments, in response to receiving the user input corresponds to selection of the fourth user interface object, the computer system ceases to display the third selectable user interface object (e.g., 1722) and the fourth selectable user interface object (e.g., 1724). In some embodiments, when a new speaker is added (e.g., selection of the fourth selectable user interface object), the computer system adds the new speaker as an audio source with the speakers of the third selectable user interface object, irrespective of whether the third selectable user interface object is displayed and has the indication that it is selected or whether the first and second user interface objects are displayed and have the indication that they are selected. Displaying a fifth selectable user interface object for controlling a group of devices that was controlled via a first selectable user interface object, a second selectable user interface object, and a fourth selectable object, while no longer separately displaying those objects, provides the user with control of the computer system without cluttering the user interface. Providing additional control of the computer system without cluttering the UI with additional displayed controls to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to receiving the user input corresponding to the selection of the second selectable user interface object, the computer system transmits, to a second computer system (e.g., a server, a personal device) different from the computer system, grouping information (e.g., 1726 in FIG. 17P) that indicates a grouping of the first selectable user interface object and the second selectable user interface object. In some embodiments, transmitting grouping information includes that indicates a grouping of the first selectable user interface object and the second selectable user interface objects includes transmitting information corresponding to the third selectable user interface object. In some embodiments, the third selectable user interface object is configured to be displayed via a third computer system that is different from the computer system (and the second computer system). In some embodiments, the transmitted information causes display of the third selectable user interface object at (on, via) the third computer system. In sonic embodiments, the third computer system is assigned to the same user account as the first computer system. In some embodiments, transmitting the grouping information causes the third system to receive information that indicates the grouping of the first selectable user interface object and the second selectable user interface object. Transmitting information that indicates that the third selectable user interface object is configured to be displayed via a second computer system that is different from the computer system provides the user with the ability to update another computer system with the information without having to manually affect the operation via additional inputs. Performing an optimized operation when a set of conditions has been met without requiring further user input enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, after displaying, in the user interface, the third selectable user interface object (e.g., 1722), the computer system receives data corresponding to an indication that the first set of one or more media playback devices (and/or the second set of one or more media playback devices) re connected to (e.g., automatically connected without user input before the connection took place) the computer system. In some embodiments, in response to receiving the data, the computer system displays a notification (e.g., 1782) (e.g., an automatic connection alert) that indicates that the first set of one or more media playback devices and the second set of one or more media playback devices are connected to the computer system. In some embodiments, the notification is a different color (e.g., blue) than another notification that has been previously displayed. Displaying a notification that devices which can be controlled by selection of the third selectable user interface object have connected (e.g., automatically connected) to the computer system provides visual feedback to the user indicating that the group of devices (e.g., dynamic group of devices) have been connected to the computer system. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the user interface (e.g., 1710), the computer system receives user input at a first location on the user interface (e.g., on a selectable user interface object for displaying a second user interface (e.g., media playback interface)). In some embodiments, in response to receiving the user input at the first location (e.g., location of 1702) on the user interface, the computer system displays, via the display generation component, a second user interface (e.g., 1700) (e.g., media playback interface) that includes a selectable user interface objects that, when selected via the one or more input devices, causes (and, in some embodiments, by transmitting a command directly or indirectly (e.g., via a server) to the external media playback device) one or more external media playback devices that are playing back media to modify a media playback operation (e.g., pause or stop the operation, transition from the currently playing media to different media, a fast-forward operation, a rewind operation, a volume increase or decrease operation, a repeat operation, a shuffle operation (e.g., on user interface 1700 in FIG. 17A)). Displaying a second user interface that includes options for modifying media playback operations of existing playback operations enables the user to transition from a user interface for controlling sets of media playback devices to a user interface for modifying playback operations without cluttering the initial user interface. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of criteria includes a criterion that is satisfied when an indication that the second selectable user interface object and the indication that the first selectable user interface object is selected for a predetermined period of time (e.g., 2, 3, 30 seconds) (e.g., the predetermined period of time is non zero and human perceivable). Displaying a third selectable user interface object for controlling a group of devices that was controlled via a first selectable user interface object and a second selectable user interface object after a period of time provides the user with the ability to reverse a selection of the first selectable user interface object, before the object is replaced by the third user interface object, thereby reducing the occurrence of unintentional inputs. Providing the option to reverse a selection makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the user interface and as a part of the third selectable user interface object (e.g., and ceasing to display the first selectable user interface object and the second selectable user interface object), the computer system, prior to displaying the third user interface object, (e.g., an animation that (e.g., merges, coalesces, combines), display of the first selectable user interface object and display of the second selectable user interface object to display the third selectable user interface object) (e.g., before displaying the third selectable user interface object) displays a single user interface object (e.g., combination of 1716 and 1718 in FIG. 17G) that includes a first portion (e.g., portion of 1716 shown in FIG. 17G) of the first selectable user interface object (e.g., without including a second portion of the first selectable user interface object) and a first portion (e.g., portion of 1718 shown of FIG. 17G) of the second selectable user interface object (e.g., without including a second portion of the second selectable user interface object). In some embodiments, while displaying the animation a portion of the first selectable user interface object and a portion of the third selectable user interface object appear to be join during an instance in time. In some embodiments, displaying the third selectable user interface object (e.g., in response to receiving the user input corresponding to the selection of the second selectable user interface object) includes transmitting information to the first set of one or more media playback devices and the second set of one or more media playback devices that causes the first set of one or more media playback devices and the second set of one or more media playback devices to display the animation of the display of selectable user interface objects (e.g., that a representative of at least two sets of media playback devices) (e.g., coalescing). Displaying an animation of the first selectable user interface object and the second selectable user interface coalescing to form the third selectable user interface object provides the user with feedback concerning the group of selectable user interface objects or controls that correspond to the third selectable user interface object. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, after receiving the user input corresponding to the selection of the second selectable user interface object, the computer system displays a selectable user interface object for confirming the third selectable user interface object. Updating the visual characteristics of the third selectable user interface object (when the user selects the first and the selectable user interface objects) to reflect a state change of the first selectable user interface object and displaying a user interface to confirm the grouping of the first and second selectable user interface objects provides the user with more control of the computer system by helping the user avoid unintentionally group the first and second selectable user interface objects, which allows the user to recognize that confirmation is required before the operation will be performed. Providing a confirmation user interface element makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

Note that details of the processes described above with respect to method 1800 (e.g., FIG. 18) are also applicable in an analogous manner to the methods described below. For example, method 800 optionally includes one or more of the characteristics of the various methods described above with reference to method 1800. For example, operation 806 of method 800 can be performed to select the first media information affordance that corresponds to a group of speakers described in operation 1808 of method 1800, and operations 808, 810, and/or 812 can be performed as part of method 1800 in response to the selection. For brevity, these details are not repeated below.

FIGS. 19A-19I illustrate exemplary user interfaces for sharing media in accordance with some embodiments. The user interfaces in these figures are used to illustrate the processes described below, including the processes shown in FIG. 20.

Figure 19A:
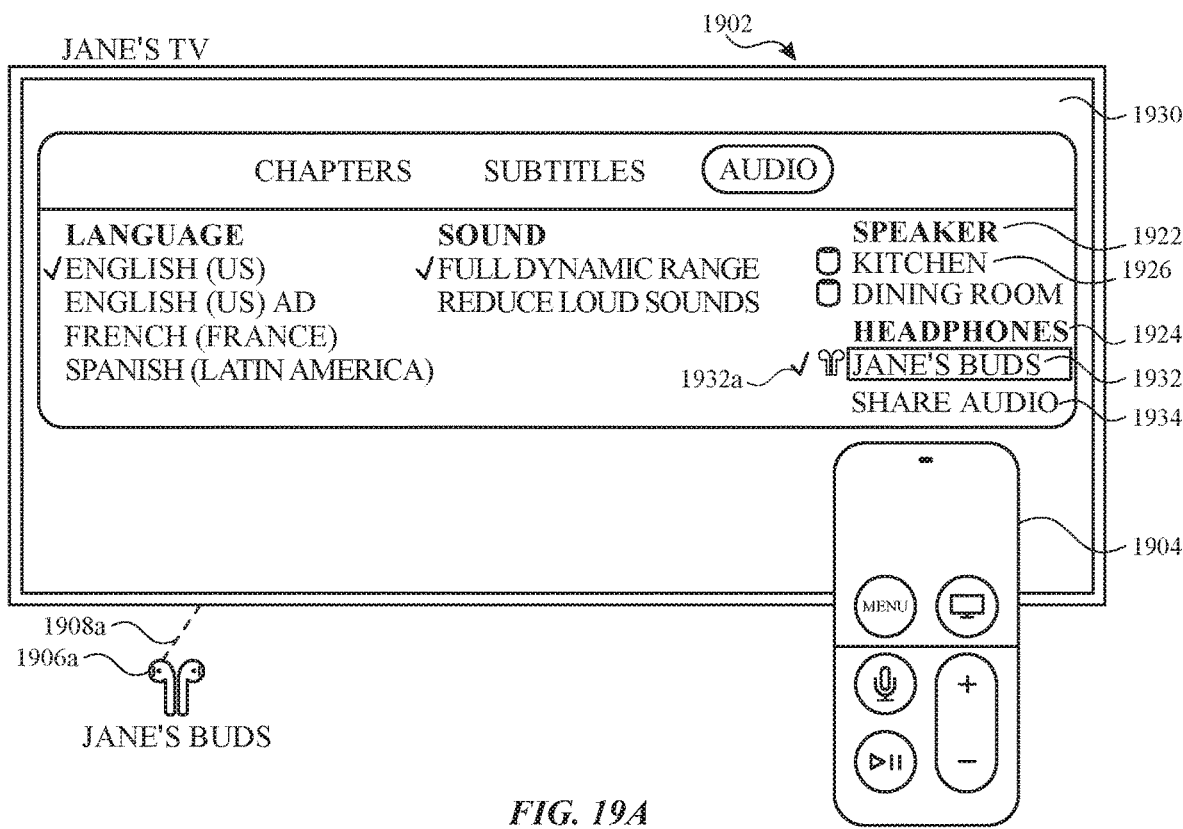
Figure 20:
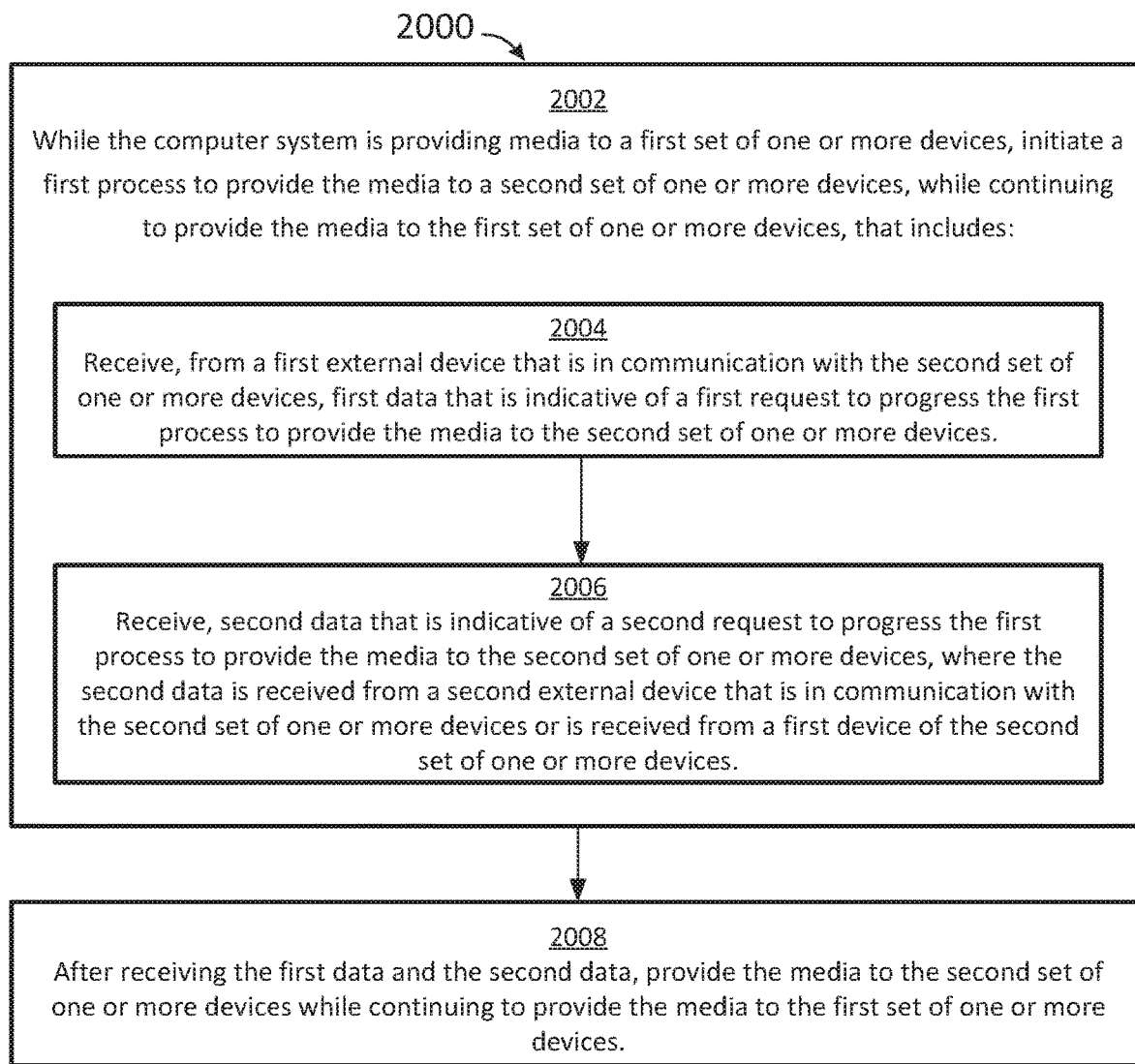
FIG. 20 illustrates an exemplary method in accordance with some embodiments.

FIG. 19A illustrates exemplary display screen 1902 (e.g., "Jane's TV"), buds 1906a (e.g., "Jane's buds), and remote 1904. In FIG. 19A, display screen 1902 is a multimedia device (e.g., a device that stores and/or generates multimedia content for output at the device or at another output device) that is linked to and configured to share media with buds 1906a, as shown by communication link 1908a. Remote 1904 is also linked to display screen 1902, such that gestures detected via remote 1904 are transmitted to display screen 1902 for processing. In some embodiments, a device (e.g., display screen, headphones, phone) that is linked to a second device is a device that is in operable communication with (e.g., via a wireless or wired medium) or connected to (e.g., via Bluetooth, near-field communication, a network connection) (e.g., paired to) the second device.

In some embodiments, display screen 1902, rather than being a multimedia device itself, is directly linked to a multimedia device that provides the multimedia content for output at display screen 1902. In some embodiments, display screen 1902 or a multimedia device linked to display screen 1902 includes one or more features of devices 100, 300, or 500. In some embodiments, the multimedia device is configured to share media with display screen 1902 and buds 1906a. In some embodiments, the multimedia device is also linked to remote 1904, such that gestures detected via remote 1904 are transmitted to the multimedia device for processing in the scenario where display screen 1902 is linked to the multimedia device. In some embodiments, the multimedia device (e.g., that is linked to display screen 1902) causes display screen 1902 to display one or more user interface elements in response to receiving one or more gestures (or an indication of one or more gestures that are transmitted from remote 1904). In some embodiments, the multimedia device shares media with buds 1906a, such that media (e.g., audio) is available for output by buds 1906a. Thus, the following description will often refer to the display screen 1902 performing actions, belonging to an entity (e.g., associated with an account), or being linked to one or more devices (e.g., headphones, phones) for simplicity. However, the following description contemplates and does not rule out the scenarios where there are one or more multimedia devices that are linked to display screen 1902 and the one or more devices. In these scenarios, the multimedia device(s) (and not the display screen) can belong to the entity and/or perform one or more actions (e.g., such as causing display of one or more user interfaces on display screen 1902, receiving one or more gestures, sharing media, and/or performing other logic described herein with relation to display screen 1902).

In FIG. 19A, display screen 1902 belongs to Jane (e.g., "Jane's TV"). In addition, buds 1906a are headphones that belong to Jane (e.g., is associated with a user account that includes an identifier or name that is (e.g., or includes the word) "Jane"). Thus, in some embodiments, a device belongs to an entity (e.g., a person, building, house) when the device is associated with (e.g., logged into) a user account that includes an identifier or name that is representative of the entity (e.g., "Jane").

As illustrated in FIG. 19A, display screen 1902 displays user interface 1930. User interface 1930 includes speaker group 1922 and headphones group 1924. Speaker group 1922 includes one or more speaker controls, where each speaker control is a control for sharing media from display screen 1902 to a particular speaker. Speaker controls include kitchen speaker control 1926. Kitchen speaker control 1926 is displayed because kitchen speaker 1206 (e.g., as discussed in relation to FIG. 12) is linked to or has been previously linked to display screen 1902. Headphones group 1924 include one or more controls for sharing media from display screen 1902 to headphones that are linked to or that have been previously linked to display screen 1902. Headphones group 1924 includes buds control 1932 ("Jane's Buds") that is displayed with sharing indication 1932a (e.g., the checkmark next to "Jane's Buds" on user interface 1930). Sharing indication 1932a indicates that buds 1906a are linked to and configured to receive media that is shared by display screen 1902. Notably, kitchen speaker control 1926 is not displayed with a sharing indication because kitchen speaker 1206 is not configured to receive media that is shared by display screen 1902. In addition to buds control 1932, share audio control 1934 is also positioned inside of headphones group 1924. In FIG. 19A, share audio control 1934 is displayed under buds control 1932. In some embodiments, share audio control 1934 is not displayed when less than a predetermined number (e.g., 1) of headphones (e.g., buds) are linked to and configured to receive media from display screen 1902. In some embodiments, share audio control 1934 is displayed, irrespective of the number of headphones that are linked to and configured to receive media from display screen 1902.

Figure 19B:
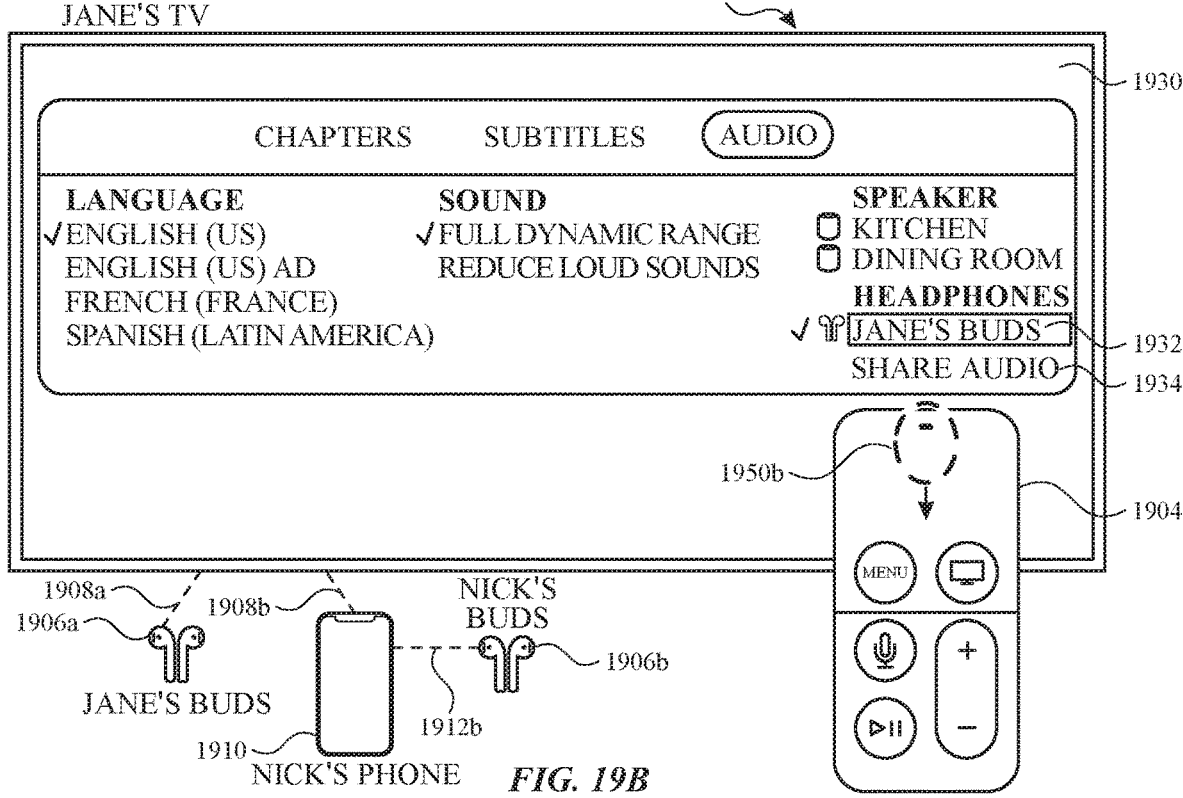

As illustrated in FIG. 19B, display screen 1902 is linked to device 1910 ("Nick's Phone"), as shown by communication link 1908b. Device 1910 is linked to buds 1906b (e.g., "Nicks buds"), as shown by communication link 1912b. In some embodiments, device 1910 includes one or more components and uses one or more techniques as described herein in relation to device 600.

At FIG. 19B, buds 1906a (e.g., "Jane's buds") and buds 1906b ("Nick's buds) are within a predetermined distance from display screen 1902, such that each of the buds could be configured to receive media from display screen 1902 if respective properties (e.g., configuration properties, location) of each of the buds satisfy a set of conditions. Thus, at FIG. 19B, the properties of buds 1906a currently satisfy the set of conditions (e.g., as shown by the checkmark next to buds control 1932 in FIG. 19B). Thus, buds 1906a are configured to receive media from display screen 1902. On the other hand, the properties of buds 1906*b* do not currently satisfy the set of conditions; thus, buds 1906*b* are not configured to receive media from display screen 1902.

As used herein, when a pair of buds is linked to and configured to receive media from display screen 1902, display screen 1902 is currently configured to share audio media (e.g., media that is currently being played back by display screen 1902) with the pair of buds. Thus, because buds 1906*b* are not configured to receive media from display screen 1902, display screen 1902 is not currently configured to (e.g., or cannot) share media that can be outputted by buds 1906*b*. However, display screen 1902 is currently configured to share media that can be outputted by buds 1906*a* because buds 1906*a* are linked to and configured to receive media from display screen 1902, In addition, in FIG. 19B, when the properties of a pair of buds satisfy the set of conditions and are near (e.g., within a predetermined distance from) display screen 1902, the buds are automatically linked to and configured to receive media from display screen 1902 (e.g., the display screen is able to share media with buds 1902*a*). Thus, in some embodiments, buds 1906*a* were automatically linked to and configured to receive media from display screen 1902 when buds 1906*a* were moved near display screen 1902.

In some embodiments, the set of conditions includes a condition that is met when a pair of buds are associated with (e.g., registered with, logged into) the same user account with which display screen 1902 is associated. In some embodiments, the set of conditions includes a condition that is met when the set of buds are designated as being permitted to receive media from a display screen via an account in which display screen 1902 is associated. In some embodiments, the set of conditions includes a condition that is met when there is an indication that a set of buds have been connected to display screen 1902 in the past (and, in some embodiments, continue to be permitted to be connected to display screen 1902).

FIGS. 19C-19I show a process of connecting display screen 1902 with buds 1906*b*, such that display screen 1902 is configured to share media that is currently being played back by display screen 1902 so that the media can be output by buds 1906*b*. At FIG. 19B, remote 1904 receives downward navigation gesture 1950*b* and transmits an indication of downward navigation gesture 1950*b* to display screen 1902 for processing.

As illustrated in FIG. 19C, in response to receiving the indication of downward navigation gesture 1950*h*, display screen 1902 moves a selection indicator from being displayed at buds control 1932 (e.g., in FIG. 19B) to share audio control 1934 (e.g., in FIG. 19C). At FIG. 19C, remote 1904 receives selection gesture 1950*c* directed to share audio control 1934 and transmits an indication of selection gesture 1950*c* to display screen 1902 for processing.

As illustrated in FIG. 19C1, in response to receiving the indication of selection gesture 1950*c*, display screen 1902 displays user interface 1938 overlaid onto user interface 1930. In some embodiments, in response to receiving an indication of a selection gesture that is directed to cancel sharing option 1938*c*, display screen 1902 ceases to display user interface 1938 and continues to display user interface 1930. User interface 1938 includes sharing options, such as temporary sharing option 1938*a*, permanent sharing option 1938*b*, and cancel sharing option 1938*c*. In some embodiments, in response to receiving an indication of a selection gesture that is directed to cancel sharing option 1938*c*, display screen 1902 does not initiate a process for sharing media (e.g., and ceases to display user interface 1938 overlaid on user interface 1930).

In some embodiments, in response receiving an indication of a selection gesture that is directed to permanent sharing option 1938*b*, display screen 1902 initiates a process for sharing media with a peripheral device (e.g., "Nick's buds," 1906*b*), such that the completion of the process configures display screen 1902 to share media with the peripheral device until the display screen 1902 is manually de-configured to share media with the peripheral device (or the peripheral device is manually de-configured to receive media from display screen 1902) (e.g., without a temporary time period for sharing). In some embodiments, display screen 1902 does not display user interface 1938 in response to receiving selection gesture 1950*c* directed to audio control 1934 and, instead, displays user interface 1940 of FIG. 19D. In such embodiments, display screen 1902 would be configured to provide media to buds 1906*b* without a predetermined time limit on the provision of media, in a similar manner to that described with respect to selection of sharing option 1938*b*. At FIG. 19C, remote 1904 receives selection gesture 1950*c*1 directed to temporary sharing option 1938*a* and transmits an indication of selection gesture 1950*c*1 to display screen 1902 for processing.

Figure 19D:
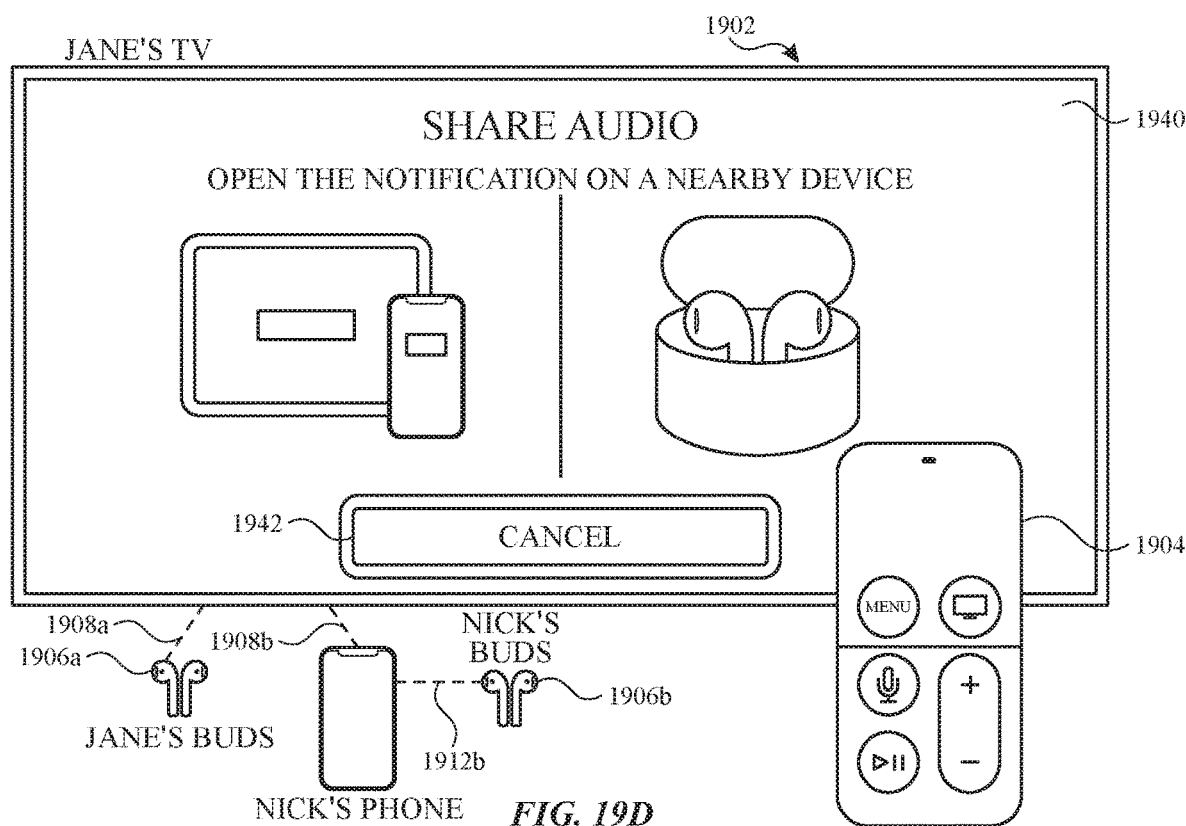

At FIG. 19D, in response to receiving the indication of selection gesture 1950*c*1, display screen 1902 displays user interface 1940 and initiates a process for sharing media, such that the completion of the process configures display screen 1902 is configured to share media with the peripheral device for a temporary period of time (e.g., a predefined time period). In some embodiments, the temporary period of time is a predefined period of time, such as a predetermined time from a particular time (e.g., 1-hour from now), a period of time that is based on the duration of current media being output by display screen 1902 (e.g., the duration of a movie, the remaining time left in a currently playing movie), a period of time that is based on the end of a time interval or a predetermined event (e.g., a day, a week). Thus, in response to receiving the indication of selection gesture 1950*c*1, display screen 1902 is automatically de-configured to share media with the peripheral device after the temporary period of time (e.g., without having to be manually de-configured). In some embodiments, in response to receiving the indication of selection gesture 1950*c*1, device 600 displays a user interface with different selectable temporary period of time options (e.g., predefined period of times, times based on the duration of media and/or a predetermined event). And, in response to receiving a selection directed to one of the options, device 600 displays user interface 1940 and initiates a process for sharing media based on the selected period of time options.

At FIG. 19D, in response to receiving the indication of selection gesture 1950*c*1 (or a selection of a period of time option), as a part of the process for sharing media, device 600 initiates a process for sending one or more notifications. As a part of initiating the process for sending one or more notifications, display screen 1902 sends an instruction or request that causes one or more devices (e.g., device 1910) that are nearby display screen 1902 to display a notification. In FIG. 19D, the instruction is only sent to devices (e.g., phones, tablets, etc.) that are linked to and/or paired to a set of buds. In some embodiments, the instruction can be sent to other devices (e.g., the instruction can be a broadcasted request to display a notification).

As illustrated in FIG. 19D, user interface 1940 includes an indication that a notification has been sent to at least one nearby device and should be interacted with to configure display screen 1902 to share media with a pair of buds (e.g., or another type of accessory device) that is connected to the nearby device. User interface 1940 also includes cancel control 1942 that, when selected, causes display screen 1902 to re-display user interface 1930. At FIG. 19D, device 1910 (e.g., "Nick's Phone") receives data indicating that a share notification should be displayed (e.g., via the process for sending the notifications initiated by display screen 1902).

As illustrated in FIG. 19E, in response to receiving data indicating that the notification should be displayed, device 1910 (e.g., "Nick's Phone") displays share notification 1960. Share notification 1960 indicates that buds 1906*b* ("Nick's buds") can be linked to and configured to receive media from display screen 1902. At FIG. 19E, device 1910 detects gesture 1952*e* (e.g., a press-and-hold gesture) on share notification 1960.

As illustrated in FIG. 19F, in response to detecting gesture 1952*e*, device 1910 displays share audio control 1962, where a selection of the share audio control 1902 allows the multimedia device to share audio with an accessory device (e.g., buds 1906*b*) that is connected to a device (e.g., the device displaying the control, device 1910). At FIG. 19F, device 1910 detects gesture 1952*f* (e.g., a tap gesture) on share audio control 1962.

Figure 19G:
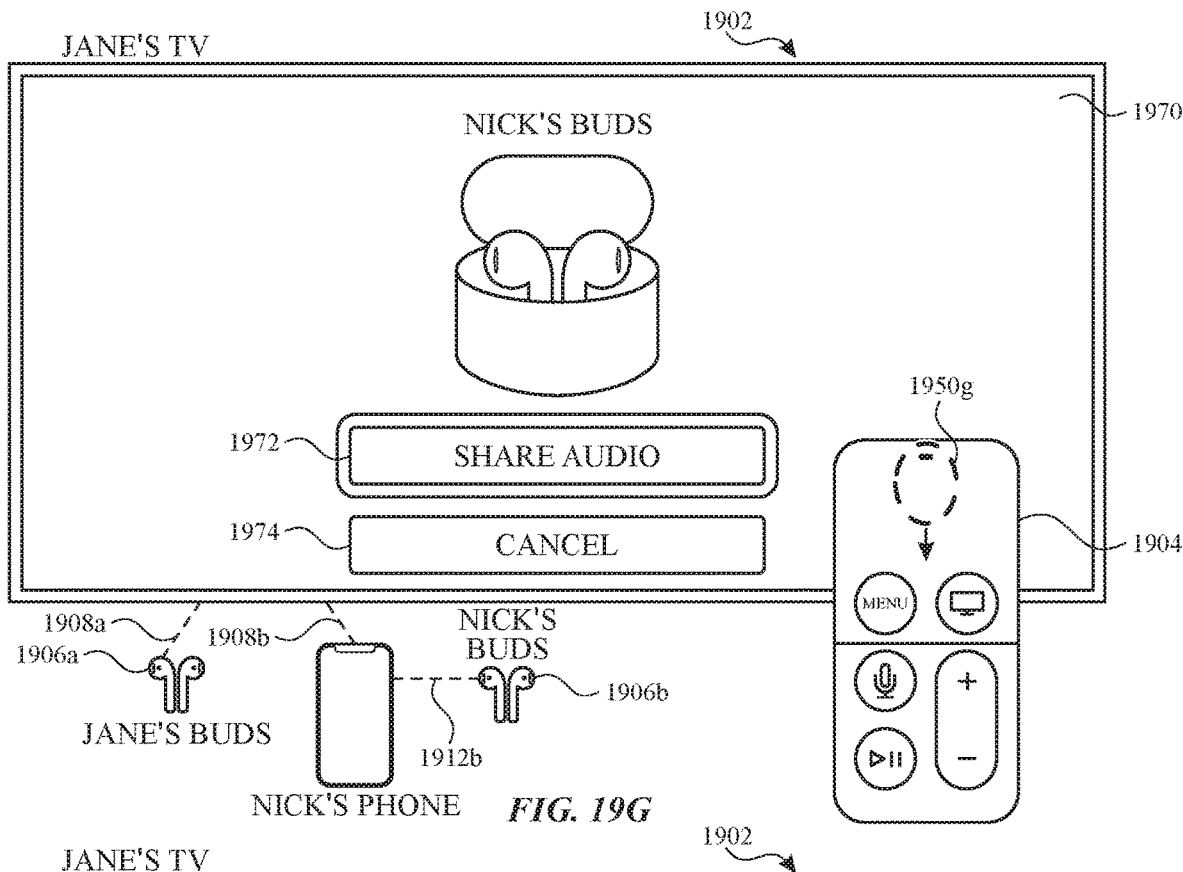
Figure 19H:
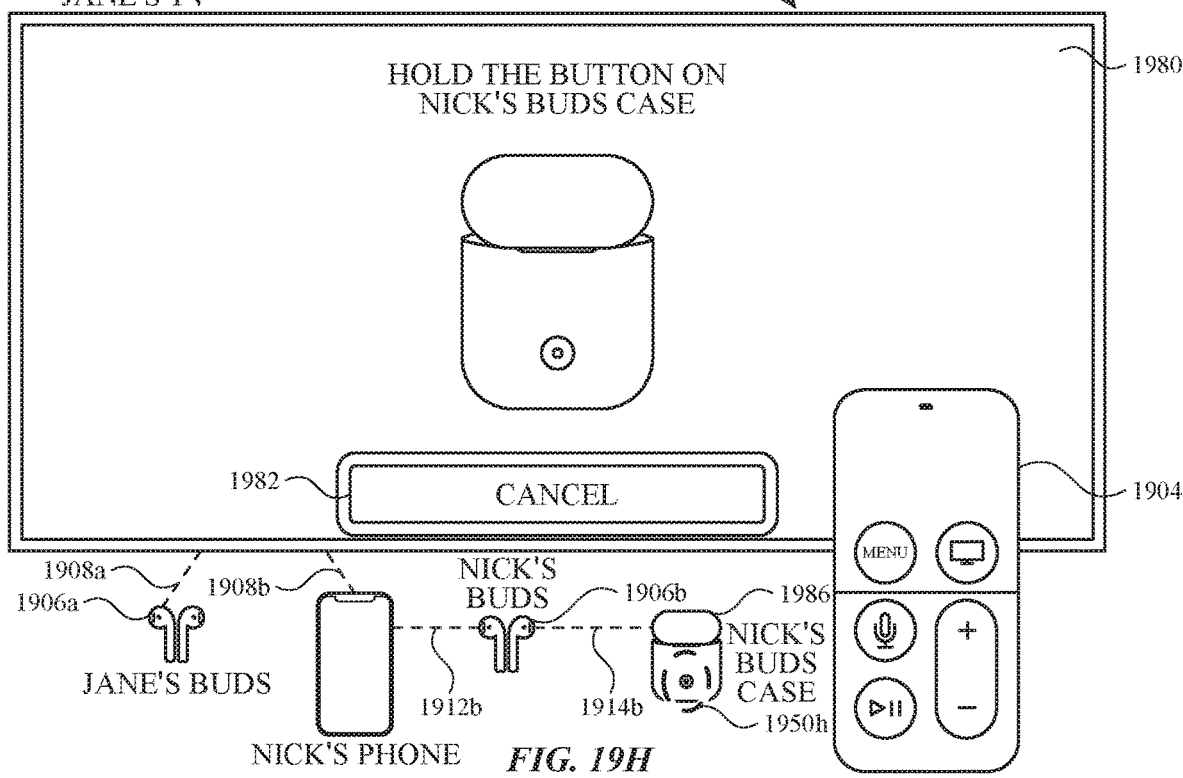

At FIG. 19G, in response detecting gesture 1952*f*, device 1910 causes initiation of a process for sharing media between display screen 1902 and buds 1906*b* (e.g., as a step in the process for sharing media that was initiated above (e.g., in FIG. 19D)). As a part of causing the initiation of the process for sharing media, device 1910 sends an instruction that causes display screen 1902 to display user interface 1970 shown in FIG. 19G. As illustrated in FIG. 19G, user interface 1970 includes share audio control 1972 and cancel control 1974 (e.g., that, when selected, causes display screen 1902 to re-display user interface 1930). At FIG. 19G, remote 1904 receives selection gesture 1950*g* directed to share audio control 1972 and transmits an indication of selection gesture 1950*g* to display screen 1902 for processing.

As illustrated in FIG. 1911, in response to receiving the indication of selection gesture 1950*g*, display screen 1902 displays user interface 1980. User interface 1980 includes one or more instructions for configuring an accessory device (e.g., buds 1906*b*, "Nick's buds") (e.g., that is linked to the device that caused the initiation of a process for sharing media between the multimedia and accessory device), such that the accessory device can receive media from display screen 1902. Here, the instruction says, "HOLD THE BUTTON NICK'S BUDS CASE," which indicates that a user should hold a button on a case that is linked to buds 1906*b* (e.g., in order to configure buds 1906*b* to receive media from display screen 1902). At FIG. 19H, press-and-hold gesture 1956*h* is detected at case 1986 (e.g., "Nick's Buds Case") linked to (e.g., as shown by communication link 1914*b*) buds 1906*b* (e.g., "Nick's Buds").

Figure 19I:
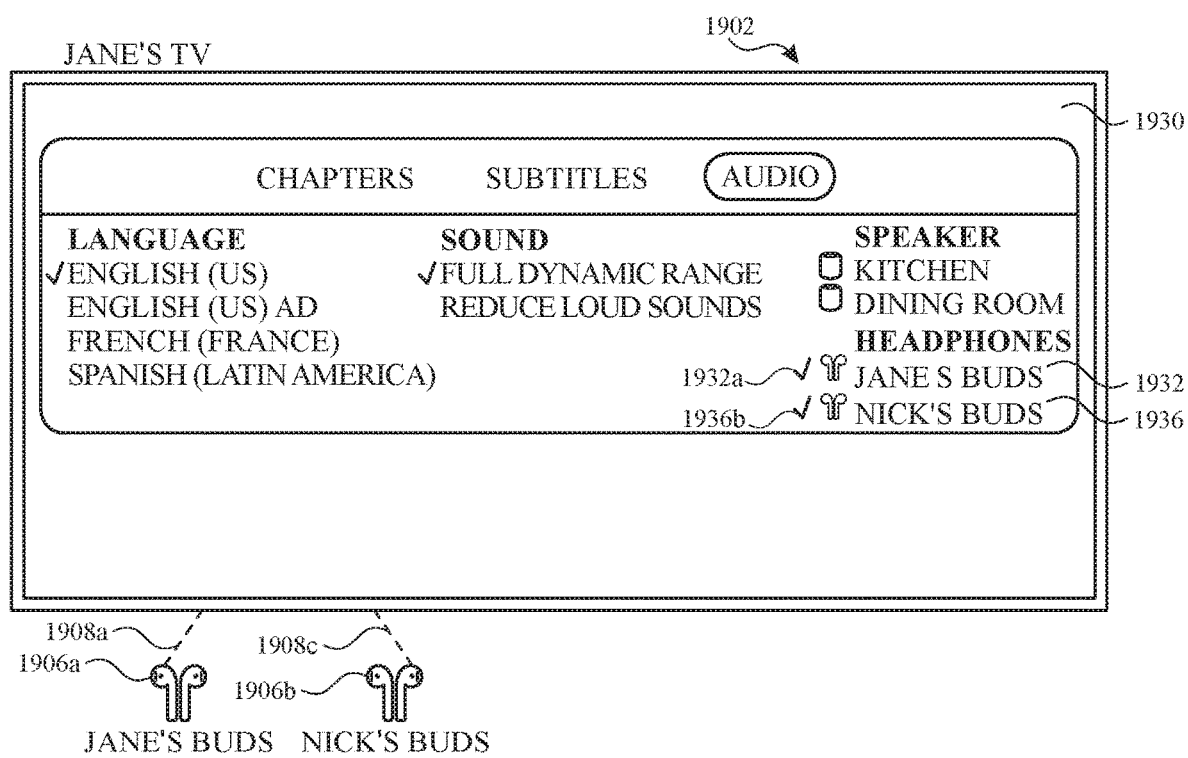

At FIG. 19I, after press-and-hold gesture 1956*h* is detected, display screen 1902 is linked to (e.g., as shown by communication link 1908*c*) and configured to share media that can be outputted (e.g., sent) to buds 1906*b* (so that buds 1906*b* can output (e.g., play) the media using one or more speakers of buds 1906*b*). As illustrated in FIG. 19I, display screen 1902 re-displays user interface 1930, which now includes buds control 1936 that is displayed with indication 1936*a*. (e.g., the checkmark next to "Nick's Buds"). Indication 1936*a* indicates that buds 1906*b* are linked to and configured to receive media that is shared by display screen 1902. Notably, in FIG. 19H, buds 1906*a* (e.g., shown by indication 1936*a*) and 1906*b* (e.g., shown by indication 1932*a*) are concurrently configured to receive media from display screen 1902. Thus, 1906*a* and 1906*b* can concurrently output media that is currently being played back by display screen 1902. Moreover, in embodiments where temporary sharing option 1938*a* was selected in FIG. 19C1, buds 1906*b* is configured to receive media for a temporary period of time. Thus, in some embodiments, display screen 1902 is configured to share media with buds 1906*b* and 1906*a* for different period of times (e.g., display screen 1902 is configured to share media with buds 1906*a* for until the event of manual de-configuration (e.g., as described above in relation to permanent sharing option 1938*b*) or a different temporary period of time from the period of time that buds 1906*b* is configured to receive media). As illustrated in FIG. 19I, user interface 1930 no longer includes share audio control 1934. In some embodiments, user interface 1930 no longer includes share audio control 1934 because a determination is made that a maximum amount (e.g., 2, 3, 5) of accessory devices are concurrently configured to receive media from display screen 1902. In some embodiments, user interface 1930 continues to include share audio control 1934 irrespective of whether a maximum amount of accessory devices are concurrently configured to receive media from display screen 1902.

As illustrated in FIG. 19I, buds 1906*b* are linked directly to display screen 1902, such that display screen 1902 shares media directly with buds 1906*b* to be output. In some embodiments, buds 1906*b* are not linked directly with display screen 1902, such that display screen 1902 screen shares media with device 1910 (e.g., in 19H), and device 1910 shares the media with buds 1906*b* to be output. In some embodiments, buds 1906*b* are no longer linked to device 1910 in FIG. 19I when buds 1906*b* are configured to receive media from display screen 1902. In some embodiments, buds 1906*b* remain linked to device 1910 irrespective of whether buds 1906*b* are directly linked to display screen 1902 (e.g., when buds 1906*b* are configured to receive media from display screen 1902). In some embodiments, buds (e.g., 1906*a*, 1906*b*) may go out of operable communication range from the display screen 1902. If the buds move out of operable communication range, they may no longer play the audio for the media currently playing on display screen 1902. When the buds return to operable communication range, if they are permanently connected to display screen 1902 or if they are temporarily connected, but the time is within the temporary connectivity time period, the buds may resume (e.g., without requiring further user input or requiring re-setup) the audio portion of the media currently playing on display screen 1902. In some implementations, display screen 1902 provides one or more user interface options to manually disconnect buds. By manually disconnecting buds, buds that were linked permanently will no longer be displayed in the headphones section of display screen 1902 and buds that were linked temporarily will not be linked for the duration (e.g., remaining duration) of the temporary time period.

Notably, as described above (e.g., in relation to FIGS. 19A-19I), display screen 1902 is not automatically configured to share media with buds 1906*b* after share audio control 1934 is selected (e.g., via selection gesture 1950*c*1 in FIG. 19C1). Instead, explicit confirmation is needed from display screen 1902 (e.g., via selection gesture 1950*c*1 in FIG. 19C1) and device 1910 (e.g., that is already linked to buds 1906*b*) (e.g., via selection gesture 1952*f* in FIG. 19F) before display screen 1902 can be configured to share media with buds 1906*b*. Requiring this explicit confirmation from both devices enhances the security and/or reduces the risk of unintended sharing or receiving of audio. For example, assuming Jane and Nick have control over each of their respective devices in FIG. 19A-19, the techniques described above reduces the risk of Jane's display screen being able to share media that is output by Nick's buds without Nick's permission. Also, the techniques described above reduces the risk of Nick being able to listen to media, via Nick's buds, that is received from display screen 1902, without Jane's permission. Thus, the techniques described above increase the chances that each device is receiving/outputting media from a respective device as intended by the user of each respective device.

FIG. 20 is a flow diagram illustrating methods for managing audio playback at multiple devices using an electronic device in accordance with some embodiments. Method 2000 is performed at a computer system (e.g., 100, 300, 500, 1902). Some operations in method 2000 are, optionally, combined, the orders of some operations are, optionally, changed, and some operations are, optionally, omitted.

As described below, method 2000 provides an intuitive way or managing audio playback at multiple devices. The method reduces the cognitive burden on a user or managing audio playback at multiple devices, thereby creating a more efficient human-machine interface. For battery-operated computing devices, enabling a user to manage audio playback at multiple devices faster and more efficiently conserves power and increases the time between battery charges.

While the computer system (e.g., 1902) is providing media (e.g., audio media (e.g., music)) to a first set of one or more devices (e.g., 1906a) (e.g., and, in some embodiments, while configured to (e.g., via one or more settings or wireless connections (e.g., a Bluetooth or Wi-Fi connection)) control media playback at the first set of one or more devices (e.g., cause the first set of one or more devices to playback media)), the computer initiates (2002) a first process to provide the media to a second set of one or more devices (e.g., 1906b) (and, in some embodiments, to control media playback at the second set of one or more devices), while continuing to provide (e.g., 1932) the media to the first set of one or more devices (e.g., 906a).

As a part of initiating the process to provide the media to a second set of one or more devices (e.g., 1906b), the computer system receives (2004) from a first external device (e.g., 1910) (e.g., a smartphone; a smartwatch; a personal computer; a tablet computer) that is in communication with the second set of one or more devices (e.g., 1906b), first data that is indicative of a first request (e.g., authorization; approval) to progress the first process to provide the media to the second set of one or more devices.

As a part of initiating the process to provide the media to a second set of one or more devices, the computer system receives (2006), second data that is indicative of a second request (e.g., authorization; approval) to progress the first process to provide the media to the second set of one or more devices (e.g., 1906b), where the second data is received from a second external device (e.g., 1986) (a device that facilitates connection of the second set of one or more devices with other devices (e.g., a case for the second set of one or more devices that includes an input device that causes transmission of the second data)) that is in communication with the second set of one or more devices (e.g., 1906b) or is received from a first device (e.g., 1912) of the second set of one or more devices.

As a part of initiating the process to provide the media to a second set of one or more devices (e.g., 1906b), the computer system, after receiving the first data and the second data (and, in some embodiments, in response to receiving the first data and the second data), provides (2008) the media to the second set of one or more devices 1906b) while continuing to provide the media to the first set of one or more devices. Providing media to a second set of one or more devices after receiving data from both a first external device and from a second external device or from a first device of the second set of one or more devices reduces the probability of unintended provision of the media and increases the security of media provision for both the user of the computer system and the user of the second set of devices. Reducing the probability of erroneous operations and improving security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system is in communication with a display generation component (e.g., 1902). In some embodiments, prior to initiating the first process, the computer system, via the display generation component, a first user interface (e.g., 1930) (e.g., an interface for controlling provision of media to sets of devices; a control user interface) that includes: in accordance with a determination that a first set of media provisioning criteria is satisfied, a first selectable user interface object (e.g., 1934) (e.g., a "share audio" affordance) that, when selected, causes the first process to be initiated. In some embodiments, in accordance with a determination that the first set of media provisioning criteria is not satisfied, the first user interface does not include the first selectable user interface object. In some embodiments, the first user interface (e.g., 1930) includes an indication (e.g., graphical and/or textual indication) that the computer system is providing audio to the first set of one or more devices (e.g., that is displayed concurrently with the first selectable user interface object). In some embodiments, the first set of media provisioning criteria is satisfied when the computer system is providing media to a predetermined number (e.g., 1; 2; less than 3; less than 2) of sets of one or more devices. In sonic embodiments, to sets of one or more devices of a predetermined type (e.g., wireless headphones). Conditionally displaying the interface object for initiating the first process provides the user with feedback as to when the process is available for initiation. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Conditionally displaying the interface object for initiating the first process based on whether the system is currently providing media to a predetermined number of devices provides the user with feedback as to when the process is available for initiation. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first process includes, prior to receiving the first data, initiating transmission (e.g., transmitting or causing to be transmitted via one or more intermediary devices (e.g., a server, a network device, a router)), to the first external device (e.g., 1910) that is in communication with the second set of one or more devices (e.g., 1906*b*), of a first request to authorize providing the media to the second set of one or more devices. In some embodiments, request causes (e.g., the request is an instruction) the first external device (e.g., 1912) to display a selectable user interface object (e.g., 1960*e*) that, when selected, causes transmission of the first data. Transmitting a request to authorize the provision of media provides the computer system with the ability to prompt the first external device for the first data, improving the usability of the media provisioning process. Providing improved usability increases the user-system interaction and promotes use of the system which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, as a part of initiating transmission of the first request to the first external device, the computer system (e.g., 1902) initiates a broadcast (e.g., broadcasting or causing to be broadcast by one or more intermediary devices (e.g., a server, a network device, a router)) (e.g., non-specific transmission to potentially a plurality of recipients) of a request (e.g., a request to share media) to a plurality of potential external devices (e.g., 1912, 1906*b*). Broadcasting the request optimizes the reception of the request by devices that are capable of providing the first data improving the usability of the media provisioning process. Providing improved usability increases the user-system interaction and promotes use of the system which enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system, when initiating the transmission of the first request (e.g., is not in communication (or a paired relationship) with the first external devices or is not in communication with the second set of one or more devices.

In some embodiments, in response to receiving the first data (and, in some embodiments, prior to receiving the second data), the computer system displays a confirmation user interface (e.g., 1970) that includes a second selectable user interface object (e.g., 1972). In some embodiments, the computer receives an input (e.g., via 1950*g*) corresponding to the second selectable user interface object. In some embodiments, in response to receiving the input corresponding to the second selectable user interface object, the computer system displays a prompt (e.g., 1980) (e.g., a graphical prompt; a textual prompt) to provide an input (e.g., a particular input) at the second external device or displaying a prompt (e.g., 1980) (e.g., a particular input) to provide an input at the first device of the second set of one or more devices. In some embodiments, the confirmation user interface is displayed prior to receiving the second data. Displaying a prompt to provide the input at the second external device or at the first device of the second set of one or more devices improves system-user interactions and provides users with feedback as to the steps necessary to progress the media provisioning process. Improving user-system interactions and promoting use of the system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, as a part of providing the media to the second set of one or more devices while continuing to provide media to the first set of one or more devices, the computer system displays an indication (e.g., 1936) (e.g., a graphical indication; a textual indication) that the media is being provided to the second set of one or more devices (and, in some embodiments, also displaying an indication that the media is being provided to the first set of one or more devices). Displaying an indication that the system is providing the media to the second set of one or more devices provides the user with feedback about what devices are currently being provided media. Providing improved visual feedback to the user enhances the operability of the computer system and makes the user interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, prior to initiating the first process, the second set of one or more devices (e.g., 1906*b*) is configured to playback media provided by the first external device (e.g., 1912).

In some embodiments, the computer system is associated with (e.g., signed into) a first user account. In some embodiments, the first external device is associated with a second user account different from the first user account. In some embodiments, providing the media to the second set of one or more devices occurs via a direct connection (e.g., a wireless connection) between the computer system and the second set of one or more devices. In some embodiments, providing the media to the second set of one or more devices includes providing the media to the first external device to provide to the second set of one or more devices.

In some embodiments, as a part of providing the media to the second set of one or more devices while continuing to provide the media to the first set of one or more device, in accordance with a determination that an input (e.g., 1950*c*1) corresponding to selection of a temporary sharing option (e.g., 1938*a*) was received (e.g., an input received on a user interface for selecting a duration of sharing that was displayed by the computer system prior to receiving the first data), the computer system provides the media to the second set of one or more devices for no longer than a first predetermined period of time (e.g., the provision of audio is automatically (e.g., without requiring user input) discontinued/ceased/terminated after the predetermined period of time). In some embodiments, as a part of providing the media to the second set of one or more devices while continuing to provide the media to the first set of one or more device, in accordance with a determination that an input corresponding to selection of a non-temporary (e.g., indefinite) sharing option was received (e.g., an input received on a user interface for selecting a duration of sharing that was displayed by the computer system prior to receiving the first data), the computer system provides the media to the second set of one or more devices without configuring a predetermined time limit on providing the media to the second set of one or more devices. In some embodiments, the first predetermined period of time is selected from the group consisting of: a predetermined period of time from a current time (e.g., 1 hour after the start of the providing of media or after the receipt of the input corresponding to selection of the temporary sharing option); a predetermined period of time selected based on currently playing media (e.g., the time remaining in the currently playing media (e.g., a movie)), and a predetermined period of time until a predetermined event (e.g., until the end of the current day; until sunset). In some embodiments, in accordance with a determination that an input corresponding to selection of a non-temporary (e.g., indefinite) sharing option (e.g., 1938*b*) (e.g., an input received on a user interface for selecting a duration of sharing that was displayed by the computer system prior to receiving the first data), providing the media to the second set of one or more devices without configuring a predetermined time limit on providing the media to the second set of one or more devices. Providing an option to provide the media to the second set of one or more devices for no longer than a first predetermined period of time provides the user with an option to limit the duration of sharing, which can increase security and reduce the risk of unintended sharing of audio. Providing additional control options and increasing security enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

Note that details of the processes described above with respect to method 2000 (e.g., FIG. 20) are also applicable in an analogous manner to the methods described below. For example, method 2000 optionally includes one or more of the characteristics of the various methods described above with reference to method 1700. For brevity, these details are not repeated below.

FIGS. 21A-21F illustrate exemplary user interfaces for managing voice input in accordance with some embodiments. In particular, FIGS. 21A-21F demonstrate a scenario where voice input is being detected from multiple users and media is output in response to the detected voice input. The user interfaces in these figures are used to illustrate the processes described below, including the processes shown in FIGS. 18 and 23.

Figure 21A:
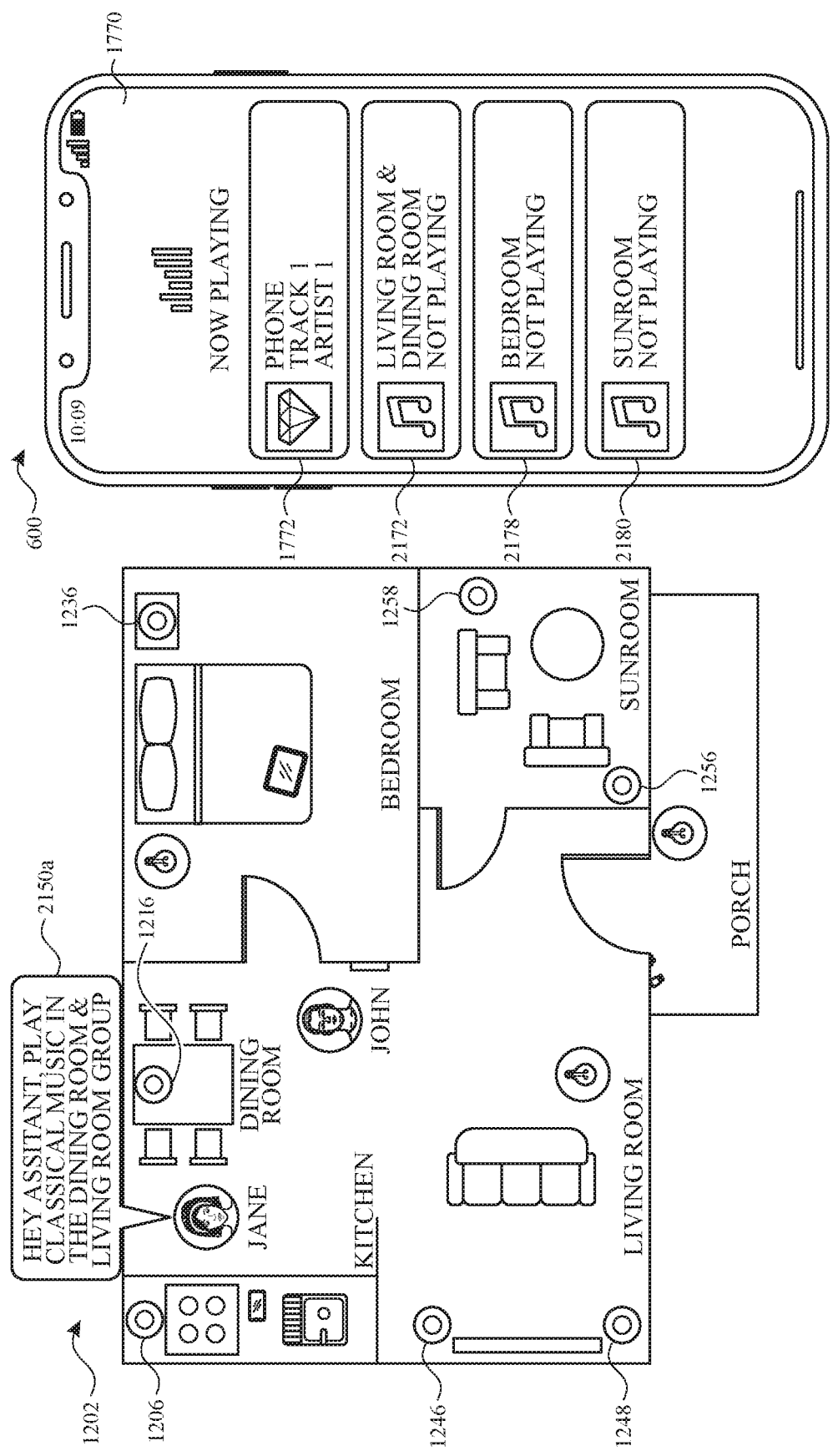
FIGS. 21A-21F illustrate exemplary user interfaces in accordance with some embodiments.

FIG. 21A illustrates a diagram of home 1202 that includes multiple speaker devices, such as kitchen speaker 1206, dining room speaker 1216, bedroom speaker 1236, living room speaker 1246, living room speaker 1248, sunroom speaker 1256, and sunroom speaker 1258. In FIG. 21A, the devices have one or more properties, as described above in relation to FIG. 12, including being assigned to home 1202 and/or particular rooms of home 1202.

In addition to the diagram of home 1202, FIG. 21A also illustrates device 600 displaying user interface 1770, using one or more techniques as described above (e.g., in relation to FIG. 17N). User interface 1770 includes multiple group affordances, such as phone group affordance 1770, living-and-dining room group affordance 2172, bedroom group affordance 2178, and sunroom group affordance 2180. At FIG. 21A, the group affordances correspond to respective output affordances, as described above in relation to FIG. 17N. Moreover, the living-and-dining room group affordance 2172 identifies a grouping that was created using one or more similar techniques as described above (e.g., in relation to FIGS. 17A-17P). In sonic embodiments, a kitchen group affordance is also displayed in user interface 1770 or replaces display of one of the other group affordances that are displayed in user interface 1770 in FIG. 21A.

As illustrated in FIG. 21A, Jane and John are positioned proximate to dining room speaker 1216. At FIG. 21A, dining room speaker 1216 detects voice input 2150*a* (e.g., "Hey Assistant, play classical music on the dining room and living room group," uttered by Jane). Here, voice input 2150*a* corresponds to an instruction to initiate playback of classical music on a particular group speakers (e.g., "dining room and living room group") that were grouped using one or more similar techniques as described above (e.g., in relation to FIGS. 17A-17P).

Figure 21B:
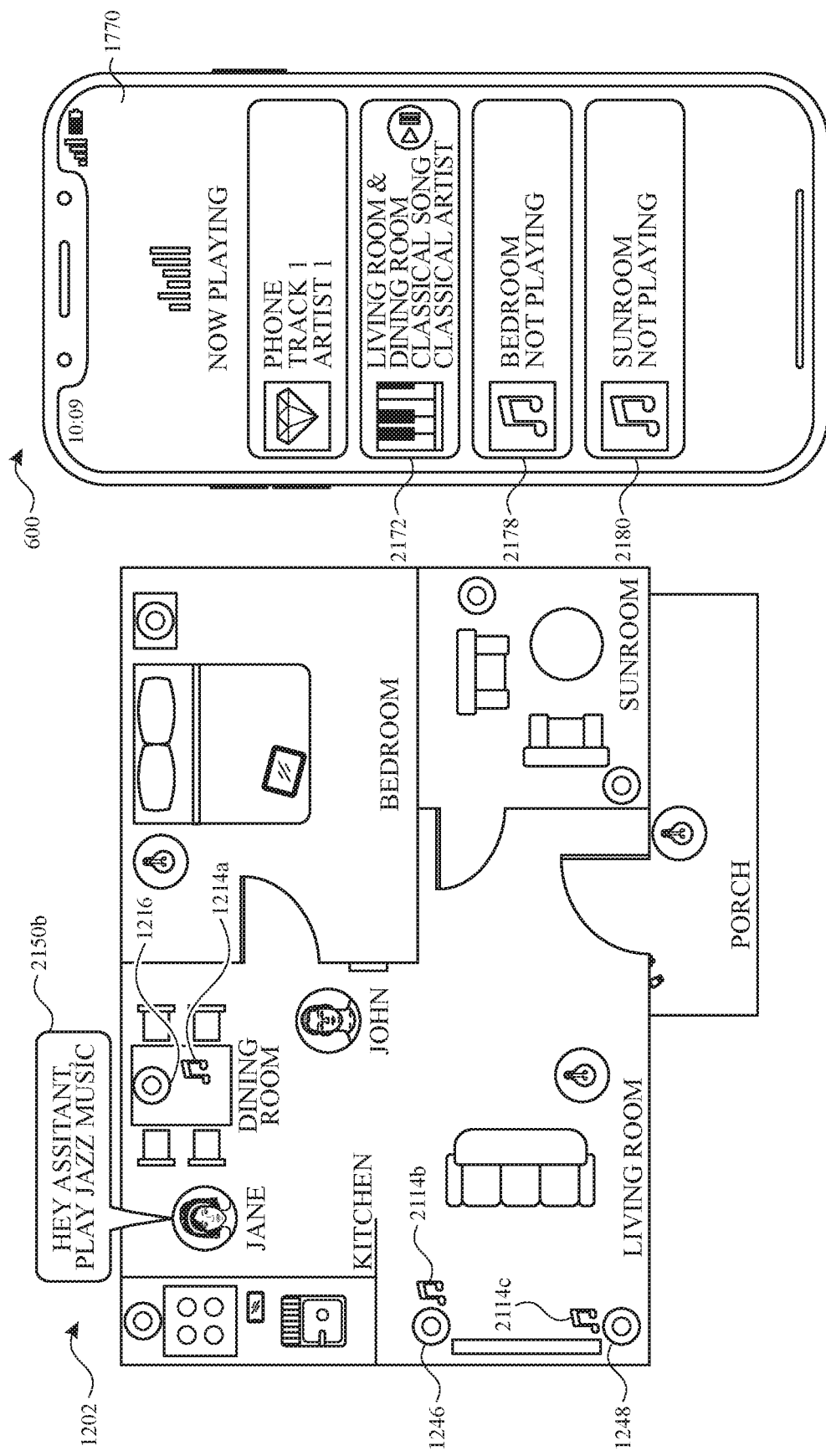

As illustrated in FIG. 21B, in response to detecting voice input 2150*a*, dining room speaker 1216 initiates performance of an operation that is consistent with voice input 2150*a*. For example, at FIG. 21B, dining room speaker 1216 transmits an instruction that causes dining room speaker 1216, living room speaker 1246, and living room speaker 1248 (e.g., the speakers assigned to the dining room and living room group) to output classical music. In FIG. 21B, the output of classical music is represented by classical output indicators 2114*a*, 2114*b*, 2114*c* that is shown above each speaker. Notably, in FIG. 21B, the speakers in the kitchen, bedroom, and sunroom do not include output indicators above them because they are not playing back media (e.g., because they are not associated with the dining room and living room group).

At FIG. 21B, dining room speaker 1216 detects voice input 2150*b* (e.g., "Hey Assistant, play jazz music," uttered by Jane) (e.g., while classical music is playing on the speakers). Here, voice input 2150*b* corresponds to an instruction to initiate playback of jazz music. However, voice input 2150*b* does not include an indication of the group of speakers of which the type of music should be played on (e.g., as opposed to voice input 2150*a*). In response to detecting voice input 2150*b*, a determination is made that voice input 2150*b* was uttered by the same user (e.g., "Jane") who uttered voice input 2150*a* in FIG. 21A.

Figure 21C:
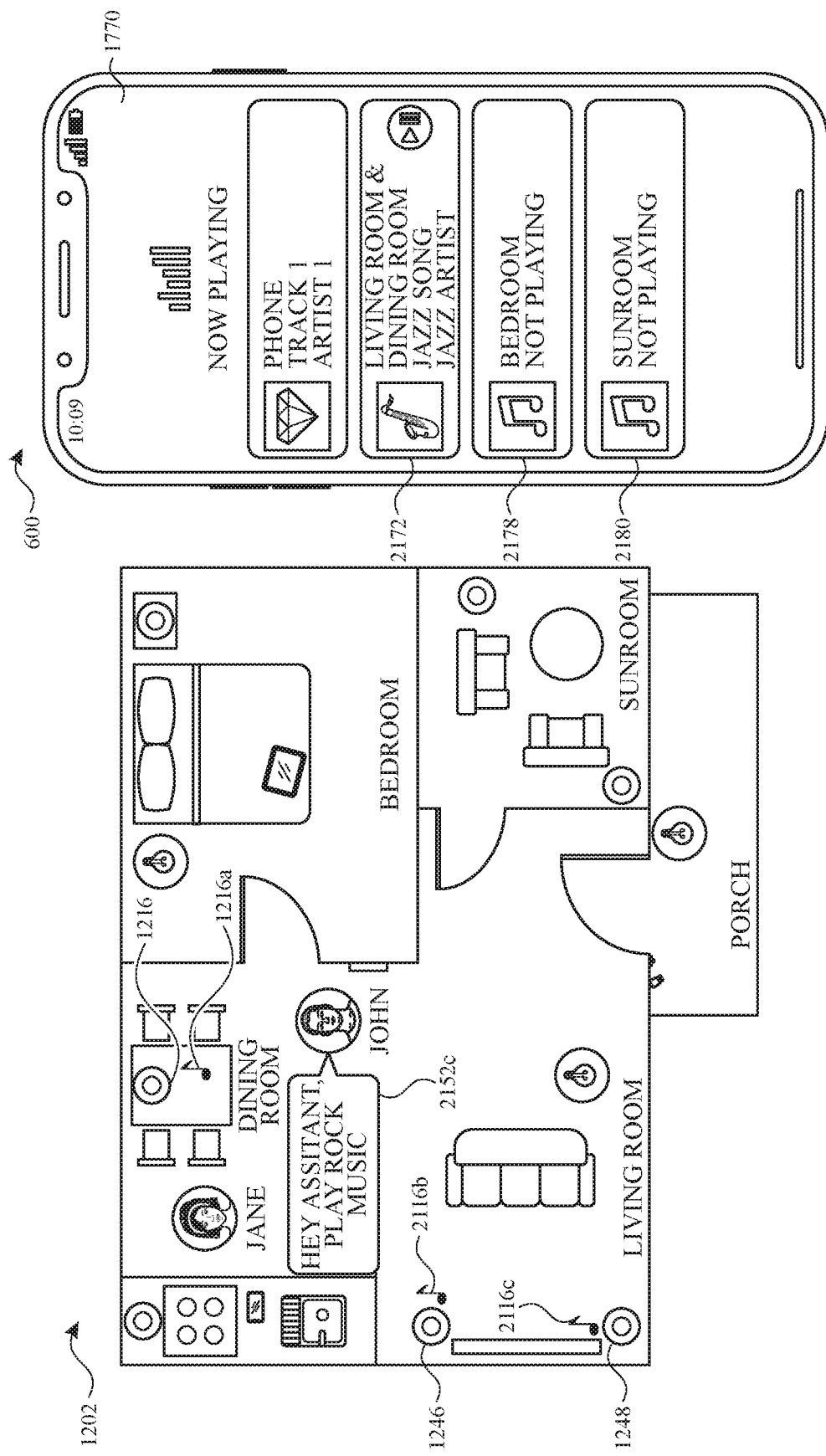

As illustrated in FIG. 21C, because the determination was made that voice input 2150*b* was uttered by the same user (e.g., "Jane") who uttered voice input 2150*a*, dining room speaker 1216, living room speaker 1246, and living room speaker 1248 (e.g., the speakers assigned to the dining room and living room group) are caused to output jazz music instead of classical music. Moreover, the dining room and living room speakers are caused to output jazz music even though voice input 2150*b* did not include an indication of a group of speakers. In FIG. 21C, the output of jazz music is represented by jazz output indicators 2116*a*, 2116*b*, and 2116*c* that is shown above each speaker.

At FIG. 21C, dining room speaker 1216 detects voice input 2152*c* (e.g., "Hey Assistant, play rock music," uttered by John) (e.g., while classical jazz is playing on the speakers). Here, voice input 2152*c* corresponds to an instruction to initiate playback of rock music. However, voice input 2152*c* does not include the indication of the group of speakers that the type of music should be played on liked in voice input 2150*a*. In response to detecting voice input 2152*c*, a determination is made that voice input 2152*c* was uttered by a different user (e.g., "John" or a user that is not recognized as Jane) from the user (e.g., "Jane") who uttered voice input 2150*b* in FIG. 21B (e.g., and/or voice input 2150*a* in FIG. 21A). In some embodiments, the determination of whether a voice input was uttered by the same or different user is made via one or more speech recognition algorithms. In some embodiments, biometric data that is associated with one or more of the people is stored in a database and accessed to determine whether the voice input corresponds to the same user. In some embodiments, when new voice input is recognized as being uttered by a different user than previous voice input, the different user is recognized as a particular user (e.g., via the stored biometric user) and/or a user that is known. In some embodiments, when new voice input is recognized as being utter by a different user than previous voice input, the different user is recognized as an unknown user (e.g., because there is not enough biometric data stored for the different user).

Figure 21D:
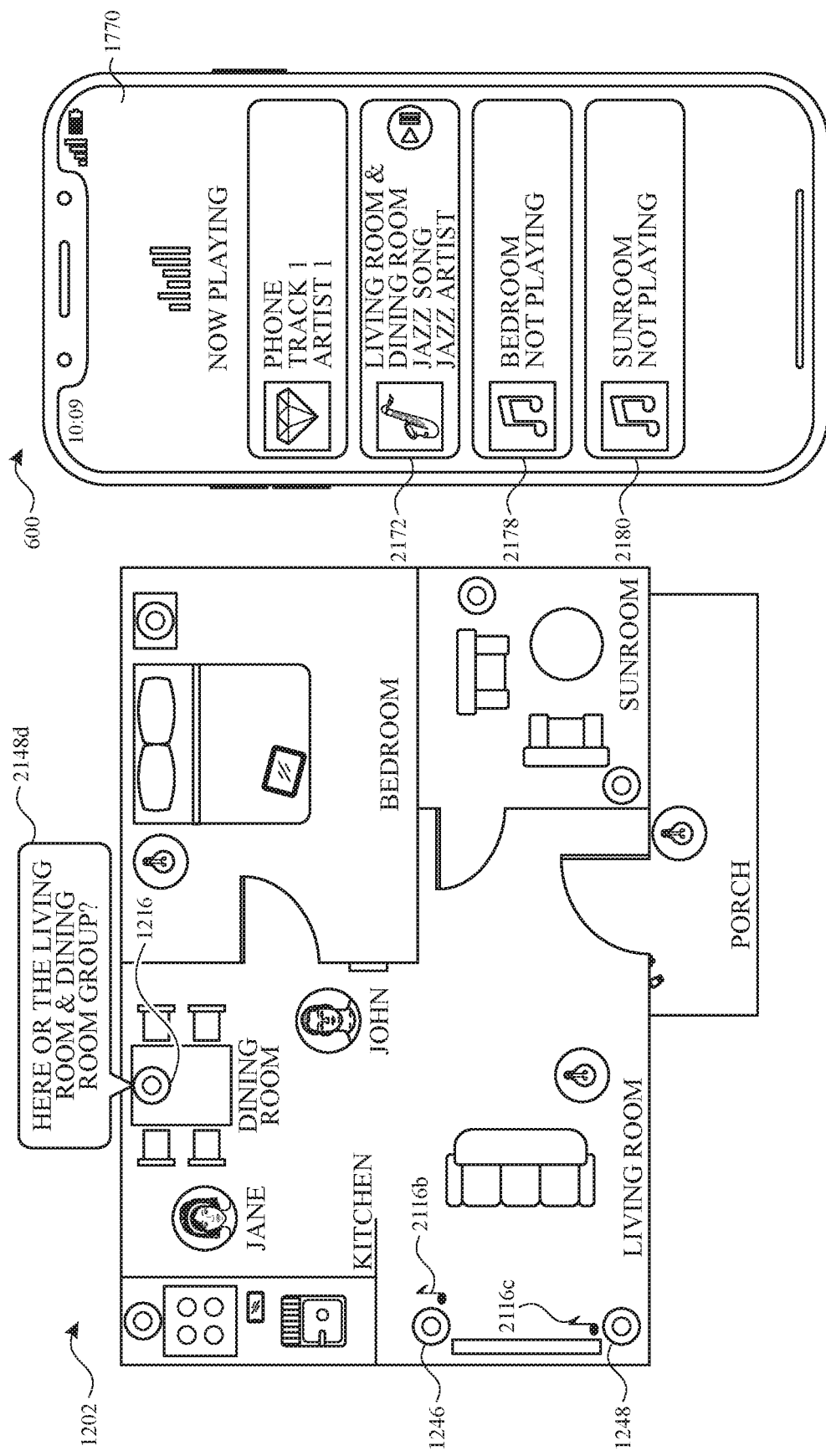

As illustrated in FIG. 21D, because the determination was made that voice input 2152c was uttered by a different user (e.g., "John") from the user (e.g., "Jane") who uttered voice input 2150b (and/or 2150a), dining room speaker 1216 provides audio output 2148d (e.g., "Here or the living room and dining room group?"). Audio output 2148d indicates that dining room speaker 1216 requires a confirmation concerning where to output the rock music before any of the speakers are caused to output the media. In particular, audio output 2148 indicates that a choice can be made to output rock music solely at dining room speaker 1216 (e.g., "Here" or on dining room speaker 1216, living room speaker 1246, and living room speaker 1248 (e.g., "dining room and living room group"). Notably, dining room speaker 1216 provides audio output 2148d to get the confirmation because of the uncertainty of determining whether John intends his voice input (e.g., voice input 2152c having no device group identifier) to impact the same group of speakers in which Jane's voice input (e.g., voice input 2150b). At FIG. 21D, before and after audio output 2148d, jazz music continues to be output by the dining room and living room speakers. At FIG. 21D, if a determination had been made that voice input 2152c was from the same user (e.g., "Jane") who uttered the previous voice input, rock music would be output by the dining room and living room speakers.

Figure 21E:
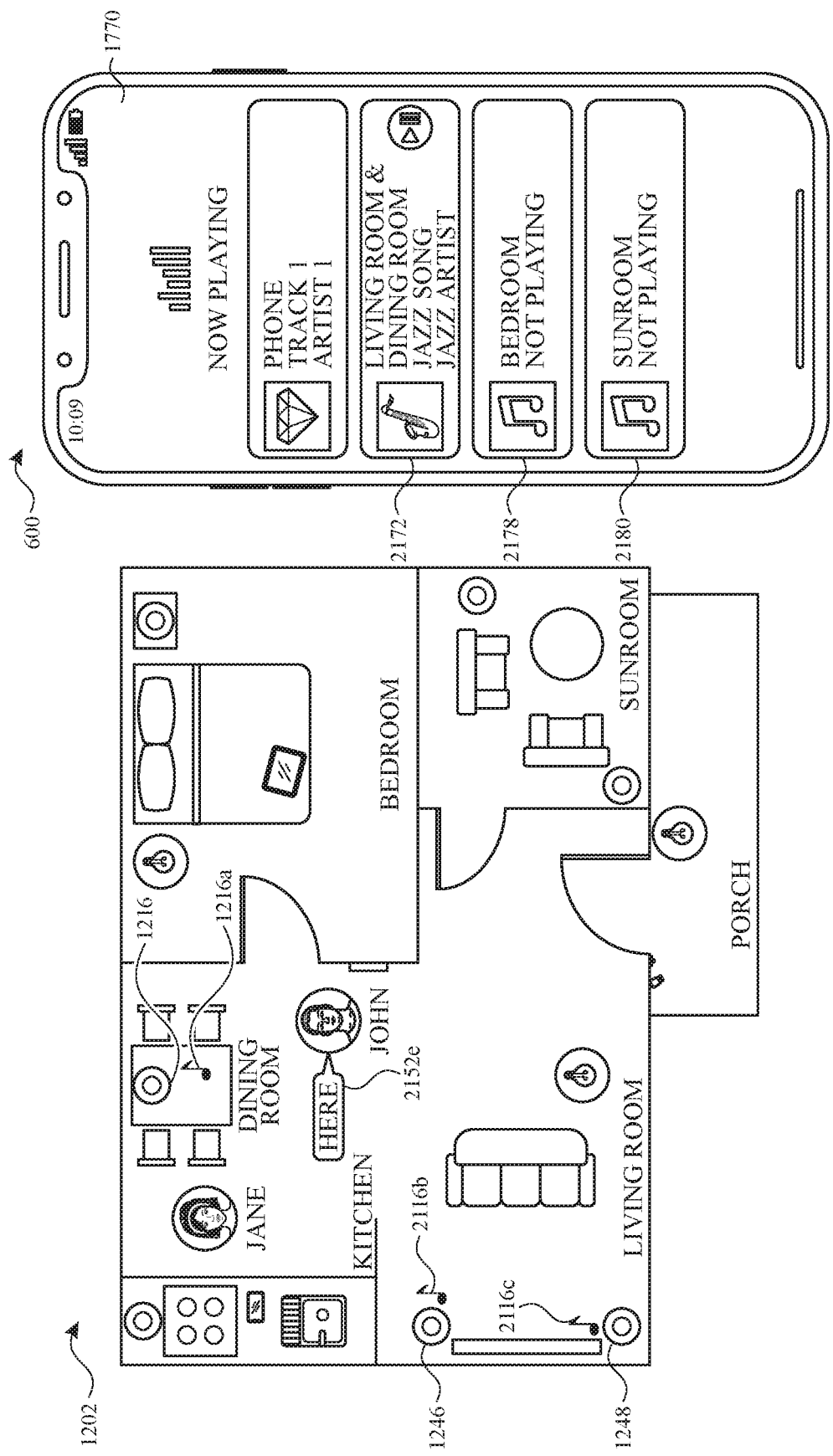
Figure 21F:
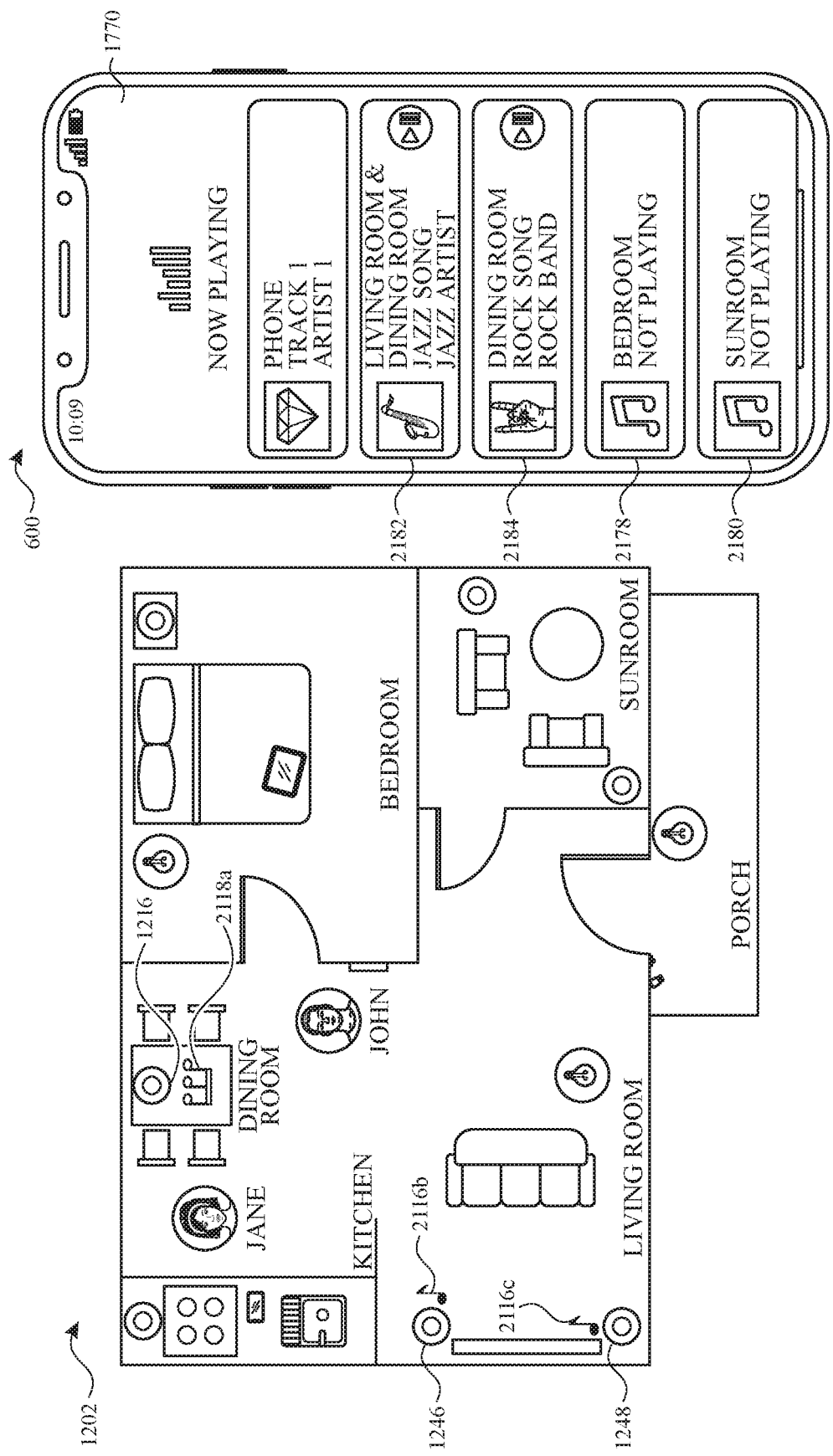

At FIG. 21E, dining room speaker 1216 detects voice input 2152d ("Here") that indicates that the previous command should apply only to dining room speaker 1216. As illustrated in FIG. 21F, in response to detecting voice input 2152d, dining room speaker 1216 is caused to stop outputting jazz music and start outputting rock music, as indicated by rock output indicator 2118a. Notably, as illustrated in FIG. 21E, living room speaker 1246 and 1248 continue to output jazz music (e.g., as indicated by jazz music indicator 2116b and 2116c) because voice input 2152d was detected. In some embodiments, in response to detecting voice input that indicates that the previous command should apply to the dining room and living group is detected, rock music is output by the dining room and living speakers and no jazz music is output (e.g., the dining room and living room speakers cease to output music).

As illustrated in FIG. 21F, in response to detecting voice input 2152d, user interface 1770 displays separate group affordances for the living room (e.g., 2182) and dining room (e.g., 2184) to reflect that the dining room and living room are currently outputting different media and/or are not in-sync or included in the same group (e.g., as discussed above in relation to FIGS. 17A-17P). Thus, user interface 1710 does not include living-and-dining room group affordance 2172. In some embodiments, in response to detecting voice input 2152, user interface 1710 is automatically updated (e.g., without any user input on user interface 1710) to display output affordances that correspond to the separate dining room and living room group affordances and cease to display of an output affordance that corresponds to living-and-dining room group affordance 2172.

Figure 22A:
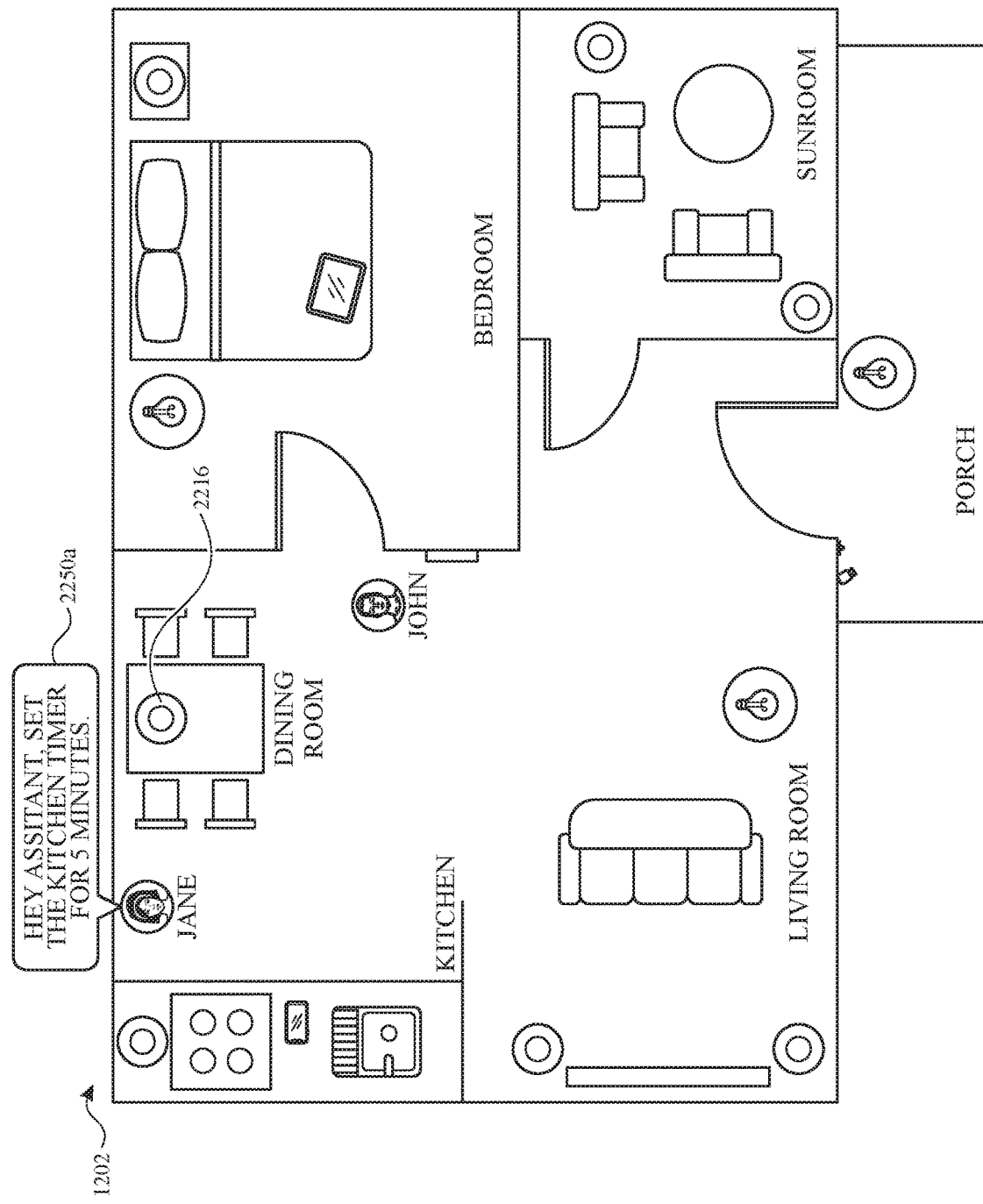
FIGS. 22A-22F illustrate exemplary user interfaces in accordance with some embodiments.

FIGS. 22A-22F illustrate exemplary user interfaces for managing voice input in accordance with some embodiments. In particular FIGS. 22A-22F demonstrate a scenario where voice input is being detected from multiple users and a timer is controlled in response to the detecting the detected voice input. The user interfaces in these figures are used to illustrate the processes described below, including the processes shown in FIGS. 18 and 23, FIG. 22A illustrates a diagram of home 1202 that includes multiple devices, such as dining room speaker 1216. In FIG. 22A, the devices have one or more properties and are assigned to home 1202 and/or particular rooms of home 1202, as described above in FIG. 12. As illustrated in FIG. 22A, Jane and John are positioned around dining room speaker 1216. At FIG. 22A, dining room speaker 1216 detects voice input 2250a (e.g., "Hey Assistant, set the kitchen timer for 5 minutes," uttered by Jane). Here, voice input 2150a corresponds to an instruction to initiate a timer named, "kitchen," (e.g., the kitchen timer) for five minutes.

Figure 22B:
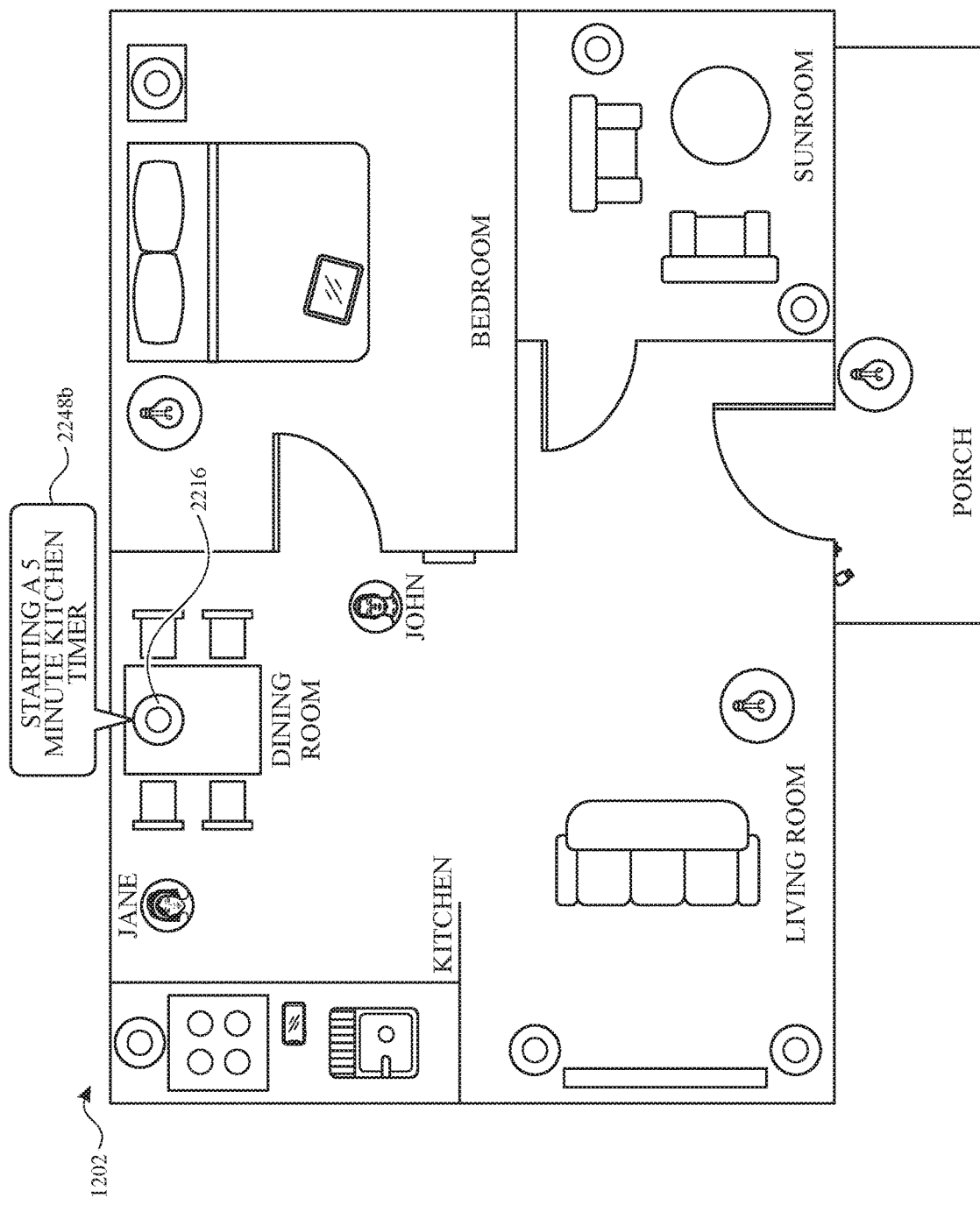
Figure 23:
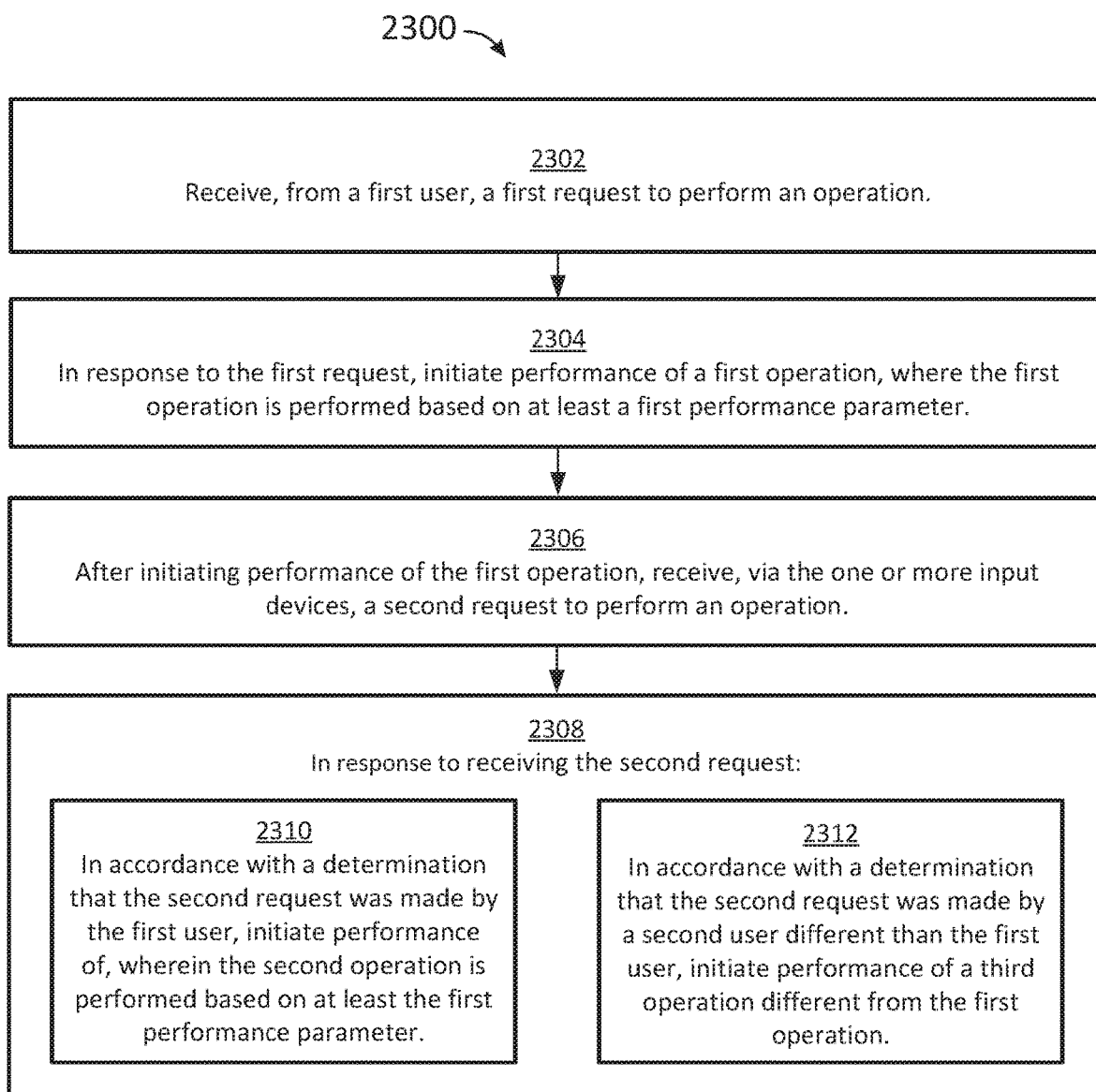
FIG. 23 illustrates an exemplary method in accordance with some embodiments.

As illustrated in FIG. 22B, in response to detecting voice input 2250a, dining room speaker 1216 causes the kitchen timer to be initiated. In addition, dining room speaker 1216 provides audio output 2248b to indicate that the kitchen timer has been initiated.

Figure 22C:
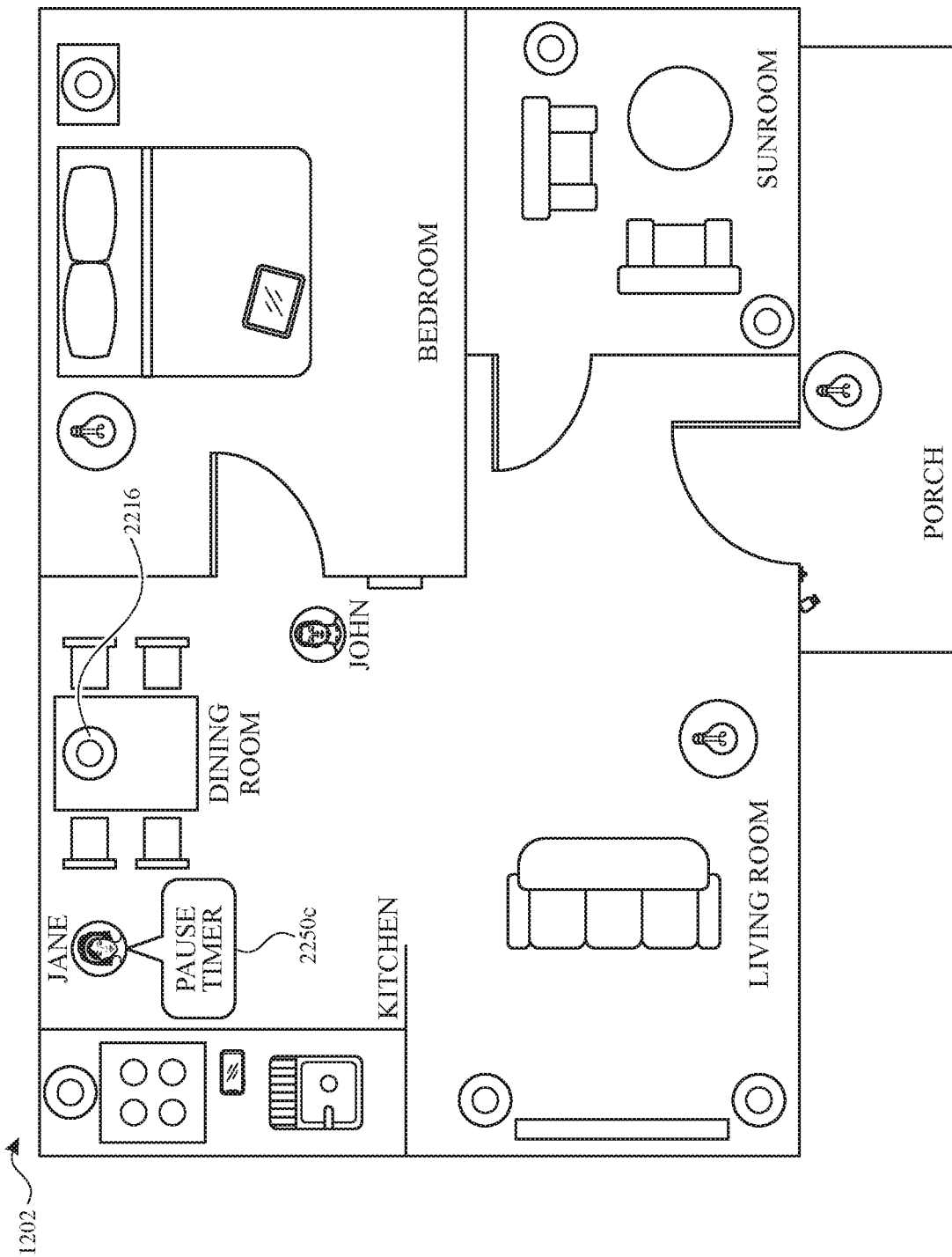

As illustrated in FIG. 22C, dining room speaker 1216 detects voice input 2250c (e.g., "Pause the timer," uttered by Jane), At FIG. 22C, in response to detecting voice input 2250c, a determination is made that voice input 2250c was uttered by the same user (e.g., "Jane") as voice input 2250a, using similar techniques to those described above (e.g., in relation to FIGS. 21B-21D).

Figure 22D:
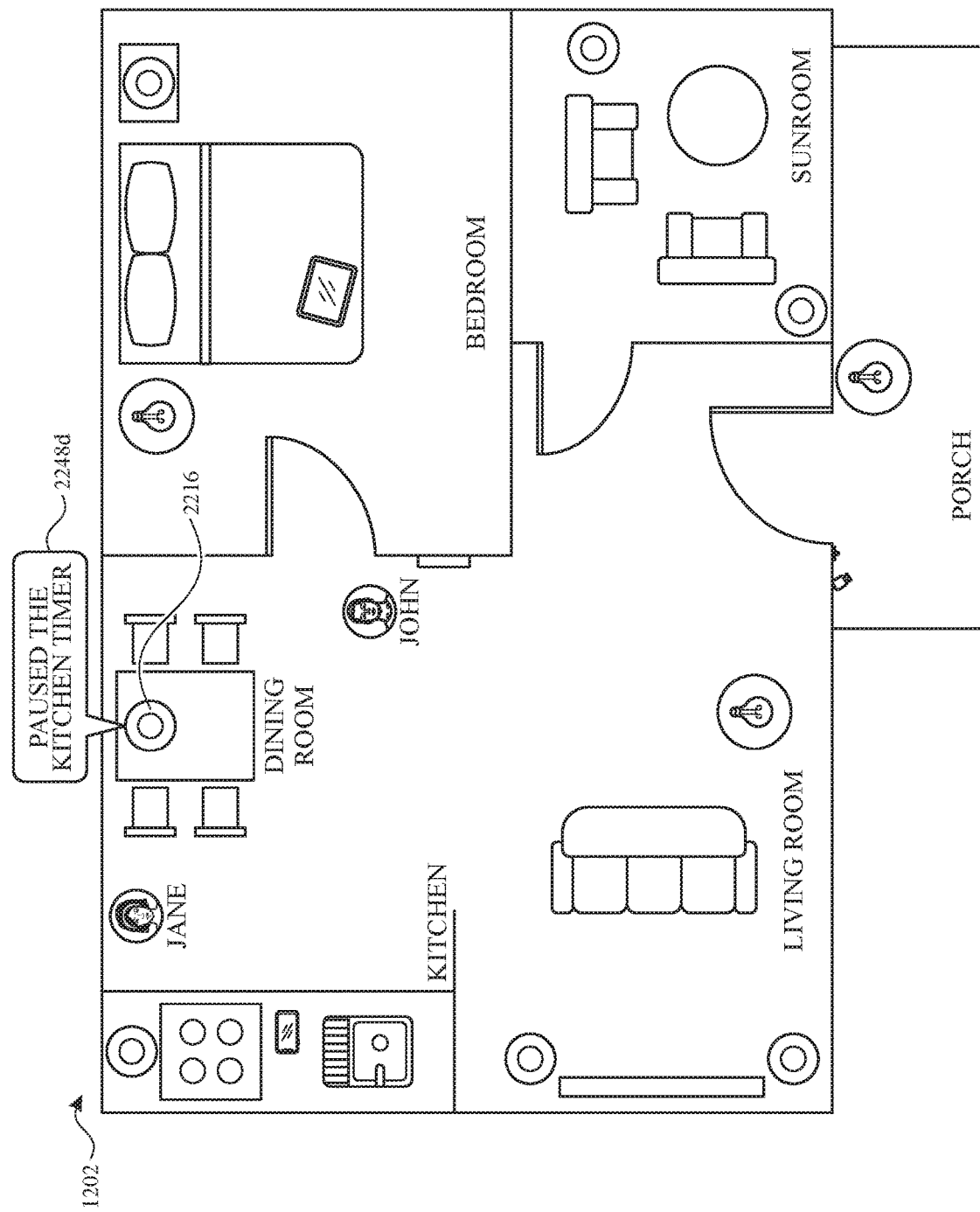

As illustrated in FIG. 22D, because the determination is made that voice input 2250c was uttered by the same user, dining room speaker 1216 causes the kitchen timer to be paused. In addition, dining room speaker 1216 provides audio output 2248d (e.g., "Paused the kitchen timer") to indicate that the kitchen timer has been paused.

Figure 22E:
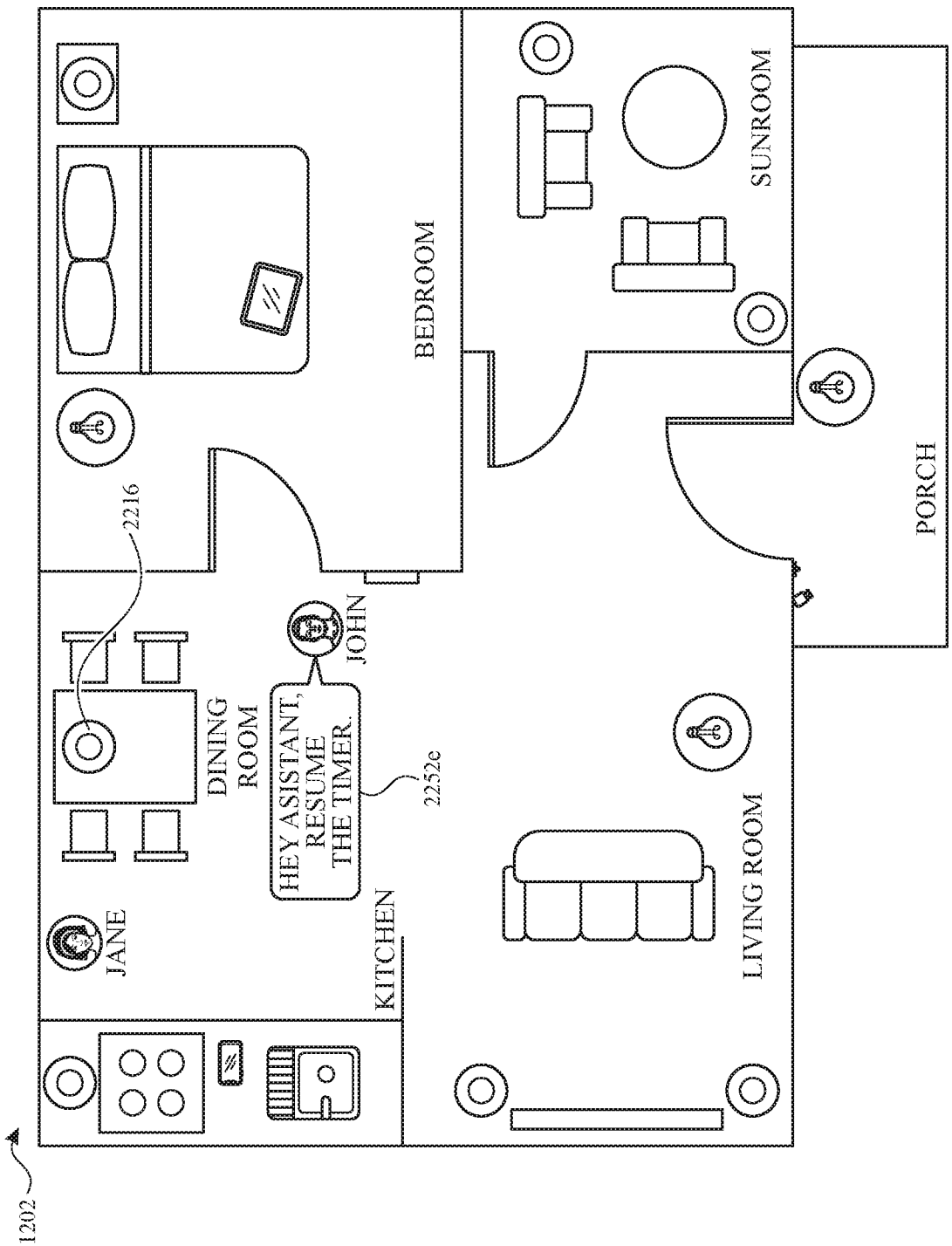

As illustrated in FIG. 22E, dining room speaker 1216 detects voice input 2252e (e.g., "Hey Assistant, resume the timer," uttered by John). At FIG. 22E, in response to detecting voice input 2252e, a determination is made that voice input 2252e was uttered by a different user (e.g., "John" or a user not identified as Jane) from the user who uttered the previous voice input that was detected (e.g., voice input 2250c), using similar techniques to those described above (e.g., in relation to FIGS. 21B-21D).

Figure 22F:
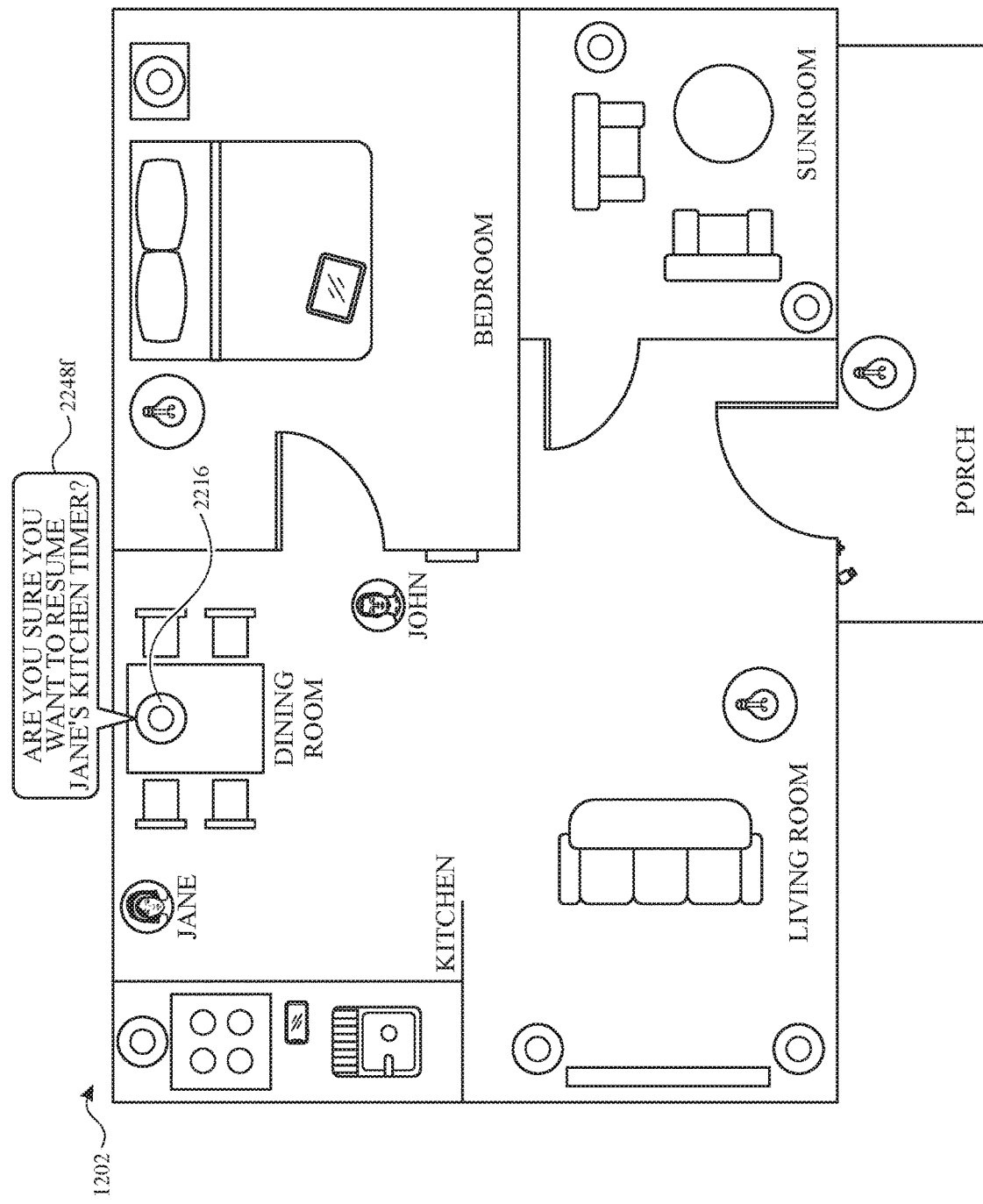

As illustrated in FIG. 22F, because the determination is made that voice input 2252e was uttered by a different user, dining room speaker 1216 provides audio output 2248f (e.g., "Are you sure want to resume Jane's kitchen timer") without resuming the kitchen timer (e.g., without performing an operation associated with voice input 2252e). Here, audio output 2248f is intended to get confirmation concerning whether the different user (e.g., "John") intends to cancel the kitchen timer that was started by user that originally started or setup the kitchen timer (e.g., "Jane"). In embodiments where Jane utters the same words as voice input 2252e, kitchen timer is resumed without dining room speaker 1216 providing audio output 2248f.

One or more other scenarios (e.g., scenarios related to music, alarm, timer, navigation, etc. applications) can be realized that incorporate similar techniques to those described above discussed in FIGS. 21A-21F and FIGS. 22A-22F. For example, in some embodiments, dining room speaker 1216 can receive voice input from Jane that initiates an alarm (or timer) that is named, "wake-up," that is set for 6:00 AM. In some of these embodiments, dining room speaker 1216 can receive a subsequent voice input from John that initiates another alarm (or timer) that is named, "wake-up" that is set for 8:00 AM. In a first set of embodiments, after initiating both alarms, dining room speaker 1216 receives voice input from Jane to cancel the wake-up alarm and, in response to receiving the voice input and because Jane did not provide the previous voice input (e.g., John did when the alarm named, "wake-up" that is set for 8:10), dining room speaker 1216 provides audio output that confirms whether Jane intends to cancel Jane's wake-up timer or John's wake-up timer. In a second set of embodiments, after initiating both alarms, dining room speaker 1216 receives voice input from John to cancel the wake-up alarm and in response to receiving the voice input and because John did provide the previous voice input, dining room speaker 1216 cancels the timer that John initiated. In a third set of embodiments, after initiating both alarms, dining room speaker 1216 receives voice input from Jane or John to cancel the wake-up alarm and, in response to receiving the voice input, dining room speaker 1216 cancels the alarm that was initiated by the respective user that provided the voice input without providing output to confirm.

FIG. 23 is a flow diagram illustrating a method for managing voice input using an electronic device in accordance with some embodiments. Method 2300 is performed at a computer system (e.g., 100, 300, 500, 600, 650) that is in communication with a display generation component and one or more input devices. Some operations in method 2300 are, optionally, combined, the orders of some operations are, optionally, changed, and some operations are, optionally, omitted.

As described below, method 2300 provides an intuitive way for managing voice input. The method reduces the cognitive burden on a user for managing voice input, thereby creating a more efficient human-machine interface. For battery-operated computing devices, enabling a user to manage playback faster and more efficiently conserves power and increases the time between battery charges.

The computer system receives (2302), from a first user (e.g., a user identified via voice recognition and/or authentication), a first request (e.g., a spoken request; a natural language request; an utterance) to perform an operation (e.g., media playback, starting a timer; starting an alarm). In some embodiments, the first request is processed by a digital assistant operating at the computer system or in communication with the computer system.

The computer system, in response to the first request, initiates (2304) performance of (e.g., performing) a first operation (e.g., 2150a, 2114a-2114c), where the first operation is performed based on at least a first performance parameter (e.g., 2150a) (e.g., a set of one or more computer systems for performing the operation (e.g., "group 1", "all devices"), an identify of a user requester; a type of operation (e.g., media playback, starting a timer), a variable controlling performance (e.g., for media playback, a media identifier (e.g., classical music, rock music, a specific song))). In some embodiments, the first request includes the first performance parameter (e.g., the request includes "play music at group 1").

The computer system, after initiating performance of the first operation (e.g., 2150a, 2114a-2114c, 2248b) (e.g., while performance of the first operation is ongoing), the computer system receives (2306), via the one or more input devices, a second request (e.g., 2150b, 2152c) (e.g., a spoken request; a natural language request; an utterance) to perform an operation (e.g., media playback, starting a timer; starting an alarm).

In response to (2308) receiving the second request and in accordance with a determination that the second request was made by the first user (e.g., 2150b, 2250a) (e.g., based on voice recognition), the computer system initiates (2310) performance of (e.g., performing) a second operation (e.g., 2150b, 2114a-2114c, 2248c, 2248d) (e.g., media playback, starting a timer; starting an alarm), where the second operation is performed based on at least the first performance parameter. In some embodiments, the computer system automatically adopts, for performance of the second operation, the first performance parameter of the first operation, without requiring that the first performance parameter be specified in the second request.

In response to (2308) receiving the second request (e.g., 2152c) and in accordance with a determination that the second request was made by a second user different than the first user (e.g., a user with an expressly defined identify (e.g., identified via voice recognition); a user identified as not being the first user, but without a specific recognized identity), the computer system initiates (2312) performance of (e.g., performing) a third operation (e.g., 2248f) different from the first operation (e.g., 2116a-2116c). Performing different operations in response to a second request based on whether the request is made by the same user as a first request reduces the number of user inputs (e.g., input defining whether to perform the first or second operation) required to perform the optimal operation. Performing an operation when a set of conditions are met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second request (e.g., 2152c, 2150b, 2252e) is received while performance of the first operation is ongoing. In some embodiments, while an effect of the first operation (e.g., music playing as a result of the play operation) is ongoing.

In some embodiments, the first performance parameter (e.g., person who uttered 2152c, 2150b, 2252e, 2250c) is an identity of the first user. Performing both the first and second operations based on the identity of the first user, without requiring the user to provide their identity, reduces the number of inputs required to perform the first and second operations. Performing an operation when a set of conditions are met without requiring further user input enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, the computer system is in communication with one or more output devices (e.g., an audio generation component (e.g., a speaker); a display generation component). In some embodiments, the third operation includes outputting, via the one or more output devices, a request (e.g., 2148d, 2248f) (e.g., a visual request (e.g., textual or graphical); an audio request (e.g., a spoken phrase)) for an input (e.g., an audio input) that identifies a set of one or more devices (e.g., a set of devices that includes the computer system) at which to perform a fourth operation (e.g., media playback, starting a timer; starting an alarm). In some embodiments, the fourth operation is performed based on at least a second performance parameter (e.g., a variable controlling performance (e.g., for media playback, a media identifier (e.g., classical music, rock music, a specific song)) that was included in the second request). Outputting a request for input identifying a set of devices to perform an operation reduces the probability of performing an operation at the wrong set of devices. Performing an operation while reducing the probability of erroneously performing the operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first operation is performed at (e.g., performed by) a first set of one or more devices (e.g., 1216, 1246, 1248) (e.g., a set of devices that includes the computer system). In some embodiments, after outputting the request (e.g., 2148*d*) for the input that identifies a set of one or more devices at which to perform the fourth operation (e.g., 2118*a*), the computer system receives, via the one or more input devices, a first input (e.g., 2152*c*, 2252*e*) that identifies a second set of one or more devices (e.g., 1216) (e.g., a set of devices that includes the computer system) that is different from the first set of one or more devices. In some embodiments, in response to receiving the first input, the computer system initiates performance of the fourth operation at the second set of one or more devices. Performing the fourth operation at a second set of devices identified by an input received after an outputted request provides the user with additional control over the performance of the fourth operation. Providing the user additional control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after initiating performance of the first operation and prior to initiating performance of the fourth operation (e.g., 2118*a*), the computer system is identifiable to at least a first external device (e.g., 1216) (e.g., a smart phone, a digital media player, a personal computer) as a member of the first set of one or more devices (e.g., 1216, 1246, 1248). In some embodiments, after the initiating performance of the fourth operation (e.g., 2118*a*), the computer system is identifiable to at least the first external device (e.g., 1216) as a member of the second set of one or more devices. In some embodiments, the computer system is no longer identifiable as a member of the first set of one or more devices. Modifying the identifiable membership of the computer system provides users with feedback as to the current membership of the computer system. Providing improved feedback to users enhances the operability of the computer system and makes the user-device interface more efficient (e.g., by helping the user to provide proper inputs and reducing user mistakes when operating/interacting with the device) which, additionally, reduces power usage and improves battery life of the computer system by enabling the user to use the computer system more quickly and efficiently.

In some embodiments, the request for the input that identifies a set of one or more devices at which to perform the fourth operation includes identifying a possible (e.g., likely, predicted) performance parameter (e.g., "here" or "at this device") for performing the fourth operation. In some embodiments, the second operation is performed using the same plurality of devices used to perform the first request.

In some embodiments, after initiating performance of the first operation (e.g., 2114*a*-2114*c*) (e.g., while performance of the first operation is ongoing), the computer system receives, via the one or more input devices, a third request (e.g., 2150*b*) (e.g., a spoken request; a natural language request; an utterance) to perform an operation (e.g., media playback, starting a timer; starting an alarm). In response to the third request, the computer system initiates performance of a fifth operation (e.g., media playback, starting a timer; starting an alarm). In some embodiments, performance of the fifth operation occurs without regard to the identity of the user that made the fourth request (e.g., the fifth operation is performed in the same manner for different users). Performing certain operations independent of user identity provides users with certain operations that are consistently performed across all users. Providing improved and/or additional control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the determination that the second request was made by a second user different than the first user includes a determination of a specific identity of the second user. In some embodiments, the second request is a spoken request/utterance and identification is made via voice recognition.

In some embodiments, the determination that the second request was made by a second user different than the first user does not include a determination of a specific identity of the second user (e.g., the second request is made by a user that does not match any user profile, including the first user profile).

In some embodiments, the first operation (and, in some embodiments, also the second operation) is selected from the group consisting of: playing media (e.g., 2114*a*-2114*c*) (e.g., music), starting a timer 2248*b*), starting an alarm, and providing navigation instructions.

Note that details of the processes described above with respect to method 2300 (e.g., FIG. 23) are also applicable in an analogous manner to the methods described above. For example, method 1800 optionally includes one or more of the characteristics of the various methods described above with reference to method 2300. For example, operation 1808 of method 1800 can be performed to create a new group of speakers to perform an action as described in 2304 of method 2300. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of audio media. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, account information and/or user preferences for audio media services (e.g., streaming music services), data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide audio media that is of greater interest to the user. Accordingly, use of such personal information data enables users to have calculated control of the provided content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of streaming audio services, the present technology can be configured to allow users to select to "opt in" or "opt out" of participation in the collection of personal information data during registration for services or anytime thereafter. In another example, users can select not to provide user preferences or account information for streaming audio services. In yet another example, users can select to limit the length of time preference data is maintained or entirely prohibit the development of a baseline preference profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, audio content can be selected and delivered to users by inferring preferences based on non-personal information data or a bare minimum amount of personal information, such as the content being requested by the device associated with a user, other non-personal information available to the audio content delivery services, or publicly available information.

What is claimed is:

1. A computer system, comprising:
one or more processors, wherein the computer system is in communication with a display generation component and one or more input devices; and
memory storing one or more programs configured to be executed by the one or more processors, the one or more programs including instructions for:
while the computer system is in an unlocked user interface state, displaying, via the display generation component, a first user interface that includes a first plurality of selectable user interface objects, wherein displaying the first plurality of selectable user interface objects includes concurrently displaying:

a first selectable user interface object that, when selected, causes the computer system to initiate a process that includes modifying a state of the computer system without causing an external accessory device to perform a function;

in accordance with a determination that the computer system is in a first use context, a second selectable user interface object that, when selected, causes a first external accessory device of a plurality of external accessory devices to perform a first function; and in accordance with a determination that the computer system is in a second use context that is different from the first use context, a third selectable user interface object, different from the second selectable user interface object, that, when selected, causes a second external accessory device of the plurality of external accessory devices to perform a second function, wherein the third selectable user interface object is not included in the first user interface in accordance with a determination that the computer system is in the first use context; and while the computer system is in a locked user interface state, displaying a second user interface that includes a second plurality of selectable user interface objects, wherein the second plurality of selectable user interface objects includes a fourth selectable user interface object that, when selected, initiates the process that includes modifying the state of the computer system without causing an external accessory device to perform the function, and wherein the second plurality of selectable user interface objects does not include either of a fifth selectable user interface object that, when selected, causes the first external accessory device of the plurality of external accessory devices to perform the first function and a sixth selectable user interface object that, when selected, causes the second external accessory device of the plurality of external accessory devices to perform the second function.

2. The computer system of claim 1, wherein the first external accessory device is different from the second external accessory device.

3. The computer system of claim 1, wherein:
the first use context includes a requirement that is met when the first user interface is displayed at a first time; and
the second use context includes a requirement that is met when the first user interface is displayed at a second time that is different from the first time.

4. The computer system of claim 1, wherein:
the first use context includes a requirement that is met when the computer system is detected at a first location; and
the second use context includes a requirement that is met when the computer system is detected at a second location that is different from the first location.

5. The computer system of claim 1, wherein:
the first use context includes a requirement that is met when the computer system has previously caused the first external accessory device to perform a third function; and the second use context includes a requirement that is met when the computer system has previously caused the second external accessory device to perform a fourth function.

6. The computer system of claim 1, wherein the first plurality of selectable user interface objects includes:
in accordance with a determination that the computer system is in the first use context, a first number of selectable user interface objects that includes the first selectable user interface object and the second selectable user interface object; and
in accordance with a determination that the computer system is in the second use context, a second number of selectable user interface objects that includes the first selectable user interface object and the third selectable user interface object, wherein the first number of selectable user interface objects is different than the second number of selectable user interface objects.

7. The computer system of claim 1, wherein the one or more programs further include instructions for:
receiving a first user input corresponding to the first selectable user interface object;
in response to receiving the first user input, displaying a user interface for controlling one or more external accessory devices that includes:
in accordance with the computer system being in the first use context, wherein the first use context includes the computer system being currently associated with a first location that corresponds to a first set of one or more external accessory devices, a first external accessory device user interface object that, when selected, causes a first external accessory device of the first set of one or more external accessory devices to perform a fifth function; and
in accordance with the computer system being in the second use context, wherein the second use context includes the computer system being currently associated with a second location that corresponds to a second set of one or more external accessory devices that is different from the first set of one or more external accessory devices, a second external accessory device user interface object that, when selected, causes the first external accessory device of the second set of one or more external accessory devices to perform a sixth function.

8. The computer system of claim 1, wherein the first user interface is displayed while the computer system is in a first user-configurable mode, and wherein the one or more programs further include instructions for:
while the computer system is in a second user-configurable mode, displaying a second user interface that includes a third plurality of selectable user interface objects, wherein the third plurality of selectable user interface objects includes a first subset of the first plurality of selectable user interface objects and does not include any selectable user interface objects of a second subset of the first plurality of selectable user interface objects that includes the first selectable user interface object and the second selectable user interface object.

9. The computer system of claim 1, wherein the one or more programs further include instructions for:
receiving user input corresponding to selection of the first selectable user interface object; and
in response to receiving the user input corresponding to selection of the first selectable user interface object:

while displaying the first user interface that includes the second selectable user interface object or the third selectable user interface object, displaying a seventh selectable user interface object that is different from the second selectable user interface object and the third selectable user interface object, wherein selection of the seventh selectable user interface object causes a seventh external accessory device of the plurality of external accessory devices to perform a seventh function.

10. The computer system of claim 1, wherein the fourth selectable user interface object is displayed at a location that the first selectable user interlace object was previously displayed.

11. The computer system of claim 1, wherein the one or more programs further include instructions for:
after displaying the second plurality of selectable user interface objects, displaying an indication that the computer system must be unlocked to display one or more controls that causes one or more external accessory devices to be unlocked.

12. The computer system of claim 11, wherein the indication is displayed at a location at which the second selectable user interface object or the third selectable user interface object was previously displayed.

13. A non-transitory computer-readable storage medium storing one or more programs configured to be executed by one or more processors of a computer system that is in communication with a display generation component and one or more input devices, the one or more programs including instructions for:
while the computer system is in an unlocked user interface state, displaying, via the display generation component, a first user interface that includes a first plurality of selectable user interface objects, wherein displaying the first plurality of selectable user interface objects includes concurrently displaying:
a first selectable user interface object that, when selected, causes the computer system to initiate a process that includes modifying a state of the computer system without causing an external accessory device to perform a function;
in accordance with a determination. that the computer system is in a first use context, a second selectable user interface object that, when selected, causes a first external accessory device of a plurality of external accessory devices to perform a first function; and
in accordance with a determination that the computer system is in a second use context that is different from the first use context, a third selectable user interface object, different from the second selectable user interface object, that, when selected, causes a second external accessory device of the plurality of external accessory devices to perform a second function, Wherein the third selectable user interface object is not included in the first user interface in accordance with a determination that the computer system is in the first use context; and
while the computer system is in a locked user interface state, displaying a second user interface that includes a second plurality of selectable user interface objects, wherein the second plurality of selectable user interface objects includes a fourth selectable user interface object that, when selected, initiates the process that includes modifying the state of the computer system without causing an external accessory device to perform the function, and
wherein the second plurality of selectable user interface objects does not include either of a fifth selectable user interface object that, when selected, causes the first external accessory device of the plurality of external accessory devices to perform the first function and a sixth selectable user interface object that, when selected, causes the second external accessory device of the plurality of external accessory devices to perform the second function.

14. The non-transitory computer-readable storage medium of claim 13, wherein the first external accessory device is different from the second external accessory device.

15. The non-transitory computer-readable storage medium of claim 13, wherein:
the first use context includes a requirement that is met when the first user interlace is displayed at a first time; and
the second use context includes a requirement that is met when the first user interface is displayed at a second time that is different from the first time.

16. The non-transitory computer-readable storage medium of claim 13, wherein:
the first use context includes a requirement that is met when the computer system is detected at a first location; and
the second use context includes a requirement that is met when the computer system is detected at a second location that is different from the first location.

17. The non-transitory computer-readable storage medium of claim 13, wherein:
the first use context includes a requirement that is met when the computer system has previously caused the first external accessory device to perform a third function; and
the second use context includes a requirement that is met when the computer system has previously caused the second external accessory device to perform a fourth function.

18. The non-transitory computer-readable storage medium of claim 13, wherein the first plurality of selectable user interface objects includes:
in accordance with a determination that the computer system is in the first use context, a first number of selectable user interface objects that includes the first selectable user interface object and the second selectable user interface object; and
in accordance with a determination that the computer system is in the second use context, a second number of selectable user interface objects that includes the first selectable user interface object and the third selectable user interface object, wherein the first number of selectable user interface objects is different than the second number of selectable user interface objects.

19. The non-transitory computer-readable storage medium of claim 13, wherein the one or more programs further include instructions for:
receiving a first user input corresponding to the first selectable user interface object;
in response to receiving the first user input, displaying a user interface for controlling one or more external accessory devices that includes:
in accordance with the computer system being in the first use context, wherein the first use context includes the computer system being currently associated with a first location that corresponds to a first set of one or more external accessory devices, a first external accessory device user interface object that, when selected, causes a first external accessory device of the first set of one or more external accessory devices to perform a fifth function; and in accordance with the computer system being in. the second use context, wherein the second use context includes the computer system being currently associated with a second location that corresponds to a second set of one or more external accessory devices that is different from the first set of one or more external accessory devices, a second external. accessory device user interface object that, when selected, causes the first external accessory device of the second set of one or more external accessory devices to perform a sixth function.

20. The non-transitory computer-readable storage medium of claim 13, wherein the first user interface is displayed while the computer system is in a first user-configurable mode, and wherein the one or more programs further include instructions for:

while the computer system is in a second user-configurable mode, displaying a second user interface that includes a third plurality of selectable user interface objects, wherein the third plurality of selectable user interface objects includes a first subset of the first plurality of selectable user interface objects and does not include any selectable user interface objects of a second subset of the first plurality of selectable user interface objects that includes the first selectable user interface object and the second selectable user interface object.

21. The non-transitory computer-readable storage medium of claim 13, wherein the one or more programs further include instructions for:

receiving user input corresponding to selection of the first selectable user interface object; and in response to receiving the user input corresponding to selection of the first selectable user interface object:
while displaying the first user interface that includes the second selectable user interface object or the third selectable user interface object, displaying a seventh selectable user interface object that is different from the second selectable user interface object and the third selectable user interface object, wherein selection of the seventh selectable user interface object causes a seventh external accessory device of the plurality of external accessory devices to perform a seventh function.

22. The non-transitory computer-readable storage medium of claim 13, wherein the fourth selectable user interface object is displayed at a location that the first selectable user interface object was previously displayed.

23. The non-transitory computer-readable storage medium of claim 13 wherein the one or more programs further include instructions for:

after displaying the second plurality of selectable user interface objects, displaying an indication that the computer system must be unlocked to display one or more controls that causes one or more external accessory devices to be unlocked.

24. The non-transitory computer-readable storage medium of claim 23, wherein the indication is displayed at a location at which the second selectable user interface object or the third selectable user interface object was previously displayed.

25. A method, comprising:
at a computer system that is in communication with a display generation component and one or more input devices:
determining that the computer system is in an unlocked user interface state;
while the computer system is in the unlocked user interface state and determined to be in a first use context, displaying, via the display generation component, a first user interface with a first plurality of selectable user interface objects, wherein displaying the first plurality of selectable user interface objects includes concurrently displaying:
a first selectable user interface object that, when selected, causes the computer system to initiate a process that includes modifying a state of the computer system without causing an external accessory device to perform a function; and
a second selectable user interface object that, when selected, causes a first external accessory device of a plurality of external accessory devices to perform a first function;
while the computer system is in the unlocked user interface state and determined to be in a second use context that is different from the first use context, displaying, via the display generation component, the first user interface with a second plurality of selectable user interface objects, wherein displaying the second plurality of selectable user interface objects includes concurrently displaying:
the first selectable user interface object; and
a third selectable user interface object, different from the second selectable user interface object, that, when selected, causes a second external accessory device of the plurality of external accessory devices to perform a second function, wherein the third selectable user interface object is not included in the first user interface while the computer system is in the first use context;
determining that the computer system is in a locked user interface state; and
while the computer system is in the locked user interface state, displaying a second user interface that includes a third plurality of selectable user interface objects,
wherein the third plurality of selectable user interface objects includes a fourth selectable user interface object that, when selected, initiates the process that includes modifying the state of the computer system without causing an external accessory device to perform the function, and
wherein the third plurality of selectable user interface objects does not include either of a fifth selectable user interface object that, when selected, causes the first external accessory device of the plurality of external accessory devices to perform the first function and a sixth selectable user interface object that, when selected, causes the second external accessory device of the plurality of external accessory devices to perform the second function.

26. The method of claim 25, wherein the first external accessory device is different from the second external accessory device.

27. The method of claim 25, wherein:
the first use context includes a requirement that is met when the first user interface is displayed at a first time; and the second use context includes a requirement that is met when the first user interface is displayed at a second time that is different front the first time.

28. The method of claim 25, wherein:
the first use context includes a requirement that is met when the computer system is detected at a first location; and
the second use context includes a requirement that is met when the computer system is detected at a second location that is different from the first location.

29. The method of claim 25, wherein:
the first use context includes a requirement that is met when the computer system has previously caused the first external accessory device to perform a third function; and
the second use context includes a requirement that is met when the computer system has previously caused the second external accessory device to perform a fourth function.

30. The method of claim 25, wherein:
the first plurality of selectable user interface objects includes a first number of selectable user interface objects that includes the first selectable user interface object and the second selectable user interface object; and
the second plurality of selectable user interface objects includes a second number of selectable user interface objects that includes the first selectable user interface object and the third selectable user interface object, wherein the first number of selectable user interface objects is different than the second number of selectable user interface objects.

31. The method of claim 25, further comprising:
while the computer system is determined to be in the first use context, wherein the first use context includes the computer system being currently associated with a first location that corresponds to a first set of one or more external accessory devices, receiving a first user input corresponding to the first selectable user interface object;
in response to receiving the first user input, displaying a user interface for controlling one or more external accessory devices that includes a first external accessory device user interface object that, when selected, causes a first external accessory device of the first set of one or more external accessory devices to perform a fifth function;
while the computer system is determined to be in the second use context, wherein the second use context includes the computer system being currently associated with a second location that corresponds to a second set of one or more external accessory devices that is different from the first set of one or more external accessory devices,
receiving a second user input corresponding to the first selectable user interface object; and
in response to receiving the second user input, displaying a second user interface for controlling one or more external accessory devices that includes a second external accessory device user interface object that, when selected, causes a first external accessory device of the second set of one or more external accessory devices to perform a sixth function.

32. The method of claim 25, wherein the first user interface is displayed while the computer system is in a first user-configurable mode, the method further comprising:
while the computer system is in a second user-configurable mode, displaying a second user interface that includes a fourth plurality of selectable user interface objects, wherein the fourth plurality of selectable user interface objects includes a first subset of the first plurality of selectable user interface objects and does not include any selectable user interface objects of a second subset of the first plurality of selectable user interface objects that includes the first selectable user interface object and the second selectable user interface object.

33. The method of claim 25, further comprising:
receiving user input corresponding to selection of the first selectable user interface object; and
in response to receiving the user input corresponding to selection of the first selectable user interface object:
while displaying the first user interface that includes the second selectable user interface object or the third selectable user interface object, displaying a seventh selectable user interface object that is different from the second selectable user interface object and the third selectable user interface object, wherein selection of the seventh selectable user interface object causes a seventh external accessory device of the plurality of external accessory devices to perform a seventh function.

34. The method of claim 25, wherein the fourth selectable user interface object is displayed at a location that the first selectable user interface object was previously displayed.

35. The method of claim 25, further comprising:
after displaying the third plurality of selectable user interface objects, displaying an indication that the computer system must be unlocked to display one or more controls that causes one or more external accessory devices to be unlocked.

36. The method of claim 35, wherein the indication is displayed at a location at which the second selectable user interface object or the third selectable user interface object was previously displayed.

* * * * *

UNITED STATES PATENT AND TRADEMARK OFFICE
CERTIFICATE OF CORRECTION

| | |
|---|---|
| PATENT NO. | : 11,853,646 B2 |
| APPLICATION NO. | : 16/922675 |
| DATED | : December 26, 2023 |
| INVENTOR(S) | : Taylor G. Carrigan et al. |

It is certified that error appears in the above-identified patent and that said Letters Patent is hereby corrected as shown below:

On the Title Page

Item (72), In the Inventors:
Column 1, Line 4, delete "Cupertino," and insert --San Francisco,--.
Column 1, Line 5, delete "Cupertino," and insert --San Francisco,--.

Under item (56), In Other Publications:
Column 2, Line 1, delete "snnartwatch"," and insert --smartwatch",--.

In the Claims

Column 147, Line 13, Claim 10, delete "interlace" and insert --interface--.

Column 147, Line 43, Claim 13, delete "determination." and insert --determination--.

Column 147, Line 55, Claim 13, delete "Wherein" and insert --wherein--.

Column 148, Line 17, Claim 15, delete "interlace" and insert --interface--.

Column 149, Line 5, Claim 19, delete "in." and insert --in--.

Column 149, Line 11, Claim 19, delete "external." and insert --external--.

Column 151, Line 3, Claim 27, delete "front" and insert --from--.

Signed and Sealed this
Fifteenth Day of October, 2024

Katherine Kelly Vidal
*Director of the United States Patent and Trademark Office*